US011410106B2

(12) United States Patent
Brannon et al.

(10) Patent No.: US 11,410,106 B2
(45) **Date of Patent: *Aug. 9, 2022**

(54) PRIVACY MANAGEMENT SYSTEMS AND METHODS

(71) Applicant: OneTrust, LLC, Atlanta, GA (US)

(72) Inventors: Jonathan Blake Brannon, Smyrna, GA (US); Andrew Clearwater, Atlanta, GA (US); Brian Philbrook, Atlanta, GA (US); Trey Hecht, Atlanta, GA (US); Wesley Johnson, Atlanta, GA (US); Nicholas Ian Pavlichek, Atlanta, GA (US); Rajanandini Chennur, Atlanta, GA (US)

(73) Assignee: OneTrust, LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/535,065

(22) Filed: Nov. 24, 2021

(65) Prior Publication Data

US 2022/0083934 A1 Mar. 17, 2022

Related U.S. Application Data

(63) Continuation of application No. 17/306,252, filed on May 3, 2021, now Pat. No. 11,188,862, which is a (Continued)

(51) Int. Cl.

*G06F 21/00* (2013.01)
*G06Q 10/06* (2012.01)
*G06F 15/76* (2006.01)
*G06F 21/55* (2013.01)
*G06F 21/62* (2013.01)
*G06F 21/57* (2013.01)
*G06F 16/95* (2019.01)

(52) U.S. Cl.

CPC ......... *G06Q 10/0635* (2013.01); *G06F 15/76* (2013.01); *G06F 21/552* (2013.01); (Continued)

(58) Field of Classification Search

CPC .. G06Q 10/0635; G06Q 10/067; G06F 15/76; G06F 21/552; G06F 21/577; G06F 21/6245; G06F 16/95

See application file for complete search history.

(56) References Cited

U.S. PATENT DOCUMENTS 5,710,917 A 1/1998 Musa et al.
6,148,297 A 11/2000 Swor et al.
(Continued)

FOREIGN PATENT DOCUMENTS

WO 2008/134203 11/2008
WO 2020/146028 7/2020
WO 2022006421 1/2022

OTHER PUBLICATIONS

Bjorn Greif, "Cookie Pop-up Blocker: Cliqz Automatically Denies Consent Requests," Cliqz.com, pp. 1-9, Aug. 11, 2019 (Year: 2019).
(Continued)

*Primary Examiner* — Shin-Hon (Eric) Chen

(74) *Attorney, Agent, or Firm* — Brient IP Law, LLC

(57) ABSTRACT

Data processing systems and methods, according to various embodiments, are adapted for mapping various questions regarding a data breach from a master questionnaire to a plurality of territory-specific data breach disclosure questionnaires. The answers to the questions in the master questionnaire are used to populate the territory-specific data breach disclosure questionnaires and determine whether disclosure is required in territory. The system can automatically notify the appropriate regulatory bodies for each territory where it is determined that data breach disclosure is required.

18 Claims, 75 Drawing Sheets

Related U.S. Application Data continuation-in-part of application No. 17/026,727, filed on Sep. 21, 2020, now Pat. No. 10,997,542, which is a continuation of application No. 16/808,496, filed on Mar. 4, 2020, now Pat. No. 10,796,260, which is a continuation-in-part of application No. 16/714,355, filed on Dec. 13, 2019, now Pat. No. 10,692,033, which is a continuation of application No. 16/403,358, filed on May 3, 2019, now Pat. No. 10,510,031, which is a continuation of application No. 16/159,634, filed on Oct. 13, 2018, now Pat. No. 10,282,692, which is a continuation-in-part of application No. 16/055,083, filed on Aug. 4, 2018, now Pat. No. 10,289,870, which is a continuation-in-part of application No. 15/996,208, filed on Jun. 1, 2018, now Pat. No. 10,181,051, which is a continuation-in-part of application No. 15/853,674, filed on Dec. 22, 2017, now Pat. No. 10,019,597, which is a continuation-in-part of application No. 15/169,455, filed on Jun. 10, 2017, now Pat. No. 9,851,966, which is a continuation-in-part of application No. 15/254,901, filed on Sep. 1, 2016, now Pat. No. 9,729,583.

(60) Provisional application No. 62/813,584, filed on Mar. 4, 2019, provisional application No. 62/728,435, filed on Sep. 7, 2018, provisional application No. 62/572,096, filed on Oct. 13, 2017, provisional application No. 62/547,530, filed on Aug. 18, 2017, provisional application No. 62/541,613, filed on Aug. 4, 2017, provisional application No. 62/537,839, filed on Jul. 27, 2017, provisional application No. 62/360,123, filed on Jul. 8, 2016, provisional application No. 62/353,802, filed on Jun. 23, 2016, provisional application No. 62/348,695, filed on Jun. 10, 2016.

(52) U.S. Cl.
CPC ........ *G06F 21/577* (2013.01); *G06F 21/6245* (2013.01); *G06Q 10/067* (2013.01); *G06F 16/95* (2019.01)

(56) References Cited

U.S. PATENT DOCUMENTS

| | | | |
|---|---|---|---|
| 6,243,816 | B1 | 6/2001 | Fang et al. |
| 6,330,562 | B1 | 12/2001 | Boden et al. |
| 6,516,337 | B1 | 2/2003 | Tripp et al. |
| 6,574,631 | B1 | 6/2003 | Subramanian et al. |
| 6,699,042 | B2 | 3/2004 | Smith et al. |
| 6,701,314 | B1 | 3/2004 | Conover et al. |
| 6,721,713 | B1 | 4/2004 | Guheen et al. |
| 6,754,665 | B1 | 6/2004 | Futagami et al. |
| 6,762,413 | B2 | 7/2004 | Zeng et al. |
| 6,850,252 | B1 | 2/2005 | Hoffberg |
| 6,909,897 | B2 | 6/2005 | Kikuchi |
| 6,980,927 | B2 | 12/2005 | Tracy et al. |
| 7,023,979 | B1 | 4/2006 | Wu et al. |
| 7,124,107 | B1 | 10/2006 | Pishevar et al. |
| 7,149,698 | B2 | 12/2006 | Guheen et al. |
| 7,165,041 | B1 | 1/2007 | Guheen et al. |
| 7,299,299 | B2 | 11/2007 | Hollenbeck et al. |
| 7,315,826 | B1 | 1/2008 | Guheen et al. |
| 7,382,903 | B2 | 6/2008 | Ray |
| 7,428,546 | B2 | 9/2008 | Nori et al. |
| 7,565,685 | B2 | 7/2009 | Ross et al. |
| 7,584,508 | B1 | 9/2009 | Kashchenko et al. |
| 7,676,034 | B1 | 3/2010 | Wu et al. |
| 7,702,639 | B2 | 4/2010 | Stanley et al. |
| 7,761,586 | B2 | 7/2010 | Olenick et al. |
| 7,801,912 | B2 | 9/2010 | Ransil et al. |
| 7,802,305 | B1 | 9/2010 | Leeds |
| 7,813,947 | B2 | 10/2010 | Deangelis et al. |
| 8,005,891 | B2 | 8/2011 | Knowles et al. |
| 8,036,374 | B2 | 10/2011 | Noble, Jr. |
| 8,041,749 | B2 | 10/2011 | Beck |
| 8,090,754 | B2 | 1/2012 | Schmidt et al. |
| 8,156,159 | B2 | 4/2012 | Ebrahimi et al. |
| 8,214,362 | B1 | 7/2012 | Djabarov |
| 8,261,362 | B2 | 9/2012 | Goodwin et al. |
| 8,381,297 | B2 | 2/2013 | Touboul |
| 8,464,311 | B2 | 6/2013 | Ashley et al. |
| 8,468,244 | B2 | 6/2013 | Redlich et al. |
| 8,473,324 | B2 | 6/2013 | Alvarez et al. |
| 8,474,012 | B2 | 6/2013 | Ahmed et al. |
| 8,494,894 | B2 | 7/2013 | Jaster et al. |
| 8,504,481 | B2 | 8/2013 | Motahari et al. |
| 8,510,199 | B1 | 8/2013 | Erlanger |
| 8,515,988 | B2 | 8/2013 | Jones et al. |
| 8,516,076 | B2 | 8/2013 | Thomas |
| 8,527,337 | B1 | 9/2013 | Lim et al. |
| 8,533,746 | B2 | 9/2013 | Nolan et al. |
| 8,533,844 | B2 | 9/2013 | Mahaffey et al. |
| 8,538,817 | B2 | 9/2013 | Wilson |
| 8,539,359 | B2 | 9/2013 | Rapaport et al. |
| 8,539,437 | B2 | 9/2013 | Finlayson et al. |
| 8,560,645 | B2 | 10/2013 | Linden et al. |
| 8,560,841 | B2 | 10/2013 | Chin et al. |
| 8,560,956 | B2 | 10/2013 | Curtis et al. |
| 8,561,153 | B2 | 10/2013 | Grason et al. |
| 8,565,729 | B2 | 10/2013 | Moseler et al. |
| 8,566,726 | B2 | 10/2013 | Dixon et al. |
| 8,566,938 | B1 | 10/2013 | Prakash et al. |
| 8,571,909 | B2 | 10/2013 | Miller et al. |
| 8,572,717 | B2 | 10/2013 | Narayanaswamy |
| 8,578,036 | B1 | 11/2013 | Holfelder et al. |
| 8,578,166 | B2 | 11/2013 | De Monseignat et al. |
| 8,578,481 | B2 | 11/2013 | Rowley |
| 8,578,501 | B1 | 11/2013 | Ogilvie |
| 8,583,694 | B2 | 11/2013 | Siegel et al. |
| 8,583,766 | B2 | 11/2013 | Dixon et al. |
| 8,589,183 | B2 | 11/2013 | Awaraji et al. |
| 8,601,467 | B2 | 12/2013 | Hofhansl et al. |
| 8,601,591 | B2 | 12/2013 | Krishnamurthy et al. |
| 8,606,746 | B2 | 12/2013 | Yeap et al. |
| 8,612,420 | B2 | 12/2013 | Sun et al. |
| 8,612,993 | B2 | 12/2013 | Grant et al. |
| 8,615,549 | B2 | 12/2013 | Knowles et al. |
| 8,615,731 | B2 | 12/2013 | Doshi |
| 8,620,952 | B2 | 12/2013 | Bennett et al. |
| 8,621,637 | B2 | 12/2013 | Al-Harbi et al. |
| 8,626,671 | B2 | 1/2014 | Federgreen |
| 8,627,114 | B2 | 1/2014 | Resch et al. |
| 8,630,961 | B2 | 1/2014 | Beilby et al. |
| 8,631,048 | B1 | 1/2014 | Davis et al. |
| 8,640,110 | B2 | 1/2014 | Kopp et al. |
| 8,646,072 | B1 | 2/2014 | Savant |
| 8,650,399 | B2 | 2/2014 | Le Bihan et al. |
| 8,655,939 | B2 | 2/2014 | Redlich et al. |
| 8,656,265 | B1 | 2/2014 | Paulin et al. |
| 8,656,456 | B2 | 2/2014 | Maxson et al. |
| 8,661,036 | B2 | 2/2014 | Turski et al. |
| 8,667,074 | B1 | 3/2014 | Farkas |
| 8,667,487 | B1 | 3/2014 | Boodman et al. |
| 8,677,472 | B1 | 3/2014 | Dotan et al. |
| 8,681,984 | B2 | 3/2014 | Lee et al. |
| 8,682,698 | B2 | 3/2014 | Cashman et al. |
| 8,683,502 | B2 | 3/2014 | Shkedi et al. |
| 8,688,601 | B2 | 4/2014 | Jaiswal |
| 8,689,292 | B2 | 4/2014 | Williams et al. |
| 8,693,689 | B2 | 4/2014 | Belenkiy et al. |
| 8,700,524 | B2 | 4/2014 | Williams et al. |
| 8,700,699 | B2 | 4/2014 | Shen et al. |
| 8,706,742 | B1 | 4/2014 | Ravid et al. |
| 8,707,451 | B2 | 4/2014 | Ture et al. |
| 8,712,813 | B2 | 4/2014 | King |
| 8,713,098 | B1 | 4/2014 | Adya et al. |
| 8,713,638 | B2 | 4/2014 | Hu et al. |
| 8,719,366 | B2 | 5/2014 | Mathew et al. |
| 8,732,839 | B2 | 5/2014 | Hohl |

(56) References Cited

U.S. PATENT DOCUMENTS

| | | | |
|---|---|---|---|
| 8,744,894 | B2 | 6/2014 | Christiansen et al. |
| 8,751,285 | B2 | 6/2014 | Deb et al. |
| 8,762,406 | B2 | 6/2014 | Ho et al. |
| 8,763,071 | B2 | 6/2014 | Sinha et al. |
| 8,763,082 | B2 | 6/2014 | Huber et al. |
| 8,763,131 | B2 | 6/2014 | Archer et al. |
| 8,767,947 | B1 | 7/2014 | Ristock et al. |
| 8,769,242 | B2 | 7/2014 | Tkac et al. |
| 8,769,412 | B2 | 7/2014 | Gill et al. |
| 8,769,671 | B2 | 7/2014 | Shraim et al. |
| 8,776,241 | B2 | 7/2014 | Zaitsev |
| 8,788,935 | B1 | 7/2014 | Hirsch et al. |
| 8,793,614 | B2 | 7/2014 | Wilson et al. |
| 8,793,650 | B2 | 7/2014 | Hilerio et al. |
| 8,793,781 | B2 | 7/2014 | Grossi et al. |
| 8,793,809 | B2 | 7/2014 | Falkenburg et al. |
| 8,799,984 | B2 | 8/2014 | Ahn |
| 8,805,707 | B2 | 8/2014 | Schumann, Jr. et al. |
| 8,805,806 | B2 | 8/2014 | Amarendran et al. |
| 8,805,925 | B2 | 8/2014 | Price et al. |
| 8,812,342 | B2 | 8/2014 | Barcelo et al. |
| 8,812,752 | B1 | 8/2014 | Shih et al. |
| 8,812,766 | B2 | 8/2014 | Kranendonk et al. |
| 8,813,028 | B2 | 8/2014 | Farooqi |
| 8,819,253 | B2 | 8/2014 | Simeloff et al. |
| 8,819,617 | B1 | 8/2014 | Koenig et al. |
| 8,826,446 | B1 | 9/2014 | Liu et al. |
| 8,832,649 | B2 | 9/2014 | Bishop et al. |
| 8,832,854 | B1 | 9/2014 | Staddon et al. |
| 8,839,232 | B2 | 9/2014 | Taylor et al. |
| 8,843,487 | B2 | 9/2014 | McGraw et al. |
| 8,843,745 | B2 | 9/2014 | Roberts, Jr. |
| 8,849,757 | B2 | 9/2014 | Kruglick |
| 8,856,534 | B2 | 10/2014 | Khosravi et al. |
| 8,856,936 | B2 | 10/2014 | Datta Ray et al. |
| 8,862,507 | B2 | 10/2014 | Sandhu et al. |
| 8,875,232 | B2 | 10/2014 | Blom et al. |
| 8,893,078 | B2 | 11/2014 | Schaude et al. |
| 8,893,286 | B1 | 11/2014 | Oliver |
| 8,893,297 | B2 | 11/2014 | Eversoll et al. |
| 8,904,494 | B2 | 12/2014 | Kindler et al. |
| 8,914,263 | B2 | 12/2014 | Shimada et al. |
| 8,914,299 | B2 | 12/2014 | Pesci-Anderson |
| 8,914,342 | B2 | 12/2014 | Kalaboukis et al. |
| 8,914,902 | B2 | 12/2014 | Moritz et al. |
| 8,918,306 | B2 | 12/2014 | Cashman et al. |
| 8,918,392 | B1 | 12/2014 | Brooker et al. |
| 8,918,632 | B1 | 12/2014 | Sartor |
| 8,930,896 | B1 | 1/2015 | Wiggins |
| 8,930,897 | B2 | 1/2015 | Nassar |
| 8,935,198 | B1 | 1/2015 | Phillips et al. |
| 8,935,266 | B2 | 1/2015 | Wu |
| 8,935,342 | B2 | 1/2015 | Patel |
| 8,935,804 | B1 | 1/2015 | Clark et al. |
| 8,938,221 | B2 | 1/2015 | Brazier et al. |
| 8,943,076 | B2 | 1/2015 | Stewart et al. |
| 8,943,548 | B2 | 1/2015 | Drokov et al. |
| 8,949,137 | B2 | 2/2015 | Crapo et al. |
| 8,955,038 | B2 | 2/2015 | Nicodemus et al. |
| 8,959,568 | B2 | 2/2015 | Hudis et al. |
| 8,959,584 | B2 | 2/2015 | Piliouras |
| 8,966,575 | B2 | 2/2015 | McQuay et al. |
| 8,966,597 | B1 | 2/2015 | Saylor et al. |
| 8,973,108 | B1 | 3/2015 | Roth et al. |
| 8,977,234 | B2 | 3/2015 | Chava |
| 8,977,643 | B2 | 3/2015 | Schindlauer et al. |
| 8,978,158 | B2 | 3/2015 | Rajkumar et al. |
| 8,983,972 | B2 | 3/2015 | Kriebel et al. |
| 8,984,031 | B1 | 3/2015 | Todd |
| 8,990,933 | B1 | 3/2015 | Magdalin |
| 8,996,417 | B1 | 3/2015 | Channakeshava |
| 8,996,480 | B2 | 3/2015 | Agarwala et al. |
| 8,997,213 | B2 | 3/2015 | Papakipos et al. |
| 9,003,295 | B2 | 4/2015 | Baschy |
| 9,003,552 | B2 | 4/2015 | Goodwin et al. |
| 9,009,851 | B2 | 4/2015 | Droste et al. |
| 9,014,661 | B2 | 4/2015 | Decharms |
| 9,015,796 | B1 | 4/2015 | Fujioka |
| 9,021,469 | B2 | 4/2015 | Hilerio et al. |
| 9,026,526 | B1 | 5/2015 | Bau et al. |
| 9,030,987 | B2 | 5/2015 | Bianchei et al. |
| 9,032,067 | B2 | 5/2015 | Prasad et al. |
| 9,043,217 | B2 | 5/2015 | Cashman et al. |
| 9,043,480 | B2 | 5/2015 | Barton et al. |
| 9,047,463 | B2 | 6/2015 | Porras |
| 9,047,582 | B2 | 6/2015 | Hutchinson et al. |
| 9,047,639 | B1 | 6/2015 | Ouintiliani et al. |
| 9,049,244 | B2 | 6/2015 | Prince et al. |
| 9,049,314 | B2 | 6/2015 | Pugh et al. |
| 9,055,071 | B1 | 6/2015 | Gates et al. |
| 9,058,590 | B2 | 6/2015 | Criddle et al. |
| 9,064,033 | B2 | 6/2015 | Jin et al. |
| 9,069,940 | B2 | 6/2015 | Hars |
| 9,076,231 | B1 | 7/2015 | Hill et al. |
| 9,077,736 | B2 | 7/2015 | Werth et al. |
| 9,081,952 | B2 | 7/2015 | Sagi et al. |
| 9,087,090 | B1 | 7/2015 | Cormier et al. |
| 9,092,796 | B2 | 7/2015 | Eversoll et al. |
| 9,094,434 | B2 | 7/2015 | Williams et al. |
| 9,098,515 | B2 | 8/2015 | Richter et al. |
| 9,100,778 | B2 | 8/2015 | Stogaitis et al. |
| 9,106,691 | B1 | 8/2015 | Burger et al. |
| 9,106,710 | B1 | 8/2015 | Feimster |
| 9,110,918 | B1 | 8/2015 | Rajaa et al. |
| 9,111,105 | B2 | 8/2015 | Barton et al. |
| 9,111,295 | B2 | 8/2015 | Tietzen et al. |
| 9,123,339 | B1 | 9/2015 | Shaw et al. |
| 9,129,311 | B2 | 9/2015 | Schoen et al. |
| 9,135,261 | B2 | 9/2015 | Maunder et al. |
| 9,135,444 | B2 | 9/2015 | Carter et al. |
| 9,141,823 | B2 | 9/2015 | Dawson |
| 9,141,911 | B2 | 9/2015 | Zhao et al. |
| 9,152,818 | B1 | 10/2015 | Hathaway et al. |
| 9,152,820 | B1 | 10/2015 | Pauley, Jr. et al. |
| 9,154,514 | B1 | 10/2015 | Prakash |
| 9,154,556 | B1 | 10/2015 | Dotan et al. |
| 9,158,655 | B2 | 10/2015 | Wadhwani et al. |
| 9,165,036 | B2 | 10/2015 | Mehra |
| 9,170,996 | B2 | 10/2015 | Lovric et al. |
| 9,172,706 | B2 | 10/2015 | Krishnamurthy et al. |
| 9,177,293 | B1 | 11/2015 | Gagnon et al. |
| 9,178,901 | B2 | 11/2015 | Kue et al. |
| 9,183,100 | B2 | 11/2015 | Gventer et al. |
| 9,189,642 | B2 | 11/2015 | Perlman |
| 9,201,572 | B2 | 12/2015 | Lyon et al. |
| 9,201,770 | B1 | 12/2015 | Duerk |
| 9,202,026 | B1 | 12/2015 | Reeves |
| 9,202,085 | B2 | 12/2015 | Mawdsley et al. |
| 9,215,076 | B1 | 12/2015 | Roth |
| 9,215,252 | B2 | 12/2015 | Smith et al. |
| 9,218,596 | B2 | 12/2015 | Ronca et al. |
| 9,224,009 | B1 | 12/2015 | Liu et al. |
| 9,230,036 | B2 | 1/2016 | Davis |
| 9,231,935 | B1 | 1/2016 | Bridge et al. |
| 9,232,040 | B2 | 1/2016 | Barash et al. |
| 9,235,476 | B2 | 1/2016 | McHugh et al. |
| 9,240,987 | B2 | 1/2016 | Barrett-Bowen et al. |
| 9,241,259 | B2 | 1/2016 | Daniela et al. |
| 9,245,126 | B2 | 1/2016 | Christodorescu et al. |
| 9,245,266 | B2 | 1/2016 | Hardt |
| 9,253,609 | B2 | 2/2016 | Hosier, Jr. |
| 9,264,443 | B2 | 2/2016 | Weisman |
| 9,274,858 | B2 | 3/2016 | Milliron et al. |
| 9,280,581 | B1 | 3/2016 | Grimes et al. |
| 9,286,149 | B2 | 3/2016 | Sampson et al. |
| 9,286,282 | B2 | 3/2016 | Ling, III et al. |
| 9,288,118 | B1 | 3/2016 | Pattan |
| 9,288,556 | B2 | 3/2016 | Kim et al. |
| 9,294,498 | B1 | 3/2016 | Yampolskiy et al. |
| 9,299,050 | B2 | 3/2016 | Stiffler et al. |
| 9,306,939 | B2 | 4/2016 | Chan et al. |
| 9,317,697 | B2 | 4/2016 | Maier et al. |
| 9,317,715 | B2 | 4/2016 | Schuette et al. |
| 9,325,731 | B2 | 4/2016 | McGeehan |

(56) References Cited

U.S. PATENT DOCUMENTS

| | | | |
|---|---|---|---|
| 9,336,184 | B2 | 5/2016 | Mital et al. |
| 9,336,324 | B2 | 5/2016 | Lomme et al. |
| 9,336,332 | B2 | 5/2016 | Davis et al. |
| 9,336,400 | B2 | 5/2016 | Milman et al. |
| 9,338,188 | B1 | 5/2016 | Ahn |
| 9,342,706 | B2 | 5/2016 | Chawla et al. |
| 9,344,297 | B2 | 5/2016 | Shah et al. |
| 9,344,424 | B2 | 5/2016 | Tenenboym et al. |
| 9,344,484 | B2 | 5/2016 | Ferris |
| 9,348,802 | B2 | 5/2016 | Massand |
| 9,348,862 | B2 | 5/2016 | Kawecki, III |
| 9,348,929 | B2 | 5/2016 | Eberlein |
| 9,349,016 | B1 | 5/2016 | Brisebois et al. |
| 9,350,718 | B2 | 5/2016 | Sondhi et al. |
| 9,355,157 | B2 | 5/2016 | Mohammed et al. |
| 9,356,961 | B1 | 5/2016 | Todd et al. |
| 9,361,446 | B1 | 6/2016 | Demirjian et al. |
| 9,369,488 | B2 | 6/2016 | Woods et al. |
| 9,374,693 | B1 | 6/2016 | Olincy et al. |
| 9,384,199 | B2 | 7/2016 | Thereska et al. |
| 9,384,357 | B2 | 7/2016 | Patil et al. |
| 9,386,104 | B2 | 7/2016 | Adams et al. |
| 9,396,332 | B2 | 7/2016 | Abrams et al. |
| 9,401,900 | B2 | 7/2016 | Levasseur et al. |
| 9,411,967 | B2 | 8/2016 | Parecki et al. |
| 9,411,982 | B1 | 8/2016 | Dippenaar et al. |
| 9,417,859 | B2 | 8/2016 | Gounares et al. |
| 9,424,021 | B2 | 8/2016 | Zamir |
| 9,424,414 | B1 | 8/2016 | Demirjian et al. |
| 9,426,177 | B2 | 8/2016 | Wang et al. |
| 9,450,940 | B2 | 9/2016 | Belov et al. |
| 9,460,136 | B1 | 10/2016 | Todd et al. |
| 9,460,171 | B2 | 10/2016 | Marrelli et al. |
| 9,460,307 | B2 | 10/2016 | Breslau et al. |
| 9,461,876 | B2 | 10/2016 | Van Dusen et al. |
| 9,462,009 | B1 | 10/2016 | Kolman et al. |
| 9,465,702 | B2 | 10/2016 | Gventer et al. |
| 9,465,800 | B2 | 10/2016 | Lacey |
| 9,473,446 | B2 | 10/2016 | Mjay et al. |
| 9,473,535 | B2 | 10/2016 | Sartor |
| 9,477,523 | B1 | 10/2016 | Warman et al. |
| 9,477,660 | B2 | 10/2016 | Scott et al. |
| 9,477,685 | B1 | 10/2016 | Leung et al. |
| 9,477,942 | B2 | 10/2016 | Adachi et al. |
| 9,483,659 | B2 | 11/2016 | Bao et al. |
| 9,489,366 | B2 | 11/2016 | Scott et al. |
| 9,495,547 | B1 | 11/2016 | Schepis et al. |
| 9,501,523 | B2 | 11/2016 | Hyatt et al. |
| 9,507,960 | B2 | 11/2016 | Bell et al. |
| 9,509,674 | B1 | 11/2016 | Nasserbakht et al. |
| 9,509,702 | B2 | 11/2016 | Grigg et al. |
| 9,514,231 | B2 | 12/2016 | Eden |
| 9,516,012 | B2 | 12/2016 | Chochois et al. |
| 9,521,166 | B2 | 12/2016 | Wilson |
| 9,524,500 | B2 | 12/2016 | Dave et al. |
| 9,529,989 | B2 | 12/2016 | Kling et al. |
| 9,536,108 | B2 | 1/2017 | Powell et al. |
| 9,537,546 | B2 | 1/2017 | Cordeiro et al. |
| 9,542,568 | B2 | 1/2017 | Francis et al. |
| 9,549,047 | B1 | 1/2017 | Fredinburg et al. |
| 9,552,395 | B2 | 1/2017 | Bayer et al. |
| 9,552,470 | B2 | 1/2017 | Turgeman et al. |
| 9,553,918 | B1 | 1/2017 | Manion et al. |
| 9,558,497 | B2 | 1/2017 | Carvalho |
| 9,569,752 | B2 | 2/2017 | Deering et al. |
| 9,571,509 | B1 | 2/2017 | Satish et al. |
| 9,571,526 | B2 | 2/2017 | Sartor |
| 9,571,559 | B2 | 2/2017 | Raleigh et al. |
| 9,571,991 | B1 | 2/2017 | Brizendine et al. |
| 9,576,289 | B2 | 2/2017 | Henderson et al. |
| 9,578,060 | B1 | 2/2017 | Brisebois et al. |
| 9,578,173 | B2 | 2/2017 | Sangh et al. |
| 9,582,681 | B2 | 2/2017 | Mishra |
| 9,584,964 | B2 | 2/2017 | Pelkey |
| 9,589,110 | B2 | 3/2017 | Carey et al. |
| 9,600,181 | B2 | 3/2017 | Patel et al. |
| 9,602,529 | B2 | 3/2017 | Jones et al. |
| 9,606,971 | B2 | 3/2017 | Seolas et al. |
| 9,607,041 | B2 | 3/2017 | Himmelstein |
| 9,619,652 | B2 | 4/2017 | Slater |
| 9,619,661 | B1 | 4/2017 | Finkelstein |
| 9,621,357 | B2 | 4/2017 | Williams et al. |
| 9,621,566 | B2 | 4/2017 | Gupta et al. |
| 9,626,124 | B2 | 4/2017 | Lipinski |
| 9,626,680 | B1 | 4/2017 | Ryan et al. |
| 9,629,064 | B2 | 4/2017 | Graves et al. |
| 9,642,008 | B2 | 5/2017 | Wyatt et al. |
| 9,646,095 | B1 | 5/2017 | Gottlieb et al. |
| 9,647,949 | B2 | 5/2017 | Varki et al. |
| 9,648,036 | B2 | 5/2017 | Seiver et al. |
| 9,652,314 | B2 | 5/2017 | Mahiddini |
| 9,654,506 | B2 | 5/2017 | Barrett |
| 9,654,541 | B1 | 5/2017 | Kapczynski et al. |
| 9,665,722 | B2 | 5/2017 | Nagasu et al. |
| 9,665,733 | B1 | 5/2017 | Sills et al. |
| 9,665,883 | B2 | 5/2017 | Roullier et al. |
| 9,672,053 | B2 | 6/2017 | Tang et al. |
| 9,672,355 | B2 | 6/2017 | Titonis et al. |
| 9,678,794 | B1 | 6/2017 | Barrett et al. |
| 9,691,090 | B1 | 6/2017 | Barday |
| 9,699,209 | B2 | 7/2017 | Ng et al. |
| 9,704,103 | B2 | 7/2017 | Suskind et al. |
| 9,705,840 | B2 | 7/2017 | Pujare et al. |
| 9,705,880 | B2 | 7/2017 | Siris |
| 9,721,078 | B2 | 8/2017 | Cornick et al. |
| 9,721,108 | B2 | 8/2017 | Krishnamurthy et al. |
| 9,727,751 | B2 | 8/2017 | Oliver et al. |
| 9,729,583 | B1 | 8/2017 | Barday |
| 9,734,148 | B2 | 8/2017 | Bendersky et al. |
| 9,734,255 | B2 | 8/2017 | Jiang |
| 9,736,004 | B2 | 8/2017 | Jung et al. |
| 9,740,985 | B2 | 8/2017 | Byron et al. |
| 9,740,987 | B2 | 8/2017 | Dolan |
| 9,749,408 | B2 | 8/2017 | Subramani et al. |
| 9,754,091 | B2 | 9/2017 | Kode et al. |
| 9,756,059 | B2 | 9/2017 | Demirjian et al. |
| 9,760,620 | B2 | 9/2017 | Nachnani et al. |
| 9,760,635 | B2 | 9/2017 | Bliss et al. |
| 9,760,697 | B1 | 9/2017 | Walker |
| 9,760,849 | B2 | 9/2017 | Vinnakota et al. |
| 9,762,553 | B2 | 9/2017 | Ford et al. |
| 9,767,202 | B2 | 9/2017 | Darby et al. |
| 9,767,309 | B1 | 9/2017 | Patel et al. |
| 9,769,124 | B2 | 9/2017 | Yan |
| 9,773,269 | B1 | 9/2017 | Lazarus |
| 9,785,795 | B2 | 10/2017 | Grondin et al. |
| 9,787,671 | B1 | 10/2017 | Bogrett |
| 9,798,749 | B2 | 10/2017 | Saner |
| 9,798,826 | B2 | 10/2017 | Wilson et al. |
| 9,798,896 | B2 | 10/2017 | Jakobsson |
| 9,800,605 | B2 | 10/2017 | Baikalov et al. |
| 9,800,606 | B1 | 10/2017 | Yumer |
| 9,804,649 | B2 | 10/2017 | Cohen et al. |
| 9,804,928 | B2 | 10/2017 | Davis et al. |
| 9,805,381 | B2 | 10/2017 | Frank et al. |
| 9,811,532 | B2 | 11/2017 | Parkison et al. |
| 9,817,850 | B2 | 11/2017 | Dubbels et al. |
| 9,817,978 | B2 | 11/2017 | Marsh et al. |
| 9,819,684 | B2 | 11/2017 | Cernoch et al. |
| 9,825,928 | B2 | 11/2017 | Lelcuk |
| 9,830,563 | B2 | 11/2017 | Paknad |
| 9,832,633 | B2 | 11/2017 | Gerber, Jr. et al. |
| 9,836,598 | B2 | 12/2017 | Iyer et al. |
| 9,838,407 | B1 | 12/2017 | Oprea et al. |
| 9,838,839 | B2 | 12/2017 | Vudali et al. |
| 9,841,969 | B2 | 12/2017 | Seibert, Jr. et al. |
| 9,842,042 | B2 | 12/2017 | Chhatwal et al. |
| 9,842,349 | B2 | 12/2017 | Sawczuk et al. |
| 9,848,005 | B2 | 12/2017 | Ardeli et al. |
| 9,848,061 | B1 | 12/2017 | Jain et al. |
| 9,852,150 | B2 | 12/2017 | Sharpe et al. |
| 9,853,959 | B1 | 12/2017 | Kapczynski et al. |
| 9,860,226 | B2 | 1/2018 | Thormaehlen |
| 9,864,735 | B1 | 1/2018 | Lamprecht |

(56) References Cited

U.S. PATENT DOCUMENTS

| | | | |
|---|---|---|---|
| 9,876,825 | B2 | 1/2018 | Amar et al. |
| 9,877,138 | B1 | 1/2018 | Franklin |
| 9,880,157 | B2 | 1/2018 | Levak et al. |
| 9,882,935 | B2 | 1/2018 | Barday |
| 9,887,965 | B2 | 2/2018 | Kay et al. |
| 9,888,377 | B1 | 2/2018 | McCorkendale et al. |
| 9,892,441 | B2 | 2/2018 | Barday |
| 9,892,442 | B2 | 2/2018 | Barday |
| 9,892,443 | B2 | 2/2018 | Barday |
| 9,892,444 | B2 | 2/2018 | Barday |
| 9,894,076 | B2 | 2/2018 | Li et al. |
| 9,898,613 | B1 | 2/2018 | Swerdlow et al. |
| 9,898,769 | B2 | 2/2018 | Barday |
| 9,912,625 | B2 | 3/2018 | Mutha et al. |
| 9,912,677 | B2 | 3/2018 | Chien |
| 9,912,810 | B2 | 3/2018 | Segre et al. |
| 9,916,703 | B2 | 3/2018 | Levinson et al. |
| 9,922,124 | B2 | 3/2018 | Rathod |
| 9,923,927 | B1 | 3/2018 | McClintock et al. |
| 9,928,379 | B1 | 3/2018 | Hoffer |
| 9,934,493 | B2 | 4/2018 | Castinado et al. |
| 9,934,544 | B1 | 4/2018 | Whitfield et al. |
| 9,936,127 | B2 | 4/2018 | Todasco |
| 9,942,214 | B1 | 4/2018 | Burciu et al. |
| 9,942,244 | B2 | 4/2018 | Lahoz et al. |
| 9,942,276 | B2 | 4/2018 | Sartor |
| 9,946,897 | B2 | 4/2018 | Lovin |
| 9,948,652 | B2 | 4/2018 | Yu et al. |
| 9,948,663 | B1 | 4/2018 | Wang et al. |
| 9,953,189 | B2 | 4/2018 | Cook et al. |
| 9,954,879 | B1 | 4/2018 | Sadaghiani et al. |
| 9,954,883 | B2 | 4/2018 | Ahuja et al. |
| 9,959,551 | B1 | 5/2018 | Schermerhorn et al. |
| 9,959,582 | B2 | 5/2018 | Sukman et al. |
| 9,961,070 | B2 | 5/2018 | Tang |
| 9,973,518 | B2 | 5/2018 | Lee et al. |
| 9,973,585 | B2 | 5/2018 | Ruback et al. |
| 9,977,904 | B2 | 5/2018 | Khan et al. |
| 9,977,920 | B2 | 5/2018 | Danielson et al. |
| 9,983,936 | B2 | 5/2018 | Dornemann et al. |
| 9,984,252 | B2 | 5/2018 | Pollard |
| 9,990,499 | B2 | 6/2018 | Chan et al. |
| 9,992,213 | B2 | 6/2018 | Sinnema |
| 10,001,975 | B2 | 6/2018 | Bharthulwar |
| 10,002,064 | B2 | 6/2018 | Muske |
| 10,007,895 | B2 | 6/2018 | Vanasco |
| 10,013,577 | B1 | 7/2018 | Beaumont et al. |
| 10,015,164 | B2 | 7/2018 | Hamburg et al. |
| 10,019,339 | B2 | 7/2018 | Von Hanxleden et al. |
| 10,019,588 | B2 | 7/2018 | Garcia et al. |
| 10,019,591 | B1 | 7/2018 | Beguin |
| 10,019,741 | B2 | 7/2018 | Hesselink |
| 10,021,143 | B2 | 7/2018 | Cabrera et al. |
| 10,025,804 | B2 | 7/2018 | Vranyes et al. |
| 10,028,226 | B2 | 7/2018 | Ayyagari et al. |
| 10,032,172 | B2 | 7/2018 | Barday |
| 10,044,761 | B2 | 8/2018 | Ducatel et al. |
| 10,055,426 | B2 | 8/2018 | Arasan et al. |
| 10,055,869 | B2 | 8/2018 | Borrelli et al. |
| 10,061,847 | B2 | 8/2018 | Mohammed et al. |
| 10,069,858 | B2 | 9/2018 | Robinson et al. |
| 10,069,914 | B1 | 9/2018 | Smith |
| 10,073,924 | B2 | 9/2018 | Karp et al. |
| 10,075,451 | B1 | 9/2018 | Hall et al. |
| 10,084,817 | B2 | 9/2018 | Saher et al. |
| 10,091,214 | B2 | 10/2018 | Godlewski et al. |
| 10,091,312 | B1 | 10/2018 | Khanwalkar et al. |
| 10,102,533 | B2 | 10/2018 | Barday |
| 10,108,409 | B2 | 10/2018 | Pirzadeh et al. |
| 10,122,663 | B2 | 11/2018 | Hu et al. |
| 10,122,760 | B2 | 11/2018 | Terrill et al. |
| 10,127,403 | B2 | 11/2018 | Kong et al. |
| 10,129,211 | B2 | 11/2018 | Heath |
| 10,140,666 | B1 | 11/2018 | Wang et al. |
| 10,142,113 | B2 | 11/2018 | Zaidi et al. |
| 10,152,560 | B2 | 12/2018 | Potiagalov et al. |
| 10,158,676 | B2 | 12/2018 | Barday |
| 10,165,011 | B2 | 12/2018 | Barday |
| 10,169,762 | B2 | 1/2019 | Ogawa |
| 10,176,503 | B2 | 1/2019 | Barday et al. |
| 10,181,043 | B1 | 1/2019 | Pauley, Jr. et al. |
| 10,181,051 | B2 | 1/2019 | Barday et al. |
| 10,187,363 | B2 | 1/2019 | Smirnoff et al. |
| 10,187,394 | B2 | 1/2019 | Bar et al. |
| 10,204,154 | B2 | 2/2019 | Barday et al. |
| 10,205,994 | B2 | 2/2019 | Splaine et al. |
| 10,212,134 | B2 | 2/2019 | Rai |
| 10,212,175 | B2 | 2/2019 | Seul et al. |
| 10,223,533 | B2 | 3/2019 | Dawson |
| 10,230,571 | B2 | 3/2019 | Rangasamy et al. |
| 10,250,594 | B2 | 4/2019 | Chathoth et al. |
| 10,255,602 | B2 | 4/2019 | Wang |
| 10,257,127 | B2 | 4/2019 | Dotan-Cohen et al. |
| 10,257,181 | B1 | 4/2019 | Sherif et al. |
| 10,268,838 | B2 | 4/2019 | Yadgiri et al. |
| 10,275,221 | B2 | 4/2019 | Thattai et al. |
| 10,275,614 | B2 | 4/2019 | Barday et al. |
| 10,282,370 | B1 | 5/2019 | Barday et al. |
| 10,282,559 | B2 | 5/2019 | Barday et al. |
| 10,284,604 | B2 | 5/2019 | Barday et al. |
| 10,289,584 | B2 | 5/2019 | Chiba |
| 10,289,857 | B1 | 5/2019 | Brinskelle |
| 10,289,866 | B2 | 5/2019 | Barday et al. |
| 10,289,867 | B2 | 5/2019 | Barday et al. |
| 10,289,870 | B2 | 5/2019 | Barday et al. |
| 10,296,504 | B2 | 5/2019 | Hock et al. |
| 10,304,442 | B1 | 5/2019 | Rudden et al. |
| 10,310,723 | B2 | 6/2019 | Rathod |
| 10,311,042 | B1 | 6/2019 | Kumar |
| 10,311,475 | B2 | 6/2019 | Yuasa |
| 10,311,492 | B2 | 6/2019 | Gelfenbeyn et al. |
| 10,318,761 | B2 | 6/2019 | Barday et al. |
| 10,320,940 | B1 | 6/2019 | Brennan et al. |
| 10,324,960 | B1 | 6/2019 | Skvortsov et al. |
| 10,326,768 | B2 | 6/2019 | Verweyst et al. |
| 10,326,798 | B2 | 6/2019 | Lambert |
| 10,326,841 | B2 | 6/2019 | Bradley et al. |
| 10,331,689 | B2 | 6/2019 | Sorrentino et al. |
| 10,331,904 | B2 | 6/2019 | Sher-Jan et al. |
| 10,333,975 | B2 | 6/2019 | Soman et al. |
| 10,346,186 | B2 | 7/2019 | Kalyanpur |
| 10,346,635 | B2 | 7/2019 | Kumar et al. |
| 10,346,637 | B2 | 7/2019 | Barday et al. |
| 10,346,638 | B2 | 7/2019 | Barday et al. |
| 10,346,849 | B2 | 7/2019 | Ionescu et al. |
| 10,348,726 | B2 | 7/2019 | Caluwaert |
| 10,348,775 | B2 | 7/2019 | Barday |
| 10,353,673 | B2 | 7/2019 | Barday et al. |
| 10,361,857 | B2 | 7/2019 | Woo |
| 10,373,119 | B2 | 8/2019 | Driscoll et al. |
| 10,373,409 | B2 | 8/2019 | White et al. |
| 10,375,115 | B2 | 8/2019 | Mallya |
| 10,387,559 | B1 | 8/2019 | Wendt et al. |
| 10,387,657 | B2 | 8/2019 | Belfiore, Jr. et al. |
| 10,387,952 | B1 | 8/2019 | Sandhu et al. |
| 10,395,201 | B2 | 8/2019 | Vescio |
| 10,402,545 | B2 | 9/2019 | Gorfein et al. |
| 10,404,729 | B2 | 9/2019 | Turgeman |
| 10,417,401 | B2 | 9/2019 | Votaw et al. |
| 10,417,621 | B2 | 9/2019 | Cassel et al. |
| 10,419,476 | B2 | 9/2019 | Parekh |
| 10,423,985 | B1 | 9/2019 | Dutta et al. |
| 10,425,492 | B2 | 9/2019 | Comstock et al. |
| 10,430,608 | B2 | 10/2019 | Peri et al. |
| 10,435,350 | B2 | 10/2019 | Ito et al. |
| 10,437,412 | B2 | 10/2019 | Barday et al. |
| 10,437,860 | B2 | 10/2019 | Barday et al. |
| 10,438,016 | B2 | 10/2019 | Barday et al. |
| 10,438,273 | B2 | 10/2019 | Burns et al. |
| 10,440,062 | B2 | 10/2019 | Barday et al. |
| 10,445,508 | B2 | 10/2019 | Sher-Jan et al. |
| 10,445,526 | B2 | 10/2019 | Barday et al. |
| 10,452,864 | B2 | 10/2019 | Barday et al. |
| 10,452,866 | B2 | 10/2019 | Barday et al. |

(56) References Cited

U.S. PATENT DOCUMENTS 10,453,076 B2 10/2019 Parekh et al.
10,453,092 B1 10/2019 Wang et al.
10,454,934 B2 10/2019 Parimi et al.
10,481,763 B2 11/2019 Bartkiewicz et al.
10,489,454 B1 11/2019 Chen
10,503,926 B2 12/2019 Barday et al.
10,510,031 B2 12/2019 Barday et al.
10,521,623 B2 12/2019 Rodriguez et al.
10,534,851 B1 1/2020 Chan et al.
10,535,081 B2 1/2020 Ferreira et al.
10,536,475 B1 1/2020 McCorkle, Jr. et al.
10,536,478 B2 1/2020 Kirti et al.
10,541,938 B1 1/2020 Timmerman et al.
10,546,135 B1 * 1/2020 Kassoumeh .......... G06F 21/577
10,552,462 B1 2/2020 Hart
10,558,809 B1 2/2020 Joyce et al.
10,558,821 B2 2/2020 Barday et al.
10,564,815 B2 2/2020 Soon-Shiong
10,564,935 B2 2/2020 Barday et al.
10,564,936 B2 2/2020 Barday et al.
10,565,161 B2 2/2020 Barday et al.
10,565,236 B1 2/2020 Barday et al.
10,567,439 B2 2/2020 Barday
10,567,517 B2 2/2020 Weinig et al.
10,572,684 B2 2/2020 Lafever et al.
10,572,686 B2 2/2020 Barday et al.
10,574,705 B2 2/2020 Barday et al.
10,592,648 B2 3/2020 Barday et al.
10,592,692 B2 3/2020 Brannon et al.
10,606,916 B2 3/2020 Brannon et al.
10,613,971 B1 4/2020 Vasikarla
10,628,553 B1 4/2020 Murrish et al.
10,645,102 B2 5/2020 Hamdi
10,645,548 B2 5/2020 Reynolds et al.
10,649,630 B1 5/2020 Vora et al.
10,650,408 B1 5/2020 Andersen et al.
10,657,469 B2 5/2020 Bade et al.
10,659,566 B1 5/2020 Luah et al.
10,671,749 B2 6/2020 Felice-Steele et al.
10,671,760 B2 6/2020 Esmailzadeh et al.
10,678,945 B2 6/2020 Barday et al.
10,685,140 B2 6/2020 Barday et al.
10,706,176 B2 7/2020 Brannon et al.
10,706,226 B2 7/2020 Byun et al.
10,708,305 B2 7/2020 Barday et al.
10,713,387 B2 7/2020 Brannon et al.
10,726,153 B2 7/2020 Nerurkar et al.
10,726,158 B2 7/2020 Brannon et al.
10,732,865 B2 8/2020 Jain et al.
10,735,388 B2 8/2020 Rose et al.
10,740,487 B2 8/2020 Barday et al.
10,747,893 B2 8/2020 Kiriyama et al.
10,747,897 B2 8/2020 Cook
10,749,870 B2 8/2020 Brouillette et al.
10,762,213 B2 9/2020 Rudek et al.
10,762,236 B2 9/2020 Brannon et al.
10,769,302 B2 9/2020 Barday et al.
10,769,303 B2 9/2020 Brannon et al.
10,776,510 B2 9/2020 Antonelli et al.
10,776,518 B2 9/2020 Barday et al.
10,778,792 B1 9/2020 Handy Bosma et al.
10,783,256 B2 9/2020 Brannon et al.
10,785,173 B2 9/2020 Willett et al.
10,785,299 B2 9/2020 Gupta et al.
10,791,150 B2 9/2020 Barday et al.
10,795,527 B1 10/2020 Legge et al.
10,796,020 B2 10/2020 Barday et al.
10,796,260 B2 10/2020 Brannon et al.
10,798,133 B2 10/2020 Barday et al.
10,803,196 B2 10/2020 Bodegas Martinez et al.
10,805,331 B2 10/2020 Boyer et al.
10,831,831 B2 11/2020 Greene
10,834,590 B2 11/2020 Furgemanavi et al.
10,846,433 B2 11/2020 Brannon et al.
10,853,501 B2 12/2020 Brannon
10,860,721 B1 * 12/2020 Gentile ............... H04L 63/1433
10,860,742 B2 12/2020 Joseph et al.
10,860,979 B2 12/2020 Geffen et al.
10,878,127 B2 12/2020 Brannon et al.
10,885,485 B2 1/2021 Brannon et al.
10,891,393 B2 1/2021 Currier et al.
10,893,074 B2 1/2021 Sartor
10,896,394 B2 1/2021 Brannon et al.
10,902,490 B2 1/2021 He et al.
10,909,488 B2 2/2021 Hecht et al.
10,949,555 B2 3/2021 Rattan et al.
10,949,565 B2 3/2021 Barday et al.
10,957,326 B2 3/2021 Bhaya et al.
10,963,571 B2 3/2021 Bar Joseph et al.
10,963,572 B2 3/2021 Belfiore, Jr. et al.
10,965,547 B1 3/2021 Esposito et al.
10,970,418 B2 4/2021 Durvasula et al.
10,972,509 B2 4/2021 Barday et al.
10,976,950 B1 4/2021 Trezzo et al.
10,983,963 B1 4/2021 Venkatasubramanian et al.
10,984,458 B1 4/2021 Gutierrez
10,997,318 B2 5/2021 Barday et al.
11,003,748 B2 5/2021 Oliker et al.
11,012,475 B2 5/2021 Patnala et al.
11,057,356 B2 7/2021 Malhotra et al.
11,057,427 B2 7/2021 Wright et al.
11,062,051 B2 7/2021 Barday et al.
11,068,318 B2 7/2021 Kuesel et al.
11,068,584 B2 7/2021 Burriesci et al.
11,068,618 B2 7/2021 Brannon et al.
11,068,797 B2 7/2021 Bhide et al.
11,093,950 B2 8/2021 Hersh et al.
11,138,299 B2 10/2021 Brannon et al.
11,144,622 B2 10/2021 Brannon et al.
11,144,862 B1 10/2021 Jackson et al.
11,195,134 B2 12/2021 Brannon et al.
11,201,929 B2 12/2021 Dudmesh et al.
11,210,420 B2 12/2021 Brannon et al.
11,238,390 B2 2/2022 Brannon et al.
11,240,273 B2 2/2022 Barday et al.
11,256,777 B2 2/2022 Brannon et al.
2002/0004736 A1 1/2002 Roundtree et al.
2002/0049907 A1 4/2002 Woods et al.
2002/0055932 A1 5/2002 Wheeler et al.
2002/0077941 A1 6/2002 Halligan et al.
2002/0103854 A1 8/2002 Okita
2002/0129216 A1 9/2002 Collins
2002/0161594 A1 10/2002 Bryan et al.
2002/0161733 A1 10/2002 Grainger
2003/0041250 A1 2/2003 Proudler
2003/0065641 A1 4/2003 Chaloux
2003/0093680 A1 5/2003 Astley et al.
2003/0097451 A1 5/2003 Bjorksten et al.
2003/0097661 A1 5/2003 Li et al.
2003/0115142 A1 6/2003 Brickell et al.
2003/0130893 A1 7/2003 Farmer
2003/0131001 A1 7/2003 Matsuo
2003/0131093 A1 7/2003 Aschen et al.
2003/0140150 A1 7/2003 Kemp et al.
2003/0167216 A1 9/2003 Brown et al.
2003/0212604 A1 11/2003 Cullen
2004/0002818 A1 1/2004 Kulp et al.
2004/0025053 A1 2/2004 Hayward
2004/0088235 A1 5/2004 Ziekle et al.
2004/0098366 A1 5/2004 Sinclair et al.
2004/0098493 A1 5/2004 Rees
2004/0111359 A1 6/2004 Hudock
2004/0186912 A1 9/2004 Harlow et al.
2004/0193907 A1 * 9/2004 Patanella ............ H04L 63/0227
726/25
2005/0022198 A1 1/2005 Olapurath et al.
2005/0033616 A1 2/2005 Vavul et al.
2005/0076294 A1 4/2005 Dehamer et al.
2005/0114343 A1 5/2005 Wesinger et al.
2005/0144066 A1 6/2005 Cope et al.
2005/0197884 A1 9/2005 Mullen
2005/0198177 A1 9/2005 Black
2005/0198646 A1 9/2005 Kortela
2005/0246292 A1 11/2005 Sarcanin

(56) References Cited

U.S. PATENT DOCUMENTS

2005/0278538 A1 12/2005 Fowler
2006/0031078 A1 2/2006 Pizzinger et al.
2006/0035204 A1 2/2006 Lamarche et al.
2006/0075122 A1 4/2006 Lindskog et al.
2006/0149730 A1 7/2006 Curtis
2006/0156052 A1 7/2006 Bodnar et al.
2006/0190280 A1 8/2006 Hoebel et al.
2006/0206375 A1 9/2006 Scott et al.
2006/0224422 A1 10/2006 Cohen
2006/0253597 A1 11/2006 Mujica
2006/0259416 A1 11/2006 Johnson
2007/0011058 A1 1/2007 Dev
2007/0027715 A1 2/2007 Gropper et al.
2007/0061393 A1 3/2007 Moore
2007/0130101 A1 6/2007 Anderson et al.
2007/0130323 A1 6/2007 Landsman et al.
2007/0157311 A1 7/2007 Meier et al.
2007/0173355 A1 7/2007 Klein
2007/0179793 A1 8/2007 Bagchi et al.
2007/0180490 A1 8/2007 Renzi et al.
2007/0192438 A1 8/2007 Goei
2007/0266420 A1 11/2007 Hawkins et al.
2008/0140696 A1 6/2008 Mathuria
2008/0189306 A1 8/2008 Hewett et al.
2008/0222271 A1 9/2008 Spires
2008/0270351 A1 10/2008 Thomsen
2008/0270381 A1 10/2008 Thomsen
2008/0270382 A1 10/2008 Thomsen et al.
2008/0270451 A1 10/2008 Thomsen et al.
2008/0270462 A1 10/2008 Thomsen
2009/0119500 A1 5/2009 Roth et al.
2009/0132419 A1 5/2009 Grammer et al.
2010/0010912 A1 1/2010 Jones et al.
2010/0010968 A1 1/2010 Redlich et al.
2010/0262624 A1 10/2010 Pullikottil
2011/0153396 A1 6/2011 Marcuvitz et al.
2011/0302643 A1 12/2011 Pichna et al.
2013/0091156 A1 4/2013 Raiche et al.
2013/0179988 A1 7/2013 Bekker et al.
2014/0137257 A1 5/2014 Martinez et al.
2014/0278539 A1 9/2014 Edwards
2015/0006514 A1 1/2015 Hung
2015/0066865 A1 3/2015 Yara et al.
2015/0088598 A1 3/2015 Acharyya et al.
2015/0271167 A1 9/2015 Kalai
2016/0006760 A1 1/2016 Lala et al.
2016/0012360 A1* 1/2016 Vinnakota .......... G06Q 10/0635
705/7.28
2016/0080405 A1 3/2016 Schler et al.
2016/0253497 A1 9/2016 Christodorescu et al.
2016/0292453 A1 10/2016 Patterson et al.
2016/0335531 A1 11/2016 Mullen et al.
2017/0061501 A1 3/2017 Horwich
2017/0070495 A1 3/2017 Cherry et al.
2017/0193017 A1 7/2017 Migliori
2018/0204281 A1 7/2018 Painter et al.
2018/0285887 A1* 10/2018 Maung ................. G06Q 30/018
2019/0188402 A1 6/2019 Wang et al.
2019/0266200 A1 8/2019 Francolla
2019/0266201 A1 8/2019 Barday et al.
2019/0266350 A1 8/2019 Barday et al.
2019/0268343 A1 8/2019 Barday et al.
2019/0268344 A1 8/2019 Barday et al.
2019/0272492 A1 9/2019 Elledge et al.
2019/0294818 A1 9/2019 Barday et al.
2019/0332802 A1 10/2019 Barday et al.
2019/0332807 A1 10/2019 Lafever et al.
2019/0333118 A1 10/2019 Crimmins et al.
2019/0354709 A1 11/2019 Brinskelle
2019/0356684 A1 11/2019 Sinha et al.
2019/0362169 A1 11/2019 Lin et al.
2019/0362268 A1 11/2019 Fogarty et al.
2019/0378073 A1 12/2019 Lopez et al.
2019/0384934 A1 12/2019 Kim
2019/0392170 A1 12/2019 Barday et al.
2019/0392171 A1 12/2019 Barday et al.
2020/0020454 A1 1/2020 McGarvey et al.
2020/0050966 A1 2/2020 Enuka et al.
2020/0051117 A1 2/2020 Mitchell
2020/0057781 A1 2/2020 McCormick
2020/0074471 A1 3/2020 Adjaoute
2020/0081865 A1 3/2020 Farrar et al.
2020/0082270 A1 3/2020 Gu et al.
2020/0090197 A1* 3/2020 Rodriguez ......... G06Q 30/0203
2020/0092179 A1 3/2020 Chieu et al.
2020/0110589 A1 4/2020 Bequet et al.
2020/0110904 A1 4/2020 Shinde et al.
2020/0117737 A1 4/2020 Gopalakrishnan et al.
2020/0137097 A1 4/2020 Zimmermann et al.
2020/0143301 A1 5/2020 Bowers
2020/0143797 A1 5/2020 Manoharan et al.
2020/0159952 A1 5/2020 Dain et al.
2020/0159955 A1 5/2020 Barlik et al.
2020/0167653 A1 5/2020 Manjunath et al.
2020/0175424 A1 6/2020 Kursun
2020/0183655 A1 6/2020 Barday et al.
2020/0186355 A1 6/2020 Davies
2020/0193018 A1 6/2020 Van Dyke
2020/0193022 A1 6/2020 Lunsford et al.
2020/0210558 A1 7/2020 Barday et al.
2020/0210620 A1 7/2020 Haletky
2020/0220901 A1 7/2020 Barday et al.
2020/0226156 A1 7/2020 Borra et al.
2020/0226196 A1 7/2020 Brannon
2020/0242259 A1 7/2020 Chirravuri et al.
2020/0242719 A1 7/2020 Lee
2020/0250342 A1 8/2020 Miller et al.
2020/0252413 A1 8/2020 Buzbee et al.
2020/0252817 A1 8/2020 Brouillette et al.
2020/0272764 A1 8/2020 Brannon et al.
2020/0293679 A1 9/2020 Handy Bosma et al.
2020/0296171 A1 9/2020 Mocanu et al.
2020/0302089 A1 9/2020 Barday et al.
2020/0310917 A1 10/2020 Tkachev et al.
2020/0311310 A1 10/2020 Barday et al.
2020/0344243 A1 10/2020 Brannon et al.
2020/0356695 A1 11/2020 Brannon et al.
2020/0364369 A1 11/2020 Brannon et al.
2020/0372178 A1 11/2020 Barday et al.
2020/0394327 A1 12/2020 Childress et al.
2020/0401380 A1 12/2020 Jacobs et al.
2020/0401962 A1 12/2020 Gottemukkala et al.
2020/0410117 A1 12/2020 Barday et al.
2020/0410131 A1 12/2020 Barday et al.
2020/0410132 A1 12/2020 Brannon et al.
2021/0012341 A1 1/2021 Garg et al.
2021/0056569 A1 2/2021 Silberman et al.
2021/0081567 A1 3/2021 Park et al.
2021/0110047 A1 4/2021 Fang
2021/0125089 A1 4/2021 Nickl et al.
2021/0152496 A1 5/2021 Kim et al.
2021/0233157 A1 7/2021 Crutchfield, Jr.
2021/0243595 A1 8/2021 Buck et al.
2021/0248247 A1 8/2021 Poothokaran et al.
2021/0256163 A1 8/2021 Fleming et al.
2021/0279360 A1 9/2021 Gimenez Palop et al.
2021/0297441 A1* 9/2021 Olalere ............... H04L 63/1441
2021/0303828 A1 9/2021 Lafreniere et al.
2021/0312061 A1 10/2021 Schroeder et al.
2021/0326786 A1 10/2021 Sun et al.
2021/0382949 A1 12/2021 Yastrebenetsky et al.
2021/0397735 A1 12/2021 Samatov et al.
2021/0400018 A1 12/2021 Vettaikaran et al.
2021/0406712 A1 12/2021 Bhide et al.

OTHER PUBLICATIONS

Final Office Action, dated Dec. 10, 2021, from corresponding U.S. Appl. No. 17/187,329.

He et al, "A Crowdsourcing Framework for Detecting of Cross-Browser Issues in Web Application," ACM, pp. 1-4, Nov. 6, 2015 (Year: 2015).

(56) References Cited

OTHER PUBLICATIONS

International Search Report, dated Dec. 22, 2021, from corresponding International Application No. PCT/US2021/051217.
Jones et al, "AI and the Ethics of Automating Consent," IEEE, pp. 64-72, May 2018 (Year: 2018).
Liu et al, "A Novel Approach for Detecting Browser-based Silent Miner," IEEE, pp. 490-497 (Year: 2018).
Lu et al, "An HTTP Flooding Detection Method Based on Browser Behavior," IEEE, pp. 1151-1154 (Year: 2006).
Notice of Allowance, dated Dec. 13, 2021, from corresponding U.S. Appl. No. 16/908,081.
Notice of Allowance, dated Dec. 13, 2021, from corresponding U.S. Appl. No. 17/347,853.
Notice of Allowance, dated Dec. 2, 2021, from corresponding U.S. Appl. No. 16/901,654.
Notice of Allowance, dated Dec. 8, 2021, from corresponding U.S. Appl. No. 17/397,472.
Nouwens et al, "Dark Patterns after the GDPR: Scraping Consent Pop-ups and Demonstrating their Influence," ACM, pp. 1-13, Apr. 25, 2020 (Year: 2020).
Office Action, dated Dec. 13, 2021, from corresponding U.S. Appl. No. 17/476,209.
Office Action, dated Dec. 17, 2021, from corresponding U.S. Appl. No. 17/395,759.
Office Action, dated Dec. 17, 2021, from corresponding U.S. Appl. No. 17/499,582.
Office Action, dated Dec. 2, 2021, from corresponding U.S. Appl. No. 17/504,102.
Office Action, dated Dec. 27, 2021, from corresponding U.S. Appl. No. 17/493,332.
Office Action, dated Dec. 29, 2021, from corresponding U.S. Appl. No. 17/479,807.
Office Action, dated Dec. 7, 2021, from corresponding U.S. Appl. No. 17/499,609.
Paes, "Student Research Abstract: Automatic Detection of Cross-Browser Incompatibilities using Machine Learning and Screenshot Similarity," ACM, pp. 697-698, Apr. 3, 2017 (Year: 2017).
Restriction Requirement, dated Dec. 17, 2021, from corresponding U.S. Appl. No. 17/475,244.
Shahriar et al, "A Model-Based Detection of Vulnerable and Malicious Browser Extensions," IEEE, pp. 198-207 (Year: 2013).
Sjosten et al, "Discovering Browser Extensions via Web Accessible Resources," ACM, pp. 329-336, Mar. 22, 2017 (Year: 2017).
Written Opinion of the International Searching Authority, dated Dec. 22, 2021, from corresponding International Application No. PCT/US2021/051217.
Amar et al, "Privacy-Aware Infrastructure for Managing Personal Data," ACM, pp. 571-572, Aug. 22-26, 2016 (Year: 2016).
Banerjee et al, "Link Before You Share: Managing Privacy Policies through Blockchain," IEEE, pp. 4438-4447 (Year: 2017).
Civili et al, "Mastro Studio: Managing Ontology-Based Data Access Applications," ACM, pp. 1314-1317, Aug. 26-30, 2013 (Year: 2013).
Degeling et al, "We Value Your Privacy . . . Now Take Some Cookies: Measuring the GDPRs Impact on Web Privacy," arxiv.org, Cornell University Library, 201 Olin Library Cornell University, Ithaca, NY 14853, Aug. 15, 2018, pp. 1-15 (Year: 2019).
Geko et al, "An Ontology Capturing the Interdependence of the General Data Protection Regulation (GDPR) and Information Security," ACM, pp. 1-6, Nov. 15-16, 2018 (Year: 2018).
International Search Report, dated Jan. 5, 2022, from corresponding International Application No. PCT/US2021/050497.
Lu, "How Machine Learning Mitigates Racial Bias in the US Housing Market," Available as SSRN 3489519, pp. 1-73, Nov. 2019 (Year: 2019).
Notice of Allowance, dated Dec. 30, 2021, from corresponding U.S. Appl. No. 16/938,520.
Notice of Allowance, dated Jan. 11, 2022, from corresponding U.S. Appl. No. 17/371,350.
Notice of Allowance, dated Jan. 12, 2022, from corresponding U.S. Appl. No. 17/334,948.
Notice of Allowance, dated Jan. 12, 2022, from corresponding U.S. Appl. No. 17/463,775.
Notice of Allowance, dated Jan. 24, 2022, from corresponding U.S. Appl. No. 17/340,699.
Notice of Allowance, dated Jan. 26, 2022, from corresponding U.S. Appl. No. 17/491,906.
Notice of Allowance, dated Jan. 5, 2022, from corresponding U.S. Appl. No. 17/475,241.
Notice of Allowance, dated Jan. 6, 2022, from corresponding U.S. Appl. No. 17/407,765.
Notice of Allowance, dated Jan. 7, 2022, from corresponding U.S. Appl. No. 17/222,725.
Office Action, dated Dec. 30, 2021, from corresponding U.S. Appl. No. 17/149,421.
Office Action, dated Jan. 14, 2022, from corresponding U.S. Appl. No. 17/499,595.
Office Action, dated Jan. 21, 2022, from corresponding U.S. Appl. No. 17/499,624.
Office Action, dated Jan. 25, 2022, from corresponding U.S. Appl. No. 17/494,220.
Office Action, dated Jan. 4, 2022, from corresponding U.S. Appl. No. 17/480,377.
Office Action, dated Jan. 7, 2022, from corresponding U.S. Appl. No. 17/387,421.
Rakers, "Managing Professional and Personal Sensitive Information," ACM, pp. 9-13, Oct. 24-27, 2010 (Year 2010).
Sachinopoulou et al, "Ontology-Based Approach for Managing Personal Health and Wellness Information," IEEE, pp. 1802-1805 (Year: 2007).
Shankar et al, "Doppleganger: Better Browser Privacy Without the Bother," Proceedings of the 13th ACM Conference on Computer and Communications Security; [ACM Conference on Computer and Communications Security], New York, NY : ACM, US, Oct. 30, 2006, pp. 154-167 (Year: 2006).
Written Opinion of the International Searching Authority, dated Jan. 5, 2022, from corresponding International Application No. PCT/US2021/050497.
Yue et al, "An Automatic HTTP Cookie Management System," Computer Networks, Elsevier, Amsterdam, NL, vol. 54, No. 13, Sep. 15, 2010, pp. 2182-2198 (Year: 2010).
International Search Report, dated Feb. 11, 2022, from corresponding International Application No. PCT/US2021/053518.
Jiahao Chen et al. "Fairness Under Unawareness: Assessing Disparity when Protected Class is Unobserved," arxiv.org, Cornell University Library, 201 Olin Library Cornell University, Ithaca, NY 14853, Nov. 27, 2018 (Nov. 27, 2018), Section 2, Figure 2. (Year 2018).
Notice of Allowance, dated Feb. 1, 2022, from corresponding U.S. Appl. No. 17/346,509.
Notice of Allowance, dated Feb. 14, 2022, from corresponding U.S. Appl. No. 16/623,157.
Notice of Allowance, dated Feb. 4, 2022, from corresponding U.S. Appl. No. 17/520,272.
Notice of Allowance, dated Feb. 8, 2022, from corresponding U.S. Appl. No. 17/342,153.
Notice of Allowance, dated Jan. 31, 2022, from corresponding U.S. Appl. No. 17/472,948.
Office Action, dated Feb. 16, 2022, from corresponding U.S. Appl. No. 16/872,031.
Office Action, dated Feb. 9, 2022, from corresponding U.S. Appl. No. 17/543,546.
Office Action, dated Jan. 31, 2022, from corresponding U.S. Appl. No. 17/493,290.
Sarkar et al, "Towards Enforcement of the Eu Gdpr: Enabling Data Erasure," 2018 IEEE Confs on Internet of Things, Green Computing and Communications, Cyber, Physical and Social Computing, Smart Data, Blockchain, Computer and Information Technology, Congress on Cybermatics, 2018, pp. 222-229, IEEE (Year: 2018).
Written Opinion of the International Searching Authority, dated Feb. 11, 2022, from corresponding International Application No. PCT/US2021/053518.

(56) References Cited

OTHER PUBLICATIONS

Czeskis et al, "Lightweight Server Support for Browser-based CSRF Protection," Proceedings of the 22nd International Conference on World Wide Web, 2013, pp. 273-284 (Year: 2013).
Final Office Action, dated Feb. 25, 2022, from corresponding U.S. Appl. No. 17/346,586.
Final Office Action, dated Mar. 21, 2022, from corresponding U.S. Appl. No. 17/373,444.
Final Office Action, dated Mar. 22, 2022, from corresponding U.S. Appl. No. 17/380,485.
Matte et al, "Do Cookie Banners Respect my Choice?: Measuring Legal Compliance of Banners from IAB Europe's Transparency and Consent Framework," 2020 IEEE Symposium on Security and Privacy (SP), 2020, pp. 791-809 (Year: 2020).
Notice of Allowance, dated Feb. 24, 2022, from corresponding U.S. Appl. No. 17/234,205.
Notice of Allowance, dated Feb. 24, 2022, from corresponding U.S. Appl. No. 17/549,170.
Notice of Allowance, dated Mar. 16, 2022, from corresponding U.S. Appl. No. 17/486,350.
Notice of Allowance, dated Mar. 2, 2022, from corresponding U.S. Appl. No. 16/872,130.
Notice of Allowance, dated Mar. 2, 2022, from corresponding U.S. Appl. No. 17/535,098.
Notice of Allowance, dated Mar. 21, 2022, from corresponding U.S. Appl. No. 17/366,754.
Notice of Allowance, dated Mar. 22, 2022, from corresponding U.S. Appl. No. 17/475,244.
Notice of Allowance, dated Mar. 22, 2022, from corresponding U.S. Appl. No. 17/504,102.
Notice of Allowance, dated Mar. 28, 2022, from corresponding U.S. Appl. No. 17/499,609.
Notice of Allowance, dated Mar. 4, 2022, from corresponding U.S. Appl. No. 17/409,999.
Office Action, dated Mar. 1, 2022, from corresponding U.S. Appl. No. 17/119,080.
Office Action, dated Mar. 2, 2022, from corresponding U.S. Appl. No. 17/020,275.
Office Action, dated Mar. 2, 2022, from corresponding U.S. Appl. No. 17/161,159.
Office Action, dated Mar. 2, 2022, from corresponding U.S. Appl. No. 17/200,698.
Office Action, dated Mar. 21, 2022, from corresponding U.S. Appl. No. 17/571,871.
Office Action, dated Mar. 22, 2022, from corresponding U.S. Appl. No. 17/187,329.
Sanchez-Rola et al, "Can I Opt Out Yet?: GDPR and the Global Illusion of Cookie Control," Proceedings of the 2019 ACM Asia Conference on Computer and Communications Security, 2019, pp. 340-351 (Year: 2019).
Ali et al, "Age Estimation from Facial Images Using Biometric Ratios and Wrinkle Analysis," IEEE, 2015, pp. 1-5 (Year: 2015).
Chang et al, "A Ranking Approach for Human Age Estimation Based on Face Images," IEEE, 2010, pp. 3396-3399 (Year: 2010).
Edinger et al, "Age and Gender Estimation of Unfiltered Faces," IEEE, 2014, pp. 2170-2179 (Year: 2014).
Final Office Action, dated Apr. 1, 2022, from corresponding U.S. Appl. No. 17/370,650.
Final Office Action, dated Apr. 25, 2022, from corresponding U.S. Appl. No. 17/149,421.
Final Office Action, dated Apr. 5, 2022, from corresponding U.S. Appl. No. 17/013,756.
Han et al, "Demographic Estimation from Face Images: Human vs. Machine Performance," IEEE, 2015, pp. 1148-1161 (Year: 2015).
Huettner, "Digital Risk Management: Protecting Your Privacy, Improving Security, and Preparing for Emergencies," EEE, pp. 136-138 (Year: 2006).
International Search Report, dated Apr. 12, 2022, from corresponding International Application No. PCT/US2022/016735.
International Search Report, dated Feb. 14, 2022, from corresponding International Application No. PCT/US2021/058274.
International Search Report, dated Mar. 18, 2022, from corresponding International Application No. PCT/US2022/013733.
Jayasinghe et al, "Matching Facial Images Using Age Related Morphing Changes," ISSRI, 2009, pp. 2901-2907 (Year: 2009).
Khan et al, "Wrinkles Energy Based Age Estimation Using Discrete Cosine Transform," IEEE, 2015, pp. 1-4 (Year 2015).
Kristian et al, "Human Facial Age Classification Using Active Shape Module, Geometrical Feature, and Support Vendor Machine on Early Growth Stage," ISICO, 2015, pp. 1-8 (Year: 2015).
Lewis, James et al, "Microservices," Mar. 25, 2014 (Mar. 25, 2014),XP055907494, Retrieved from the Internet: https://martinfowler.com/articles/microsen/ices.html [retrieved on Mar. 31, 2022].
Liu et al, "Overview on Ontology Mapping and Approach," IEEE, pp. 592-595 (Year: 2011).
Milic et al, "Comparative Analysis of Metadata Models on e-Government Open Data Platforms," IEEE, pp. 119-130 (Year: 2021).
Notice of Allowance, dated Apr. 12, 2022, from corresponding U.S. Appl. No. 17/479,807.
Notice of Allowance, dated Apr. 14, 2022, from corresponding U.S. Appl. No. 17/572,276.
Notice of Allowance, dated Apr. 20, 2022, from corresponding U.S. Appl. No. 17/573,808.
Notice of Allowance, dated Apr. 27, 2022, from corresponding U.S. Appl. No. 17/573,999.
Notice of Allowance, dated Apr. 28, 2022, from corresponding U.S. Appl. No. 17/670,352.
Notice of Allowance, dated Apr. 4, 2022, from corresponding U.S. Appl. No. 17/493,332.
Notice of Allowance, dated Apr. 4, 2022, from corresponding U.S. Appl. No. 17/572,298.
Notice of Allowance, dated Mar. 31, 2022, from corresponding U.S. Appl. No. 17/476,209.
Office Action, dated Apr. 12, 2022, from corresponding U.S. Appl. No. 17/670,341.
Office Action, dated Apr. 18, 2022, from corresponding U.S. Appl. No. 17/670,349.
Office Action, dated Apr. 25, 2022, from corresponding U.S. Appl. No. 17/588,645.
Office Action, dated Apr. 26, 2022, from corresponding U.S. Appl. No. 17/151,334.
Office Action, dated Apr. 8, 2022, from corresponding U.S. Appl. No. 16/938,509.
Qu et al, "Metadata Type System: Integrate Presentation, Data Models and Extraction to Enable Exploratory Browsing nterfaces," ACM, pp. 107-116 (Year: 2014).
Restriction Requirement, dated Apr. 12, 2022, from corresponding U.S. Appl. No. 17/584,187.
Shulz et al, "Generative Data Models for Validation and Evaluation of Visualization Techniques," ACM, pp. 1-13 (Year: 2016).
Written Opinion of the International Searching Authority, dated Apr. 12, 2022, from corresponding International Application No. PCT/US2022/016735.
Written Opinion of the International Searching Authority, dated Feb. 14, 2022, from corresponding International Application No. PCT/US2021/058274.
Written Opinion of the International Searching Authority, dated Mar. 18, 2022, from corresponding International Application No. PCT/US2022/013733.
Final Office Action, dated Apr. 28, 2022, from corresponding U.S. Appl. No. 16/925,550.
Notice of Allowance, dated Apr. 28, 2022, from corresponding U.S. Appl. No. 17/592,922.
Notice of Allowance, dated Apr. 29, 2022, from corresponding U.S. Appl. No. 17/387,421.
Bansal et al, "Integrating Big Data: A Semantic Extract-Transform-Load Framework," IEEE, pp. 42-50 (Year: 2015).
Bindschaedler et al, "Privacy Through Fake Yet Semantically Real Traces," arxiv.org, Cornell University Library, 201 Olin Library Cornell University Ithaca, NY 14853, May 27, 2015 (Year: 2015).
Castro et al, "Creating Lightweight Ontologies for Dataset Description," IEEE, pp. 1-4 (Year: 2014).

(56) References Cited

OTHER PUBLICATIONS

Ex Parte Quayle Action, dated May 10, 2022, from corresponding U.S. Appl. No. 17/668,714.
Final Office Action, dated May 12, 2022, from corresponding U.S. Appl. No. 17/499,624.
Final Office Action, dated May 16, 2022, from corresponding U.S. Appl. No. 17/480,377.
Final Office Action, dated May 2, 2022, from corresponding U.S. Appl. No. 17/499,595.
International Search Report, dated May 12, 2022, from corresponding International Application No. PCT/US2022/015929.
International Search Report, dated May 17, 2022, from corresponding International Application No. PCT/US2022/015241.
International Search Report, dated May 19, 2022, from corresponding International Application No. PCT/US2022/015637.
Lasierra et al, "Data Management in Home Scenarios Using an Autonomic Ontology-Based Approach," IEEE, pp. 94-99 (Year: 2012).
Lenzerini et al, "Ontology-based Data Management," ACM, pp. 5-6 (Year: 2011).
Niu, et al, "Achieving Data Truthfulness and Privacy Preservation in Data Markets", IEEE Transactions On Knowledge and Data Engineering, IEEE Service Centre, Los Alamitos, Ca, US, vol. 31, No. 1, Jan. 1, 2019, pp. 105-119 (Year 2019).
Notice of Allowance, dated May 11, 2022, from corresponding U.S. Appl. No. 17/395,759.
Notice of Allowance, dated May 18, 2022, from corresponding U.S. Appl. No. 17/670,354.
Notice of Allowance, dated May 6, 2022, from corresponding U.S. Appl. No. 17/666,886.
Office Action, dated May 12, 2022, from corresponding U.S. Appl. No. 17/509,974.
Office Action, dated May 16, 2022, from corresponding U.S. Appl. No. 17/679,750.
Office Action, dated May 9, 2022, from corresponding U.S. Appl. No. 16/840,943.
Thomas et al, "MooM—A Prototype Framework for Management of Ontology Mappings," IEEE, pp. 548-555 (Year: 2011).
Written Opinion of the International Searching Authority, dated May 12, 2022, from corresponding International Application No. PCT/US2022/015929.
Written Opinion of the International Searching Authority, dated May 17, 2022, from corresponding International Application No. PCT/US2022/015241.
Written Opinion of the International Searching Authority, dated May 19, 2022, from corresponding International Application No. PCT/US2022/015637.
International Search Report, dated Oct. 11, 2018, from corresponding International Application No. PCT/US2018/044026.
International Search Report, dated Oct. 11, 2018, from corresponding International Application No. PCT/US2018/045240.
International Search Report, dated Oct. 12, 2017, from corresponding International Application No. PCT/US2017/036888.
International Search Report, dated Oct. 12, 2018, from corresponding International Application No. PCT/US2018/044046.
International Search Report, dated Oct. 16, 2018, from corresponding International Application No. PCT/US2018/045243.
International Search Report, dated Oct. 18, 2018, from corresponding International Application No. PCT/US2018/045249.
International Search Report, dated Oct. 20, 2017, from corresponding International Application No. PCT/US2017/036917.
International Search Report, dated Oct. 3, 2017, from corresponding International Application No. PCT/US2017/036912.
International Search Report, dated Sep. 1, 2017, from corresponding International Application No. PCT/US2017/036896.
International Search Report, dated Sep. 12, 2018, from corresponding International Application No. PCT/US2018/037504.
International Search Report, dated Sep. 15, 2021, from corresponding International Application No. PCT/US2021/033631.
Abdullah et al, "The Mapping Process of Unstructured Data to the Structured Data", ACM, pp. 151-155 (Year: 2013).
Acar, Gunes, et al, The Web Never Forgets, Computerand Communications Security, ACM, Nov. 3, 2014, pp. 674-689.
Aghasian, Erfan, et al, Scoring Users' Privacy Disclosure Across Multiple Online Social Networks,IEEE Access, Multidisciplinary Rapid Review Open Access Journal, Jul. 31, 2017, vol. 5, 2017.
Agosti et al, "Access and Exchange of Hierarchically Structured Resources on the Web with the NESTOR Framework", EEE, pp. 659-662 (Year: 2009).
Agrawal et al, "Securing Electronic Health Records Without Impeding the Flow of Information," International Journal of Medical Informatics 76, 2007, pp. 471-479 (Year: 2007).
Ahmad et al, "Task-Oriented Access Model for Secure Data Sharing Over Cloud," ACM, pp. 1-7 (Year: 2015).
Ahmad, et al, "Performance of Resource Management Algorithms for Processable Bulk Data Transfer Tasks in Grid Environments," ACM, pp. 177-188 (Year: 2008).
Alaa et al, "Personalized Risk Scoring for Critical Care Prognosis Using Mixtures of Gaussian Processes," Apr. 27, 2017, IEEE, vol. 65, issue 1, pp. 207-217 (Year: 2017).
Aman et al, "Detecting Data Tampering Attacks in Synchrophasor Networks using Time Hopping," IEEE, pp. 1-6 (Year: 2016).
Antunes et al, "Preserving Digital Data in Heterogeneous Environments", ACM, pp. 345-348,2009 (Year: 2009).
Ardagna, et al, "A Privacy-Aware Access Control System," Journal of Computer Security, 16:4, pp. 369-397 (Year: 2008).
Avepoint, Automating Privacy Impact Assessments, AvePoint, Inc.
Avepoint, AvePoint Privacy Impact Assessment 1: User Guide, Cumulative Update 2, Revision E, Feb. 2015, AvePoint, Inc.
Avepoint, Installing and Configuring the APIA System, International Association of Privacy Professionals, AvePoint, nc.
Ball, et al, "Aspects of the Computer-Based Patient Record," Computers in Healthcare, Springer-Verlag New York Inc., pp. 1-23 (Year: 1992).
Bang et al, "Building an Effective and Efficient Continuous Web Application Security Program," 2016 International Conference on Cyber Security Situational Awareness, Data Analytics and Assessment (CyberSA), London, 2016, pp. 1-4 (Year: 2016).
Barker, "Personalizing Access Control by Generalizing Access Control," ACM, pp. 149-158 (Year: 2010).
Barr, "Amazon Rekognition Update—Estimated Age Range for Faces," AWS News Blog, Feb. 10, 2017, pp. 1-5(Year: 2017).
Bayardo et al, "Technological Solutions for Protecting Privacy," Computer 36.9 (2003), pp. 115-118, (Year: 2003).
Berezovskiy et al, "A framework for dynamic data source identification and orchestration on the Web", ACM, pp. 1-8 (Year: 2010).
Bertino et al, "On Specifying Security Policies for Web Documents with an XML-based Language," ACM, pp. 57-65 (Year: 2001).
Bertino et al, "Towards Mechanisms for Detection and Prevention of Data Exfiltration by Insiders," Mar. 22, 2011, ACM, pp. 10-19 (Year: 2011).
Bhargav-Spantzel et al., Receipt Management- Transaction History based Trust Establishment, 2007, ACM, pp. 82-91.
Bhuvaneswaran et al, "Redundant Parallel Data Transfer Schemes for the Grid Environment", ACM, p. 18 (Year: 2006).
Bieker, et al, "Privacy-Preserving Authentication Solutions - Best Practices for Implementation and EU Regulatory Perspectives," Oct. 29, 2014, IEEE, pp. 1-10 (Year: 2014).
Bin, et al, "Research on Data Mining Models for the Internet of Things," IEEE, pp. 1-6 (Year: 2010).
Binns, et al, "Data Havens, or Privacy Sans Frontieres? A Study of International Personal Data Transfers," ACM, pp. 273-274 (Year: 2002).
Borgida, "Description Logics in Data Management," IEEE Transactions on Knowledge and Data Engineering, vol. 7, No. 5, Oct. 1995, pp. 671-682 (Year: 1995).
Brandt et al, "Efficient Metadata Management in Large Distributed Storage Systems," IEEE, pp. 1-9 (Year: 2003).
Bujlow et al, "Web Tracking: Mechanisms, Implications, and Defenses," Proceedings of the IEEE, Aug. 1, 2017, vol. 5, No. 8, pp. 1476-1510 (Year: 2017).

(56) References Cited

OTHER PUBLICATIONS

Byun, Ji-Won, Elisa Bertino, and Ninghui Li. "Purpose based access control of complex data for privacy protection." Proceedings of the tenth ACM symposium on Access control models and technologies. ACM, 2005. (Year: 2005).
Carminati et al, "Enforcing Access Control Over Data Streams," ACM, pp. 21-30 (Year: 2007).
Carpineto et al, "Automatic Assessment of Website Compliance to the European Cookie Law with CooLCheck," Proceedings of the 2016 ACM on Workshop on Privacy in the Electronic Society, 2016, pp. 135-138 (Year: 2016).
Cerpzone, "How to Access Data on Data Archival Storage and Recovery System", https://www.saj.usace.army.mil/Portals/44/docs/Environmental/Lake%200%20Watershed/15February2017/How%20To%20Access%20Model% 20Data%20on%20DASR.pdf?ver=2017-02-16-095535-633, Feb. 16, 2017.
Cha et al, "A Data-Driven Security Risk Assessment Scheme for Personal Data Protection," IEEE, p. 50510-50517 (Year: 2018).
Cha, et al, "Process-Oriented Approach for Validating Asset Value for Evaluating Information Security Risk," IEEE, Aug. 31, 2009, pp. 379-385 (Year: 2009).
Chapados et al, "Scoring Models for Insurance Risk Sharing Pool Optimization," 2008, IEEE, pp. 97-105 (Year: 2008).
Cheng, Raymond, et al, "Radiatus: A Shared-Nothing Server-Side Web Architecture," Proceedings of the Seventh ACM Symposium on Cloud Computing, Oct. 5, 2016, pp. 237-250 (Year: 2016).
Choi et al, "Retrieval Effectiveness of Table of Contents and Subject Headings," ACM, pp. 103-104 (Year: 2007).
Office Action, dated Jan. 27, 2020, from corresponding U.S. Appl. No. 16/656,895.
Office Action, dated Jan. 28, 2020, from corresponding U.S. Appl. No. 16/712,104.
Office Action, dated Jan. 29, 2021, from corresponding U.S. Appl. No. 17/101,106.
Office Action, dated Jan. 4, 2019, from corresponding U.S. Appl. No. 16/159,566.
Office Action, dated Jan. 4, 2019, from corresponding U.S. Appl. No. 16/159,628.
Office Action, dated Jan. 4, 2021, from corresponding U.S. Appl. No. 17/013,756.
Office Action, dated Jan. 7, 2020, from corresponding U.S. Appl. No. 16/572,182.
Office Action, dated Jul. 13, 2021, from corresponding U.S. Appl. No. 17/306,496.
Office Action, dated Jul. 15, 2021, from corresponding U.S. Appl. No. 17/020,275.
Office Action, dated Jul. 18, 2019, from corresponding U.S. Appl. No. 16/410,762.
Office Action, dated Jul. 19, 2021, from corresponding U.S. Appl. No. 17/316,179.
Office Action, dated Jul. 21, 2017, from corresponding U.S. Appl. No. 15/256,430.
Office Action, dated Jul. 21, 2021, from corresponding U.S. Appl. No. 16/901,654.
Office Action, dated Jul. 23, 2019, from corresponding U.S. Appl. No. 16/436,616.
Office Action, dated Jul. 24, 2020, from corresponding U.S. Appl. No. 16/404,491.
Office Action, dated Jul. 27, 2020, from corresponding U.S. Appl. No. 16/595,342.
Office Action, dated Jun. 1, 2020, from corresponding U.S. Appl. No. 16/862,952.
Office Action, dated Jun. 24, 2019, from corresponding U.S. Appl. No. 16/410,336.
Office Action, dated Jun. 24, 2021, from corresponding U.S. Appl. No. 17/234,205.
Office Action, dated Jun. 27, 2019, from corresponding U.S. Appl. No. 16/404,405.
Office Action, dated Jun. 7, 2021, from corresponding U.S. Appl. No. 17/200,698.
Office Action, dated Jun. 9, 2021, from corresponding U.S. Appl. No. 17/222,523.
Office Action, dated Mar. 11, 2019, from corresponding U.S. Appl. No. 16/220,978.
Office Action, dated Mar. 12, 2019, from corresponding U.S. Appl. No. 16/221,153.
Office Action, dated Mar. 15, 2021, from corresponding U.S. Appl. No. 17/149,421.
Office Action, dated Mar. 16, 2020, from corresponding U.S. Appl. No. 16/719,488.
Office Action, dated Mar. 17, 2020, from corresponding U.S. Appl. No. 16/565,395.
Office Action, dated Mar. 17, 2020, from corresponding U.S. Appl. No. 16/719,071.
Office Action, dated Mar. 20, 2020, from corresponding U.S. Appl. No. 16/778,709.
Office Action, dated Mar. 23, 2020, from corresponding U.S. Appl. No. 16/671,444.
Office Action, dated Mar. 25, 2019, from corresponding U.S. Appl. No. 16/278,121.
Office Action, dated Mar. 25, 2020, from corresponding U.S. Appl. No. 16/701,043.
Office Action, dated Mar. 25, 2020, from corresponding U.S. Appl. No. 16/791,006.
Office Action, dated Mar. 27, 2019, from corresponding U.S. Appl. No. 16/278,120.
Office Action, dated Mar. 30, 2018, from corresponding U.S. Appl. No. 15/894,890.
Office Action, dated Mar. 30, 2018, from corresponding U.S. Appl. No. 15/896,790.
Office Action, dated Mar. 30, 2021, from corresponding U.S. Appl. No. 17/151,399.
Office Action, dated Mar. 4, 2019, from corresponding U.S. Appl. No. 16/237,083.
Office Action, dated May 14, 2020, from corresponding U.S. Appl. No. 16/808,497.
Office Action, dated May 14, 2020, from corresponding U.S. Appl. No. 16/808,503.
Office Action, dated May 15, 2020, from corresponding U.S. Appl. No. 16/808,493.
Office Action, dated May 16, 2018, from corresponding U.S. Appl. No. 15/882,989.
Office Action, dated May 17, 2019, from corresponding U.S. Appl. No. 16/277,539.
Office Action, dated May 18, 2021, from corresponding U.S. Appl. No. 17/196,570.
Office Action, dated May 2, 2018, from corresponding U.S. Appl. No. 15/894,809.
Office Action, dated May 2, 2019, from corresponding U.S. Appl. No. 16/104,628.
Office Action, dated May 29, 2020, from corresponding U.S. Appl. No. 16/862,944.
Office Action, dated May 29, 2020, from corresponding U.S. Appl. No. 16/862,948.
Office Action, dated May 29, 2020, from corresponding U.S. Appl. No. 16/863,226.
Office Action, dated May 5, 2020, from corresponding U.S. Appl. No. 16/410,336.
Office Action, dated Aug. 13, 2019, from corresponding U.S. Appl. No. 16/505,430.
Office Action, dated Aug. 13, 2019, from corresponding U.S. Appl. No. 16/512,033.
Office Action, dated Aug. 15, 2019, from corresponding U.S. Appl. No. 16/505,461.
Office Action, dated Aug. 18, 2021, from corresponding U.S. Appl. No. 17/222,725.
Office Action, dated Aug. 19, 2019, from corresponding U.S. Appl. No. 16/278,122.
Office Action, dated Aug. 20, 2020, from corresponding U.S. Appl. No. 16/817,136.
Office Action, dated Aug. 23, 2017, from corresponding U.S. Appl. No. 15/626,052.

(56) References Cited

OTHER PUBLICATIONS

Office Action, dated Aug. 24, 2017, from corresponding U.S. Appl. No. 15/169,643.
Office Action, dated Aug. 24, 2017, from corresponding U.S. Appl. No. 15/619,451.
Office Action, dated Aug. 24, 2020, from corresponding U.S. Appl. No. 16/595,327.
Office Action, dated Aug. 27, 2019, from corresponding U.S. Appl. No. 16/410,296.
Office Action, dated Aug. 27, 2021, from corresponding U.S. Appl. No. 17/187,329.
Office Action, dated Aug. 27, 2021, from corresponding U.S. Appl. No. 17/334,948.
Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.
Office Action, dated Aug. 30, 2021, from corresponding U.S. Appl. No. 16/938,520.
Office Action, dated Aug. 6, 2019, from corresponding U.S. Appl. No. 16/404,491.
Office Action, dated Aug. 6, 2020, from corresponding U.S. Appl. No. 16/862,956.
Office Action, dated Dec. 11, 2019, from corresponding U.S. Appl. No. 16/578,712.
Office Action, dated Dec. 14, 2018, from corresponding U.S. Appl. No. 16/104,393.
Office Action, dated Dec. 15, 2016, from corresponding U.S. Appl. No. 15/256,419.
Office Action, dated Dec. 16, 2019, from corresponding U.S. Appl. No. 16/563,754.
Office Action, dated Dec. 16, 2019, from corresponding U.S. Appl. No. 16/565,265.
Office Action, dated Dec. 16, 2020, from corresponding U.S. Appl. No. 17/020,275.
Office Action, dated Dec. 18, 2020, from corresponding U.S. Appl. No. 17/030,714.
Office Action, dated Dec. 19, 2019, from corresponding U.S. Appl. No. 16/410,866.
Office Action, dated Dec. 2, 2019, from corresponding U.S. Appl. No. 16/560,963.
Office Action, dated Dec. 23, 2019, from corresponding U.S. Appl. No. 16/593,639.
Office Action, dated Dec. 24, 2020, from corresponding U.S. Appl. No. 17/068,454.
Office Action, dated Dec. 3, 2018, from corresponding U.S. Appl. No. 16/055,998.
Office Action, dated Dec. 31, 2018, from corresponding U.S. Appl. No. 16/160,577.
Office Action, dated Dec. 8, 2020, from corresponding U.S. Appl. No. 17/013,758.
Office Action, dated Dec. 8, 2020, from corresponding U.S. Appl. No. 17/068,198.
Office Action, dated Feb. 10, 2021, from corresponding U.S. Appl. No. 16/862,944.
Office Action, dated Feb. 10, 2021, from corresponding U.S. Appl. No. 17/106,469.
Office Action, dated Feb. 15, 2019, from corresponding U.S. Appl. No. 16/220,899.
Office Action, dated Feb. 17, 2021, from corresponding U.S. Appl. No. 16/862,948.
Office Action, dated Feb. 18, 2021, from corresponding U.S. Appl. No. 16/862,952.
Office Action, dated Feb. 2, 2021, from corresponding U.S. Appl. No. 17/101,915.
Office Action, dated Feb. 26, 2019, from corresponding U.S. Appl. No. 16/228,250.
Office Action, dated Feb. 3, 2021, from corresponding U.S. Appl. No. 17/013,757.
Office Action, dated Feb. 5, 2020, from corresponding U.S. Appl. No. 16/586,202.
Office Action, dated Feb. 6, 2020, from corresponding U.S. Appl. No. 16/707,762.
Office Action, dated Feb. 8, 2021, from corresponding U.S. Appl. No. 17/139,650.
Office Action, dated Feb. 9, 2021, from corresponding U.S. Appl. No. 16/808,493.
Office Action, dated Jan. 18, 2019, from corresponding U.S. Appl. No. 16/055,984.
Office Action, dated Jan. 22, 2021, from corresponding U.S. Appl. No. 17/099,270.
Office Action, dated Jan. 24, 2020, from corresponding U.S. Appl. No. 16/505,426.
Office Action, dated Jan. 24, 2020, from corresponding U.S. Appl. No. 16/700,049.
Notice of Allowance, dated May 26, 2021, from corresponding U.S. Appl. No. 16/808,493.
Notice of Allowance, dated May 26, 2021, from corresponding U.S. Appl. No. 16/865,874.
Notice of Allowance, dated May 26, 2021, from corresponding U.S. Appl. No. 17/199,514.
Notice of Allowance, dated May 27, 2020, from corresponding U.S. Appl. No. 16/820,208.
Notice of Allowance, dated May 27, 2021, from corresponding U.S. Appl. No. 16/927,658.
Notice of Allowance, dated May 27, 2021, from corresponding U.S. Appl. No. 17/198,757.
Notice of Allowance, dated May 28, 2019, from corresponding U.S. Appl. No. 16/277,568.
Notice of Allowance, dated May 28, 2020, from corresponding U.S. Appl. No. 16/799,279.
Notice of Allowance, dated May 28, 2021, from corresponding U.S. Appl. No. 16/862,944.
Notice of Allowance, dated May 5, 2017, from corresponding U.S. Appl. No. 15/254,901.
Notice of Allowance, dated May 5, 2020, from corresponding U.S. Appl. No. 16/563,754.
Notice of Allowance, dated May 7, 2020, from corresponding U.S. Appl. No. 16/505,426.
Notice of Allowance, dated May 7, 2021, from corresponding U.S. Appl. No. 17/194,662.
Notice of Allowance, dated Nov. 14, 2019, from corresponding U.S. Appl. No. 16/436,616.
Notice of Allowance, dated Nov. 16, 2021, from corresponding U.S. Appl. No. 17/491,871.
Notice of Allowance, dated Nov. 2, 2018, from corresponding U.S. Appl. No. 16/054,762.
Notice of Allowance, dated Nov. 22, 2021, from corresponding U.S. Appl. No. 17/383,889.
Notice of Allowance, dated Nov. 23, 2020, from corresponding U.S. Appl. No. 16/791,589.
Notice of Allowance, dated Nov. 24, 2020, from corresponding U.S. Appl. No. 17/027,019.
Notice of Allowance, dated Nov. 25, 2020, from corresponding U.S. Appl. No. 17/019,771.
Notice of Allowance, dated Nov. 26, 2019, from corresponding U.S. Appl. No. 16/563,735.
Notice of Allowance, dated Nov. 27, 2019, from corresponding U.S. Appl. No. 16/570,712.
Notice of Allowance, dated Nov. 27, 2019, from corresponding U.S. Appl. No. 16/577,634.
Notice of Allowance, dated Nov. 3, 2020, from corresponding U.S. Appl. No. 16/719,071.
Notice of Allowance, dated Nov. 5, 2019, from corresponding U.S. Appl. No. 16/560,965.
Notice of Allowance, dated Nov. 7, 2017, from corresponding U.S. Appl. No. 15/671,073.
Notice of Allowance, dated Nov. 8, 2018, from corresponding U.S. Appl. No. 16/042,642.

(56) References Cited

OTHER PUBLICATIONS

Notice of Allowance, dated Nov. 9, 2020, from corresponding U.S. Appl. No. 16/595,342.
Notice of Allowance, dated Oct. 1, 2021, from corresponding U.S. Appl. No. 17/340,395.
Notice of Allowance, dated Oct. 10, 2019, from corresponding U.S. Appl. No. 16/277,539.
Notice of Allowance, dated Oct. 17, 2018, from corresponding U.S. Appl. No. 15/896,790.
Notice of Allowance, dated Oct. 17, 2018, from corresponding U.S. Appl. No. 16/054,672.
Notice of Allowance, dated Oct. 17, 2019, from corresponding U.S. Appl. No. 16/563,741.
Notice of Allowance, dated Oct. 21, 2019, from corresponding U.S. Appl. No. 16/404,405.
Notice of Allowance, dated Oct. 21, 2020, from corresponding U.S. Appl. No. 16/834,812.
Notice of Allowance, dated Oct. 22, 2021, from corresponding U.S. Appl. No. 17/346,847.
Notice of Allowance, dated Oct. 3, 2019, from corresponding U.S. Appl. No. 16/511,700.
Notice of Allowance, dated Sep. 1, 2021, from corresponding U.S. Appl. No. 17/196,570.
Notice of Allowance, dated Sep. 1, 2021, from corresponding U.S. Appl. No. 17/222,556.
Notice of Allowance, dated Sep. 12, 2019, from corresponding U.S. Appl. No. 16/512,011.
Notice of Allowance, dated Sep. 13, 2018, from corresponding U.S. Appl. No. 15/894,809.
Notice of Allowance, dated Sep. 13, 2018, from corresponding U.S. Appl. No. 15/894,890.
Notice of Allowance, dated Sep. 14, 2021, from corresponding U.S. Appl. No. 16/808,497.
Notice of Allowance, dated Sep. 16, 2020, from corresponding U.S. Appl. No. 16/915,097.
Notice of Allowance, dated Sep. 17, 2020, from corresponding U.S. Appl. No. 16/863,226.
Notice of Allowance, dated Sep. 18, 2018, from corresponding U.S. Appl. No. 15/894,819.
Notice of Allowance, dated Sep. 18, 2018, from corresponding U.S. Appl. No. 16/041,545.
Notice of Allowance, dated Sep. 18, 2020, from corresponding U.S. Appl. No. 16/812,795.
Notice of Allowance, dated Sep. 23, 2020, from corresponding U.S. Appl. No. 16/811,793.
Notice of Allowance, dated Sep. 23, 2021, from corresponding U.S. Appl. No. 17/068,454.
Chowdhury et al, "A System Architecture for Subject-Centric Data Sharing", ACM, pp. 1-10 (Year: 2018).
Chowdhury et al, "Managing Data Transfers in Computer Clusters with Orchestra," ACM, pp. 98-109 (Year: 2011).
Decision Regarding Institution of Post-Grant Review in Case PGR2018-00056 for U.S. Pat. No. 9,691,090 B1, Oct. 11, 2018.
Dimou et al, "Machine-Interpretable Dataset and Service Descriptions for Heterogeneous Data Access and Retrieval", ACM, pp. 145-152 (Year: 2015).
Dokholyan et al, "Regulatory and Ethical Considerations for Linking Clinical and Administrative Databases," American Heart Journal 157 6 (2009), pp. 971-982 (Year: 2009).
Dunkel et al., "Data Organization and Access for Efficient Data Mining", IEEE, pp. 522-529 (Year: 1999).
Dwork, Cynthia, Differential Privacy, Microsoft Research, pp. 1-12.
Emerson, et al, "A Data Mining Driven Risk Profiling Method for Road Asset Management," ACM, pp. 1267-1275 (Year: 2013).
Enck, William, et al, TaintDroid: An Information-Flow Tracking System for Realtime Privacy Monitoring on Smartphones, ACM Transactions on Computer Systems, vol. 32, No. 2, Article 5, Jun. 2014, pp. 5:1-5:29.
Everypixel Team, "A New Age Recognition API Detects the Age of People on Photos," May 20, 2019, pp. 1-5 (Year: 2019).
Falahrastegar, Marjan, et al, Tracking Personal Identifiers Across the Web, Medical Image Computing and Computer-Assisted Intervention—Miccai 2015, 18th International Conference, Oct. 5, 2015, Munich, Germany.
Fan et al, "Intrusion Investigations with Data-hiding for Computer Log-file Forensics," IEEE, pp. 1-6 (Year: 2010).
Final Written Decision Regarding Post-Grant Review in Case PGR2018-00056 for U.S. Pat. No. 9,691,090 B1, Oct. 10, 2019.
Francis, Andre, Business Mathematics and Statistics, South-Western Cengage Learning, 2008, Sixth Edition.
Friedman et al, "Data Mining with Differential Privacy," ACM, Jul. 2010, pp. 493-502 (Year: 2010).
Friedman et al, "Informed Consent in the Mozilla Browser: Implementing Value-Sensitive Design," Proceedings of the 35th Annual Hawaii International Conference on System Sciences, 2002, IEEE, pp. 1-10 (Year: 2002).
Frikken, Keith B., et al, Yet Another Privacy Metric for Publishing Micro-data, Miami University, Oct. 27, 2008, pp. 117-121.
Fung et al, "Discover Information and Knowledge from Websites using an Integrated Summarization and Visualization Framework", IEEE, pp. 232-235 (Year: 2010).
Gajare et al, "Improved Automatic Feature Selection Approach for Health Risk Prediction," Feb. 16, 2018, IEEE, pp. 816-819 (Year: 2018).
Ghiglieri, Marco et al; Personal DLP for Facebook, 2014 IEEE International Conference on Pervasive Computing and Communication Workshops (Percom Workshops); IEEE; Mar. 24, 2014; pp. 629-634.
Gilda, et al., "Blockchain for Student Data Privacy and Consent," 2018 International Conference on Computer Communication and Informatics, Jan. 4-6, 2018, IEEE, pp. 1-5 (Year: 2018).
Golab, et al, "Issues in Data Stream Management," ACM, Sigmod Record, vol. 32, No. 2, Jun. 2003, pp. 5-14 (Year: 2003).
Golfarelli et al, "Beyond Data Warehousing: What's Next in Business Intelligence?," ACM, pp. 1-6 (Year: 2004).
Gonçalves et al, "The XML Log Standard for Digital Libraries: Analysis, Evolution, and Deployment," IEEE, pp. 312-314 (Year: 2003).
Goni, Kyriaki, "Deletion Process_Only you can see my history: Investigating Digital Privacy, Digital Oblivion, and Control on Personal Data Through an Interactive Art Installation," ACM, 2016, retrieved online on Oct. 3, 2019, pp. 324-333. Retrieved from the Internet URL: http://delivery.acm.org/10.1145/2920000/291.
Gowadia et al, "RDF Metadata for XML Access Control," ACM, pp. 31-48 (Year: 2003).
Grolinger, et al, "Data Management in Cloud Environments: NoSQL and NewSQL Data Stores," Journal of Cloud Computing: Advances, Systems and Applications, pp. 1-24 (Year: 2013).
Guo, et al, "OPAL: A Passe-partout for Web Forms," ACM, pp. 353-356 (Year: 2012).
Gustarini, et al, "Evaluation of Challenges in Human Subject Studies "In-the-Wild" Using Subjects' Personal Smartphones," ACM, pp. 1447-1456 (Year: 2013).
Hacigümüs, Hakan, et al, Executing SQL over Encrypted Data in the Database-Service-Provider Model, ACM, Jun. 4, 2002, pp. 216-227.
Halevy, et al, "Schema Mediation in Peer Data Management Systems," IEEE, Proceedings of the 19th International Conference on Data Engineering, 2003, pp. 505-516 (Year: 2003).
Hauch, et al, "Information Intelligence: Metadata for Information Discovery, Access, and Integration," ACM, pp. 793-798 (Year: 2005).
Hernandez, et al, "Data Exchange with Data-Metadata Translations," ACM, pp. 260-273 (Year: 2008).
Hinde, "A Model to Assess Organisational Information Privacy Maturity Against the Protection of Personal Information Act Dissertation University of Cape Town" 2014, pp. 1-121 (Year: 2014).
Hodge, et al, "Managing Virtual Data Marts with Metapointer Tables," pp. 1-7 (Year: 2002).
Horrall et al, "Evaluating Risk: IBM's Country Financial Risk and Treasury Risk Scorecards," Jul. 21, 2014, IBM, vol. 58, issue 4, pp. 2:1-2:9 (Year: 2014).

(56) References Cited

OTHER PUBLICATIONS

Hu, et al, "Attribute Considerations for Access Control Systems," NIST Special Publication 800-205, Jun. 2019, pp. 1-42 (Year: 2019).
Hu, et al, "Guide to Attribute Based Access Control (ABAC) Definition and Considerations (Draft)," NIST Special Publication 800-162, pp. 1-54 (Year: 2013).
Huang, et al, "A Study on Information Security Management with Personal Data Protection," IEEE, Dec. 9, 2011, pp. 624-630 (Year: 2011).
Huner et al, "Towards a Maturity Model for Corporate Data Quality Management", ACM, pp. 231-238, 2009 (Year: 2009).
Hunton & Williams LLP, The Role of Risk Management in Data Protection, Privacy Risk Framework and the Risk-based Approach to Privacy, Centre for Information Policy Leadership, Workshop II, Nov. 23, 2014.
Huo et al, "A Cloud Storage Architecture Model for Data-Intensive Applications," IEEE, pp. 1-4 (Year: 2011).
IAPP, Daily Dashboard, PIA Tool Stocked With New Templates for DPI, Infosec, International Association of Privacy Professionals, Apr. 22, 2014.
IAPP, ISO/IEC 27001 Information Security Management Template, Resource Center, International Association of Privacy Professionals.
Imran et al, "Searching in Cloud Object Storage by Using a Metadata Model", IEEE, 2014, retrieved online on Apr. 1, 2020, pp. 121-128. Retrieved from the Internet: URL: https://ieeeexplore.ieee.org/stamp/stampjsp? (Year: 2014).
Invitation to Pay Additional Search Fees, dated Aug. 10, 2017, from corresponding International Application No. PCT/US2017/036912.
Invitation to Pay Additional Search Fees, dated Aug. 10, 2017, from corresponding International Application No. PCT/US2017/036917.
Invitation to Pay Additional Search Fees, dated Aug. 24, 2017, from corresponding International Application No. PCT/US2017/036888.
Invitation to Pay Additional Search Fees, dated Jan. 18, 2019, from corresponding International Application No. PCT/US2018/055736.
Invitation to Pay Additional Search Fees, dated Jan. 7, 2019, from corresponding International Application No. PCT/US2018/055773.
Invitation to Pay Additional Search Fees, dated Jan. 8, 2019, from corresponding International Application No. PCT/US2018/055774.
Invitation to Pay Additional Search Fees, dated Oct. 23, 2018, from corresponding International Application No. PCT/US2018/045296.
Ordanou et al, "Tracing Cross Border Web Tracking," Oct. 31, 2018, pp. 329-342, ACM (Year: 2018).
Slam, et al, "Mixture Model Based Label Association Techniques for Web Accessibility," ACM, pp. 67-76 (Year: 2010).
Jensen, et al, "Temporal Data Management," IEEE Transactions on Knowledge and Data Engineering, vol. 11, No. 1, Jan./Feb. 1999, pp. 36-44 (Year: 1999).
Joel Reardon et al, Secure Data Deletion from Persistent Media, ACM, Nov. 4, 2013, retrieved online on Jun. 13, 2019, pp. 271-283. Retrieved from the Internet: URL: http://delivery.acm.org/10.1145/2520000/2516699/p271-reardon.pdf? (Year: 2013).
Joonbakhsh et al, "Mining and Extraction of Personal Software Process measures through IDE Interaction logs," ACM/IEEE, 2018, retrieved online on Dec. 2, 2019, pp. 78-81. Retrieved from the Internet: URL: http://delivery.acm.org/10.1145/3200000/3196462/p78-joonbakhsh.pdf? (Year: 2018).
Jun et al, "Scalable Multi-Access Flash Store for Big Data Analytics," ACM, pp. 55-64 (Year: 2014).
Kirkham, et al, "A Personal Data Store for an Internet of Subjects," IEEE, pp. 92-97 (Year: 2011).
Korba, Larry et al; "Private Data Discovery for Privacy Compliance in Collaborative Environments"; Cooperative Design, Visualization, and Engineering; Springer Beriin Heidelberg; Sep. 21, 2008; pp. 142-150.
Krol, Kat, et al, Control versus Effort in Privacy Warnings for Webforms, ACM, Oct. 24, 2016, pp. 13-23.
Lamb et al, "Role-Based Access Control for Data Service Integration", ACM, pp. 3-11 (Year: 2006).
Leadbetter, et al, "Where Big Data Meets Linked Data: Applying Standard Data Models to Environmental Data Streams," IEEE, pp. 2929-2937 (Year: 2016).
Lebeau, Franck, et al, "Model-Based Vulnerability Testing for Web Applications," 2013 IEEE Sixth International Conference on Software Testing, Verification and Validation Workshops, pp. 445-452, IEEE, 2013 (Year: 2013).
Li, Ninghui, et al, t-Closeness: Privacy Beyond k-Anonymity and I-Diversity, IEEE, 2014, pp. 106-115.
Liu et al, "Cross-Geography Scientific Data Transferring Trends and Behavior," ACM, pp. 267-278 (Year: 2018).
Liu, Kun, et al, A Framework for Computing the Privacy Scores of Users in Online Social Networks, ACM Transactions an Knowledge Discovery from Data, vol. 5, No. 1, Article 6, Dec. 2010, 30 pages.
Liu, Yandong, et al, "Finding the Right Consumer: Optimizing for Conversion in Display Advertising Campaigns," Proceedings of the Fifth ACM International Conference on Web Search and Data Mining, Feb. 2, 2012, pp. 473-428 (Year: 2012).
Lizar et al, "Usable Consents: Tracking and Managing Use of Personal Data with a Consent Transaction Receipt," Proceedings of the 2014 ACM International Joint Conference on Pervasive and Ubiquitous Computing: Adjunct Publication, 2014, pp. 647-652 (Year: 2014).
Luu, et al, "Combined Local and Holistic Facial Features for Age-Determination," 2010 11th Int. Conf. Control, Automation, Robotics and Vision, Singapore, Dec. 7, 2010, IEEE, pp. 900-904 (Year: 2010).
Ma Ziang, et al, "LibRadar: Fast and Accurate Detection of Third-Party Libraries in Android Apps," 2016 IEEE/ACM 38th IEEE International Conference on Software Engineering Companion (ICSE-C), ACM, May 14, 2016, pp. 653-656, DOI: http://dx.doi.org/10.1145/2889160.2889178, p. 653, r.col, par. 1-3; figure 3 (Year: 2016).
Mandal, et al, "Automated Age Prediction Using Wrinkles Features of Facial Images and Neural Network," International Journal of Emerging Engineering Research and Technology, vol. 5, Issue 2, Feb. 2017, pp. 12-20 (Year: 2017).
Maret et al, "Multimedia Information Interchange: Web Forms Meet Data Servers", IEEE, pp. 499-505 (Year: 1999).
Martin, et al, "Hidden Surveillance by Web Sites: Web Bugs in Contemporary Use," Communications of the ACM, vol. 46, No. 12, Dec. 2003, pp. 258-264. Internet source https://doi.0rg/10.1145/953460.953509 (Year: 2003).
McGarth et al, "Digital Library Technology for Locating and Accessing Scientific Data", ACM, pp. 188-194 (Year: 1999).
Mesbah et al, "Crawling Ajax-Based Web Applications Through Dynamic Analysis of User Interface State Changes," ACM Transactions on the Web (TWEB) vol. 6, No. 1, Article 3, Mar. 2012, pp. 1-30 (Year: 2012).
Moiso et al, "Towards a User-Centric Personal Data Ecosystem The Role of the Bank of Individual's Data," 2012 16th International Conference on Intelligence in Next Generation Networks, Berlin, 2012, pp. 202-209 (Year: 2012).
Moscoso-Zea et al, "Datawarehouse Design for Educational Data Mining," IEEE, pp. 1-6 (Year: 2016).
Mudepalli et al, "An efficient data retrieval approach using blowfish encryption on cloud CipherText Retrieval in Cloud Computing" IEEE, pp. 267-271 (Year: 2017).
Mundada et al, "Half-Baked Cookies: Hardening Cookie-Based Authentication for the Modem Web," Proceedings of the 11th ACM on Asia Conference on Computer and Communications Security, 2016, pp. 675-685 (Year: 2016).
Newman et al, "High Speed Scientific Data Transfers using Software Defined Networking," ACM, pp. 1-9 (Year 2015).
Newman, "Email Archive Overviews using Subject Indexes", ACM, pp. 652-653, 2002 (Year: 2002).
Nishikawa, Taiji, English Translation of JP 2019154505, Aug. 27, 2019 (Year: 2019).
Notice of Filing Date for Petition for Post-Grant Review of related U.S. Pat. No. 9,691,090 dated Apr. 12, 2018.
O'Keefe et al, "Privacy-Preserving Data Linkage Protocols," Proceedings of the 2004 ACM Workshop on Privacy in the Electronic Society, 2004, pp. 94-102 (Year: 2004).

(56) References Cited

OTHER PUBLICATIONS

Olenski, Steve, For Consumers, Data Is A Matter Of Trust, CMO Network, Apr. 18, 2016, https://www.forbes.com/sites/steveolenski/2016/04/18/for-consumers-data-is-a-matter-of-trust/#2e48496278b3.
Pearson, et al, "A Model-Based Privacy Compliance Checker," IJEBR, vol. 5, No. 2, pp. 63-83, 2009, Nov. 21, 2008. [Online]. Available: http://dx.doi.org/10.4018/jebr.2009040104 (Year: 2008).
Pechenizkiy et al, "Process Mining Online Assessment Data," Educational Data Mining, pp. 279-288 (Year: 2009).
Petition for Post-Grant Review of related U.S. Pat. No. 9,691,090 dated Mar. 27, 2018.
Petrie et al, "The Relationship between Accessibility and Usability of Websites", ACM, pp. 397-406 (Year: 2007).
Pfeifle, Sam, The Privacy Advisor, IAPP and AvePoint Launch New Free PIA Tool, International Association of Privacy Professionals, Mar. 5, 2014.
Pfeifle, Sam, The Privacy Advisor, IAPP Heads to Singapore with APIA Template in Tow, International Association of Privacy Professionals, https://iapp.org/news/a/iapp-heads-to-singapore-with-apia-template_in_tow/, Mar. 28, 2014, pp. 1-3.
Ping et al, "Wide Area Placement of Data Replicas for Fast and Highly Available Data Access," ACM, pp. 1-8 (Year: 2011).
Popescu-Zeletin, "The Data Access and Transfer Support in a Local Heterogeneous Network (HMINET)", IEEE, pp. 147-152 (Year: 1979).
Porter, "De-Identified Data and Third Party Data Mining: The Risk of Re-Identification of Personal Information," Shidler JL Com. & Tech. 5, 2008, pp. 1-9 (Year: 2008).
Pretorius, et al, "Attributing Users Based on Web Browser History," 2017 IEEE Conference on Application, Information and Network Security (AINS), 2017, pp. 69-74 (Year: 2017).
Qing-Jiang et al, "The (P, a, K) Anonymity Model for Privacy Protection of Personal Information in the Social Networks," 2011 6th IEEE Joint International Information Technology and Artificial Intelligence Conference, vol. 2 IEEE, 2011, pp. 420-423 (Year: 2011).
Qiu, et al, "Design and Application of Data Integration Platform Based on Web Services and XML," IEEE, pp. 253-256 (Year: 2016).
Radu, et al, "Analyzing Risk Evaluation Frameworks and Risk Assessment Methods," IEEE, Dec. 12, 2020, pp. 1-6 (Year: 2020).
Reardon et al, User-Level Secure Deletion on Log-Structured File Systems, ACM, 2012, retrieved online on Apr. 22, 2021, pp. 1-11. Retrieved from the Internet: URL: http://citeseerx.ist.psu.edu/viewdoc/download; sessionid=450713515DC7F19F8ED09AE961D4B60E. (Year: 2012).
Notice of Allowance, dated Jun. 11, 2021, from corresponding U.S. Appl. No. 16/862,948.
Notice of Allowance, dated Jun. 11, 2021, from corresponding U.S. Appl. No. 16/862,952.
Notice of Allowance, dated Jun. 11, 2021, from corresponding U.S. Appl. No. 17/216,436.
Notice of Allowance, dated Jun. 12, 2019, from corresponding U.S. Appl. No. 16/278,123.
Notice of Allowance, dated Jun. 12, 2019, from corresponding U.S. Appl. No. 16/363,454.
Notice of Allowance, dated Jun. 16, 2020, from corresponding U.S. Appl. No. 16/798,818.
Notice of Allowance, dated Jun. 17, 2020, from corresponding U.S. Appl. No. 16/656,895.
Notice of Allowance, dated Jun. 18, 2019, from corresponding U.S. Appl. No. 16/410,566.
Notice of Allowance, dated Jun. 19, 2018, from corresponding U.S. Appl. No. 15/894,890.
Notice of Allowance, dated Jun. 19, 2019, from corresponding U.S. Appl. No. 16/042,673.
Notice of Allowance, dated Jun. 19, 2019, from corresponding U.S. Appl. No. 16/055,984.
Notice of Allowance, dated Jun. 2, 2021, from corresponding U.S. Appl. No. 17/198,581.
Notice of Allowance, dated Jun. 21, 2019, from corresponding U.S. Appl. No. 16/404,439.
Notice of Allowance, dated Jun. 22, 2020, from corresponding U.S. Appl. No. 16/791,337.
Notice of Allowance, dated Jun. 27, 2018, from corresponding U.S. Appl. No. 15/882,989.
Notice of Allowance, dated Jun. 4, 2019, from corresponding U.S. Appl. No. 16/159,566.
Notice of Allowance, dated Jun. 5, 2019, from corresponding U.S. Appl. No. 16/220,899.
Notice of Allowance, dated Jun. 5, 2019, from corresponding U.S. Appl. No. 16/357,260.
Notice of Allowance, dated Jun. 6, 2018, from corresponding U.S. Appl. No. 15/875,570.
Notice of Allowance, dated Jun. 6, 2019, from corresponding U.S. Appl. No. 16/159,628.
Notice of Allowance, dated Jun. 7, 2021, from corresponding U.S. Appl. No. 17/099,270.
Notice of Allowance, dated Jun. 8, 2020, from corresponding U.S. Appl. No. 16/712,104.
Notice of Allowance, dated Mar. 1, 2018, from corresponding U.S. Appl. No. 15/853,674.
Notice of Allowance, dated Mar. 1, 2019, from corresponding U.S. Appl. No. 16/059,911.
Notice of Allowance, dated Mar. 10, 2021, from corresponding U.S. Appl. No. 16/925,628.
Notice of Allowance, dated Mar. 10, 2021, from corresponding U.S. Appl. No. 17/128,666.
Notice of Allowance, dated Mar. 13, 2019, from corresponding U.S. Appl. No. 16/055,083.
Notice of Allowance, dated Mar. 14, 2019, from corresponding U.S. Appl. No. 16/055,944.
Notice of Allowance, dated Mar. 16, 2020, from corresponding U.S. Appl. No. 16/778,704.
Notice of Allowance, dated Mar. 16, 2021, from corresponding U.S. Appl. No. 17/149,380.
Notice of Allowance, dated Mar. 17, 2020, from corresponding U.S. Appl. No. 16/560,885.
Notice of Allowance, dated Mar. 18, 2020, from corresponding U.S. Appl. No. 16/560,963.
Notice of Allowance, dated Mar. 19, 2021, from corresponding U.S. Appl. No. 17/013,757.
Notice of Allowance, dated Mar. 2, 2018, from corresponding U.S. Appl. No. 15/858,802.
Notice of Allowance, dated Mar. 24, 2020, from corresponding U.S. Appl. No. 16/552,758.
Notice of Allowance, dated Mar. 25, 2019, from corresponding U.S. Appl. No. 16/054,780.
Notice of Allowance, dated Mar. 26, 2020, from corresponding U.S. Appl. No. 16/560,889.
Notice of Allowance, dated Mar. 26, 2020, from corresponding U.S. Appl. No. 16/578,712.
Notice of Allowance, dated Mar. 27, 2019, from corresponding U.S. Appl. No. 16/226,280.
Notice of Allowance, dated Mar. 29, 2019, from corresponding U.S. Appl. No. 16/055,998.
Notice of Allowance, dated Mar. 31, 2020, from corresponding U.S. Appl. No. 16/563,744.
Notice of Allowance, dated Mar. 31, 2021, from corresponding U.S. Appl. No. 17/013,758.
Notice of Allowance, dated Mar. 31, 2021, from corresponding U.S. Appl. No. 17/162,205.
Notice of Allowance, dated May 1, 2020, from corresponding U.S. Appl. No. 16/586,202.
Notice of Allowance, dated May 11, 2020, from corresponding U.S. Appl. No. 16/786,196.
Notice of Allowance, dated May 13, 2021, from corresponding U.S. Appl. No. 17/101,915.
Notice of Allowance, dated May 19, 2020, from corresponding U.S. Appl. No. 16/505,430.

(56) References Cited

OTHER PUBLICATIONS

Notice of Allowance, dated May 19, 2020, from corresponding U.S. Appl. No. 16/808,496.
Notice of Allowance, dated May 20, 2020, from corresponding U.S. Appl. No. 16/707,762.
Notice of Allowance, dated May 21, 2018, from corresponding U.S. Appl. No. 15/896,790.
Written Opinion of the International Searching Authority, dated Jan. 14, 2019, from corresponding International Application No. PCT/US2018/046949.
Written Opinion of the International Searching Authority, dated Jan. 7, 2019, from corresponding International Application No. PCT/US2018/055772.
Written Opinion of the International Searching Authority, dated Jun. 21, 2017, from corresponding International Application No. PCT/US2017/025600.
Written Opinion of the International Searching Authority, dated Jun. 6, 2017, from corresponding International Application No. PCT/US2017/025605.
Written Opinion of the International Searching Authority, dated Mar. 14, 2019, from corresponding International Application No. PCT/US2018/055736.
Written Opinion of the International Searching Authority, dated Mar. 4, 2019, from corresponding International Application No. PCT/US2018/055773.
Written Opinion of the International Searching Authority, dated Mar. 4, 2019, from corresponding International Application No. PCT/US2018/055774.
Written Opinion of the International Searching Authority, dated Nov. 12, 2021, from corresponding International Application No. PCT/US2021/043481.
Written Opinion of the International Searching Authority, dated Nov. 19, 2018, from corresponding International Application No. PCT/US2018/046939.
Written Opinion of the International Searching Authority, dated Nov. 3, 2021, from corresponding International Application No. PCT/US2021/040893.
Written Opinion of the International Searching Authority, dated Nov. 3, 2021, from corresponding International Application No. PCT/US2021/044910.
Written Opinion of the International Searching Authority, dated Oct. 11, 2018, from corresponding International Application No. PCT/US2018/043975.
Written Opinion of the International Searching Authority, dated Oct. 11, 2018, from corresponding International Application No. PCT/US2018/043976.
Written Opinion of the International Searching Authority, dated Oct. 11, 2018, from corresponding International Application No. PCT/US2018/043977.
Written Opinion of the International Searching Authority, dated Oct. 11, 2018, from corresponding International Application No. PCT/US2018/044026.
Written Opinion of the International Searching Authority, dated Oct. 11, 2018, from corresponding International Application No. PCT/US2018/045240.
Written Opinion of the International Searching Authority, dated Oct. 12, 2017, from corresponding International Application No. PCT/US2017/036888.
Written Opinion of the International Searching Authority, dated Oct. 12, 2018, from corresponding International Application No. PCT/US2018/044046.
Written Opinion of the International Searching Authority, dated Oct. 16, 2018, from corresponding International Application No. PCT/US2018/045243.
Written Opinion of the International Searching Authority, dated Oct. 18, 2018, from corresponding International Application No. PCT/US2018/045249.
Written Opinion of the International Searching Authority, dated Oct. 20, 2017, from corresponding International Application No. PCT/US2017/036917.
Written Opinion of the International Searching Authority, dated Oct. 3, 2017, from corresponding International Application No. PCT/US2017/036912.
Written Opinion of the International Searching Authority, dated Sep. 1, 2017, from corresponding International Application No. PCT/US2017/036896.
Written Opinion of the International Searching Authority, dated Sep. 12, 2018, from corresponding International Application No. PCT/US2018/037504.
Written Opinion of the International Searching Authority, dated Sep. 15, 2021, from corresponding International Application No. PCT/US2021/033631.
International Search Report, dated Aug. 15, 2017, from corresponding International Application No. PCT/US2017/036919.
International Search Report, dated Aug. 21, 2017, from corresponding International Application No. PCT/US2017/036914.
International Search Report, dated Aug. 29, 2017, from corresponding International Application No. PCT/US2017/036898.
International Search Report, dated Aug. 8, 2017, from corresponding International Application No. PCT/US2017/036889.
International Search Report, dated Aug. 8, 2017, from corresponding International Application No. PCT/US2017/036890.
International Search Report, dated Aug. 8, 2017, from corresponding International Application No. PCT/US2017/036893.
International Search Report, dated Aug. 8, 2017, from corresponding International Application No. PCT/US2017/036901.
International Search Report, dated Aug. 8, 2017, from corresponding International Application No. PCT/US2017/036913.
International Search Report, dated Aug. 8, 2017, from corresponding International Application No. PCT/US2017/036920.
International Search Report, dated Dec. 14, 2018, from corresponding International Application No. PCT/US2018/045296.
International Search Report, dated Jan. 14, 2019, from corresponding International Application No. PCT/US2018/046949.
International Search Report, dated Jan. 7, 2019, from corresponding International Application No. PCT/US2018/055772.
International Search Report, dated Jun. 21, 2017, from corresponding International Application No. PCT/US2017/025600.
International Search Report, dated Jun. 6, 2017, from corresponding International Application No. PCT/US2017/025605.
International Search Report, dated Jun. 6, 2017, from corresponding International Application No. PCT/US2017/025611.
International Search Report, dated Mar. 14, 2019, from corresponding International Application No. PCT/US2018/055736.
International Search Report, dated Mar. 4, 2019, from corresponding International Application No. PCT/US2018/055773.
International Search Report, dated Mar. 4, 2019, from corresponding International Application No. PCT/US2018/055774.
International Search Report, dated Nov. 12, 2021, from corresponding International Application No. PCT/US2021/043481.
International Search Report, dated Nov. 19, 2018, from corresponding International Application No. PCT/US2018/046939.
International Search Report, dated Nov. 3, 2021, from corresponding International Application No. PCT/US2021/040893.
International Search Report, dated Nov. 3, 2021, from corresponding International Application No. PCT/US2021/044910.
International Search Report, dated Oct. 11, 2018, from corresponding International Application No. PCT/US2018/043975.
International Search Report, dated Oct. 11, 2018, from corresponding International Application No. PCT/US2018/043976.
International Search Report, dated Oct. 11, 2018, from corresponding International Application No. PCT/US2018/043977.
Notice of Allowance, dated Apr. 2, 2019, from corresponding U.S. Appl. No. 16/160,577.
Notice of Allowance, dated Apr. 2, 2021, from corresponding U.S. Appl. No. 17/162,006.
Notice of Allowance, dated Apr. 22, 2021, from corresponding U.S. Appl. No. 17/163,701.
Notice of Allowance, dated Apr. 25, 2018, from corresponding U.S. Appl. No. 15/883,041.
Notice of Allowance, dated Apr. 28, 2021, from corresponding U.S. Appl. No. 17/135,445.

(56) References Cited

OTHER PUBLICATIONS

Notice of Allowance, dated Apr. 28, 2021, from corresponding U.S. Appl. No. 17/181,828.
Notice of Allowance, dated Apr. 29, 2020, from corresponding U.S. Appl. No. 16/700,049.
Notice of Allowance, dated Apr. 30, 2020, from corresponding U.S. Appl. No. 16/565,265.
Notice of Allowance, dated Apr. 30, 2020, from corresponding U.S. Appl. No. 16/820,346.
Notice of Allowance, dated Apr. 30, 2021, from corresponding U.S. Appl. No. 16/410,762.
Notice of Allowance, dated Apr. 8, 2019, from corresponding U.S. Appl. No. 16/228,250.
Notice of Allowance, dated Apr. 8, 2020, from corresponding U.S. Appl. No. 16/791,348.
Notice of Allowance, dated Apr. 9, 2020, from corresponding U.S. Appl. No. 16/791,075.
Notice of Allowance, dated Aug. 10, 2020, from corresponding U.S. Appl. No. 16/671,444.
Notice of Allowance, dated Aug. 10, 2020, from corresponding U.S. Appl. No. 16/788,633.
Notice of Allowance, dated Aug. 12, 2020, from corresponding U.S. Appl. No. 16/719,488.
Notice of Allowance, dated Aug. 12, 2021, from corresponding U.S. Appl. No. 16/881,832.
Notice of Allowance, dated Aug. 14, 2018, from corresponding U.S. Appl. No. 15/989,416.
Notice of Allowance, dated Aug. 18, 2017, from corresponding U.S. Appl. No. 15/619,455.
Notice of Allowance, dated Aug. 20, 2019, from corresponding U.S. Appl. No. 16/241,710.
Notice of Allowance, dated Aug. 24, 2018, from corresponding U.S. Appl. No. 15/619,479.
Notice of Allowance, dated Aug. 26, 2019, from corresponding U.S. Appl. No. 16/443,374.
Notice of Allowance, dated Aug. 26, 2020, from corresponding U.S. Appl. No. 16/808,503.
Notice of Allowance, dated Aug. 28, 2019, from corresponding U.S. Appl. No. 16/278,120.
Notice of Allowance, dated Aug. 30, 2018, from corresponding U.S. Appl. No. 15/996,208.
Notice of Allowance, dated Aug. 31, 2021, from corresponding U.S. Appl. No. 17/326,901.
Notice of Allowance, dated Aug. 4, 2021, from corresponding U.S. Appl. No. 16/895,278.
Notice of Allowance, dated Aug. 7, 2020, from corresponding U.S. Appl. No. 16/901,973.
Notice of Allowance, dated Aug. 9, 2018, from corresponding U.S. Appl. No. 15/882,989.
Notice of Allowance, dated Aug. 9, 2021, from corresponding U.S. Appl. No. 16/881,699.
Notice of Allowance, dated Dec. 10, 2018, from corresponding U.S. Appl. No. 16/105,602.
Notice of Allowance, dated Dec. 11, 2019, from corresponding U.S. Appl. No. 16/278,122.
Notice of Allowance, dated Dec. 11, 2019, from corresponding U.S. Appl. No. 16/593,634.
Notice of Allowance, dated Dec. 12, 2017, from corresponding U.S. Appl. No. 15/169,643.
Notice of Allowance, dated Dec. 12, 2017, from corresponding U.S. Appl. No. 15/619,212.
Notice of Allowance, dated Dec. 12, 2017, from corresponding U.S. Appl. No. 15/619,382.
Notice of Allowance, dated Dec. 13, 2019, from corresponding U.S. Appl. No. 16/512,033.
Notice of Allowance, dated Dec. 15, 2020, from corresponding U.S. Appl. No. 16/989,086.
Notice of Allowance, dated Dec. 16, 2019, from corresponding U.S. Appl. No. 16/505,461.
Notice of Allowance, dated Dec. 17, 2020, from corresponding U.S. Appl. No. 17/034,772.
Notice of Allowance, dated Dec. 18, 2019, from corresponding U.S. Appl. No. 16/659,437.
Notice of Allowance, dated Dec. 23, 2019, from corresponding U.S. Appl. No. 16/656,835.
Notice of Allowance, dated Dec. 23, 2020, from corresponding U.S. Appl. No. 17/068,557.
Notice of Allowance, dated Dec. 3, 2019, from corresponding U.S. Appl. No. 16/563,749.
Notice of Allowance, dated Dec. 31, 2018, from corresponding U.S. Appl. No. 16/159,634.
Notice of Allowance, dated Dec. 31, 2019, from corresponding U.S. Appl. No. 16/404,399.
Notice of Allowance, dated Dec. 4, 2019, from corresponding U.S. Appl. No. 16/594,670.
Notice of Allowance, dated Dec. 5, 2017, from corresponding U.S. Appl. No. 15/633,703.
Notice of Allowance, dated Dec. 6, 2017, from corresponding U.S. Appl. No. 15/619,451.
Notice of Allowance, dated Dec. 6, 2017, from corresponding U.S. Appl. No. 15/619,459.
Regulation (EU) 2016/679, "On the protection of natural persons with regard to the processing of personal data and on the free movement of such data, and repealing Directive 95/46/EC (General Data Protection Regulation)," Dfficial Journal of the European Union, May 4, 2016, pp. L 119/1-L 119/88 (Year: 2016).
Roesner et al, "Detecting and Defending Against Third-Party Tracking on the Web," 9th USENIX Symposium on Networked Systems Design and Implementation, Apr. 11, 2013, pp. 1-14, ACM (Year: 2013).
Rozepz, "What is Google Privacy Checkup? Everything You Need to Know," Tom's Guide web post, Apr. 26, 2018, pp. 1-11 (Year: 2018).
Salim et al, "Data Retrieval and Security using Lightweight Directory Access Protocol", IEEE, pp. 685-688 (Year: 2009).
Santhisree, et al, "Web Usage Data Clustering Using Dbscan Algorithm and Set Similarities," IEEE, pp. 220-224 (Year: 2010).
Sanzo et al, "Analytical Modeling of Lock-Based Concurrency Control with Arbitrary Transaction Data Access Patterns," ACM, pp. 69-78 (Year: 2010).
Schwartz, Edward J., et al, 2010 IEEE Symposium on Security and Privacy: All You Ever Wanted to Know About Dynamic Analysis and forward Symbolic Execution (but might have been afraid to ask), Carnegie Mellon University, EEE Computer Society, 2010, pp. 317-331.
Sedinic et al, "Security Risk Management in Complex Organization," May 29, 2015, IEEE, pp. 1331-1337 (Year: 2015).
Singh, et al, "A Metadata Catalog Service for Data Intensive Applications," ACM, pp. 1-17 (Year: 2003).
Slezak, et al, "Brighthouse: An Analytic Data Warehouse for Ad-hoc Queries," ACM, pp. 1337-1345 (Year: 2008).
Soceanu, et al, "Managing the Privacy and Security of eHealth Data," May 29, 2015, IEEE, pp. 1-8 (Year: 2015).
Srinivasan et al, "Descriptive Data Analysis of File Transfer Data," ACM, pp. 1-8 (Year: 2014).
Srivastava, Agrima, et al, Measuring Privacy Leaks in Online Social Networks, International Conference on Advances in Computing, Communications and Informatics (ICACCI), 2013.
Stack Overflow, "Is there a way to force a user to scroll to the bottom of a div?," Stack Overflow, pp. 1-11, Nov. 2013. [Online], Available: https://stackoverflow.com/questions/2745935/is-there-a-way-to-force-a-user-to-scroll-to-the-bottom-of-a-div (Year: 2013).
Stern, Joanna, "iPhone Privacy Is Broken . . . and Apps Are to Blame", The Wall Street Journal, wsj.com, May 31, 2019.
Strodl, et al, "Personal & SOHO Archiving," Vienna University of Technology, Vienna, Austria, JCDL '08, Jun. 16-20, 2008, Pittsburgh, Pennsylvania, USA, pp. 115-123 (Year: 2008).
Sukumar et al, "Review on Modern Data Preprocessing Techniques in Web Usage Mining (WUM)," IEEE, 2016, pp. 34-69 (Year: 2016).

(56) References Cited

OTHER PUBLICATIONS

Symantec, Symantex Data Loss Prevention—Discover, monitor, and protect confidential data; 2008; Symantec Corporation; http://www.mssuk.com/images/Symantec%2014552315_IRC_BR_DLP_03.09_sngl.pdf.
Fanasa et al, "Advanced Data Preprocessing for Intersites Web Usage Mining," IEEE, Mar. 2004, pp. 59-65 (Year: 2004).
Fanwar, et al, "Live Forensics Analysis: Violations of Business Security Policy," 2014 International Conference on Contemporary Computing and Informatics (IC31), 2014, pp. 971-976 (Year: 2014).
The Cookie Collective, Optanon Cookie Policy Generator, The Cookie Collective, Year 2016, http://web.archive.org/web/20160324062743/https:/optanon.com/.
Thuraisingham, "Security Issues for the Semantic Web," Proceedings 27th Annual International Computer Software and Applications Conference, COMPSAC 2003, Dallas, TX, USA, 2003, pp. 633-638 (Year: 2003).
TRUSTe Announces General Availability of Assessment Manager for Enterprises to Streamline Data Privacy Management with Automation, PRNewswire, Mar. 4, 2015.
Tsai et al, "Determinants of Intangible Assets Value: The Data Mining Approach," Knowledge Based System, pp. 67-77 http://www.elsevier.com/locate/knosys (Year: 2012).
Tuomas Aura et al, Scanning Electronic Documents for Personally Identifiable Information, ACM, 2006-10-30, retrieved online on Jun. 13, 2019, pp. 41-49. Retrieved from the Internet: URL: http://delivery.acm.org/10.1145/1180000/1179608Zp41-aura.pdf? (Year: 2006).
Van Eijk et al, "The Impact of User Location on Cookie Notices (Inside and Outside of the European Union," IEEE Security & Privacy Workshop on Technology and Consumer Protection (CONPRO '19), Jan. 1, 2019 (Year: 2019).
Wang et al, "Revealing Key Non-Financial Factors for Online Credit-Scoring in E-Financing," 2013, IEEE, pp. 1-6 (Year: 2013).
Wang et al, "Secure and Efficient Access to Outsourced Data," ACM, pp. 55-65 (Year: 2009).
Weaver et al, "Understanding Information Preview in Mobile Email Processing", ACM, pp. 303-312, 2011 (Year: 2011).
Wu et al, "Data Mining with Big Data," IEEE, Jan. 2014, pp. 97-107, vol. 26, No. 1, (Year: 2014).
www.truste.com (1), 200150207, Internet Archive Wayback Machine, www.archive.org, Feb. 7, 2015.
Xu, et al, "GatorShare: A File System Framework for High-Throughput Data Management," ACM, pp. 776-786 (Year: 2010).
Yang et al., "DAC-MACS: Effective Data Access Control for Multiauthority Cloud Storage Systems," IEEE, pp. 1790-1801 (Year: 2013).
Yang et al., "Mining Web Access Sequence with Improved Apriori Algorithm," IEEE, 2017, pp. 780-784 (Year: 2017).
Ye et al., "An Evolution-Based Cache Scheme for Scalable Mobile Data Access," ACM, pp. 1-7 (Year: 2007).
Yin et al., "Multibank Memory Optimization for Parallel Data Access in Multiple Data Arrays", ACM, pp. 1-8 (Year: 2016).
Mu et al., "Outsourced Similarity Search on Metric Data Assets", IEEE, pp. 338-352 (Year: 2012).
Yu, "Using Data from Social Media Websites to Inspire the Design of Assistive Technology", ACM, pp. 1-2 (Year: 2016).
Yu, et al., "Performance and Fairness Issues in Big Data Transfers," ACM, pp. 9-11 (Year: 2014).
Zannone, et al., "Maintaining Privacy on Derived Objects," ACM, pp. 10-19 (Yean 2005).
Zeldovich, Nickolai, et al., Making Information Flow Explicit in HiStar, OSDI '06: 7th USENIX Symposium on Dperating Systems Design and Implementation, USENIX Association, p. 263-278.
Zhang et al., "Data Transfer Performance Issues for a Web Services Interface to Synchrotron Experiments", ACM, pp. 59-65 (Year: 2007).
Zhang et al., "Dynamic Topic Modeling for Monitoring Market Competition from Online Text and Image Data", ACM, pp. 1425-1434 (Year: 2015).
Zheng, et al., "Methodologies for Cross-Domain Data Fusion: An Overview," IEEE, pp. 16-34 (Year: 2015).
Zheng, et al., "Toward Assured Data Deletion in Cloud Storage," IEEE, vol. 34, No. 3, pp. 101-107 May/Jun. 2020 (Year: 2020).
Zhu, et al., "Dynamic Data Integration Using Web Services," IEEE, pp. 1-8 (Year: 2004).
Notice of Allowance, dated December?, 2020, from corresponding U.S. Appl. No. 16/817,136.
Notice of Allowance, dated Dec. 9, 2019, from corresponding U.S. Appl. No. 16/565,261.
Notice of Allowance, dated Dec. 9, 2020, from corresponding U.S. Appl. No. 16/404,491.
Notice of Allowance, dated Feb. 10, 2020, from corresponding U.S. Appl. No. 16/552,765.
Notice of Allowance, dated Feb. 11, 2021, from corresponding U.S. Appl. No. 17/086,732.
Notice of Allowance, dated Feb. 12, 2020, from corresponding U.S. Appl. No. 16/572,182.
Notice of Allowance, dated Feb. 13, 2019, from corresponding U.S. Appl. No. 16/041,563.
Notice of Allowance, dated Feb. 14, 2019, from corresponding U.S. Appl. No. 16/226,272.
Notice of Allowance, dated Feb. 19, 2019, from corresponding U.S. Appl. No. 16/159,632.
Notice of Allowance, dated Feb. 19, 2021, from corresponding U.S. Appl. No. 16/832,451.
Notice of Allowance, dated Feb. 24, 2021, from corresponding U.S. Appl. No. 17/034,355.
Notice of Allowance, dated Feb. 24, 2021, from corresponding U.S. Appl. No. 17/068,198.
Notice of Allowance, dated Feb. 24, 2021, from corresponding U.S. Appl. No. 17/101,106.
Notice of Allowance, dated Feb. 24, 2021, from corresponding U.S. Appl. No. 17/101,253.
Notice of Allowance, dated Feb. 25, 2020, from corresponding U.S. Appl. No. 16/714,355.
Notice of Allowance, dated Feb. 25, 2021, from corresponding U.S. Appl. No. 17/106,469.
Notice of Allowance, dated Feb. 26, 2021, from corresponding U.S. Appl. No. 17/139,650.
Notice of Allowance, dated Feb. 27, 2019, from corresponding U.S. Appl. No. 16/041,468.
Notice of Allowance, dated Feb. 27, 2019, from corresponding U.S. Appl. No. 16/226,290.
Notice of Allowance, dated Feb. 3, 2021, from corresponding U.S. Appl. No. 16/827,039.
Notice of Allowance, dated Feb. 3, 2021, from corresponding U.S. Appl. No. 17/068,558.
Notice of Allowance, dated Jan. 1, 2021, from corresponding U.S. Appl. No. 17/026,727.
Notice of Allowance, dated Jan. 14, 2020, from corresponding U.S. Appl. No. 16/277,715.
Notice of Allowance, dated Jan. 15, 2021, from corresponding U.S. Appl. No. 17/030,714.
Notice of Allowance, dated Jan. 18, 2018, from corresponding U.S. Appl. No. 15/619,478.
Notice of Allowance, dated Jan. 18, 2019 from corresponding U.S. Appl. No. 16/159,635.
Notice of Allowance, dated Jan. 2, 2020, from corresponding U.S. Appl. No. 16/410,296.
Notice of Allowance, dated Jan. 23, 2018, from corresponding U.S. Appl. No. 15/619,251.
Notice of Allowance, dated Jan. 25, 2021, from corresponding U.S. Appl. No. 16/410,336.
Notice of Allowance, dated Jan. 26, 2018, from corresponding U.S. Appl. No. 15/619,469.
Notice of Allowance, dated Jan. 29, 2020, from corresponding U.S. Appl. No. 16/278,119.
Notice of Allowance, dated Jan. 6, 2021, from corresponding U.S. Appl. No. 16/595,327.
Notice of Allowance, dated Jan. 8, 2020, from corresponding U.S. Appl. No. 16/600,879.

(56) References Cited

OTHER PUBLICATIONS

Notice of Allowance, dated Jul. 10, 2019, from corresponding U.S. Appl. No. 16/237,083.
Notice of Allowance, dated Jul. 10, 2019, from corresponding U.S. Appl. No. 16/403,358.
Notice of Allowance, dated Jul. 12, 2019, from corresponding U.S. Appl. No. 16/278,121.
Notice of Allowance, dated Jul. 14, 2020, from corresponding U.S. Appl. No. 16/701,043.
Notice of Allowance, dated Jul. 15, 2020, from corresponding U.S. Appl. No. 16/791,006.
Notice of Allowance, dated Jul. 16, 2020, from corresponding U.S. Appl. No. 16/901,979.
Notice of Allowance, dated Jul. 17, 2019, from corresponding U.S. Appl. No. 16/055,961.
Notice of Allowance, dated Jul. 17, 2020, from corresponding U.S. Appl. No. 16/778,709.
Notice of Allowance, dated Jul. 19, 2021, from corresponding U.S. Appl. No. 17/306,252.
Notice of Allowance, dated Jul. 21, 2020, from corresponding U.S. Appl. No. 16/557,392.
Notice of Allowance, dated Jul. 23, 2019, from corresponding U.S. Appl. No. 16/220,978.
Notice of Allowance, dated Jul. 26, 2019, from corresponding U.S. Appl. No. 16/409,673.
Notice of Allowance, dated Jul. 26, 2021, from corresponding U.S. Appl. No. 17/151,399.
Notice of Allowance, dated Jul. 26, 2021, from corresponding U.S. Appl. No. 17/207,316.
Notice of Allowance, dated Jul. 31, 2019, from corresponding U.S. Appl. No. 16/221,153.
Notice of Allowance, dated Jul. 8, 2021, from corresponding U.S. Appl. No. 17/201,040.
Notice of Allowance, dated Jun. 1, 2020, from corresponding U.S. Appl. No. 16/813,321.
Notice of Allowance, dated Sep. 24, 2021, from corresponding U.S. Appl. No. 17/334,939.
Notice of Allowance, dated Sep. 25, 2020, from corresponding U.S. Appl. No. 16/983,536.
Notice of Allowance, dated Sep. 27, 2017, from corresponding U.S. Appl. No. 15/626,052.
Notice of Allowance, dated Sep. 27, 2021, from corresponding U.S. Appl. No. 17/222,523.
Notice of Allowance, dated Sep. 28, 2018, from corresponding U.S. Appl. No. 16/041,520.
Notice of Allowance, dated Sep. 29, 2021, from corresponding U.S. Appl. No. 17/316,179.
Notice of Allowance, dated Sep. 4, 2018, from corresponding U.S. Appl. No. 15/883,041.
Notice of Allowance, dated Sep. 4, 2020, from corresponding U.S. Appl. No. 16/808,500.
Notice of Allowance, dated Sep. 4, 2020, from corresponding U.S. Appl. No. 16/901,662.
Notice of Allowance, dated Sep. 9, 2021, from corresponding U.S. Appl. No. 17/334,909.
Restriction Requirement, dated Apr. 10, 2019, from corresponding U.S. Appl. No. 16/277,715.
Restriction Requirement, dated Apr. 13, 2020, from corresponding U.S. Appl. No. 16/817,136.
Restriction Requirement, dated Apr. 24, 2019, from corresponding U.S. Appl. No. 16/278,122.
Restriction Requirement, dated Aug. 7, 2019, from corresponding U.S. Appl. No. 16/410,866.
Restriction Requirement, dated Aug. 9, 2019, from corresponding U.S. Appl. No. 16/404,399.
Restriction Requirement, dated Dec. 31, 2018, from corresponding U.S. Appl. No. 15/169,668.
Restriction Requirement, dated Dec. 9, 2019, from corresponding U.S. Appl. No. 16/565,395.
Restriction Requirement, dated Jan. 18, 2017, from corresponding U.S. Appl. No. 15/256,430.
Restriction Requirement, dated Jul. 28, 2017, from corresponding U.S. Appl. No. 15/169,658.
Restriction Requirement, dated Jun. 15, 2021, from corresponding U.S. Appl. No. 17/187,329.
Restriction Requirement, dated Jun. 15, 2021, from corresponding U.S. Appl. No. 17/222,556.
Restriction Requirement, dated Jun. 9, 2021, from corresponding U.S. Appl. No. 17/222,725.
Restriction Requirement, dated May 5, 2020, from corresponding U.S. Appl. No. 16/808,489.
Restriction Requirement, dated Nov. 10, 2021, from corresponding U.S. Appl. No. 17/366,754.
Restriction Requirement, dated Nov. 15, 2019, from corresponding U.S. Appl. No. 16/586,202.
Restriction Requirement, dated Nov. 21, 2016, from corresponding U.S. Appl. No. 15/254,901.
Restriction Requirement, dated Nov. 5, 2019, from corresponding U.S. Appl. No. 16/563,744.
Restriction Requirement, dated Oct. 17, 2018, from corresponding U.S. Appl. No. 16/055,984.
Restriction Requirement, dated Oct. 6, 2021, from corresponding U.S. Appl. No. 17/340,699.
Restriction Requirement, dated Sep. 15, 2020, from corresponding U.S. Appl. No. 16/925,628.
Restriction Requirement, dated Sep. 9, 2019, from corresponding U.S. Appl. No. 16/505,426.
Advisory Action, dated Jan. 13, 2021, from corresponding U.S. Appl. No. 16/808,493.
Advisory Action, dated Jan. 13, 2021, from corresponding U.S. Appl. No. 16/862,944.
Advisory Action, dated Jan. 13, 2021, from corresponding U.S. Appl. No. 16/862,948.
Advisory Action, dated Jan. 13, 2021, from corresponding U.S. Appl. No. 16/862,952.
Advisory Action, dated Jan. 6, 2021, from corresponding U.S. Appl. No. 16/808,497.
Advisory Action, dated Jun. 19, 2020, from corresponding U.S. Appl. No. 16/595,342.
Advisory Action, dated Jun. 2, 2020, from corresponding U.S. Appl. No. 16/404,491.
Advisory Action, dated May 21, 2020, from corresponding U.S. Appl. No. 16/557,392.
Written Opinion of the International Searching Authority, dated Jun. 6, 2017, from corresponding International Application No. PCT/US2017/025611.
Written Opinion of the International Searching Authority, dated Aug. 15, 2017, from corresponding International Application No. PCT/US2017/036919.
Written Opinion of the International Searching Authority, dated Aug. 21, 2017, from corresponding International Application No. PCT/US2017/036914.
Written Opinion of the International Searching Authority, dated Aug. 29, 2017, from corresponding International Application No. PCT/US2017/036898.
Written Opinion of the International Searching Authority, dated Aug. 8, 2017, from corresponding International Application No. PCT/US2017/036889.
Written Opinion of the International Searching Authority, dated Aug. 8, 2017, from corresponding International Application No. PCT/US2017/036890.
Written Opinion of the International Searching Authority, dated Aug. 8, 2017, from corresponding International Application No. PCT/US2017/036893.
Written Opinion of the International Searching Authority, dated Aug. 8, 2017, from corresponding International Application No. PCT/US2017/036901.
Written Opinion of the International Searching Authority, dated Aug. 8, 2017, from corresponding International Application No. PCT/US2017/036913.

(56) References Cited

OTHER PUBLICATIONS

Written Opinion of the International Searching Authority, dated Aug. 8, 2017, from corresponding International Application No. PCT/US2017/036920.
Written Opinion of the International Searching Authority, dated Dec. 14, 2018, from corresponding International Application No. PCT/US2018/045296.

* cited by examiner

PRIVACY MANAGEMENT SYSTEMS AND METHODS

CROSS-REFERENCE TO RELATED APPLICATIONS

This application is a continuation of U.S. patent application Ser. No. 17/306,252, filed May 3, 2021, which is a continuation-in-part of U.S. patent application Ser. No. 17/026,727, filed Sep. 21, 2020, now U.S. Pat. No. 10,997, 542, issued May 4, 2021, which is a continuation of U.S. patent application Ser. No. 16/808,496, filed Mar. 4, 2020, now U.S. Pat. No. 10,796,260, issued Oct. 6, 2020, which claims priority from U.S. Provisional Patent Application Ser. No. 62/813,584, filed Mar. 4, 2019, and is also a continuation-in-part of U.S. patent application Ser. No. 16/714,355, filed Dec. 13, 2019, now U.S. Pat. No. 10,692,033, issued Jun. 23, 2020, which is a continuation of U.S. patent application Ser. No. 16/403,358, filed May 3, 2019, now U.S. Pat. No. 10,510,031, issued Dec. 17, 2019, which is a continuation of U.S. patent application Ser. No. 16/159,634, filed Oct. 13, 2018, now U.S. Pat. No. 10,282,692, issued May 7, 2019, which claims priority from U.S. Provisional Patent Application Ser. No. 62/572,096, filed Oct. 13, 2017 and U.S. Provisional Patent Application Ser. No. 62/728, 435, filed Sep. 7, 2018, and is also a continuation-in-part of U.S. patent application Ser. No. 16/055,083, filed Aug. 4, 2018, now U.S. Pat. No. 10,289,870, issued May 14, 2019, which claims priority from U.S. Provisional Patent Application Ser. No. 62/547,530, filed Aug. 18, 2017, and is also a continuation-in-part of U.S. patent application Ser. No. 15/996,208, filed Jun. 1, 2018, now U.S. Pat. No. 10,181, 051, issued Jan. 15, 2019, which claims priority from U.S. Provisional Patent Application Ser. No. 62/537,839, filed Jul. 27, 2017, and is also a continuation-in-part of U.S. patent application Ser. No. 15/853,674, filed Dec. 22, 2017, now U.S. Pat. No. 10,019,597, issued Jul. 10, 2018, which claims priority from U.S. Provisional Patent Application Ser. No. 62/541,613, filed Aug. 4, 2017, and is also a continuation-in-part of U.S. patent application Ser. No. 15/619,455, filed Jun. 10, 2017, now U.S. Pat. No. 9,851,966, issued Dec. 26, 2017, which is a continuation-in-part of U.S. patent application Ser. No. 15/254,901, filed Sep. 1, 2016, now U.S. Pat. No. 9,729,583, issued Aug. 8, 2017, which claims priority from: (1) U.S. Provisional Patent Application Ser. No. 62/360,123, filed Jul. 8, 2016; (2) U.S. Provisional Patent Application Ser. No. 62/353,802, filed Jun. 23, 2016; and (3) U.S. Provisional Patent Application Ser. No. 62/348, 695, filed Jun. 10, 2016. The disclosures of all of the above patent applications are hereby incorporated herein by reference in their entirety.

TECHNICAL FIELD

This disclosure relates to a data processing system and methods for retrieving data regarding a plurality of privacy campaigns, and for using that data to assess a relative risk associated with the data privacy campaign, provide an audit schedule for each campaign, and electronically display campaign information.

BACKGROUND

Over the past years, privacy and security policies, and related operations have become increasingly important. Breaches in security, leading to the unauthorized access of personal data (which may include sensitive personal data) have become more frequent among companies and other organizations of all sizes. Such personal data may include, but is not limited to, personally identifiable information (PII), which may be information that directly (or indirectly) identifies an individual or entity. Examples of PII include names, addresses, dates of birth, social security numbers, and biometric identifiers such as a person's fingerprints or picture. Other personal data may include, for example, customers' Internet browsing habits, purchase history, or even their preferences (e.g., likes and dislikes, as provided or obtained through social media).

Many organizations that obtain, use, and transfer personal data, including sensitive personal data, have begun to address these privacy and security issues. To manage personal data, many companies have attempted to implement operational policies and processes that comply with legal requirements, such as Canada's Personal Information Protection and Electronic Documents Act (PIPEDA) or the U.S.'s Health Insurance Portability and Accountability Act (HIPPA) protecting a patient's medical information. Many regulators recommend conducting privacy impact assessments, or data protection risk assessments along with data inventory mapping. For example, the GDPR requires data protection impact assessments. Additionally, the United Kingdom ICO's office provides guidance around privacy impact assessments. The OPC in Canada recommends certain personal information inventory practices, and the Singapore PDPA specifically mentions personal data inventory mapping.

In implementing these privacy impact assessments, an individual may provide incomplete or incorrect information regarding personal data to be collected, for example, by new software, a new device, or a new business effort, for example, to avoid being prevented from collecting that personal data, or to avoid being subject to more frequent or more detailed privacy audits. In light of the above, there is currently a need for improved systems and methods for monitoring compliance with corporate privacy policies and applicable privacy laws in order to reduce a likelihood that an individual will successfully "game the system" by providing incomplete or incorrect information regarding current or future uses of personal data.

Organizations that obtain, use, and transfer personal data often work with other organizations ("vendors") that provide services and/or products to the organizations. Organizations working with vendors may be responsible for ensuring that any personal data to which their vendors may have access is handled properly. However, organizations may have limited control over vendors and limited insight into their internal policies and procedures. Therefore, there is currently a need for improved systems and methods that help organizations ensure that their vendors handle personal data properly.

SUMMARY

A computer-implemented data processing method for monitoring one or more system inputs as input of information related to a privacy campaign, according to various embodiments, comprises: (A) actively monitoring, by one or more processors, one or more system inputs from a user as the user provides information related to a privacy campaign, the one or more system inputs comprising one or more submitted inputs and one or more unsubmitted inputs, wherein actively monitoring the one or more system inputs comprises: (1) recording a first keyboard entry provided within a graphical user interface that occurs prior to submission of the one or more system inputs by the user, and (2)

recording a second keyboard entry provided within the graphical user interface that occurs after the user inputs the first keyboard entry and before the user submits the one or more system inputs; (B) storing, in computer memory, by one or more processors, an electronic record of the one or more system inputs; (C) analyzing, by one or more processors, the one or more submitted inputs and one or more unsubmitted inputs to determine one or more changes to the one or more system inputs prior to submission, by the user, of the one or more system inputs, wherein analyzing the one or more submitted inputs and the one or more unsubmitted inputs to determine the one or more changes to the one or more system inputs comprises comparing the first keyboard entry with the second keyboard entry to determine one or more differences between the one or more submitted inputs and the one or more unsubmitted inputs, wherein the first keyboard entry is an unsubmitted input and the second keyboard entry is a submitted input; (D) determining, by one or more processors, based at least in part on the one or more system inputs and the one or more changes to the one or more system inputs, whether the user has provided one or more system inputs comprising one or more abnormal inputs; and (E) at least partially in response to determining that the user has provided one or more abnormal inputs, automatically flagging the one or more system inputs that comprise the one or more abnormal inputs in memory.

A computer-implemented data processing method for monitoring a user as the user provides one or more system inputs as input of information related to a privacy campaign, in various embodiments, comprises: (A) actively monitoring, by one or more processors, (i) a user context of the user as the user provides the one or more system inputs as information related to the privacy campaign and (ii) one or more system inputs from the user, the one or more system inputs comprising one or more submitted inputs and one or more unsubmitted inputs, wherein actively monitoring the user context and the one or more system inputs comprises recording a first user input provided within a graphical user interface that occurs prior to submission of the one or more system inputs by the user, and recording a second user input provided within the graphical user interface that occurs after the user inputs the first user input and before the user submits the one or more system input; (B) storing, in computer memory, by one or more processors, an electronic record of user context of the user and the one or more system inputs from the user; (C) analyzing, by one or more processors, at least one item of information selected from a group consisting of (i) the user context and (ii) the one or more system inputs from the user to determine whether abnormal user behavior occurred in providing the one or more system inputs, wherein determining whether the abnormal user behavior occurred in providing the one or more system inputs comprises comparing the first user input with the second user input to determine one or more differences between the one or more submitted inputs and the one or more unsubmitted inputs, wherein the first user input is an unsubmitted input and the second user input is a submitted input; and (D) at least partially in response to determining that abnormal user behavior occurred in providing the one or more system inputs, automatically flagging, in memory, at least a portion of the provided one or more system inputs in which the abnormal user behavior occurred.

A computer-implemented data processing method for monitoring a user as the user provides one or more system inputs as input of information related to a privacy campaign, in various embodiments, comprises: (A) actively monitoring, by one or more processors, a user context of the user as the user provides the one or more system inputs, the one or more system inputs comprising one or more submitted inputs and one or more unsubmitted inputs, wherein actively monitoring the user context of the user as the user provides the one more system inputs comprises recording a first user input provided within a graphical user interface that occurs prior to submission of the one or more system inputs by the user, and recording a second user input provided within the graphical user interface that occurs after the user provides the first user input and before the user submits the one or more system inputs, wherein the user context comprises at least one user factor selected from a group consisting of: (i) an amount of time the user takes to provide the one or more system inputs, (ii) a deadline associated with providing the one or more system inputs, (iii) a location of the user as the user provides the one or more system inputs; and (iv) one or more electronic activities associated with an electronic device on which the user is providing the one or more system inputs; (B) storing, in computer memory, by one or more processors, an electronic record of the user context of the user; (C) analyzing, by one or more processors, the user context, based at least in part on the at least one user factor, to determine whether abnormal user behavior occurred in providing the one or more system inputs, wherein determining whether the abnormal user behavior occurred in providing the one or more system inputs comprises comparing the first user input with the second user input to determine one or more differences between the first user input and the second user input, wherein the first user input is an unsubmitted input and the second user input is a submitted input; and (D) at least partially in response to determining that abnormal user behavior occurred in providing the one or more system inputs, automatically flagging, in memory, at least a portion of the provided one or more system inputs in which the abnormal user behavior occurred.

A computer-implemented data processing method for scanning one or more webpages to determine vendor risk, in various embodiments, comprises: (A) scanning, by one or more processors, one or more webpages associated with a vendor; (B) identifying, by one or more processors, one or more vendor attributes based on the scan; (C) calculating a vendor risk score based at least in part on the one or more vendor attributes; and (D) taking one or more automated actions based on the vendor risk rating.

A computer-implemented data processing method for generating an incident notification for a vendor, according to particular embodiments, comprises: receiving, by one or more processors, an indication of a particular incident; determining, by one or more processors based on the indication of the particular incident, one or more attributes of the particular incident; determining, by one or more processors based on the one or more attributes of the particular incident, a vendor associated with the particular incident; determining, by one or more processors based on the vendor associated with the particular incident, a notification obligation for the vendor associated with the particular incident; generating, by one or more processors in response to determining the notification obligation, a task associated with satisfying the notification obligation; presenting, by one or more processors on a graphical user interface, an indication of the task associated with satisfying the notification obligation; detecting, by one or more processors on a graphical user interface, a selection of the indication of the task associated with satisfying the notification obligation; and presenting, by one or more processors on a graphical user interface, detailed information associated with the task associated with satisfying the notification obligation.

In various embodiments, determining the attributes of the particular incident comprises determining a region or country associated with the particular incident. In various embodiments, a data processing method for generating an incident notification for a vendor may include determining the attributes of the particular incident comprises determining a method by which the indication of the particular incident was generated. In various embodiments, generating at least one additional task based at least in part on the indication of the particular incident. In various embodiments, determining the notification obligation for the vendor associated with the particular incident comprises analyzing one or more documents defining one or more obligations to the vendor and based on analyzing the one or more documents, determining the notification obligation for the vendor associated with the particular incident. In various embodiments, analyzing the one or more documents defining the one or more obligations to the vendor comprises using one or more natural language processing techniques to identify particular terms in the one or more documents. In various embodiments, a data processing method for generating an incident notification for a vendor may include determining, based on the notification obligation, a timeframe within which the notification of the particular incident is to be provided to the vendor. In various embodiments, presenting the detailed information associated with the task associated with satisfying the notification obligation comprises: generating an interface comprising a user-selectable object associated with an indication of satisfaction of the notification obligation; receiving an indication of a selection of the user-selectable object; and responsive to receiving the indication of the selection of the user-selectable object, storing an indication of the satisfaction of the notification obligation. In various embodiments, a data processing method for generating an incident notification for a vendor may include analyzing one or more documents defining one or more obligations to the vendor, wherein the interface further comprises a description of at least a subset of the one or more obligations to the vendor. In various embodiments, determining the attributes of the particular incident comprises determining one or more assets associated with the particular incident.

A data processing incident notification generation system, according to particular embodiments, comprises: one or more processors; computer memory; and a computer-readable medium storing computer-executable instructions that, when executed by the one or more processors, cause the one or more processors to perform operations comprising: receiving an indication of a particular incident; determining attributes of the particular incident; determining a plurality of entities associated with the particular incident; determining a vendor from among the plurality of entities associated with the particular incident; analyzing one or more documents defining one or more obligations to the vendor; based on analyzing the one or more documents, determining a notification obligation for the vendor; generating a task associated with the notification obligation for the vendor; and presenting, to a user on a graphical user interface, a user-selectable indication of the task associated with the notification obligation for the vendor.

In various embodiments, a data processing incident notification generation system may perform operations comprising analyzing the attributes of the particular incident to determine a risk level associated with the particular incident, wherein determining the notification obligation for the vendor is further based on the risk level associated with the particular incident. In various embodiments, a data processing incident notification generation system may perform operations comprising analyzing the attributes of the particular incident to determine a scope of the particular incident, wherein determining the notification obligation for the vendor is further based on the scope of the particular incident. In various embodiments, a data processing incident notification generation system may perform operations comprising analyzing the attributes of the particular incident to determine one or more affected assets associated with the particular incident, wherein determining the notification obligation for the vendor is further based on the one or more affected assets associated with the particular incident. In various embodiments, a data processing incident notification generation system may perform operations comprising detecting a selection of the user-selectable indication of the task associated with the notification obligation for the vendor; in response to detecting the selection of the user-selectable indication of the task, presenting a user-selectable indication of task completion; detecting a selection of the user-selectable indication of task completion; and in response to detecting the selection of the user-selectable indication of task completion, storing an indication that the notification obligation for the vendor is satisfied. In various embodiments, presenting the user-selectable indication of the task associated with the notification obligation for the vendor comprises presenting, to the user on the graphical user interface: a name of the task associated with the notification obligation for the vendor; a status of the task associated with the notification obligation for the vendor; and a deadline to complete the task associated with the notification obligation for the vendor. In various embodiments, presenting the user-selectable indication of the task associated with the notification obligation for the vendor comprises presenting, to the user on the graphical user interface, a listing of a plurality of user-selectable indications of tasks, wherein each task of the plurality of user-selectable indications of tasks is associated with a respective, distinct vendor. In various embodiments, a data processing incident notification generation system may perform operations comprising: detecting a selection of the user-selectable indication of the task associated with the notification obligation for the vendor; and, in response to detecting the selection of the user-selectable indication of the task, presenting detailed information associated with the notification obligation for the vendor. In various embodiments, the detailed information associated with the notification obligation for the vendor comprises regulatory information. In various embodiments, the detailed information associated with the notification obligation for the vendor comprises vendor response information.

A computer-implemented data processing method for determining vendor privacy standard compliance, according to particular embodiments, comprises: receiving, by one or more processors, vendor information associated with the particular vendor; receiving, by one or more processors, vendor assessment information associated with the particular vendor; obtaining, by one or more processors based on the vendor information associated with the particular vendor, publicly available privacy-related information associated with the particular vendor; calculating, by one or more processors based at least in part on the vendor information associated with the particular vendor, the vendor assessment information associated with the particular vendor, and the publicly available privacy-related information associated with the particular vendor, a risk score for the particular vendor; determining, by one or more processors based at least in part on the vendor information associated with the particular vendor, the vendor assessment information associated with the particular vendor, and the publicly available privacy-related information associated with the particular vendor, additional privacy-related information associated with the particular vendor; and presenting, by one or more processors on a graphical user interface: the risk score for the particular vendor, at least a subset of the vendor information associated with the particular vendor, and at least a subset of the additional privacy-related information associated with the particular vendor.

In various embodiments, obtaining the publicly available privacy-related information associated with the particular vendor comprises scanning one or more webpages associated with the particular vendor and identifying one or more pieces of privacy-related information associated with the particular vendor based on the scan. In various embodiments, the publicly available privacy-related information associated with the particular vendor comprises one or more pieces of privacy-related information associated with the particular vendor selected from a group consisting of: (1) one or more security certifications; (2) one or more awards; (3) one or more recognitions; (4) one or more security policies; (5) one or more privacy policies; (6) one or more cookie policies; (7) one or more partners; and (8) one or more sub-processors. In various embodiments, the publicly available privacy-related information associated with the particular vendor comprises one or more webpages operated by the particular vendor. In various embodiments, the publicly available privacy-related information associated with the particular vendor comprises one or more webpages operated by a third-party that is not the particular vendor. In various embodiments, the vendor information associated with the particular vendor comprises one or more documents, and wherein a method for determining vendor privacy standard compliance may include analyzing the one or more documents using one or more natural language processing techniques to identify particular terms in the one or more documents. In various embodiments, calculating the risk score for the particular vendor is further based, at least in part, on the particular terms in the one or more documents.

A data processing vendor compliance system according to particular embodiments, comprises: one or more processors; computer memory; and a computer-readable medium storing computer-executable instructions that, when executed by the one or more processors, cause the one or more processors to perform operations comprising: detecting, on a first graphical user interface, a selection of a user-selectable control associated with a particular vendor; retrieving, from a vendor information database, vendor information associated with the particular vendor; obtaining, based on the vendor information associated with the particular vendor, publicly available privacy-related information associated with the particular vendor; calculating, based at least in part on the vendor information associated with the particular vendor and the publicly available privacy-related information associated with the particular vendor, a vendor risk score for the particular vendor; determining, based at least in part on the vendor information associated with the particular vendor and the publicly available privacy-related information associated with the particular vendor, additional privacy-related information associated with the particular vendor; storing, in the vendor information database, the vendor risk score for the particular vendor and the additional privacy-related information associated with the particular vendor; and presenting, by one or more processors on a graphical user interface, the vendor risk score for the particular vendor and the additional privacy-related information associated with the particular vendor.

In various embodiments, a data processing vendor compliance system may perform operations that include: detecting a selection of a user-selectable control for adding the new vendor on a second graphical user interface; responsive to detecting the selection of the user-selectable control for adding the new vendor, presenting a third graphical user interface configured to receive the vendor information associated with the particular vendor; detecting a submission of the vendor information associated with the particular vendor on the third user graphical interface; and responsive to detecting submission of the vendor information associated with the particular vendor on the third user graphical interface, storing the vendor information associated with the particular vendor in the vendor information database. In various embodiments, a data processing vendor compliance system may perform operations that include: generating a privacy risk assessment questionnaire; transmitting the privacy risk assessment questionnaire to the particular vendor; and receiving privacy risk assessment questionnaire responses from the particular vendor. In various embodiments, determining the additional privacy-related information associated with the particular vendor comprises determining the additional privacy-related information associated with the particular vendor further based, at least in part, on the privacy risk assessment questionnaire responses. In various embodiments, calculating the vendor risk score for the particular vendor comprises calculating the vendor risk score for the particular vendor further based, at least in part, on the privacy risk assessment questionnaire responses. In various embodiments, the privacy risk assessment questionnaire responses comprise one or more pieces of information associated with the particular vendor, and a data processing vendor compliance system may perform operations that include: determining an expiration date for the one or more pieces of information associated with the particular vendor; determining that the expiration date has occurred; and in response to determining that the expiration date has occurred: generating a second privacy risk assessment questionnaire, transmitting the second privacy risk assessment questionnaire to the particular vendor; receiving second privacy risk assessment questionnaire responses from the particular vendor; and calculating a second vendor risk score for the particular vendor based, at least in part, on the second privacy risk assessment questionnaire responses. In various embodiments, the publicly available privacy-related information associated with the particular vendor comprises one or more pieces of information associated with the particular vendor, and a data processing vendor compliance system may perform operations that include: determining an expiration date for the one or more pieces of information associated with the particular vendor; determining that the expiration date has occurred; and in response to determining that the expiration date has occurred: obtaining second publicly available privacy-related information associated with the particular vendor, and calculating, based at least in part on the vendor information associated with the particular vendor and the second publicly available privacy-related information associated with the particular vendor, a second vendor risk score for the particular vendor.

A computer-implemented data processing method for determining vendor privacy standard compliance, according to particular embodiments, comprises: receiving, by one or more processors, vendor information associated with the particular vendor; obtaining, by one or more processors based on the vendor information associated with the particular vendor, publicly available privacy-related information associated with the particular vendor; calculating, by one or more processors based at least in part on the vendor information associated with the particular vendor and the publicly available privacy-related information associated with the particular vendor, a risk score for the particular vendor; determining, by one or more processors based at least in part on the vendor information associated with the particular vendor and the publicly available privacy-related information associated with the particular vendor, additional privacy-related information associated with the particular vendor; and presenting, by one or more processors on a graphical user interface: the risk score for the particular vendor, at least a subset of the vendor information associated with the particular vendor, and at least a subset of the additional privacy-related information associated with the particular vendor.

In various embodiments, the vendor information associated with the particular vendor comprises one or more documents, wherein determining the additional privacy-related information associated with the particular vendor is further based, at least in part, on particular terms in the one or more documents. In various embodiments, the vendor information associated with the particular vendor comprises one or more documents, wherein calculating the risk score for the particular vendor is further based, at least in part, on particular terms in the one or more documents. In various embodiments, the vendor information associated with the particular vendor comprises one or more pieces of information associated with the particular vendor selected from a group consisting of: (1) one or more services provided by the particular vendor; (2) a name of the particular vendor; (3) a geographical location of the particular vendor; (4) a description of the particular vendor; and (5) one or more contacts associated with the particular vendor. In various embodiments, a data processing vendor compliance system may perform operations that include receiving vendor assessment information associated with the particular vendor, wherein calculating the risk score for the particular vendor is further based, at least in part, on the vendor assessment information associated with the particular vendor. In various embodiments, a data processing vendor compliance system may perform operations that include receiving vendor assessment information associated with the particular vendor, wherein determining the additional privacy-related information associated with the particular vendor is further based, at least in part, on the vendor assessment information associated with the particular vendor.

A computer-implemented data processing method for determining a vendor privacy risk score, according to particular embodiments, comprises: receiving, by one or more processors, one or more pieces of vendor information associated with the particular vendor; receiving, by one or more processors, one or more pieces of vendor assessment information associated with the particular vendor; obtaining, by one or more processors based on the one or more pieces of vendor information associated with the particular vendor, one or more pieces of publicly available privacy-related information associated with the particular vendor; determining, by one or more processors: a respective weighting factor for each of the one or more pieces of vendor information associated with the particular vendor, a respective weighting factor for each of the one or more pieces of vendor assessment information associated with the particular vendor, and a respective weighting factor for each of the one or more pieces of publicly available privacy-related information associated with the particular vendor; calculating, by one or more processors, a privacy risk score based on: the one or more pieces of vendor information associated with the particular vendor, the respective weighting factor for each of the one or more pieces of vendor information associated with the particular vendor, the one or more pieces of vendor assessment information associated with the particular vendor, the respective weighting factor for each of the one or more pieces of vendor assessment information associated with the particular vendor, the one or more pieces of publicly available privacy-related information associated with the particular vendor, and the respective weighting factor for each of the one or more pieces of publicly available privacy-related information associated with the particular vendor; and presenting, by one or more processors on a graphical user interface, the privacy risk score for the particular vendor.

In various embodiments, obtaining the publicly available privacy-related information associated with the particular vendor comprises scanning one or more webpages associated with the particular vendor and identifying one or more pieces of privacy-related information associated with the particular vendor based on the scan. In various embodiments, the one or more pieces of publicly available privacy-related information associated with the particular vendor comprises one or more security certifications. In various embodiments, the one or more pieces of publicly available privacy-related information associated with the particular vendor comprises one or more pieces of information obtained from a social networking site. In various embodiments, the one or more pieces of publicly available privacy-related information associated with the particular vendor comprises information obtained from one or more webpages operated by the particular vendor. In various embodiments, the one or more pieces of publicly available privacy-related information associated with the particular vendor comprises information obtained from one or more webpages operated by a third-party that is not the particular vendor. In various embodiments, the one or more pieces of vendor information associated with the particular vendor comprises particular terms obtained from one or more documents, wherein a method for determining a vendor privacy risk score may include analyzing the one or more documents using one or more natural language processing techniques to identify the particular terms in the one or more documents.

A data processing vendor privacy risk score determination system, according to particular embodiments, comprises: one or more processors; computer memory; and a computer-readable medium storing computer-executable instructions that, when executed by the one or more processors, cause the one or more processors to perform operations comprising: retrieving, from a vendor information database, one or more pieces of vendor information associated with the particular vendor; retrieving, from the vendor information database, one or more pieces of vendor assessment information associated with the particular vendor; obtaining, based on the one or more pieces of vendor information associated with the particular vendor, one or more pieces of publicly available privacy-related information associated with the particular vendor; determining whether each of the one or more pieces of vendor information associated with the particular vendor, the one or more pieces of vendor assessment information associated with the particular vendor, and the one or more pieces of publicly available privacy-related information associated with the particular vendor is currently valid; if each of the one or more pieces of vendor information associated with the particular vendor, the one or more pieces of vendor assessment information associated with the particular vendor, and the one or more pieces of publicly available privacy-related information associated with the particular vendor is currently valid: calculating, based at least in part each of the one or more pieces of vendor information associated with the particular vendor, the one or more pieces of vendor assessment information associated with the particular vendor, and the one or more pieces of publicly available privacy-related information associated with the particular vendor is currently valid, a vendor risk rating for the particular vendor, and presenting, on a graphical user interface, the privacy risk score for the particular vendor; and if any of the one or more pieces of vendor information associated with the particular vendor, the one or more pieces of vendor assessment information associated with the particular vendor, and the one or more pieces of publicly available privacy-related information associated with the particular vendor is not currently valid: requesting updated information corresponding to any of the one or more pieces of vendor information associated with the particular vendor, the one or more pieces of vendor assessment information associated with the particular vendor, and the one or more pieces of publicly available privacy-related information associated with the particular vendor that is not currently valid.

In various embodiments, the one or more pieces of publicly available privacy-related information associated with the particular vendor comprises one or more privacy disclaimers displayed on one or more webpages associated with the particular vendor. In various embodiments, the one or more pieces of publicly available privacy-related information associated with the particular vendor comprises one or more privacy-related employee positions associated with the particular vendor. In various embodiments, the one or more pieces of publicly available privacy-related information associated with the particular vendor comprises one or more privacy-related events attended by one or more representatives of the particular vendor. In various embodiments, the one or more pieces of vendor information associated with the particular vendor comprises one or more contractual obligations obtained from one or more documents, wherein retrieving the one or more pieces of vendor information associated with the particular vendor comprises: retrieving the one or more documents, and analyzing the one or more documents using one or more natural language processing techniques to identify the one or more contractual obligations in the one or more documents. In various embodiments, determining whether each of the one or more pieces of vendor information associated with the particular vendor, the one or more pieces of vendor assessment information associated with the particular vendor, and the one or more pieces of publicly available privacy-related information associated with the particular vendor is currently valid comprises determining whether a respective expiration date associated with each of the one or more pieces of vendor information associated with the particular vendor, the one or more pieces of vendor assessment information associated with the particular vendor, and the one or more pieces of publicly available privacy-related information associated with the particular vendor has passed. In various embodiments, requesting updated information corresponding to any of the one or more pieces of vendor information associated with the particular vendor, the one or more pieces of vendor assessment information associated with the particular vendor, and the one or more pieces of publicly available privacy-related information associated with the particular vendor that is not currently valid comprises generating and transmitting an assessment to the particular vendor.

A computer-implemented data processing method for determining a vendor privacy risk score, according to particular embodiments, comprises: receiving, by one or more processors, one or more pieces of vendor information associated with the particular vendor; receiving, by one or more processors, one or more pieces of vendor assessment information associated with the particular vendor; obtaining, by one or more processors based on the one or more pieces of vendor information associated with the particular vendor, one or more pieces of publicly available privacy-related information associated with the particular vendor by scanning one or more webpages associated with the particular vendor; calculating, by one or more processors, a privacy risk score based on: the one or more pieces of vendor information associated with the particular vendor, the one or more pieces of vendor assessment information associated with the particular vendor, the one or more pieces of publicly available privacy-related information associated with the particular vendor, and presenting, by one or more processors on a graphical user interface, the privacy risk score for the particular vendor.

In various embodiments, the one or more pieces of publicly available privacy-related information associated with the particular vendor comprises an indication of a contract between the particular vendor and a government entity. In various embodiments, the one or more pieces of publicly available privacy-related information associated with the particular vendor comprises one or more privacy notices displayed on the one or more webpages associated with the particular vendor. In various embodiments, the one or more pieces of publicly available privacy-related information associated with the particular vendor comprises one or more privacy control centers configured on the one or more webpages associated with the particular vendor. In various embodiments, a method for determining a vendor privacy risk score may include determining that a respective expiration date associated with each of the one or more pieces of vendor information associated with the particular vendor, the one or more pieces of vendor assessment information associated with the particular vendor, and the one or more pieces of publicly available privacy-related information associated with the particular vendor has not passed. In various embodiments, the one or more pieces of publicly available privacy-related information associated with the particular vendor comprises an indication that the particular vendor is an active member of a privacy-related industry organization.

This concept involves integrating performing vendor risk assessments and related analysis into a company's procurement process and/or procurement system. In particular, the concept involves triggering requiring a new risk assessment or risk acknowledgement before entering into a new contract with a vendor, renewing an existing contract with the vendor, and/or paying the vendor if: (1) the vendor has not conducted a privacy assessment and/or security assessment; (2) the vendor has an outdated privacy assessment and/or security assessment; or (3) the vendor or a sub-processor of the vendor has recently been involved in a privacy-related incident (e.g., a data breach).

A computer-implemented data processing method for assessing a level of privacy-related risk associated with a particular vendor, according to particular embodiments, comprises: receiving, by one or more processors, a request for an assessment of privacy-related risk associated with the particular vendor; in response to receiving the request, retrieving, by one or more processors, from a vendor information database, current vendor information associated with the particular vendor, wherein the current vendor information associated with the particular vendor comprises both vendor privacy risk assessment information associated with the particular vendor and a vendor privacy risk score for the particular vendor; determining, by one or more processors, based at least in part on the vendor privacy risk assessment information, to request updated vendor privacy risk assessment information for the particular vendor; in response to determining to request the updated vendor privacy risk assessment information: generating, by one or more processors, a vendor privacy risk assessment questionnaire, transmitting, by one or more processors, the vendor privacy risk assessment questionnaire to the particular vendor, receiving, by one or more processors, one or more vendor privacy risk assessment questionnaire responses from the particular vendor, and storing, by one or more processors in the vendor information database, the vendor privacy risk assessment questionnaire responses as the updated vendor privacy risk assessment information; calculating, by one or more processors based at least in part on the updated vendor privacy risk assessment information, an updated privacy risk score for the particular vendor; storing, by one or more processors in the vendor information database, the updated privacy risk score for the particular vendor; and communicating, by one or more processors, the updated privacy risk score for the particular vendor to one or more users.

In various embodiments, communicating the updated privacy risk score comprises displaying the updated privacy risk score to the one or more users on a computer display. In various embodiments, determining to request the updated vendor privacy risk assessment information comprises determining that the vendor privacy risk assessment information associated with the particular vendor has expired. In various embodiments, determining to request the updated vendor privacy risk assessment information comprises determining that the vendor privacy risk score for the particular vendor has expired. In various embodiments, data processing a method for assessing a level of privacy-related risk associated with a particular vendor further may also include determining, by one or more computer processors, based at least in part on the updated privacy risk score for the particular vendor, to approve the particular vendor as being suitable for doing business with a particular entity; and in response to determining to approve the particular vendor, storing, by one or more computer processors, an indication of approval of the particular vendor. In various embodiments, a data processing method for assessing a level of privacy-related risk associated with a particular vendor further may also include determining, by one or more processors, based at least in part on the updated privacy risk score for the particular vendor, to automatically reject the particular vendor as a candidate for doing business with a particular entity; and responsive to determining to reject the particular vendor, storing, by one or more computer processors, an indication of rejection of the particular vendor. In various embodiments, the current vendor information associated with the particular vendor further comprises one or more documents related to the particular vendor's privacy practices, wherein the method further comprises analyzing the one or more documents using one or more natural language processing techniques to identify particular terms in the one or more documents, and wherein calculating the updated privacy risk score for the particular vendor is further based, at least in part, on one or more particular terms in the one or more documents. In various embodiments, the current vendor information associated with the particular vendor further comprises publicly available privacy-related information associated with the particular vendor, and wherein calculating the updated privacy risk score for the particular vendor is further based, at least in part, on the publicly available privacy-related information associated with the particular vendor.

A data processing system for assessing privacy risk associated with a particular vendor, according to particular embodiments, comprises: one or more processors; and computer memory storing computer-executable instructions that, when executed by the one or more processors, cause the one or more processors to perform operations comprising: receiving a request for vendor privacy risk information for a particular vendor; retrieving, from a vendor information database, current vendor information associated with the particular vendor and a vendor privacy risk rating for the particular vendor; automatically determining, based at least in part on the current vendor information associated with the particular vendor, to obtain updated vendor information associated with the particular vendor; in response to determining to obtain the updated vendor information associated with the particular vendor, requesting the updated vendor information associated with the particular vendor; receiving the updated vendor information associated with the particular vendor; storing the updated vendor information associated with the particular vendor in the vendor information database; calculating an updated vendor privacy risk rating for the particular vendor based at least in part on the updated vendor information associated with the particular vendor; storing the updated vendor privacy risk rating for the particular vendor in the vendor information database; and communicating the updated vendor privacy risk rating for the particular vendor to at least one user.

In various embodiments, communicating the updated vendor privacy risk rating for the particular vendor comprises displaying the updated vendor privacy risk rating on a computer display. In various embodiments, determining, based at least in part on the current vendor information associated with the particular vendor, to obtain the updated vendor information associated with the particular vendor comprises: determining, based at least in part on the current vendor information associated with the particular vendor, that no vendor privacy risk assessment information associated with the particular vendor is stored in the vendor information database. In various embodiments, determining, based at least in part on the current vendor information associated with the particular vendor, to obtain the updated vendor information associated with the particular vendor is done at least partially in response to determining, based at least in part on the current vendor information associated with the particular vendor, that the particular vendor has experienced a particular type of privacy-related incident. In various embodiments, determining, based at least in part on the current vendor information associated with the particular vendor, to obtain the updated vendor information associated with the particular vendor is executed at least partially in response to determining, based at least in part on the current vendor information associated with the particular vendor, that the particular vendor is associated with a new sub-processor. In various embodiments, determining, based at least in part on the current vendor information associated with the particular vendor, to obtain the updated vendor information associated with the particular vendor is executed at least partially in response to determining, based at least in part on the current vendor information associated with the particular vendor, that a security certification for the particular vendor has expired. In various embodiments, the current vendor information associated with the particular vendor comprises a plurality of pieces of information associated with the particular vendor; and wherein determining, based at least in part on the current vendor information associated with the particular vendor, to obtain the updated vendor information associated with the particular vendor comprises: determining an expiration date for at least one of the plurality of pieces of information associated with the particular vendor, and determining that the at least one of the plurality of pieces of information associated with the particular vendor has expired. In various embodiments, determining, based at least in part on the current vendor information associated with the particular vendor, to obtain the updated vendor information associated with the particular vendor is executed at least partially in response to determining, based at least in part on the current vendor information associated with the particular vendor, that a vendor privacy risk assessment for the particular vendor has expired; and wherein requesting the updated vendor information associated with the particular vendor comprises: generating a vendor privacy risk assessment questionnaire, and transmitting the vendor privacy risk assessment questionnaire to the particular vendor for completion.

A computer-implemented data processing method for assessing a risk associated with a vendor, according to particular embodiments, comprises: receiving, by one or more computer processors, an indication that an entity wishes to do business with, or submit payment to, a particular vendor; at least partially in response to receiving the indication, obtaining, by one or more computer processors, information from a centralized vendor risk information database regarding whether a new risk assessment is needed for the vendor; at least partially in response to determining that a new risk assessment is needed for the vendor, automatically facilitating, by one or more computer processors, the completion of a new or updated risk assessment for the vendor; saving, by one or more computer processors, the new or updated risk assessment to system memory; and communicating, by one or more computer processors, information from the new risk assessment to the entity for use in determining whether to contract with, or submit payment to, the particular vendor.

In various embodiments, the indication is an indication that the entity wishes to establish a new business relationship with the particular vendor. In various embodiments, the indication is an indication that the entity wishes to renew an existing business relationship with the particular vendor. In various embodiments, the indication is an indication that the entity wishes to submit payment to particular vendor. In various embodiments, the information regarding whether a new risk assessment is needed for the vendor indicates that an updated risk assessment is needed for the vendor. In various embodiments, the information regarding whether a new risk assessment is needed for the vendor comprises information indicating that the vendor has been involved in a privacy-related incident. In various embodiments, the information regarding whether a new risk assessment is needed for the vendor comprises information indicating that an existing privacy assessment for the vendor is outdated. In various embodiments, the existing privacy assessment is stored in the centralized vendor risk information database.

A computer-implemented data processing method for assessing privacy risk associated with a particular vendor, according to particular embodiments, comprises: receiving, by one or more processors, a request for vendor privacy risk information for a particular vendor; at least partially in response to receiving the request, retrieving, by one or more processors from a vendor information database, current vendor information associated with the particular vendor and a vendor privacy risk rating for the particular vendor; determining, by one or more processors based at least in part on the current vendor information associated with the particular vendor, to request updated vendor information associated with the particular vendor; at least partially in response to determining to request the updated vendor information associated with the particular vendor, requesting, by one or more processors, the updated vendor information associated with the particular vendor; receiving, by one or more processors, the updated vendor information associated with the particular vendor; storing, by one or more processors in the vendor information database, the updated vendor information associated with the particular vendor; calculating, by one or more processors, based at least in part on the updated vendor information associated with the particular vendor, an updated privacy risk rating for the particular vendor; storing, by one or more processors in the vendor information database, the updated privacy risk rating for the particular vendor; and communicating the updated privacy risk rating for the particular vendor to at least one user.

In various embodiments, the communicating step further comprises communicating a subset of the updated vendor information associated with the particular vendor to the at least one user. In various embodiments, receiving the request for the vendor privacy risk information for the particular vendor comprises detecting a selection on a graphical user interface. In various embodiments, data processing a method for assessing a level of privacy-related risk associated with a particular vendor further may also include obtaining, using at least a portion of the updated vendor information associated with the particular vendor, publicly available privacy-related information associated with the particular vendor, wherein calculating the updated privacy risk rating for the particular vendor is based at least in part on the publicly available privacy-related information associated with the particular vendor. In various embodiments, the updated vendor information associated with the particular vendor comprises one or more pieces of information associated with the particular vendor selected from a group consisting of: (1) one or more services provided by the particular vendor; (2) a name of the particular vendor; (3) a geographical location of the particular vendor; (4) a description of the particular vendor; and (5) one or more employees of the particular vendor. In various embodiments, the current vendor information associated with the particular vendor comprises one or more documents; and wherein determining, based at least in part on the current vendor information associated with the particular vendor, to request the updated vendor information associated with the particular vendor comprises: determining an expiration date associated with at least one of the one or more documents, and determining that the at least one of the one or more documents has expired.

A computer-implemented data processing method for generating privacy-related training material associated with a vendor, according to particular embodiments, comprises: retrieving, by one or more processors from a vendor information database, vendor information associated with the particular vendor, wherein the vendor information associated with the particular vendor is based, at least in part, on: privacy-related information associated with the particular vendor, publicly available privacy-related information associated with the particular vendor, and a privacy risk score for the particular vendor; generating, by one or more processors, first privacy-related training material associated with the particular vendor; storing, by one or more processors in the vendor information database, the first privacy-related training material associated with the particular vendor; detecting, by one or more processors, an indication of a change in the vendor information associated with the particular vendor; responsive to detecting the indication of the change in the vendor information associated with the particular vendor, retrieving, by one or more processors from the vendor information database, updated vendor information associated with the particular vendor; generating, by one or more processors, second privacy-related training material associated with the particular vendor; storing, by one or more processors in the vendor information database, the second privacy-related training material associated with the particular vendor; and presenting, by one or more processors on a graphical user interface, an indication of the generation of the second privacy-related training material associated with the particular vendor.

In various embodiments, the publicly available privacy-related information associated with the particular vendor comprises information obtained by scanning one or more webpages associated with the particular vendor. In various embodiments, the privacy-related information associated with the particular vendor comprises one or more security certifications. In various embodiments, the one or more pieces of publicly available privacy-related information associated with the particular vendor comprises one or more pieces of information obtained from a social networking site. In various embodiments, detecting the indication of the change in the vendor information associated with the particular vendor comprises detecting an indication of an incident associated with the particular vendor. In various embodiments, detecting the indication of the change in the vendor information associated with the particular vendor comprises detecting an indication of a change of a sub-processor associated with the particular vendor. In various embodiments, detecting the indication of the change in the vendor information associated with the particular vendor comprises detecting an indication of a change of the privacy risk score for the particular vendor.

A data processing vendor-related training material generation system, according to particular embodiments, comprises: one or more processors; computer memory; and a computer-readable medium storing computer-executable instructions that, when executed by the one or more processors, cause the one or more processors to perform operations comprising: receiving a request for vendor-related training material associated with a particular vendor; retrieving vendor information associated with the particular vendor from a vendor information database, wherein the vendor information is based, at least in part, on: non-publicly available information associated with the particular vendor, publicly available information associated with the particular vendor, and a risk score for the particular vendor; generating the vendor-related training material associated with the particular vendor; storing the vendor-related training material associated with the particular vendor in the vendor information database; and presenting, on a graphical user interface, an indication of the generation of the vendor-related training material associated with the particular vendor.

In various embodiments, the publicly available information associated with the particular vendor comprises one or more privacy disclaimers displayed on one or more webpages associated with the particular vendor. In various embodiments, the publicly available information associated with the particular vendor comprises one or more security-related employee positions associated with the particular vendor. In various embodiments, vendor-related training material generation operations may further include: detecting an indication of an incident associated with the particular vendor; and responsive to detecting the indication of the incident associated with the particular vendor, generating updated vendor-related training material associated with the particular vendor. In various embodiments, vendor-related training material generation operations may further include: detecting an indication of a change of a sub-processor associated with the particular vendor; and responsive to detecting the indication of the change of the sub-processor associated with the particular vendor, generating updated vendor-related training material associated with the particular vendor. In various embodiments, vendor-related training material generation operations may further include: detecting an indication of a change of the risk score for the particular vendor; and responsive to detecting the indication of the change of the risk score for the particular vendor, generating updated vendor-related training material associated with the particular vendor. In various embodiments, receiving the request for the vendor-related training material associated with the particular vendor comprises detecting a selection of a control on a second graphical user interface.

A computer-implemented data processing method for generating vendor-related training material, according to particular embodiments, comprises: receiving, by one or more processors, a request for training material associated with a particular vendor; retrieving, by one or more processors from a vendor information database, vendor information associated with the particular vendor, wherein the vendor information is based, at least in part, on: non-publicly available security-related information associated with the particular vendor, publicly available security-related information associated with the particular vendor, and a risk score for the particular vendor; generating, by one or more processors, the training material associated with the particular vendor; storing, by one or more processors in the vendor information database, training material associated with the particular vendor; and presenting, by one or more processors on a graphical user interface, an indication of the generation of the training material associated with the particular vendor.

In various embodiments, the non-publicly available security-related information associated with the particular vendor comprises one or more terms derived from analysis of one or more documents. In various embodiments, the non-publicly available security-related information associated with the particular vendor comprises one or more sub-processors. In various embodiments, the publicly available security-related information associated with the particular vendor comprises information derived from analysis of one or more webpages operated by a third-party that is not the particular vendor. In various embodiments, the non-publicly available security-related information associated with the particular vendor comprises an indication of one or more incidents associated with the particular vendor. In various embodiments, the publicly available security-related information associated with the particular vendor comprises in indication that the particular vendor is an active member of a privacy-related industry organization.

A computer-implemented data processing method for determining whether to disclose a data breach to regulators within a plurality of territories, according to various embodiments, may include: accessing, by one or more computer processors from a computer memory, an ontology, wherein the ontology: maps one or more questions from a first data breach disclosure questionnaire for a first territory to a first question in a master questionnaire; and maps one or more questions from a second data breach disclosure questionnaire for a second territory to the first question in the master questionnaire; detecting, by one or more processors, the occurrence of a data breach; at least partially in response to detecting the occurrence of the data breach, presenting, by one or more processors via a graphical user interface, a prompt requesting an answer to the first question in the master questionnaire from a user; receiving, by one or more processors via the graphical user interface, input indicating the answer to the first question in the master questionnaire from the user; storing, by one or more processors, the answer to the first question in the master questionnaire; populating, by one or more processors using the ontology, the one or more questions from the first data breach disclosure questionnaire for the first territory with the answer to the first question in the master questionnaire; populating, by one or more processors using the ontology, the one or more questions from the second data breach disclosure questionnaire for the second territory with the answer to the first question in the master questionnaire; determining, by the one or more processors based on the one or more questions from the first data breach disclosure questionnaire for the first territory, whether to disclose the data breach to regulators for the first territory; at least partially in response to determining to disclose the data breach to the regulators for the first territory, automatically generating, by one or more processors, a first notification for the regulators for the first territory; determining, by the one or more processors based on the one or more questions from the second data breach disclosure questionnaire for the second territory, whether to disclose the data breach to regulators for the second territory; and at least partially in response to determining to disclose the data breach to the regulators for the second territory, automatically generating, by one or more processors, a second notification for the regulators for the second territory.

In various embodiments, the ontology further maps one or more questions from a third data breach disclosure questionnaire for a third territory to the first question in the master questionnaire. In various embodiments, the data processing method may include populating, by one or more processors using the ontology, the one or more questions from the third data breach disclosure questionnaire for the third territory with the answer to the first question in the master questionnaire; determining, by the one or more processors based on the one or more questions from the third data breach disclosure questionnaire for the third territory, whether to disclose the data breach to regulators for the third territory; and at least partially in response to determining to disclose the data breach to the regulators for the third territory, automatically generating, by one or more processors, a third notification for the regulators for the third territory. In various embodiments, the data processing method may include populating, by one or more processors using the ontology, the one or more questions from the third data breach disclosure questionnaire for the third territory with the answer to the first question in the master questionnaire; determining, by the one or more processors based on the one or more questions from the third data breach disclosure questionnaire for the third territory, not to disclose the data breach to regulators for the third territory. In various embodiments, automatically generating the first notification for the regulators for the first territory comprises generating a notification selected from a group consisting of an electronic notification and a paper notification. In various embodiments, the first question in the master questionnaire comprises a question requesting data selected from a group consisting of: (a) a number of data subjects affected by the data breach; (b) a business sector associated with the data breach; and (c) a date of discovery of the data breach. In various embodiments, the data processing method may include determining a status of the data breach based on the answer to the first question in the master questionnaire.

According to various embodiments, a data processing system for determining whether to disclose a data breach to regulators within a plurality of territories may include: one or more processors; and computer memory storing computer-executable instructions that, when executed by the one or more processors, cause the one or more processors to perform operations comprising: generating a data breach master questionnaire comprising a plurality of questions; generating a first data breach disclosure questionnaire for a first territory comprising a plurality of questions; generating an ontology mapping a first question of the plurality of questions of the data breach master questionnaire to a first question of the plurality of questions of the first data breach disclosure questionnaire for the first territory; receiving a request to determine whether to disclose a data breach to a first regulator for the first territory; at least partially in response to receiving the request to determine whether to disclose the data breach to the first regulator for the first territory, generating a prompt to a user requesting an answer to the first question of the plurality of questions of the data breach master questionnaire; receiving input from the user indicating the answer to the first question of the plurality of questions of the data breach master questionnaire; storing the answer to the first question of the plurality of questions of the data breach master questionnaire; accessing the ontology; populating the first question of the plurality of questions of the first data breach disclosure questionnaire for the first territory with the answer to the first question of the plurality of questions of the data breach master questionnaire using the ontology; determining, based at least in part on the first question of the plurality of questions of the first data breach disclosure questionnaire for the first territory, to disclose the data breach to the first regulator for the first territory; and at least partially in response to determining to disclose the data breach to the first regulator for the first territory, automatically generating an electronic notification of the data breach for the first regulator for the first territory.

In various embodiments, the data processing system may perform further operations that may include generating a second data breach disclosure questionnaire for a second territory comprising a plurality of questions; and mapping, in the ontology, the first question of the plurality of questions of the data breach master questionnaire to a first question of the plurality of questions of the second data breach disclosure questionnaire for the second territory. The data processing system of claim 9, wherein the operations further comprise: receiving an indication from the user that an entity operating the system no longer conducts business in the second territory; and at least partially in response to receiving the indication from the user that the entity operating the system no longer conducts business in the second territory, removing the mapping in the ontology of the first question of the plurality of questions of the data breach master questionnaire to the first question of the plurality of questions of the second data breach disclosure questionnaire for the second territory. In various embodiments, the data processing system may perform further operations that may include, at least partially in response to removing the mapping in the ontology of the first question of the plurality of questions of the data breach master questionnaire to the first question of the plurality of questions of the second data breach disclosure questionnaire for the second territory, generating a second data breach master questionnaire comprising a plurality of questions. In various embodiments, the data processing system may perform further operations that may include after generating the data breach master questionnaire, receiving an indication from the user that an entity operating the system conducts business in a second territory; and at least partially in response to receiving the indication from the user that the entity operating the system conducts business in the second territory: generating a second data breach disclosure questionnaire for a second territory comprising a plurality of questions; mapping, in the ontology, the first question of the plurality of questions of the data breach master questionnaire to a first question of the plurality of questions of the second data breach disclosure questionnaire for the second territory; and generating a second data breach master questionnaire comprising a plurality of questions. In various embodiments, the data processing system may perform further operations that may include receiving an indication of a business sector associated with the data breach. In various embodiments, determining to disclose the data breach to the first regulator for the first territory is further based at least in part on the business sector associated with the data breach.

In various embodiments, a computer-implemented data processing method for determining whether to disclose a data breach to regulators for a territory may include: generating, by one or more computer processors from a computer memory, an ontology, wherein the ontology: maps a first question from a first data breach disclosure questionnaire for a first territory to a first question in a master questionnaire; and maps a second question from the first data breach disclosure questionnaire for the first territory to a second question in the master questionnaire; presenting, by one or more processors via a graphical user interface, a first prompt requesting an answer to the first question in the master questionnaire from a user; receiving, by one or more processors via the graphical user interface, first input indicating the answer to the first question in the master questionnaire from the user; storing, by one or more processors, the answer to the first question in the master questionnaire; presenting, by one or more processors via a graphical user interface, a second prompt requesting an answer to the second question in the master questionnaire from a user; receiving, by one or more processors via the graphical user interface, second input indicating the answer to the second question in the master questionnaire from the user; storing, by one or more processors, the answer to the second question in the master questionnaire; populating, by one or more processors using the ontology, the first question from the first data breach disclosure questionnaire for the first territory with the answer to the first question in the master questionnaire; populating, by one or more processors using the ontology, the second question from the first data breach disclosure questionnaire for the first territory with the answer to the second question in the master questionnaire; and determining, by the one or more processors based at least in part on the first question from the first data breach disclosure questionnaire for the first territory and the second question from the first data breach disclosure questionnaire for the first territory, whether to disclose the data breach to regulators for the first territory.

According to various embodiments, the first question in the master questionnaire comprises a request for a number of data subjects affected by the data breach; and determining, based at least in part on the first question from the first data breach disclosure questionnaire for the first territory and the second question from the first data breach disclosure questionnaire for the first territory, whether to disclose the data breach to the regulators for the first territory comprises determining whether the number of data subjects affected by the data breach exceeds a threshold. In particular embodiments, determining whether the number of data subjects affected by the data breach exceeds the threshold comprises determining that the number of data subjects affected by the data breach exceeds the threshold; and wherein determining whether to disclose the data breach to the regulators for the first territory comprises determining to disclose the data breach to regulators for the first territory based at least in part on determining that the number of data subjects affected by the data breach exceeds the threshold. In particular embodiments, determining whether the number of data subjects affected by the data breach exceeds the threshold comprises determining that the number of data subjects affected by the data breach does not exceed the threshold; and wherein determining whether to disclose the data breach to the regulators for the first territory comprises determining not to disclose the data breach to regulators for the first territory based at least in part on determining that the number of data subjects affected by the data breach does not exceed the threshold. In particular embodiments, the first question in the master questionnaire comprises a request for a business sector associated with the data breach. In various embodiments, determining whether to disclose the data breach to the regulators for the first territory comprises determining to disclose the data breach to the regulators for the first territory; and wherein the method further comprises, at least partially in response to determining to disclose the data breach to the regulators for the first territory, automatically transmitting an electronic notification of the data breach to the regulators for the first territory.

In various embodiments, a computer-implemented data processing method for determining vendor compliance with one or more privacy standards may include: accessing, by one or more computer processors from a computer memory, an ontology, wherein the ontology: maps one or more questions from a first privacy standard compliance questionnaire to a first question in a master questionnaire; and maps one or more questions from a second privacy standard compliance questionnaire to the first question in the master questionnaire; presenting, by one or more processors via a graphical user interface, a prompt requesting an answer to the first question in the master questionnaire from a user; receiving, by one or more processors via the graphical user interface, input indicating the answer to the first question in the master questionnaire from the user; storing, by one or more processors, the answer to the first question in the master questionnaire; populating, by one or more processors using the ontology, the one or more questions from the first privacy standard compliance questionnaire with the answer to the first question in the master questionnaire; populating, by one or more processors using the ontology, the one or more questions from the second privacy standard compliance questionnaire with the answer to the first question in the master questionnaire; determining, by the one or more processors based on the one or more questions from the first privacy standard compliance questionnaire, an extent of vendor compliance with a first privacy standard associated with the first privacy standard compliance questionnaire; determining, by the one or more processors based on the one or more questions from the second privacy standard compliance questionnaire, an extent of vendor compliance with a second privacy standard associated with the second privacy standard compliance questionnaire; and automatically generating, by one or more processors, a notification for the user indicating the extent of vendor compliance with the first privacy standard and the extent of vendor compliance with the second privacy standard.

In particular embodiments, the ontology further maps one or more questions from a third privacy standard compliance questionnaire associated with a third privacy standard to the first question in the master questionnaire. The data processing method may further include populating, by one or more processors using the ontology, the one or more questions from the third data breach disclosure questionnaire for the third territory with the answer to the first question in the master questionnaire; determining, by the one or more processors based on the one or more questions from the third privacy standard compliance questionnaire, an extent of vendor compliance with the third privacy standard associated with the third privacy standard compliance questionnaire; and automatically generating, by one or more processors, the notification for the user indicating the extent of vendor compliance with the third privacy standard. In particular embodiments, the first question in the master questionnaire comprises a question regarding a control associated with personal data processed by a vendor. Automatically generating the notification for the user may include generating a notification selected from a group consisting of: (a) an electronic notification; and (b) a paper notification. In particular embodiments, the data processing method may include determining, based on the extent of vendor compliance with the first privacy standard and the extent of vendor compliance with the second privacy standard, an extent of vendor compliance with a third first privacy standard. The ontology may further map at least one of the one or more questions from the first privacy standard compliance questionnaire one or more questions from a third privacy standard compliance questionnaire.

In various embodiments, a data processing system for determining an extent of vendor compliance with a privacy standard may include one or more processors; and computer memory storing computer-executable instructions that, when executed by the one or more processors, cause the one or more processors to perform operations comprising: generating a compliance master questionnaire comprising a plurality of questions; generating a first privacy standard compliance questionnaire for a first privacy standard comprising a plurality of questions; generating an ontology mapping a first question of the plurality of questions of the compliance master questionnaire to a first question of the plurality of questions of the first privacy standard compliance questionnaire, wherein the first question of the plurality of questions of the compliance master questionnaire solicits information regarding one or more personal data controls; receiving a request to determine an extent of vendor compliance with a plurality of privacy standards, wherein the plurality of privacy standards comprises the first privacy standard; at least partially in response to receiving the request to determine the extent of vendor compliance with the plurality of privacy standards, generating a prompt to a user requesting an answer to the first question of the plurality of questions of the compliance master questionnaire; receiving input from the user indicating the answer to the first question of the plurality of questions of the compliance master questionnaire; storing the answer to the first question of the plurality of questions of the compliance master questionnaire; accessing the ontology; populating the first question of the plurality of questions of the first privacy standard compliance questionnaire with the answer to the first question of the plurality of questions of the compliance master questionnaire using the ontology; determining, based at least in part on the answer to the first question of the plurality of questions of the compliance master questionnaire, an extent of vendor compliance with the first privacy standard; and automatically generating an electronic notification of the extent of vendor compliance with the first privacy standard.

In particular embodiments, the operations may also include, at least partially in response the answer to the first question of the plurality of questions of the compliance master questionnaire, determining a confidence level for the first question of the plurality of questions of the first privacy standard compliance questionnaire. Determining the confidence level for the first question of the plurality of questions of the first privacy standard compliance questionnaire may be based on a source of the answer to the first question of the plurality of questions of the compliance master questionnaire. The source of the answer to the first question of the plurality of questions of the compliance master questionnaire may be a source selected from a group consisting of: (a) unsubstantiated data provided by a vendor; (b) substantiated data based on a remote interview with the vendor; and (c) substantiated data based on a vendor site audit. In particular embodiments, the operations further include: determining a respective confidence level for each of the plurality of questions of the first privacy standard compliance questionnaire; determining a confidence score for the extent of vendor compliance with the first privacy standard; and providing the confidence score for the extent of vendor compliance with the first privacy standard with the electronic notification of the extent of vendor compliance with the first privacy standard. The information regarding the one or more personal data controls comprises information regarding whether a vendor requires employee multi-factor authentication. The ontology may also map the first question of the plurality of questions of the first privacy standard compliance questionnaire to a one or more questions from a second privacy standard compliance questionnaire.

In various embodiments, a computer-implemented data processing method for determining whether a vendor is in compliance with a privacy standard may include: generating, by one or more computer processors from a computer memory, an ontology, wherein the ontology: maps a first question from a first privacy standard compliance questionnaire for a first privacy standard to a first question in a master compliance questionnaire; and maps a second question from the first privacy standard compliance questionnaire for the first privacy standard to a second question in the master compliance questionnaire; presenting, by one or more processors via a graphical user interface, a first prompt requesting an answer to the first question in the master compliance questionnaire from a user; receiving, by one or more processors via the graphical user interface, first input indicating the answer to the first question in the master compliance questionnaire from the user; storing, by one or more processors, the answer to the first question in the master compliance questionnaire; presenting, by one or more processors via the graphical user interface, a second prompt requesting an answer to the second question in the master compliance questionnaire from the user; receiving, by one or more processors via the graphical user interface, second input indicating the answer to the second question in the master compliance questionnaire from the user; storing, by one or more processors, the answer to the second question in the master compliance questionnaire; populating, by one or more processors using the ontology, the first question from the first privacy standard compliance questionnaire with the answer to the first question in the master compliance questionnaire; populating, by one or more processors using the ontology, the second question from the first privacy standard compliance questionnaire with the answer to the second question in the master compliance questionnaire; and determining, by the one or more processors based at least in part on the first question from the first privacy standard compliance questionnaire and the second question from the first privacy standard compliance questionnaire, whether a vendor is in compliance with the first privacy standard.

In particular embodiments, the first question in the master questionnaire comprises a request for information regarding a first control associated with personal data; and the second question in the master questionnaire comprises a request for information regarding a second control associated with personal data. Determining whether the vendor is in compliance with the first privacy standard may include: determining that the answer to the first question in the master compliance questionnaire indicates that the vendor implements the first control associated with personal data; determining that the answer to the second question in the master compliance questionnaire indicates that the vendor implements the second control associated with personal data; and at least partially in response to determining that the vendor implements the first control associated with personal data and that the vendor implements the second control associated with personal data, determining that the vendor is in compliance with the first privacy standard. The data processing method may further include, at least partially in response to determining that the vendor implements the first control associated with personal data and that the vendor implements the second control associated with personal data, determining that the vendor is in compliance with a second privacy standard. In particular embodiments, the ontology further maps the first question from the first privacy standard compliance questionnaire for the first privacy standard to a first question from a second privacy standard compliance questionnaire for a second privacy standard; and maps the second question from the first privacy standard compliance questionnaire for the first privacy standard to a second question from the second privacy standard compliance questionnaire for the second privacy standard. In particular embodiments, the ontology further maps a first question from a second privacy standard compliance questionnaire for a second privacy standard to the first question in a master compliance questionnaire; and maps a second question from the second privacy standard compliance questionnaire for the second privacy standard to the second question in the master compliance questionnaire.

In various embodiments, a data processing system for determining readiness to comply with a set of privacy regulations may include: one or more processors; and computer memory storing computer-executable instructions that, when executed by the one or more processors, cause the one or more processors to perform operations such as: generating a master compliance readiness questionnaire comprising a plurality of questions; generating a first compliance readiness questionnaire for a first set of regulations comprising a plurality of questions; generating an ontology mapping a first question of the plurality of questions of the master compliance readiness questionnaire to a first question of the plurality of questions of the first compliance readiness questionnaire for the first set of regulations, wherein the first question of the plurality of questions of the master compliance readiness questionnaire solicits information regarding one or more privacy policies; receiving a request to determine an extent of compliance with a plurality of sets of regulations, wherein the plurality of sets of regulations comprises the set of regulations; at least partially in response to receiving the request to determine the extent of compliance with the plurality of sets of regulations, generating a prompt to a user requesting an answer to the first question of the plurality of questions of the master compliance readiness questionnaire; receiving input from the user indicating the answer to the first question of the plurality of questions of the master compliance readiness questionnaire; storing the answer to the first question of the plurality of questions of the master compliance readiness questionnaire; accessing the ontology; populating the first question of the plurality of questions of the first compliance readiness questionnaire for the first set of regulations with the answer to the first question of the plurality of questions of the master compliance readiness questionnaire using the ontology; determining, based at least in part on the answer to the first question of the plurality of questions of the master compliance readiness questionnaire, an extent of compliance with the first set of regulations; and automatically generating a notification of the extent of compliance with the first set of regulations.

In particular embodiments, such operations may further include storing an indication of the extent of compliance with the first set of regulations in a central repository and/or detecting, on a graphical user interface, a user selection of a first territory; and at least partially in response to detecting the user selection of the first territory: determining the first set of regulations based at least in part on the first territory; and generating the first compliance readiness questionnaire based at least in part on the first set of regulations. Detecting, on the graphical user interface, the user selection of a first territory may include: generating a graphical representation of a map and presenting the graphical representation of the map on the graphical user interface; and detecting the user selection of the first territory on the graphical representation of the map. In particular embodiments, such operations may further include detecting a user selection of a second territory on the graphical representation of the map; at least partially in response to detecting the user selection of the second territory: determining a second set of regulations based at least in part on the second territory; generating, based at least in part on the second set of regulations, a second compliance readiness questionnaire for the second set of regulations comprising a plurality of questions; and mapping, in the ontology, the first question of the plurality of questions of the master compliance readiness questionnaire to a first question of the plurality of questions of the second compliance readiness questionnaire for the second set of regulations. In particular embodiments, such operations may further include presenting, on a graphical user interface, a listing of a plurality of territories selected for compliance readiness assessment, wherein the listing of a plurality of territories comprises an entry associated with the first territory and an entry associated with the second territory. The ontology may further map the first question of the plurality of questions of the first compliance readiness questionnaire for the first set of regulations to a one or more questions from a second compliance readiness questionnaire for a second set of regulations.

In various embodiments, a computer-implemented data processing method for determining readiness to comply with a plurality of sets of privacy regulations may include: accessing, by one or more computer processors from a computer memory, an ontology, wherein the ontology: maps one or more questions from a first regulatory compliance readiness questionnaire for a first set of privacy regulations to a first question in master regulatory compliance readiness questionnaire; and maps one or more questions from a second regulatory compliance readiness questionnaire for a second set of privacy regulations to the first question in the master regulatory compliance readiness questionnaire; presenting, by one or more processors via a graphical user interface, a prompt requesting an answer to the first question in the master regulatory compliance readiness questionnaire from a user; receiving, by one or more processors via the graphical user interface, input indicating the answer to the first question in the master regulatory compliance readiness questionnaire from the user; storing, by one or more processors, the answer to the first question in the master regulatory compliance readiness questionnaire; populating, by one or more processors using the ontology, the one or more questions from the first regulatory compliance readiness questionnaire with the answer to the first question in the master regulatory compliance readiness questionnaire; populating, by one or more processors using the ontology, the one or more questions from the second regulatory compliance readiness questionnaire with the answer to the first question in the master regulatory compliance readiness questionnaire; determining, by the one or more processors based on the one or more questions from the first regulatory compliance readiness questionnaire, an extent of compliance with the first set of privacy regulations; determining, by the one or more processors based on the one or more questions from the second regulatory compliance readiness questionnaire, an extent of compliance with the second first of privacy regulations; and automatically presenting, by one or more processors on the graphical user interface, an indication of the extent of compliance with the first set of privacy regulations and an indication of the extent of compliance with the second set of privacy regulations.

In particular embodiments, the ontology further maps one or more questions from a third regulatory compliance readiness questionnaire for a third set of privacy regulations to the first question in the master regulatory compliance readiness questionnaire. According to various embodiments, the method may also include: populating, by one or more processors using the ontology, the one or more questions from the third regulatory compliance readiness questionnaire for the third set of privacy regulations with the answer to the first question in the master questionnaire; determining, by the one or more processors based on the one or more questions from the third regulatory compliance readiness questionnaire for the third set of privacy regulations, an extent of compliance with the third set of privacy regulations; and automatically presenting, by one or more processors on the graphical user interface, an indication of the extent of compliance with the third set of privacy regulations. According to various embodiments, the method may also include: receiving, by one or more processors via the graphical user interface, input indicating a third set of privacy regulations; at least partially in response to receiving the input indicating the third set of privacy regulations, automatically generating a third regulatory compliance readiness questionnaire for the third set of privacy regulations; and mapping one or more questions from a third regulatory compliance readiness questionnaire for the third set of privacy regulations to the first question in the master regulatory compliance readiness questionnaire. In particular embodiments, the indication of the extent of compliance with the first set of privacy regulations comprises a percentage of readiness to comply the first set of privacy regulations; and the indication of the extent of compliance with the second set of privacy regulations comprises a percentage of readiness to comply the second set of privacy regulations. According to various embodiments, the method may also include determining, based on the extent of compliance with the first set of privacy regulations and the extent of compliance with the second set of privacy regulations, an extent of compliance with a third set of privacy regulations. In particular embodiments, the ontology further maps at least one of the one or more questions from the first regulatory compliance readiness questionnaire for the first set of privacy regulations to one or more questions from a third regulatory compliance readiness questionnaire for a third set of privacy regulations.

According to various embodiments, a computer-implemented data processing method for determining an extent of readiness to comply with a set of regulations may include: generating, by one or more computer processors from a computer memory, an ontology, wherein the ontology: maps a first question from a first compliance readiness questionnaire for a first set of privacy regulations to a first question in a master compliance readiness questionnaire; and maps a second question from the first compliance readiness questionnaire for the first set of privacy regulations to a second question in the master compliance readiness questionnaire; presenting, by one or more processors via a graphical user interface, a first prompt requesting an answer to the first question in the master compliance readiness questionnaire from a user; receiving, by one or more processors via the graphical user interface, first input indicating the answer to the first question in the master compliance readiness questionnaire from the user; storing, by one or more processors, the answer to the first question in the master compliance readiness questionnaire; presenting, by one or more processors via the graphical user interface, a second prompt requesting an answer to the second question in the master compliance readiness questionnaire from the user; receiving, by one or more processors via the graphical user interface, second input indicating the answer to the second question in the master compliance readiness questionnaire from the user; storing, by one or more processors, the answer to the second question in the master compliance readiness questionnaire; populating, by one or more processors using the ontology, the first question from the first compliance readiness questionnaire for the first set of privacy regulations with the answer to the first question in the master compliance readiness questionnaire; populating, by one or more processors using the ontology, the second question from the first compliance readiness questionnaire for the first set of privacy regulations with the answer to the second question in the master compliance readiness questionnaire; determining, by the one or more processors based at least in part on the first question from the first compliance readiness questionnaire for the first set of privacy regulations and the second question from the first compliance readiness questionnaire for the first set of privacy regulations, an indication of readiness to comply with the first set of privacy regulations.

In particular embodiments, determining the indication of readiness to comply with the first set of privacy regulations includes determining a percentage of answers to questions in the first compliance readiness questionnaire for the first set of privacy regulations that correspond to compliant answers to questions in the first compliance readiness questionnaire for the first set of privacy regulations. Determining the indication of readiness to comply with the first set of privacy regulations may include determining, based on an answer to the first question from the first compliance readiness questionnaire for the first set of privacy regulations, that at least one control from a first set of controls required by the first set of privacy regulations has been implemented. Determining the indication of readiness to comply with the first set of privacy regulations may also include determining, based on an answer to the second question from the first compliance readiness questionnaire for the first set of privacy regulations, that at least one control from a second set of controls required by the first set of privacy regulations has not been implemented. In particular embodiments, the ontology further maps the first question from the first compliance readiness questionnaire for the first set of privacy regulations to a first question from a second compliance readiness questionnaire for a second set of privacy regulations; and maps the second question from the first compliance readiness questionnaire for the first set of privacy regulations to a second question from the second compliance readiness questionnaire for the second set of privacy regulations. In particular embodiments, the ontology further maps a first question from a second compliance readiness questionnaire for a second set of privacy regulations to the first question in a master compliance questionnaire; and maps a second question from the second compliance readiness questionnaire for the second set of privacy regulations to the second question in the master compliance questionnaire.

According to various embodiments, a computer-implemented data processing method for determining data breach response activities may include: generating, by one or more computer processors, a data breach information interface soliciting a first affected jurisdiction, a second affected jurisdiction, and data breach information; presenting, by the one or more computer processors, the data breach information interface to a user; receiving, by the one or more computer processors from the user via the data breach information interface, an indication of the first affected jurisdiction, an indication of the second affected jurisdiction, and the data breach information; determining, by the one or more computer processors based on the first affected jurisdiction and the data breach information, a first plurality of data breach response requirements for the first affected jurisdiction; determining, by the one or more computer processors based on the second affected jurisdiction and the data breach information, a second plurality of data breach response requirements for the second affected jurisdiction; presenting, by the one or more computer processors to the user, a data breach response interface comprising a plurality of checklist items, wherein each checklist item of the plurality of checklist items corresponds to one requirement of the first plurality of data breach response requirements for the first affected jurisdiction or one requirement of the second plurality of data breach response requirements for the second affected jurisdiction; detecting, by the one or more computer processors, an activation by the user of a first checklist item of the plurality of checklist items; determining, by the one or more computer processors, a data breach response requirement corresponding to the first checklist item, wherein the data breach response requirement is a data breach response requirement of one of the first plurality of data breach response requirements for the first affected jurisdiction or the second plurality of data breach response requirements for the second affected jurisdiction; and storing, in a memory by the one or more computer processors, an indication of completion of the data breach response requirement.

In particular embodiments, where the data breach information interface solicits a third affected jurisdiction, the method may also include: receiving, by the one or more computer processors from the user via the data breach information interface, an indication of the third affected jurisdiction; determining, by the one or more computer processors based on the third affected jurisdiction and the data breach information, a third plurality of data breach response requirements for the third affected jurisdiction; determining, by the one or more computer processors based on the third affected jurisdiction and the data breach information, a penalty for failing to address the third plurality of data breach response requirements for the third affected jurisdiction; and determining, by the one or more computer processors based on the penalty, to generate the data breach response interface comprising the plurality of checklist items, wherein no checklist item of the plurality of checklist items corresponds to a requirement of the third plurality of data breach response requirements for the third affected jurisdiction. Where the data breach information interface solicits a third affected jurisdiction, the method may also include: receiving, by the one or more computer processors from the user via the data breach information interface, an indication of the third affected jurisdiction; determining, by the one or more computer processors based on the third affected jurisdiction and the data breach information, a third plurality of data breach response requirements for the third affected jurisdiction; determining, by the one or more computer processors based on the third affected jurisdiction and the data breach information, an enforcement frequency for failures to address the third plurality of data breach response requirements for the third affected jurisdiction; and determining, by the one or more computer processors based on the enforcement frequency, to generate the data breach response interface comprising the plurality of checklist items, wherein no checklist item of the plurality of checklist items corresponds to a requirement of the third plurality of data breach response requirements for the third affected jurisdiction. In particular embodiments, the data breach information interface solicits a third affected jurisdiction and a business value for the third affected jurisdiction, and the method further includes: determining, by the one or more computer processors based on the business value for the third affected jurisdiction, to generate the data breach response interface comprising the plurality of checklist items, wherein no checklist item of the plurality of checklist items corresponds to a requirement of a third plurality of data breach response requirements for the third affected jurisdiction. In particular embodiments, the data breach information includes at least one of a number of affected users, a data breach discovery date, a data breach discovery time, a data breach occurrence date, a data breach occurrence time, a personal data type, or a data breach discovery method. In particular embodiments, the first plurality of data breach response requirements comprises at least one of: generating a notification to a regulatory agency, generating a notification to affected data subjects, or generating a notification to an internal organization. According to various embodiments, the data breach information interface is presented to the user via a web browser.

According to various embodiments, a computer-implemented data processing method for performing data breach response activities may include: determining, by one or more computer processors, a first jurisdiction affected by a data breach; determining, by one or more computer processors, a first plurality of reporting requirements for the first jurisdiction; determining, by one or more computer processors, a second jurisdiction affected by the data breach; determining, by one or more computer processors, a second plurality of reporting requirements for the second jurisdiction; generating, by the one or more computer processors, an ontology mapping a first reporting requirement of the first plurality of reporting requirements to a second reporting requirement of the second plurality of reporting requirements; generating, by the one or more computer processors, a master questionnaire comprising a master question; mapping, in the ontology by the one or more computer processors, the first reporting requirement of the first plurality of reporting requirements to the master question; mapping, in the ontology by the one or more computer processors, the second reporting requirement of the second plurality of reporting requirements to the master question; presenting, by the one or more computer processors, the master questionnaire to a user; receiving, by the one or more computer processors, data responsive to the master question from the user; storing, by the one or more computer processors, the data responsive to the master question; associating, by the one or more computer processors using the ontology, the data responsive to the master question with the first reporting requirement of the first plurality of reporting requirement; associating, by the one or more computer processors using the ontology, the data responsive to the master question with the second reporting requirement of the second plurality of reporting requirements; generating, by the one or more computer processors, a first data breach disclosure report for the first jurisdiction, the first data breach disclosure report comprising the data responsive to the master question; and generating, by the one or more computer processors, a second data breach disclosure report for the second jurisdiction, the second data breach disclosure report comprising the data responsive to the master question.

In particular embodiments, the method may also include: determining, by the one or more computer processors, a third jurisdiction affected by a data breach; determining, by the one or more computer processors based on the third jurisdiction, a penalty for failing to address a third plurality of reporting requirements for the third jurisdiction; and determining, by the one or more computer processors based on the penalty, to generate the ontology with no mapping of a reporting requirement of the third plurality of reporting requirements to the master question. In particular embodiments, the method may also include: determining, by the one or more computer processors, a third jurisdiction affected by a data breach; determining, by the one or more computer processors based on the third jurisdiction, an enforcement frequency for failures to address a third plurality of reporting requirements for the third jurisdiction; and determining, by the one or more computer processors based on the enforcement frequency, to generate the ontology with no mapping of a reporting requirement of the third plurality of reporting requirements to the master question. In particular embodiments, the method may also include: determining, by the one or more computer processors, a third jurisdiction affected by a data breach and a business value for the third jurisdiction; and determining, by the one or more computer processors based on the business value for the third jurisdiction, to generate the ontology with no mapping of a reporting requirement of a third plurality of reporting requirements for the third jurisdiction to the master question. The master questionnaire may include a plurality of questions, such as: a first question of the plurality of questions solicits a number of affected users, a second question of the plurality of questions solicits a data breach discovery date, and a third question of the plurality of questions solicits a data breach discovery method. In particular embodiments, the method may also include: determining a first penalty for failing to address the first plurality of reporting requirements for the first jurisdiction; and determining a second penalty for failing to address the second plurality of reporting requirements for the second jurisdiction. In particular embodiments, the method may also include: determining a first enforcement frequency for failures to address the first plurality of reporting requirements for the first jurisdiction; and determining a second enforcement frequency for failures to address the second plurality of reporting requirements for the second jurisdiction.

A data breach response system, according to various embodiments, may include: one or more processors; and computer memory, wherein the data breach response system is configured for: generating a data breach information interface soliciting a first affected jurisdiction, a second affected jurisdiction, and data breach information; presenting the data breach information interface to a user; receiving, from the user via the data breach information interface, an indication of the first affected jurisdiction, an indication of the second affected jurisdiction, and the data breach information; determining, based on the first affected jurisdiction and the data breach information, a first plurality of data breach response requirements for the first affected jurisdiction; determining, based on the second affected jurisdiction and the data breach information, a second plurality of data breach response requirements for the second affected jurisdiction; generating an ontology mapping a first requirement of the first plurality of data breach response requirements to a second requirement of the second plurality of data breach response requirements; generating a master questionnaire comprising a master question; mapping the first requirement of the first plurality of data breach response requirements to the master question in the ontology; mapping the second requirement of the second plurality of data breach response requirements to the master question; determining data responsive to the master question based on the data breach information; associating the data responsive to the master question with the first requirement of the first plurality of data breach response requirements in the ontology; associating the data responsive to the master question with the second requirement of the second plurality of data breach response requirements in the ontology; generating a first data breach disclosure report for the first affected jurisdiction, the first data breach disclosure report comprising the data responsive to the master question; and generating a second data breach disclosure report for the second affected jurisdiction, the second data breach disclosure report comprising the data responsive to the master question.

In particular embodiments, the data breach information interface further solicits a third affected jurisdiction, wherein the data breach response system is further configured for: receiving, from the user via the data breach information interface, an indication of the third affected jurisdiction; determining, based on the third affected jurisdiction and the data breach information, a third plurality of data breach response requirements for the third affected jurisdiction; determining, based on the third affected jurisdiction and the data breach information, a penalty for failing to address the third plurality of data breach response requirements for the third affected jurisdiction; and determining, based on the penalty, to generate the ontology such that no question of the master questionnaire maps to a requirement of the third plurality of data breach response requirements for the third affected jurisdiction. In particular embodiments, the data breach information interface further solicits a third affected jurisdiction, and wherein the data breach response system is further configured for: receiving, from the user via the data breach information interface, an indication of the third affected jurisdiction; determining, based on the third affected jurisdiction and the data breach information, a third plurality of data breach response requirements for the third affected jurisdiction; determining, based on the third affected jurisdiction and the data breach information, an enforcement frequency for failing to address the third plurality of data breach response requirements for the third affected jurisdiction; and determining, based on the enforcement frequency, to generate the ontology such that no question of the master questionnaire maps to a requirement of the third plurality of data breach response requirements for the third affected jurisdiction. In particular embodiments, the data breach information interface further solicits a third affected jurisdiction and a business value for the third affected jurisdiction, and wherein the data breach response system is further configured for: receiving, from the user via the data breach information interface, an indication of the third affected jurisdiction; receiving, from the user via the data breach information interface, an indication of the business value for the third affected jurisdiction; determining, based on the third affected jurisdiction and the business value for the third affected jurisdiction, to generate the ontology such that no question of the master questionnaire maps to a requirement of the third plurality of data breach response requirements for the third affected jurisdiction. In particular embodiments, the data breach information comprises at least one of a number of affected users, a data breach discovery date, a data breach discovery time, a data breach occurrence date, a data breach occurrence time, or a data breach discovery method. In particular embodiments, the first data breach disclosure report is one of a notification to a regulatory agency, a notification to affected data subjects, or a notification to an internal organization.

A computer-implemented data processing method for prioritizing data breach response activities, according to various embodiments, may include: generating, by one or more computer processors, a data breach information interface soliciting a first affected jurisdiction, a second affected jurisdiction, and data breach information; presenting, by the one or more computer processors, the data breach information interface to a user; receiving, by the one or more computer processors from the user via the data breach information interface, an indication of the first affected jurisdiction, an indication of the second affected jurisdiction, and the data breach information; determining, by the one or more computer processors based on the first affected jurisdiction and the data breach information, a first reporting failure penalty for the first affected jurisdiction; determining, by the one or more computer processors based on the first affected jurisdiction and the data breach information, a first reporting deadline for the first affected jurisdiction; determining, by the one or more computer processors based on the first reporting failure penalty and the first reporting deadline, a first reporting score for the first affected jurisdiction; determining, by the one or more computer processors based on the second affected jurisdiction and the data breach information, a second reporting failure penalty for the second affected jurisdiction; determining, by the one or more computer processors based on the second affected jurisdiction and the data breach information, a second reporting deadline for the second affected jurisdiction; determining, by the one or more computer processors based on the second reporting failure penalty and the second reporting deadline, a second reporting score for the second affected jurisdiction; determining, by the one or more computer processors, that the first reporting score is greater than the second reporting score; generating, by the one or more computer processors, a data breach response interface comprising a checklist, the checklist comprising a first checklist item associated with the first affected jurisdiction and a second checklist item associated with the second affected jurisdiction, wherein, based on determining that the first reporting score is greater than the second reporting score, the first checklist item is presented earlier in the checklist than the second checklist item; presenting, by the one or more computer processors to the user, the data breach response interface; detecting, by the one or more computer processors, an activation by the user of the first checklist item; and storing, in a memory by the one or more computer processors, an indication of completion of the first checklist item.

In particular embodiments, the data breach information interface solicits a third affected jurisdiction, the method further comprising: receiving, by the one or more computer processors from the user via the data breach information interface, an indication of the third affected jurisdiction; determining, by the one or more computer processors based on the third affected jurisdiction and the data breach information, a third reporting failure penalty for the third affected jurisdiction; determining, by the one or more computer processors based on the third affected jurisdiction and the data breach information, a third reporting deadline for the third affected jurisdiction; determining, by the one or more computer processors based on the third reporting failure penalty and the third reporting deadline, a third reporting score for the first affected jurisdiction; and determining, by the one or more computer processors based on the third reporting score, to generate the data breach response interface comprising the checklist, wherein no checklist item on the checklist is associated with the third affected jurisdiction. In particular embodiments, the method may further include: determining, based on the first affected jurisdiction and the data breach information, a first cure period for the first affected jurisdiction; and determining, based on the second affected jurisdiction and the data breach information, a second cure period for the second affected jurisdiction. In particular embodiments, the method may further include: determining, based on the first affected jurisdiction and the data breach information, a first business value for the first affected jurisdiction; and determining, based on the second affected jurisdiction and the data breach information, a second business value for the second affected jurisdiction; wherein determining the first reporting score for the first affected jurisdiction is further based on the first business value, and wherein determining the second reporting score for the second affected jurisdiction is further based on the second business value. The data breach information may include at least one of a number of affected users, a data breach discovery date, a data breach discovery time, a data breach occurrence date, a data breach occurrence time, a personal data type, or a data breach discovery method. In particular embodiments, the method may further include: determining, based on the first affected jurisdiction and the data breach information, a first plurality of data breach response requirements for the first affected jurisdiction; and determining, based on the second affected jurisdiction and the data breach information, a second plurality of data breach response requirements for the first affected jurisdiction; wherein the first checklist item corresponds to a respective first requirement of the first plurality of data breach response requirements, and wherein second checklist item corresponds to a respective second requirement of the second plurality of data breach response requirements. In particular embodiments, the data breach information interface and the data breach response interface are presented to the user via a web browser.

A computer-implemented data processing method for prioritizing data breach response activities, according to various embodiments, includes: generating, by one or more computer processors, a data breach information interface soliciting a first affected jurisdiction, a second affected jurisdiction, and data breach information; presenting, by the one or more computer processors, the data breach information interface to a user; receiving, by the one or more computer processors from the user via the data breach information interface, an indication of the first affected jurisdiction, an indication of the second affected jurisdiction, and the data breach information; determining, by the one or more computer processors based on the first affected jurisdiction and the data breach information, first reporting requirements for the first affected jurisdiction; determining, by the one or more computer processors based on the first affected jurisdiction and the data breach information, first enforcement characteristics for the first affected jurisdiction; determining, by the one or more computer processors based on the first reporting requirements and the first enforcement characteristics, a first reporting score for the first affected jurisdiction; determining, by the one or more computer processors based on the second affected jurisdiction and the data breach information, second reporting requirements for the second affected jurisdiction; determining, by the one or more computer processors based on the second affected jurisdiction and the data breach information, second enforcement characteristics for the second affected jurisdiction; determining, by the one or more computer processors based on the second reporting requirements and the second enforcement characteristics, a second reporting score for the second affected jurisdiction; assigning, by the one or more computer processors based on the first reporting score, a first visual indicator to the first affected jurisdiction; assigning, by the one or more computer processors based on the second reporting score, a second visual indicator to the second affected jurisdiction; generating, by the one or more computer processors, a data breach response map, the data breach response map comprising the first visual indicator and the second visual indicator; presenting, by the one or more computer processors to the user, the data breach response map; detecting, by the one or more computer processors via the data breach response map, a selection by the user of the first visual indicator; responsive to detecting the selection of the first visual indicator, generating, by the one or more computer processors, a first graphical listing of the first reporting requirements; and presenting, by the one or more computer processors to the user, the first graphical listing of the first reporting requirements.

In particular embodiments, the first visual indicator is a first color, wherein the second visual indicator is a second color, and wherein generating the data breach response map comprises: generating a first visual representation of the first affected jurisdiction in the first color; and generating a second visual representation of the second affected jurisdiction in the second color. In particular embodiments, the first visual indicator is a first texture, wherein the second visual indicator is a second texture, and wherein generating the data breach response map comprises: generating a first visual representation of the first affected jurisdiction in the first texture; and generating a second visual representation of the second affected jurisdiction in the second texture. In particular embodiments, the first enforcement characteristics comprise a first data breach reporting deadline and a first data breach reporting failure penalty, and wherein the second enforcement characteristics comprise a second data breach reporting deadline and a second data breach reporting failure penalty. In particular embodiments, the data breach information comprises at least one of a number of affected users, a data breach discovery date, a data breach discovery method, or a type of personal data. In particular embodiments, the data breach information comprises a first business value for the first affected jurisdiction and a second business value for the second affected jurisdiction. In particular embodiments, determining the first reporting score for the first affected jurisdiction is further based on the first business value, and wherein determining the second reporting score for the second affected jurisdiction is further based on the second business value.

A data breach response prioritization system, according to various embodiments, includes: one or more processors; and computer memory, wherein the data breach response system is configured for: generating a data breach information interface soliciting a first affected jurisdiction, a second affected jurisdiction, and data breach information; presenting the data breach information interface to a user; receiving, from the user via the data breach information interface, an indication of the first affected jurisdiction, an indication of the second affected jurisdiction, and the data breach information; determining, based on the first affected jurisdiction and the data breach information, a first plurality of data breach response requirements for the first affected jurisdiction, a first reporting deadline for the first affected jurisdiction, and a first reporting failure penalty for the first affected jurisdiction; determining, based on the second affected jurisdiction and the data breach information, a second plurality of data breach response requirements for the second affected jurisdiction, a second reporting deadline for the second affected jurisdiction, and a second reporting failure penalty for the second affected jurisdiction; determining a first reporting score for the first affected jurisdiction based on the first plurality of data breach response requirements, the first reporting deadline, and the first reporting failure penalty; determining a second reporting score for the second affected jurisdiction based on the second plurality of data breach response requirements, the second reporting deadline, and the second reporting failure penalty; assigning a first color to the first affected jurisdiction based on the first reporting score; assigning a second color to the second affected jurisdiction based on the second reporting score; generating a data breach response map comprising a first visual representation of the first affected jurisdiction in the first color and a second visual representation of the second affected jurisdiction in the second color; presenting the data breach response map to the user; detecting a selection of the first visual representation of the first affected jurisdiction by the user; responsive to detecting the selection of the first visual representation of the first affected jurisdiction, generating a first graphical listing of the first plurality of data breach response requirements; and presenting the first graphical listing of the first plurality of data breach response requirements to the user.

In particular embodiments, the data breach information interface further solicits a third affected jurisdiction, and wherein the data breach response system is further configured for: receiving, from the user via the data breach information interface, an indication of the third affected jurisdiction; determining, based on the third affected jurisdiction and the data breach information, a third plurality of data breach response requirements for the third affected jurisdiction, a third reporting deadline for the third affected jurisdiction, and a third reporting failure penalty for the third affected jurisdiction; determining a third reporting score for the third affected jurisdiction based on the third plurality of data breach response requirements, the third reporting deadline, and the third reporting failure penalty; assigning a color indicating that no data breach response is required to the third affected jurisdiction based on the third reporting score; and generating the data breach response map comprising a third visual representation of the third affected jurisdiction in the color indicating that no data breach response is required. In particular embodiments, assigning the color indicating that no data breach response is required to the third affected jurisdiction based on the third reporting score comprises determining that the third reporting score fails to meet a threshold. In particular embodiments, assigning the first color to the first affected jurisdiction based on the first reporting score comprises determining that the first reporting score meets a first threshold, and wherein assigning the second color to the second affected jurisdiction based on the second reporting score comprises determining that the second reporting score meets a second threshold. In particular embodiments, the data breach information comprises at least one of a number of affected users, a data breach discovery date, a data breach discovery time, a data breach occurrence date, a data breach occurrence time, a personal data type, or a data breach discovery method. In particular embodiments, the first plurality of data breach response requirements comprise at least one of a notification to a regulatory agency, a notification to affected data subjects, or a notification to an internal organization.

A computer-implemented data processing method for determining a required data privacy activity, according to various embodiments, may include: receiving, by one or more computer processors from a user via a graphical user interface, an indication of a first jurisdiction and an indication of a second jurisdiction; determining, by one or more computer processors based on the first jurisdiction; a data privacy requirement for the first jurisdiction; determining, by one or more computer processors based on the second jurisdiction; a data privacy requirement for the second jurisdiction; determining, by one or more computer processors, that satisfying the data privacy requirement for the first jurisdiction conflicts with satisfying the data privacy requirement for the second jurisdiction; in response to determining that satisfying the data privacy requirement for the first jurisdiction conflicts with satisfying the data privacy requirement for the second jurisdiction, automatically, by one or more computer processors: assessing a first risk level associated with not satisfying the data privacy requirement for the first jurisdiction; and assessing a second risk level associated with not satisfying the data privacy requirement for the second jurisdiction; performing a comparison of the first risk level with the second risk level to determine which of the first risk level and the second risk level is a lowest risk level; determining, by one or more processors based on the lowest risk level, a required data privacy activity; and electronically communicating, by one or more processors, an indication of the required data privacy activity.

In particular embodiments, the data processing method may further include automatically performing the required data privacy activity. In particular embodiments, the data privacy requirement for the first jurisdiction comprises a first personal data retention policy; and wherein the data privacy requirement for the second jurisdiction comprises a second personal data retention policy. In particular embodiments, assessing the first risk level associated with not satisfying the data privacy requirement for the first jurisdiction comprises determining a first penalty for not satisfying the data privacy requirement for the first jurisdiction; and wherein assessing the second risk level associated with not satisfying the data privacy requirement for the second jurisdiction comprises determining a second penalty for not satisfying the data privacy requirement for the first jurisdiction. In particular embodiments, assessing the first risk level associated with not satisfying the data privacy requirement for the first jurisdiction comprises determining a first enforcement rate for violations of the data privacy requirement for the first jurisdiction; and wherein assessing the second risk level associated with not satisfying the data privacy requirement for the second jurisdiction comprises determining a second enforcement rate for violations of the data privacy requirement for the first jurisdiction. In particular embodiments, assessing the first risk level associated with not satisfying the data privacy requirement for the first jurisdiction comprises determining a first volume of data processed in the first jurisdiction; and assessing the second risk level associated with not satisfying the data privacy requirement for the second jurisdiction comprises determining a second volume of data processed in the first jurisdiction. In particular embodiments, electronically communicating the indication of the required data privacy activity comprises presenting, on the graphical user interface, a recommended course of action comprising the indication of the required data privacy activity.

A computer-implemented data processing method for performing data breach response activities, according to various embodiments, may include: determining, by one or more computer processors, a first jurisdiction affected by a data breach; determining, by one or more computer processors, a first reporting requirement for the first jurisdiction; determining, by one or more computer processors, a second jurisdiction affected by the data breach; determining, by one or more computer processors, a second reporting requirement for the second jurisdiction; determining, by one or more computer processors, that performing the first reporting requirement for the first jurisdiction and performing the second reporting requirement for the second jurisdiction is not possible; in response to determining that performing the first reporting requirement for the first jurisdiction and performing the second reporting requirement for the second jurisdiction is not possible, automatically, by one or more computer processors: assessing a first risk level associated with not performing the first reporting requirement for the first jurisdiction; and assessing a second risk level associated with not performing the second reporting requirement for the second jurisdiction; performing a comparison of the first risk level with the second risk level to determine that the first risk level is lower than the second risk level; determining, by one or more processors based on determining that the first risk level is lower than the second risk level, to perform the first reporting requirement for the first jurisdiction; and automatically performing, by one or more processors, the first reporting requirement for the first jurisdiction.

In particular embodiments, the data processing method may further include electronically storing an indication that the second reporting requirement for the second jurisdiction was not performed. In particular embodiments, the data processing method may further include electronically communicating the indication that the second reporting requirement for the second jurisdiction was not performed to a user. In particular embodiments, determining the first jurisdiction affected by the data breach comprises receiving an indication of the first jurisdiction as an answer to a first question in a questionnaire; and determining the second jurisdiction affected by the data breach comprises receiving an indication of the second jurisdiction as an answer to a second question in the questionnaire. In particular embodiments, determining the first reporting requirement for the first jurisdiction comprises using an ontology to determine the first reporting requirement for the first jurisdiction based on the answer to the first question in the questionnaire; and determining the second reporting requirement for the second jurisdiction comprises using the ontology to determine the second reporting requirement for the second jurisdiction based on the answer to the second question in the questionnaire. In particular embodiments, assessing the first risk level associated with not performing the first reporting requirement for the first jurisdiction comprises determining a first deadline for performing the first reporting requirement for the first jurisdiction; and assessing the second risk level associated with not performing the second reporting requirement for the second jurisdiction comprises determining a second deadline for performing the second reporting requirement for the second jurisdiction. In particular embodiments, determining the first deadline for performing the first reporting requirement for the first jurisdiction comprises accessing an ontology using an indication of the first jurisdiction to determine the first deadline for performing the first reporting requirement for the first jurisdiction; and determining the second deadline for performing the second reporting requirement for the second jurisdiction comprises accessing an ontology using an indication of the second jurisdiction to determine the second deadline for performing the second reporting requirement for the second jurisdiction.

A data breach response system, according to various embodiments, may include: one or more processors; and computer memory, wherein the data breach response system is configured for: generating a data breach information interface soliciting a first affected jurisdiction, a second affected jurisdiction, and data breach information; presenting the data breach information interface to a user; receiving, from the user via the data breach information interface, an indication of the first affected jurisdiction, an indication of the second affected jurisdiction, and the data breach information; determining, based on the first affected jurisdiction and the data breach information, a first data breach response requirement for the first affected jurisdiction; determining, based on the second affected jurisdiction and the data breach information, a second data breach response requirement for the second affected jurisdiction; generating an ontology mapping the first data breach response requirement for the first affected jurisdiction to the second data breach response requirement for the second affected jurisdiction; determining that performing the mapping the first data breach response requirement for the first affected jurisdiction and performing the second data breach response requirement for the second affected jurisdiction is not possible; and in response to determining that performing the mapping the first data breach response requirement for the first affected jurisdiction and performing the second data breach response requirement for the second affected jurisdiction is not possible: assessing a first risk level associated with not performing the first data breach response requirement for the first affected jurisdiction; and assessing a second risk level associated with not performing the second data breach response requirement for the second affected jurisdiction; performing a comparison of the first risk level with the second risk level to determine that the first risk level is lower than the second risk level; generating a master questionnaire comprising a master question; mapping the first data breach response requirement for the first affected jurisdiction to the master question in the ontology and not mapping the second data breach response requirement for the second affected jurisdiction to a question in the master questionnaire; determining data responsive to the master question based on the data breach information; associating the data responsive to the master question with the first data breach response requirement for the first affected jurisdiction in the ontology; and generating a first data breach disclosure report for the first affected jurisdiction, the first data breach disclosure report comprising the data responsive to the master question.

In particular embodiments, the data breach information comprises at least one of a number of affected users, a data breach discovery date, a data breach discovery time, a data breach occurrence date, a data breach occurrence time, or a data breach discovery method. In particular embodiments, the first data breach disclosure report is one of a notification to a regulatory agency, a notification to affected data subjects, or a notification to an internal organization. In particular embodiments, the data breach response system is further configured for: determining, based on the first affected jurisdiction and the data breach information, a first plurality of data breach response requirements for the first affected jurisdiction; and generating a data breach response interface comprising a checklist, the checklist comprising a plurality of checklist items, wherein each of the plurality of checklist items is associated with a respective requirement of the first plurality of data breach response requirements, and wherein none of the plurality of checklist items is associated with the second affected jurisdiction. In particular embodiments, assessing the first risk level associated with not performing the first data breach response requirement for the first affected jurisdiction comprises determining a first reporting score for the first affected jurisdiction; and wherein assessing the second risk level associated with not performing the second data breach response requirement for the second affected jurisdiction comprises determining a second reporting score for the second affected jurisdiction. In particular embodiments, the data breach response system is further configured for: determining, based on the first affected jurisdiction and the data breach information, a first business value for the first affected jurisdiction; and determining, based on the second affected jurisdiction and the data breach information, a second business value for the second affected jurisdiction; wherein determining the first reporting score for the first affected jurisdiction is based on the first business value, and wherein determining the second reporting score for the second affected jurisdiction is based on the second business value.

The details of one or more embodiments of the subject matter described in this specification are set forth in the accompanying drawings and the description below. Other features, aspects, and advantages of the subject matter may become apparent from the description, the drawings, and the claims.

BRIEF DESCRIPTION OF THE DRAWINGS

Various embodiments of a system and method for operationalizing privacy compliance and assessing risk of privacy campaigns are described below. In the course of this description, reference will be made to the accompanying drawings, which are not necessarily drawn to scale, and wherein.

DETAILED DESCRIPTION

Figure 1:
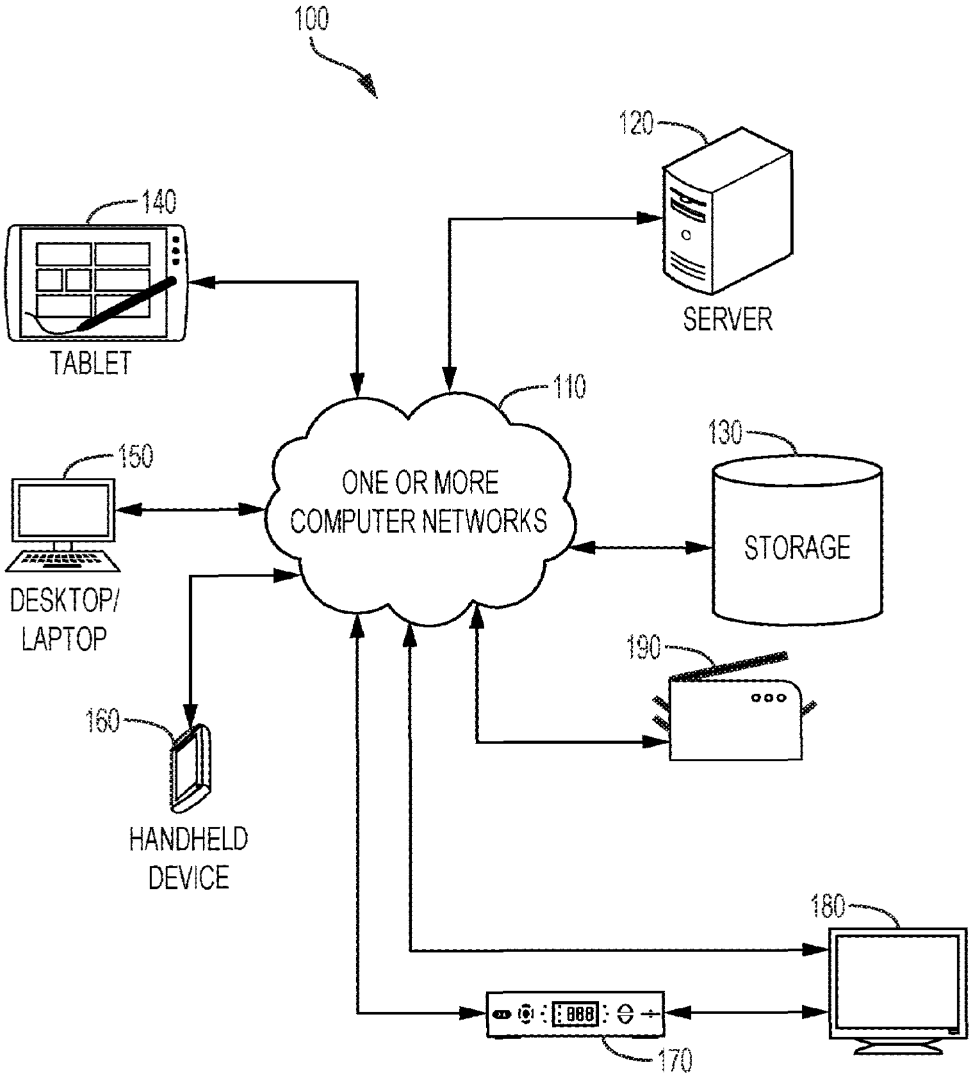
FIG. 1 is a diagram illustrating an exemplary network environment in which the present systems and methods for operationalizing privacy compliance may operate.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

According to exemplary embodiments, a system for operationalizing privacy compliance is described herein. The system may be comprised of one or more servers and client computing devices that execute software modules that facilitate various functions.

A Main Privacy Compliance Module is operable to allow a user to initiate the creation of a privacy campaign (i.e., a business function, system, product, technology, process, project, engagement, initiative, campaign, etc., that may utilize personal data collected from one or more persons or entities). The personal data may contain PII that may be sensitive personal data. The user can input information such as the name and description of the campaign. The user may also select whether he/she will take ownership of the campaign (i.e., be responsible for providing the information needed to create the campaign and oversee the conducting of privacy audits related to the campaign), or assign the campaign to one or more other persons. The Main Privacy Compliance Module can generate a sequence or serious of GUI windows that facilitate the entry of campaign data representative of attributes related to the privacy campaign (e.g., attributes that might relate to the description of the personal data, what personal data is collected, whom the data is collected from, the storage of the data, and access to that data).

Based on the information input, a Risk Assessment Module may be operable to take into account Weighting Factors and Relative Risk Ratings associated with the campaign in order to calculate a numerical Risk Level associated with the campaign, as well as an Overall Risk Assessment for the campaign (i.e., low-risk, medium risk, or high risk). The Risk Level may be indicative of the likelihood of a breach involving personal data related to the campaign being compromised (i.e., lost, stolen, accessed without authorization, inadvertently disclosed, maliciously disclosed, etc.). An inventory page can visually depict the Risk Level for one or more privacy campaigns.

After the Risk Assessment Module has determined a Risk Level for a campaign, a Privacy Audit Module may be operable to use the Risk Level to determine an audit schedule for the campaign. The audit schedule may be editable, and the Privacy Audit Module also facilitates the privacy audit process by sending alerts when a privacy audit is impending, or sending alerts when a privacy audit is overdue.

The system may also include a Data Flow Diagram Module for generating a data flow diagram associated with a campaign. An exemplary data flow diagram displays one or more shapes representing the source from which data associated with the campaign is derived, the destination (or location) of that data, and which departments or software systems may have access to the data. The Data Flow Diagram Module may also generate one or more security indicators for display. The indicators may include, for example, an "eye" icon to indicate that the data is confidential, a "lock" icon to indicate that the data, and/or a particular flow of data, is encrypted, or an "unlocked lock" icon to indicate that the data, and/or a particular flow of data, is not encrypted. Data flow lines may be colored differently to indicate whether the data flow is encrypted or unencrypted.

The system also provides for a Communications Module that facilitates the creation and transmission of notifications and alerts (e.g., via email). The Communications Module may also instantiate an instant messaging session and overlay the instant messaging session over one or more portions of a GUI in which a user is presented with prompts to enter or select information.

In particularly embodiments, a vendor risk scanning system is configured to scan one or more webpages associated with a particular vendor (e.g., provider of particular software, particular entity, etc.) in order to identify one or more vendor attributes. In particular embodiments, the system may be configured to scan the one or more web pages to identify one or more vendor attributes such as, for example: (1) one or more security certifications that the vendor does or does not have (e.g., ISO 27001, SOC II Type 2, etc.); (2) one or more awards and/or recognitions that the vendor has received (e.g., one or more security awards); (3) one or more security policies and/or 3rd party vendor parties; (4) one or more privacy policies and/or cookie policies for the one or more webpages; (5) one or more key partners or potential sub processors of one or more services associated with the vendor; and/or (6) any other suitable vendor attribute. Other suitable vendor attributes may include, for example, membership in a Privacy Shield, use of Standardized Information Gathering (SIG), etc.

In various embodiments, the system is configured to scan the one or more webpages by: (1) scanning one or more pieces of computer code associated with the one or more webpages (e.g., HTML, Java, etc.); (2) scanning one or more contents of the one or more webpages (e.g., using one or more natural language processing techniques); (3) scanning for one or more particular images on the one or more webpages (e.g., one or more images that indicate membership in a particular organization, receipt of a particular award etc.; and/or (4) using any other suitable scanning technique. The system may, for example, identify one or more image hosts of one or more images identified on the website, analyze the contents of a particular identified privacy or cookie policy that is displayed on the one or more webpages, etc. The system may, for example, be configured to automatically detect the one or more vendor attributes described above.

In various embodiments, the system may, for example: (1) analyze the one or more vendor attributes; and (2) calculate a risk rating for the vendor based at least in part on the one or more vendor attributes. In particular embodiments, the system is configured to automatically assign a suitable weighting factor to each of the one or more vendor attributes when calculating the risk rating. In particular embodiments, the system is configured to analyze one or more pieces of the vendor's published applications of software available to one or more customers for download via the one or more webpages to detect one or more privacy disclaimers associated with the published applications. The system may then, for example, be configured to use one or more text matching techniques to determine whether the one or more privacy disclaimers contain one or more pieces of language required by one or more prevailing industry or legal requirements related to data privacy. The system may, for example, be configured to assign a relatively low risk score to a vendor whose software (e.g., and/or webpages) includes required privacy disclaimers, and configured to assign a relatively high risk score to a vendor whose one or more webpages do not include such disclaimers.

In another example, the system may be configured to analyze one or more websites associated with a particular vendor for one or more privacy notices, one or more blog posts, one or more preference centers, and/or one or more control centers. The system may, for example, calculate the vendor risk score based at least in part on a presence of one or more suitable privacy notices, one or more contents of one or more blog posts on the vendor site (e.g., whether the vendor sire has one or more blog posts directed toward user privacy), a presence of one or more preference or control centers that enable visitors to the site to opt in or out of certain data collection policies (e.g., cookie policies, etc.), etc.

In particular other embodiments, the system may be configured to determine whether the particular vendor holds one or more security certifications. The one or more security certifications may include, for example: (1) system and organization control (SOC); (2) International Organization for Standardization (ISO); (3) Health Insurance Portability and Accountability ACT (HIPPA); (4) etc. In various embodiments, the system is configured to access one or more public databases of security certifications to determine whether the particular vendor holds any particular certification. The system may then determine the privacy awareness score based on whether the vendor holds one or more security certifications (e.g., the system may calculate a relatively higher score depending on one or more particular security certifications held by the vendor). The system may be further configured to scan a vendor website for an indication of the one or more security certifications. The system may, for example, be configured to identify one or more images indicated receipt of the one or more security certifications, etc.

In still other embodiments, the system is configured to analyze one or more social networking sites (e.g., LinkedIn, Facebook, etc.) and/or one or more business related job sites (e.g., one or more job-posting sites, one or more corporate websites, etc.) or other third-party websites that are associated with the vendor (e.g., but not maintained by the vendor). The system may, for example, use social networking and other data to identify one or more employee titles of the vendor, one or more job roles for one or more employees of the vendor, one or more job postings for the vendor, etc. The system may then analyze the one or more job titles, postings, listings, roles, etc. to determine whether the vendor has or is seeking one or more employees that have a role associated with data privacy or other privacy concerns. In this way, the system may determine whether the vendor is particularly focused on privacy or other related activities. The system may then calculate a privacy awareness score and/or risk rating based on such a determination (e.g., a vendor that has one or more employees whose roles or titles are related to privacy may receive a relatively higher privacy awareness score).

In particular embodiments, the system may be configured to calculate the privacy awareness score using one or more additional factors such as, for example: (1) public information associated with one or more events that the vendor is attending; (2) public information associated with one or more conferences that the vendor has participated in or is planning to participate in; (3) etc. In some embodiments, the system may calculate a privacy awareness score based at least in part on one or more government relationships with the vendor. For example, the system may be configured to calculate a relatively high privacy awareness score for a vendor that has one or more contracts with one or more government entities (e.g., because an existence of such a contract may indicate that the vendor has passed one or more vetting requirements imposed by the one or more government entities).

In any embodiment described herein, the system may be configured to assign, identify, and/or determine a weighting factor for each of a plurality of factors used to determine a risk rating score for a particular vendor. For example, when calculating the rating, the system may assign a first weighting factor to whether the vendor has one or more suitable privacy notices posted on the vendor website, a second weighting factor to whether the vendor has one or more particular security certifications, etc. The system may, for example, assign one or more weighting factors using any suitable technique described herein with relation to risk rating determination. In some embodiments, the system may be configured to receive the one or more weighting factors (e.g., from a user). In other embodiments, the system may be configured to determine the one or more weighting factors based at least in part on a type of the factor.

In any embodiment described herein, the system may be configured to determine an overall risk rating for a particular vendor (e.g., particular piece of vendor software) based in part on the privacy awareness score. In other embodiments, the system may be configured to determine an overall risk rating for a particular vendor based on the privacy awareness rating in combination with one or more additional factors (e.g., one or more additional risk factors described herein). In any such embodiment, the system may assign one or more weighting factors or relative risk ratings to each of the privacy awareness score and other risk factors when calculating an overall risk rating. The system may then be configured to provide the risk score for the vendor, software, and/or service for use in calculating a risk of undertaking a particular processing activity that utilizes the vendor, software, and/or service (e.g., in any suitable manner described herein).

In a particular example, the system may be configured to identify whether the vendor is part of a Privacy Shield arrangement. In particular, a privacy shield arrangement may facilitate monitoring of an entity's compliance with one or more commitments and enforcement of those commitments under the privacy shield. In particular, an entity entering a privacy shield arrangement may, for example: (1) be obligated to publicly commit to robust protection of any personal data that it handles; (2) be required to establish a clear set of safeguards and transparency mechanisms on who can access the personal data it handles; and/or (3) be required to establish a redress right to address complaints about improper access to the personal data.

In a particular example of a privacy shield, a privacy shield between the United States and Europe may involve, for example: (1) establishment of responsibility by the U.S. Department of Commerce to monitor an entity's compliance (e.g., a company's compliance) with its commitments under the privacy shield; and (2) establishment of responsibility of the Federal Trade Commission having enforcement authority over the commitments. In a further example, the U.S. Department of Commerce may designate an ombudsman to hear complaints from Europeans regarding U.S. surveillance that affects personal data of Europeans.

In some embodiments, the one or more regulations may include a regulation that allows data transfer to a country or entity that participates in a safe harbor and/or privacy shield as discussed herein. The system may, for example, be configured to automatically identify a transfer that is subject to a privacy shield and/or safe harbor as 'low risk.' In this example, U.S. Privacy Shield members may be maintained in a database of privacy shield members (e.g., on one or more particular webpages such as at www.privacyshield.gov). The system may be configured to scan such webpages to identify whether the vendor is part of the privacy shield.

In particular embodiments, the system may be configured to monitor the one or more websites (e.g., one or more webpages) to identify one or more changes to the one or more vendor attributes. For example, a vendor may update a privacy policy for the website (e.g., to comply with one or more legal or policy changes). In some embodiments, a change in a privacy policy may modify a relationship between a website and its users. In such embodiments, the system may be configured to: (1) determine that a particular website has changed its privacy policy; and (2) perform a new scan of the website in response to determining the change. The system may, for example, scan a website's privacy policy at a first time and a second time to determine whether a change has occurred. The system may be configured to analyze the change in privacy policy to determine whether to modify the calculated risk rating for the vendor (e.g., based on the change).

The system may, for example, be configured to continuously monitor for one or more changes. In other embodiments, the system may be configured to scan for one or more changes according to a particular schedule (e.g., hourly, daily, weekly, or any other suitable schedule). For example, the system may be configured to scan the one or more webpages on an ongoing basis to determine whether the one or more vendor attributes have changed (e.g., if the vendor did not renew its Privacy Shield membership, lost its ISO certification, etc.).

Technical Contributions of Various Embodiments

An entity that handles (e.g., collects, receives, transmits, stores, processes, shares, and/or the like) sensitive and/or personal information associated with particular individuals (e.g., personally identifiable information (PII) data, sensitive data, personal data, etc.) may be subject to various laws, regulations, and/or requirements regarding the handling of such personal data. These laws, regulations, and/or requirements may vary based on the jurisdiction in which the entity is operating, the jurisdiction in which a person or entity associated with the data ("data subject") handled by the entity is located, and/or the jurisdiction in which the data is handled. In many jurisdictions, an entity that handles particular types of data may be required to take one or more actions in regard to such data and/or track the ways in which such data is handled in order to be in compliance with one or more applicable laws, regulations, and/or requirements. The entity may also, or instead, be required to maintain and/or readily generate information that indicates the actions that the entity takes to comply with such laws, regulations, and/or requirements (e.g., documentation on where the data is stored, how the data is processed, how the data is collected, who has access to the data, security measures in place to protect the data, etc.). The entity may be required to have this information available (or have to ability to obtain this information) to comply with various aspects of the one or more applicable regulations and/or requirements. The entity may also, or instead, want or be able to have this information available (or have to ability to obtain this information) to perform one or more other functions, such as proactively ensuring compliance with upcoming changes to laws, regulations, and/or requirements, ensuring ongoing compliance with applicable laws, regulations, and/or requirements, determining an extent of compliance at the time of an incident, etc.

As an entity increases the number of jurisdictions in which it operates and/or as the regulations in force in each such jurisdiction change over time, the quantity of regulations with which an entity is required to be in compliance can change often and may increase dramatically. Other types of requirements with which the entity may wish to remain in compliance (e.g., standards body requirements, industry group requirements, etc.) may also be added and/or changed over time and may also vary by jurisdiction, country, territory, etc. Accordingly, determining an entity's extent of compliance with an increasing number of regularly changing regulations and/or requirements may become increasing challenging over time.

Accordingly, various embodiments of present disclosure overcome many of the technical challenges associated with determining compliance with numerous and varying regulations and requirements as mentioned above. Specifically, various embodiments of the disclosure are directed to a computational framework configured for displaying only a limited list of questions regarding requirements that may be common among multiple regulations and requirements and soliciting answers from a user to such questions. The various embodiments may then correlate the answers to the limited list of questions received from the user and populate separate data structures for each regulation and requirement with the information received. The system can then determine compliance for each individual set of regulations or requirements using its respective data structures. Accordingly, the various embodiments spare users from the time-consuming operations of obtaining a questionnaire for each applicable set of regulations or requirements, navigating within each such questionnaire, and answering each individual question within each such questionnaire for each requirement of each applicable set of regulations or requirements. The various embodiments thus increase the efficiency with which users can provide information that can be used by the various disclosed systems to automatically determine compliance with multiple regulations and/or requirements.

Accordingly, various embodiments of the disclosure provided herein are more effective, efficient, timely, accurate, and faster in determining an entity's compliance with multiple particular regulations and other requirements (e.g., standards body requirements, industry requirements, etc.). In addition, various embodiments of the disclosure provided herein can facilitate the identification and/or documentation of (e.g., automated) processes and activities performed by an entity in its efforts to comply with multiple various regulations and requirements. These activities may be performed by and/or involve various data assets and/or data sources and may be performed to comply with numerous regulations and requirements. Various embodiments of the disclosure can carry out data processing related to determining the extent of an entity's compliance with various regulations and requirements that cannot be feasibly performed by a human, especially when such data processing involves large volumes of data (e.g., numerous requirements associated with multiple sets of regulations and/or requirements). This is especially advantageous when data processing must be carried out over a reasonable timeframe to ensure that an extent of compliance with various sets of regulations and/or requirements is determined. In doing so, various embodiments of the present disclosure make major technical contributions to improving the computational efficiency and reliability of various automated systems and procedures for determining an extent of compliance with one or more particular regulations and/or requirements and/or extents of compliance between multiple regulations and/or requirements. This in turn translates to more computationally efficient software systems. Further detail is now provided for different aspects of various embodiments of the disclosure.

Exemplary Technical Platforms

As will be appreciated by one skilled in the relevant field, a system for operationalizing privacy compliance and assessing risk of privacy campaigns may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web, mobile, wearable computer-implemented, computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each step of the block diagrams and flowchart illustrations, and combinations of steps in the block diagrams and flowchart illustrations, respectively, may be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart step or steps These computer program instructions may also be stored in a computer-readable memory that may direct a computer or other programmable data processing apparatus to function in a particular manner such that the instructions stored in the computer-readable memory produce an article of manufacture that is configured for implementing the function specified in the flowchart step or steps. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart step or steps.

Accordingly, steps of the block diagrams and flowchart illustrations support combinations of mechanisms for performing the specified functions, combinations of steps for performing the specified functions, and program instructions for performing the specified functions. It should also be understood that each step of the block diagrams and flowchart illustrations, and combinations of steps in the block diagrams and flowchart illustrations, may be implemented by special purpose hardware-based computer systems that perform the specified functions or steps, or combinations of special purpose hardware and other hardware executing appropriate computer instructions.

Example System Architecture

FIG. 1 is a block diagram of a System 100 according to a particular embodiment. As may be understood from this figure, the System 100 includes one or more computer networks 110, a Server 120, a Storage Device 130 (which may contain one or more databases of information), one or more remote client computing devices such as a tablet computer 140, a desktop or laptop computer 150, or a handheld computing device 160, such as a cellular phone, browser and Internet capable set-top boxes 170 connected with a TV 180, or even smart TVs 180 having browser and Internet capability. The client computing devices attached to the network may also include copiers/printers 190 having hard drives (a security risk since copies/prints may be stored on these hard drives). The Server 120, client computing devices, and Storage Device 130 may be physically located in a central location, such as the headquarters of the organization, for example, or in separate facilities. The devices may be owned or maintained by employees, contractors, or other third parties (e.g., a cloud service provider). In particular embodiments, the one or more computer networks 110 facilitate communication between the Server 120, one or more client computing devices 140, 150, 160, 170, 180, 190, and Storage Device 130.

The one or more computer networks 110 may include any of a variety of types of wired or wireless computer networks such as the Internet, a private intranet, a public switched telephone network (PSTN), or any other type of network. The communication link between the Server 120, one or more client computing devices 140, 150, 160, 170, 180, 190, and Storage Device 130 may be, for example, implemented via a Local Area Network (LAN) or via the Internet.

Example Computer Architecture Used Within the System

Figure 2:
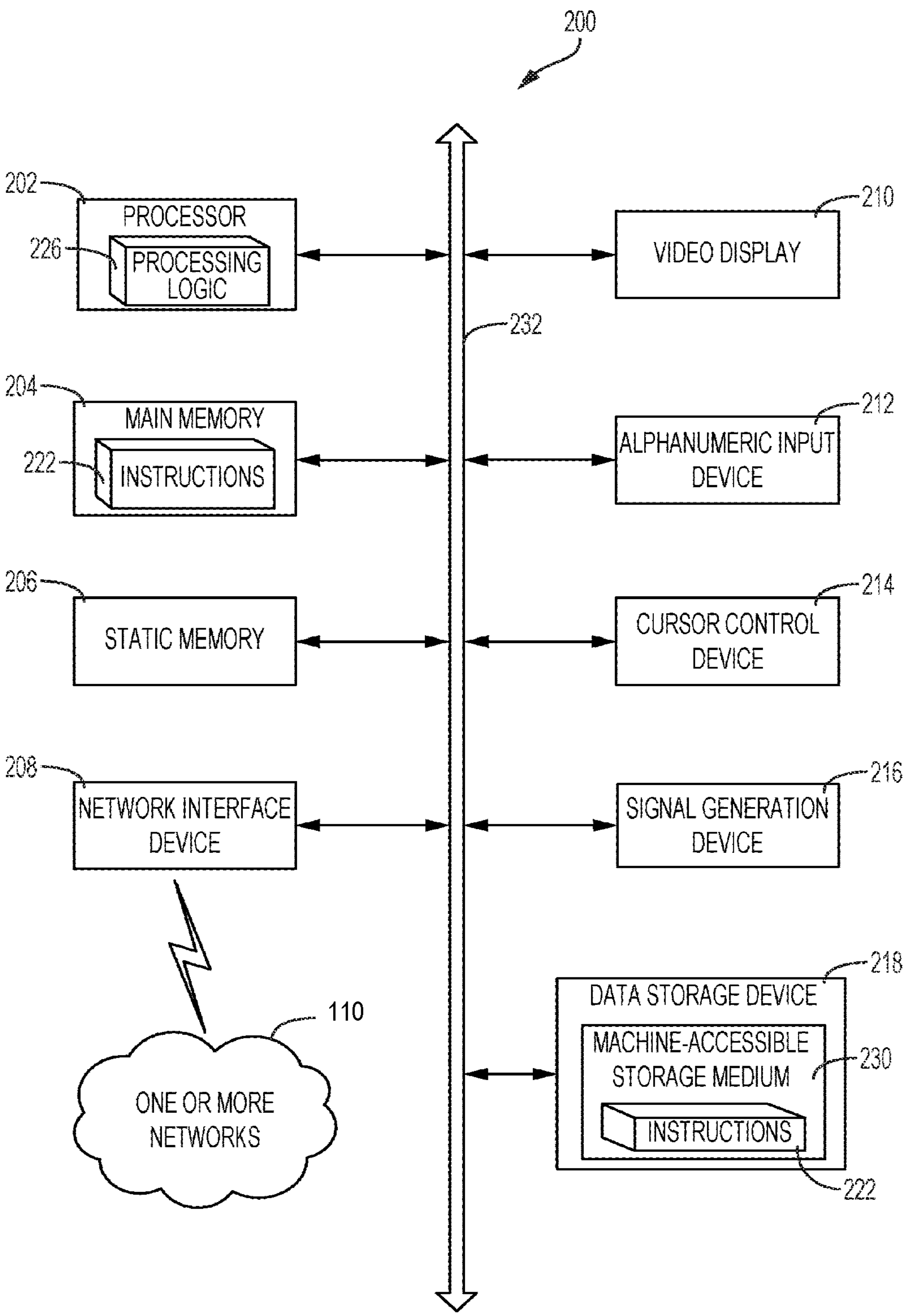
FIG. 2 is a schematic diagram of a computer (such as the server 120; or user device 140, 150, 160, 170, 180, 190; and/or such as the vendor risk scanning server 1100, or one or more remote computing devices 1500) that is suitable for use in various embodiments.

FIG. 2 illustrates a diagrammatic representation of the architecture of a computer 200 that may be used within the System 100, for example, as a client computer (e.g., one of client computing devices 140, 150, 160, 170, 180, 190, shown in FIG. 1), or as a server computer (e.g., Server 120 shown in FIG. 1). In exemplary embodiments, the computer 200 may be suitable for use as a computer within the context of the System 100 that is configured to operationalize privacy compliance and assess risk of privacy campaigns. In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 200 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker). The data storage device 218 may include a non-transitory computer-readable storage medium 230 (also known as a non-transitory computer-readable storage medium or a non-transitory computer-readable medium) on which is stored one or more sets of instructions 222 (e.g., software, software modules) embodying any one or more of the methodologies or functions described herein. The instructions 222 may also reside, completely or at least partially, within main memory 204 and/or within processing device 202 during execution thereof by computer 200—main memory 204 and processing device 202 also constituting computer-accessible storage media. The instructions 222 may further be transmitted or received over a network 110 via network interface device 208.

While the computer-readable storage medium 230 is shown in an exemplary embodiment to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium that is capable of storing, encoding or carrying a set of instructions for execution by the computer and that cause the computer to perform any one or more of the methodologies of the present invention. The term "computer-readable storage medium" should accordingly be understood to include, but not be limited to, solid-state memories, optical and magnetic media, etc.

Exemplary System Platform

According to various embodiments, the processes and logic flows described in this specification may be performed by a system (e.g., System 100) that includes, but is not limited to, one or more programmable processors (e.g., processing device 202) executing one or more computer program modules to perform functions by operating on input data and generating output, thereby tying the process to a particular machine (e.g., a machine programmed to perform the processes described herein). This includes processors located in one or more of client computers (e.g., client computing devices 140, 150, 160, 170, 180, 190 of FIG. 1). These devices connected to network 110 may access and execute one or more Internet browser-based program modules that are "served up" through the network 110 by one or more servers (e.g., server 120 of FIG. 1), and the data associated with the program may be stored on a one or more storage devices, which may reside within a server or computing device (e.g., Main Memory 204, Static Memory 206), be attached as a peripheral storage device to the one or more servers or computing devices, or attached to the network (e.g., Storage Device 130).

The System 100 facilitates the acquisition, storage, maintenance, use, and retention of campaign data associated with a plurality of privacy campaigns within an organization. In doing so, various aspects of the System 100 initiates and creates a plurality of individual data privacy campaign records that are associated with a variety of privacy-related attributes and assessment related meta-data for each campaign. These data elements may include: the subjects of the sensitive information, the respective person or entity responsible for each campaign (e.g., the campaign's "owner"), the location where the personal data will be stored, the entity or entities that will access the data, the parameters according to which the personal data will be used and retained, the Risk Level associated with a particular campaign (as well as assessments from which the Risk Level is calculated), an audit schedule, and other attributes and meta-data. The System 100 may also be adapted to facilitate the setup and auditing of each privacy campaign. These modules may include, for example, a Main Privacy Compliance Module, a Risk Assessment Module, a Privacy Audit Module, a Data Flow Diagram Module, a Communications Module (examples of which are described below), a Privacy Assessment Monitoring Module, and a Privacy Assessment Modification Module. It is to be understood that these are examples of modules of various embodiments, but the functionalities performed by each module as described may be performed by more (or less) modules. Further, the functionalities described as being performed by one module may be performed by one or more other modules.

A. Example Elements Related to Privacy Campaigns

Figure 3:
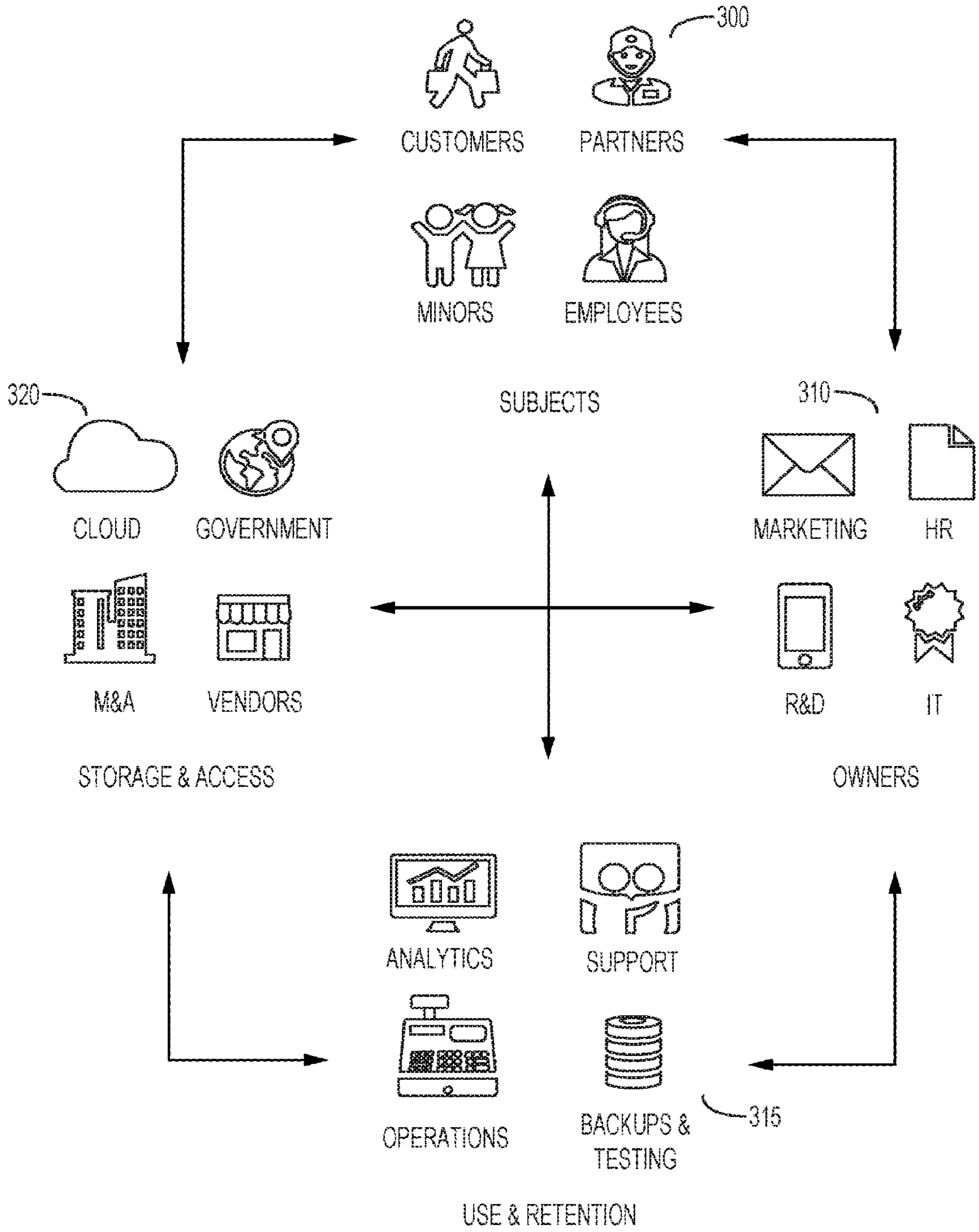
FIG. 3 is a diagram illustrating an example of the elements (e.g., subjects, owner, etc.) that may be involved in privacy compliance.

FIG. 3 provides a high-level visual overview of example "subjects" for particular data privacy campaigns, exemplary campaign "owners," various elements related to the storage and access of personal data, and elements related to the use and retention of the personal data. Each of these elements may, in various embodiments, be accounted for by the System 100 as it facilitates the implementation of an organization's privacy compliance policy.

As may be understood from FIG. 3, sensitive information may be collected by an organization from one or more subjects 300. Subjects may include customers whose information has been obtained by the organization. For example, if the organization is selling goods to a customer, the organization may have been provided with a customer's credit card or banking information (e.g., account number, bank routing number), social security number, or other sensitive information.

An organization may also possess personal data originating from one or more of its business partners. Examples of business partners are vendors that may be data controllers or data processors (which have different legal obligations under EU data protection laws). Vendors may supply a component or raw material to the organization, or an outside contractor responsible for the marketing or legal work of the organization. The personal data acquired from the partner may be that of the partners, or even that of other entities collected by the partners. For example, a marketing agency may collect personal data on behalf of the organization, and transfer that information to the organization. Moreover, the organization may share personal data with one of its partners. For example, the organization may provide a marketing agency with the personal data of its customers so that it may conduct further research.

Other subjects 300 include the organization's own employees. Organizations with employees often collect personal data from their employees, including address and social security information, usually for payroll purposes, or even prior to employment, for conducting credit checks. The subjects 300 may also include minors. It is noted that various corporate privacy policies or privacy laws may require that organizations take additional steps to protect the sensitive privacy of minors.

Still referring to FIG. 3, within an organization, a particular individual (or groups of individuals) may be designated to be an "owner" of a particular campaign to obtain and manage personal data. These owners 310 may have any suitable role within the organization. In various embodiments, an owner of a particular campaign will have primary responsibility for the campaign, and will serve as a resident expert regarding the personal data obtained through the campaign, and the way that the data is obtained, stored, and accessed. As shown in FIG. 3, an owner may be a member of any suitable department, including the organization's marketing, HR, R&D, or IT department. As will be described below, in exemplary embodiments, the owner can always be changed, and owners can sub-assign other owners (and other collaborators) to individual sections of campaign data input and operations.

Referring still to FIG. 3, the system may be configured to account for the use and retention 315 of personal data obtained in each particular campaign. The use and retention of personal data may include how the data is analyzed and used within the organization's operations, whether the data is backed up, and which parties within the organization are supporting the campaign.

The system may also be configured to help manage the storage and access 320 of personal data. As shown in FIG. 3, a variety of different parties may access the data, and the data may be stored in any of a variety of different locations, including on-site, or in "the cloud", i.e., on remote servers that are accessed via the Internet or other suitable network.

B. Main Compliance Module

Figure 4:
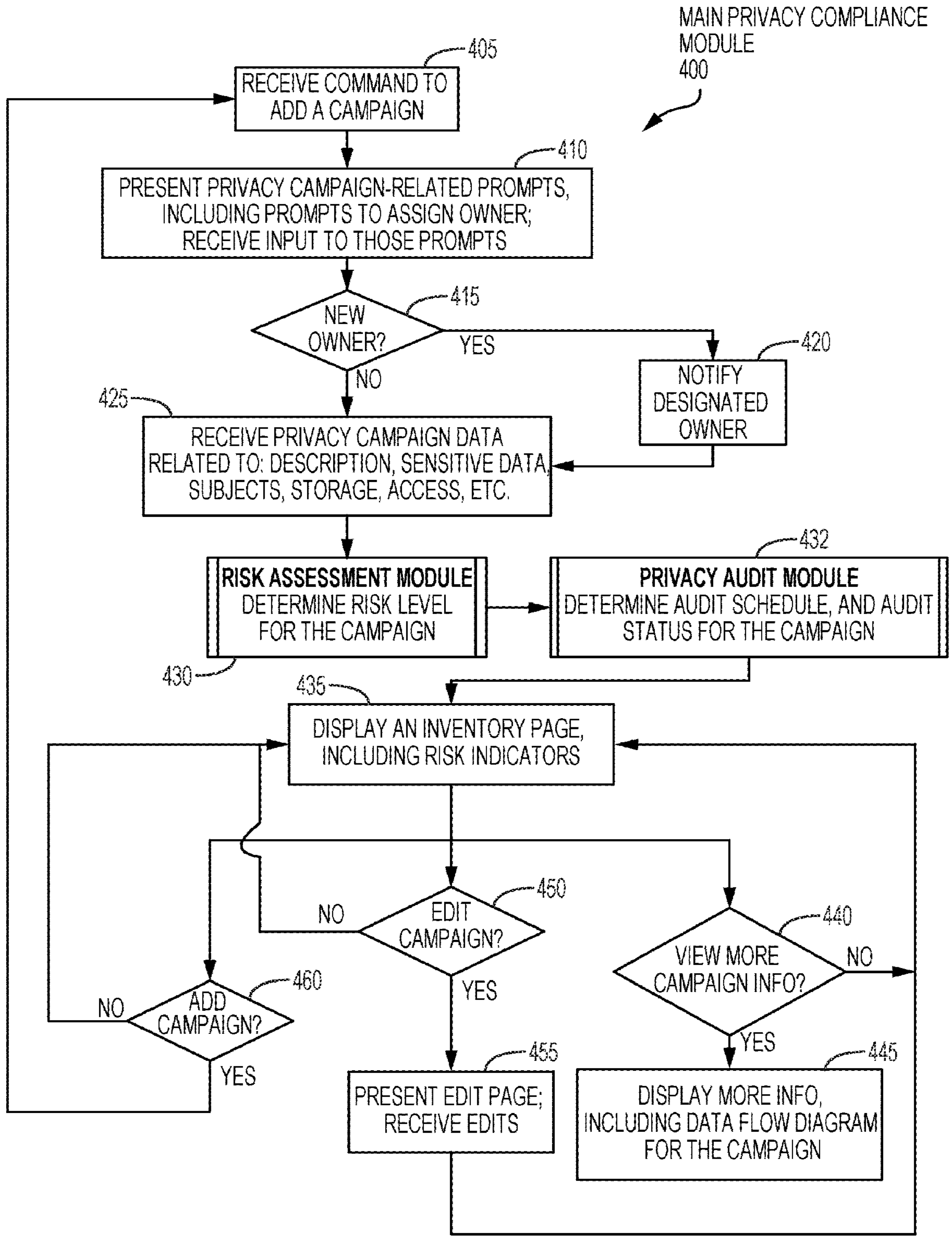
FIG. 4 is a flow chart showing an example of a process performed by the Main Privacy Compliance Module.

FIG. 4 illustrates an exemplary process for operationalizing privacy compliance. Main Privacy Compliance Module 400, which may be executed by one or more computing devices of System 100, may perform this process. In exemplary embodiments, a server (e.g., server 120) in conjunction with a client computing device having a browser, execute the Main Privacy Compliance Module (e.g., client computing devices 140, 150, 160, 170, 180, 190) through a network (network 110). In various exemplary embodiments, the Main Privacy Compliance Module 400 may call upon other modules to perform certain functions. In exemplary embodiments, the software may also be organized as a single module to perform various computer executable routines.

I. Adding a Campaign

The process may begin at step 405, wherein the Main Privacy Compliance Module 400 of the System 100 receives a command to add a privacy campaign. In exemplary embodiments, the user selects an on-screen button (e.g., the Add Data Flow button 1555 of FIG. 15) that the Main Privacy Compliance Module 400 displays on a landing page, which may be displayed in a graphical user interface (GUI), such as a window, dialog box, or the like. The landing page may be, for example, the inventory page 1500 below. The inventory page 1500 may display a list of one or more privacy campaigns that have already been input into the System 100. As mentioned above, a privacy campaign may represent, for example, a business operation that the organization is engaged in, or some business record, that may require the use of personal data, which may include the personal data of a customer or some other entity. Examples of campaigns might include, for example, Internet Usage History, Customer Payment Information, Call History Log, Cellular Roaming Records, etc. For the campaign "Internet Usage History," a marketing department may need customers' on-line browsing patterns to run analytics. This might entail retrieving and storing customers' IP addresses, MAC address, URL history, subscriber ID, and other information that may be considered personal data (and even sensitive personal data). As will be described herein, the System 100, through the use of one or more modules, including the Main Privacy Compliance Module 400, creates a record for each campaign. Data elements of campaign data may be associated with each campaign record that represents attributes such as: the type of personal data associated with the campaign; the subjects having access to the personal data; the person or persons within the company that take ownership (e.g., business owner) for ensuring privacy compliance for the personal data associated with each campaign; the location of the personal data; the entities having access to the data; the various computer systems and software applications that use the personal data; and the Risk Level (see below) associated with the campaign.

II. Entry of Privacy Campaign Related Information, Including Owner

At step 410, in response to the receipt of the user's command to add a privacy campaign record, the Main Privacy Compliance Module 400 initiates a routine to create an electronic record for a privacy campaign, and a routine for the entry data inputs of information related to the privacy campaign. The Main Privacy Compliance Module 400 may generate one or more graphical user interfaces (e.g., windows, dialog pages, etc.), which may be presented one GUI at a time. Each GUI may show prompts, editable entry fields, check boxes, radial selectors, etc., where a user may enter or select privacy campaign data. In exemplary embodiments, the Main Privacy Compliance Module 400 displays on the graphical user interface a prompt to create an electronic record for the privacy campaign. A user may choose to add a campaign, in which case the Main Privacy Compliance Module 400 receives a command to create the electronic record for the privacy campaign, and in response to the command, creates a record for the campaign and digitally stores the record for the campaign. The record for the campaign may be stored in, for example, storage 130, or a storage device associated with the Main Privacy Compliance Module (e.g., a hard drive residing on Server 120, or a peripheral hard drive attached to Server 120).

The user may be a person who works in the Chief Privacy Officer's organization (e.g., a privacy office rep, or privacy officer). The privacy officer may be the user that creates the campaign record, and enters initial portions of campaign data (e.g., "high level" data related to the campaign), for example, a name for the privacy campaign, a description of the campaign, and a business group responsible for administering the privacy operations related to that campaign (for example, though the GUI shown in FIG. 6). The Main Privacy Compliance Module 400 may also prompt the user to enter a person or entity responsible for each campaign (e.g., the campaign's "owner"). The owner may be tasked with the responsibility for ensuring or attempting to ensure that the privacy policies or privacy laws associated with personal data related to a particular privacy campaign are being complied with. In exemplary embodiments, the default owner of the campaign may be the person who initiated the creation of the privacy campaign. That owner may be a person who works in the Chief Privacy Officer's organization (e.g., a privacy office rep, or privacy officer). The initial owner of the campaign may designate someone else to be the owner of the campaign. The designee may be, for example, a representative of some business unit within the organization (a business rep). Additionally, more than one owner may be assigned. For example, the user may assign a primary business rep, and may also assign a privacy office rep as owners of the campaign.

In many instances, some or most of the required information related to the privacy campaign record might not be within the knowledge of the default owner (i.e., the privacy office rep). The Main Privacy Compliance Module 400 can be operable to allow the creator of the campaign record (e.g., a privacy officer rep) to designate one or more other collaborators to provide at least one of the data inputs for the campaign data. Different collaborators, which may include the one or more owners, may be assigned to different questions, or to specific questions within the context of the privacy campaign. Additionally, different collaborators may be designated to respond to pats of questions. Thus, portions of campaign data may be assigned to different individuals.

Still referring to FIG. 4, if at step 415 the Main Privacy Compliance Module 400 has received an input from a user to designate a new owner for the privacy campaign that was created, then at step 420, the Main Privacy Compliance Module 400 may notify that individual via a suitable notification that the privacy campaign has been assigned to him or her. Prior to notification, the Main Privacy Compliance Module 400 may display a field that allows the creator of the campaign to add a personalized message to the newly assigned owner of the campaign to be included with that notification. In exemplary embodiments, the notification may be in the form of an email message. The email may include the personalized message from the assignor, a standard message that the campaign has been assigned to him/her, the deadline for completing the campaign entry, and instructions to log in to the system to complete the privacy campaign entry (along with a hyperlink that takes the user to a GUI providing access to the Main Privacy Compliance Module 400. Also included may be an option to reply to the email if an assigned owner has any questions, or a button that when clicked on, opens up a chat window (i.e., instant messenger window) to allow the newly assigned owner and the assignor a GUI in which they are able to communicate in real-time. An example of such a notification appears in FIG. 16 below. In addition to owners, collaborators that are assigned to input portions of campaign data may also be notified through similar processes. In exemplary embodiments, The Main Privacy Compliance Module 400 may, for example through a Communications Module, be operable to send collaborators emails regarding their assignment of one or more portions of inputs to campaign data. Or through the Communications Module, selecting the commentators button brings up one or more collaborators that are on-line (with the off-line users still able to see the messages when they are back on-line. Alerts indicate that one or more emails or instant messages await a collaborator.

At step 425, regardless of whether the owner is the user (i.e., the creator of the campaign), "someone else" assigned by the user, or other collaborators that may be designated with the task of providing one or more items of campaign data, the Main Privacy Compliance Module 400 may be operable to electronically receive campaign data inputs from one or more users related to the personal data related to a privacy campaign through a series of displayed computer-generated graphical user interfaces displaying a plurality of prompts for the data inputs. In exemplary embodiments, through a step-by-step process, the Main Privacy Compliance Module may receive from one or more users' data inputs that include campaign data like: (1) a description of the campaign; (2) one or more types of personal data to be collected and stored as part of the campaign; (3) individuals from which the personal data is to be collected; (4) the storage location of the personal data, and (5) information regarding who will have access to the personal data. These inputs may be obtained, for example, through the graphical user interfaces shown in FIGS. 8 through 13, wherein the Main Privacy Compliance Module 400 presents on sequentially appearing GUIs the prompts for the entry of each of the enumerated campaign data above. The Main Privacy Compliance Module 400 may process the campaign data by electronically associating the campaign data with the record for the campaign and digitally storing the campaign data with the record for the campaign. The campaign data may be digitally stored as data elements in a database residing in a memory location in the server 120, a peripheral storage device attached to the server, or one or more storage devices connected to the network (e.g., storage 130). If campaign data inputs have been assigned to one or more collaborators, but those collaborators have not input the data yet, the Main Privacy Compliance Module 400 may, for example through the Communications Module, sent an electronic message (such as an email) alerting the collaborators and owners that they have not yet supplied their designated portion of campaign data.

III. Privacy Campaign Information Display

At step 430, Main Privacy Compliance Module 400 may, in exemplary embodiments, call upon a Risk Assessment Module 430 that may determine and assign a Risk Level for the privacy campaign, based wholly or in part on the information that the owner(s) have input. The Risk Assessment Module 430 will be discussed in more detail below.

At step 432, Main Privacy Compliance Module 400 may in exemplary embodiments, call upon a Privacy Audit Module 432 that may determine an audit schedule for each privacy campaign, based, for example, wholly or in part on the campaign data that the owner(s) have input, the Risk Level assigned to a campaign, and/or any other suitable factors. The Privacy Audit Module 432 may also be operable to display the status of an audit for each privacy campaign. The Privacy Audit Module 432 will be discussed in more detail below.

At step 435, the Main Privacy Compliance Module 400 may generate and display a GUI showing an inventory page (e.g., inventory page 1500) that includes information associated with each campaign. That information may include information input by a user (e.g., one or more owners), or information calculated by the Main Privacy Compliance Module 400 or other modules. Such information may include for example, the name of the campaign, the status of the campaign, the source of the campaign, the storage location of the personal data related to the campaign, etc. The inventory page 1500 may also display an indicator representing the Risk Level (as mentioned, determined for each campaign by the Risk Assessment Module 430), and audit information related to the campaign that was determined by the Privacy Audit Module (see below). The inventory page 1500 may be the landing page displayed to users that access the system. Based on the login information received from the user, the Main Privacy Compliance Module may determine which campaigns and campaign data the user is authorized to view, and display only the information that the user is authorized to view. Also from the inventory page 1500, a user may add a campaign (discussed above in step 405), view more information for a campaign, or edit information related to a campaign (see, e.g., FIGS. 15, 16, 17).

If other commands from the inventory page are received (e.g., add a campaign, view more information, edit information related to the campaign), then step 440, 445, and/or 450 may be executed.

At step 440, if a command to view more information has been received or detected, then at step 445, the Main Privacy Compliance Module 400 may present more information about the campaign, for example, on a suitable campaign information page 1500. At this step, the Main Privacy Compliance Module 400 may invoke a Data Flow Diagram Module (described in more detail below). The Data Flow Diagram Module may generate a flow diagram that shows, for example, visual indicators indicating whether data is confidential and/or encrypted (see, e.g., FIG. 16 below).

At step 450, if the system has received a request to edit a campaign, then, at step 455, the system may display a dialog page that allows a user to edit information regarding the campaign (e.g., edit campaign dialog 1700).

At step 460, if the system has received a request to add a campaign, the process may proceed back to step 405.

C. Risk Assessment Module

Figure 5:
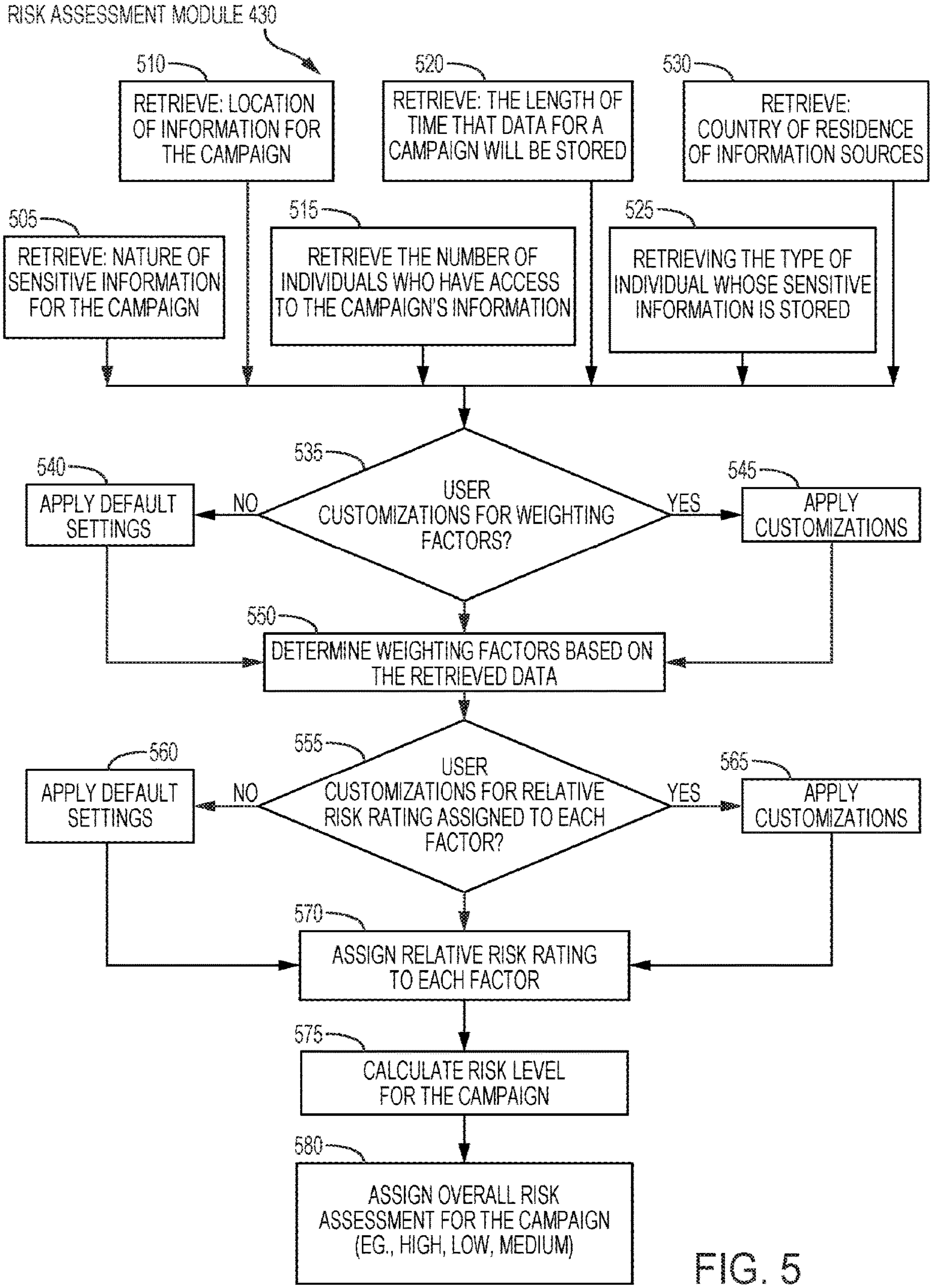
FIG. 5 is a flow chart showing an example of a process performed by the Risk Assessment Module.

FIG. 5 illustrates an exemplary process for determining a Risk Level and Overall Risk Assessment for a particular privacy campaign performed by Risk Assessment Module 430.

I. Determining Risk Level

In exemplary embodiments, the Risk Assessment Module 430 may be operable to calculate a Risk Level for a campaign based on the campaign data related to the personal data associated with the campaign. The Risk Assessment Module may associate the Risk Level with the record for the campaign and digitally store the Risk Level with the record for the campaign.

The Risk Assessment Module 430 may calculate this Risk Level based on any of various factors associated with the campaign. The Risk Assessment Module 430 may determine a plurality of weighting factors based upon, for example: (1) the nature of the sensitive information collected as part of the campaign (e.g., campaigns in which medical information, financial information or non-public personal identifying information is collected may be indicated to be of higher risk than those in which only public information is collected, and thus may be assigned a higher numerical weighting factor); (2) the location in which the information is stored (e.g., campaigns in which data is stored in the cloud may be deemed higher risk than campaigns in which the information is stored locally); (3) the number of individuals who have access to the information (e.g., campaigns that permit relatively large numbers of individuals to access the personal data may be deemed more risky than those that allow only small numbers of individuals to access the data); (4) the length of time that the data will be stored within the system (e.g., campaigns that plan to store and use the personal data over a long period of time may be deemed more risky than those that may only hold and use the personal data for a short period of time); (5) the individuals whose sensitive information will be stored (e.g., campaigns that involve storing and using information of minors may be deemed of greater risk than campaigns that involve storing and using the information of adults); (6) the country of residence of the individuals whose sensitive information will be stored (e.g., campaigns that involve collecting data from individuals that live in countries that have relatively strict privacy laws may be deemed more risky than those that involve collecting data from individuals that live in countries that have relative lax privacy laws). It should be understood that any other suitable factors may be used to assess the Risk Level of a particular campaign, including any new inputs that may need to be added to the risk calculation.

In particular embodiments, one or more of the individual factors may be weighted (e.g., numerically weighted) according to the deemed relative importance of the factor relative to other factors (i.e., Relative Risk Rating).

These weightings may be customized from organization to organization, and/or according to different applicable laws. In particular embodiments, the nature of the sensitive information will be weighted higher than the storage location of the data, or the length of time that the data will be stored.

In various embodiments, the system uses a numerical formula to calculate the Risk Level of a particular campaign. This formula may be, for example: Risk Level for campaign=(Weighting Factor of Factor 1)*(Relative Risk Rating of Factor 1)+(Weighting Factor of Factor 2)*(Relative Risk Rating of Factor 2)+(Weighting Factor of Factor N)*(Relative Risk Rating of Factor N). As a simple example, the Risk Level for a campaign that only collects publicly available information for adults and that stores the information locally for a short period of several weeks might be determined as Risk Level=(Weighting Factor of Nature of Sensitive Information)*(Relative Risk Rating of Particular Sensitive Information to be Collected)+(Weighting Factor of Individuals from which Information is to be Collected)*(Relative Risk Rating of Individuals from which Information is to be Collected)+(Weighting Factor of Duration of Data Retention)*(Relative Risk Rating of Duration of Data Retention)+(Weighting Factor of Individuals from which Data is to be Collected)*(Relative Risk Rating of Individuals from which Data is to be Collected). In this example, the Weighting Factors may range, for example from 1-5, and the various Relative Risk Ratings of a factor may range from 1-10. However, the system may use any other suitable ranges.

In particular embodiments, the Risk Assessment Module 430 may have default settings for assigning Overall Risk Assessments to respective campaigns based on the numerical Risk Level value determined for the campaign, for example, as described above. The organization may also modify these settings in the Risk Assessment Module 430 by assigning its own Overall Risk Assessments based on the numerical Risk Level. For example, the Risk Assessment Module 430 may, based on default or user assigned settings, designate: (1) campaigns with a Risk Level of 1-7 as "low risk" campaigns, (2) campaigns with a Risk Level of 8-15 as "medium risk" campaigns; (3) campaigns with a Risk Level of over 16 as "high risk" campaigns. As show below, in an example inventory page 1500, the Overall Risk Assessment for each campaign can be indicated by up/down arrow indicators, and further, the arrows may have different shading (or color, or portions shaded) based upon this Overall Risk Assessment. The selected colors may be conducive for viewing by those who suffer from color blindness.

Thus, the Risk Assessment Module 430 may be configured to automatically calculate the numerical Risk Level for each campaign within the system, and then use the numerical Risk Level to assign an appropriate Overall Risk Assessment to the respective campaign. For example, a campaign with a Risk Level of 5 may be labeled with an Overall Risk Assessment as "Low Risk". The system may associate both the Risk Level and the Overall Risk Assessment with the campaign and digitally store them as part of the campaign record.

II. Exemplary Process for Assessing Risk

Accordingly, as shown in FIG. 5, in exemplary embodiments, the Risk Assessment Module 430 electronically retrieves from a database (e.g., storage device 130) the campaign data associated with the record for the privacy campaign. It may retrieve this information serially, or in parallel. At step 505, the Risk Assessment Module 430 retrieves information regarding (1) the nature of the sensitive information collected as part of the campaign. At step 510, the Risk Assessment Module 430 retrieves information regarding the (2) the location in which the information related to the privacy campaign is stored. At step 515, the Risk Assessment Module 430 retrieves information regarding (3) the number of individuals who have access to the information. At step 520, the Risk Assessment Module retrieves information regarding (4) the length of time that the data associated with a campaign will be stored within the System 100. At step 525, the Risk Assessment Module retrieves information regarding (5) the individuals whose sensitive information will be stored. At step 530, the Risk Assessment Module retrieves information regarding (6) the country of residence of the individuals whose sensitive information will be stored.

At step 535, the Risk Assessment Module takes into account any user customizations to the weighting factors related to each of the retrieved factors from steps 505, 510, 515, 520, 525, and 530. At steps 540 and 545, the Risk Assessment Module applies either default settings to the weighting factors (which may be based on privacy laws), or customizations to the weighting factors. At step 550, the Risk Assessment Module determines a plurality of weighting factors for the campaign. For example, for the factor related to the nature of the sensitive information collected as part of the campaign, a weighting factor of 1-5 may be assigned based on whether non-public personal identifying information is collected.

At step 555, the Risk Assessment Module takes into account any user customizations to the Relative Risk assigned to each factor, and at step 560 and 565, will either apply default values (which can be based on privacy laws) or the customized values for the Relative Risk. At step 570, the Risk Assessment Module assigns a relative risk rating for each of the plurality of weighting factors. For example, the relative risk rating for the location of the information of the campaign may be assigned a numerical number (e.g., from 1-10) that is lower than the numerical number assigned to the Relative Risk Rating for the length of time that the sensitive information for that campaign is retained.

At step 575, the Risk Assessment Module 430 calculates the relative risk assigned to the campaign based upon the plurality of Weighting Factors and the Relative Risk Rating for each of the plurality of factors. As an example, the Risk Assessment Module 430 may make this calculation using the formula of Risk Level=(Weighting Factor of Factor 1)*(Relative Risk Rating of Factor 1)+(Weighting Factor of Factor 2)*(Relative Risk Rating of Factor 2)+(Weighting Factor of Factor N)*(Relative Risk Rating of Factor N).

At step 580, based upon the numerical value derived from step 575, the Risk Assessment Module 430 may determine an Overall Risk Assessment for the campaign. The Overall Risk Assessment determination may be made for the privacy campaign may be assigned based on the following criteria, which may be either a default or customized setting: (1) campaigns with a Risk Level of 1-7 as "low risk" campaigns, (2) campaigns with a Risk Level of 8-15 as "medium risk" campaigns; (3) campaigns with a Risk Level of over 16 as "high risk" campaigns. The Overall Risk Assessment is then associated and stored with the campaign record.

D. Privacy Audit Module

The System 100 may determine an audit schedule for each campaign, and indicate, in a particular graphical user interface (e.g., inventory page 1500), whether a privacy audit is coming due (or is past due) for each particular campaign and, if so, when the audit is/was due. The System 100 may also be operable to provide an audit status for each campaign, and alert personnel of upcoming or past due privacy audits. To further the retention of evidence of compliance, the System 100 may also receive and store evidence of compliance. A Privacy Audit Module 432 may facilitate these functions.

I. Determining a Privacy Audit Schedule and Monitoring Compliance

In exemplary embodiments, the Privacy Audit Module 432 is adapted to automatically schedule audits and manage compliance with the audit schedule. In particular embodiments, the system may allow a user to manually specify an audit schedule for each respective campaign. The Privacy Audit Module 432 may also automatically determine, and save to memory, an appropriate audit schedule for each respective campaign, which in some circumstances, may be editable by the user.

The Privacy Audit Module 432 may automatically determine the audit schedule based on the determined Risk Level of the campaign. For example, all campaigns with a Risk Level less than 10 may have a first audit schedule and all campaigns with a Risk Level of 10 or more may have a second audit schedule. The Privacy Audit Module may also be operable determine the audit schedule based on the Overall Risk Assessment for the campaign (e.g., "low risk" campaigns may have a first predetermined audit schedule, "medium risk" campaigns may have a second predetermined audit schedule, "high risk" campaigns may have a third predetermined audit schedule, etc.).

In particular embodiments, the Privacy Audit Module 432 may automatically facilitate and monitor compliance with the determined audit schedules for each respective campaign. For example, the system may automatically generate one or more reminder emails to the respective owners of campaigns as the due date approaches. The system may also be adapted to allow owners of campaigns, or other users, to submit evidence of completion of an audit (e.g., by for example, submitting screen shots that demonstrate that the specified parameters of each campaign are being followed). In particular embodiments, the system is configured for, in response to receiving sufficient electronic information documenting completion of an audit, resetting the audit schedule (e.g., scheduling the next audit for the campaign according to a determined audit schedule, as determined above).

II. Exemplary Privacy Audit Process

Figure 6:
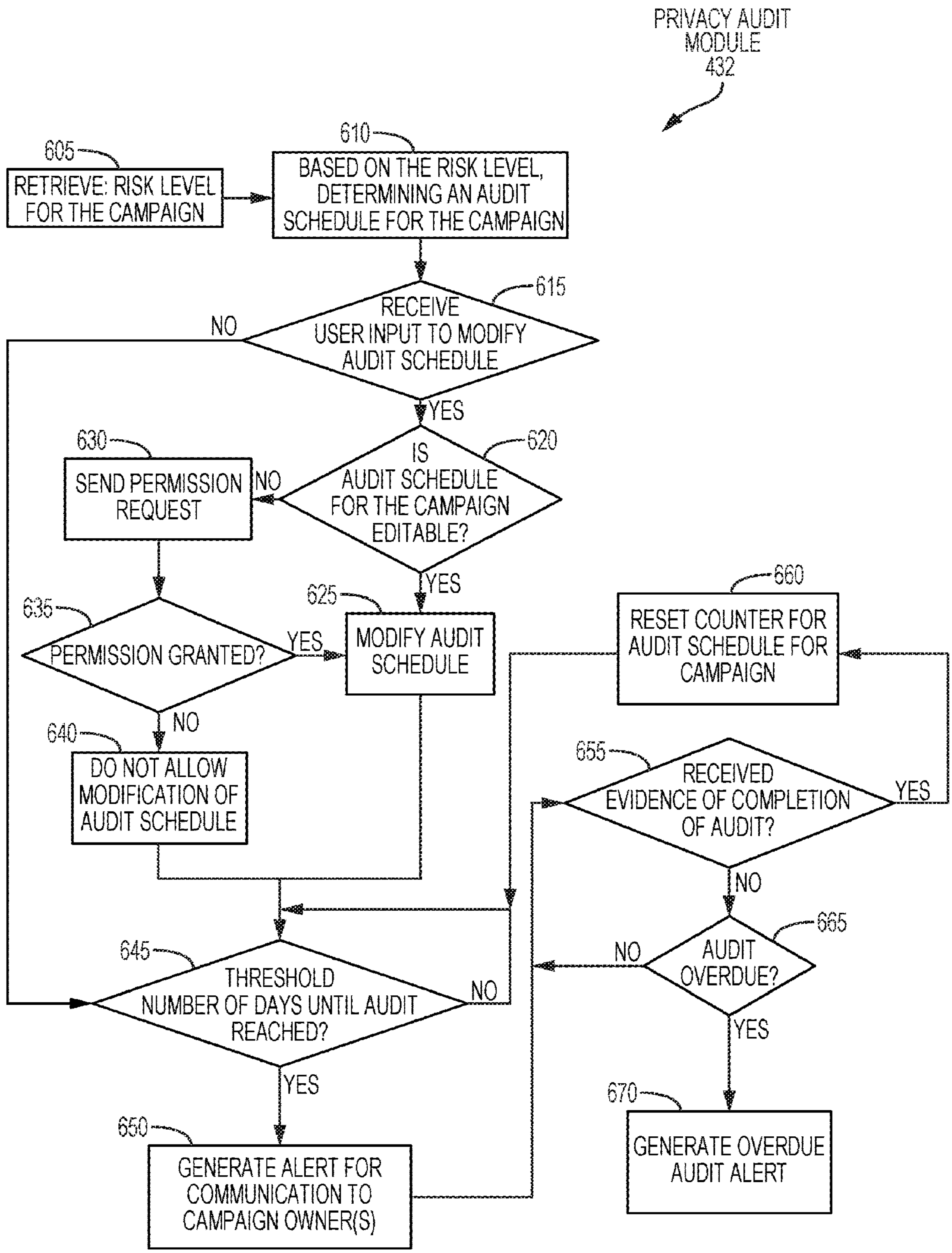
FIG. 6 is a flow chart showing an example of a process performed by the Privacy Audit Module.

FIG. 6 illustrates an exemplary process performed by a Privacy Audit Module 432 for assigning a privacy audit schedule and facilitating and managing compliance for a particular privacy campaign. At step 605, the Privacy Audit Module 432 retrieves the Risk Level associated with the privacy campaign. In exemplary embodiments, the Risk Level may be a numerical number, as determined above by the Risk Assessment Module 430. If the organization chooses, the Privacy Audit Module 432 may use the Overall Risk Assessment to determine which audit schedule for the campaign to assign.

At step 610, based on the Risk Level of the campaign (or the Overall Risk Assessment), or based on any other suitable factor, the Privacy Audit Module 432 can assign an audit schedule for the campaign. The audit schedule may be, for example, a timeframe (i.e., a certain amount of time, such as number of days) until the next privacy audit on the campaign to be performed by the one or more owners of the campaign. The audit schedule may be a default schedule. For example, the Privacy Audit Module can automatically apply an audit schedule of 120 days for any campaign having Risk Level of 10 and above. These default schedules may be modifiable. For example, the default audit schedule for campaigns having a Risk Level of 10 and above can be changed from 120 days to 150 days, such that any campaign having a Risk Level of 10 and above is assigned the customized default audit schedule (i.e., 150 days). Depending on privacy laws, default policies, authority overrides, or the permission level of the user attempting to modify this default, the default might not be modifiable.

At step 615, after the audit schedule for a particular campaign has already been assigned, the Privacy Audit Module 432 determines if a user input to modify the audit schedule has been received. If a user input to modify the audit schedule has been received, then at step 620, the Privacy Audit Module 432 determines whether the audit schedule for the campaign is editable (i.e., can be modified). Depending on privacy laws, default policies, authority overrides, or the permission level of the user attempting to modify the audit schedule, the campaign's audit schedule might not be modifiable.

At step 625, if the audit schedule is modifiable, then the Privacy Audit Module will allow the edit and modify the audit schedule for the campaign. If at step 620 the Privacy Audit Module determines that the audit schedule is not modifiable, in some exemplary embodiments, the user may still request permission to modify the audit schedule. For example, the Privacy Audit Module 432 can at step 630 provide an indication that the audit schedule is not editable, but also provide an indication to the user that the user may contact through the system one or more persons having the authority to grant or deny permission to modify the audit schedule for the campaign (i.e., administrators) to gain permission to edit the field. The Privacy Audit Module 432 may display an on-screen button that, when selected by the user, sends a notification (e.g., an email) to an administrator. The user can thus make a request to modify the audit schedule for the campaign in this manner.

At step 635, the Privacy Audit Module may determine whether permission has been granted by an administrator to allow a modification to the audit schedule. It may make this determination based on whether it has received input from an administrator to allow modification of the audit schedule for the campaign. If the administrator has granted permission, the Privacy Audit Module 432 at step 635 may allow the edit of the audit schedule. If at step 640, a denial of permission is received from the administrator, or if a certain amount of time has passed (which may be customized or based on a default setting), the Privacy Audit Module 432 retains the audit schedule for the campaign by not allowing any modifications to the schedule, and the process may proceed to step 645. The Privacy Audit Module may also send a reminder to the administrator that a request to modify the audit schedule for a campaign is pending.

At step 645, the Privacy Audit Module 432 determines whether a threshold amount of time (e.g., number of days) until the audit has been reached. This threshold may be a default value, or a customized value. If the threshold amount of time until an audit has been reached, the Privacy Audit Module 432 may at step 650 generate an electronic alert. The alert can be a message displayed to the collaborator the next time the collaborator logs into the system, or the alert can be an electronic message sent to one or more collaborators, including the campaign owners. The alert can be, for example, an email, an instant message, a text message, or one or more of these communication modalities. For example, the message may state, "This is a notification that a privacy audit for Campaign Internet Browsing History is scheduled to occur in 90 days." More than one threshold may be assigned, so that the owner of the campaign receives more than one alert as the scheduled privacy audit deadline approaches. If the threshold number of days has not been reached, the Privacy Audit Module 432 will continue to evaluate whether the threshold has been reached (i.e., back to step 645).

In exemplary embodiments, after notifying the owner of the campaign of an impending privacy audit, the Privacy Audit Module may determine at step 655 whether it has received any indication or confirmation that the privacy audit has been completed. In example embodiments, the Privacy Audit Module allows for evidence of completion to be submitted, and if sufficient, the Privacy Audit Module 432 at step 660 resets the counter for the audit schedule for the campaign. For example, a privacy audit may be confirmed upon completion of required electronic forms in which one or more collaborators verify that their respective portions of the audit process have been completed. Additionally, users can submit photos, screen shots, or other documentation that show that the organization is complying with that user's assigned portion of the privacy campaign. For example, a database administrator may take a screen shot showing that all personal data from the privacy campaign is being stored in the proper database and submit that to the system to document compliance with the terms of the campaign.

If at step 655, no indication of completion of the audit has been received, the Privacy Audit Module 432 can determine at step 665 whether an audit for a campaign is overdue (i.e., expired). If it is not overdue, the Privacy Audit Module 432 will continue to wait for evidence of completion (e.g., step 655). If the audit is overdue, the Privacy Audit Module 432 at step 670 generates an electronic alert (e.g., an email, instant message, or text message) to the campaign owner(s) or other administrators indicating that the privacy audit is overdue, so that the organization can take responsive or remedial measures.

In exemplary embodiments, the Privacy Audit Module 432 may also receive an indication that a privacy audit has begun (not shown), so that the status of the audit when displayed on inventory page 1500 shows the status of the audit as pending. While the audit process is pending, the Privacy Audit Module 432 may be operable to generate reminders to be sent to the campaign owner(s), for example, to remind the owner of the deadline for completing the audit.

E. Data Flow Diagram Module

The system may be operable to generate a data flow diagram based on the campaign data entered and stored, for example in the manner described above.

I. Display of Security Indicators and Other Information

In various embodiments, a Data Flow Diagram Module is operable to generate a flow diagram for display containing visual representations (e.g., shapes) representative of one or more parts of campaign data associated with a privacy campaign, and the flow of that information from a source (e.g., customer), to a destination (e.g., an internet usage database), to which entities and computer systems have access (e.g., customer support, billing systems). Data Flow Diagram Module may also generate one or more security indicators for display. The indicators may include, for example, an "eye" icon to indicate that the data is confidential, a "lock" icon to indicate that the data, and/or a particular flow of data, is encrypted, or an "unlocked lock" icon to indicate that the data, and/or a particular flow of data, is not encrypted. In the example shown in FIG. 16, the dotted arrow lines generally depict respective flows of data and the locked or unlocked lock symbols indicate whether those data flows are encrypted or unencrypted. The color of dotted lines representing data flows may also be colored differently based on whether the data flow is encrypted or non-encrypted, with colors conducive for viewing by those who suffer from color blindness.

II. Exemplary Process Performed by Data Flow Diagram Module

Figure 7:
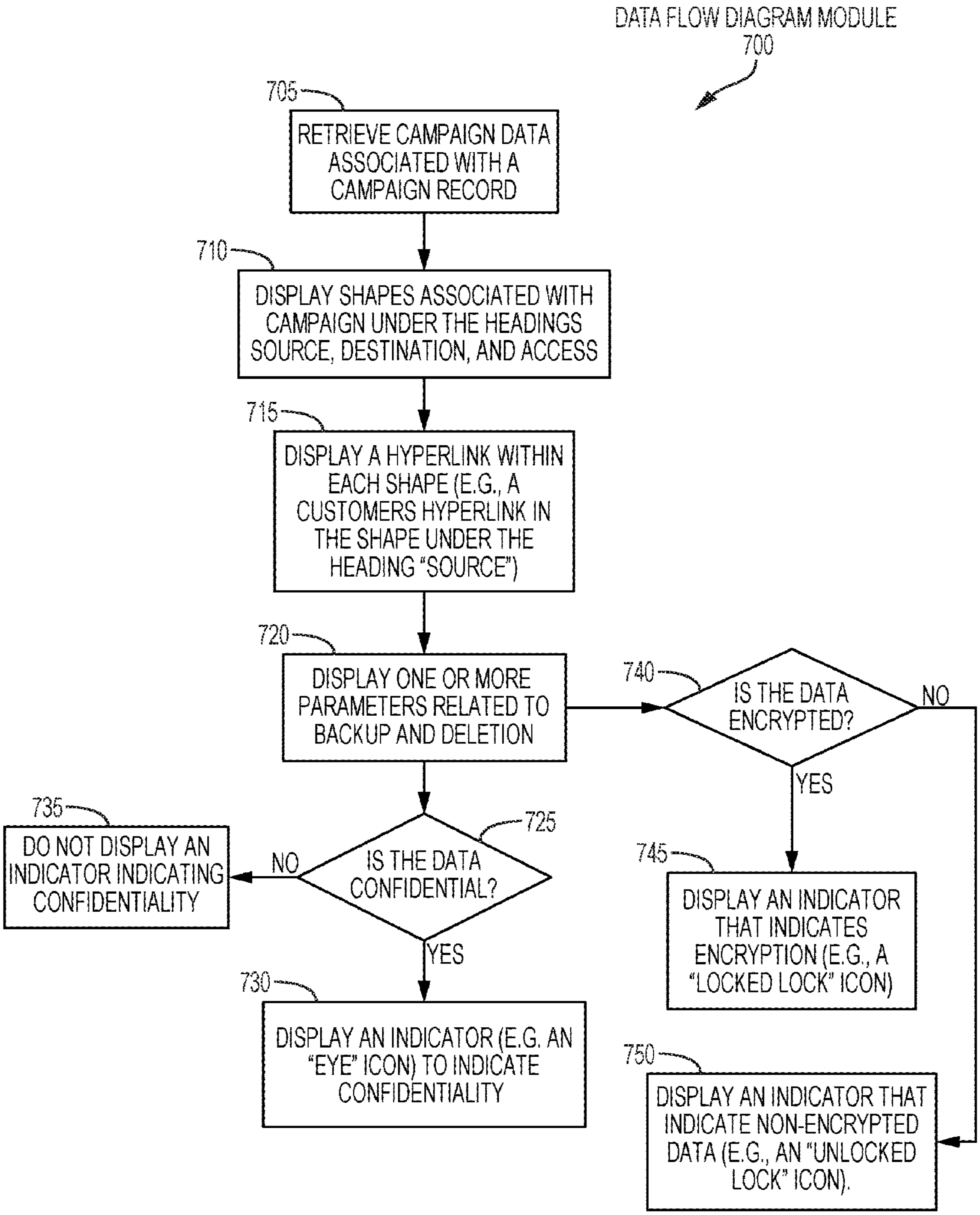
FIG. 7 is a flow chart showing an example of a process performed by the Data Flow Diagram Module.

FIG. 7 shows an example process performed by the Data Flow Diagram Module 700. At step 705, the Data Flow Diagram retrieves campaign data related to a privacy campaign record. The campaign data may indicate, for example, that the sensitive information related to the privacy campaign contains confidential information, such as the social security numbers of a customer.

Figure 16:
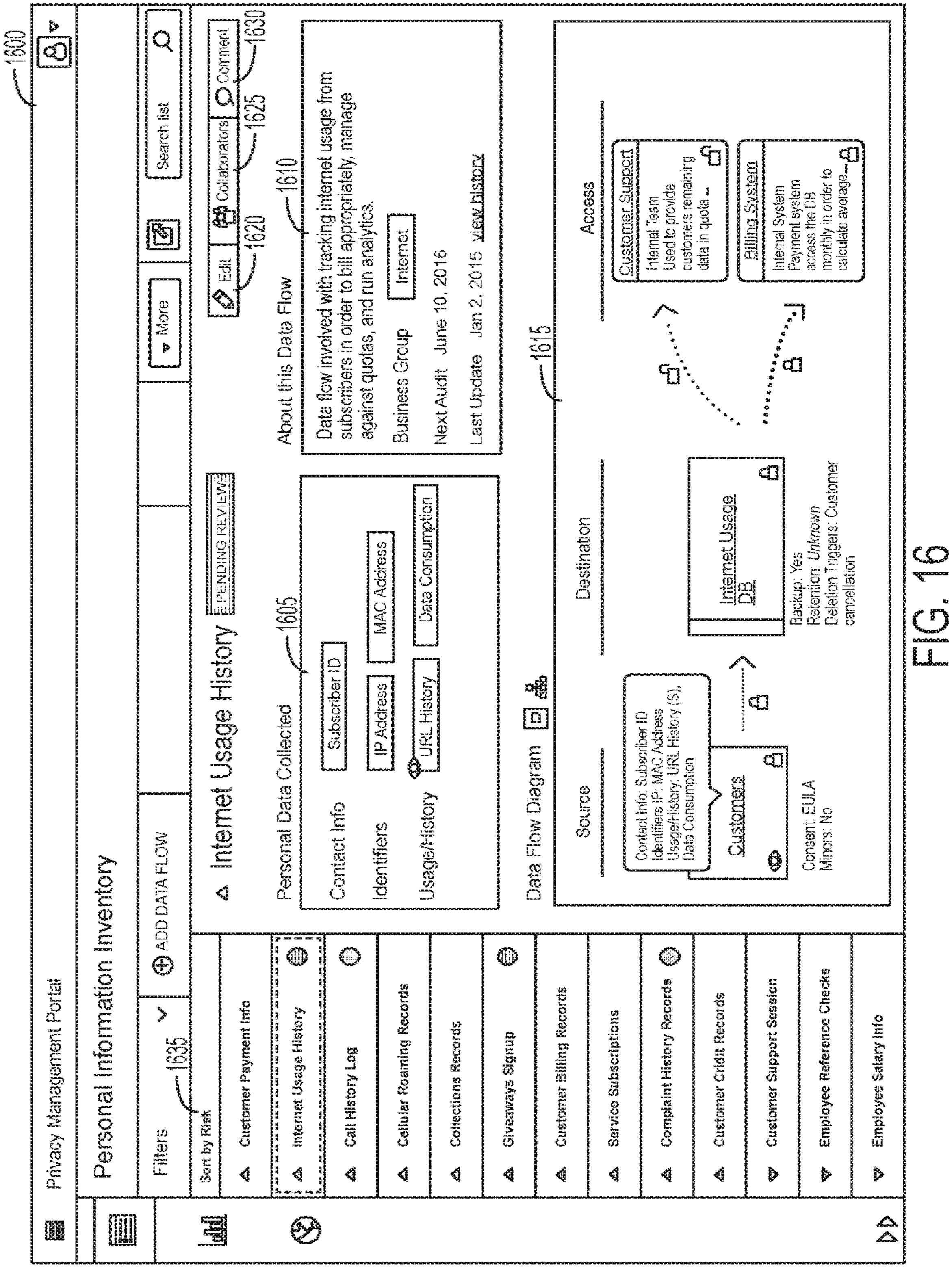
FIG. 16 is an example of a GUI showing campaign data, including a data flow diagram.

At step 710, the Data Flow Diagram Module 700 is operable to display on-screen objects (e.g., shapes) representative of the Source, Destination, and Access, which indicate that information below the heading relates to the source of the personal data, the storage destination of the personal data, and access related to the personal data. In addition to campaign data regarding Source, Destination, and Access, the Data Flow Diagram Module 700 may also account for user defined attributes related to personal data, which may also be displayed as on-screen objects. The shape may be, for example, a rectangular box (see, e.g., FIG. 16). At step 715, the Data Flow Diagram Module 700 may display a hyperlink label within the on-screen object (e.g., as shown in FIG. 16, the word "Customer" may be a hyperlink displayed within the rectangular box) indicative of the source of the personal data, the storage destination of the personal data, and access related to the personal data, under each of the respective headings. When a user hovers over the hyperlinked word, the Data Flow Diagram is operable to display additional campaign data relating to the campaign data associated with the hyperlinked word. The additional information may also be displayed in a pop up, or a new page. For example, FIG. 16 shows that if a user hovers over the words "Customer," the Data Flow Diagram Module 700 displays what customer information is associated with the campaign (e.g., the Subscriber ID, the IP and Mac Addresses associated with the Customer, and the customer's browsing and usage history). The Data Flow Diagram Module 700 may also generate for display information relating to whether the source of the data includes minors, and whether consent was given by the source to use the sensitive information, as well as the manner of the consent (for example, through an End User License Agreement (EULA)).

At step 720, the Data Flow Diagram Module 700 may display one or more parameters related to backup and retention of personal data related to the campaign, including in association with the storage destination of the personal data. As an example, Data Flow Diagram 1615 of FIG. 16 displays that the information in the Internet Usage database is backed up, and the retention related to that data is Unknown.

At 725, the Data Flow Diagram Module 700 determines, based on the campaign data associated with the campaign, whether the personal data related to each of the hyperlink labels is confidential. At Step 730, if the personal data related to each hyperlink label is confidential, the Data Flow Diagram Module 700 generates visual indicator indicating confidentiality of that data (e.g., an "eye" icon, as show in Data Flow Diagram 1615). If there is no confidential information for that box, then at step 735, no indicators are displayed. While this is an example of the generation of indicators for this particular hyperlink, in exemplary embodiments, any user defined campaign data may visual indicators that may be generated for it.

Figure 9:
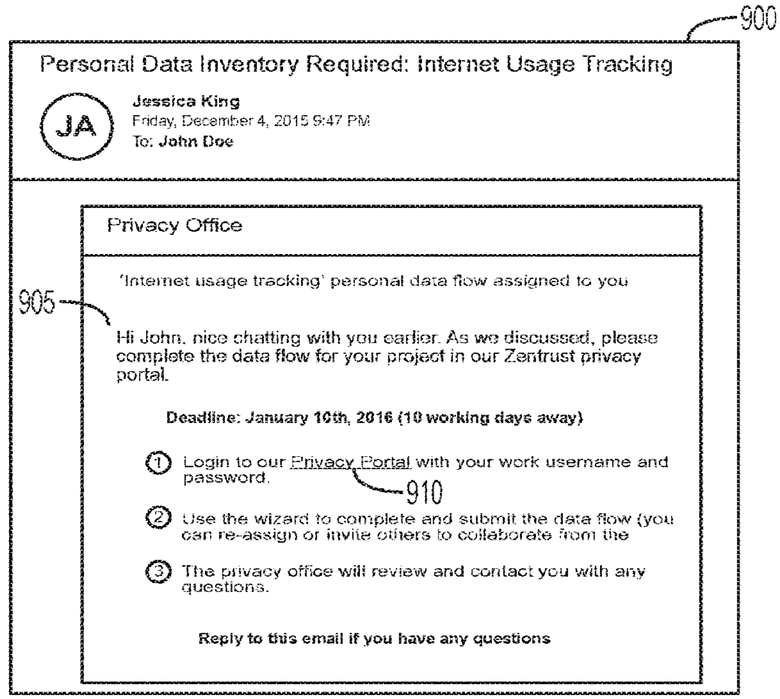
FIG. 9 is an example of a notification, generated by the system, informing a business representative (e.g., owner) that they have been assigned to a particular privacy campaign.
Figure 9:
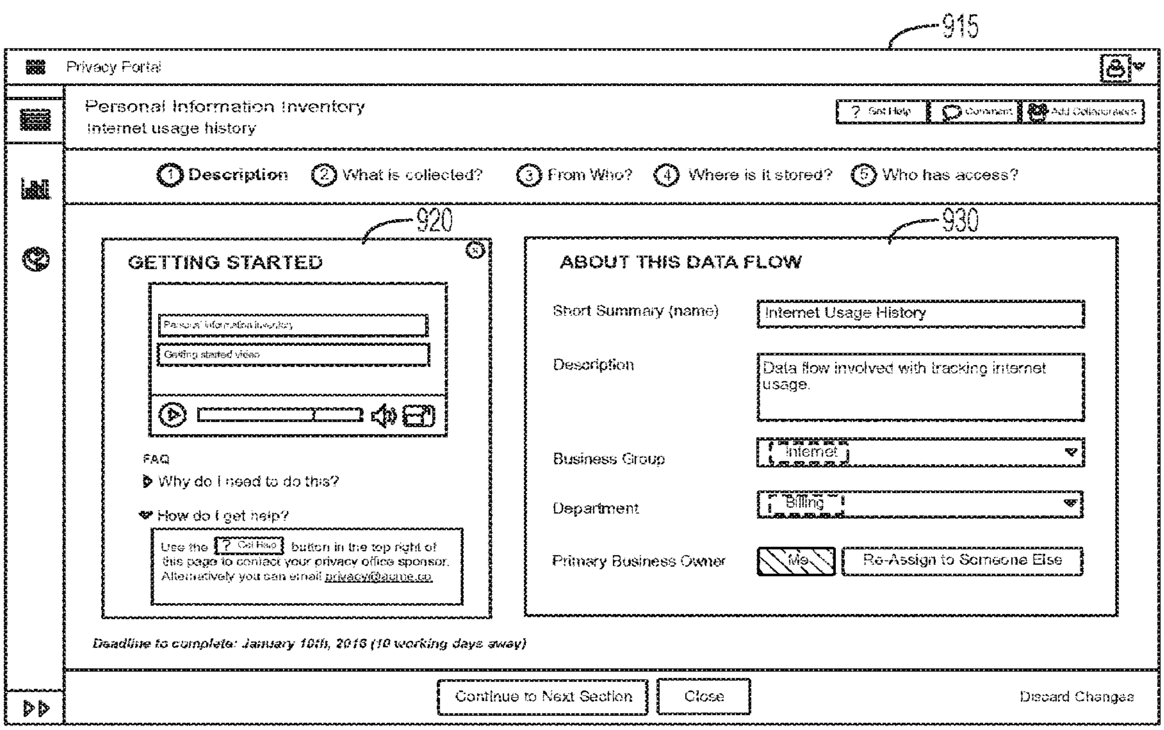

At step 740, the Data Flow Diagram Module 700 determined whether any of the data associated with the source, stored in a storage destination, being used by an entity or application, or flowing to one or more entities or systems (i.e., data flow) associated with the campaign is designated as encrypted. If the data is encrypted, then at step 745 the Data Flow Diagram Module 700 may generate an indicator that the personal data is encrypted (e.g., a "lock" icon). If the data is non-encrypted, then at step 750, the Data Flow Diagram Module 700 displays an indicator to indicate that the data or particular flow of data is not encrypted. (e.g., an "unlocked lock" icon). An example of a data flow diagram is depicted in FIG. 9. Additionally, the data flow diagram lines may be colored differently to indicate whether the data flow is encrypted or unencrypted, wherein the colors can still be distinguished by a color-blind person.

F. Communications Module

Figure 13:
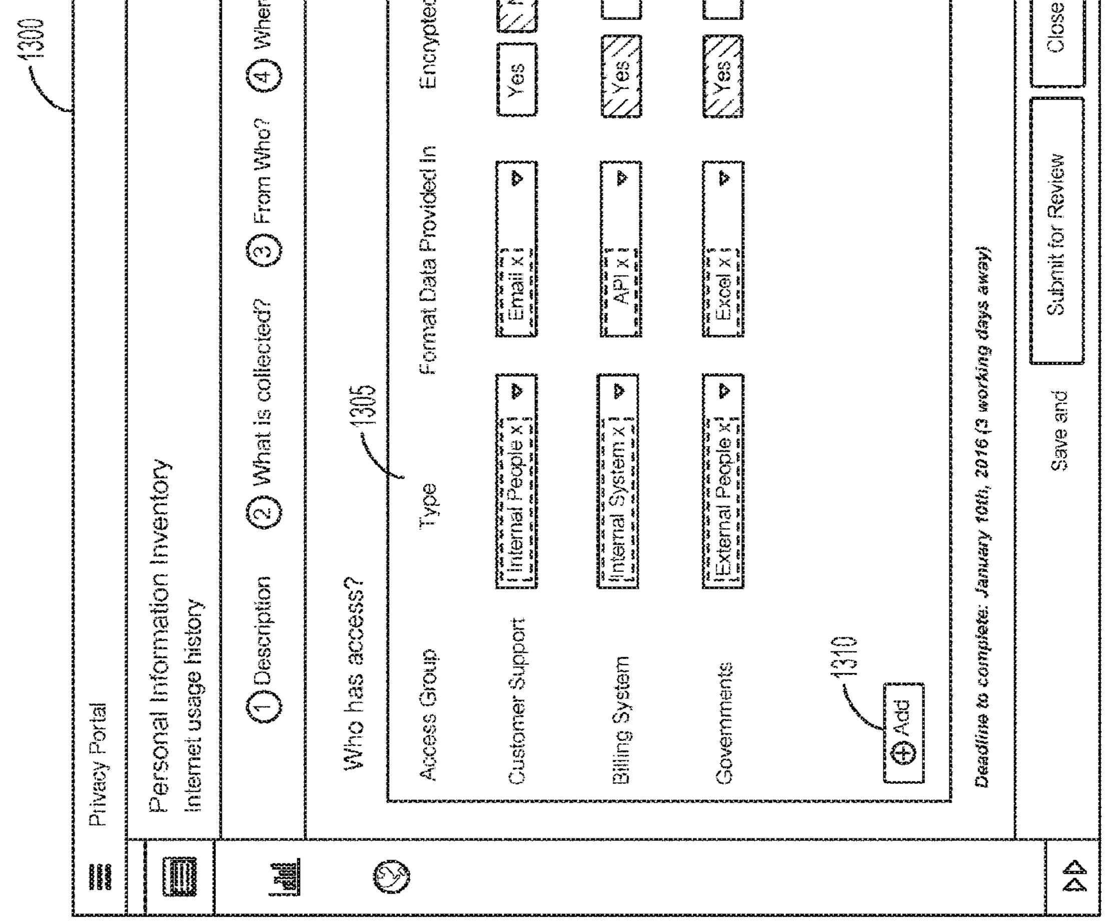
FIG. 13 is an example of a GUI that shows information regarding the access of personal data related to a campaign.
Figure 14:
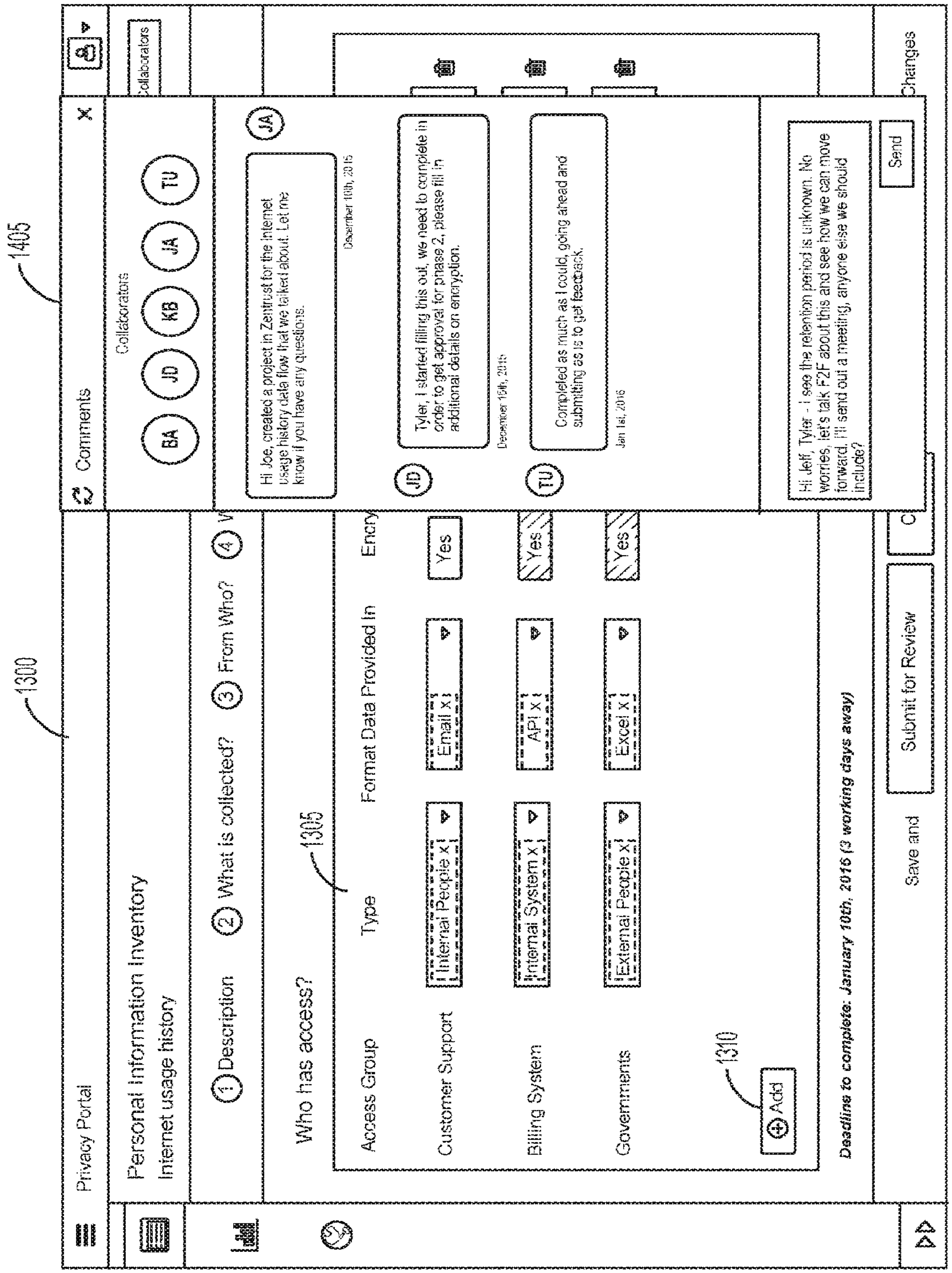
FIG. 14 is an example of an instant messaging session overlaid on top of a GUI, wherein the GUI contains prompts for the entry or selection of campaign data.

In exemplary embodiments, a Communications Module of the System 100 may facilitate the communications between various owners and personnel related to a privacy campaign. The Communications Module may retain contact information (e.g., emails or instant messaging contact information) input by campaign owners and other collaborators. The Communications Module can be operable to take a generated notification or alert (e.g., alert in step 670 generated by Privacy Audit Module 432) and instantiate an email containing the relevant information. As mentioned above, the Main Privacy Compliance Module 400 may, for example through a communications module, be operable to send collaborators emails regarding their assignment of one or more portions of inputs to campaign data. Or through the communications module, selecting the commentators button brings up one or more collaborators that are on-line In exemplary embodiments, the Communications Module can also, in response to a user request (e.g., depressing the "comment" button show in FIG. 9, FIG. 10, FIG. 11, FIG. 12, FIG. 13, FIG. 16), instantiate an instant messaging session and overlay the instant messaging session over one or more portions of a GUI, including a GUI in which a user is presented with prompts to enter or select information. An example of this instant messaging overlay feature orchestrated by the Communications Module is shown in FIG. 14. While a real-time message session may be generated, off-line users may still be able to see the messages when they are back on-line.

The Communications Module may facilitate the generation of alerts that indicate that one or more emails or instant messages await a collaborator.

If campaign data inputs have been assigned to one or more collaborators, but those collaborators have not input the data yet, the Communications Module, may facilitate the sending of an electronic message (such as an email) alerting the collaborators and owners that they have not yet supplied their designated portion of campaign data.

Exemplary User Experience

In the exemplary embodiments of the system for operationalizing privacy compliance, adding a campaign (i.e., data flow) comprises gathering information that includes several phases: (1) a description of the campaign; (2) the personal data to be collected as part of the campaign; (3) who the personal data relates to; (4) where the personal data be stored; and (5) who will have access to the indicated personal data.

Figure 8:
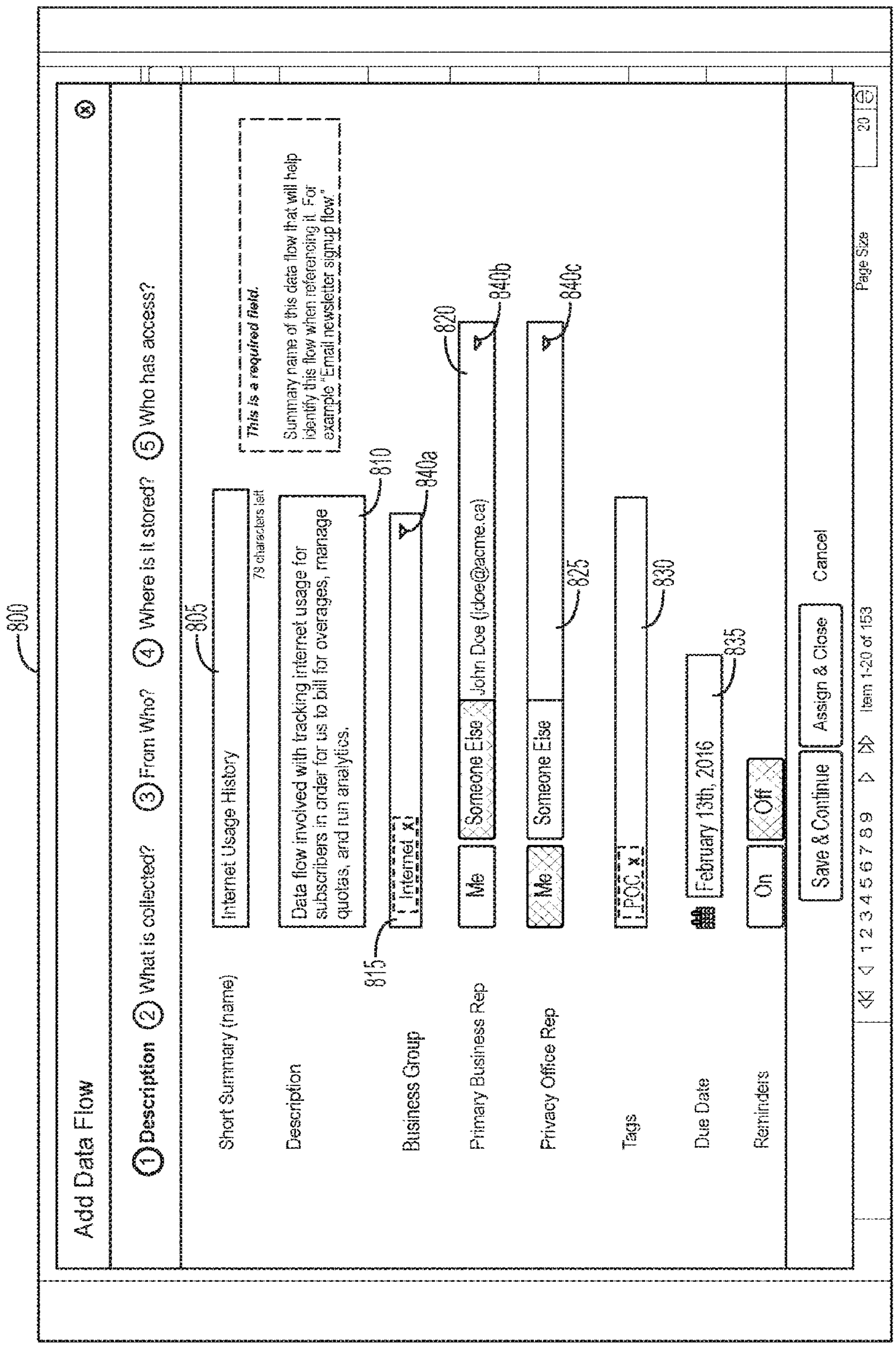
FIG. 8 is an example of a graphical user interface (GUI) showing a dialog that allows for the entry of description information related to a privacy campaign.

A. FIG. 8: Campaign Record Creation and Collaborator Assignment

FIG. 8 illustrates an example of the first phase of information gathering to add a campaign. In FIG. 8, a description entry dialog 800 may have several fillable/editable fields and drop-down selectors. In this example, the user may fill out the name of the campaign in the Short Summary (name) field 805, and a description of the campaign in the Description field 810. The user may enter or select the name of the business group (or groups) that will be accessing personal data for the campaign in the Business Group field 815. The user may select the primary business representative responsible for the campaign (i.e., the campaign's owner), and designate him/herself, or designate someone else to be that owner by entering that selection through the Someone Else field 820. Similarly, the user may designate him/herself as the privacy office representative owner for the campaign, or select someone else from the second Someone Else field 825. At any point, a user assigned as the owner may also assign others the task of selecting or answering any question related to the campaign. The user may also enter one or more tag words associated with the campaign in the Tags field 830. After entry, the tag words may be used to search for campaigns, or used to filter for campaigns (for example, under Filters 845). The user may assign a due date in a Date field 835 for completing the campaign entry, and turn reminders for the campaign on or off. The user may save and continue, or assign and close.

In example embodiments, some of the fields may be filled in by a user, with suggest-as-you-type display of possible field entries (e.g., Business Group field 815), and/or may include the ability for the user to select items from a drop-down selector (e.g., drop-down selectors 840*a*, 840*b*, 840*c*). The system may also allow some fields to stay hidden or unmodifiable to certain designated viewers or categories of users. For example, the purpose behind a campaign may be hidden from anyone who is not the chief privacy officer of the company, or the retention schedule may be configured so that it cannot be modified by anyone outside of the organization's' legal department.

B. FIG. 9: Collaborator Assignment Notification and Description Entry

Moving to FIG. 9, in example embodiments, if another business representative (owner), or another privacy office representative has been assigned to the campaign (e.g., John Doe in FIG. 8), the system may send a notification (e.g., an electronic notification) to the assigned individual, letting them know that the campaign has been assigned to him/her. FIG. 9 shows an example notification 900 sent to John Doe that is in the form of an email message. The email informs him that the campaign "Internet Usage Tracking" has been assigned to him, and provides other relevant information, including the deadline for completing the campaign entry and instructions to log in to the system to complete the campaign (data flow) entry (which may be done, for example, using a suitable "wizard" program). The user that assigned John ownership of the campaign may also include additional comments 905 to be included with the notification 900. Also included may be an option to reply to the email if an assigned owner has any questions.

In this example, if John selects the hyperlink Privacy Portal 910, he is able to access the system, which displays a landing page 915. The landing page 915 displays a Getting Started section 920 to familiarize new owners with the system, and also display an "About This Data Flow" section 930 showing overview information for the campaign.

Figure 10:
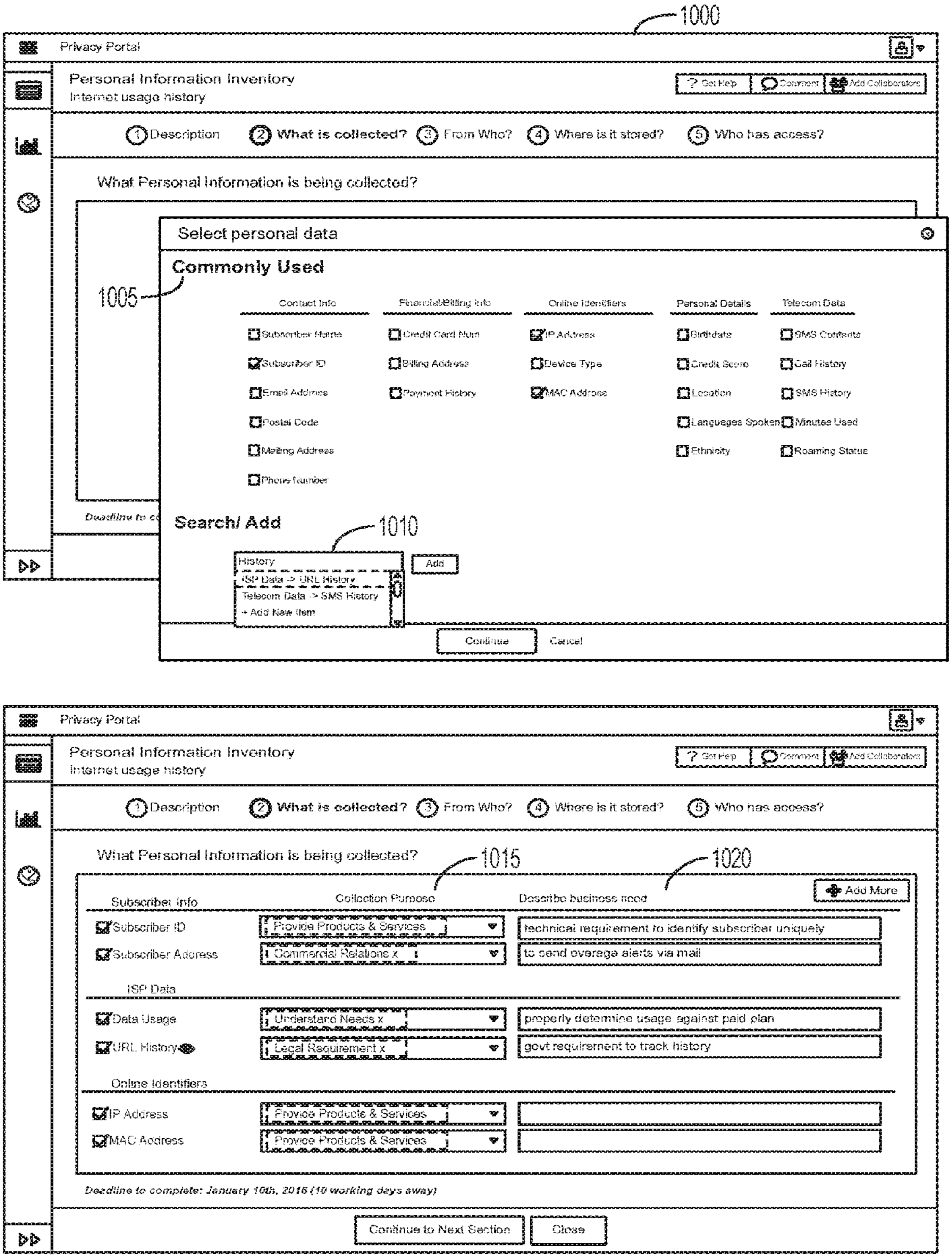
FIG. 10 is an example of a GUI showing a dialog allowing entry of the type of personal data that is being collected for a campaign.

C. FIG. 10: What Personal Data is Collected

Moving to FIG. 10, after the first phase of campaign addition (i.e., description entry phase), the system may present the user (who may be a subsequently assigned business representative or privacy officer) with a dialog 1000 from which the user may enter in the type of personal data being collected.

In addition, questions are described generally as transitional questions, but the questions may also include one or more smart questions in which the system is configured to: (1) pose an initial question to a user and, (2) in response to the user's answer satisfying certain criteria, presenting the user with one or more follow-up questions. For example, in FIG. 10, if the user responds with a choice to add personal data, the user may be additionally presented follow-up prompts, for example, the select personal data window overlaying screen 1005 that includes commonly used selections may include, for example, particular elements of an individual's contact information (e.g., name, address, email address), Financial/Billing Information (e.g., credit card number, billing address, bank account number), Online Identifiers (e.g., IP Address, device type, MAC Address), Personal Details (Birthdate, Credit Score, Location), or Telecommunication Data (e.g., Call History, SMS History, Roaming Status). The System 100 is also operable to pre-select or automatically populate choices—for example, with commonly-used selections 1005, some of the boxes may already be checked. The user may also use a search/add tool 1010 to search for other selections that are not commonly used and add another selection. Based on the selections made, the user may be presented with more options and fields. For example, if the user selected "Subscriber ID" as personal data associated with the campaign, the user may be prompted to add a collection purpose under the heading Collection Purpose 1015, and the user may be prompted to provide the business reason why a Subscriber ID is being collected under the "Describe Business Need" heading 1020.

Figure 11:
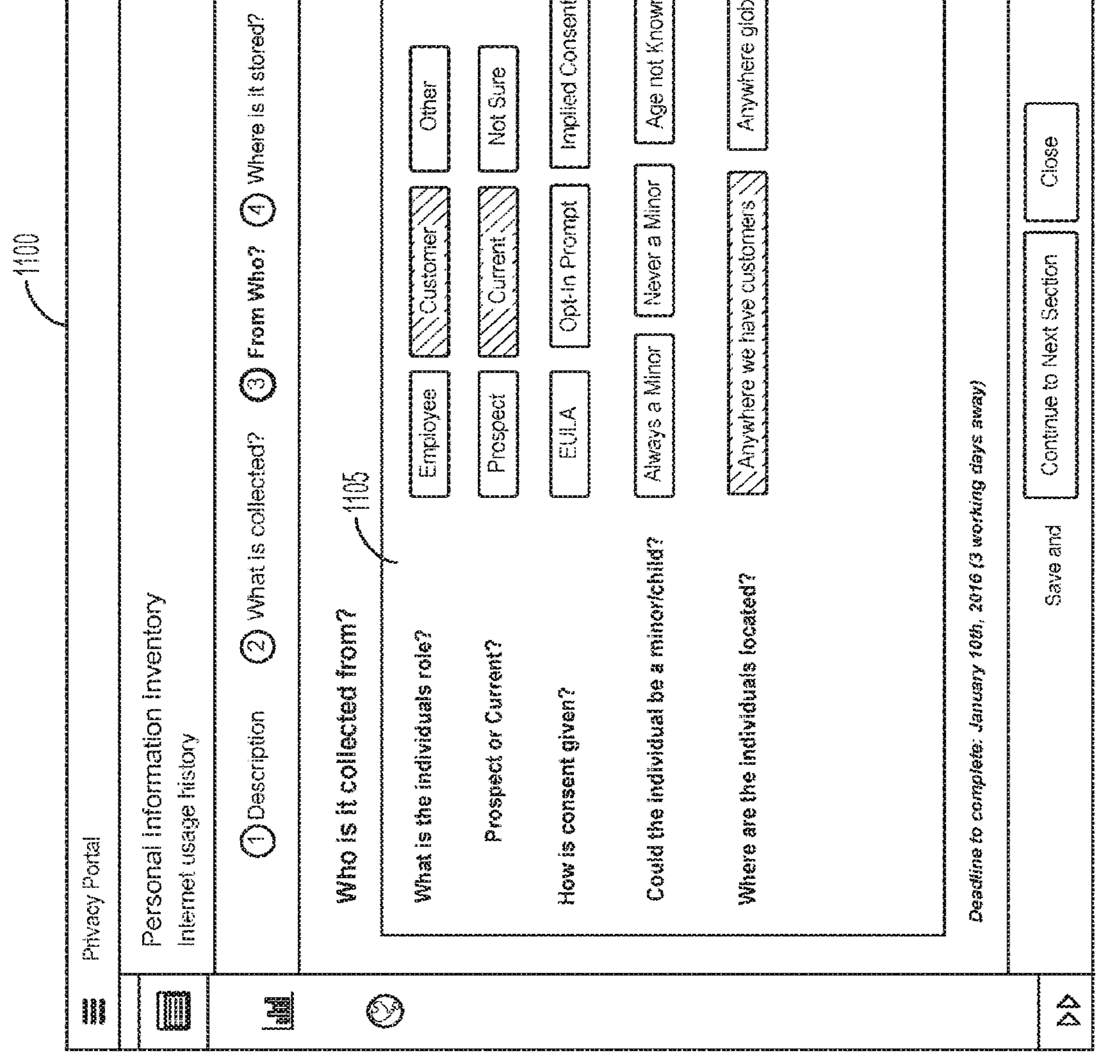
FIG. 11 is an example of a GUI that shows a dialog that allows collection of campaign data regarding the subject from which personal data was collected.

D. FIG. 11: Who Personal Data is Collected From

As displayed in the example of FIG. 11, the third phase of adding a campaign may relate to entering and selecting information regarding who the personal data is gathered from. As noted above, the personal data may be gathered from, for example, one or more Subjects 100. In the exemplary "Collected From" dialog 1100, a user may be presented with several selections in the "Who Is It Collected From" section 1105. These selections may include whether the personal data was to be collected from an employee, customer, or other entity. Any entities that are not stored in the system may be added. The selections may also include, for example, whether the data was collected from a current or prospective subject (e.g., a prospective employee may have filled out an employment application with his/her social security number on it). Additionally, the selections may include how consent was given, for example through an end user license agreement (EULA), on-line Opt-in prompt, Implied consent, or an indication that the user is not sure. Additional selections may include whether the personal data was collected from a minor, and where the subject is located.

Figure 12:
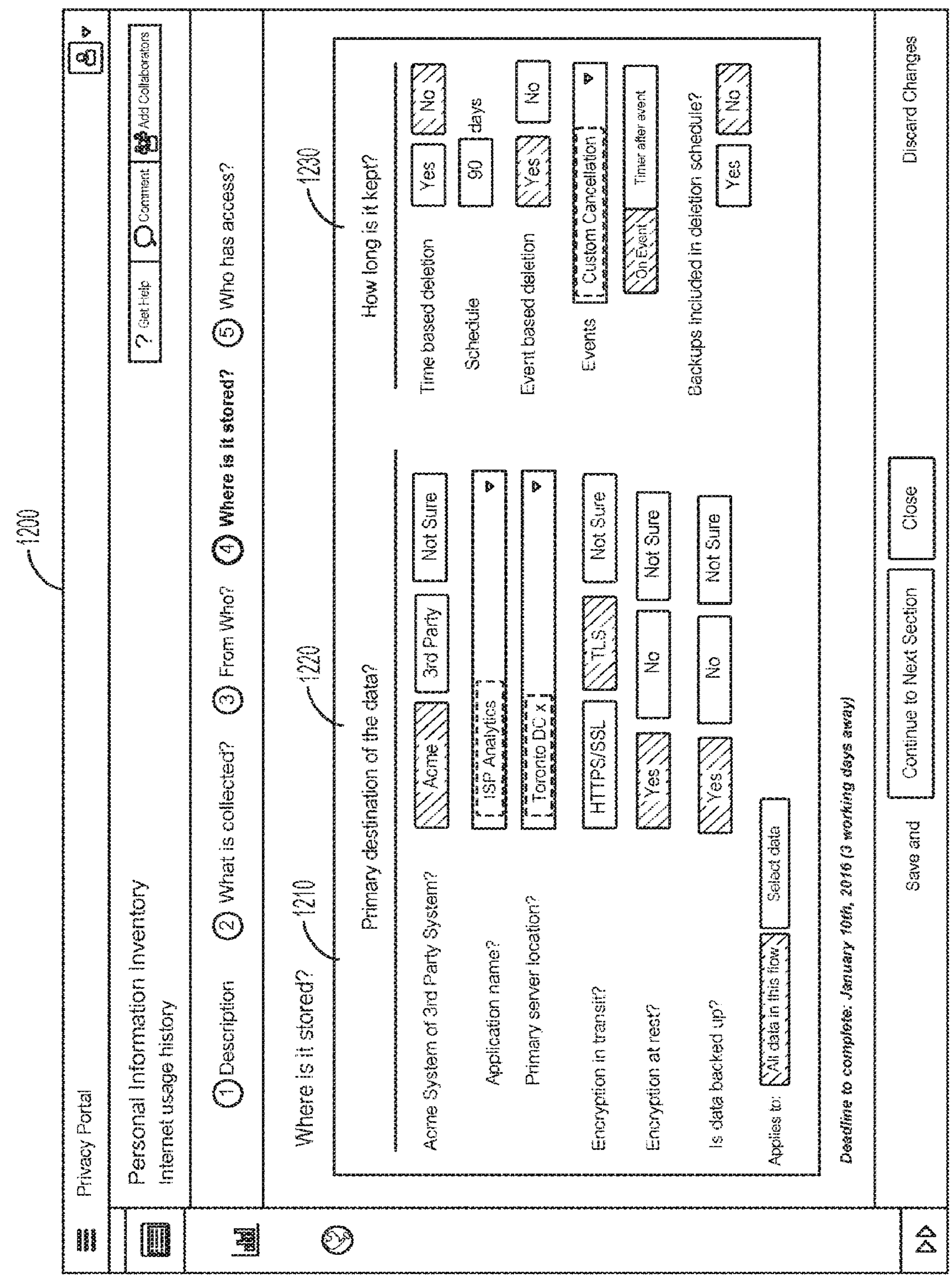
FIG. 12 is an example of a GUI that shows a dialog for inputting information regarding where the personal data related to a campaign is stored.

E. FIG. 12: Where is the Personal Data Stored

FIG. 12 shows an example "Storage Entry" dialog screen 1200, which is a graphical user interface that a user may use to indicate where particular sensitive information is to be stored 1210 within the system. From this section, a user may specify, in this case for the Internet Usage History campaign, the primary destination of the personal data 1220 and how long the personal data is to be kept 1230. The personal data may be housed by the organization (in this example, an entity called "Acme") or a third party. The user may specify an application associated with the personal data's storage (in this example, ISP Analytics), and may also specify the location of computing systems (e.g., servers) that will be storing the personal data (e.g., a Toronto data center). Other selections indicate whether the data will be encrypted and/or backed up.

The system also allows the user to select whether the destination settings are applicable to all the personal data of the campaign, or just select data (and if so, which data). In FIG. 12, the user may also select and input options related to the retention of the personal data collected for the campaign (e.g., How Long Is It Kept 1230). The retention options may indicate, for example, that the campaign's personal data should be deleted after a per-determined period of time has passed (e.g., on a particular date), or that the campaign's personal data should be deleted in accordance with the occurrence of one or more specified events (e.g., in response to the occurrence of a particular event, or after a specified period of time passes after the occurrence of a particular event), and the user may also select whether backups should be accounted for in any retention schedule. For example, the user may specify that any backups of the personal data should be deleted (or, alternatively, retained) when the primary copy of the personal data is deleted.

F. FIG. 13: Who and What Systems Have Access to Personal Data

FIG. 13 describes an example Access entry dialog screen 1300. As part of the process of adding a campaign or data flow, the user may specify in the "Who Has Access" section 1305 of the dialog screen 1300. In the example shown, the Customer Support, Billing, and Government groups within the organization are able to access the Internet Usage History personal data collected by the organization. Within each of these access groups, the user may select the type of each group, the format in which the personal data was provided, and whether the personal data is encrypted. The access level of each group may also be entered. The user may add additional access groups via the Add Group button 1310.

G. Facilitating Entry of Campaign Data, Including Chat Shown in FIG. 14

As mentioned above, to facilitate the entry of data collected through the example GUIs shown in FIGS. 8 through 12, in exemplary embodiments, the system is adapted to allow the owner of a particular campaign (or other user) to assign certain sections of questions, or individual questions, related to the campaign to contributors other than the owner. This may eliminate the need for the owner to contact other users to determine information that they don't know and then enter the information into the system themselves. Rather, in various embodiments, the system facilitates the entry of the requested information directly into the system by the assigned users.

In exemplary embodiments, after the owner assigns a respective responsible party to each question or section of questions that need to be answered in order to fully populate the data flow, the system may automatically contact each user (e.g., via an appropriate electronic message) to inform the user that they have been assigned to complete the specified questions and/or sections of questions, and provide those users with instructions as to how to log into the system to enter the data. The system may also be adapted to periodically follow up with each user with reminders until the user completes the designated tasks. As discussed elsewhere herein, the system may also be adapted to facilitate real-time text or voice communications between multiple collaborators as they work together to complete the questions necessary to define the data flow. Together, these features may reduce the amount of time and effort needed to complete each data flow.

To further facilitate collaboration, as shown FIG. 14, in exemplary embodiments, the System 100 is operable to overlay an instant messaging session over a GUI in which a user is presented with prompts to enter or select information. In FIG. 14, a communications module is operable to create an instant messaging session window 1405 that overlays the Access entry dialog screen 1300. In exemplary embodiments, the Communications Module, in response to a user request (e.g., depressing the "comment" button show in FIG. 9, FIG. 10, FIG. 11, FIG. 12, FIG. 13, FIG. 16), instantiates an instant messaging session and overlays the instant messaging session over one or more portions of the GUI.

Figure 15:
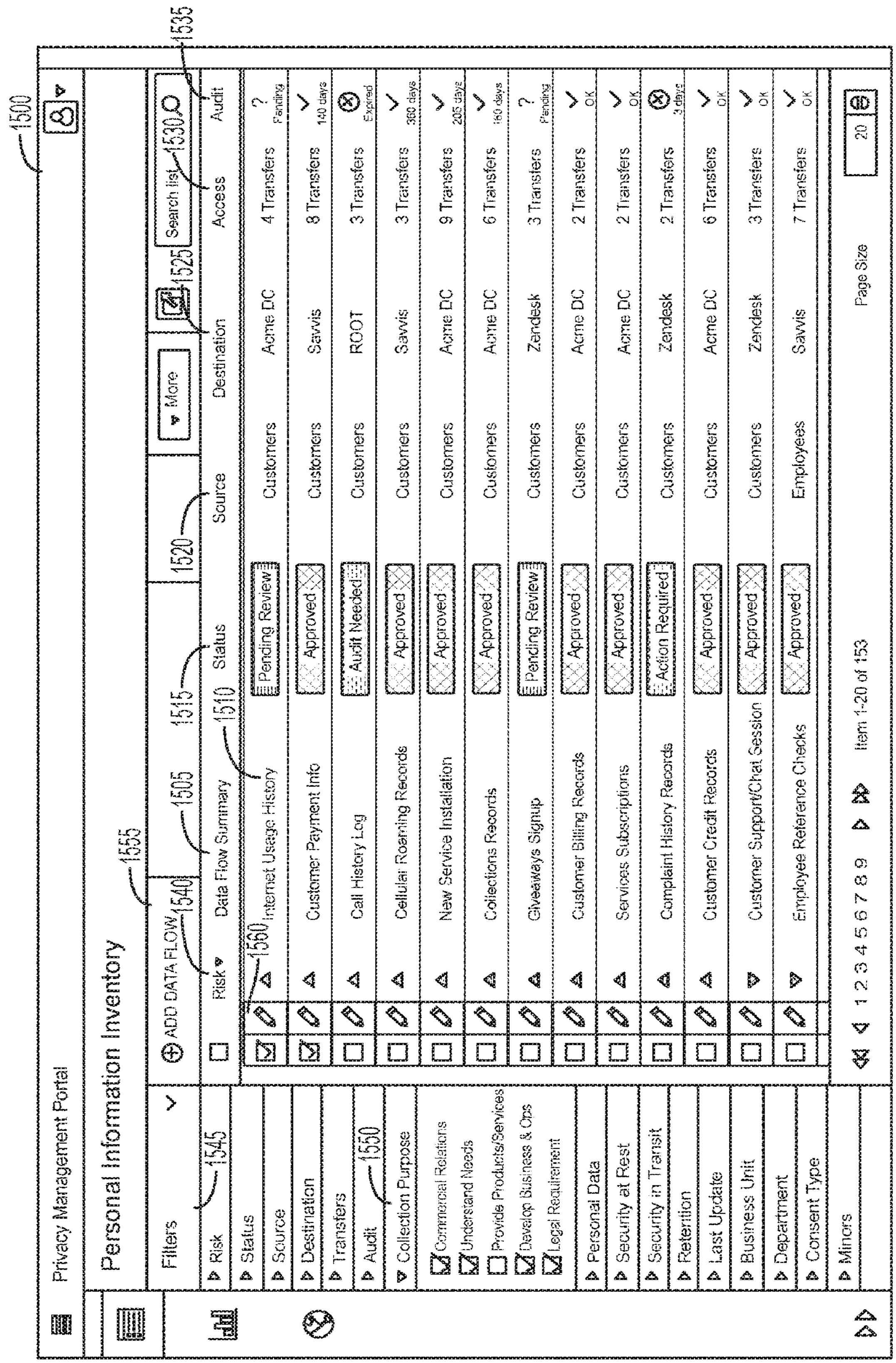
FIG. 15 is an example of a GUI showing an inventory page.

H: FIG. 15: Campaign Inventory Page

After new campaigns have been added, for example using the exemplary processes explained in regard to FIGS. 8-13, the users of the system may view their respective campaign or campaigns, depending on whether they have access to the campaign. The chief privacy officer, or another privacy office representative, for example, may be the only user that may view all campaigns. A listing of all of the campaigns within the system may be viewed on, for example, inventory page 1500 (see below). Further details regarding each campaign may be viewed via, for example, campaign information page 1600, which may be accessed by selecting a particular campaign on the inventory page 1500. And any information related to the campaign may be edited or added through, for example, the edit campaign dialog 1700 screen (see FIG. 17). Certain fields or information may not be editable, depending on the particular user's level of access. A user may also add a new campaign using a suitable user interface, such as the graphical user interface shown in FIG. 15 or FIG. 16.

In example embodiments, the System 100 (and more particularly, the Main Privacy Compliance Module 400) may use the history of past entries to suggest selections for users during campaign creation and entry of associated data. As an example, in FIG. 10, if most entries that contain the term "Internet" and have John Doe as the business rep assigned to the campaign have the items Subscriber ID, IP Address, and MAC Address selected, then the items that are commonly used may display as pre-selected items the Subscriber ID, IP address, and MAC Address each time a campaign is created having Internet in its description and John Doe as its business rep.

FIG. 15 describes an example embodiment of an inventory page 1500 that may be generated by the Main Privacy Compliance Module 400. The inventory page 1500 may be represented in a graphical user interface. Each of the graphical user interfaces (e.g., webpages, dialog boxes, etc.) presented in this application may be, in various embodiments, an HTML-based page capable of being displayed on a web browser (e.g., Firefox, Internet Explorer, Google Chrome, Opera, etc.), or any other computer-generated graphical user interface operable to display information, including information having interactive elements (e.g., an iOS, Mac OS, Android, Linux, or Microsoft Windows application). The webpage displaying the inventory page 1500 may include typical features such as a scroll-bar, menu items, as well as buttons for minimizing, maximizing, and closing the webpage. The inventory page 1500 may be accessible to the organization's chief privacy officer, or any other of the organization's personnel having the need, and/or permission, to view personal data.

Still referring to FIG. 15, inventory page 1500 may display one or more campaigns listed in the column heading Data Flow Summary 1505, as well as other information associated with each campaign, as described herein. Some of the exemplary listed campaigns include Internet Usage History 1510, Customer Payment Information, Call History Log, Cellular Roaming Records, etc. A campaign may represent, for example, a business operation that the organization is engaged in may require the use of personal data, which may include the personal data of a customer. In the campaign Internet Usage History 1510, for example, a marketing department may need customers' on-line browsing patterns to run analytics. Examples of more information that may be associated with the Internet Usage History 1510 campaign will be presented in FIG. 4 and FIG. 5. In example embodiments, clicking on (i.e., selecting) the column heading Data Flow Summary 1505 may result in the campaigns being sorted either alphabetically, or reverse alphabetically.

The inventory page 1500 may also display the status of each campaign, as indicated in column heading Status 1515. Exemplary statuses may include "Pending Review", which means the campaign has not been approved yet, "Approved," meaning the data flow associated with that campaign has been approved, "Audit Needed," which may indicate that a privacy audit of the personal data associated with the campaign is needed, and "Action Required," meaning that one or more individuals associated with the campaign must take some kind of action related to the campaign (e.g., completing missing information, responding to an outstanding message, etc.). In certain embodiments, clicking on (i.e., selecting) the column heading Status 1515 may result in the campaigns being sorted by status.

The inventory page 1500 of FIG. 15 may list the "source" from which the personal data associated with a campaign originated, under the column heading "Source" 1520. The sources may include one or more of the subjects 100 in example FIG. 1. As an example, the campaign "Internet Usage History" 1510 may include a customer's IP address or MAC address. For the example campaign "Employee Reference Checks", the source may be a particular employee. In example embodiments, clicking on (i.e., selecting) the column heading Source 1520 may result in the campaigns being sorted by source.

The inventory page 1500 of FIG. 15 may also list the "destination" of the personal data associated with a particular campaign under the column heading Destination 1525. Personal data may be stored in any of a variety of places, for example on one or more storage devices 130 that are maintained by a particular entity at a particular location. Different custodians may maintain one or more of the different storage devices. By way of example, referring to FIG. 15, the personal data associated with the campaign Internet Usage History 1510 may be stored in a repository located at the Toronto data center, and the repository may be controlled by the organization (e.g., Acme corporation) or another entity, such as a vendor of the organization that has been hired by the organization to analyze the customer's internet usage history. Alternatively, storage may be with a department within the organization (e.g., its marketing department). In example embodiments, clicking on (i.e., selecting) the column heading Destination 1525 may result in the campaigns being sorted by destination.

On the inventory page 1500, the column heading "Access" 1530 may show the number of transfers that the personal data associated with a campaign has undergone. In example embodiments, clicking on (i.e., selecting) the column heading "Access" 1530 may result in the campaigns being sorted by Access.

The column with the heading Audit 1535 shows the status of any privacy audits associated with the campaign. Privacy audits may be pending, in which an audit has been initiated but yet to be completed. The audit column may also show for the associated campaign how many days have passed since a privacy audit was last conducted for that campaign. (e.g., 140 days, 360 days). If no audit for a campaign is currently required, an "OK" or some other type of indication of compliance (e.g., a "thumbs up" indicia) may be displayed for that campaign's audit status. Campaigns may also be sorted based on their privacy audit status by selecting or clicking on the heading Audit 1535.

In example inventory page 1500, an indicator under the heading Risk 1540 may also display an indicator as to the Risk Level associated with the personal data for a particular campaign. As described earlier, a risk assessment may be made for each campaign based on one or more factors that may be obtained by the system. The indicator may, for example, be a numerical score (e.g., Risk Level of the campaign), or, as in the example shown in FIG. 15, it may be arrows that indicate the Overall Risk Assessment for the campaign. The arrows may be of different shades or different colors (e.g., red arrows indicating "high risk" campaigns, yellow arrows indicating "medium risk" campaigns, and green arrows indicating "low risk" campaigns). The direction of the arrows—for example, pointing upward or downward, may also provide a quick indication of Overall Risk Assessment for users viewing the inventory page 1500. Each campaign may be sorted based on the Risk Level associated with the campaign.

The example inventory page 1500 may comprise a filter tool, indicated by Filters 1545, to display only the campaigns having certain information associated with them. For example, as shown in FIG. 15, under Collection Purpose 1550, checking the boxes "Commercial Relations," "Provide Products/Services", "Understand Needs," "Develop Business & Ops," and "Legal Requirement" will result the display under the Data Flow Summary 1505 of only the campaigns that meet those selected collection purpose requirements.

From example inventory page 1500, a user may also add a campaign by selecting (i.e., clicking on) Add Data Flow button 1555. Once this selection has been made, the system initiates a routine to guide the user in a phase-by-phase manner through the process of creating a new campaign (further details herein). An example of the multi-phase GUIs in which campaign data associated with the added privacy campaign may be input and associated with the privacy campaign record is described in FIG. 8-13 above.

From the example inventory page 1500, a user may view the information associated with each campaign in more depth, or edit the information associated with each campaign. To do this, the user may, for example, click on or select the name of the campaign (i.e., click on Internet Usage History 1510). As another example, the user may select a button displayed on screen indicating that the campaign data is editable (e.g., edit button 1560).

I: FIG. 16: Campaign Information Page and Data Flow Diagram

FIG. 16 shows an example of information associated with each campaign being displayed in a campaign information page 1600. Campaign information page 1600 may be accessed by selecting (i.e., clicking on), for example, the edit button 1560. In this example, Personal Data Collected section 1605 displays the type of personal data collected from the customer for the campaign Internet Usage History. The type of personal data, which may be stored as data elements associated with the Internet Usage History campaign digital record entry. The type of information may include, for example, the customer's Subscriber ID, which may be assigned by the organization (e.g., a customer identification number, customer account number). The type of information may also include data associated with a customer's premises equipment, such as an IP Address, MAC Address, URL History (i.e., websites visited), and Data Consumption (i.e., the number of megabytes or gigabytes that the user has download).

Still referring to FIG. 16, the "About this Data Flow" section 1610 displays relevant information concerning the campaign, such as the purpose of the campaign. In this example, a user may see that the Internet Usage History campaign is involved with the tracking of internet usage from customers in order to bill appropriately, manage against quotas, and run analytics. The user may also see that the business group that is using the sensitive information associated with this campaign is the Internet group. A user may further see that the next privacy audit is scheduled for Jun. 10, 2016, and that the last update of the campaign entry was Jan. 2, 2015. The user may also select the "view history" hyperlink to display the history of the campaign.

FIG. 16 also depicts an example of a Data Flow Diagram 1615 generated by the system, based on information provided for the campaign. The Data Flow Diagram 1615 may provide the user with a large amount of information regarding a particular campaign in a single compact visual. In this example, for the campaign Internet Usage History, the user may see that the source of the personal data is the organization's customers. In example embodiments, as illustrated, hovering the cursor (e.g., using a touchpad, or a mouse) over the term "Customers" may cause the system to display the type of sensitive information obtained from the respective consumers, which may correspond with the information displayed in the "Personal Data Collected" section 1605.

In various embodiments, the Data Flow Diagram 1615 also displays the destination of the data collected from the User (in this example, an Internet Usage Database), along with associated parameters related to backup and deletion. The Data Flow Diagram 1615 may also display to the user which department(s) and what system(s) have access to the personal data associated with the campaign. In this example, the Customer Support Department has access to the data, and the Billing System may retrieve data from the Internet Usage Database to carry out that system's operations. In the Data Flow Diagram 1615, one or more security indicators may also be displayed. These may include, for example, an "eye" icon to indicate that the data is confidential, a "lock" icon to indicate that the data, and/or a particular flow of data, is encrypted, or an "unlocked lock" icon to indicate that the data, and/or a particular flow of data, is not encrypted. In the example shown in FIG. 16, the dotted arrow lines generally depict respective flows of data and the locked or unlocked lock symbols indicate whether those data flows are encrypted or unencrypted.

Campaign information page 1600 may also facilitate communications among the various personnel administrating the campaign and the personal data associated with it. Collaborators may be added through the Collaborators button 1625. The system may draw information from, for example, an active directory system, to access the contact information of collaborators.

If Comment button 1630 is selected, a real-time communication session (e.g., an instant messaging session) among all (or some) of the collaborators may be instantiated and overlaid on top of the page 1600. This may be helpful, for example, in facilitating population of a particular page of data by multiple users. In example embodiments, the Collaborators 1625 and Comment button 1630 may be included on any graphical user interface described herein, including dialog boxes in which information is entered or selected. Likewise, any instant messaging session may be overlaid on top of a webpage or dialog box. The system may also use the contact information to send one or more users associated with the campaign periodic updates, or reminders. For example, if the deadline to finish entering the campaign data associated with a campaign is upcoming in three days, the business representative of that assigned campaign may be sent a message reminding him or her that the deadline is in three days.

Like inventory page 1500, campaign information page 1600 also allows for campaigns to be sorted based on risk (e.g., Sort by Risk 1635). Thus, for example, a user is able to look at the information for campaigns with the highest risk assessment.

Figure 17:
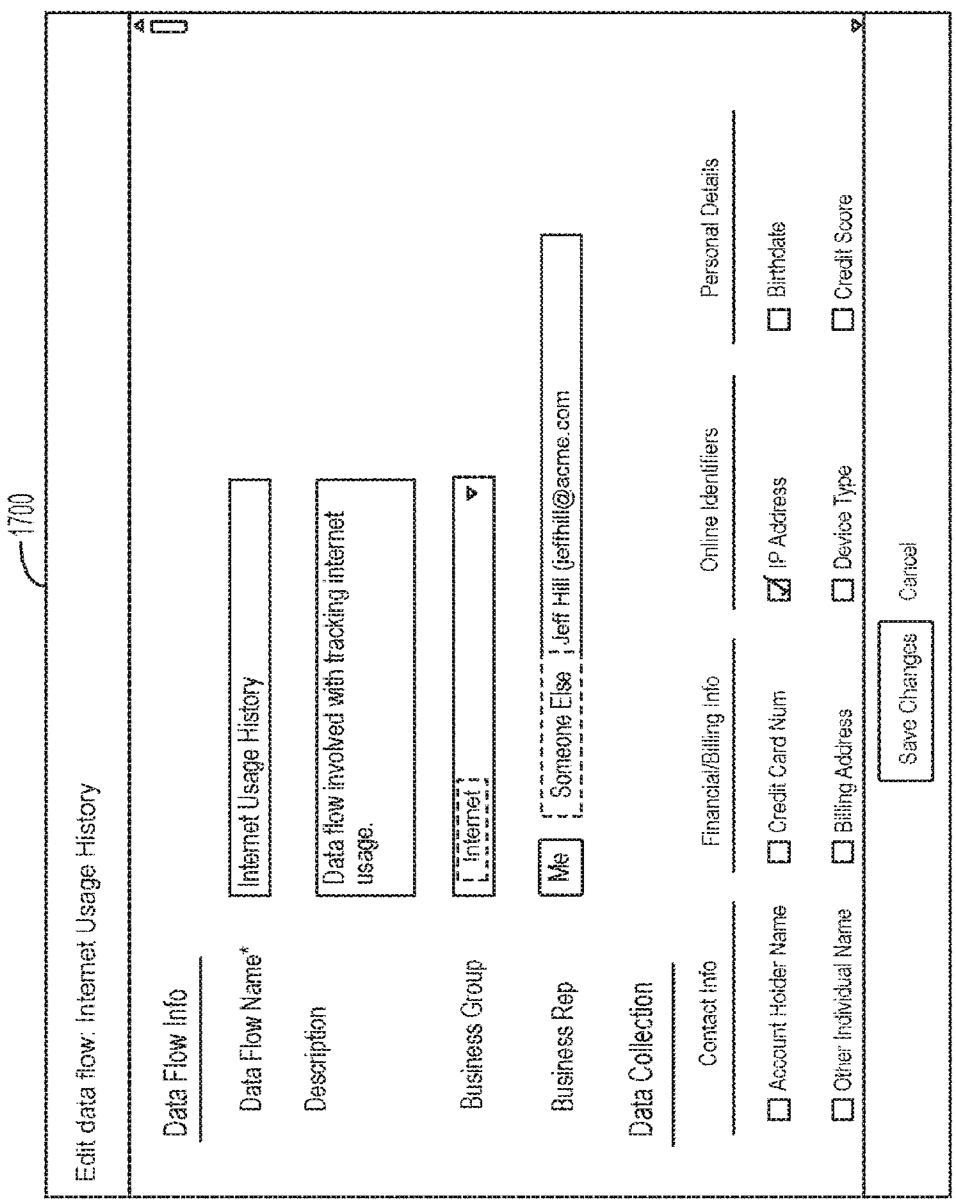
FIG. 17 is an example of a GUI showing a web page that allows editing of campaign data.

J: FIG. 17: Edit Campaign Dialog

FIG. 17 depicts an example of a dialog box—the edit campaign dialog 1700. The edit campaign dialog 1700 may be accessed by selecting (i.e., clicking on), for example, the edit button 1620 and may have editable fields associated with a campaign. In this example, the information associated with the Internet Usage History campaign may be edited via this dialog. This includes the ability for the user to change the name of the campaign, the campaign's description, the business group, the current owner of the campaign, and the particular personal data that is associated with the campaign (e.g., IP address, billing address, credit score, etc.). In example embodiments, the edit campaign dialog 1700 may also allow for the addition of more factors, checkboxes, users, etc.

The system 100 also includes a Historical Record Keeping Module, wherein every answer, change to answer, as well as assignment/re-assignment of owners and collaborators is logged for historical record keeping.

Automated Approach to Demonstrating Privacy By Design, and Integration with Software Development and Agile Tools for Privacy Design In particular embodiments, privacy by design can be used in the design phase of a product (e.g., hardware or software), which is a documented approach to managing privacy risks. One of the primary concepts is evaluating privacy impacts, and making appropriate privacy-protecting changes during the design of a project, before the project go-live.

In various embodiments, the system is adapted to automate this process with the following capabilities: (1) initial assessment; (2) gap analysis/recommended steps; and/or (3) final/updated assessment. These capabilities are discussed in greater detail below.

Initial Assessment

In various embodiments, when a business team within a particular organization is planning to begin a privacy campaign, the system presents the business team with a set of assessment questions that are designed to help one or more members of the organization's privacy team to understand what the business team's plans are, and to understand whether the privacy campaign may have a privacy impact on the organization. The questions may also include a request for the business team to provide the "go-live" date, or implementation date, for the privacy campaign. In response to receiving the answers to these questions, the system stores the answers to the system's memory and makes the answers available to the organization's privacy team. The system may also add the "go-live" date to one or more electronic calendars (e.g., the system's electronic docket).

In some implementations, the initial assessment can include an initial privacy impact assessment that evaluates one or more privacy impact features of the proposed design of the product. The initial privacy impact assessment incorporates the respective answers for the plurality of question/answer pairings in the evaluation of the one or more privacy impact features. The privacy impact features may, for example, be related to how the proposed design of the new product will collect, use, store, and/or manage personal data. One or more of these privacy impact features can be evaluated, and the initial privacy assessment can be provided to identify results of the evaluation.

Gap Analysis/Recommended Steps

After the system receives the answers to the questions, one or more members of the privacy team may review the answers to the questions. The privacy team may then enter, into the system, guidance and/or recommendations regarding the privacy campaign. In some implementations, the privacy team may input their recommendations into the privacy compliance software. In particular embodiments, the system automatically communicates the privacy team's recommendations to the business team and, if necessary, reminds one or more members of the business team to implement the privacy team's recommendations before the go-live date. The system may also implement one or more audits (e.g., as described above) to make sure that the business team incorporates the privacy team's recommendations before the "go-live" date.

The recommendations may include one or more recommended steps that can be related to modifying one or more aspects of how the product will collect, use, store, and/or manage personal data. The recommended steps may include, for example: (1) limiting the time period that personal data is held by the system (e.g., seven days); (2) requiring the personal data to be encrypted when communicated or stored; (3) anonymizing personal data; or (4) restricting access to personal data to a particular, limited group of individuals. The one or more recommended steps may be provided to address a privacy concern with one or more of the privacy impact features that were evaluated in the initial privacy impact assessment.

In response to a recommended one or more steps being provided (e.g., by the privacy compliance officers), the system may generate one or more tasks in suitable project management software that is used in managing the proposed design of the product at issue. In various embodiments, the one or more tasks may be tasks that, if recommended, would individually or collectively complete one or more (e.g., all of) the recommended steps. For example, if the one or more recommended steps include requiring personal data collected by the product to be encrypted, then the one or more tasks may include revising the product so that it encrypts any personal data that it collects.

The one or more tasks may include, for example, different steps to be performed at different points in the development of the product. In particular embodiments, the computer software application may also monitor, either automatically or through suitable data inputs, the development of the product to determine whether the one or more tasks have been completed.

Upon completion of each respective task in the one or more tasks, the system may provide a notification that the task has been completed. For example, the project management software may provide a suitable notification to the privacy compliance software that the respective task has been completed.

Final/Updated Assessment

Once the mitigation steps and recommendations are complete, the system may (e.g., automatically) conduct an updated review to assess any privacy risks associated with the revised product.

In particular embodiments, the system includes unique reporting and historical logging capabilities to automate Privacy-by-Design reporting and/or privacy assessment reporting. In various embodiments, the system is adapted to: (1) measure/analyze the initial assessment answers from the business team; (2) measure recommendations for the privacy campaign; (3) measure any changes that were implemented prior to the go-live date; (4) automatically differentiate between: (a) substantive privacy protecting changes, such as the addition of encryption, anonymization, or minimizations; and (b) non-substantive changes, such as spelling correction.

The system may also be adapted to generate a privacy assessment report showing that, in the course of a business's normal operations: (1) the business evaluates projects prior to go-live for compliance with one or more privacy-related regulations or policies; and (2) related substantive recommendations are made and implemented prior to go-live. This may be useful in documenting that privacy-by-design is being effectively implemented for a particular privacy campaign.

The privacy assessment report may, in various embodiments, include an updated privacy impact assessment that evaluates the one or more privacy impact features after the one or more recommended steps discussed above are implemented. The system may generate this updated privacy impact assessment automatically by, for example, automatically modifying any answers from within the question/answer pairings of the initial impact privacy assessment to reflect any modifications to the product that have been made in the course of completing the one or more tasks that implement the one or more substantive recommendations. For example, if a particular question from the initial privacy impact assessment indicated that certain personal data was personally identifiable data, and a recommendation was made to anonymize the data, the question/answer pairing for the particular question could be revised so the answer to the question indicates that the data has been anonymized. Any revised question/answer pairings may then be used to complete an updated privacy assessment report.

Figure 18A:
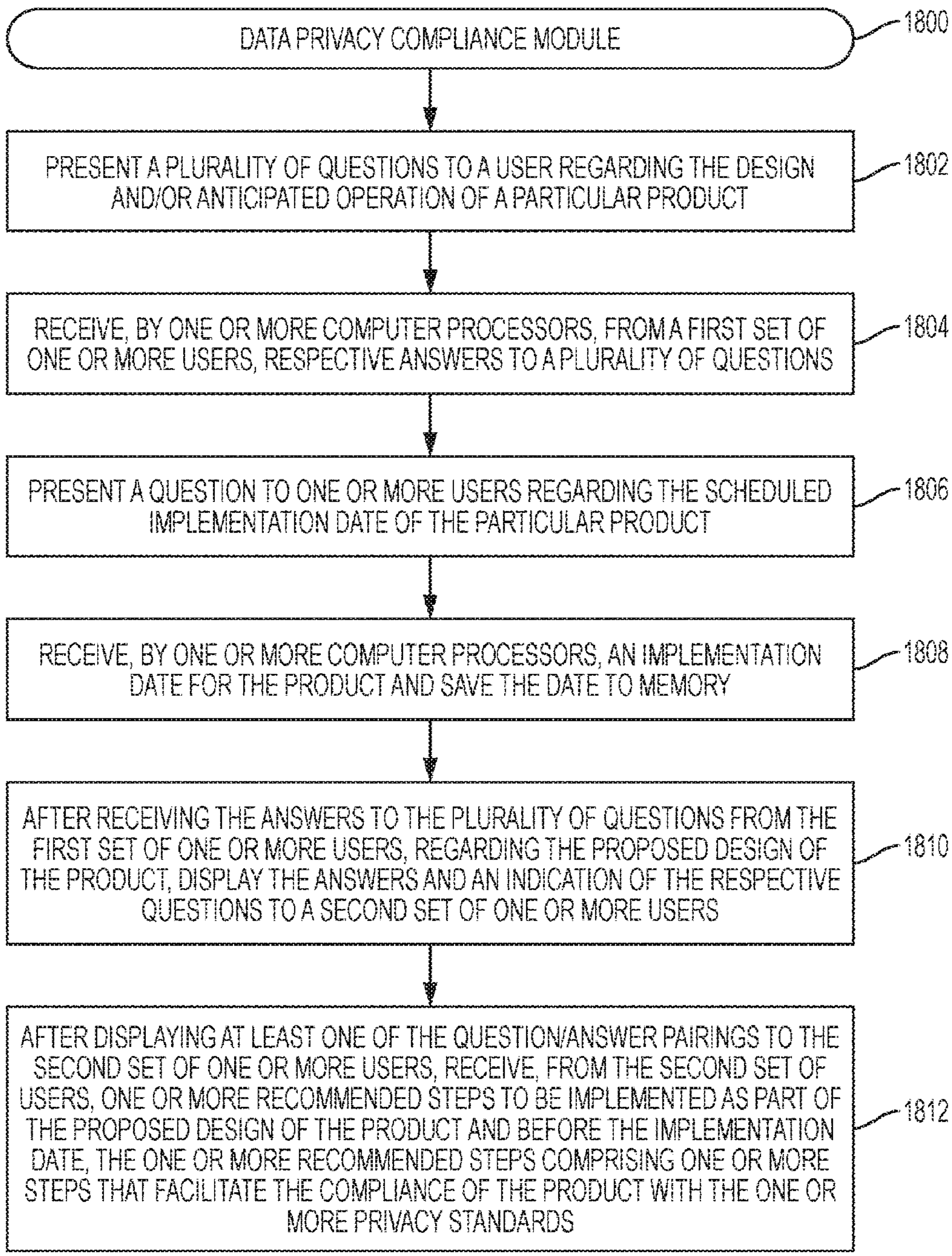
FIGS. 18A-18B depict a flow chart showing an example of a process performed by the Data Privacy Compliance Module.
Figure 18B:
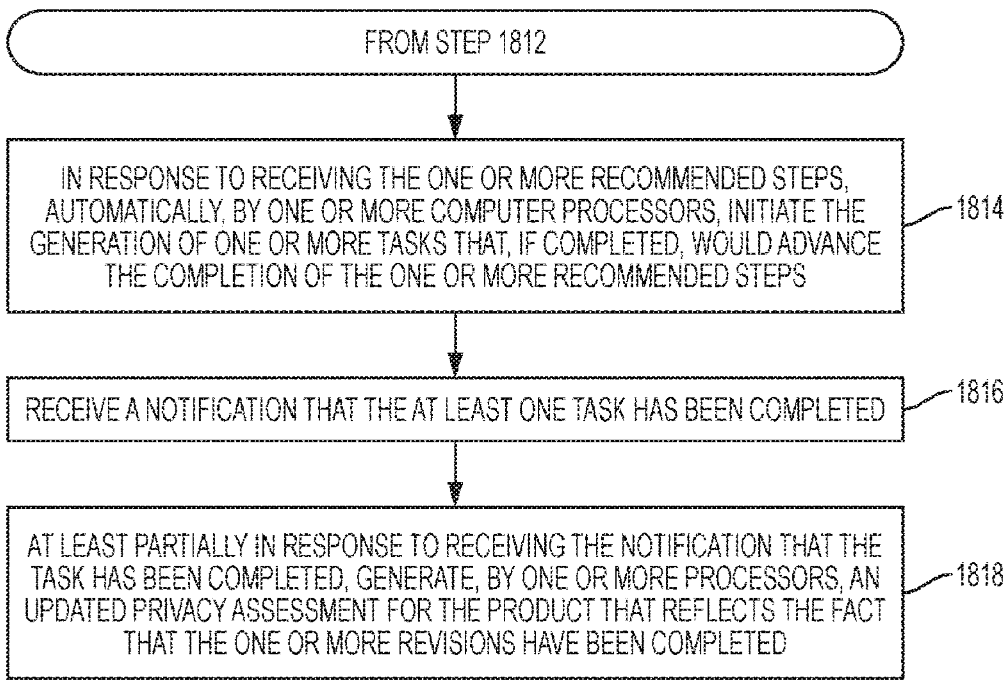

FIGS. 18A and 18B show an example process performed by a Data Privacy Compliance Module 1800. In executing the Data Privacy Compliance Module 1800, the system begins at Step 1802, where it presents a series of questions to a user (e.g., via a suitable computer display screen or other user-interface, such as a voice-interface) regarding the design and/or anticipated operation of the product. This may be done, for example, by having a first software application (e.g., a data privacy software application or other suitable application) present the user with a template of questions regarding the product (e.g., for use in conducting an initial privacy impact assessment for the product). Such questions may include, for example, data mapping questions and other questions relevant to the product's design and/or anticipated operation.

Next, the at Step 1804, the system receives, via a first computer software application, from a first set of one or more users (e.g., product designers, such as software designers, or other individuals who are knowledgeable about the product), respective answers to the questions regarding the product and associates the respective answers with their corresponding respective questions within memory to create a plurality of question/answer pairings regarding the proposed design of the product (e.g., software, a computerized electro-mechanical product, or other product).

Next, at Step 1806, the system presents a question to one or more users requesting the scheduled implantation date for the product. At Step 1808, the system receives this response and saves the scheduled implementation date to memory.

Next, after receiving the respective answers at Step 1804, the system displays, at Step 1810, the respective answers (e.g., along with their respective questions and/or a summary of the respective questions) to a second set of one or more users (e.g., one or more privacy officers from the organization that is designing the product), for example, in the form a plurality of suitable question/answer pairings. As an aside, within the context of this specification, pairings of an answer and either its respective question or a summary of the question may be referred to as a "question/answer" pairing. As an example, the question "Is the data encrypted? and respective answer "Yes" may be represented, for example, in either of the following question/answer pairings: (1) "The data is encrypted"; and (2) "Data encrypted? Yes". Alternatively, the question/answer pairing may be represented as a value in a particular field in a data structure that would convey that the data at issue is encrypted.

The system then advances to Step 1812, where it receives, from the second set of users, one or more recommended steps to be implemented as part of the proposed design of the product and before the implementation date, the one or more recommended steps comprising one or more steps that facilitate the compliance of the product with the one or more privacy standards and/or policies. In particular embodiments in which the product is a software application or an electro-mechanical device that runs device software, the one or more recommended steps may comprise modifying the software application or device software to comply with one or more privacy standards and/or policies.

Next, at Step 1814, in response to receiving the one or more recommended steps, the system automatically initiates the generation of one or more tasks in a second computer software application (e.g., project management software) that is to be used in managing the design of the product. In particular embodiments, the one or more tasks comprise one or more tasks that, if completed, individually and/or collectively would result in the completion of the one or more recommended steps. The system may do this, for example, by facilitating communication between the first and second computer software applications via a suitable application programming interface (API).

The system then initiates a monitoring process for determining whether the one or more tasks have been completed. This step may, for example, be implemented by automatically monitoring which changes (e.g., edits to software code) have been made to the product, or by receiving manual input confirming that various tasks have been completed.

Finally, at Step 1818, at least partially in response to the first computer software application being provided with the notification at Step 1816 that the task has been completed, the system generates an updated privacy assessment for the product that reflects the fact that the task has been completed. The system may generate this updated privacy impact assessment automatically by, for example, automatically modifying any answers from within the question/answer pairings of the initial impact privacy assessment to reflect any modifications to the product that have been made in the course of completing the one or more tasks that implement the one or more substantive recommendations. For example, if a particular question from the initial privacy impact assessment indicated that certain personal data was personally-identifiable data, and a recommendation was made to anonymize the data, the question/answer pairing for the particular question could be revised so that the answer to the question indicates that the data has been anonymized. Any revised question/answer pairings may then be used to complete an updated privacy assessment report.

Figure 19A:
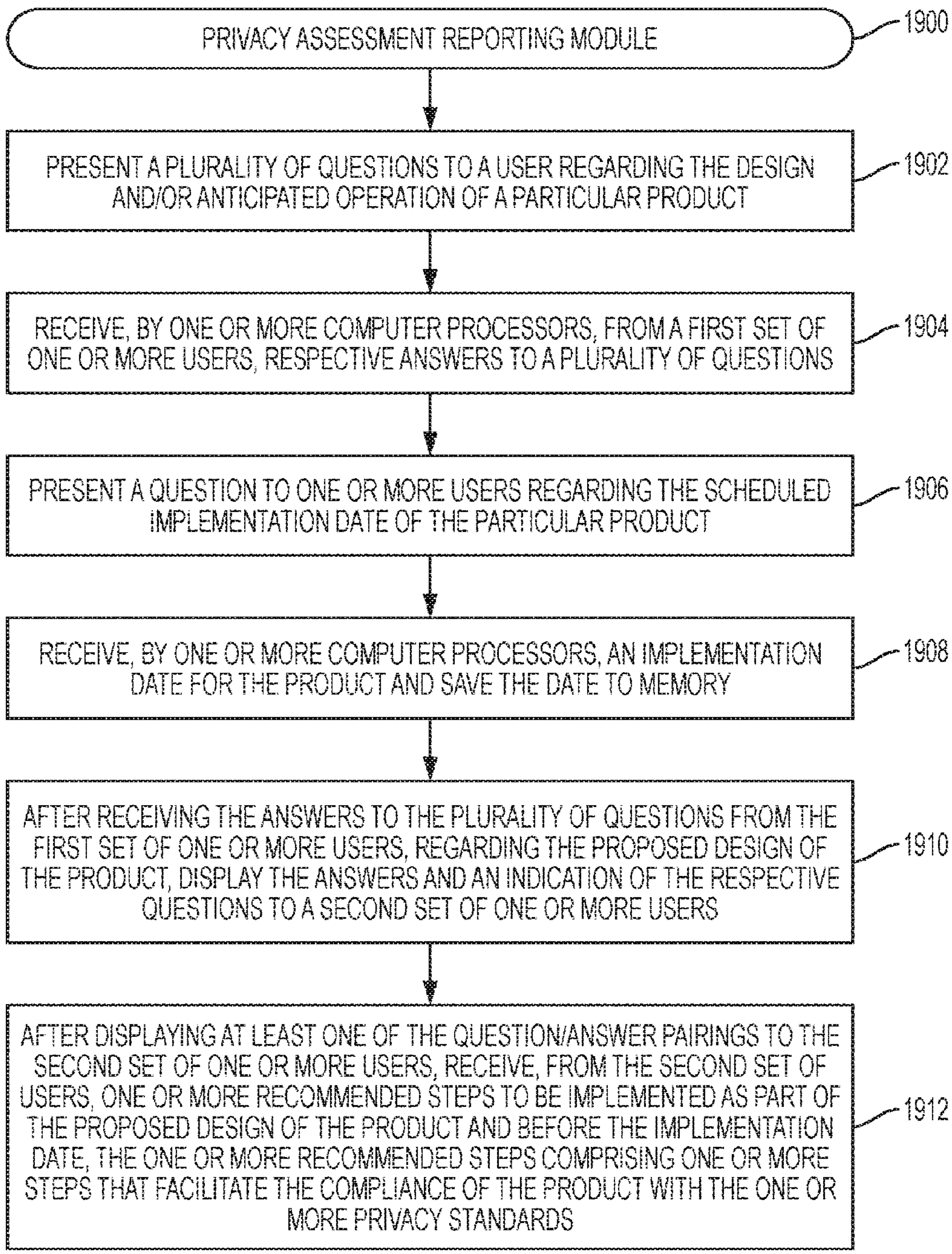
FIGS. 19A-19B depict a flow chart showing an example of a process performed by the Privacy Assessment Report Module.
Figure 19B:
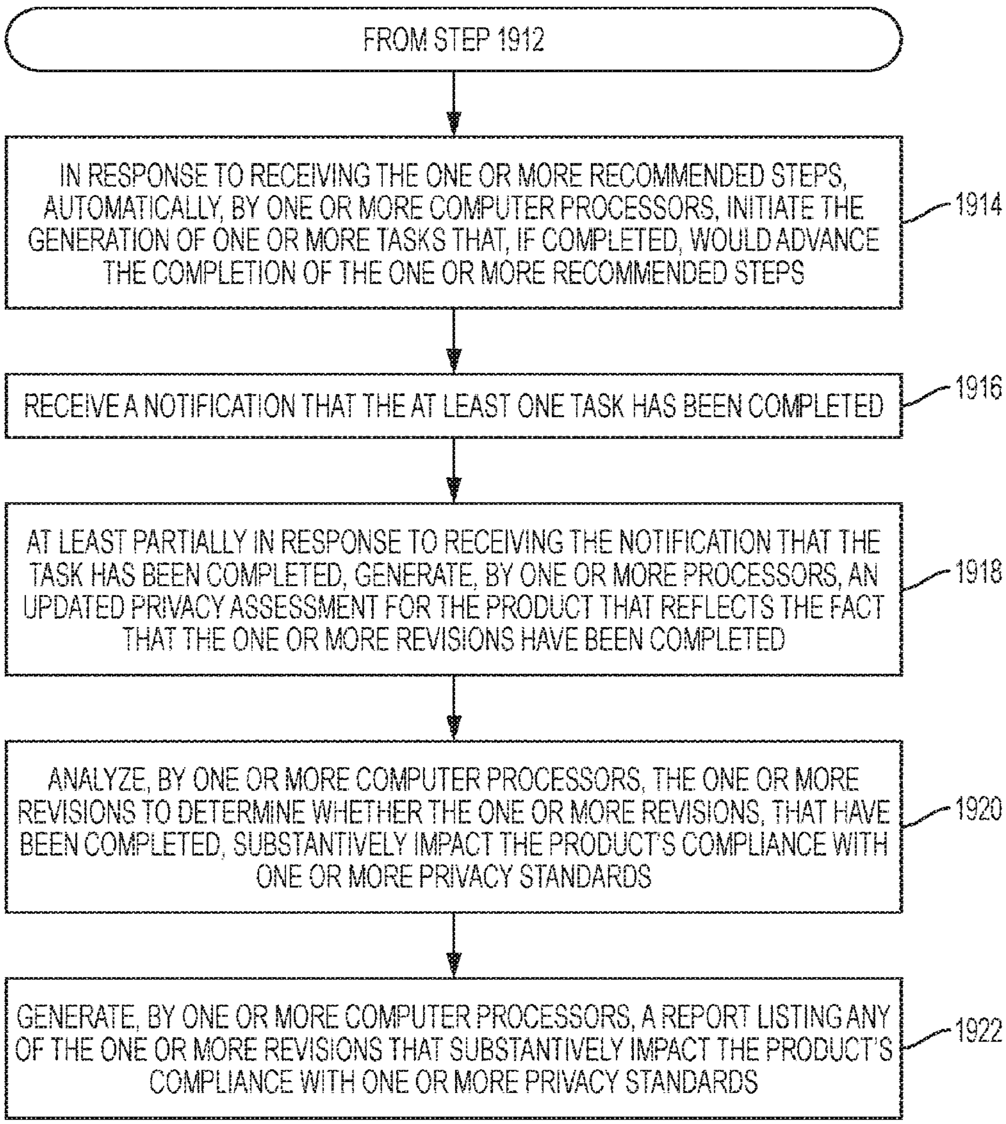

FIGS. 19A-19B depict the operation of a Privacy-By-Design Module 1900. In various embodiments, when the system executes the Privacy-By-Design Module 1900, the system begins, at Step 1902, where it presents a series of questions to a user (e.g., via a suitable computer display screen or other user-interface, such as a voice-interface) regarding the design and/or anticipated operation of the product. This may be done, for example, by having a first software application (e.g., a data privacy software application or other suitable application) present the user with a template of questions regarding the product (e.g., for use in conducting an initial privacy impact assessment for the product). Such questions may include, for example, data mapping questions and other questions relevant to the product's design and/or anticipated operation.

Next, the at Step 1904, the system receives, e.g., via a first computer software application, from a first set of one or more users (e.g., product designers, such as software designers, or other individuals who are knowledgeable about the product), respective answers to the questions regarding the product and associates the respective answers with their corresponding respective questions within memory to create a plurality of question/answer pairings regarding the proposed design of the product (e.g., software, a computerized electro-mechanical product, or other product).

Next, at Step 1906, the system presents a question to one or more users requesting the scheduled implantation date for the product. At Step 1908, the system receives this response and saves the scheduled implementation date to memory.

Next, after receiving the respective answers at Step 1904, the system displays, at Step 1910, the respective answers (e.g., along with their respective questions and/or a summary of the respective questions) to a second set of one or more users (e.g., one or more privacy officers from the organization that is designing the product), for example, in the form a plurality of suitable question/answer pairings. As an aside, within the context of this specification, pairings of an answer and either its respective question or a summary of the question may be referred to as a "question/answer" pairing. As an example, the question "Is the data encrypted? and respective answer "Yes" may be represented, for example, in either of the following question/answer pairings: (1) "The data is encrypted"; and (2) "Data encrypted? Yes". Alternatively, the question/answer pairing may be represented as a value in a particular field in a data structure that would convey that the data at issue is encrypted.

The system then advances to Step 1912, where it receives, from the second set of users, one or more recommended steps to be implemented as part of the proposed design of the product and before the implementation date, the one or more recommended steps comprising one or more steps that facilitate the compliance of the product with the one or more privacy standards and/or policies. In particular embodiments in which the product is a software application or an electro-mechanical device that runs device software, the one or more recommended steps may comprise modifying the software application or device software to comply with one or more privacy standards and/or policies.

Next, at Step 1914, in response to receiving the one or more recommended steps, the system automatically initiates the generation of one or more tasks in a second computer software application (e.g., project management software) that is to be used in managing the design of the product. In particular embodiments, the one or more tasks comprise one or more tasks that, if completed, individually and/or collectively would result in the completion of the one or more recommended steps.

The system then initiates a monitoring process for determining whether the one or more tasks have been completed. This step may, for example, be implemented by automatically monitoring which changes (e.g., edits to software code) have been made to the product, or by receiving manual input confirming that various tasks have been completed.

The system then advances to Step 1916, where it receives a notification that the at least one task has been completed. Next, at Step 1918, at least partially in response to the first computer software application being provided with the notification that the task has been completed, the system generates an updated privacy assessment for the product that reflects the fact that the task has been completed. The system may generate this updated privacy impact assessment automatically by, for example, automatically modifying any answers from within the question/answer pairings of the initial impact privacy assessment to reflect any modifications to the product that have been made in the course of completing the one or more tasks that implement the one or more substantive recommendations. For example, if a particular question from the initial privacy impact assessment indicated that certain personal data was personally-identifiable data, and a recommendation was made to anonymize the data, the question/answer pairing for the particular question could be revised so that the answer to the question indicates that the data has been anonymized. Any revised question/answer pairings may then be used to complete an updated privacy assessment report.

As discussed above, at Step 1920, the system may then analyze the one or more revisions that have made to the product to determine whether the one or more revisions substantively impact the product's compliance with one or more privacy standards. Finally, at Step 1922, the system generates a privacy-by-design report that may, for example, include a listing of any of the one or more revisions that have been made and that substantively impact the product's compliance with one or more privacy standards.

In various embodiments, the privacy-by-design report may also comprise, for example, a log of data demonstrating that the business, in the normal course of its operations: (1) conducts privacy impact assessments on new products before releasing them; and (2) implements any changes needed to comply with one or more privacy polies before releasing the new products. Such logs may include data documenting the results of any privacy impact assessments conducted by the business (and/or any particular sub-part of the business) on new products before each respective new product's launch date, any revisions that the business (and/or any particular sub-part of the business) make to new products before the launch of the product. The report may also optionally include the results of any updated privacy impact assessments conducted on products after the products have been revised to comply with one or more privacy regulations and/or policies. The report may further include a listing of any changes that the business has made to particular products in response to initial impact privacy assessment results for the products. The system may also list which of the listed changes were determined, by the system, to be substantial changes (e.g., that the changes resulted in advancing the product's compliance with one or more privacy regulations).

Additional Aspects of System

1. Standardized and Customized Assessment of Vendors' Compliance with Privacy and/or Security Policies In particular embodiments, the system may be adapted to: (1) facilitate the assessment of one or more vendors' compliance with one or more privacy and/or security policies; and (2) allow organizations (e.g., companies or other organizations) who do business with the vendors to create, view and/or apply customized criteria to information periodically collected by the system to evaluate each vendor's compliance with one or more of the company's specific privacy and/or security policies. In various embodiments, the system may also flag any assessments, projects, campaigns, and/or data flows that the organization has documented and maintained within the system if those data flows are associated with a vendor that has its rating changed so that the rating meets certain criteria (e.g., if the vendor's rating falls below a predetermined threshold).

In particular embodiments:

- The system may include an online portal and community that includes a listing of all supported vendors.
- An appropriate party (e.g., the participating vendor or a member of the on-line community) may use the system to submit an assessment template that is specific to a particular vendor.
  - If the template is submitted by the vendor itself, the template may be tagged in any appropriate way as "official"
  - An instance for each organization using the system (i.e., customer) is integrated with this online community/portal so that the various assessment templates can be directly fed into that organization's instance of the system if the organization wishes to use it.
- Vendors may subscribe to a predetermined standardized assessment format.
  - Assessment results may also be stored in the central community/portal.
  - A third-party privacy and/or security policy compliance assessor, on a schedule, may (e.g., periodically) complete the assessment of the vendor.
  - Each organization using the system can subscribe to the results (e.g., once they are available).
  - Companies can have one or more customized rules set up within the system for interpreting the results of assessments in their own unique way. For example:
    - Each customer can weight each question within an assessment as desired and set up addition/multiplication logic to determine an aggregated risk score that takes into account the customized weightings given to each question within the assessment.
    - Based on new assessment results—the system may notify each customer if the vendor's rating falls, improves, or passes a certain threshold.
    - The system can flag any assessments, projects, campaigns, and/or data flows that the customer has documented and maintained within the system if those data flows are associated with a vendor that has its rating changed.

2. Privacy Policy Compliance System that Facilitates Communications with Regulators (Including Translation Aspect)

In particular embodiments, the system is adapted to interface with the computer systems of regulators (e.g., government regulatory agencies) that are responsible for approving privacy campaigns. This may, for example, allow the regulators to review privacy campaign information directly within particular instances of the system and, in some embodiments, approve the privacy campaigns electronically.

In various embodiments, the system may implement this concept by:

- Exporting relevant data regarding the privacy campaign, from an organization's instance of the system (e.g., customized version of the system) in standardized format (e.g., PDF or Word) and sending the extracted data to an appropriate regulator for review (e.g., in electronic or paper format).
  - Either regular provides the format that the system codes to, or the organization associated with the system provides a format that the regulators are comfortable with.
- Send secure link to regulator that gives them access to comment and leave feedback
  - Gives the regulator direct access to the organization's instance of the system with a limited and restricted view of just the projects and associated audit and commenting logs the organization needs reviewed.
  - Regulator actions are logged historically and the regulator can leave guidance, comments, and questions, etc.
- Have portal for regulator that securely links to the systems of their constituents.

Details:

- When submitted—the PIAs are submitted with requested priority—standard or expedited.
- DPA specifies how many expedited requests individuals are allowed to receive.
- Either the customer or DPA can flag a PIA or associated comments/guidance on the PIA with "needs translation" and that can trigger an automated or manual language translation.
- Regulator could be a DPA "data protection authority" in any EU country, or other country with similar concept like FTC in US, or OPC in Canada.

3. Systems/Methods for Measuring the Privacy Maturity of a Business Group Within an Organization.

In particular embodiments, the system is adapted for automatically measuring the privacy of a business group, or other group, within a particular organization that is using the system. This may provide an automated way of measuring the privacy maturity, and one or more trends of change in privacy maturity of the organization, or a selected sub-group of the organization.

In various embodiments, the organization using the system can customize one or more algorithms used by the system to measure the privacy maturity of a business group (e.g., by specifying one or more variables and/or relative weights for each variable in calculating a privacy maturity score for the group). The following are examples of variables that may be used in this process:

- Issues/Risks found in submitted assessments that are unmitigated or uncaught prior to the assessment being submitted to the privacy office
  - % of privacy assessments with high issues/total assessments
  - % with medium
  - % with low

- Size and type of personal data used by the group
  - Total assessments done
  - Number of projects/campaigns with personal data
  - Amount of personal data
  - Volume of data transfers to internal and external parties
- Training of the people in the group
  - Number or % of individuals who have watched training, readings, or videos
  - Number or % of individuals who have completed quizzes or games for privacy training
  - Number or % of individuals who have attended privacy events either internally or externally
  - Number or % of individuals who are members of IAPP
  - Number or % of individuals who have been specifically trained in privacy either internally or externally, formally (IAPP certification) or informally
  - Usage of an online version of the system, or mobile training or communication portal that customer has implemented
- Other factors 4. Automated Assessment of Compliance (Scan App or Website to Determine Behavior/Compliance with Privacy Policies)

In various embodiments, instead of determining whether an organization complies with the defined parameters of a privacy campaign by, for example, conducting an audit as described above (e.g., by asking users to answer questions regarding the privacy campaign, such as "What is collected" "what cookies are on your website", etc.), the system may be configured to automatically determine whether the organization is complying with one or more aspects of the privacy policy.

For example, during the audit process, the system may obtain a copy of a software application (e.g., an "app") that is collecting and/or using sensitive user information, and then automatically analyze the app to determine whether the operation of the app is complying with the terms of the privacy campaign that govern use of the app.

Similarly, the system may automatically analyze a website that is collecting and/or using sensitive user information to determine whether the operation of the web site is complying with the terms of the privacy campaign that govern use of the web site.

In regard to various embodiments of the automatic application-analyzing embodiment referenced above:

- The typical initial questions asked during an audit may be replaced by a request to "Upload your app here".
  - After the app is uploaded to the system, the system detects what privacy permissions and data the app is collecting from users.
  - This is done by having the system use static or behavioral analysis of the application, or by having the system integrate with a third-party system or software (e.g., Veracode), which executes the analysis.
  - During the analysis of the app, the system may detect, for example, whether the app is using location services to detect the location of the user's mobile device.
  - In response to determining that the app is collecting one or more specified types of sensitive information (e.g., the location of the user's mobile device), the system may automatically request follow up information from the user by posing one or more questions to the user, such as:
    - For what business reason is the data being collected?
    - How is the user's consent given to obtain the data?
    - Would users be surprised that the data is being collected?
    - Is the data encrypted at rest and/or in motion?
    - What would happen if the system did not collect this data? What business impact would it have?
    - In various embodiments, the system is adapted to allow each organization to define these follow-up questions, but the system asks the questions (e.g., the same questions, or a customized list of questions) for each privacy issue that is found in the app.
  - In various embodiments, after a particular app is scanned a first time, when the app is scanned, the system may only detect and analyze any changes that have been made to the app since the previous scan of the app.
  - In various embodiments, the system is adapted to (optionally) automatically monitor (e.g., continuously monitor) one or more online software application marketplaces (such as Microsoft, Google, or Apple's App Store) to determine whether the application has changed. If so, the system may, for example: (1) automatically scan the application as discussed above; and (2) automatically notify one or more designated individuals (e.g., privacy office representatives) that an app was detected that the business failed to perform a privacy assessment on prior to launching the application.

In regard to various embodiments of the automatic application-analyzing embodiment referenced above:

- The system prompts the user to enter the URL of the website to be analyzed, and, optionally, the URL to the privacy policy that applies to the web site.
- The system then scans the website for cookies, and/or other tracking mechanisms, such as fingerprinting technologies and/or 3rd party SDKs.
  - The system may then optionally ask the user to complete a series of one or more follow-up questions for each of these items found during the scan of the website.
  - This may help the applicable privacy office craft a privacy policy to be put on the website to disclose the use of the tracking technologies and SDK's used on the website.
- The system may then start a continuous monitoring of the website site to detect whether any new cookies, SDKs, or tracking technologies are used. In various embodiments, the system is configured to, for example, generate an alert to an appropriate individual (e.g., a designated privacy officer) to inform them of the change to the website. The privacy officer may use this information, for example, to determine whether to modify the privacy policy for the website or to coordinate discontinuing use of the new tracking technologies and/or SDK's.
- In various embodiments, the system may also auto-detect whether any changes have been made to the policy or the location of the privacy policy link on the page and, in response to auto-detecting such changes, trigger an audit of the project.
- It should be understood that the above methods of automatically assessing behavior and/or compliance with one or more privacy policies may be done in any suitable way (e.g., ways other than website scanning and app scanning). For example, the system may alternatively, or in addition, automatically detect, scan and/or monitor any appropriate technical system(s) (e.g., computer system and/or system component or software), cloud services, apps, websites and/or data structures, etc.

5. System Integration with DLP Tools.

DLP tools are traditionally used by information security professionals. Various DLP tools discover where confidential, sensitive, and/or personal information is stored and use various techniques to automatically discover sensitive data within a particular computer system—for example, in emails, on a particular network, in databases, etc. DLP tools can detect the data, what type of data, the amount of data, and whether the data is encrypted. This may be valuable for security professionals, but these tools are typically not useful for privacy professionals because the tools typically cannot detect certain privacy attributes that are required to be known to determine whether an organization is in compliance with particular privacy policies.

For example, traditional DLP tools cannot typically answer the following questions:

Who was the data collected from (data subject)?

Where are those subjects located?

Are they minors?

How was consent to use the data received?

What is the use of the data?

Is the use consistent with the use specified at the time of consent?

What country is the data stored in and/or transferred to?

Etc.

In various embodiments, the system is adapted to integrate with appropriate DLP and/or data discovery tools (e.g., INFORMATICA) and, in response to data being discovered by those tools, to show each area of data that is discovered as a line-item in a system screen via integration.

The system may do this, for example, in a manner that is similar to pending transactions in a checking account that have not yet been reconciled.

A designated privacy officer may then select one of those—and either match it up (e.g., reconcile it) with an existing data flow or campaign in the system OR trigger a new assessment to be done on that data to capture the privacy attributes and data flow.

6. System for Generating an Organization's Data Map by Campaign, by System, or by Individual Data Attributes.

In particular embodiments, the system may be adapted to allow users to specify various criteria, and then to display, to the user, any data maps that satisfy the specified criteria. For example, the system may be adapted to display, in response to an appropriate request: (1) all of a particular customer's data flows that are stored within the system; (2) all of the customer's data flows that are associated with a particular campaign; and/or (3) all of the customer's data flows that involve a particular address.

Similarly, the system may be adapted to allow privacy officers to document and input the data flows into the system in any of a variety of different ways, including:

Document by process

The user initiates an assessment for a certain business project and captures the associated data flows (including the data elements related to the data flows and the systems they are stored in).

Document by element

The user initiates an audit of a data element—such as SSN—and tries to identify all data structures associated with the organization that include the SSN. The system may then document this information (e.g., all of the organization's systems and business processes that involve the business processes.)

Document by system

The user initiates an audit of a database, and the system records, in memory, the results of the audit.

7. Privacy Policy Compliance System that Allows Users to Attach Emails to Individual Campaigns.

Privacy officers frequently receive emails (or other electronic messages) that are associated with an existing privacy assessment or campaign, or a potential future privacy assessment. For record keeping and auditing purposes, the privacy officer may wish to maintain those emails in a central storage location, and not in email. In various embodiments, the system is adapted to allow users to automatically attach the email to an existing privacy assessment, data flow, and/or privacy campaign. Alternatively, or additionally, the system may allow a user to automatically store emails within a data store associated with the system, and to store the emails as "unassigned", so that they may later be assigned to an existing privacy assessment, data flow, and/or privacy campaign.

In various embodiments, the system is adapted to allow a user to store an email using:

a browser plugin-extension that captures webmail;

a Plug-in directly with office 365 or google webmail (or other suitable email application);

a Plug-in with email clients on computers such as Outlook;

via an integrated email alias that the email is forwarded to; or any other suitable configuration 8. Various Aspects of Related Mobile Applications In particular embodiments, the system may use a mobile app (e.g., that runs on a particular mobile device associated by a user) to collect data from a user. The mobile app may be used, for example, to collect answers to screening questions. The app may also be adapted to allow users to easily input data documenting and/or reporting a privacy incident. For example, the app may be adapted to assist a user in using their mobile device to capture an image of a privacy incident (e.g., a screen shot documenting that data has been stored in an improper location, or that a printout of sensitive information has been left in a public workspace within an organization.)

The mobile app may also be adapted to provide incremental training to individuals. For example, the system may be adapted to provide incremental training to a user (e.g., in the form of the presentation of short lessons on privacy). Training sessions may be followed by short quizzes that are used to allow the user to assess their understanding of the information and to confirm that they have completed the training.

9. Automatic Generation of Personal Data Inventory for Organization

In particular embodiments, the system is adapted to generate and display an inventory of the personal data that an organization collects and stores within its systems (or other systems). As discussed above, in various embodiments, the system is adapted to conduct privacy impact assessments for new and existing privacy campaigns. During a privacy impact assessment for a particular privacy campaign, the system may ask one or more users a series of privacy impact assessment questions regarding the particular privacy campaign and then store the answers to these questions in the system's memory, or in memory of another system, such a third-party computer server.

Such privacy impact assessment questions may include questions regarding: (1) what type of data is to be collected as part of the campaign; (2) who the data is to be collected from; (3) where the data is to be stored; (4) who will have access to the data; (5) how long the data will be kept before being deleted from the system's memory or archived; and/or (6) any other relevant information regarding the campaign.

The system may store the above information, for example, in any suitable data structure, such as a database. In particular embodiments, the system may be configured to selectively (e.g., upon request by an authorized user) generate and display a personal data inventory for the organization that includes, for example, all of the organization's current active campaigns, all of the organization's current and past campaigns, or any other listing of privacy campaigns that, for example, satisfy criteria specified by a user. The system may be adapted to display and/or export the data inventory in any suitable format (e.g., in a table, a spreadsheet, or any other suitable format).

10. Integrated/Automated Solution for Privacy Risk Assessments

Continuing with Concept 9, above, in various embodiments, the system may execute multiple integrated steps to generate a personal data inventory for a particular organization. For example, in a particular embodiment, the system first conducts a Privacy Threshold Assessment (PTA) by asking a user a relatively short set of questions (e.g., between 1 and 15 questions) to quickly determine whether the risk associated with the campaign may potentially exceed a pre-determined risk threshold (e.g., whether the campaign is a potentially high-risk campaign). The system may do this, for example, by using any of the above techniques to assign a collective risk score to the user's answers to the questions and determining whether the collective risk score exceeds a particular risk threshold value. Alternatively, the system may be configured to determine that the risk associated with the campaign exceeds the risk threshold value if the user answers a particular one or more of the questions in a certain way.

The system may be configured for, in response to the user's answers to one or more of the questions within the Privacy Threshold Assessment indicating that the campaign exceeds, or may potentially exceed, a pre-determined risk threshold, presenting the user with a longer set of detailed questions regarding the campaign (e.g., a Privacy Impact Assessment). The system may then use the user's answers to this longer list of questions to assess the overall risk of the campaign, for example, as described above.

In particular embodiments, the system may be configured for, in response to the user's answers to one or more of the questions within the Privacy Threshold Assessment indicating that the campaign does not exceed, or does not potentially exceed, a pre-determined risk threshold, not presenting the user with a longer set of detailed questions regarding the campaign (e.g., a Privacy Impact Assessment). In such a case, the system may simply save an indication to memory that the campaign is a relatively low risk campaign.

Accordingly, in particular embodiments, the system may be adapted to automatically initiate a Privacy Impact Assessment if the results of a shorter Privacy Threshold Assessment satisfy certain criteria. Additionally, or alternatively, in particular embodiments, the system may be adapted to allow a privacy officer to manually initiate a Privacy Impact Assessment for a particular campaign.

In particular embodiments, built into the Privacy Threshold Assessment and the Privacy Impact Assessment are the data mapping questions and/or sub-questions of how the personal data obtained through the campaign will be collected, used, stored, accessed, retained, and/or transferred, etc. In particular embodiments: (1) one or more of these questions are asked in the Privacy Threshold Assessment; and (2) one or more of the questions are asked in the Privacy Impact Assessment. In such embodiments, the system may obtain the answers to each of these questions, as captured during the Privacy Threshold Assessment and the Privacy Impact Assessment, and then use the respective answers to generate the end-to-end data flow for the relevant privacy campaign.

The system may then link all of the data flows across all of the organization's privacy campaigns together in order to show a complete evergreen version of the personal data inventory of the organization. Thus, the system may efficiently generate the personal data inventory of an organization (e.g., through the use of reduced computer processing power) by automatically gathering the data needed to prepare the personal data inventory while conducting Privacy Threshold Assessments and Privacy Impact Assessments.

System for Preventing Individuals from Trying to Game the System

As discussed above, in particular embodiments, the system is adapted to display a series of threshold questions for particular privacy campaigns and to use conditional logic to assess whether to present additional, follow-up questions to the user. There may, for example, be situations in which a user may answer, or attempt to answer, one or more of the threshold questions incorrectly (e.g., dishonestly) in an attempt to avoid needing to answer additional questions. This type of behavior can present serious potential problems for the organization because the behavior may result in privacy risks associated with a particular privacy campaign being hidden due to the incorrect answer or answers.

To address this issue, in various embodiments, the system maintains a historical record of every button press (e.g., un-submitted system input) that an individual makes when a question is presented to them. In particular embodiments, actively monitoring the user's system inputs may include, for example, monitoring, recording, tracking, and/or otherwise taking account of the user's system inputs. These system inputs may include, for example: (1) one or more mouse inputs; (2) one or more keyboard (e.g., text) inputs); (3) one or more touch inputs; and/or (4) any other suitable inputs (e.g., such as one or more vocal inputs, etc.). In various embodiments, the system is configured to actively monitor the user's system inputs, for example: (1) while the user is viewing one or more graphical user interfaces for providing information regarding or responses to questions regarding one or more privacy campaigns; (2) while the user is logged into a privacy portal; and/or (3) in any other suitable situation related to the user providing information related to the collection or storage of personal data (e.g., in the context of a privacy campaign). Additionally, the system tracks, and saves to memory, each incidence of the individual changing their answer to a question (e.g., (a) before formally submitting the answer by pressing an "enter" key, or other "submit" key on a user interface, such as a keyboard or graphical user interface on a touch-sensitive display screen; or (b) after initially submitting the answer).

The system may also be adapted to automatically determine whether a particular question (e.g., threshold question) is a "critical" question that, if answered in a certain way, would cause the conditional logic trigger to present the user with one or more follow-up questions. For example, the system may, in response to receiving the user's full set of answers to the threshold questions, automatically identify any individual question within the series of threshold questions that, if answered in a particular way (e.g., differently than the user answered the question) would have caused the system to display one or more follow up questions. The system may then flag those identified questions, in the system's memory, as "critical" questions.

Alternatively, the system may be adapted to allow a user (e.g., a privacy officer of an organization) who is drafting a particular threshold question that, when answered in a particular way, will automatically trigger the system to display one or more follow up questions to the user, to indicate that is a "critical" threshold question. The system may then save this "critical" designation of the question to the system's computer memory.

In various embodiments, the system is configured, for any questions that are deemed "critical" (e.g., either by the system, or manually, as discussed above), to determine whether the user exhibited any abnormal behavior when answering the question. For example, the system may check to see whether the user changed their answer once, or multiple times, before submitting their answer to the question (e.g., by tracking the user's keystrokes while they are answering the threshold question, as described above). As another example, the system may determine whether it took the user longer than a pre-determined threshold amount of time (e.g., 5 minutes, 3 minutes, etc. . . . ) to answer the critical threshold question.

In particular embodiments, the system may be adapted, in response to determining that the user exhibited abnormal behavior when answering the critical threshold question, to automatically flag the threshold question and the user's answer to that question for later follow up by a designated individual or team (e.g., a member of the organization's privacy team). In particular embodiments, the system may also, or alternatively, be adapted to automatically generate and transmit a message to one or more individuals (e.g., the organization's chief privacy officer) indicating that the threshold question may have been answered incorrectly and that follow-up regarding the question may be advisable. After receiving the message, the individual may, in particular embodiments, follow up with the individual who answered the question, or conduct other additional research, to determine whether the question was answered accurately.

In particular embodiments, the system is configured to monitor a user's context as the user provides responses for a computerized privacy questionnaire. The user context may take in to account a multitude of different user factors to incorporate information about the user's surroundings and circumstances. One user factor may be the amount of time a user takes to respond to one or more particular questions or the complete computerized privacy questionnaire. For example, if the user rushed through the computerized privacy questionnaire, the system may indicate that user abnormal behavior occurred in providing the one or more responses. In some implementations, the system may include a threshold response time for each question of the computerized privacy questionnaire (e.g., this may be a different threshold response time for each question) or the complete computerized privacy questionnaire. The system may compare the response time for each of the one or more responses to its associated threshold response time, and/or the system may compare the response time for completion of the computerized privacy questionnaire to the associated threshold response time for completion of the full computerized privacy questionnaire. The system may be configured to indicate that user abnormal behavior occurred in providing the one or more responses when either the response time is a longer period of time (e.g., perhaps indicating that the user is being dishonest) or shorter period of time (e.g., perhaps indicating that the user is rushing through the computerized privacy questionnaire and the responses may be inaccurate) than the threshold response time.

Another user factor may be a deadline for initiation or completion of the computerized privacy questionnaire. For example, if the user initiated or completed the computerized privacy questionnaire after a particular period of time (e.g., an initiation time or a completion time), the system may indicate that user abnormal behavior occurred in providing the one or more responses. The certain period of time may be preset, user-defined, and/or adjusted by the user, and may be a threshold time period. Additionally, in some implementations, the user factors may be adjusted based on one another. For example, if the user initiated the computerized privacy questionnaire close to a deadline for the computerized privacy questionnaire, then the threshold response time for each question of the computerized privacy questionnaire or the complete computerized privacy questionnaire may be modified (e.g., the threshold response time may be increased to ensure that the user does not rush through the privacy questionnaire close to the deadline).

Additionally, another user factor may incorporate a location in which the user conducted the privacy questionnaire. For example, if the user conducted the privacy questionnaire in a distracting location (e.g., at the movies or airport), the system may indicate that user abnormal behavior occurred. The system may use GPS tracking data associated with the electronic device (e.g., laptop, smart phone) on which the user conducted the privacy questionnaire to determine the location of the user. The system may include one or more particular locations or types of locations that are designated as locations in which the user may be distracted, or otherwise provide less accurate results. The locations may be specific to each user or the same locations for all users, and the locations may be adjusted (e.g., added, removed, or otherwise modified). The types of locations may be locations such as restaurants, entertainment locations, mass transportation points (e.g., airports, train stations), etc.

In particular embodiments, the system is configured to determine a type of connection via which the user is accessing the questionnaire. For example, the system may determine that the user is accessing the questionnaire while connect to a public wireless network (e.g., at an airport, coffee shop, etc.). The system may further determine that the user is connect to a wireless or other network such as a home network (e.g., at the user's house). In such examples, the system may determine that the user may be distracted based on a location inferred based on one or more connections identified for the computing device via which the user is accessing the questionnaire. In other embodiments, the system may determine that the user is connect via a company network (e.g., a network associated with the entity providing the questionnaire for completion). In such embodiments, the system may be configured to determine that the user is focused on the questionnaire (e.g., by virtue of the user being at work while completing it).

Moreover, another user factor may involve determining the electronic activities the user is performing on the user's electronic device while they are completing the privacy questionnaire. This factor may also be related to determining if the user is distracted when completing the privacy questionnaire. For example, the system may determine whether the user interacted, on the electronic device, with one or more web browsers or software applications that are unrelated to conducting the computerized privacy questionnaire (e.g., by determining whether the user accessed one or more other active browsing windows, or whether a browsing window in which the user is completing the questionnaire becomes inactive while the user us completing it). If the system determines that such unrelated electronic activities were interacted with, the system may indicate that user abnormal behavior occurred in completing the privacy questionnaire. Further, the electronic activities may be preset, user-specific, and/or modified. The user factors above are provided by way of example, and more, fewer, or different user factors may be included as part of the system. In some embodiments, the system may incorporate the user's electronic device camera to determine if the user is exhibiting abnormal behavior (e.g., pupils dilated/blinking a lot could indicate deception in responding to the privacy questionnaire).

In some implementations, the system may use one or more of the user factors to calculate a user context score. Each of the user factors may include a user factor rating to indicate a likelihood that user abnormal behavior occurred with respect to that particular user factor. The user context score may be calculated based on each of the user factor ratings. In some embodiments, a weighting factor may be applied to each user factor (e.g., this may be specific for each organization) for the calculation of the user context score. Additionally, in some embodiments, if one or more user factor ratings is above a certain rating (i.e., indicating a very likelihood of user abnormal behavior for that particular user factor), then the user context score may automatically indicate that user abnormal behavior occurred in completing the privacy questionnaire. The user context score may be compared to a threshold user context score that may be preset, user or organization defined, and/or modified. If the system determines that the user context score is greater than the threshold user context score (i.e., indicates a higher likelihood of user abnormal behavior than the likelihood defined by threshold), then the system may indicate that user abnormal behavior occurred in conducting the privacy questionnaire.

In some implementations, the submitted input of the user to one or more responses may include a particular type of input that may cause the system to provide one or more follow up questions. The follow up questions may be provided for the user justify the particular type of input response that was provided. The particular type of input may be responses that are indefinite, indicate the user is unsure of the appropriate response (e.g., "I do not know"), or intimate that the user is potentially being untruthful in the response. For example, if the user provides a response of "I do not know" (e.g., by selecting in a list or inputting in a text box), the system may be configured to provided one or more follow up questions to further determine why the user "does not know" the answer to the specific inquiry or if the user is being truthful is saying they "do not know."

In some implementations, the system may, for each of the one or more responses to one or more questions in the computerized privacy questionnaire, determine a confidence factor score. The confidence factor score may be based on the user context of the user as the user provides the one or more responses and/or the one or more system inputs from the user the comprise the one or more responses. For example, if the user was in a distracting environment when the user provided a particular response in the privacy questionnaire and/or the user provided one or more unsubmitted inputs prior to providing the submitted input for the particular response, the system may calculate a low confidence factor score for the particular response.

Further, the system may calculate a confidence score for the computerized privacy questionnaire based at least in part on the confidence factor score for each of the one or more responses to one or more questions in the computerized privacy questionnaire. Upon calculating the confidence score, the system can use the confidence score to determine whether user abnormal behavior occurred in providing the one or more responses. In some implementations, a low confidence factor score for a single response may cause the confidence score of the privacy questionnaire to automatically indicate user abnormal behavior occurred in providing the privacy questionnaire. However, in other embodiments, this is not the case. For example, if only two out of twenty confidence factor scores are very low (i.e., indicate a higher likelihood of user abnormal behavior in providing the particular response), the system may determine, based on the calculated confidence score for the privacy questionnaire, that user abnormal behavior did not occur in completing the privacy questionnaire.

Privacy Assessment Monitoring Module

In particular embodiments, a Privacy Assessment Monitoring Module 2000 is configured to: (1) monitor user inputs when the user is providing information related to a privacy campaign or completing a privacy impact assessment; and (2) determine, based at least in part on the user inputs, whether the user has provided one or more abnormal inputs or responses. In various embodiments, the Privacy Assessment Monitoring Module 2000 is configured to determine whether the user is, or may be, attempting to provide incomplete, false, or misleading information or responses related to the creation of a particular privacy campaign, a privacy impact assessment associated with a particular privacy campaign, etc.

Figure 20:
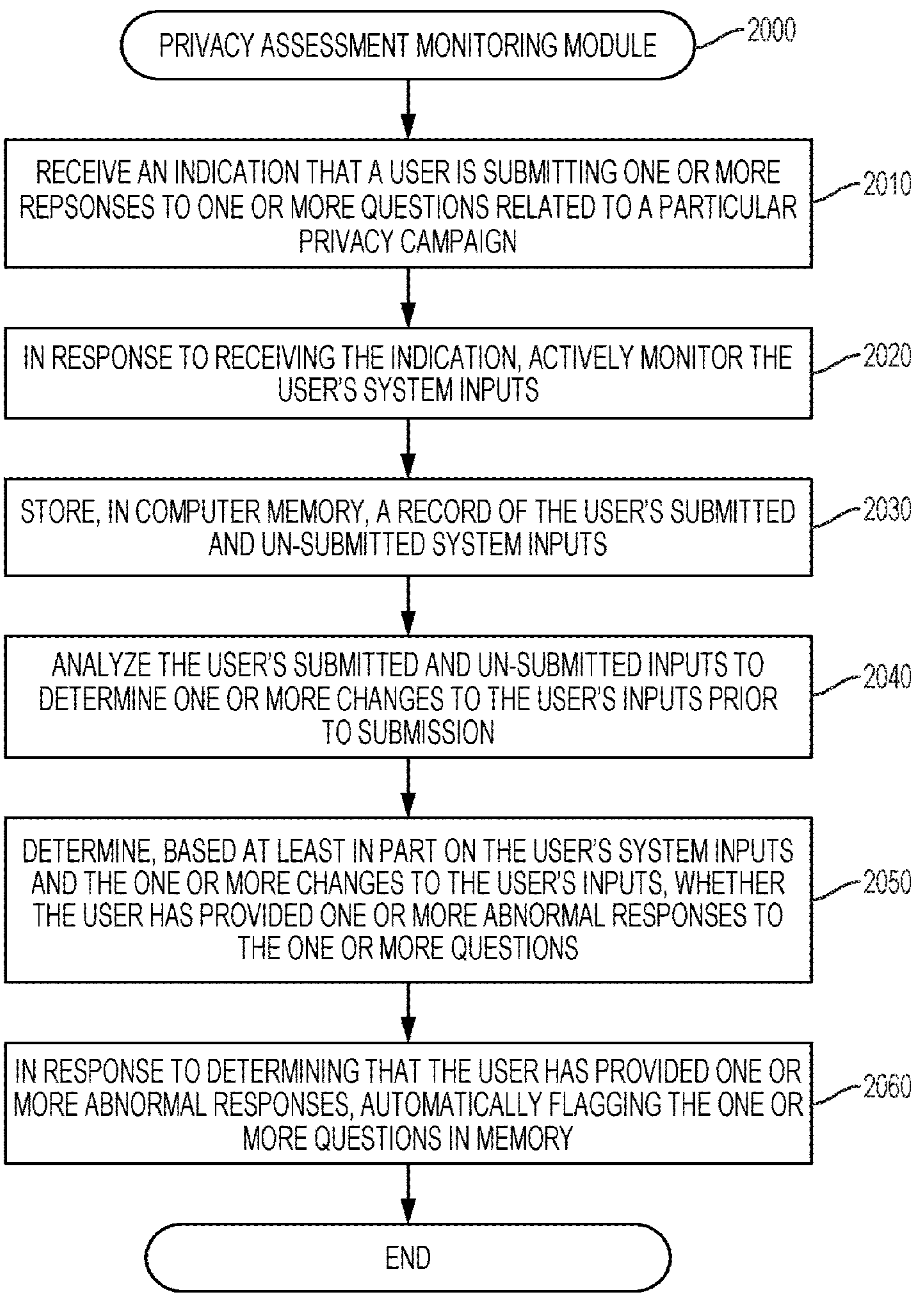
FIG. 20 is a flow chart showing an example of a process performed by the Privacy Assessment Monitoring Module according to particular embodiments.

Turning to FIG. 20, in particular embodiments, when executing the Privacy Assessment Monitoring Module 2000, the system begins, at Step 2010, by receiving an indication that a user is submitting one or more responses to one or more questions related to a particular privacy campaign. In various embodiments, the system is configured to receive the indication in response to a user initiating a new privacy campaign (e.g., on behalf of a particular organization, subgroup within the organization, or other suitable business unit). In other embodiments, the system is configured to receive the indication while a particular user is completing a privacy impact assessment for a particular privacy campaign, where the privacy impact assessment provides oversight into various aspects of the particular privacy campaign such as, for example: (1) what personal data is collected as part of the privacy campaign; (2) where the personal data is stored; (3) who has access to the stored personal data; (4) for what purpose the personal data is collected, etc.

In various embodiments, the system is configured to receive the indication in response to determining that a user has accessed a privacy campaign initiation system (e.g., or other privacy system) and is providing one or more pieces of information related to a particular privacy campaign. In particular embodiments, the system is configured to receive the indication in response to the provision, by the user, of one or more responses as part of a privacy impact assessment. In various embodiments, the system is configured to receive the indication in response to any suitable stimulus in any situation in which a user may provide one or more potentially abnormal responses to one or more questions related to the collection, storage or use of personal data.

In various embodiments, the privacy campaign may be associated with an electronic record (e.g., or any suitable data structure) comprising privacy campaign data. In particular embodiments, the privacy campaign data comprises a description of the privacy campaign, one or more types of personal data related to the campaign, a subject from which the personal data is collected as part of the privacy campaign, a storage location of the personal data (e.g., including a physical location of physical memory on which the personal data is stored), one or more access permissions associated with the personal data, and/or any other suitable data associated with the privacy campaign. In various embodiments, the privacy campaign data is provided by a user of the system.

An exemplary privacy campaign, project, or other activity may include, for example: (1) a new IT system for storing and accessing personal data (e.g., include new hardware and/or software that makes up the new IT system; (2) a data sharing initiative where two or more organizations seek to pool or link one or more sets of personal data; (3) a proposal to identify people in a particular group or demographic and initiate a course of action; (4) using existing data for a new and unexpected or more intrusive purpose; and/or (5) one or more new databases which consolidate information held by separate parts of the organization. In still other embodiments, the particular privacy campaign, project or other activity may include any other privacy campaign, project, or other activity discussed herein, or any other suitable privacy campaign, project, or activity.

During a privacy impact assessment for a particular privacy campaign, a privacy impact assessment system may ask one or more users (e.g., one or more individuals associated with the particular organization or sub-group that is undertaking the privacy campaign) a series of privacy impact assessment questions regarding the particular privacy campaign and then store the answers to these questions in the system's memory, or in memory of another system, such as a third-party computer server.

Such privacy impact assessment questions may include questions regarding, for example: (1) what type of data is to be collected as part of the campaign; (2) who the data is to be collected from; (3) where the data is to be stored; (4) who will have access to the data; (5) how long the data will be kept before being deleted from the system's memory or archived; and/or (6) any other relevant information regarding the campaign. In various embodiments a privacy impact assessment system may determine a relative risk or potential issues with a particular privacy campaign as it related to the collection and storage of personal data. For example, the system may be configured to identify a privacy campaign as being "High" risk, "Medium" risk, or "Low" risk based at least in part on answers submitted to the questions listed above. For example, a Privacy Impact Assessment that revealed that credit card numbers would be stored without encryption for a privacy campaign would likely cause the system to determine that the privacy campaign was high risk.

As may be understood in light of this disclosure, a particular organization may implement operational policies and processes that strive to comply with industry best practices and legal requirements in the handling of personal data. In various embodiments, the operational policies and processes may include performing privacy impact assessments (e.g., such as those described above) by the organization and/or one or more sub-groups within the organization. In particular embodiments, one or more individuals responsible for completing a privacy impact assessment or providing privacy campaign data for a particular privacy campaign may attempt to provide abnormal, misleading, or otherwise incorrect information as part of the privacy impact assessment. In such embodiments, the system may be configured to receive the indication in response to receiving an indication that a user has initiated or is performing a privacy impact assessment.

Returning to Step 2020, the system is configured to, in response to receiving the indication at Step 2010, monitor (e.g., actively monitor) the user's system inputs. In particular embodiments, actively monitoring the user's system inputs may include, for example, monitoring, recording, tracking, and/or otherwise taking account of the user's system inputs. These system inputs may include, for example: (1) one or more mouse inputs; (2) one or more keyboard (e.g., text) inputs); (3) one or more touch inputs; and/or (4) any other suitable inputs (e.g., such as one or more vocal inputs, etc.). In various embodiments, the system is configured to actively monitor the user's system inputs, for example: (1) while the user is viewing one or more graphical user interfaces for providing information regarding or responses to questions regarding one or more privacy campaigns; (2) while the user is logged into a privacy portal; and/or (3) in any other suitable situation related to the user providing information related to the collection or storage of personal data (e.g., in the context of a privacy campaign). In other embodiments, the system is configured to monitor one or more biometric indicators associated with the user such as, for example, heart rate, pupil dilation, perspiration rate, etc.

In particular embodiments, the system is configured to monitor a user's inputs, for example, by substantially automatically tracking a location of the user's mouse pointer with respect to one or more selectable objects on a display screen of a computing device. In particular embodiments, the one or more selectable objects are one or more selectable objects (e.g., indicia) that make up part of a particular privacy impact assessment, privacy campaign initiation system, etc. In still other embodiments, the system is configured to monitor a user's selection of any of the one or more selectable objects, which may include, for example, an initial selection of one or more selectable objects that the user subsequently changes to selection of a different one of the one or more selectable objects.

In any embodiment described herein, the system may be configured to monitor one or more keyboard inputs (e.g., text inputs) by the user that may include, for example, one or more keyboard inputs that the user enters or one or more keyboard inputs that the user enters but deletes without submitting. For example, a user may type an entry relating to the creation of a new privacy campaign in response to a prompt that asks what reason a particular piece of personal data is being collected for. The user may, for example, initially begin typing a first response, but delete the first response and enter a second response that the user ultimately submits. In various embodiments of the system described herein, the system is configured to monitor the un-submitted first response in addition to the submitted second response.

In still other embodiments, the system is configured to monitor a user's lack of input. For example, a user may mouse over a particular input indicia (e.g., a selection from a drop-down menu, a radio button or other selectable indicia) without selecting the selection or indicia. In particular embodiments, the system is configured to monitor such inputs. As may be understood in light of this disclosure, a user that mouses over a particular selection and lingers over the selection without actually selecting it may be contemplating whether to: (1) provide a misleading response; (2) avoid providing a response that they likely should provide in order to avoid additional follow up questions; and/or (3) etc.

In other embodiments, the system is configured to monitor any other suitable input by the user. In various embodiments, this may include, for example: (1) monitoring one or more changes to an input by a user; (2) monitoring one or more inputs that the user later removes or deletes; (3) monitoring an amount of time that the user spends providing a particular input; and/or (4) monitoring or otherwise tracking any other suitable information related to the user's response to a particular question and/or provision of a particular input to the system.

Retuning to Step 2030, the system is configured to store, in memory, a record of the user's submitted and un-submitted system inputs. As discussed above, the system may be configured to actively monitor both submitted and un-submitted inputs by the user. In particular embodiments, the system is configured to store a record of those inputs in computer memory (e.g., in a Storage Device 130 shown in FIG. 1). In particular embodiments, storing the user's submitted and un-submitted system inputs may include, for example, storing a record of: (1) each system input made by the user; (2) an amount of time spent by the user in making each particular input; (3) one or more changes to one or more inputs made by the user; (4) an amount of time spent by the user to complete a particular form or particular series of questions prior to submission; and/or (5) any other suitable information related to the user's inputs as they may relate to the provision of information related to one or more privacy campaigns.

Continuing to Step 2040, the system is configured to analyze the user's submitted and un-submitted inputs to determine one or more changes to the user's inputs prior to submission. In particular embodiments, the system may, for example: (1) compare a first text input with a second text input to determine one or more differences, where the first text input is an unsubmitted input and the second text input is a submitted input; (2) determine one or more changes in selection, by the user, of a user-selectable input indicia (e.g., including a number of times the user changed a selection); and/or (3) compare any other system inputs by the user to determine one or more changes to the user's responses to one or more questions prior to submission. In various embodiments, the system is configured to determine whether the one or more changes include one or more changes that alter a meaning of the submitted and unsubmitted inputs.

In various embodiments, the system is configured to compare first, unsubmitted text input with second, submitted text input to determine whether the content of the second text input differs from the first text input in a meaningful way. For example, a user may modify the wording of their text input without substantially modifying the meaning of the input (e.g., to correct spelling, utilize one or more synonyms, correct punctuation, etc.). In this example, the system may determine that the user has not made meaningful changes to their provided input.

In another example, the system may determine that the user has changed the first input to the second input where the second input has a meaning that differs from a meaning of the first input. For example, the first and second text inputs may: (1) list one or more different individuals; (2) list one or more different storage locations; (3) include one or more words with opposing meanings (e.g., positive vs. negative, short vs. long, store vs. delete, etc.); and/or (4) include any other differing text that may indicate that the responses provided (e.g., the first text input and the second text input) do not have essentially the same meaning. In this example, the system may determine that the user has made one or more changes to the user's inputs prior to submission.

Returning to Step 2050, the system continues by determining, based at least in part on the user's system inputs and the one or more changes to the user's inputs, whether the user has provided one or more abnormal responses to the one or more questions. In various embodiments, the system is configured to determine whether the user has provided one or more abnormal responses to the one or more questions based on determining, at Step 2040, that the user has made one or more changes to a response prior to submitting the response (e.g., where the one or more changes alter a meaning of the response).

In other embodiments, the system is configured to determine that the user has provided one or more abnormal responses based on determining that the user took longer than a particular amount of time to provide a particular response. For example, the system may determine that the user has provided an abnormal response in response to the user taking longer than a particular amount of time (e.g., longer than thirty seconds, longer than one minute, longer than two minutes, etc.) to answer a simple multiple choice question (e.g., "Will the privacy campaign collect personal data for customers or employees?").

In particular embodiments, the system is configured to determine that the user has provided one or more abnormal responses based on a number of times that the user has changed a response to a particular question. For example, the system may determine a number of different selections made by the user when selecting one or more choices from a drop down menu prior to ultimately submitting a response. In another example, the system may determine a number of times the user changed their free-form text entry response to a particular question. In various embodiments, the system is configured to determine that the user provided one or more abnormal responses in response to determining that the user changed their response to a particular question more than a threshold number of times (e.g., one time, two times, three times, four times, five times, etc.).

In still other embodiments, the system is configured to determine that the user has provided one or more abnormal responses based at least in part on whether a particular question (e.g., threshold question) is a "critical" question. In particular embodiments, a critical question may include a question that, if answered in a certain way, would cause the system's conditional logic trigger to present the user with one or more follow-up questions. For example, the system may, in response to receiving the user's full set of answers to the threshold questions, automatically identify any individual question within the series of threshold questions that, if answered in a particular way (e.g., differently than the user answered the question) would have caused the system to display one or more follow up questions.

In various embodiments, the system is configured, for any questions that are deemed "critical" (e.g., either by the system, or manually) to determine whether the user exhibited any abnormal behavior when answering the question. For example, the system may check to see whether the user changed their answer once, or multiple times, before submitting their answer to the question (e.g., by tracking the user's keystrokes or other system inputs while they are answering the threshold question, as described above). As another example, the system may determine whether it took the user longer than a pre-determined threshold amount of time (e.g., 5 minutes, 3 minutes, etc.) to answer the critical threshold question.

In particular embodiments, the system is configured to determine whether the user provided one or more abnormal responses based on any suitable combination of factors described herein including, for example: (1) one or more changes to a particular response; (2) a number of changes to a particular response; (3) an amount of time it took to provide the particular response; (4) whether the response is a response to a critical question; and/or (5) any other suitable factor.

Continuing to Step 2060, the system, in response to determining that the user has provided one or more abnormal responses, automatically flags the one or more questions in memory. In particular embodiments, the system is configured to automatically flag the one or more questions in memory by associating the one or more questions in memory with a listing or index of flagged questions. In other embodiments, the system, in response to flagging the one or more questions, is further configured to generate a notification and transmit the notification to any suitable individual. For example, the system may transmit a notification that one or more question have been flagged by a particular privacy officer or other individual responsible ensuring that a particular organization's collection and storage of personal data meets one or more legal or industry standards.

In particular embodiments, the system is configured to generate a report of flagged questions related to a particular privacy campaign. In various embodiments, flagging the one or more questions is configured to initiate a follow up by a designated individual or team (e.g., a member of the organization's privacy team) regarding the one or more questions. In particular embodiments, the system may also, or alternatively, be adapted to automatically generate and transmit a message to one or more individuals (e.g., the organization's chief privacy officer) indicating that the threshold question may have been answered incorrectly and that follow-up regarding the question may be advisable. After receiving the message, the individual may, in particular embodiments, follow up with the individual who answered the question, or conduct other additional research, to determine whether the question was answered accurately.

Privacy Assessment Modification Module

In particular embodiments, a Privacy Assessment Modification Module 2100 is configured to modify a questionnaire to include at least one additional question in response to determining that a user has provided one or more abnormal inputs or responses regarding a particular privacy campaign. For example, the system may, as discussed above, prompt the user to answer one or more follow up questions in response to determining that the user gave an abnormal response to a critical question. In particular embodiments, modifying the questionnaire to include one or more additional questions may prompt the user to provide more accurate responses which may, for example, limit a likelihood that a particular privacy campaign may run afoul of legal or industry-imposed restrictions on the collection and storage of personal data.

Figure 21:
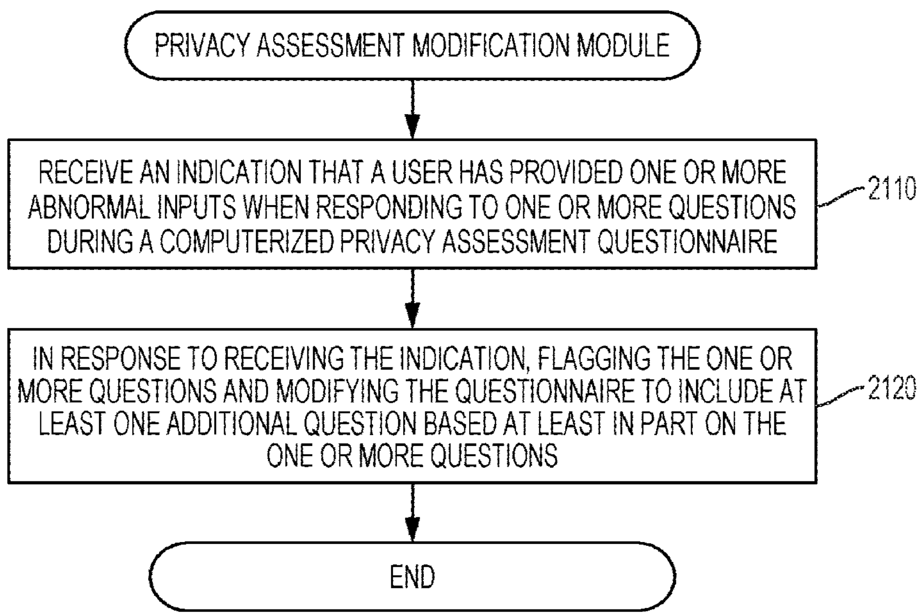
FIG. 21 is a flow chart showing an example of a process performed by the Privacy Assessment Modification Module.

Turning to FIG. 21, in particular embodiments, when executing the Privacy Assessment Modification Module 2100, the system begins, at Step 2110, by receiving an indication that a user has provided one or more abnormal inputs or responses to one or more questions during a computerized privacy assessment questionnaire. In particular embodiments, the system is configured to receive the indication in response to determining that the user has provided one or more abnormal responses to one or more questions as part of Step 2050 of the Privacy Assessment Monitoring Module 2000 described above.

Continuing to Step 2120, in response to receiving the indication, the system is configured to flag the one or more questions and modify the questionnaire to include at least one additional question based at least in part on the one or more questions. In various embodiments, the system is configured to modify the questionnaire to include at least one follow up question that relates to the one or more questions for which the user provided one or more abnormal responses. For example, the system may modify the questionnaire to include one or more follow up questions that the system would have prompted the user to answer if the user had submitted a response that the user had initially provided but not submitted. For example, a user may have initially provided a response that social security numbers would be collected as part of a privacy campaign but deleted that response prior to submitting what sort of personal data would be collected. The system may, in response to determining that the user had provided an abnormal response to that question, modify the questionnaire to include one or more additional questions related to why social security numbers would need to be collected (or to double check that they, in fact, would not be).

In other embodiments, the system is configured to take any other suitable action in response to determining that a user has provided one or more abnormal responses. The system may, for example: (1) automatically modify a privacy campaign; (2) flag a privacy campaign for review by one or more third party regulators; and/or (3) perform any other suitable action.

Automated Vendor Risk Compliance Assessment Systems and Related Methods

In particularly embodiments, a vendor risk scanning system is configured to scan one or more webpages associated with a particular vendor (e.g., provider of particular software, particular entity, etc.) in order to identify one or more vendor attributes. In particular embodiments, the system may be configured to scan the one or more web pages to identify one or more vendor attributes such as, for example: (1) one or more security certifications that the vendor does or does not have (e.g., ISO 27001, SOC II Type 2, etc.); (2) one or more awards and/or recognitions that the vendor has received (e.g., one or more security awards); (3) one or more security policies and/or 3$^{rd}$ party vendor parties; (4) one or more privacy policies and/or cookie policies for the one or more webpages; (5) one or more key partners or potential sub processors of one or more services associated with the vendor; and/or (6) any other suitable vendor attribute. Other suitable vendor attributes may include, for example, membership in a Privacy Shield, use of Standardized Information Gathering (SIG), etc.

In various embodiments, the system is configured to scan the one or more webpages by: (1) scanning one or more pieces of computer code associated with the one or more webpages (e.g., HTML, Java, etc.); (2) scanning one or more contents of the one or more webpages (e.g., using one or more natural language processing techniques); (3) scanning for one or more particular images on the one or more webpages (e.g., one or more images that indicate membership in a particular organization, receipt of a particular award etc.; and/or (4) using any other suitable scanning technique. The system may, for example, identify one or more image hosts of one or more images identified on the website, analyze the contents of a particular identified privacy or cookie policy that is displayed on the one or more webpages, etc. The system may, for example, be configured to automatically detect the one or more vendor attributes described above.

In various embodiments, the system may, for example: (1) analyze the one or more vendor attributes; and (2) calculate a risk rating for the vendor based at least in part on the one or more vendor attributes. In particular embodiments, the system is configured to automatically assign a suitable weighting factor to each of the one or more vendor attributes when calculating the risk rating. In particular embodiments, the system is configured to analyze one or more pieces of the vendor's published applications of software available to one or more customers for download via the one or more webpages to detect one or more privacy disclaimers associated with the published applications. The system may then, for example, be configured to use one or more text matching techniques to determine whether the one or more privacy disclaimers contain one or more pieces of language required by one or more prevailing industry or legal requirements related to data privacy. The system may, for example, be configured to assign a relatively low risk score to a vendor whose software (e.g., and/or webpages) includes required privacy disclaimers, and configured to assign a relatively high risk score to a vendor whose one or more webpages do not include such disclaimers.

In another example, the system may be configured to analyze one or more websites associated with a particular vendor for one or more privacy notices, one or more blog posts, one or more preference centers, and/or one or more control centers. The system may, for example, calculate the vendor risk score based at least in part on a presence of one or more suitable privacy notices, one or more contents of one or more blog posts on the vendor site (e.g., whether the vendor sire has one or more blog posts directed toward user privacy), a presence of one or more preference or control centers that enable visitors to the site to opt in or out of certain data collection policies (e.g., cookie policies, etc.), etc.

In particular other embodiments, the system may be configured to determine whether the particular vendor holds one or more security certifications. The one or more security certifications may include, for example: (1) system and organization control (SOC); (2) International Organization for Standardization (ISO); (3) Health Insurance Portability and Accountability ACT (HIPPA); (4) etc. In various embodiments, the system is configured to access one or more public databases of security certifications to determine whether the particular vendor holds any particular certification. The system may then determine the privacy awareness score based on whether the vendor holds one or more security certifications (e.g., the system may calculate a relatively higher score depending on one or more particular security certifications held by the vendor). The system may be further configured to scan a vendor website for an indication of the one or more security certifications. The system may, for example, be configured to identify one or more images indicated receipt of the one or more security certifications, etc.

In still other embodiments, the system is configured to analyze one or more social networking sites (e.g., LinkedIn, Facebook, etc.) and/or one or more business related job sites (e.g., one or more job-posting sites, one or more corporate websites, etc.) or other third-party websites that are associated with the vendor (e.g., but not maintained by the vendor). The system may, for example, use social networking and other data to identify one or more employee titles of the vendor, one or more job roles for one or more employees of the vendor, one or more job postings for the vendor, etc. The system may then analyze the one or more job titles, postings, listings, roles, etc. to determine whether the vendor has or is seeking one or more employees that have a role associated with data privacy or other privacy concerns. In this way, the system may determine whether the vendor is particularly focused on privacy or other related activities. The system may then calculate a privacy awareness score and/or risk rating based on such a determination (e.g., a vendor that has one or more employees whose roles or titles are related to privacy may receive a relatively higher privacy awareness score).

In particular embodiments, the system may be configured to calculate the privacy awareness score using one or more additional factors such as, for example: (1) public information associated with one or more events that the vendor is attending; (2) public information associated with one or more conferences that the vendor has participated in or is planning to participate in; (3) etc. In some embodiments, the system may calculate a privacy awareness score based at least in part on one or more government relationships with the vendor. For example, the system may be configured to calculate a relatively high privacy awareness score for a vendor that has one or more contracts with one or more government entities (e.g., because an existence of such a contract may indicate that the vendor has passed one or more vetting requirements imposed by the one or more government entities).

In any embodiment described herein, the system may be configured to assign, identify, and/or determine a weighting factor for each of a plurality of factors used to determine a risk rating score for a particular vendor. For example, when calculating the rating, the system may assign a first weighting factor to whether the vendor has one or more suitable privacy notices posted on the vendor website, a second weighting factor to whether the vendor has one or more particular security certifications, etc. The system may, for example, assign one or more weighting factors using any suitable technique described herein with relation to risk rating determination. In some embodiments, the system may be configured to receive the one or more weighting factors (e.g., from a user). In other embodiments, the system may be configured to determine the one or more weighting factors based at least in part on a type of the factor.

In any embodiment described herein, the system may be configured to determine an overall risk rating for a particular vendor (e.g., particular piece of vendor software) based in part on the privacy awareness score. In other embodiments, the system may be configured to determine an overall risk rating for a particular vendor based on the privacy awareness rating in combination with one or more additional factors (e.g., one or more additional risk factors described herein). In any such embodiment, the system may assign one or more weighting factors or relative risk ratings to each of the privacy awareness score and other risk factors when calculating an overall risk rating. The system may then be configured to provide the risk score for the vendor, software, and/or service for use in calculating a risk of undertaking a particular processing activity that utilizes the vendor, software, and/or service (e.g., in any suitable manner described herein).

In a particular example, the system may be configured to identify whether the vendor is part of a Privacy Shield arrangement. In particular, a privacy shield arrangement may facilitate monitoring of an entity's compliance with one or more commitments and enforcement of those commitments under the privacy shield. In particular, an entity entering a privacy shield arrangement may, for example: (1) be obligated to publicly commit to robust protection of any personal data that it handles; (2) be required to establish a clear set of safeguards and transparency mechanisms on who can access the personal data it handles; and/or (3) be required to establish a redress right to address complaints about improper access to the personal data.

In a particular example of a privacy shield, a privacy shield between the United States and Europe may involve, for example: (1) establishment of responsibility by the U.S. Department of Commerce to monitor an entity's compliance (e.g., a company's compliance) with its commitments under the privacy shield; and (2) establishment of responsibility of the Federal Trade Commission having enforcement authority over the commitments. In a further example, the U.S. Department of Commerce may designate an ombudsman to hear complaints from Europeans regarding U.S. surveillance that affects personal data of Europeans.

In some embodiments, the one or more regulations may include a regulation that allows data transfer to a country or entity that participates in a safe harbor and/or privacy shield as discussed herein. The system may, for example, be configured to automatically identify a transfer that is subject to a privacy shield and/or safe harbor as 'low risk.' In this example, U.S. Privacy Shield members may be maintained in a database of privacy shield members (e.g., on one or more particular webpages such as at www.privacyshield.gov). The system may be configured to scan such webpages to identify whether the vendor is part of the privacy shield.

In particular embodiments, the system may be configured to monitor the one or more websites (e.g., one or more webpages) to identify one or more changes to the one or more vendor attributes. For example, a vendor may update a privacy policy for the website (e.g., to comply with one or more legal or policy changes). In some embodiments, a change in a privacy policy may modify a relationship between a website and its users. In such embodiments, the system may be configured to: (1) determine that a particular website has changed its privacy policy; and (2) perform a new scan of the website in response to determining the change. The system may, for example, scan a website's privacy policy at a first time and a second time to determine whether a change has occurred. The system may be configured to analyze the change in privacy policy to determine whether to modify the calculated risk rating for the vendor (e.g., based on the change).

The system may, for example, be configured to continuously monitor for one or more changes. In other embodiments, the system may be configured to scan for one or more changes according to a particular schedule (e.g., hourly, daily, weekly, or any other suitable schedule). For example, the system may be configured to scan the one or more webpages on an ongoing basis to determine whether the one or more vendor attributes have changed (e.g., if the vendor did not renew its Privacy Shield membership, lost its ISO certification, etc.).

In particular embodiments, any entity (e.g., organization, company, etc.) that collects, stores, processes, or otherwise handles personal data (e.g., on behalf of its customers, employees, or other suitable data subjects) may be subject to various privacy and security policies (e.g., such as the European Union's General Data Protection Regulation (GDPR), the California Consumer Privacy Act (CCPA), Nevada Senate Bill 220 (SB-220), and other such policies) that relate to the handling of such personal data. An entity may, for example, be required to both comply with one or more legal or industry standards related to the collection and/or storage of private information (e.g., such as personal data or personal information) and demonstrate such compliance. One or more systems described herein may be configured to at least partially automate such compliance (e.g., and at least partially automate one or more activities that would support a demonstration of such compliance through use of the one or more systems).

In addition to personal data that an entity (e.g., or other organization) may collect, store, and/or process on its own behalf, an entity may utilize (e.g., contract with) data obtained from and/or collected by one or more third-party vendors that also collect, store, and/or process personal data from one or more data subjects. These third-party vendors may further rely on one or more sub-processors to provide, collect, store, etc. data that those third-party vendors use, and so on. An entity may have agreements and/or contracts (e.g., written agreements) with each third-party vendor that set out the obligations of each party, including obligations to take certain actions in response to privacy-related occurrences, such as a data breach or incident that may affect one or both of the parties. Similarly, third-party vendors may have agreements and/or contracts (e.g., written agreements) with sub-processors that set out the obligations of the third-part vendor and a sub-processor.

Under prevailing legal and industry standards related to the processing of personal data, an entity may be found to be in violation of one or more laws or regulations if the entity utilizes a vendor (e.g., and/or such a vendor utilizes a sub-processor) that mishandles personal data. Accordingly, as may be understood in light of this disclosure, an entity may desire to thoroughly vet (e.g., using one or more risk analysis techniques and/or vendor scoring techniques, such as any suitable technique described herein) any third-party vendors and/or sub-processors: (1) with which the entity contracts; (2) from which the entity receives personal data; (3) that store personal data on behalf of the entity; and/or (4) that otherwise collect, store, process, and/or handle personal data on behalf of the entity, or in association with any activity undertaken by the vendor or sub-processor on behalf of, or for the benefit of, the entity.

Third-party vendors that provide software applications and systems that handle or access the personal data of others may, for example, provide such software to large numbers of different customers (e.g., hundreds or thousands of different customers). This may add an additional level of complexity to complying with one or more prevailing legal or industry standards related to the handling of personal data, because an entity may be required to ensure that any vendor that the entity utilizes is also in compliance with such policies and regulations. As part of ensuring compliance with such regulations, an entity may conduct one or more privacy audits (e.g., of activities undertaken by the entity, of vendors utilized by and/or contracted with the entity, etc.).

Various embodiments of a vendor risk management system described herein may be configured to automate one or more processes related to the risk assessment, scoring, and/or analysis of particular vendors with which an entity may contract (e.g., new vendors that the entity would like to start working with—e.g., by entering into a new contract, or existing vendors that the entity would like to continue working with—e.g., by renewing an existing contract), or whose services an entity may utilize as part of one or more business and/or data processing activities. Various embodiments may also be configured for use in assessing the risk associated with one or more vendors before an entity pays the vendor. Further various embodiments of a vendor risk management system described herein may be configured to determine obligations between an entity and a third-party vendor and/or a sub-processor and perform tasks (e.g., automatically) to comply with such obligations. Particular embodiments of a vendor risk management system are described more fully below.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general-purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

Figure 22:
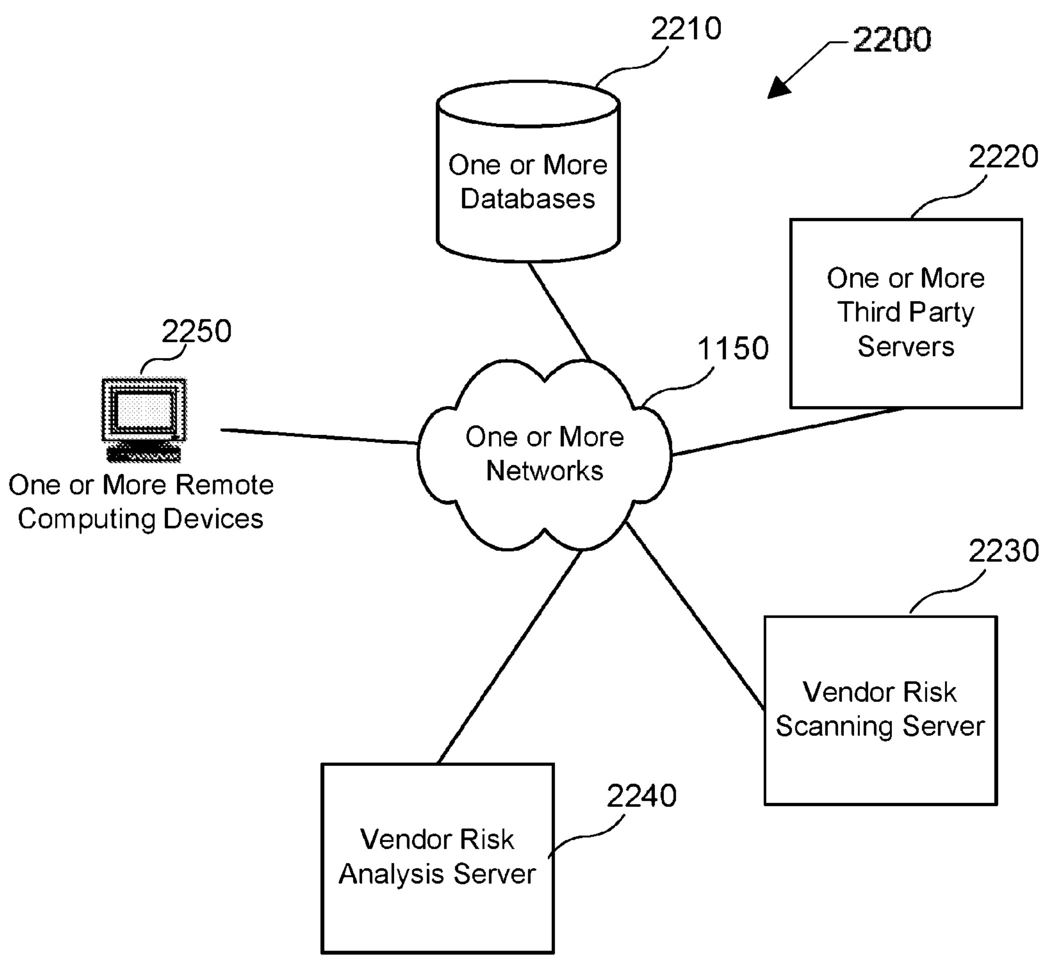
FIG. 22 depicts an exemplary vendor risk scanning system according to particular embodiments.

FIG. 22 is a block diagram of a Vendor Risk Management System 2200 according to a particular embodiment. In some embodiments, the Vendor Risk Management System 2200 is configured to scan one or more websites associated with a particular vendor to identify and analyze one or more security certifications, privacy and/or cookie policies, etc. The system may, for example, initiate a virtual browsing session on any of the one or more servers and/or computers described below in order to facilitate the scanning of the one or more webpages (e.g., in order to access and then scan the one or more websites).

As may be understood from FIG. 22, the Vendor Risk Management System 2200 includes one or more computer networks 1150, a Vendor Risk Scanning Server 2230, a Vendor Risk Analysis Server 2240 (e.g., which may be configured to analyze data identified during a scan of the vendor's website(s)), One or More Third Party Servers 2230, one or more databases 2210 (e.g., which may be used to store data used as part of the analysis, results of the analysis, etc.), and one or more remote computing devices 2250 (e.g., a desktop computer, laptop computer, tablet computer, etc.). In particular embodiments, the one or more computer networks 1150 facilitate communication between the Vendor Risk Scanning Server 2230, a Vendor Risk Analysis Server 2240, One or More Third Party Servers 2220, one or more databases 2210, and one or more remote computing devices 2250. The Vendor Risk Analysis Server 2240, the Vendor Risk Management System 2200, or a vendor risk management server described herein may be configured to perform any of the functions and processes set forth herein.

The one or more computer networks 1150 may include any of a variety of types of wired or wireless computer networks such as the Internet, a private intranet, a public switch telephone network (PSTN), or any other type of network. The communication link between Vendor Risk Scanning Server 2230 and Vendor Risk Analysis Server 2240 may be, for example, implemented via a Local Area Network (LAN) or via the Internet.

Vendor Management Overview

In particular embodiments, any entity (e.g., organization, company, etc.) that collects, stores, processes, or otherwise handles personal data (e.g., on behalf of its customers, employees, or other suitable data subjects) may be subject to various privacy and security policies (such as the European Union's General Data Protection Regulation (GDPR), the California Consumer Privacy Act (CCPA), Nevada Senate Bill 220 (SB-220), and other such policies) that relate to the handling of such personal data. An entity may, for example, be required to both comply with one or more legal or industry standards related to the collection and/or storage of private information (e.g., such as personal data or personal information) and demonstrate such compliance. One aspect of such compliance may be disclosing data breaches to one or more regulating parties, such as one or more supervisory authorities. One or more systems described herein may be configured to at least partially automate such compliance (e.g., and at least partially automate one or more activities that would support a demonstration of such compliance through the use of the one or more systems).

In addition to personal data that an entity (e.g., a company or other organization) may collect, store, and/or process on its own behalf, an entity may utilize data obtained from and/or collected by one or more third-party vendors that also collect, store, and/or process personal data from one or more data subjects. These third-party vendors may further rely on one or more sub-processors to provide, collect, process, and/or store data that those third-party vendors use, and so on.

Within the context of such business relationships, it is common for an entity to have contractual obligations to disclose privacy-related occurrences, such as a data breach or other privacy or security-related incident, to its business partners. For example, an entity may have one or more verbal or written agreements (e.g., contracts) in place with each of the entity's third-party vendors that set out the obligations of each party, including one or more obligations to take certain actions in response to specified privacy-related occurrences, such as a data security-related incident that may affect any of the parties to the agreement. Similarly, third-party vendors may have respective agreements and/or contracts (e.g., written agreements) with sub-processors that set out respective privacy-related obligations of the third-party vendor and one or more of its sub-processors. One or more systems described herein may be configured to at least partially facilitate and/or automate such compliance with such contractual obligations.

It is noted that under prevailing legal and industry standards related to the processing of personal data, an entity may be found to be in violation of one or more laws or regulations if the entity utilizes a vendor (e.g., and/or such a vendor utilizes a sub-processor) that mishandles personal data. Accordingly, as may be understood in light of this disclosure, an entity may desire to thoroughly vet (e.g., using one or more risk analysis techniques and/or vendor scoring techniques, such as any suitable technique described herein) any third-party vendors and/or sub-processors: (1) with which the entity contracts; (2) from which the entity receives personal data; (3) that store personal data on behalf of the entity; and/or (4) that otherwise collect, store, process, and/or handle personal data on behalf of the entity, or in association with any activity undertaken by the vendor or sub-processor on behalf of, or for the benefit of, the entity.

Third-party vendors that provide software applications and/or systems that handle and/or access the personal data of others may, for example, provide such software to large numbers of different customers (e.g., hundreds or thousands of different customers). This may add an additional level of complexity to complying with one or more prevailing legal or industry standards related to the handling of personal data, because an entity may be required to ensure that any vendor that the entity utilizes is also in compliance with such policies and regulations. As part of ensuring compliance with such regulations, an entity may conduct one or more privacy audits (e.g., of activities undertaken by the entity, of vendors utilized by and/or contracted with the entity, etc.).

Various embodiments of a vendor risk management system described herein may be configured to automate one or more processes related to the risk assessment, scoring, and/or analysis of particular vendors with which an entity may contract, or whose services an entity may utilize as part of one or more business and/or data processing activities. Further various embodiments of vendor risk management systems described herein may be configured to determine obligations between an entity and a third-party vendor and/or a sub-processor and perform tasks (e.g., automatically) to comply with such obligations. Particular embodiments of a vendor risk management system are described more fully below.

Vendor Incident Management

In various embodiments, the system may be configured to automatically facilitate a response to one or more incidents (e.g., security-related incidents, privacy-related incidents, data breaches, etc.). In particular, the system may be configured to: (1) identify a particular incident; (2) determine a method by which the incident was reported (e.g., via webform); (3) identify a country of origin of the incident; (4) generate one or more tasks related to the incident (e.g., one or more reporting tasks and/or notification tasks that should be completed in order to properly respond to the identified incident); (5) communicate the one or more tasks to one or more users; and/or (6) take any other suitable action related to the breach.

The system may, for example, be configured to generate one or more tasks based at least in part on one or more contractual and/or legal obligations of the entity (e.g., with respect to one or more other entities, such as one or more vendors of the entity). For example, the system may determine that, based at least in part on one or more contract terms derived, for example, using one or more techniques described herein, the entity is obligated to notify a particular vendor, regulator, sub-processor, or other entity within a specified timeframe of any material data breach. The system may, at least partially in response to identifying such a data breach, be configured to generate a task to notify one or more particular vendors, regulators, and/or other entities (e.g., within the prescribed timeframe). The system may determine such contract terms, for example, by using one or more natural language processing techniques to analyze the text of one or more relevant contracts, such as one or more relevant contracts between an entity and a third-party vendor. The system may be configured to receive any such contracts and agreements as uploaded documents for analysis (e.g., for use by the system in determining, from the documents, one or more key terms, obligations, penalties, etc. that the entity and/or one or more third parties, such as one or more of the entity's vendors are subject to in regard to disclosing, for example, one or more specified types of relevant privacy-related events, such as a data breach).

In various embodiments, the system is configured to automate the submission of notifications of one or more data breaches and/or other privacy-related incidents to one or more entities for which a contractual obligation to notify exists (e.g., a vendor). In particular embodiments, the system is configured to determine one or more attributes of a security-related incident in order to determine whether an obligation to a vendor has arisen, and, if so, what responsive actions should be performed. For example, the system may be configured to determine attributes such as: (1) a geographical region or country in which the incident occurred; (2) a scope of the security-related incident; (3) a date and time of occurrence of the security-related incident; (4) one or more systems, assets, processes, vendors, etc. that were affected by the security-related incident; and/or (5) one or more applicable regulatory or legal schemes.

The system may further be configured to analyze a security-related incident using such attributes to determine additional information. For example, the system may analyze security-related incident attributes to determine a risk level of the security-related incident. The system may then use such determined attributes and optionally additional information to determine the obligations implicated by the security-related incident (e.g., to a particular vendor). Based on such determined obligations, the system may generate one or more tasks (e.g., automatically) to be performed to satisfy the entity's obligations associated with the security-related incident. In various embodiments, the system may recommend a remediation for determined risks in response the security-related incident with respect to one or more contractual commitments or privacy regulations. In various embodiments, the system may perform such tasks, for example, automatically, or upon receipt of an instruction from a user (e.g., received via an activation of a control on a graphical user interface).

The system may, for example, be configured to: (1) capture, investigate, and/or analyze the risk, liability, and/or obligations of an entity stemming from a security-related incident such as a data breach; (2) parse one or more contracts to identify one or more notification obligations and/or regulatory/jurisdictional obligations to determine one or more required and/or desirable subsequent actions based on a type of incident and/or one or more details about the incident; (3) identify one or more assets, vendors, processes, etc. that are affected by the incident (e.g., based on one or more identified contractual obligations); (4) capture the scope of the incident (e.g., use a mobile application to take a picture relevant to the incident, scan an asset tag of a computing device involved in the incident, etc.); and/or (5) maintain a master database of privacy-related incidents (e.g., based on case law, incident reports, etc.) in order to determine a risk level of a particular incident; etc.

Figure 23:
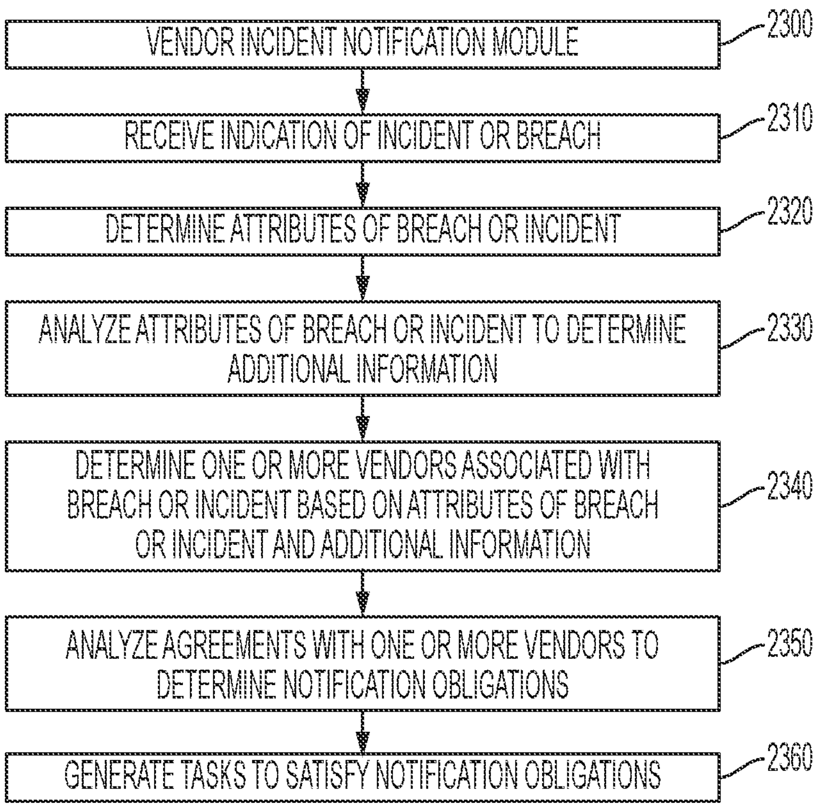
FIG. 23 is a flow chart showing an example of a process performed by the Vendor Incident Notification Module according to particular embodiments.

FIG. 23 shows an example process that may be performed by an Incident Notification Module 2300. In executing the Incident Notification Module 2300, the system begins at Step 2310, where it receives an indication of a security-related incident. The system may automatically receive this indication, for example, in response to the creation and/or detection, by the system, of an incident report. In various embodiments, such incident reports may be generated, for example: (1) by a user through use of a graphical user interface provided by the system; and/or (2) automatically by a breach detection and/or reporting system, which may be part of the present system.

At Step 2320, the system may determine one or more attributes of the indicated security-related incident. Such attributes may be provided when the incident report was created, for example by a user via a graphical user interface, or as determined by an automated incident report generation system. Such attributes may be stored in or otherwise associated with a record of the incident in the system's memory. Attributes can be any type of information associated with a security-related incident, including, but not limited to (1) a geographical region or country in which the incident occurred; (2) a scope of the incident; (3) a date and time of occurrence of the incident; (4) one or more affected systems, assets, processes, vendors, etc.; and/or (5) one or more controlling regulatory or legal schemes.

At Step 2330, based on the information available about the security-related incident (e.g., attributes as determined at Step 2320), the system may determine additional information for the security-related incident. For example, the system may determine a risk level and/or regulatory regime for an incident based, at least in part, on the location and/or scope of the incident and/or the affected systems. The system may determine any other additional information associated with the incident using any available resources at Step 2330.

At Step 2340, the system may determine one or more third-party entities (e.g., third party vendors) that may be involved and/or associated with the security-related incident using one or more of the attributes of the security-related incident and/or any additional information determined for the security-related incident. For example, the system may determine, in some embodiments based at least in part on one or more attributes of a particular data breach, that the data breach has affected one or more email systems in Germany. The system may then determine that the applicable email systems in Germany are hosted by one or more particular vendors. Accordingly, the system may conclude that the one or more particular vendors have been affected by the data breach.

The system may next, at Step 2350, analyze one or more contracts with the one or more determined entities (e.g., as determined at Step 2340) to determine whether one or more notification obligations to such entities exist and, if so, the particular requirements of such obligations. For example, the system may determine that a particular vendor contract includes an obligation of an entity to alert the particular vendor of any data breach affecting a particular service involving that vendor within 48 hours of the entity learning of the data breach. It should be understood that notification obligations may specify, for example, any particular requirements related to the required notification, such as the form of the notification (e.g., email, phone call, letter, etc.), timeframe of the notification (24 hours, 48 hours, five business days, etc.), information to be included in the notification, etc. The system may be configured to analyze such contracts using natural language processing techniques to scan the language of the contracts in order to determine the particular obligations and associated requirements.

Based on the determined obligations, at Step 2360 the system may generate one or more tasks that should be performed to satisfy such obligations. The system may then present such tasks to a user for completion, for example, in a suitable graphical user interface on a display screen associated with the system. The system may present one or more such tasks to the user along with any related information, as described in more detail herein. The system may also, or instead, automatically perform one or more of such tasks and may notify a user of the system's automatic performance and/or completion of such tasks, for example, via a suitable user interface.

Vendor Risk Scanning and Scoring Systems

A vendor risk management system may be configured to perform any one or more of several functions related to managing vendors and/or other third-party entities. In various embodiments, a vendor management system may be a centralized system providing the functions of vendor compliance demonstration, vendor compliance verification, vendor scoring (e.g., vendor risk rating, vendor privacy compliance scoring, etc.), and/or vendor information collection. The system may use various sources of information to facilitate vendor-related functions, such as, but not limited to: (1) publicly available vendor information (e.g., from websites, regulator bodies, industry associations, etc.); (2) non-publicly available information (e.g., private information, contracts, etc.); and/or (3) internally-generated information (e.g., internally-generated scoring information, internally-generated ranking information, one or more internally-maintained records of interactions with the vendor, one or more internal records of privacy-related incidents, etc.).

In particular embodiments, a vendor risk management system may be configured to scan one or more systems and/or publicly available information associated with a particular vendor. The system may extract vendor information from such sources and/or use the extracted information to determine one or more vendor risk scores for the particular vendor. The system may, for example, be configured to define particular scoring criteria for one or more privacy programs (e.g., associated with a particular vendor of the entity) and use the scoring criteria to determine one or more vendor risk scores for the particular vendor (e.g., a vendor or sub-processor that processes data on behalf of the entity) based on the particular scoring criteria. The system may also, or instead, be configured to define particular scoring criteria for one or more privacy programs (e.g., associated with a particular vendor of the entity and/or a particular product or service of the particular vendor) and use the scoring criteria to determine respective risk scores for one or more products (services, offerings, etc.) provided by the particular vendor based on the particular scoring criteria. In various embodiments, suitable scoring criteria may be based on any suitable vendor information (e.g., any suitable information associated with the vendor), including, but not limited to, publicly available information and non-publicly available information.

Suitable vendor information may include, for example: (1) one or more security certifications that the vendor may or may not have (e.g., ISO 27001, SOC II Type 2, etc.); (2) one or more awards and/or recognitions that the vendor has received (e.g., one or more security awards); (3) one or more security policies the vendor may have in place, (4) one or more third parties (e.g., sub-processors, third-party vendors, etc.) with which the vendor may do business or otherwise interact; (5) one or more privacy policies and/or cookie policies for one or more vendor webpages (e.g., one or more webpages associated with the vendor, operated by the vendor, etc.); (6) one or more partners and/or potential sub-processors associated with one or more products offered by the vendor; (7) one or more typical vendor response times to one or more particular types of incidents; (8) one or more typical vendor response times to one or more particular types of requests for information form the vendor; (9) vendor financial information (e.g., publicly available financial information for the vendor such as revenue, stock price, trends in stock price, etc.); (10) news related to the vendor (e.g., one or more news articles, magazine articles, blog posts, etc.); (11) one or more data breaches experienced by the vendor (e.g., one or more announced breaches) and/or the vendor's response to such breaches; and/or (12) any other suitable vendor information. Other suitable vendor information may include, for example, membership in a Privacy Shield and/or participation in one or more treaties and/or organizations related to a demonstration of meeting certain privacy standards, use of Standardized Information Gathering (SIG), etc. Particular exemplary vendor information is discussed more fully below.

In particular embodiments, the system may, for example, be configured to scan one or more webpages associated with a particular vendor (e.g., one or more webpages operated by the particular vendor, one or more webpages operated on behalf of the particular vendor, one or more webpages comprising information associated with the particular vendor, etc.) in order to identify one or more pieces of vendor information that may serve as a basis for calculating and/or otherwise determining one or more vendor risk scores (e.g., one or more vendor compliance scores, one or more vendor privacy risk scores, one or more vendor security risk scores, etc.). In various embodiments, the system may be configured to scan the one or more webpages by: (1) scanning one or more pieces of computer code associated with the one or more webpages (e.g., HTML, Java, etc.); (2) scanning one or more contents (e.g., text content) of the one or more webpages (e.g., using one or more natural language processing techniques); (3) scanning for one or more particular images on the one or more webpages (e.g., one or more images that indicate membership in a particular organization, receipt of a particular award, etc.); and/or (4) using any other suitable scanning technique to scan the one or more webpages. When scanning a particular webpage or multiple webpages, the system may, for example, perform one or more functions such as identifying one or more hosts of one or more images identified on the particular webpage or multiple webpages, analyzing the contents of one or more particular identified privacy and/or cookie policies that are displayed on the one or more webpages, identify one or more particular terms, policies, and/or other privacy-related language included in the text of the particular webpage or multiple webpages, etc. The system may, for example, be configured to automatically detect any of the one or more pieces of vendor information described above. The system may also, or instead, be configured to detect any of the one or more pieces of vendor information at least partially in response to a detection and/or receipt of a user input, such as the selection of a user-selectable control (e.g., user-selectable indicia, webform button, webpage control, etc.) in a graphical user interface presented to a user. The system may also, or instead, be configured to initiate detection of any of the one or more pieces of vendor information in response to any other type of input or condition.

In various embodiments, the system may, for example analyze the one or more pieces of vendor information and calculate or otherwise determine a risk score for the vendor based at least in part on the one or more pieces of vendor information. The system may also use other information in conjunction with the one or more pieces of vendor information to calculate or otherwise determine a vendor risk score. In particular embodiments, the system is configured to automatically assign one or more weighting factors to each of the one or more pieces of vendor information and/or to each of one or more pieces of other information when calculating the risk score.

In particular embodiments, the system is configured to analyze one or more pieces of a vendor's published software applications of software and/or documentation associated with vendor software (e.g., that may be available to one or more customers for download via one or more webpages) to detect one or more privacy disclaimers associated with such software. The system may then, for example, be configured to use one or more text matching techniques to determine whether the one or more privacy disclaimers contain one or more pieces of language required by one or more prevailing industry and/or legal standards and/or requirements related to data privacy and/or security. The system may, for example, be configured to assign a relatively low risk score to a vendor whose products (e.g., software, services, webpages, other offerings, etc.) include one or more required privacy disclaimers. Likewise, the system may, for example, be configured to assign a relatively high risk score to a vendor whose products do not include such disclaimers.

In various embodiments, the system may be configured to analyze one or more webpages associated with a particular vendor for one or more privacy notices, one or more blog posts, one or more preference centers, and/or one or more control centers. The system may then, for example, calculate a vendor privacy risk score based, at least in part, on a presence of one or more of: (1) one or more suitable privacy notices; (2) contents of one or more blog posts on one or more vendor sites (e.g., whether the vendor site has one or more blog posts directed toward user privacy); (3) a presence of one or more preference centers and/or control centers that enable visitors to the site to opt-in or opt-out of certain data collection policies (e.g., cookie policies, etc.); and/or (4) any other security-related information, privacy-related information etc. that may be present on one or more webpages associated with the particular vendor.

In particular embodiments, the system may be configured to determine whether the particular vendor holds one or more certifications (e.g., one or more security certifications, one or more privacy certifications, one or more industry certifications etc.) such as one or more system and organization controls (SOC) or International Organization for Standardization (ISO) certifications or one or more certifications related to Health Insurance Portability and Accountability ACT (HIPAA). In various embodiments, the system is configured to access one or more public databases of certifications to determine whether the particular vendor holds any particular certification. The system may then determine a risk score based, at least in part, on whether the vendor holds one or more certifications (e.g., the system may calculate a relatively higher score if the vendor holds one or more particular certifications). The system may be further configured to scan a vendor website for an indication of one or more certifications. The system may, for example, be configured to identify one or more images that indicate receipt of one or more certifications. In various embodiments, the system may be configured to calculate a vendor risk score based on one or more certifications that the system determines that the vendor does or does not hold.

In a particular embodiment, the system may first scan one or more vendor websites for one or more indications that the vendor has one or more certifications as discussed above. Next, in response to determining that the vendor has indicated that they have one or more certifications (e.g., via their website or otherwise), the system may be adapted to verify whether the vendor actually has the indicated one or more security certifications by automatically confirming this with one or more independent data sources, such as a public database of entities that hold security certifications.

In still other embodiments, the system is configured to analyze one or more social networking sites (e.g., LinkedIn, Facebook, etc.), one or more business related job sites (e.g., one or more job-posting sites, one or more corporate websites, etc.), and/or one or more other third-party websites that may be associated with and/or contain information pertaining to the vendor (e.g., that are not operated by, or on behalf of, the vendor). The system may, for example, use social networking data (e.g., obtained from one or more social network websites) and/or other data to identify one or more titles of employees of the vendor, one or more job roles for one or more employees of the vendor, one or more job postings for the vendor, etc. The system may then analyze the one or more job titles, postings, listings, roles, etc. to determine whether the vendor has and/or is seeking one or more employees that have a role associated with addressing data privacy, data security, and/or other privacy or security concerns (e.g., a role that requires data privacy experience). In this way, the system may determine whether the vendor is particularly focused on privacy, security, and/or other related activities. The system may then calculate a risk score for the vendor based, at least in part, on such a determination (e.g., a vendor that has one or more employees whose roles and/or titles are related to security may receive a relatively higher risk score as compared to a vendor who does not).

In particular embodiments, the system may be configured to calculate the risk score using one or more additional factors such as, for example: (1) public information associated with one or more events that the vendor is attending; (2) public information associated with one or more conferences that the vendor has participated in and/or is planning to participate in; (3) one or more publications and/or articles written by authors associated with and/or sponsored by the vendor; (4) public relations material issued by the vendor, (5) one or more news articles and/or reports about the vendor; and/or (6) any other public information about and/or associated with the vendor. In some embodiments, the system may calculate a risk score for the vendor based, at least in part, on one or more governmental relationships of the vendor (e.g., relationships that the vendor has with one or more particular government entities). For example, the system may be configured to calculate a relatively low risk score for a vendor that has one or more contracts with one or more government entities (e.g., because an existence of such a contract may indicate that the vendor has passed one or more vetting requirements imposed by the one or more government entities).

In particular embodiments, the system may be configured to determine a vendor risk score based, at least in part, on one or more pieces of information contained in one or more documents that define a relationship between the vendor and the entity (e.g., one or more contracts, one or more agreements, one or more licenses, etc.). The system may be configured to receive one or more such documents as uploaded documents, for example, provided via a suitable user interface. For example, for one or more such documents, the system may be configured to: (1) receive a copy of a particular document; (2) scan the particular document to identify particular language (e.g., one or more particular terms, clauses, etc.) contained in the document; (3) categorize the particular language based on one or more predefined term language categories; and/or (4) modify and/or calculate a risk score for the vendor based on the presence and/or absence of the particular language.

In particular embodiments, the system may be configured to analyze (e.g., using natural language processing) one or more such documents to identify key terms. The system may, for example, be automatically configured to identify one or more: (1) term limits; (2) breach notification timeline obligations; (3) sub-processor change notification requirements; (4) liability caps/obligations; (5) data breach liability terms; (6) indemnification terms; (7) required data transfer mechanisms; (8) notification time periods for a data breach; (9) notification requirements for sub-processor changes; (10) terms requiring one or more security certifications; (11) terms requiring compliance with one or more regulatory regimes; and/or (12) any other privacy or security related terms within the one or more documents.

In particular embodiments, as described herein, the system may be configured to generate one or more vendor risk assessment questionnaires and transmit the one or more questionnaires to a particular vendor for completion. The system may later receive the completed questionnaire and use one or more pieces of vendor information (as obtained from the vendor's responses to the various questions within the questionnaire) in calculating the vendor risk score.

In various embodiments, the system may be configured to automatically generate an expiration date for any particular piece of information used in the determination of a vendor risk score (e.g., one or more pieces of vendor information derived from a questionnaire and/or assessment related to the vendor, determined from one or more webpage scans, identified in one or more uploaded documents, etc.). Such an expiration date may, for example, be based on an explicit characteristic of the piece of information, such as the date on which a security certification expires. Alternatively, or in addition, an expiration date may be determined based on one or more system configurations (e.g., privacy-related data may be set to expire six months after the system identifies/determines the information, which may help ensure that the system maintains current information).

The system may use any other criteria to set information expiration dates. Any piece of information may have an expiration date that may be distinct and/or independent from the expiration date associated with any other piece of information. Alternatively, or in addition, a piece of information may have an expiration date tied to and/or associated with an expiration date of another piece of information.

In various embodiments, the system may be configured for, in response to determining that a particular piece of vendor-related information used by the system has expired, automatically requesting and/or attempting to obtain an updated version of the expired information. In various embodiments, automatically requesting and/or obtaining updated information may comprise, for example: (1) generating an updated risk assessment questionnaire for completion by the vendor and facilitating completion of the questionnaire by the vendor; (2) competing an updated scan of one or more pieces of publicly available information associated with the vendor; (3) completing an updated scan of one or more vendor systems; (4) analyzing one or more new versions of one or more particular vendor documents; and/or (5) performing other suitable activities to obtain updated information, etc. In particular embodiments, the system may then be configured to calculate an updated vendor risk score based, at least in part, on one or more pieces of the updated information. In any embodiment described herein, the system may be configured to determine whether the one or more pieces of updated information are sufficient to demonstrate continued compliance, by the vendor, with one or more obligations under one or more privacy laws, standards and/or regulations, one or more obligations under one or more vendor contracts, etc.

In any embodiment described herein, the system may be configured to assign, identify, and/or determine a weighting factor for each of a plurality of factors used to determine a risk score for a particular vendor. For example, when calculating a risk score for a particular vendor, the system may assign a first weighting factor to whether the vendor has one or more suitable privacy notices posted on a website associated with the vendor, a second weighting factor to whether the vendor has one or more particular security certifications, etc. The system may, for example, assign one or more weighting factors using any suitable technique described herein with relation to risk rating determination. In various embodiments, the system may be configured to receive the one or more weighting factors (e.g., from a user). In various embodiments, the system may also, or instead, be configured to determine the one or more weighting factors based at least in part on a type of the factor.

In any embodiment described herein, the system may be configured to determine an overall risk score for a particular vendor (e.g., applicable to all pieces of the vendor's software) based at least in part on a risk score associated with a subset of the vendor's products. In various embodiments, the system may be configured to determine an overall risk score for a particular vendor based at least in part on a risk score associated with a subset of the vendor's products in combination with one or more additional factors (e.g., one or more additional risk factors described herein). In various embodiments, the system may be configured to determine an overall risk rating for a product of a particular vendor based, at least on part, on a risk score associated with one or more of the vendor's other products in combination with one or more additional factors (e.g., one or more additional risk factors described herein). In various embodiments, the system may assign one or more weighting factors to each of one or more risk scores and/or other risk factors that may be used when calculating an overall risk score. The system may then be configured to provide a risk score (e.g., an overall risk score) for the vendor and/or a vendor product for use in calculating a risk of undertaking a particular processing activity that utilizes the vendor and/or a particular product of the vendor (e.g., in any suitable manner described herein).

In a particular example, the system may be configured to determine whether the vendor is part of a Privacy Shield arrangement. In various embodiments, a privacy shield arrangement may facilitate monitoring of a vendor's compliance with one or more commitments and may facilitate enforcement of those commitments under the privacy shield. In particular, a vendor entering a privacy shield arrangement may, for example: (1) be obligated to publicly commit to robust protection of any personal data that it handles; (2) be required to establish a clear set of safeguards and transparency mechanisms regarding who can access the personal data the vendor handles; and/or (3) be required to establish a redress right to address complaints about improper access to the personal data. The system may then be configured to use the determinization of the vendor's participation and/or membership in a privacy shield and/or one or more similar arrangement to determine a risk score for that vendor.

In a particular example of a privacy shield arrangement between the United States and Europe, the U.S. Department of Commerce may be responsible for monitoring a vendor's compliance (e.g., a company's compliance) with its commitments under the privacy shield and the Federal Trade Commission may be responsible for enforcement authority over such commitments. In a further example, the U.S. Department of Commerce may designate an ombudsman to hear complaints from Europeans regarding U.S. surveillance that affects personal data of Europeans.

In various embodiments, regulations related to data privacy and/or data security may include one or more regulations that allow data transfer to a country or entity that participates in a safe harbor and/or a privacy shield as discussed herein. The system may, for example, be configured to automatically identify a transfer that is subject to a privacy shield and/or safe harbor as "low risk." For example, U.S. Privacy Shield members may be maintained in a database of privacy shield members (e.g., on one or more particular webpages such as www.privacyshield.gov). The system may be configured to scan one or more webpages reflecting information stored in such databases to determine whether the vendor is part of the privacy shield and/or to otherwise obtain information associated with the vendor.

In particular embodiments, the system may be configured to monitor the one or more web sites (e.g., one or more webpages) and/or other systems to identify one or more changes to one or more pieces of vendor information. For example, a vendor may update a privacy policy for one of its websites (e.g., to comply with one or more legal or policy changes). In various embodiments, a change in a privacy policy may modify a relationship between a website and its users. In particular embodiments, the system may be configured to determine that a particular website has changed its privacy policy and responsively perform a new scan of the web site to obtain updated privacy-related information for the vendor. The system may, for example, scan a website's privacy policy at a first time and at a second, later time and compare such scans to determine whether a change has occurred. The system may be configured to perform scanning of websites and/or other sources of vendor information routinely and/or automatically. The system may be configured to analyze any changes (e.g., a change in a privacy policy for the vendor posted on a particular web page of the web site) to determine whether and how to modify a calculated risk score for a vendor (e.g., based on the change).

The system may, for example, be configured to continuously monitor a particular web site and/or web page for one or more changes. In various embodiments, the system may be configured to scan for one or more changes according to a particular schedule (e.g., hourly, daily, weekly, or any other suitable schedule). For example, the system may be configured to scan one or more webpages and/or other sources of vendor information on an ongoing basis to determine whether any pieces of vendor information have changed (e.g., whether the vendor has not renewed its Privacy Shield membership, lost its ISO certification, etc.).

Figure 24:
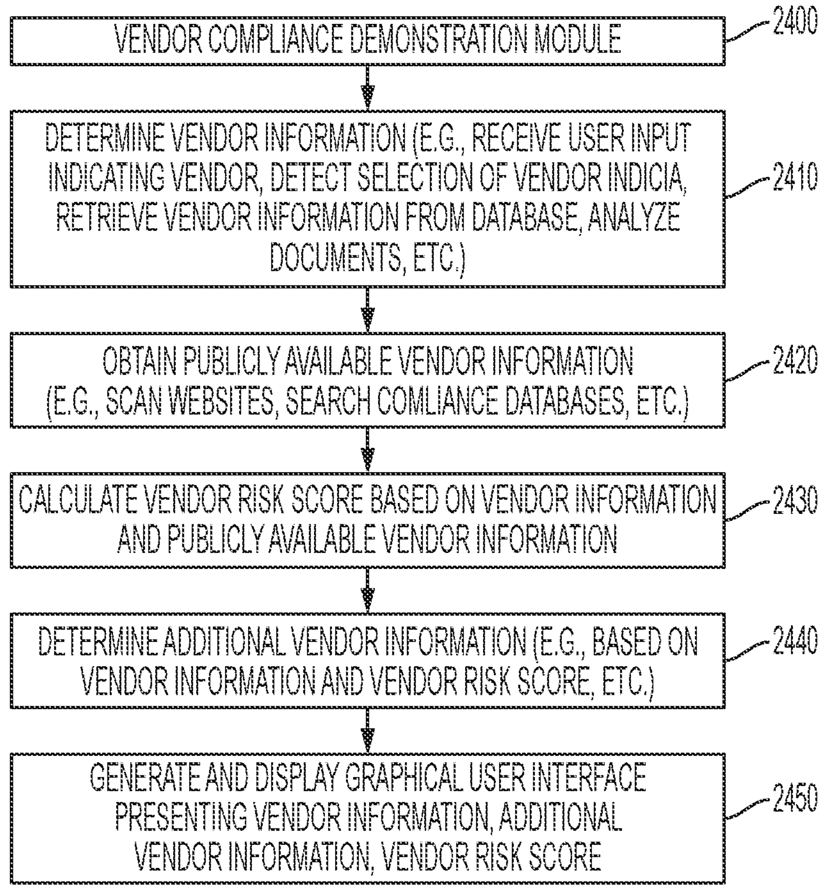
FIG. 24 is a flow chart showing an example of a process performed by the Vendor Compliance Demonstration Module according to particular embodiments.

FIG. 24 shows an example process that may be performed by a Vendor Compliance Demonstration Module 2400. In executing the Vendor Compliance Demonstration Module 2400, the system begins at Step 2410, where it determines vendor information. The Vendor Compliance Demonstration Module 2400 may determine vendor information based on a selection of a control on a graphical user interface, such as a control or indicia on an interface associated with a vendor. In various embodiments, the Vendor Compliance Demonstration Module 2400 may determine vendor information from user input such as text input on a graphical user interface, for example, when a user inputs information for a new vendor to be analyzed for compliance as described herein. In various embodiments, the Vendor Compliance Demonstration Module 2400 may determine vendor information using information (e.g., a vendor name) received from a user and/or associated with an interface activity (e.g., selection of a control) to query a database of vendor information.

At Step 2410, determining vendor information may include performing analysis on one or more documents to determine the vendor information. For example, the system may be configured to retrieve one or more contracts that an entity has entered into with a vendor from a database using a vendor's name. The system may then analyze such one or more contracts (e.g., using natural language processing) to identify one or more particular terms used in the one or more contract that may be useful in calculating a vendor risk score for the vendor. The system may be configured to also, or instead, obtain and/or determine any other internally sourced data associated with the vendor at Step 2410, such as internal records of interactions with the vendor, business relationship information for the vendor, service provided by the vendor, length of relationship with vendor, expiration of vendor service agreements, etc.

At Step 2420, the system may obtain publicly available vendor information. In doing so, the system may be configured to scan one or more webpages operated by or on behalf of the vendor and perform analysis of such webpages to determine, for example, any of the various factors related to privacy and/or security described herein. The system may also be configured to scan one or more webpages that are not operated by, or on behalf of, the vendor and perform analysis of such sites to determine any of the various factors related to privacy and/or security described herein. For example, the system may scan and analyze websites of one or more privacy certification organizations and/or industry groups to extract one or more factors related to privacy and/or security associated with the vendor. The system may perform such analysis using natural language processing and/or metadata analysis to extract data from one or more websites and/or other sources of information.

The system may also verify one or more factors at Step 2420. For example, the system may determine that a vendor's webpage indicates that the vendor holds a particular privacy certification and may then analyze the webpage of the organization that issues the particular privacy certification to verify that the vendor does indeed hold the claimed privacy certification or to determine that the vendor does not hold the privacy certification as claimed. At Step 2420, the system may access and/or analyze information from one or more other publicly available sources of information, such as databases, publications, libraries, etc.

At Step 2430, the system may calculate a vendor risk score, as described in more detail herein. In various embodiments, this calculation may be performed based at least in part on the vendor information determined at Step 2410 and/or the publicly available information obtained at Step 2420. In determining the vendor's risk score, the system may use any one or more factors, each of which may be weighted according to any criteria as described herein.

At Step 2440, the system may use any of the vendor information (e.g., as determined at Step 2410), publicly available vendor information (e.g., as determined at Step 2420), and/or a calculated vendor risk score (e.g., as determined at Step 2430) to determine any additional vendor information. For example, the system may calculate a supplemental score for the vendor (e.g., based at least in part on the score determined at Step 2430 in combination with another score associated with the particular vendor). Such a supplemental score may relate to any one or more security attributes of the particular vendor, one or more privacy attributes of the particular vendor, and/or one or more privacy or security attributes of one or more products provided by the particular vendor.

In various examples, the system may perform analysis of vendor information, publicly available vendor information, and/or one or more vendor risk scores at Step 2440 to determine the additional information. For example, the system may analyze one or more news reports retrieved at Step 2420 to identify a data breach involving the particular vendor and determine, as additional vendor information, that the breach was a high risk incident. In another example, the system may analyze the status of a privacy certification held by the particular vendor and determine that the certification expires within a short time period. In response, as additional vendor information, the system may determine at Step 2440 (e.g., based on one or more additional pieces of information) that the particular vendor is at high risk of losing the privacy certification. In another example, the system may analyze a number of and/or one or more descriptions of privacy-related officers in the particular vendor's organization (e.g., their respective job titles and/or backgrounds) and determine, as additional vendor information, that the particular vendor treats privacy issues as a high priority, and therefore has lower relative privacy risk as opposed to other organizations. In yet another example, the system may determine one or more additional scores and/or rankings beyond a vendor risk score reflecting calculations based on other criteria at Step 2440, such as a compliance score reflecting the particular vendor's compliance with a particular privacy standard and/or regulatory regime. The system may use any information available for the particular vendor to determine any additional vendor information.

At Step 2450, the system may generate a graphical user interface and present, to a user, all or any subset of the vendor information, the publicly-available vendor information, the vendor privacy risk score, and/or the additional vendor information.

Figure 25:
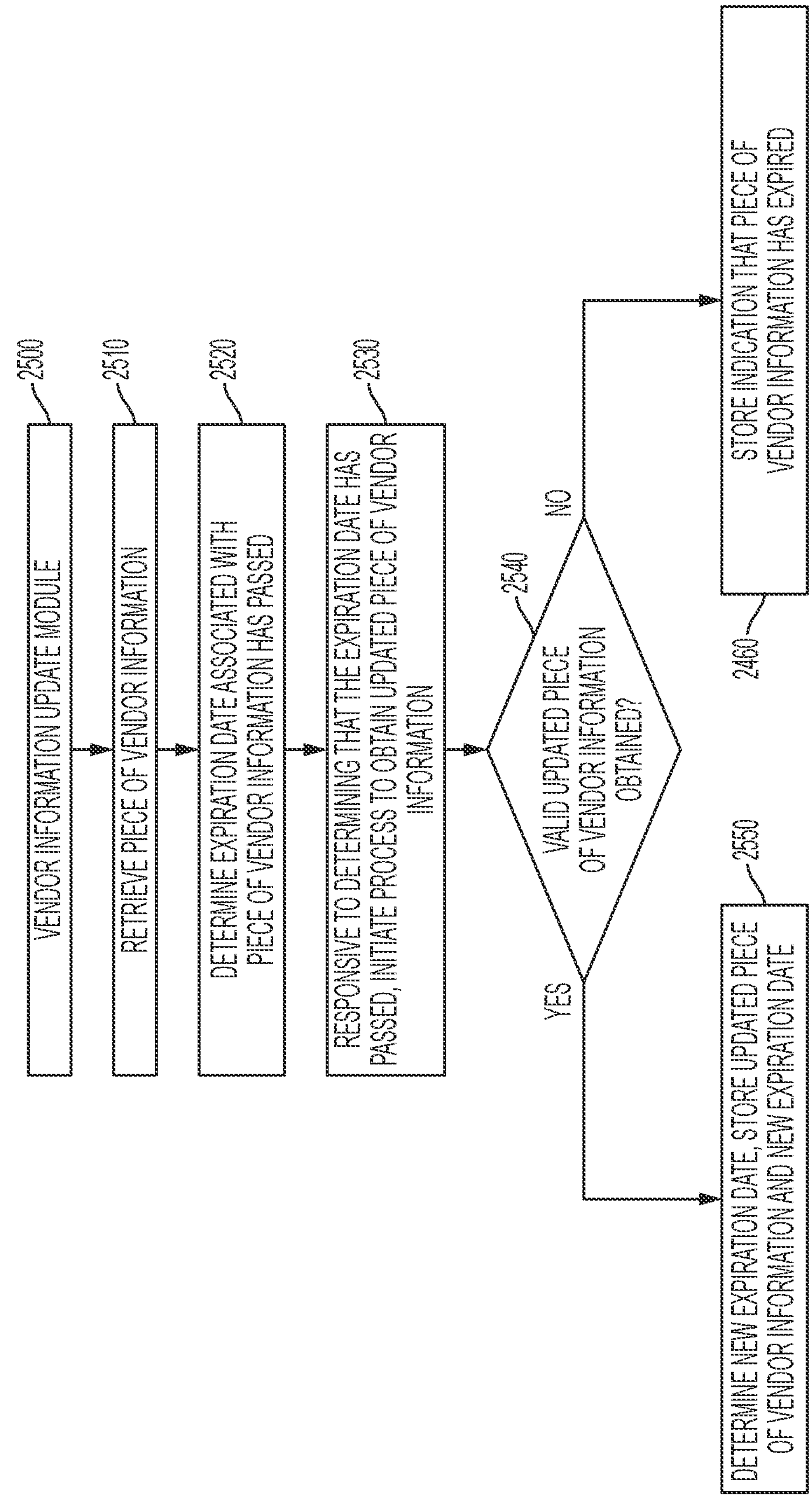
FIG. 25 is a flow chart showing an example of a process performed by the Vendor Information Update Module according to particular embodiments.

As noted herein, each piece of information associated with a vendor, regardless of how obtained or used by the presently disclosed systems, may have an associated expiration date. FIG. 25 shows an example process that may be performed by a Vendor Information Update Module 2500 that may utilize such expiration dates. In executing the Vendor Information Update Module 2500, the system begins at Step 2510, where it determines a piece of vendor information. This may be suitable any piece of vendor information, such as, but not limited to, a piece of non-publicly available vendor information, a piece of publicly available vendor information, a vendor risk score, and/or a piece of additional vendor information (e.g., as described herein). Such a piece of vendor information may be retrieved from a database and/or otherwise obtained using any suitable means.

At Step 2520, an expiration date associated with the retrieved piece of vendor information may be evaluated and determined to have passed. This expiration date may have been set based on an intrinsic characteristic of the piece of information (e.g., a date of expiration of privacy certification) and/or on one or more criteria associated with the acquisition, determination, and/or storage of the piece of information (e.g., six months after a date of acquisition, determination, and/or storage of the piece of information).

At Step 2530, responsive to determining that the expiration date has passed, the system may initiate a process to obtain and/or determine an updated piece of information. For example, the system may generate and transmit another assessment to the particular vendor associated with the expired piece of information to acquire an updated corresponding piece of information. In another example, the system may recalculate a risk score for the particular vendor associated with an expired risk score using current information. In another example, the system may scan one or more webpages for updates in order to determine an updated piece of information.

At Step 2540, the system may determine whether a valid updated piece of vendor information was obtained (e.g., determined, received). If an updated piece of information was successfully obtained (e.g., one or more responses to an updated assessment sent to a vendor were received, an updated privacy risk score was calculated, updated information was determined from analyzed webpages, etc.), at Step 2550 the system may store this updated piece of information and a new expiration date, associating the updated piece of information and the new expiration date with the appropriate vendor. Alternatively, if the system was unable to update an expired piece of information (e.g., no response was received to an updated assessment questionnaire sent to a vendor, an updated privacy risk score could not be calculated due to a lack of sufficient current information, no updated information is currently available from current webpages, etc.), at Step 2506, the system may store an indication that the piece of information is expired, invalid, and/or otherwise should not be relied upon (e.g., store such an indication in a database and associate the indication with the piece of information and/or the vendor).

Figure 26:
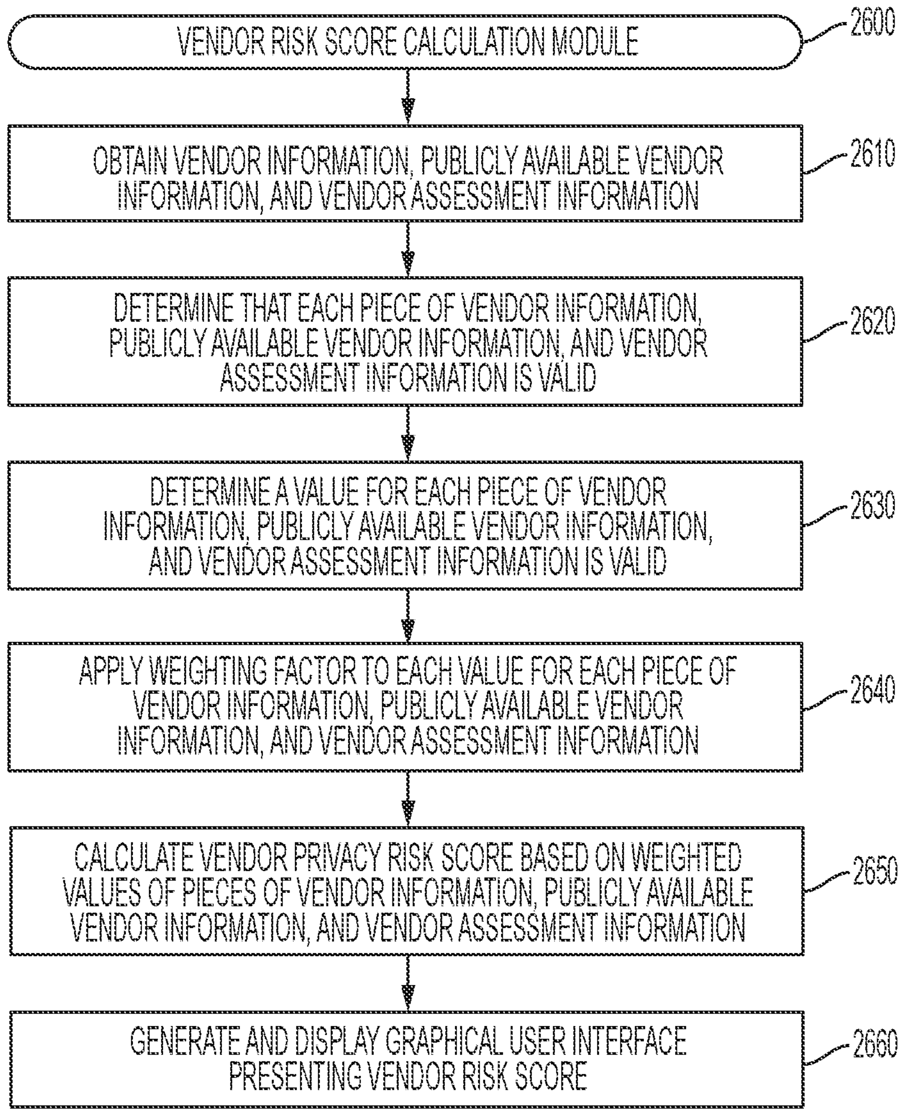
FIG. 26 is a flow chart showing an example of a process performed by the Vendor Privacy Risk Score Calculation Module according to particular embodiments.

FIG. 26 shows an example process that may be performed by a Vendor Risk Score Calculation Module 2600. In executing the Vendor Risk Score Calculation Module 2600, the system begins at Step 2610, where it determines and/or otherwise obtains non-publicly available vendor information (e.g., non-publicly available vendor information, information determined from one or more documents, etc.), publicly available vendor information, and/or vendor assessment information (e.g., as described herein). Such information may be any information and criteria as described herein.

At Step 2620, for each piece of non-publicly available vendor information, publicly available vendor information, and/or vendor assessment information, the system may be configured to determine whether the piece of information is valid. In various embodiments, to determine whether a piece of information is valid, the system may determine whether an expiration date associated with the piece of information has passed. If the expiration date has passed (e.g., the information has expired), the system may be configured to request updated information corresponding to the expired piece of information using, for example, means described herein (e.g., one or more processes such as those described in regard to FIG. 25). Other verification criteria may also, or instead, be used. For example, the system may analyze a piece of vendor information to determine whether it matches known information (e.g., a vendor name on a security certification matches a known vendor name, a vendor address on an industry membership roll matches a known vendor address, a name of vendor representative in a particular position listed in a contract matches a known vendor representative in that position, etc.). Any invalid information may be addressed in any effective manner, such as those described herein.

At Step 2630, the system may determine a value for each piece of non-publicly available vendor information, publicly available vendor information, and/or vendor assessment information that is to be used in calculating a vendor risk score (e.g., a vendor privacy risk score, a vendor security risk score, a vendor privacy risk rating, a vendor security risk rating, etc.). For example, in order to calculate a numerical vendor risk score, the system may determine a numerical value for each piece of non-publicly available vendor information, publicly available vendor information, and/or vendor assessment information. The system may be configured to assign a numerical value to each respective piece of non-publicly available vendor information, publicly available vendor information, and/or vendor assessment information using any criteria, including those described herein and/or any other suitable process, algorithm, etc.

At Step 2640, the system may be configured to apply a weighting factor to each respective value determined for each respective piece of non-publicly available vendor information, publicly available vendor information, and/or vendor assessment information. In various embodiments, some pieces of such information may be considered more important in determining a vendor risk score than others. The system may be configured to assign a greater weight to such information of elevated importance when calculating a vendor risk score. For example, a vendor's current one or more security certifications may be considered to be of greater importance than a vendor's attendance at one or more privacy-related events. In such an example, the system may apply a weighting factor to the value associated with the vendor's security certifications that is greater than the weighting factor applied to the value associated with the vendor's attendance at privacy events. Various means of determining suitable weighting factors may be used, including as described herein.

At Step 2650, the system may calculate the vendor risk score using the respective weighted values of each piece of non-publicly available vendor information, publicly available vendor information, and/or vendor assessment information. The system may, for example, be configured to perform a calculation to determine the score, such as averaging the weighted values of each piece of information. Alternatively, or in addition, the system may be configured to employ more detailed calculations and/or algorithms using the weighted values of each piece of information to determine the vendor privacy risk score. At Step 2660, the system may generate a graphical user interface and present the vendor risk score to a user. In various embodiments, the system may present the vendor privacy risk score on a graphical user interface that displays other information as well, including any interface described herein.

In particular embodiments, the system may be configured to generate and maintain a database of vendor information (e.g., including a risk analysis for each of a plurality of particular vendors). Any information associated with a vendor in any way (e.g., any vendor-related information described herein) may be stored in and/or retrieved from such a vendor information database. Such information may be acquired and/or determined by the system via any means described herein (e.g., scanning of webpages, analyzing vendor privacy risk assessments, analyzing contractual terms, analyzing one or more documents associated with the vendor, etc.). The system may provide access to, or provide information retrieved from, such a vendor information database to entities that may wish to contract with (e.g., in a new contract or by renewing an existing contract), pay, or otherwise utilize or interact with one or more vendors that are in the database. The system may also provide access to, or provide information retrieved from, such a vendor information database to entities that already have an existing relationship with one or more vendors that are in the database. In this way, the system may enable such entities to assess the risk of, for example, integrating new vendors into a new or existing processing activity, a risk associated with paying the vendor, and/or the risk of continuing a relationship with one or more vendors.

In various embodiments, vendor information (of any type) may be retrieved using one or more data models. A data model may be stored in a vendor information database and/or in any other storage means available to the disclosed systems. A data model may be associated with a vendor and may map one or more relationships between and/or among a plurality of data assets utilized by a vendor (e.g., alone or in combination with another entity). In particular embodiments, each of the plurality of data assets (e.g., data systems) may include, for example, any asset that collects, processes, contains, and/or transfers data (e.g., such as a software application, "internet of things" computerized device, database, website, data-center, server, etc.). For example, a first data asset may include any software or device (e.g., server or servers) utilized by a particular vendor for such data collection, processing, transfer, storage, etc. A data model may store any of the following information: (1) the vendor that owns and/or uses a particular data asset; (2) one or more departments within the vendor responsible for the data asset; (3) one or more software applications that collect data (e.g., personal data) for storage in and/or use by the data asset (e.g., or one or more other suitable collection assets from which the personal data that is collected, processed, stored, etc. by the primary data asset is sourced); (4) one or more particular data subjects and/or categories of data subjects that information is collected from for use by the data asset; (5) one or more particular types of data that are collected by each of the particular applications for storage in and/or use by the data asset; (6) one or more individuals (e.g., particular individuals or types of individuals) that are permitted to access and/or use the data stored in, or used by, the data asset; (7) which particular types of data each of those individuals are allowed to access and use; and/or (8) one or more data assets (destination assets) that the data is transferred to for other use, and which particular data is transferred to each of those data assets. In particular embodiments, the data model stores this information for each of a plurality of different data assets and may include links between, for example, a portion of the model that provides information for a first particular data asset and a second portion of the model that provides information for a second particular data asset.

In various embodiments, vendor information (of any type) may be retrieved using one or more data maps (e.g., privacy-related data maps). A data map may include a visual and/or computer-readable representation of one or more data models that may include one or more data assets, one or more connections between the one or more data assets, one or more inventory attributes, one or more vendor attributes, etc. For example, a data map may include one or more of: (1) a visual or other indication of a first data asset (e.g., a storage asset), a second data asset (e.g., a collection asset), and a third data asset (e.g., a transfer asset); (2) a visual or other indication of a flow of data (e.g., personal data) from the second data asset to the first data asset (e.g., from the collection asset to the storage asset); (3) a visual or other indication of a flow of data (e.g., personal data) from the first data asset to the third data asset (e.g., from the storage asset to the transfer asset); (4) one or more visual or other indications of a risk level associated with the transfer of personal data; and/or (5) any other suitable information related to the one or more data assets, the transfer of data between/among the one or more data assets, access to data stored or collected by the one or more data assets, etc.

In particular embodiments, the data map identifies one or more electronic associations between at least two data assets within a data model comprising a respective digital inventory for each of the two or more data assets, each respective digital inventory comprising one or more respective inventory attributes selected from a group consisting of: (A) one or more processing activities associated with each of the respective data assets; (B) transfer data associated with each of the respective data assets; and (C) respective identifiers of one or more pieces of personal data associated with each of the respective data assets.

The system may be configured to provide a user-accessible "dashboard" (e.g., a graphical user interface) through which a user (e.g., on behalf of an entity) may initiate a process of requesting information for a vendor (a current or new vendor to the entity). The system may, for example, perform a risk assessment (e.g., privacy risk assessment, security risk assessment, privacy impact assessment, etc.) for a specified particular vendor, which may include: (1) determining whether a current risk assessment exists for the particular vendor within the system (e.g., whether a current risk assessment is stored within a data structure (e.g., a database) associated with the system); (2) determining how long the particular vendor (e.g., a business entity) has been in business; (3) identifying one or more privacy and/or security related incidents (e.g., data breaches) associated with the particular vendor and/or one or more sub-processors utilized by the particular vendor; and/or (4) analyzing any other available data related to the particular vendor. Based at least in part on the analyzed vendor data, the system may determine whether to: (1) automatically trigger a new or updated risk assessment for the vendor; (2) automatically approve the particular vendor (e.g., as a business partner for a particular entity and/or for involvement in a particular processing activity); and/or (3) automatically reject the particular vendor (e.g., as a business partner for a particular entity and/or for involvement in a particular processing activity).

For example, at least partially in response to determining that the particular vendor has an existing, older vendor risk assessment stored within a database stored within a data structure associated with the system (e.g., a vendor risk assessment that is past a particular age, such as six months), the system may be configured to trigger a new vendor risk assessment for the particular vendor (e.g., using any suitable technique described herein). In another example, the system may be configured to trigger a new vendor risk assessment for the particular vendor in response to determining that the particular vendor has experienced one or more privacy-related incidents and/or a security-related incidents (e.g., a data breach) after the most recent vendor risk assessment was completed for the particular vendor. In yet another example, the system may be configured to automatically approve the particular vendor in response to determining that the system currently stores a recent vendor risk assessment for the particular vendor, and/or that the particular vendor has had no recent privacy and/or security incidents. Any such approvals or rejections may also be based, at least in part, on other information associated with the particular vendor, including, but not limited to: (1) one or more vendor risk scores; (2) one or more terms contained in one or more documents (e.g., contracts, licenses, agreements, etc.) involving the vendor; (3) one or more privacy and/or security certifications held by the vendor; (4) any other public information about the vendor (e.g., retrieved by scanning webpages or accessing databases); and/or (5) any other suitable vendor-related information, described herein or otherwise.

In particular embodiments, the system is configured to maintain a database of vendor privacy-specific information (e.g., scoring criteria) for use in such assessments. The system may be configured to periodically (e.g., every month, every week, annually, every six months, or at any other suitable interval) update such privacy-specific information and/or to monitor for one or more changes to such privacy-specific information (e.g., vendor privacy information) and update the database in response to identifying any such changes. Any information in such a database may have an associated expiration date, the passing of which may trigger the system to (e.g., substantially automatically) attempt to obtain updated information for the vendor.

Figure 27:
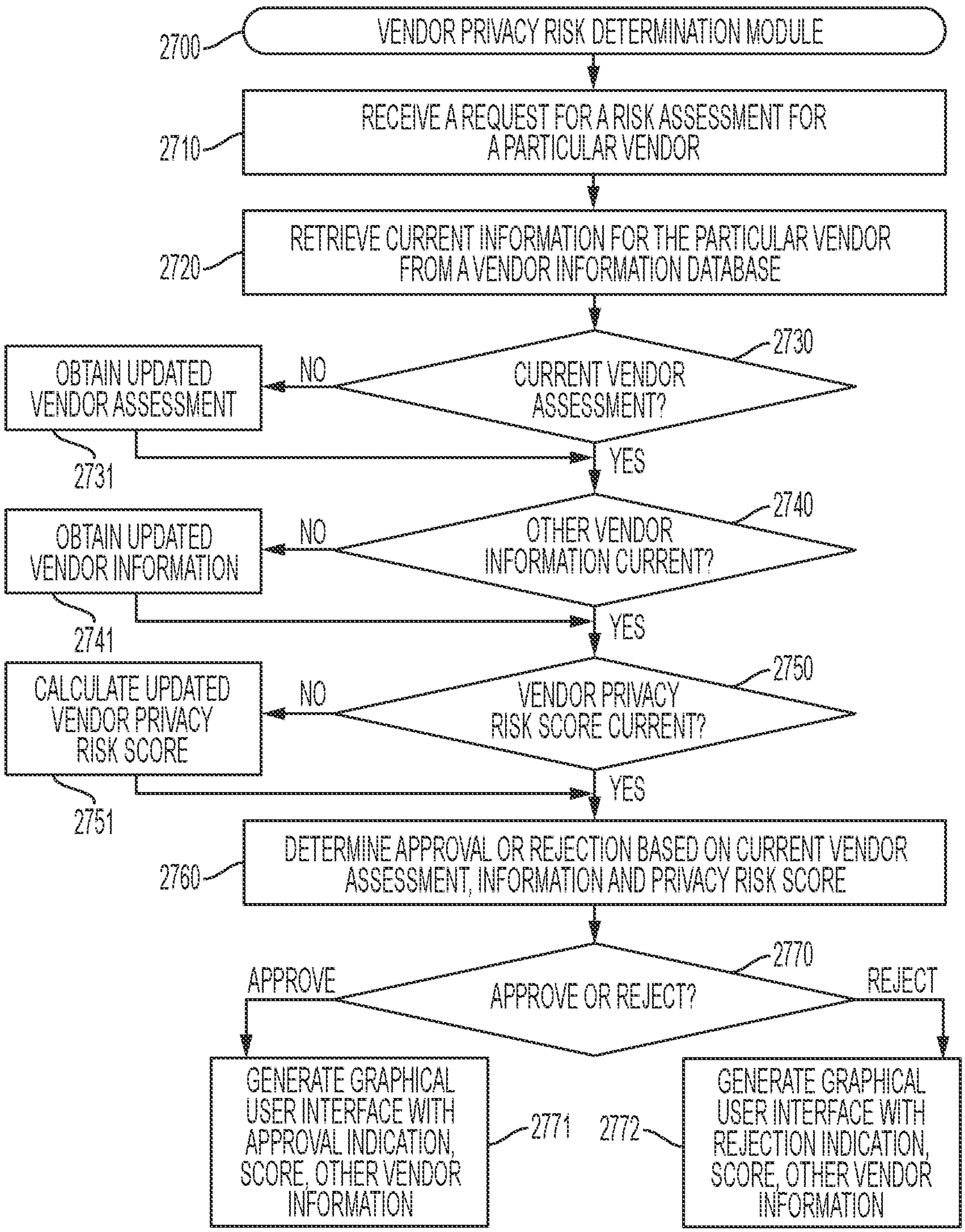
FIG. 27 is a flow chart showing an example of a process performed by the Vendor Privacy Risk Determination Module according to particular embodiments.

FIG. 27 shows an example process that may be performed by a Vendor Risk Determination Module 2700. In executing the Vendor Risk Determination Module 2700, the system begins at Step 2710, where it receives a request assess the risk associated with a particular vendor. The system may receive such a request via a graphical user interface where a user has selected the vendor from a prepopulated listing or otherwise specified the particular vendor for which information is desired (e.g., as described herein).

At Step 2720, the system may attempt to retrieve any currently available information for the particular vendor (e.g., a completed risk assessment (e.g., a privacy risk assessment, a security risk assessment, etc.) for the vendor, a summary of such a risk assessment, and/or any other suitable information regarding the vendor), for example, from a vendor information database.

At Step 2730, the system may determine whether a current risk assessment was retrieved from the vendor information database for the particular vendor. In various embodiments, if no current, valid vendor risk assessment for the vendor exists in the database (e.g., an existing assessment has expired, is invalid, or is not present), the system may be configured to responsively obtain an updated (e.g., new) vendor risk assessment from the particular vendor at Step 2731 (e.g., as described herein). At least partially in response to obtaining an updated vendor risk assessment for the vendor and/or determining that a current, valid vendor risk assessment was retrieved from the vendor information database, the system may proceed to Step 2740.

At Step 2740, the system may determine whether other vendor information (e.g., any vendor information described herein beyond a vendor risk assessment) retrieved from the vendor information database for the particular vendor is present, current, and valid. In various embodiments, if the system retrieves expired or otherwise invalid vendor information at this step, and/or any required vendor information is not present in the vendor information database, the system may be configured to responsively obtain updated (e.g., new) information (e.g., using any means described herein) at Step 2741. At least partially in response to obtaining any needed vendor information and/or determining that all required vendor information retrieved from the vendor database is current and valid, the system may proceed to Step 2750.

At Step 2750, the system may determine whether a current vendor risk score retrieved from the vendor information database for the particular vendor is available to the system (e.g., saved to a database associated with the system) and current. If the system retrieves an expired vendor risk score or there is no vendor risk score present in the vendor information database for the particular vendor, the system may be configured to responsively calculate an updated (e.g., new) vendor risk score (e.g., using any means described herein) at Step 2751. At least partially in response to calculating an updated vendor risk score and/or determining that the vendor risk score retrieved from the vendor database is current, the system may proceed to Step 2760.

At Step 2760, the system may be configured to determine whether to approve the use (e.g., new or continued) of the particular vendor based at least in part on the information retrieved and/or otherwise determined previously (e.g., in prior steps). In various embodiments, any or all of the information described in regard to FIG. 27, or elsewhere herein, may be used, at least in part, by the system to make this determination. If, at Step 2770, the system determines that the particular vendor is approved for new or continued use with the entity, then, at Step 2771, the system may present an indication of such approval to a user. The system may present such an indication on a graphical user interface (or via any other suitable communications mechanism—e.g., a paper report, an audio signal, etc.) that may also include a presentation of any of the vendor information described herein. If, at Step 2770, the system determines that the particular vendor is rejected from new or continued use with the entity, then, at Step 2772, the system may instead present an indication of such rejection to a user. Here again, the system may present such an indication on a graphical user interface (or via any other suitable communications mechanism—e.g., a paper report, an audio signal, etc.) that may also include presentation of any of the vendor information described herein.

It should be understood that various alternative embodiments of the system may function differently than described above. For example, while the system is described above as using three different types of information to determine whether to approve or reject a particular vendor, other embodiments may use only one or two of these three types of information or may use different or other information when making this determination.

Dynamic Vendor Training Material Generation

In particular embodiments, the system may be configured to generate training material associated with a particular vendor based at least in part on privacy information associated with that particular vendor, such as the vendor's privacy risk score, any privacy-related information for the vendor, any publicly available information for the vendor, sub-processors used by the vendor, privacy and/or security incidents involving the vendor, etc. (e.g., any information described herein that may be associated with a vendor). In various embodiments, such training material may be intended for use by an entity to train employees on how to evaluate, interact, and/or otherwise operate with the particular vendor with whom the training is associated. In various embodiments, such training material may be intended for use by the particular vendor itself, for example as training recommended and/or required by the entity engaging the particular vendor. Any other use of such training material is contemplated in various embodiments.

The system may generate vendor-specific training material on-demand, for example, at least partially in response to the detection of a selection of a user-selectable control on a graphical user interface, where the control is associated with requesting the generation of such material.

The system may also, or instead, generate vendor-specific training material at least partially in response to detection of an occurrence associated with the particular vendor. For example, the system may be configured to detect (e.g., using any suitable technique described herein) a change in any vendor information described herein (e.g., a change in a vendor risk score, a change in a vendor sub-processor, etc.) and/or detect an incident or other event involving the vendor (e.g., a privacy breach, a security incident, etc.). In response to detection of such an occurrence, the system may be configured to dynamically (e.g., substantially automatically) update training material associated with the involved vendor to reflect the detected occurrence. The system may be configured to adjust existing training material in an appropriate manner, update existing training material, and/or generate new training material based at least in part on the occurrence. In various embodiments, the generated training material may also include one or more training assessments that may be used to gauge how well the recipients of the training material have absorbed the material. The system may be configured to store training material in a vendor database as described herein or in any appropriate system.

Figure 28:
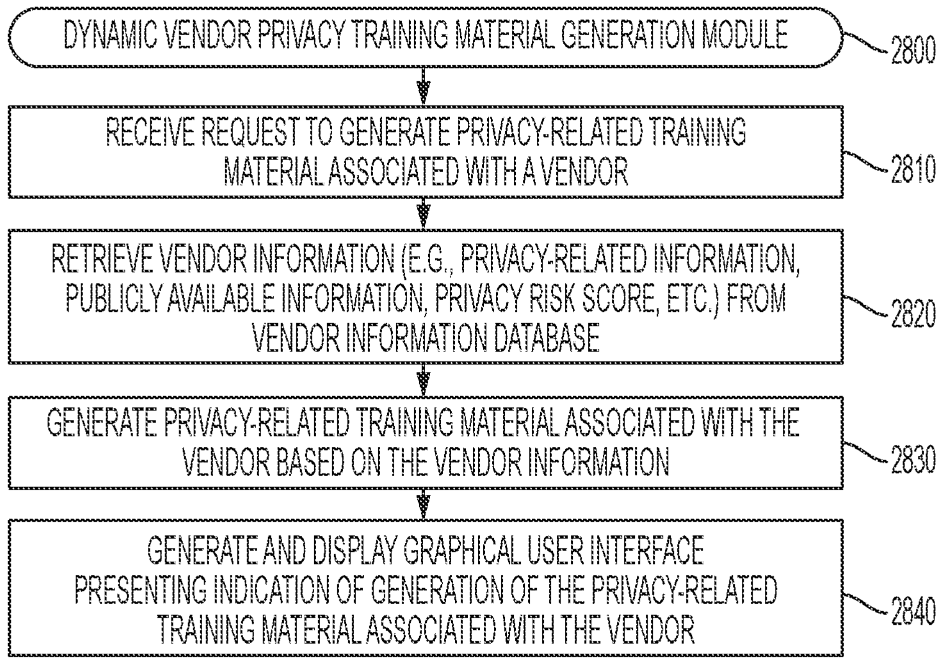
FIG. 28 is a flow chart showing an example of a process performed by the Dynamic Vendor Privacy Training Material Generation Module according to particular embodiments.

FIG. 28 shows an example process that may be performed by a Dynamic Vendor Privacy Training Material Generation Module 2800. In executing the Dynamic Vendor Privacy Training Material Generation Module 2800, the system begins at Step 2810, where a request to generate vendor-related training maybe received by the module. Such a request may be received via a graphical user interface where a user has selected the vendor from a prepopulated listing of vendors and/or otherwise specified the particular vendor for which training is desired (e.g., as described herein).

At Step 2820, the system may retrieve any currently available information for the particular vendor, for example, from a vendor information database. This information may include any vendor information described herein (e.g., vendor privacy risk assessment, vendor risk score, vendor incident history, publicly available vendor information, etc.). This information may also include any other suitable information that may be of use in generating training material associated with a particular vendor, such as: (1) one or more training material templates; (2) general information to be included in any vendor training; (3) background on applicable privacy and/or security laws and regulations; (4) one or more standard procedures for interacting with vendors; and/or (5) any other generally applicable vendor training material.

At Step 2830, the system may generate the training material associated with the particular vendor using any of the information obtained at Step 2820. The generated training material may take any suitable form (e.g., one or more manuals, slide decks, audio files, video files, etc.). At Step 2840, the system may present an indication on a graphical user interface that the training material associated with the particular vendor has been generated and/or may include a user-selectable control on such an interface that allows a user to download or otherwise access such training material. Such a graphical user interface may also include presentation of any of the vendor information described herein. At Step 2840, the system may also store the generated training material, for example, in a vendor database as described herein and/or in any appropriate system.

Figure 29:
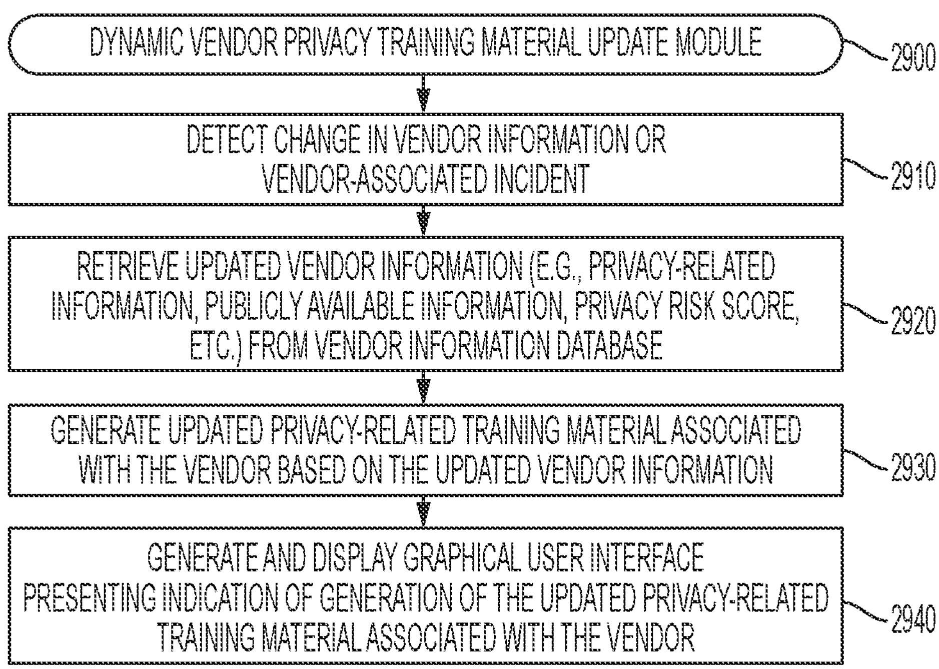
FIG. 29 is a flow chart showing an example of a process performed by the Dynamic Vendor Privacy Training Material Update Module according to particular embodiments.

FIG. 29 shows an example process that may be performed by a Dynamic Vendor Privacy Training Material Update Module 2900. In executing the Dynamic Vendor Privacy Training Material Update Module 2900, the system begins at Step 2910, where the system may detect an occurrence associated with a particular vendor. For example, the system may detect a change in any vendor information and/or an incident involving the vendor (e.g., any information or occurrence as described herein).

At Step 2920, in response to detecting the change or occurrence associated with the particular vendor, the system may retrieve any updated information for the particular vendor (e.g., from a vendor information database) and/or any other information relevant to the detected change or occurrence. This information may include any information described herein. As with the process of FIG. 29, this information may also include any other information that may be of use in generating training material associated with a particular vendor.

At Step 2930, the system may generate the training material associated with the particular vendor using any of the updated and/or occurrence information obtained at Step 2920. At Step 2940, the system may present an indication on a graphical user interface that the updated training material associated with the particular vendor has been generated. Such a graphical user interface may include a user-selectable control that allows a user to download or otherwise access such updated training material. Such a graphical user interface may also include presentation of any of the vendor information described herein. At Step 2940, the system may also store the generated training material in a vendor database as described herein or in any appropriate system.

It should be understood that various alternative embodiments of the system may function differently than described above. For example, while the system is described above as using three different types of information to determine whether to approve or reject a particular vendor, other embodiments may use only one or two of these three types of information or may use different or other information when making this determination.

Exemplary User Experience

Exemplary Vendor Incident Management User Experience

Figure 30:
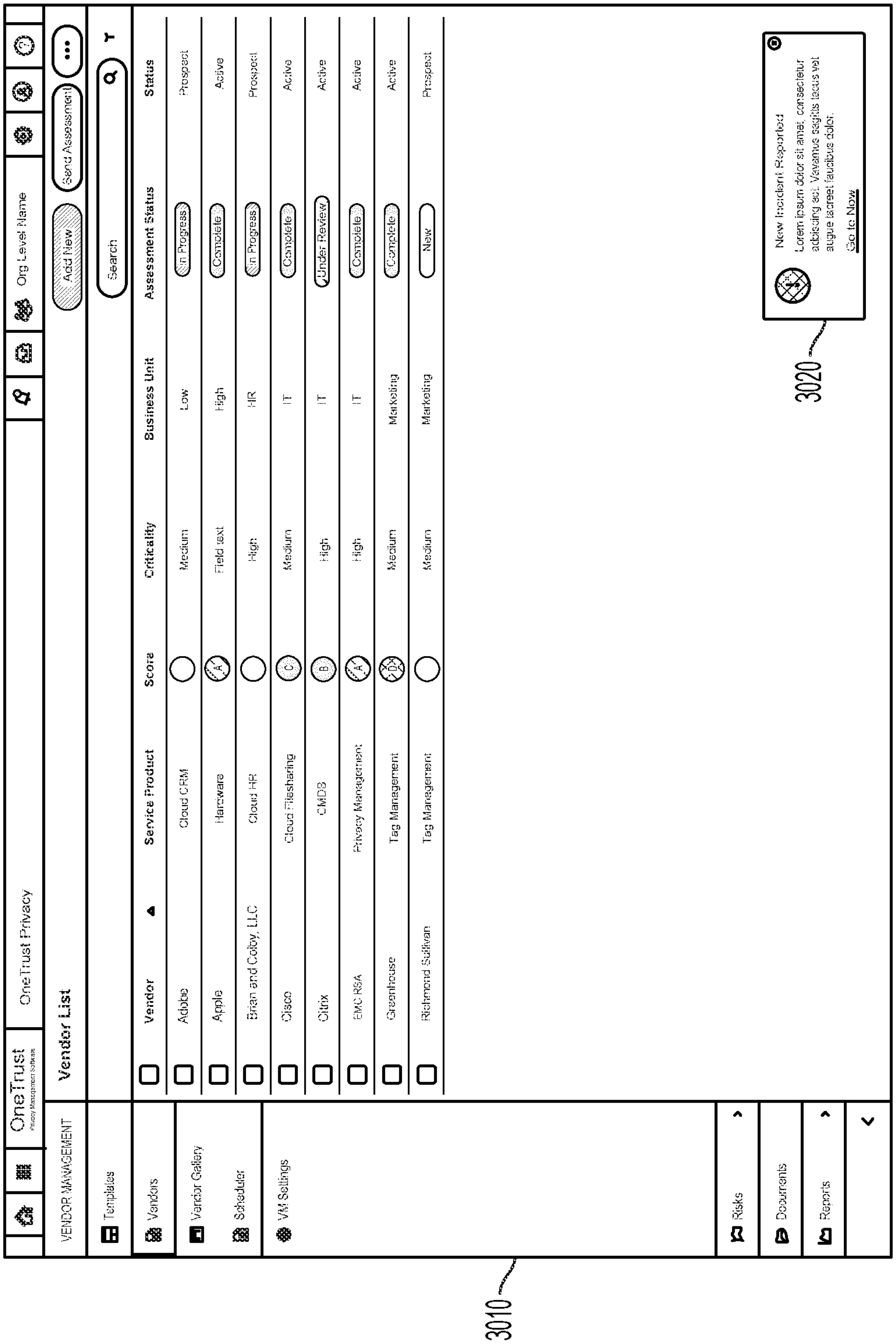
FIG. 30 is an example of a GUI showing a listing of vendors.

FIGS. 30-34 depict exemplary screen displays that a user may encounter when utilizing an exemplary system configured to provide notifications of a security-related incident to one or more vendors of a particular entity. For example, a vendor list page 3010 illustrated in FIG. 30 presents a listing of vendors and associated vendor attributes (e.g., vendor name, service products provided by each respective vendor, vendor score (which may, for example, indicate a privacy rating and/or security rating for the vendor), criticality of each respective vendor to the particular entity, associated business unit for each respective vendor (e.g., that the entity does direct business with), privacy impact assessment status for each respective vendor, status of each respective vendor with respect to the entity, etc.). The vendor list page 3010 may be represented in a graphical user interface, or in any other suitable format.

At least partially in response to an occurrence and/or detection of an incident, the system may generate and/or present an incident alert 3020 on the vendor list page 3010. Incident alert 3020 may include a summary and/or brief description of the incident and may be, or include, a user-selectable object that instructs the system to generate an incident detail page, such as incident detail page 3110 of FIG. 31.

Figure 31:
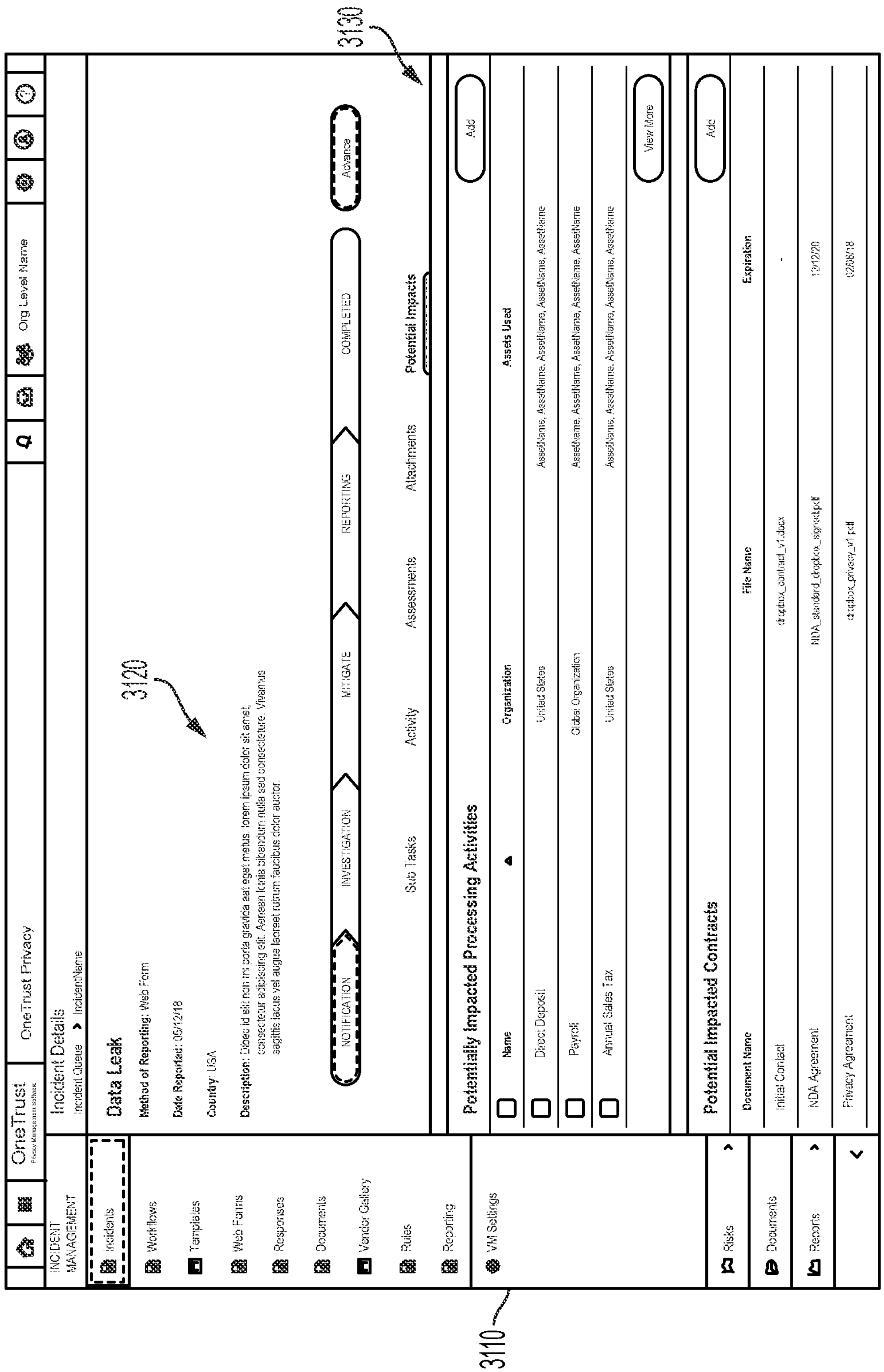
FIG. 31 is an example of a GUI showing incident details.

Turning now to FIG. 31, at least partially in response to an occurrence and/or detection, by the system, of an incident and/or in response to selection of a control requesting incident details, the system may generate a page presenting the details of a security-related incident, such as incident detail page 3110. The incident detail page 3110 may be represented in a graphical user interface, such as a webpage.

The incident detail page 3110 may include various attributes 3120 of a security-related incident. For example, as may be understood from FIG. 31, incident detail page 3110 may display: (1) the method used to report the incident; (2) a date that the incident was reported (e.g., May 12, 2018); (3) a geographical location of occurrence of the incident (e.g., USA); and/or (4) a description of the incident. Additional information may also be presented, such as potentially impacted processing activities and/or contracts 3130 (e.g., processing activities and/or contracts that may be affected by the particular incident). The system may receive additional information, such as the potentially impacted processing activities and/or contracts 3130, when receiving information about the incident and/or the system may determine such additional information based on information received about the incident and/or one or more attributes of the incident (e.g., attributes 3120) and/or the system's analysis of such information and/or attributes.

As noted herein, at least partially in response to receiving and/or analyzing incident information and/or one or more attributes of the incident, the system may determine one or more vendors associated with the incident and/or the notification obligations for each such vendor.

Figure 32:
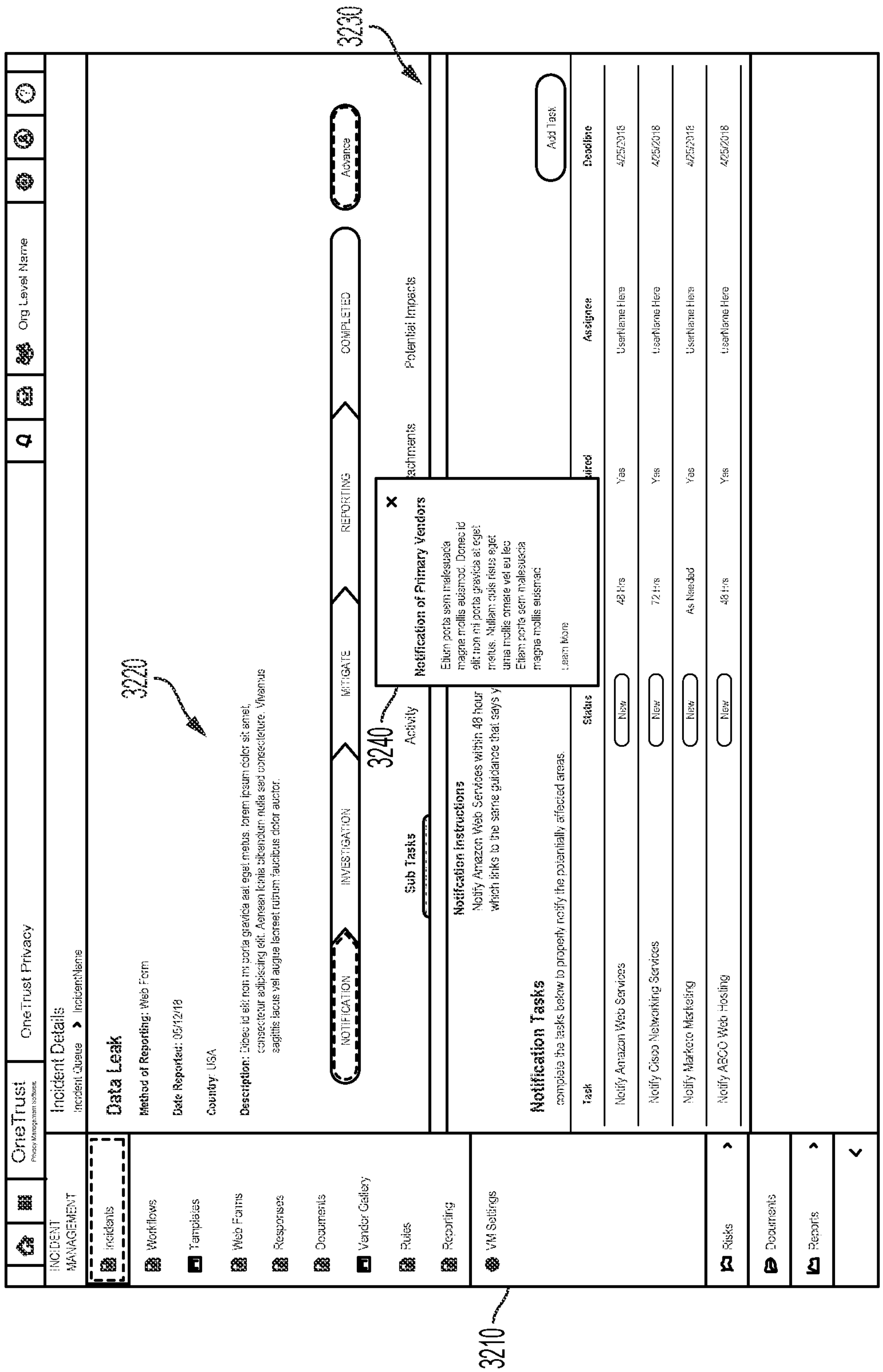
FIG. 32 is another example of a GUI showing incident details.

Turning now to FIG. 32, the system may generate a page presenting the details of a security-related incident and associated vendor notification tasks, such as incident detail page 3210. The incident detail page 3210 may be presented in a graphical user interface. Similar to the incident detail page 3110, the incident detail page 3210 may include various attributes 3220 of security-related incident. For example, as seen on the incident detail page 3210, a method of reporting the incident may be presented (e.g., web form), as well as a date reported (e.g., May 12, 2018), a geographical location of occurrence of the incident (e.g., USA), and a description of the incident.

The system may also include, on incident detail page 3210, a listing of tasks 3230 to be performed to satisfy one or more of the entity's incident notification obligations to the vendor. As noted herein, the system may determine one or more affected vendors and associated obligations, and any information associated therewith, by analyzing one or more vendor contracts and/or one or more attributes of the incident. The listing of tasks 3230 may include a title for each respective task (e.g., "Notify Amazon Web Services"), a status for each respective task (e.g., "New"), a timeframe for completion of each respective task (e.g., "48 Hrs"), whether each respective task is required (e.g., "Yes"), a user to whom each respective task is assigned (e.g., "UserName Here"), and/or a deadline for completion of each respective task (e.g., "Apr. 25, 2018").

One or more sections of each task listing presented in listing of tasks 3230 may be user selectable. At least partially in response to activating (e.g., "hovering" or moving a cursor onto) such a section, the system may generate a pop-up window 3240 providing a brief description of the task to be performed. In response to clicking on, or otherwise selecting, a task from the listing of tasks 3230, the system may generate a task details page, such as the task detail page 3310 of FIG. 33.

Figure 33:
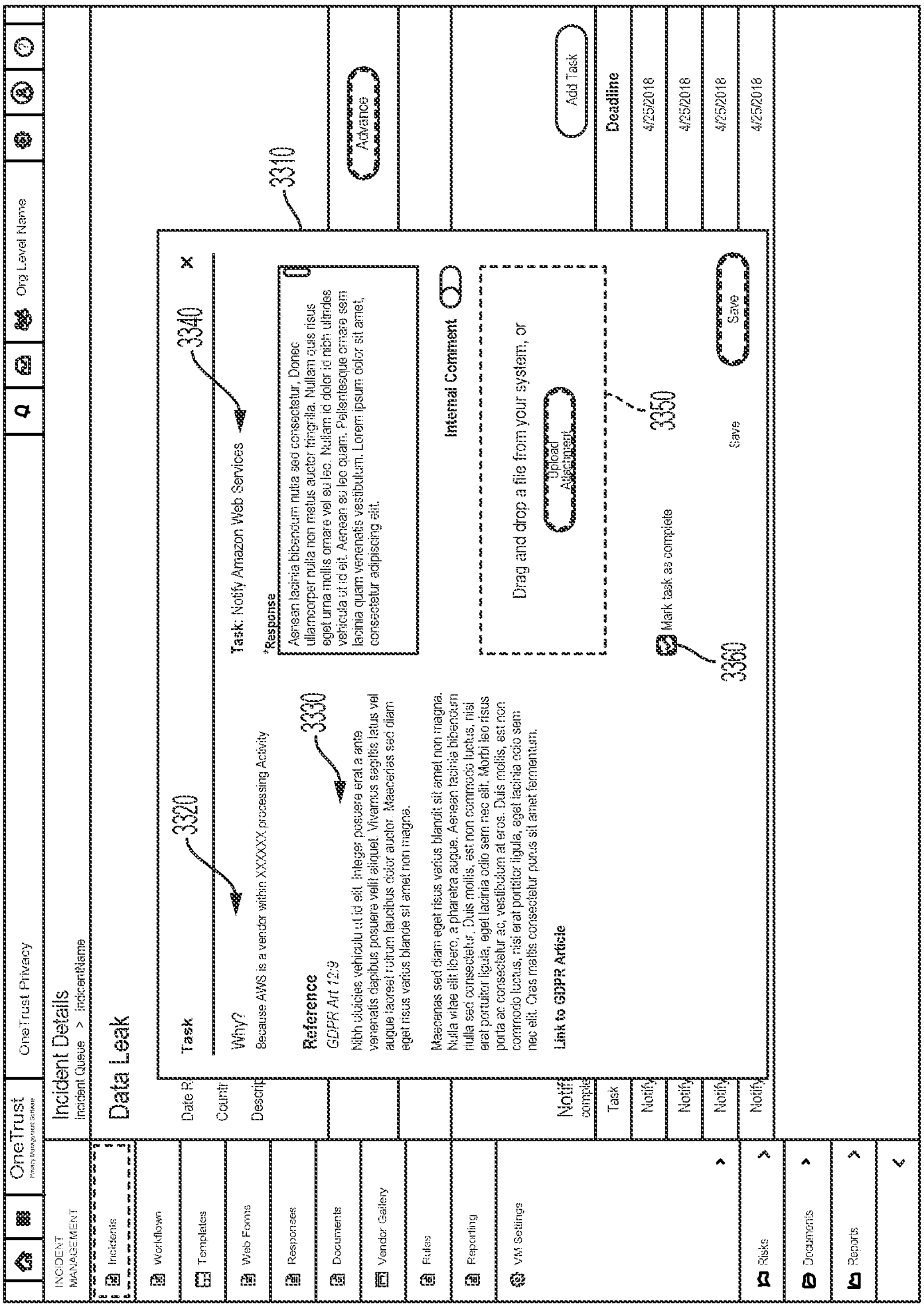
FIG. 33 is an example of a GUI showing a vendor-related task.

Turning now to FIG. 33, the system may generate a page presenting the details of a vendor notification task, such as task detail page 3310. The task detail page 3310 may include a reason section 3320 that may provide a brief explanation for why this vendor incident notification task should be performed. A detailed explanation section 3330 may provide additional information, such as one or more excerpts from the applicable contract, agreement, regulation, law, etc. A task information section 3340 may list the task to be performed and any responses that may have been received to the task received (e.g., from the vendor, from those asked to perform the task, etc.). A user may provide any additional information associated with the task by uploading one or more files to the system in upload section 3350. For example, the communication (e.g., email, letter, documentation of a phone call) used to satisfy the task may be uploaded or otherwise recorded here. Upon completion of the task, the task may be marked as complete by a user at completion control 3360. Any other changes to the task, such as status change, indication of actions taken, partial completion of the task, changes made to the task details, etc., may be saved by the user (e.g., via task detail page 3310). The system may store any such task details and changes, including an indication of satisfaction of a vendor incident notification task, in a suitable database or elsewhere.

Figure 34:
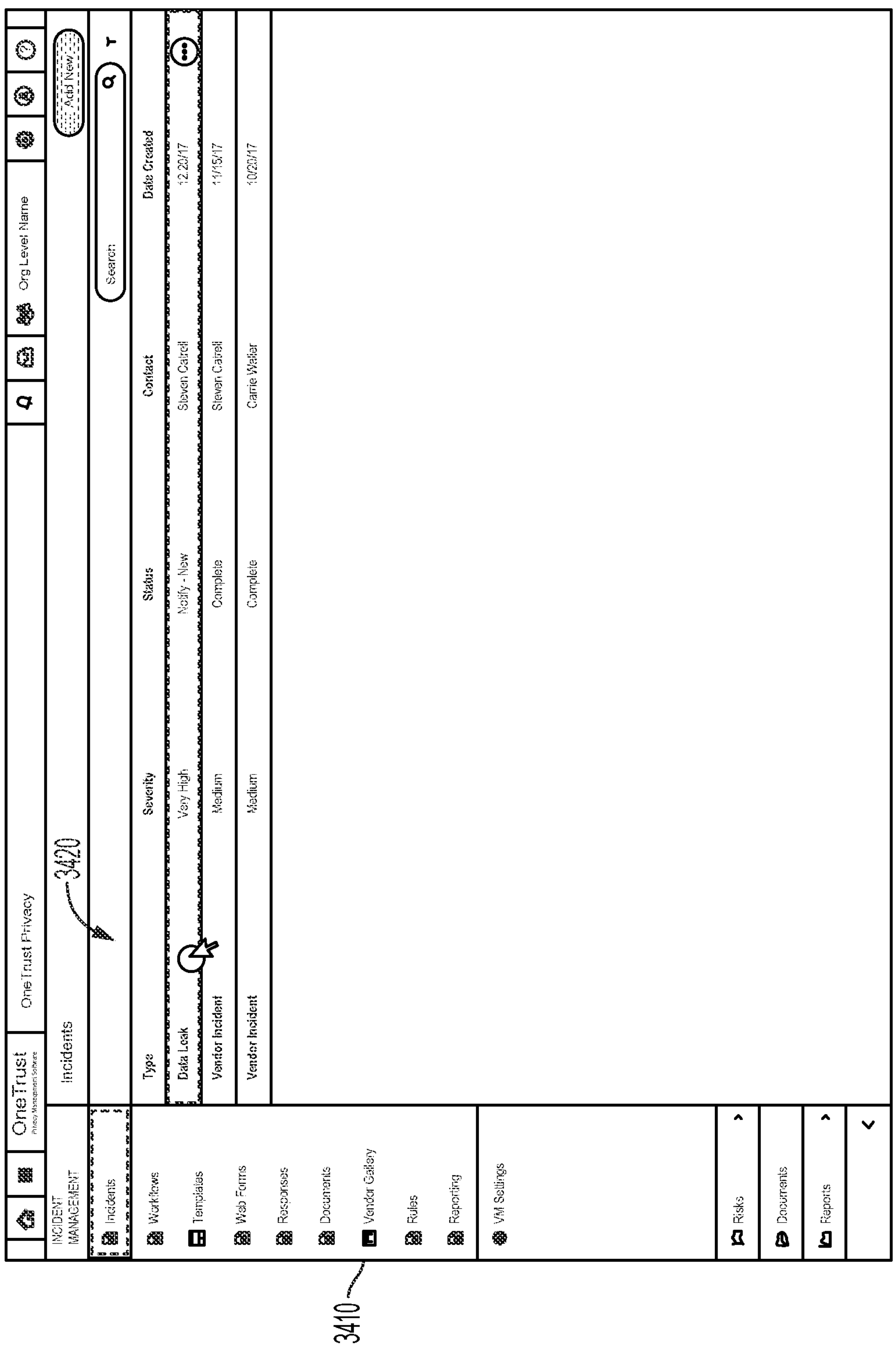
FIG. 34 is an example of a GUI showing a listing of vendor-related tasks.

The system may provide a summary of incidents that includes one or more incidents associated with one or more vendors for ease of evaluation. Turning now to FIG. 34, the system may generate a page, such as incident summary page 3410, presenting a listing of incident-related tasks, including vendor notification tasks. The incident summary page 3410 may include an incident summary listing 3420 that may include a listing of tasks (e.g., to be performed, in progress, and/or completed). The incident summary listing 3420 may indicate a type of each respective task (e.g., "Data Leak", "Vendor Incident"), a severity of each respective task (e.g., "Very High", "Medium"), a status of each respective task (e.g., "Notify—New", "Complete"), a contact person for each respective task (e.g., "Steve", "Carrie"), and a date of creation of each respective task (e.g., "Dec. 20, 2017", Nov. 15, 2017", "Oct. 20, 2017").

Exemplary Vendor Risk Scanning and Scoring Experience

FIGS. 35-46 depict exemplary screen displays that a user may encounter when utilizing any suitable system described herein to view and/or determine a vendor's compliance, privacy, and/or security scoring and/or other attributes. These exemplary screen displays may also, or instead, be encountered by a user when onboarding a new vendor on behalf of an entity utilizing any suitable system described herein. For example, these exemplary screen displays may be encountered by a user associated with an entity in evaluating a vendor according to the disclosed embodiments. These exemplary screen displays may also, or instead, be encountered by a vendor in completing an evaluation requested by an entity, as part of one or more processing activities.

Figure 35:
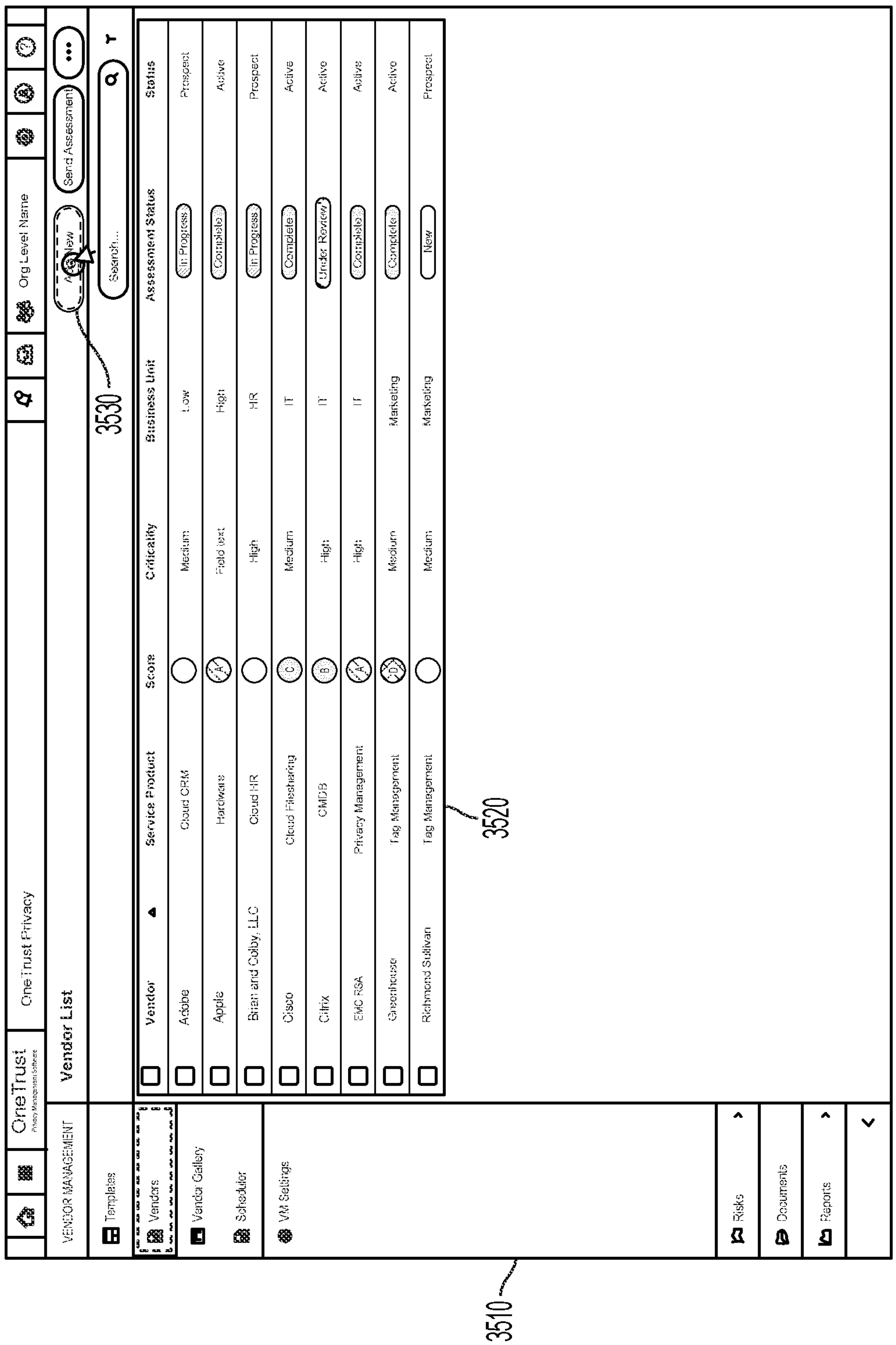
FIG. 35 is another example of a GUI showing a listing of vendors.
Figure 36:
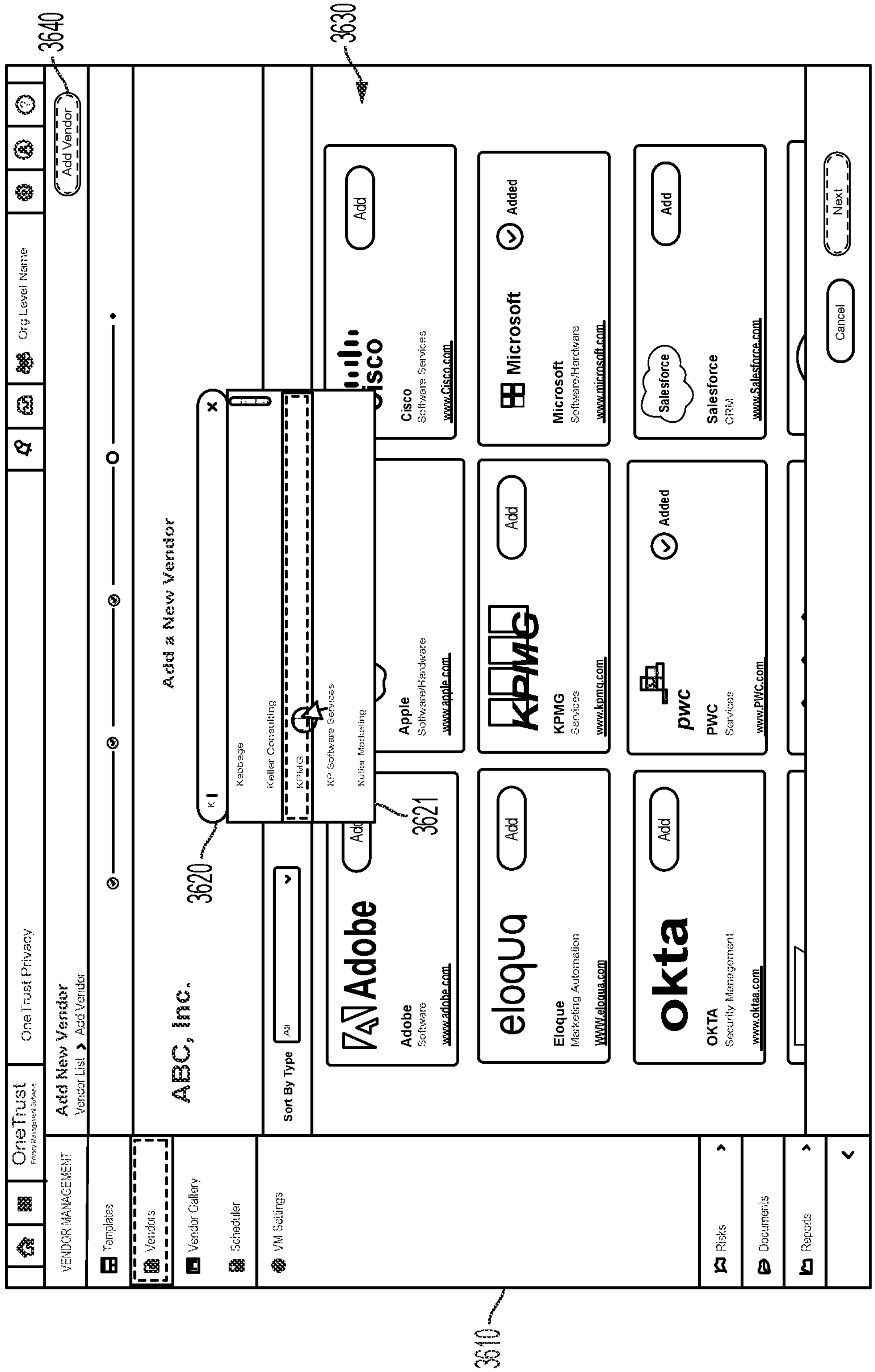
FIG. 36 is another example of a GUI showing a listing of vendors.

FIG. 35 depicts the exemplary listing 3520 of one or more vendors in a database as represented in the exemplary interface 3510. The listing 3520 may include one or more vendors with which an entity is already engaging in one or more contracts. Each item listed in the listing 3520 may include vendor information, which may include: (1) the vendor's name; (2) a product provided by the vendor; (3) a risk score for the vendor or the vendor's product(s); (4) a criticality rating for the vendor (or vendor's product); (5) a business unit for which the vendor provides services; (6) an privacy impact assessment status for the vendor (or vendor's product) (e.g., does the entity have a current privacy impact assessment for the vendor); and (7) a current status of the vendor. Some portion of the listing for each vendor shown in the listing 3520 may be a user-selectable control (e.g., a user-selectable indicia, a webpage control, etc.) that, when selected and/or otherwise activated, presents the user with additional vendor information as described herein.

The exemplary interface 3510 may also include a user-selectable control 3530 for adding a new vendor to the database of vendor information. In response to the user selecting the control 3530, the system may be configured to generate the interface 3610 shown in FIG. 36 which may facilitate the creation of a new database entry for the new vendor. The system may access a prepopulated database of potential vendor information and use such information to provide a listing of one or more potential vendors 3630 from which a user may select a vendor. The system may also allow a user of the interface 3610 to search for a particular vendor from among those available in a database of potential vendor using a search field 3620. In some examples, the system may populate a drop-down box 3621 based on the user's input to the search field 3620, allowing the user to select a vendor from the drop-down box 3621. Should the user not locate the desired vendor from the listing of vendors provided by the interface 3610, the user may select the control 3640 to add a new vendor without using prepopulated information.

Figure 37:
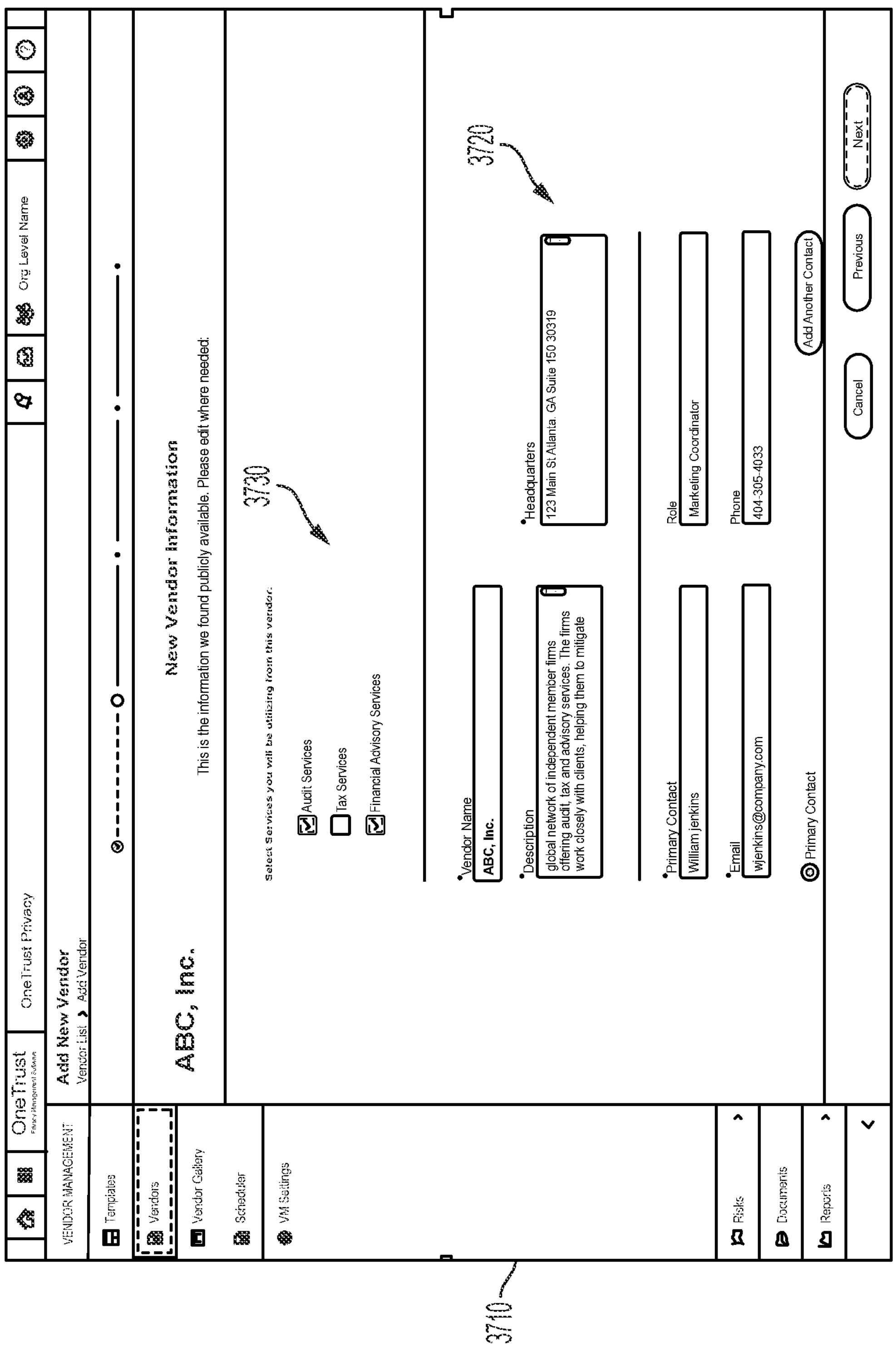
FIG. 37 is an example of a GUI allowing entry of vendor information.
Figure 38:
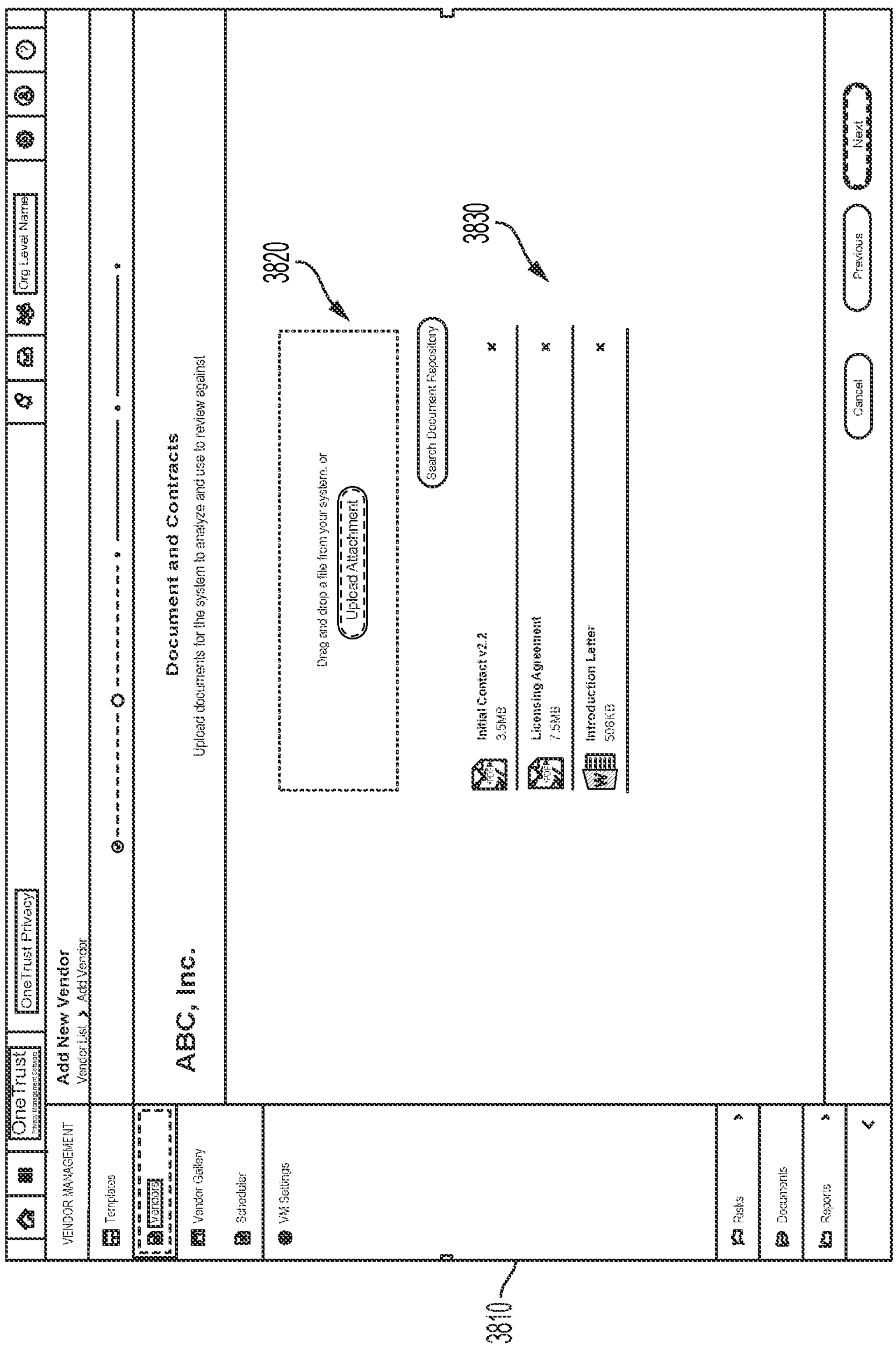
FIG. 38 is an example of a GUI showing a listing of vendor-related documents and allowing the addition of vendor-related documents.

Upon selection of a vendor from the prepopulated listing on the interface 3610 or selection of the control 3640 to add a new vendor without using predetermined information, the system may generate an exemplary interface 3710 of FIG. 37. Where the user has selected a particular vendor as the vendor to be added to a database of vendor information (e.g., by selecting a vendor on the interface 3610 of FIG. 36), the system may prepopulate some or all of the field and information shown in the interface 3710. Where the user has chosen to add a new vendor without using predetermined information, some or all of the field and information shown in the interface 3710 may be left blank.

The fields available in the interface 3710 may include the vendor information fields 3720 (e.g., in the example of FIG. 37, for ABC, Inc., an audit and financial advisory firm). The vendor information fields 3720 may include respective fields for: (1) a vendor name; (2) a vendor description; (3) one or more vendor addresses or locations (e.g., a vendor headquarters address, a location within which the vendor operates, a jurisdiction to which the vendor is subject, etc.); (4) one or more vendor contacts; (5) contact information for the one or more vendor contacts; (6) respective roles and/or responsibilities of the one or more vendor contacts; and/or (7) any other suitable vendor information. Some or all of the vendor information fields 3720 may be prepopulated based on known vendor information (e.g., in response to a user selecting a vendor on the interface 3610 of FIG. 36). The fields available in the interface 3710 may include a services field 3730 that may allow a user to select or view one or more of the services, products, software, offerings, etc. that the vendor may provide to the entity. The user may select and/or deselect such services as appropriate. Some or all of the services shown in the services field 3730 may be preselected and/or prepopulated based on known vendor services information (e.g., in response to a user selecting a vendor on the interface 3610 of FIG. 36). The system may be configured to enable a user to update any information (e.g., that may be incorrect or non-current) that may have been prepopulated.

Upon entry or receipt of vendor information (e.g., as described in regard to FIG. 37), the system may be configured to enable a user to upload one or more documents associated with the vendor (e.g., one or more licenses, agreements, contracts, etc. that an entity may be entering into and/or engaged in with the vendor). To facilitate this document uploading, the system may generate an interface such as the exemplary interface 3810 shown in FIG. 38. The interface 3810 may be configured to receive one or more documents for uploading and analysis, for example using the upload field 3820. The interface 3810 may also display a listing 3830 of documents that have already been uploaded for this particular vendor. Such a listing may be prepopulated based on an earlier selection of the particular vendor (as described in regard to FIG. 36) and/or may reflect documents already uploaded using the interface 3810.

Upon receipt of one or more documents associated with the vendor, the system may be configured to analyze such one or more documents using any suitable analysis technique (e.g., natural language processing) to identify key language and/or terms in the documents. The system may, for example, be automatically configured to identify, from such documents, one or more of: (1) term limits; (2) breach notification timeline obligations; (3) sub-processor change notifications; (4) liability caps and/or obligations; (5) data breach liability information; (6) indemnification information; (7) data transfer mechanisms; (8) notification time periods for a breach; (9) notification requirements for sub-processor changes; and/or (10) any other suitable information that may be included in any documents associated with a vendor.

Figure 39:
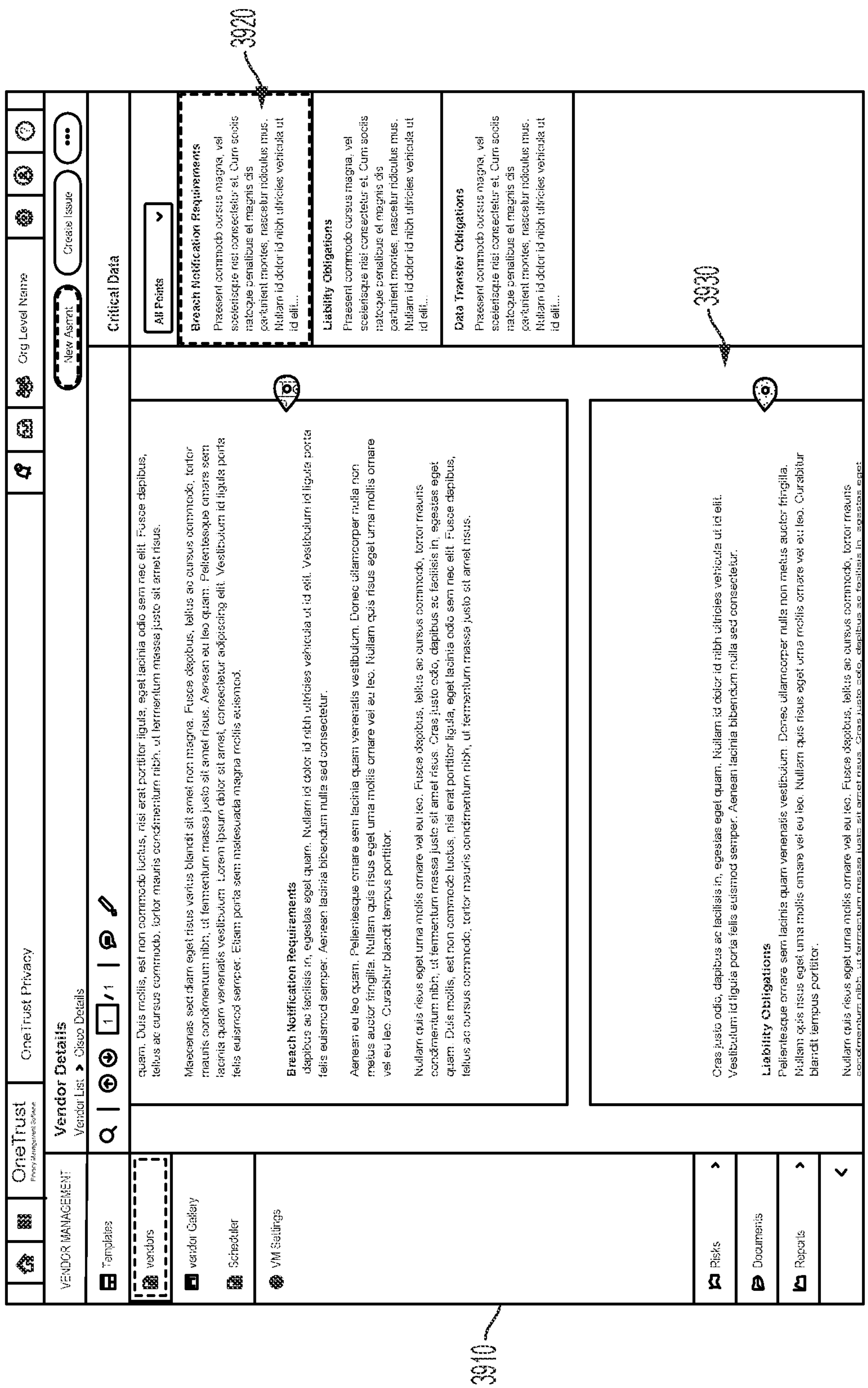
FIG. 39 is an example of a GUI showing details of vendor-related documents.

FIG. 39 depicts the exemplary interface 3910 showing results of such analysis. The system may be configured to indicate one or more particular identified features and/or terms of the documents in the critical data section 3920, which may list such features and/or terms as one or more respective user-selectable controls associated with one or more respective locations in the uploaded document where the particular identified features and/or terms may be found. Upon selection of a control for a particular feature or term, the system may be configured to display the document section from which the particular feature or term was derived in the document display section 3930. For example, as shown in the interface 3910, the system has identified breach notification requirements, liability obligations, and data transfer obligations in the critical data section 3920. When the highlighted breach notification requirements indicia in the critical data section 3920 is selected, the system is configured to display the corresponding text from the document from which such requirements were derived in the document display section 3930.

Figure 40:
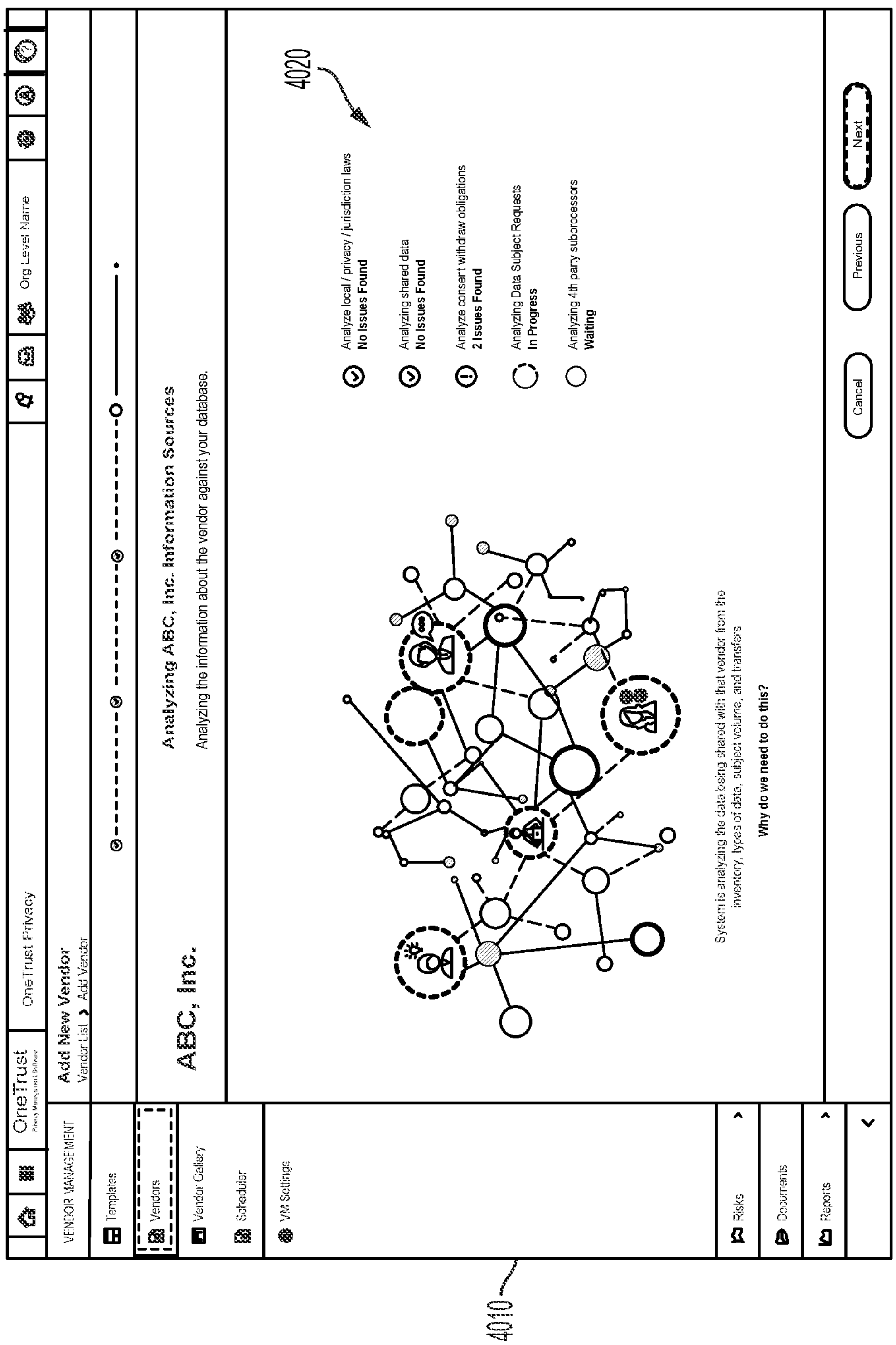
FIG. 40 is an example of a GUI showing the analysis of vendor information.

As described herein, the system may be configured to determine and/or analyze publicly available information sources and/or shared information sources that may have data associated with the vendor. Such information sources may include one or more webpages (e.g., operated by the vendor and/or operated by third parties), databases to which the entity may have access, news sources, governmental bodies, regulatory agencies, industry groups, etc. FIG. 40 depicts the exemplary interface 4010 that may indicate to a user the information sources that are being analyzed in the listing 4020. In this analysis, the system may be configured to use any suitable analysis technique (e.g., natural language processing) to determine the desired vendor-related information. Among the analysis performed by the system, the system may be configured to: (1) analyze one or more local/privacy/jurisdiction laws associated with the vendor; (2) analyze shared data with the vendor; (3) analyze one or more consent withdrawal obligations from one or more vendor documents; (4) analyze one or more data subject requests associated with the vendor; and (5) analyze one or more sub-processors associated with the vendor.

Figure 41:
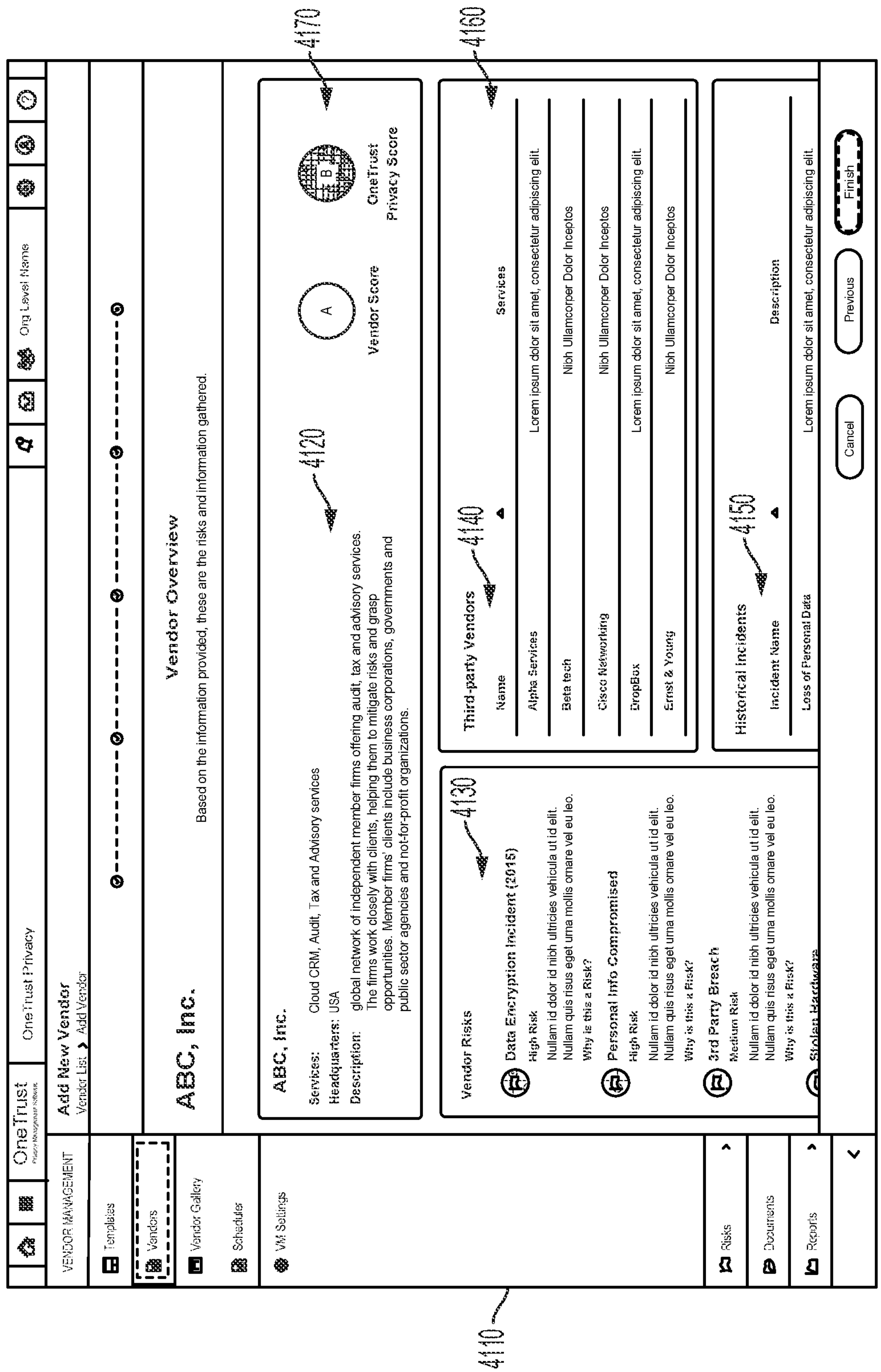
FIG. 41 is an example of a GUI showing an overview of vendor information.

FIG. 41 depicts the exemplary interface 4110 showing a vendor overview. The system may be configured to generate and display the vendor overview interface 4110 based on any vendor information the system has determined, including information determined based on the vendor analyses described herein. The interface 4110 may include a description of the vendor (e.g., "ADB, Inc." in FIG. 41) in the vendor description section 4120 that may include the vendor's name, location, description, etc.

The system may be configured to determine additional information for the vendor based on one or more of: (1) information gathered from the vendor (e.g., assessment responses from the vendor); (2) information about the vendor gathered from public or shared sources (e.g., webpages, databases, etc.); documents associated with the vendor (e.g., contracts, licenses, agreements, etc.); and/or (3) and other vendor information (e.g., known vendor data, historical information about the vendor, etc.). Such additional information may be displayed on the interface 4110.

In various embodiments, as part of additional vendor information, the system may calculate a vendor risk score for the vendor, shown as "Vendor Score" in the vendor score section 4170 of the interface 4110. As described herein, the system may, for example, calculate the vendor risk score based on any factor(s) and/or criteria described herein or that may be suitable (e.g., information transfer, contract terms, assessments performed, etc.). The system may also calculate one or more other scores (e.g., as one or more internal vendor-related scores based on criteria different than that used to determine a vendor risk score) and display such scores in the vendor score section 4170.

In various embodiments, as part of additional vendor information, the system may determine and/or highlight one or more vendor risks (e.g., data encryption incidents, personal information compromises, 3rd party breaches, etc.) and display such risks in the vendor risk section 4130. In various embodiments, as part of additional vendor information, the system may determine and display third-party vendors utilized by the vendor in the third-party vendor section 4140. In various embodiments, as part of additional vendor information, the system may determine and display historical incidents associated with the vendor in the historical incident section 4150. In various embodiments, as part of additional vendor information, the system may determine and display a listing of services provided by the vendor in the services listing 4160. The system may be configured to determine and display any other information relevant to risks associated with the vendor.

Figure 42:
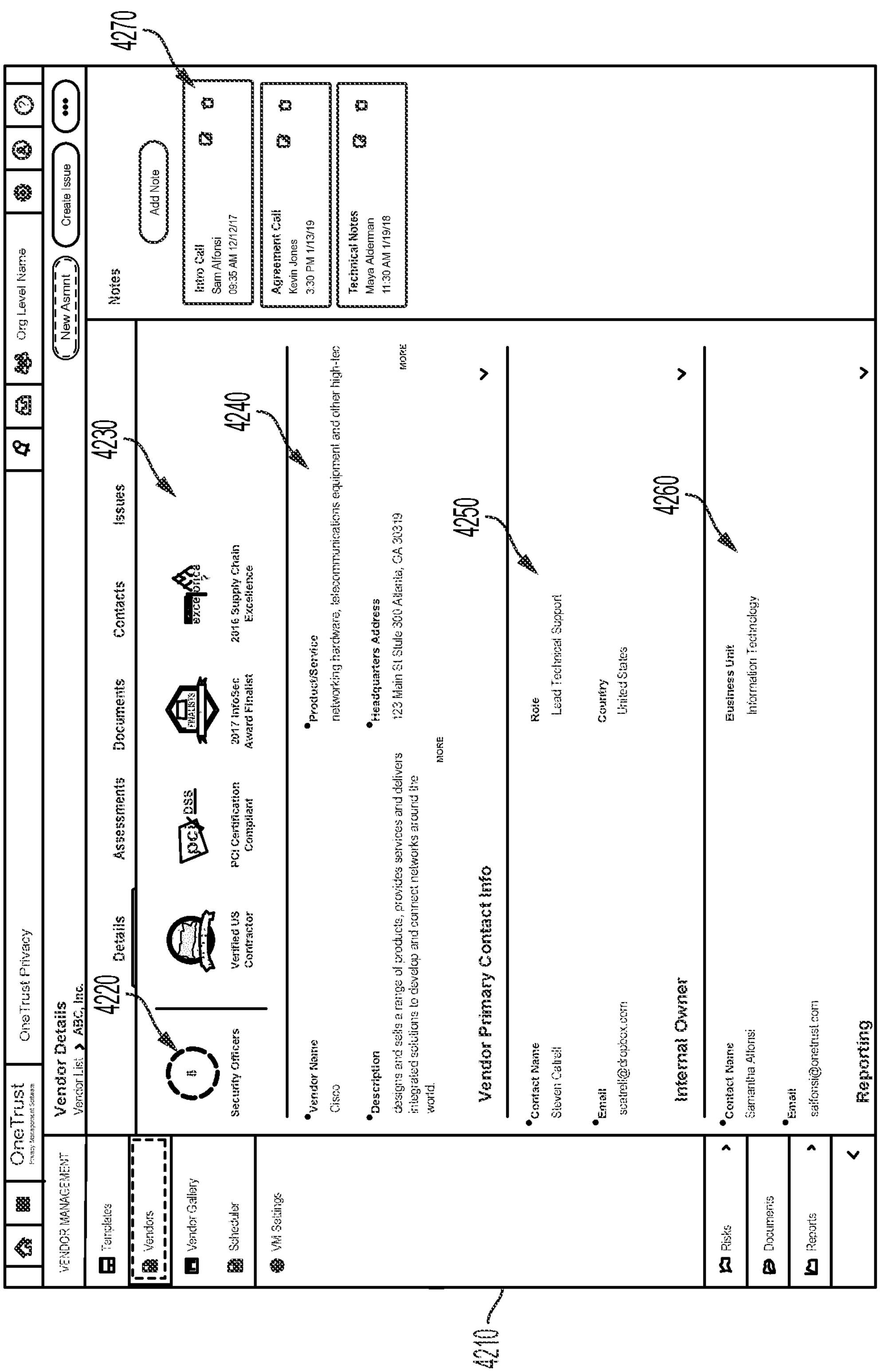
FIG. 42 is an example of a GUI showing vendor information details.

FIG. 42 depicts the exemplary interface 4210 showing vendor details. The system may be configured to generate and display the vendor details interface 4210 based on any vendor information the system has determined, including information determined based on the vendor analyses described herein. The interface 4210 may include any vendor information described herein, including vendor information as shown in the section 4240 of the interface 4210 and/or vendor information such as: (1) a number of security and/or privacy officers (e.g., as shown in the section 4220 of the interface 4210); (2) one or more certifications, verifications, and/or awards obtained by the vendor (e.g., as shown in the section 4230 of the interface 4210); (3) one or more vendor contacts and their respective roles at the vendor organization (e.g., as shown in the section 4250 of the interface 4210); (4) entity personnel responsible for interacting with the vendor and their respective roles at the entity organization (e.g., as shown in the section 4260 of the interface 4210); (5) notes regarding interactions with the vendor and related information (e.g., as shown in the section 4270 of the interface 4210); and/or (6) any other information that may be of use in evaluating and interacting with the vendor.

Figure 43:
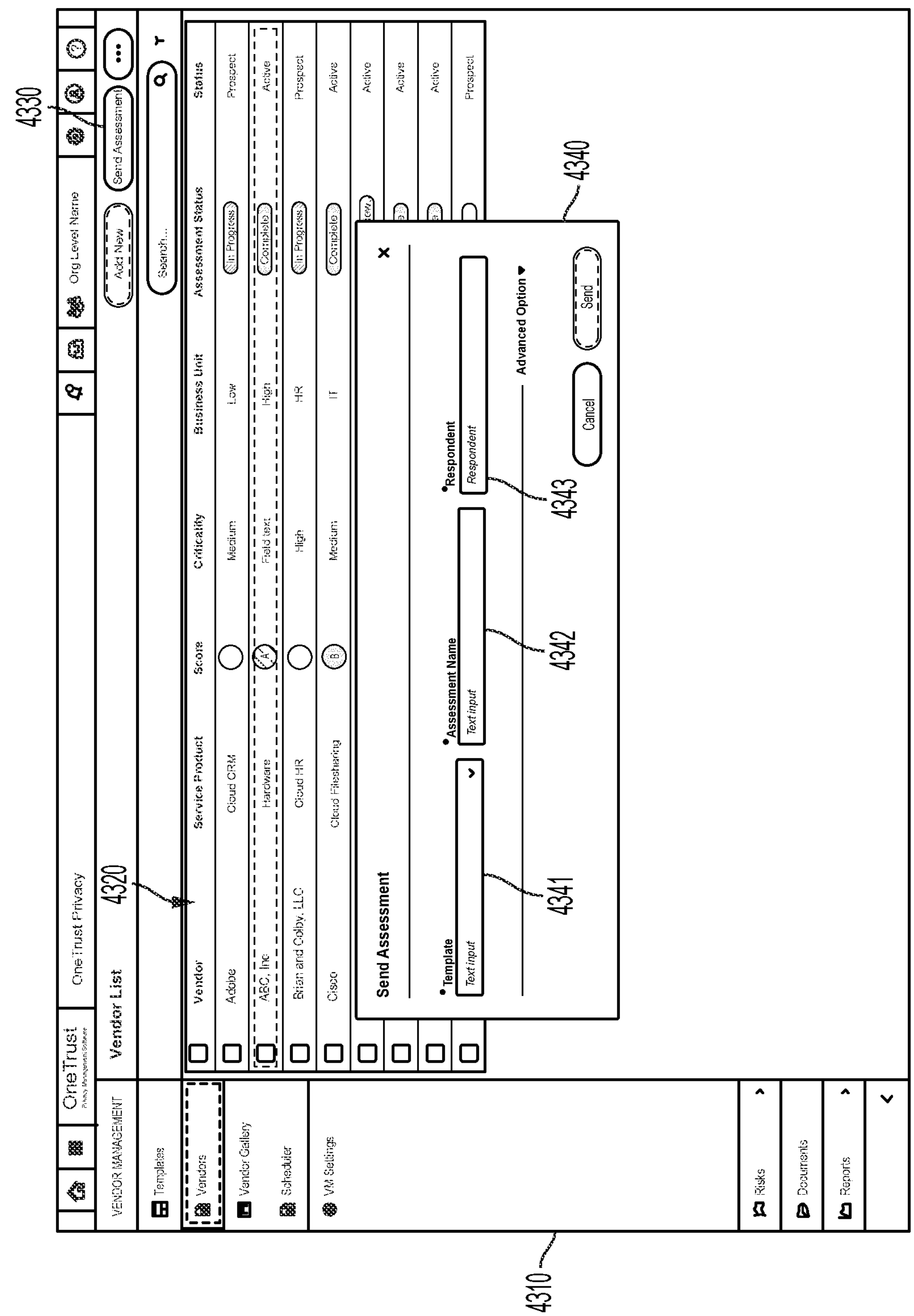
FIG. 43 is an example of a GUI for requesting a vendor assessment.

As described herein, a vendor may complete one or more privacy and/or security-related assessments (e.g., that may include question/answer pairings), the responses to which the system may use in calculating one or more vendor risk scores and/or determining other vendor information. FIG. 43 depicts the exemplary interface 4310 for requesting that an assessment be sent to a vendor. The system may be configured to detect the selection of a vendor from the listing of vendors 4320 and/or the selection of the assessment control 4330. Responsive to such detection, the system may be configured to request desired assessment information, for example using the assessment information window 4340. The assessment information window 4340 may include fields or selections that allow a user to specify a template for the assessment (e.g., as shown in the field 4341), a name for the assessment (e.g., as shown in the field 4342), and a recipient of the assessment, such as a particular vendor employee or representative designated to receive such an assessment (e.g., as shown in the field 4343).

Figure 44:
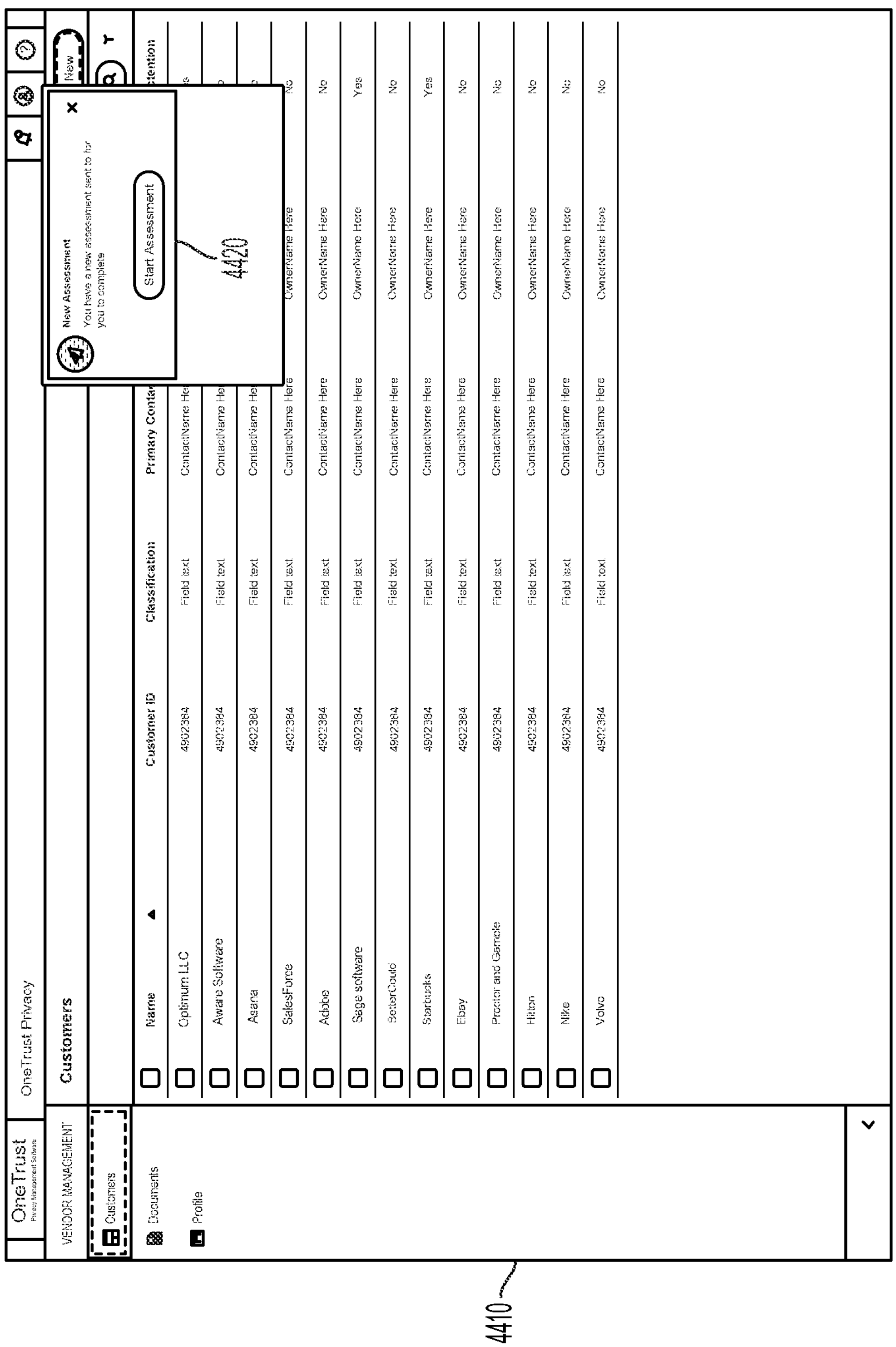
FIG. 44 is an example of a GUI indicating the detection of a vendor assessment.

After completion of an assessment request (e.g., as described in regard to FIG. 43), a designated vendor representative may receive an indication that a new assessment has arrived. FIG. 44 depicts the exemplary interface 4410 that may include a notification 4420 of a new assessment. Note that the system may be configured to generate such an interface in response a user requesting that such an assessment be sent because vendor information queried by the assessment has expired, as described herein. The assessment notification 4420 may include a control that allows the recipient vendor representative to initiate the assessment.

Figure 45:
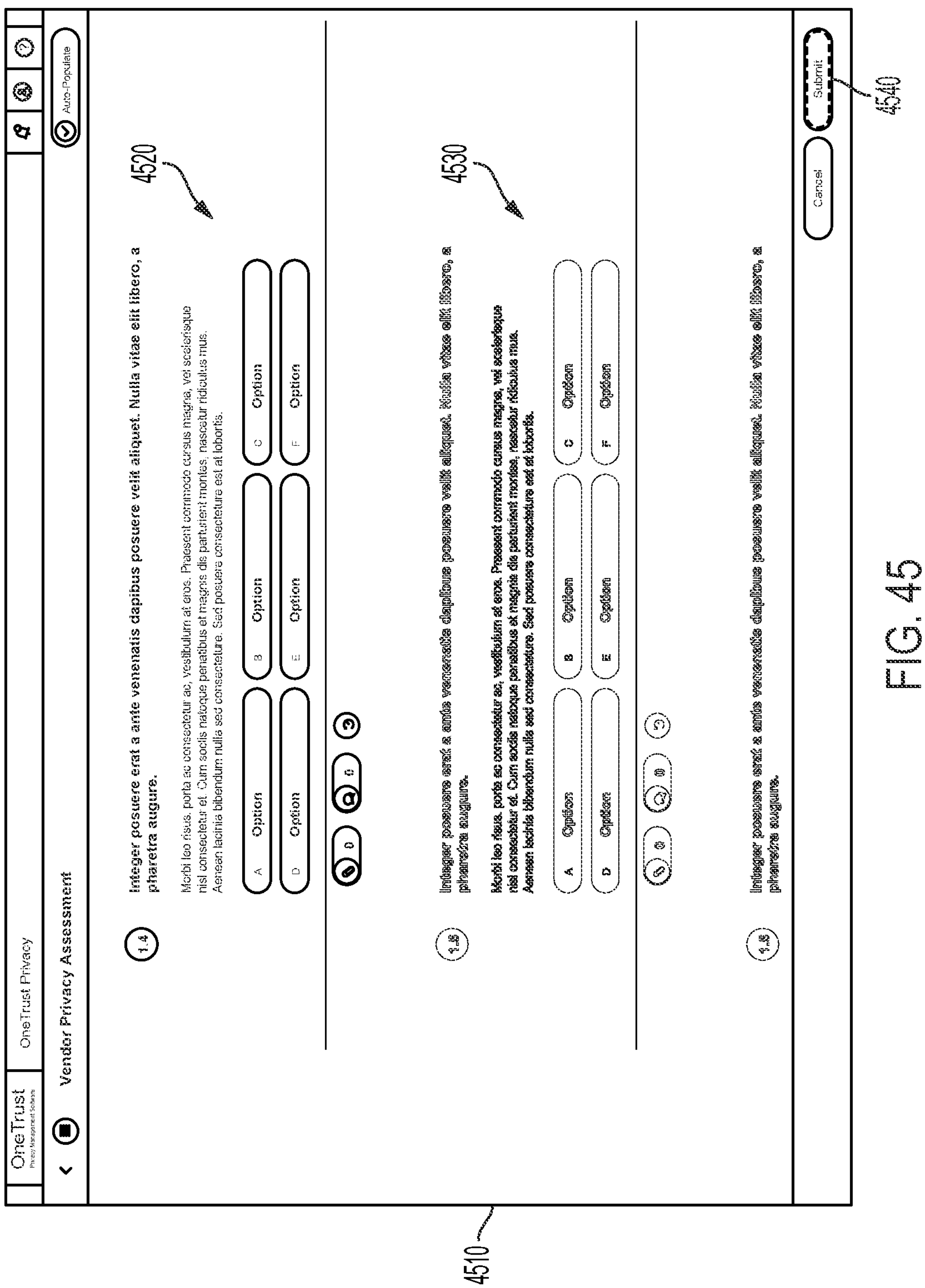
FIG. 45 is an example of a GUI allowing entry of vendor assessment information.
Figure 46:
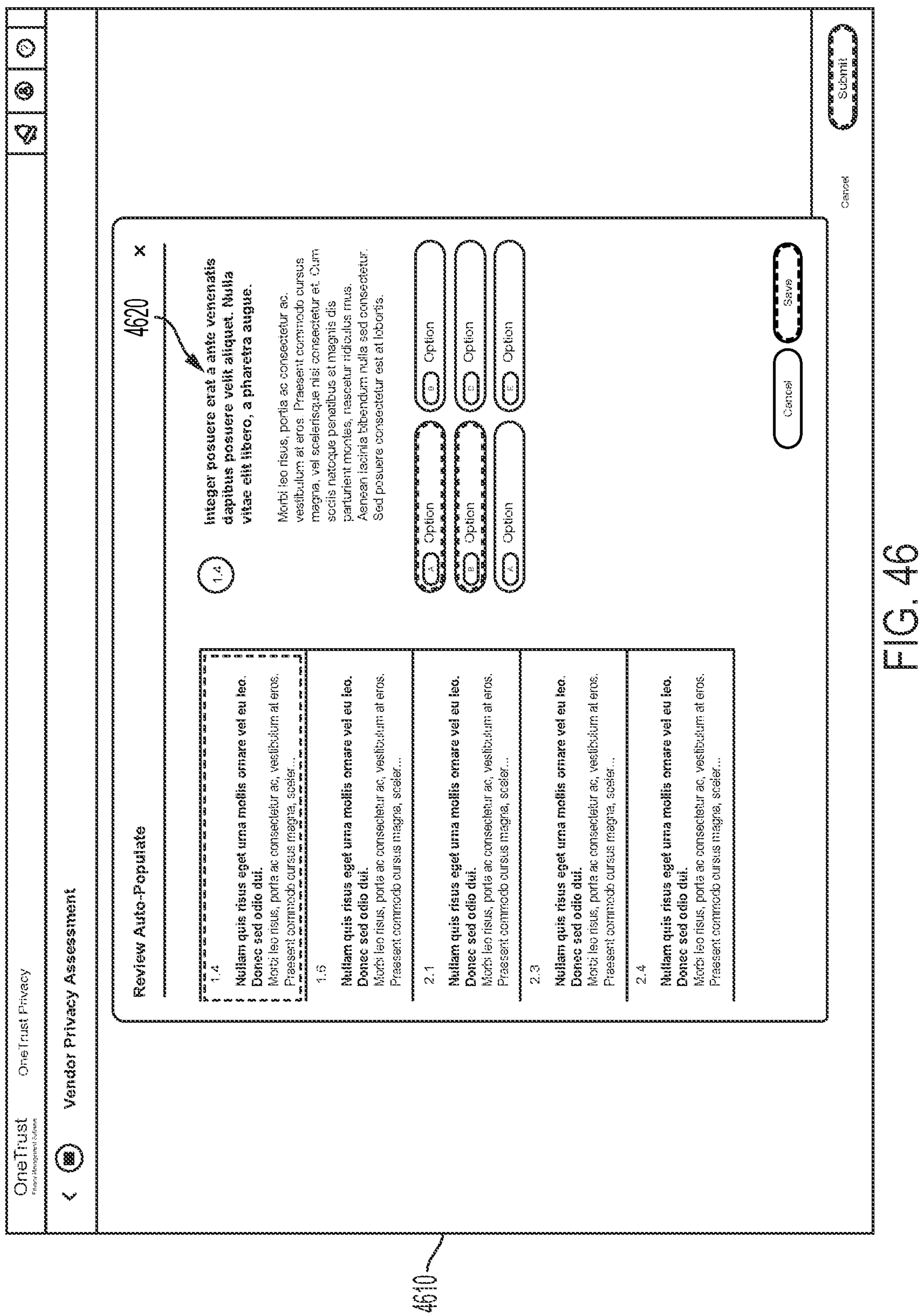
FIG. 46 is another example of a GUI allowing entry of vendor assessment information.

At least partially in response to initiating the assessment, the system may be configured to present the exemplary interface 4510 as shown in FIG. 45 that may request information using, for example, one or more question and answer pairs (e.g., as described herein). For example, the first question and answer section 4520 may be presented to the vendor representative completing the assessment, followed by the second question and answer section 4530 that may, in some examples, not be active until the preceding question and answer section is complete. Upon completing the required one or more question and answer sections of the assessment, the vendor representative may activate the assessment submission control 4540 to submit the completed assessment to the entity requesting the assessment.

In various embodiments, answers to one or more questions within a vendor assessment may be pre-populated based on known and/or previously provided information. This may be especially helpful where a subset of information acquired via an assessment has expired but the remaining information remains valid. In such embodiments, the system may be configured to generate and present an interface that includes prepopulated information, such as the exemplary interface 4610 shown in FIG. 46. In this example, the system may generate a window including the section of prepopulated information 4620 that the vendor representative may then evaluate and update as needed.

The system may be configured to detect a change in a vendor's information and responsively inquire of a user whether the vendor should be sent an updated assessment. In various embodiments, the system may be configured to substantially automatically identify a change in a sub-processor by one or more vendors. The system may, for example, be configured to monitor one or more RSS feeds to identify one or more changes to one or more sub-processors utilized by a particular vendor. In response to identifying that a vendor has changed (e.g., been added or removed) one or more sub-processors, the system may be configured to substantially automatically generate and/or transmit a privacy assessment and/or a security assessment to the vendor based at least in part on the detected change. Alternatively, the system may be configured to prompt a user to send a new assessment.

Figure 47:
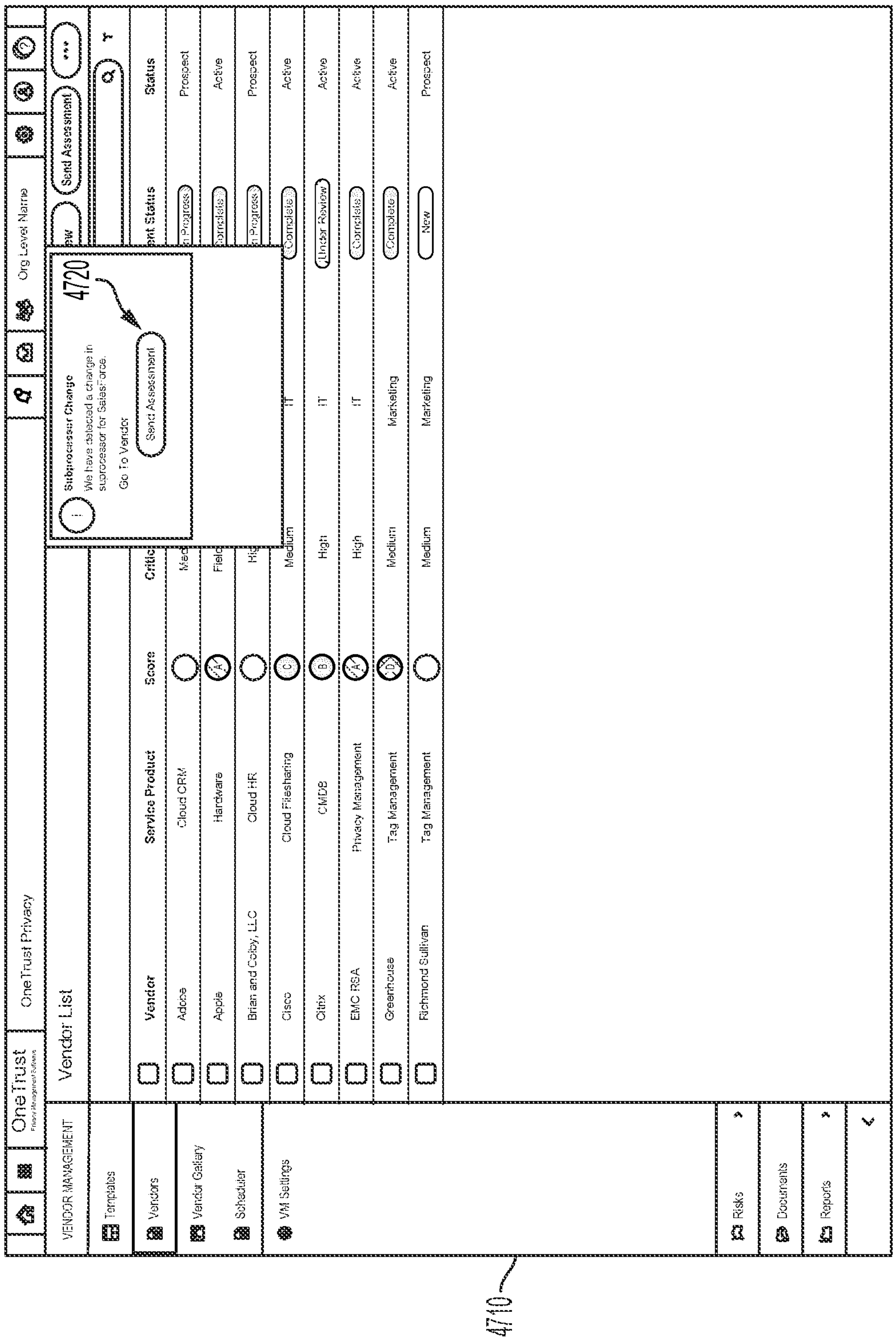
FIG. 47 is an example of a GUI showing a listing of vendors and an indication of a change in vendor information.

FIG. 47 depicts the exemplary interface 4710 that includes the notification 4720 of a detected vendor change. The notification 4720 includes a user-selectable control that may initiate creation and/or transmission of a new vendor assessment (e.g., as described herein). Note that any detected vendor changes may initiate a new vendor assessment and/or generate a prompt to a user inquiring of the need to send a new assessment to the vendor.

Figure 48:
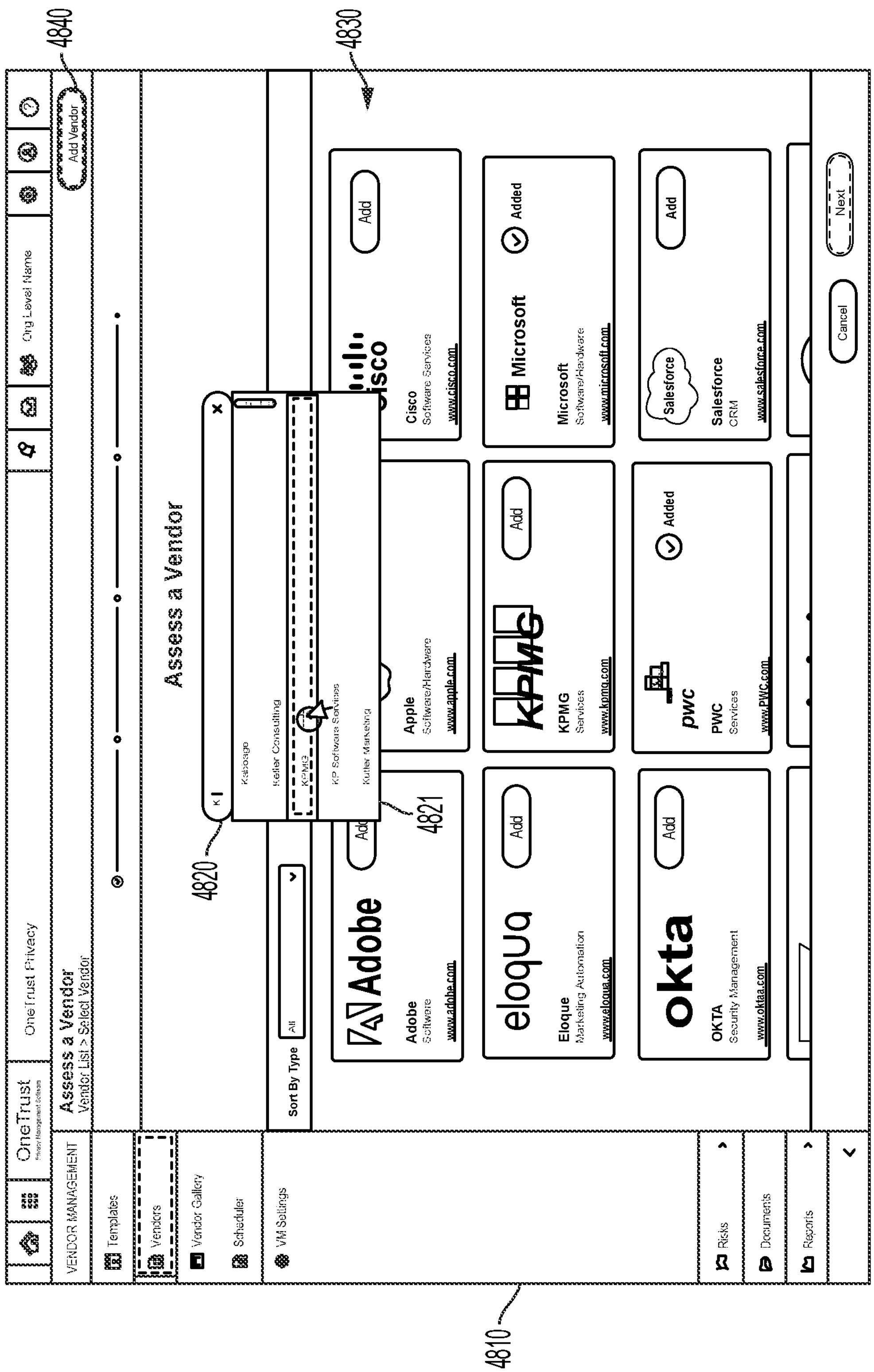
FIG. 48 is another example of a GUI showing a listing of vendors.
Figure 49:
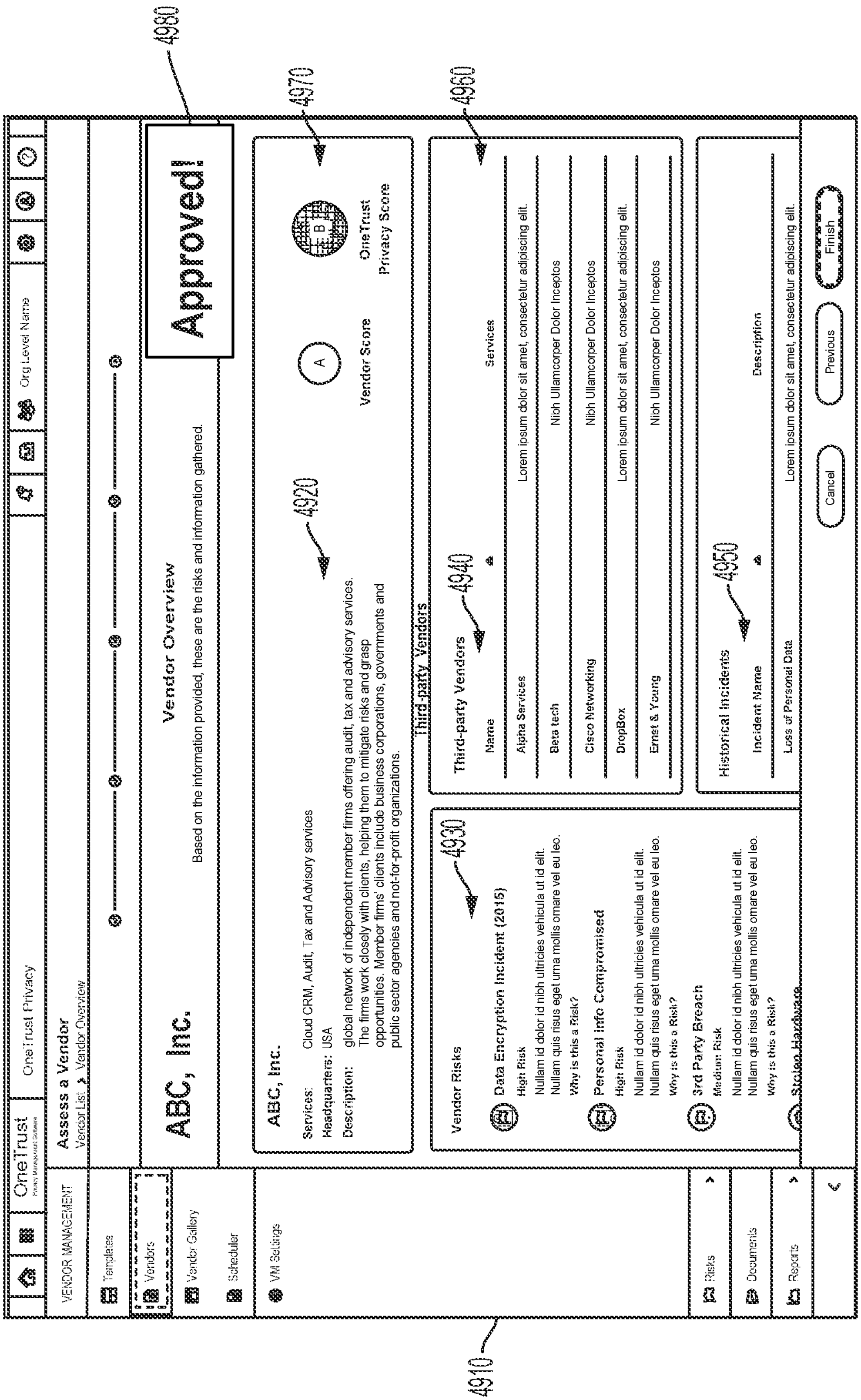
FIG. 49 is another example of a GUI showing an overview of vendor information.
Figure 50:
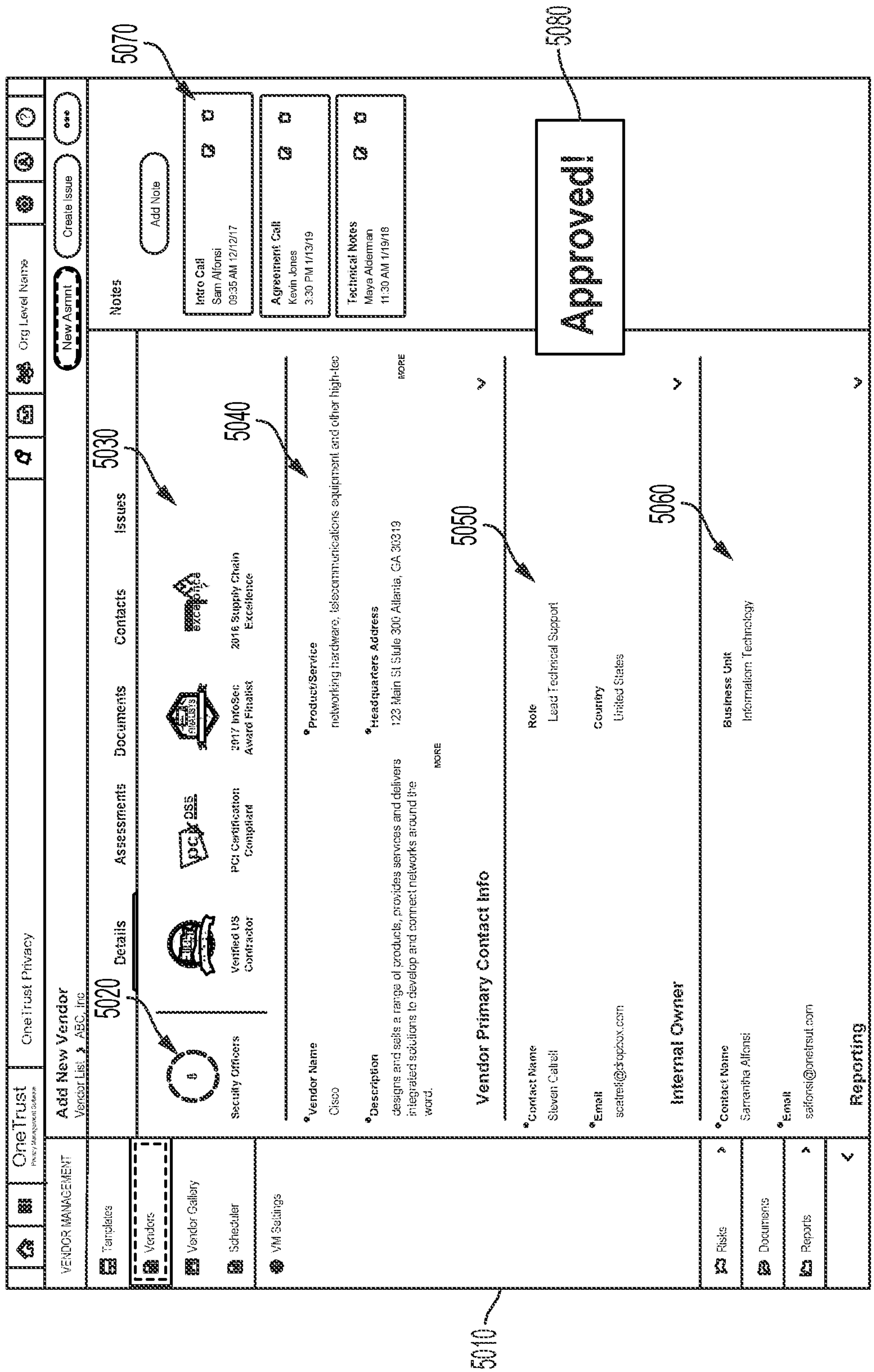
FIG. 50 is another example of a GUI showing vendor information details.

FIGS. 48-50 depict exemplary screen displays that a user may encounter when utilizing any suitable system described herein to determine the risk (e.g., privacy risk, security risk, etc.) that a particular vendor may present, as well as to view other attributes and information about the particular vendor. For example, these exemplary screen displays may be encountered by a user associated with an entity in evaluating a vendor to determine whether to begin or continue a relationship (e.g., business relationship) with such a vendor according to various disclosed embodiments.

FIG. 48 depicts an exemplary listing of vendors 4830 in a database as represented in an exemplary user interface 4810. The system may access a prepopulated database of vendor information and use such information to provide the listing of vendors 4830 from which a user may select a vendor. The system may also allow a user of the interface 4810 to search for a particular vendor from among those available in a database of vendor information using a search field 4820. In some examples, the system may populate a drop-down box 4821 based at least in part on the user's input to the search field 4820, allowing the user to select a vendor from the drop-down box 4821. Should the user not locate the desired vendor from the listing of vendors provided by the interface 4810, the user may select a control 4840 to add, or request to have added, a new vendor to the vendor information database. The user may then take the necessary steps to add or request to add the new vendor.

Upon selection of a particular vendor on interface 4810, the system may generate exemplary interface 4910 as depicted in FIG. 49 on a display screen. The exemplary interface 4910 may show a vendor overview for the particular vendor. The system may be configured to generate and display the vendor overview interface 4910 based at least in part on any vendor information the system has determined, including information determined based at least in part on the vendor analyses described herein. The interface 4910 may include a description of the vendor (e.g., "ABC, Inc." in FIG. 49) in a vendor description section 4920, which may include the vendor's name, location, description, etc.

The system may be configured to determine additional information for the vendor as described herein, including based at least in part on one or more of: (1) information gathered from the vendor (e.g., assessment responses from the vendor); (2) information about the vendor gathered from public and/or shared sources (e.g., webpages, databases, etc.); documents associated with the vendor (e.g., contracts, licenses, agreements, etc.); and/or (3) and other vendor information (e.g., publicly known vendor data, historical information about the vendor, etc.). Such additional information may be displayed on interface 4910.

In various embodiments, as part of the additional vendor information, the system may calculate a vendor risk score (e.g., vendor security risk score, vendor privacy risk score, etc.) for the vendor, shown as "Vendor Score" in a vendor score section 4970 of interface 4910. As described herein, the system may, for example, calculate the vendor risk score based at least in part on any factor or criteria described herein or any other suitable information (e.g., information transfer information, one or more contract terms, assessments previously performed for the vendor, etc.). The system may also calculate one or more other scores of any type (e.g., as one or more internal vendor-related scores based at least in part on criteria that differs from criteria used to determine one or more other vendor risk scores) and display such scores in the vendor score section 4970.

In various embodiments, as part of additional vendor information, the system may determine and/or highlight one or more vendor risks (e.g., data encryption incidents, personal information compromises, third-party breaches, etc.) and display such risks in the vendor risk section 4930. In various embodiments, as part of the additional vendor information, the system may determine and display third-party vendors utilized by the vendor in the third-party vendor section 4940. In various embodiments, as part of the additional vendor information, the system may determine and display one or more historical incidents associated with the vendor in the historical incident section 4950. In various embodiments, as part of the additional vendor information, the system may determine and display a listing of services provided by the vendor in a services listing 4960. The system may be configured to determine and display any other information relevant to one or more privacy risks associated with the vendor. The system may be configured to determine whether, based, for example, on any vendor information described herein, the particular vendor is approved or rejected for use by, and/or interaction with, the entity requesting the assessment of the vendor's risk. Based at least in part on this determination, the system may present an approval indication or a rejection indication in an approval section 4980 of the user interface.

FIG. 50 depicts an exemplary interface 5010 showing vendor details. The system may be configured to generate and display the vendor details interface 5010 in response to a selection, by a user, of a particular vendor on interface 4810 of FIG. 48, for example, as an alternative to displaying interface 4910 of FIG. 49, or in response to a selection, by a user, of a control on interface 4910 of FIG. 49 requesting further vendor details. In various embodiments, the system may generate interface 5010 based at least in part on any vendor information the system has determined, including information determined based at least in part on the vendor analyses described herein. The interface 5010 may include any additional detailed vendor information described herein, including vendor information as shown in the section 5040 of the interface 5010 and/or vendor information such as: (1) a number of security and/or privacy officers associated with the vendor (e.g., as shown in section 5020); (2) one or more certifications, verifications, and/or awards obtained by the vendor (e.g., as shown in section 5030); (3) vendor employees (e.g., employees who serve as contacts with the requesting entity) and their roles at the vendor organization (e.g., as shown in section 5050); (4) entity personnel responsible for interacting with the vendor and their roles at the entity organization (e.g., as shown in section 5060); (5) notes regarding one or more interactions with the vendor and related information (e.g., as shown in section 5070); and (6) any other information that may be of use in evaluating and interacting with the vendor (e.g., as shown in the section 5040). As noted above, in various embodiments, the system may be configured to determine whether, based at least in part on any vendor information described herein, the particular vendor is approved or rejected for use by, and/or for interaction with, the entity requesting the assessment of the vendor's privacy risk. Based at least in part on this determination, the system may present an approval indication or a rejection indication in approval section 5080.

Exemplary Vendor Training Material Generation Experience

Figure 51:
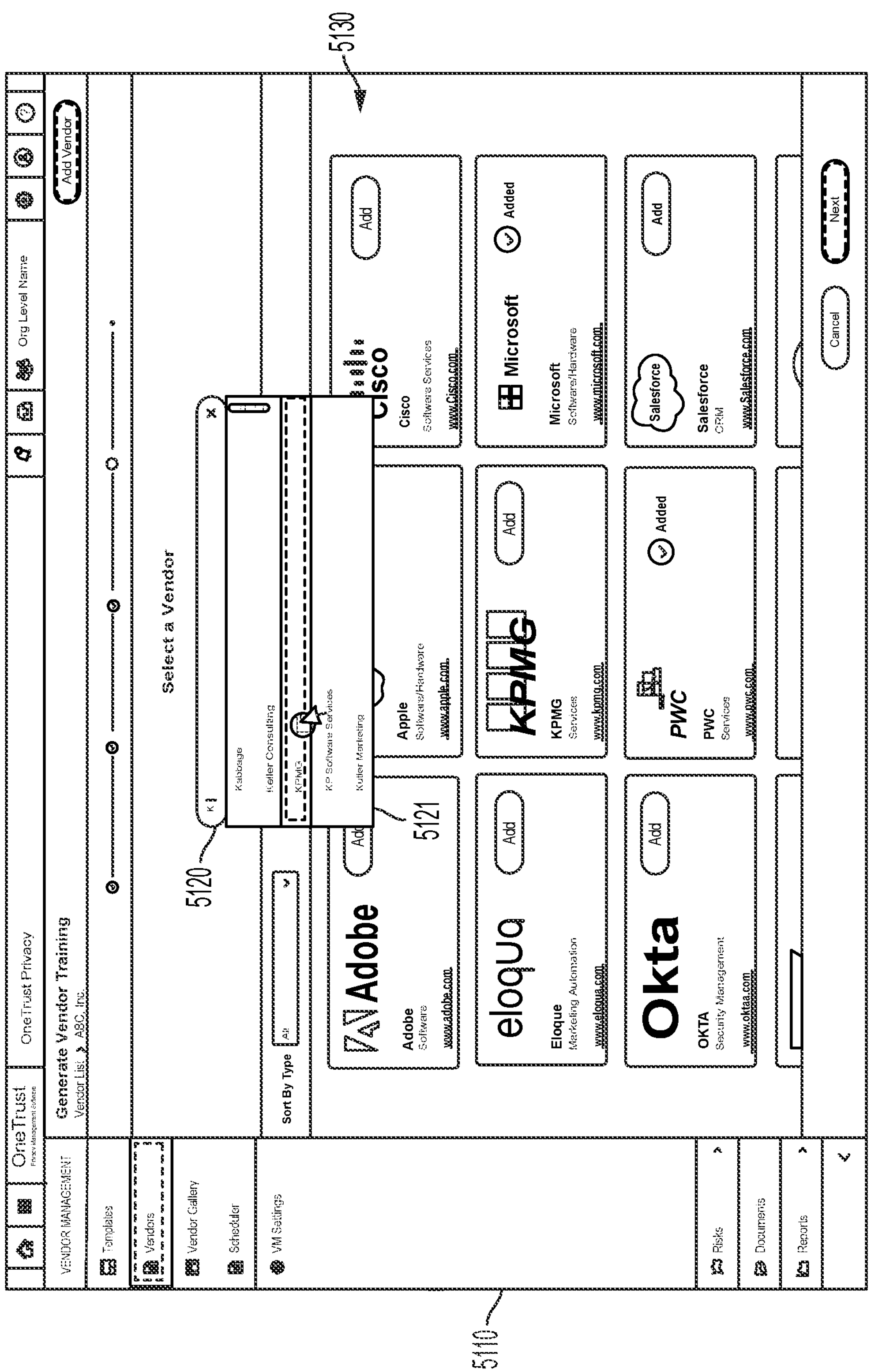
FIG. 51 is another example of a GUI showing a listing of vendors.
Figure 52:
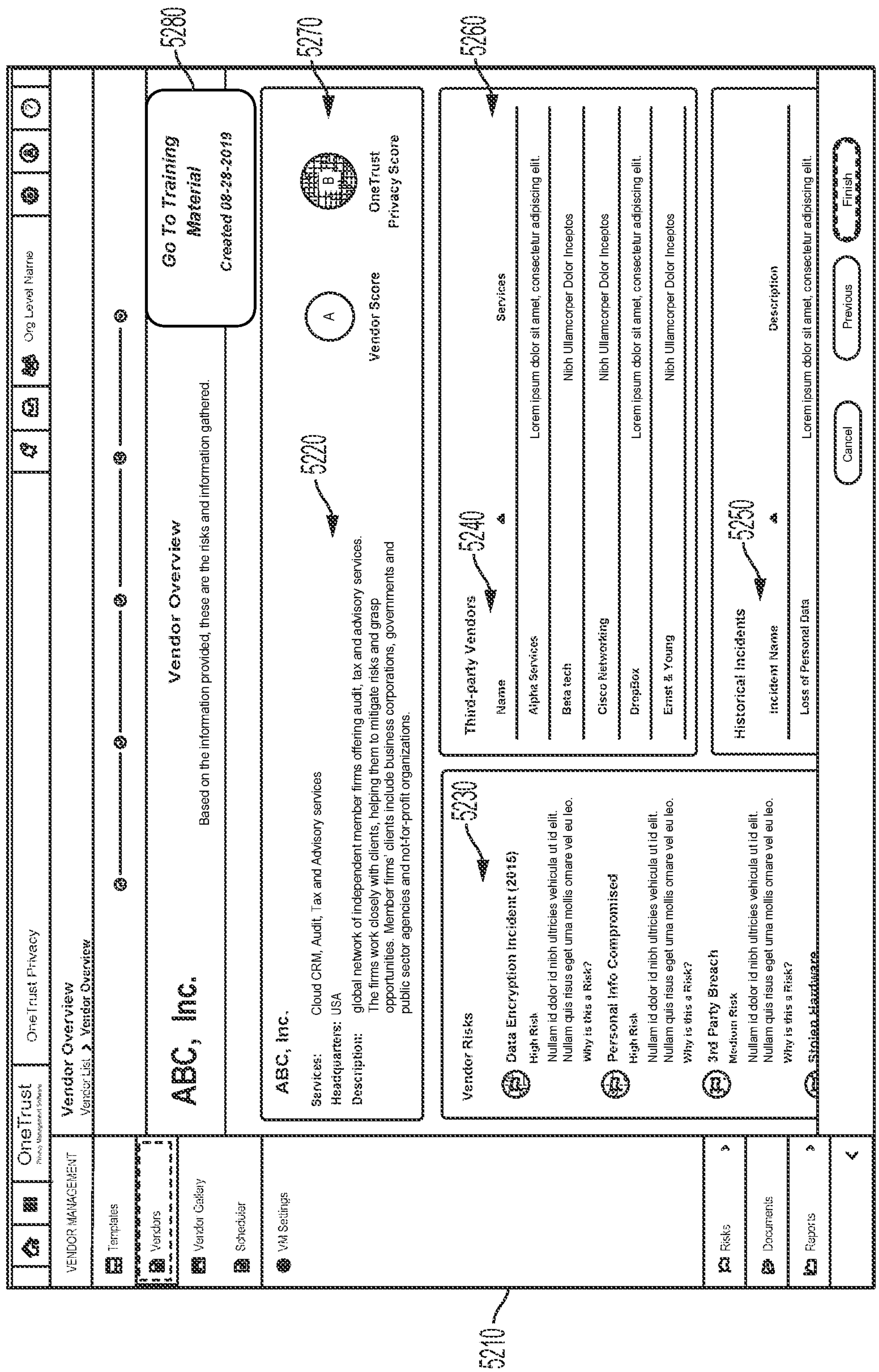
FIG. 52 is another example of a GUI showing an overview of vendor information.
Figure 53:
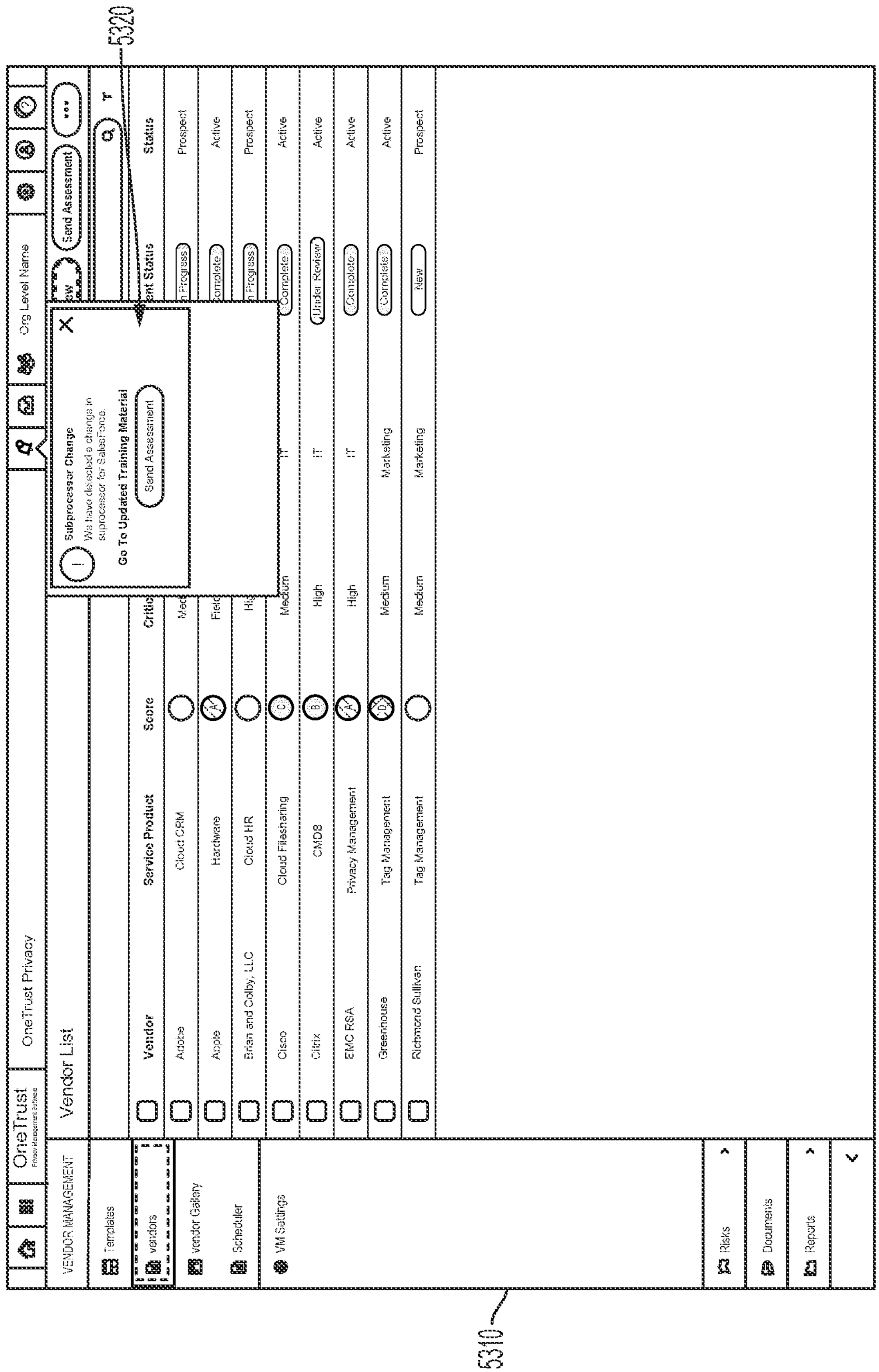
FIG. 53 is another example of a GUI showing a listing of vendors and an indication of a change in vendor information.

FIGS. 51-53 depict exemplary screen displays that a user may encounter when utilizing any suitable system described herein to generate and/or update training material associated with a particular vendor, as well as to view other attributes and/or information about the particular vendor. For example, these exemplary screen displays may be encountered by a user associated with an entity who may be operating the disclosed system to obtain privacy-related training material and/or security-related training material that may assist the user in understanding how to interact with a particular vendor. In another example, these exemplary screen displays may be encountered by a user associated with a vendor who may be operating the disclosed system to obtain privacy-related training material and/or security-related training material provided by an entity with which the vendor interacts.

FIG. 51 depicts the exemplary listing of vendors 5130 in a database as represented in the exemplary interface 5110. The system may access a prepopulated database of vendor information and use such information to provide the listing of vendors 5130 from which a user may select a vendor. The system may also allow a user of the interface 5110 to search for a particular vendor from among those available in a database of vendor information using the search field 5120. In some examples, the system may populate the drop-down box 5121 based at least in part on the user's input to the search field 5120, allowing the user to select a vendor from the drop-down box 5121.

Upon selection of a particular vendor on the interface 5110, the system may generate the exemplary interface 5210 showing a vendor overview for the particular vendor, as depicted in FIG. 52. The interface 5210 may include the user-selectable control 5280 that may indicate that training material has been generated for the particular vendor. The user-selectable control 5280 may allow a user to download or otherwise access (e.g., via a subsequent interface) the training material generated by the system.

In various embodiments, the interface 5210 may also provide a date of generation of such training material (e.g., on or proximate to the user-selectable control 5280). The system may also be configured to generate and/or display the vendor overview interface 5210 based at least in part on any vendor information the system has determined, including information determined based at least in part on the vendor analyses described herein. The interface 5210 may include a description of the vendor (e.g., "ABC, Inc." in FIG. 52) in vendor description section 5220, a "Vendor Score" in vendor score section 5270, one or more vendor risks in vendor risk section 5230, third-party vendors utilized by the vendor in third-party vendor section 5240, historical incidents associated with the vendor in historical incident section 5250, a listing of services provided by the vendor in services listing 5260, etc.

As noted herein, the system may be configured to detect a change in a vendor's information and/or an occurrence involving a vendor and responsively update training material associated with that particular vendor. For example, the system may be configured to substantially automatically identify a change in sub-processor by one or more vendors. FIG. 53 depicts the exemplary interface 5310 that includes a notification 5320 of a detected vendor change of a sub-processor. The notification 5320 includes a user-selectable control that may allow a user to download and/or otherwise access training material that has been updated based at least in part on the detected change or occurrence (e.g., as described herein). Alternatively, in response to selection of the user-selectable control, the system may generate an interface such as interface 5210 of FIG. 52. The user may then access the updated training material using such an interface. Referring again to FIG. 52, where the system has generated updated training material in response to some detected change or occurrence, the indication of such training material generation (e.g., control 5280) may include a date of creation (e.g., updating) of such updated training material.

Mapping of Data Breach Regulation Questions

A large number of regulations govern the actions that are required to be taken in response to a data breach. The particular regulations that apply to a data breach may be defined by the jurisdiction (e.g., country, state, defined geographic area, or other suitable region, such as any defined area sharing at least one common reporting requirement related to one or more data breaches) in which the data breach occurs, the nationality of one or more potential victims (e.g., data subjects) of the data breach, and/or the business sector involved in the data breach (e.g., healthcare, finance, telecommunications, utilities, defense, cybersecurity, etc.). For example, a data breach that results in the improper disclosure of personal health information within the U.S. may trigger the disclosure provisions of the Health Insurance Portability and Accountability Act (HIPAA). Examples of security standards or regulations that may indicate how a data breach is to be managed may include International Organization for Standardization (ISO) 27000 series standards, National Institute of Standards and Technology (NIST) standards, Health Information Technology for Economic and Clinical Health (HITECH) standards, Health Insurance Portability and Accountability Act (HIPAA) standards, American Institute of Certified Public Accountants (AICPA) System and Organization Controls (SOC) standards, the EU General Data Protection Regulation (GDPR), and the California Consumer Privacy Act (CCPA). Jurisdictions may also develop and use their own sets of requirements for handling data beaches. Entities (e.g., corporations, organizations, companies, etc.) may also have their own requirements and policies regarding the management of data breaches.

Therefore, a breach of personal data by a large, multinational company may trigger a need to analyze and comply with (potentially numerous) applicable privacy regulations of a potentially large number of different territories. This can pose a daunting challenge for an organization because, in currently available systems, a privacy officer would typically have to complete a data breach disclosure questionnaire for each affected territory and/or business segment. Each such questionnaire can include a large number of (e.g., 40, 50, or more) questions, making this process very time consuming when there are many different jurisdictions involved.

Systems and methods according to various embodiments may store, in memory, an ontology that maps respective questions from a data breach disclosure questionnaire for a first territory and/or business sector (e.g., an initial, high-level questionnaire that is used to determine whether it is necessary to disclose a particular data breach within the first territory) to: (1) corresponding questions within one or more data breach disclosure questionnaires (e.g., similar threshold questionnaires) for other territories and/or business sectors; and/or (2) corresponding questions within a master questionnaire. For example, the health care sectors of Germany, France, and the United States may all use "The number of data subjects whose data was affected by the breach" as a factor in determining whether a particular breach must be disclosed, who the breach must be disclosed to, and/or how quickly the breach must be disclosed. In various embodiments, however, each jurisdiction may include one or more data breach disclosure questionnaire questions related to the number of data subjects with affected data that are in a different form, in a different language, are worded differently, are posed differently (e.g., one questionnaire may require a free-form text entry response, another may include one or more user selectable responses, etc.), etc. As may be understood in light of this disclosure, although each respective questionnaire may include one or more respective questions that have different wording or form, each question may still map back to the same specific question within a data breach master questionnaire.

In an example embodiment, the master questionnaire may include the question "How many data subjects were affected by the breach?" This question may be important because various jurisdictions may have varying threshold of affected numbers of data subject that trigger reporting requirements. The system may map this question, via the ontology (which may map questions, at least in part, based on pattern matching between respective questions), to corresponding questions within the respective threshold data breach questionnaires for Germany, France, and the United States. In a particular example, in response to receiving, from a user, an answer to this question in the master questionnaire, the system may then use the answer in conjunction with the ontology to populate the answer to the corresponding questions within the questionnaires for Germany, France, and the United States. For example, if the user indicated in the answer to this question in the master questionnaire that the personal data of 150 people was affected by the breach, the system may save, in system memory, an answer corresponding to "150 people" to the particular question "How many data subjects were affected by the breach" (or similar questions that may, for example, be worded differently) in the threshold data breach questionnaires for Germany, France, and the United States.

It should be understood that the ontology may vary in complexity based on the circumstances. In particular embodiments, one or more questions from a master questionnaire (e.g., 1, 2, 3, 4, 5, 10, 25, 50, etc. questions) may each be respectively mapped to one or more corresponding questions in a plurality of (e.g., any number between 1 and 500, or more) data breach questionnaires for respective territories and/or business sectors. For example, the question above regarding the number of affected data subjects may be mapped to a respective question in data breach questionnaires for 40 different jurisdictions.

The system may include any number and type of questions in a master questionnaire and any data breach questionnaire for a particular territory and/or business sector. The system may use the answers to any such questions to determine the notification obligations for any particular territory. In this way, the system may determine the notification obligations for various territories that may each have varying disclosure requirements. The questions that the system may include on a master questionnaire and/or a data breach questionnaire for a particular territory may include, but are not limited to, a number of affected data subject and/or consumers, types of data elements involved in the breach, a volume of data involved in the breach, a classification of data involved in the breach, a business sector associated with the breach, questions associated with any type of regulatory trigger that may initiate a requirement for disclosure, etc.

Figure 54:
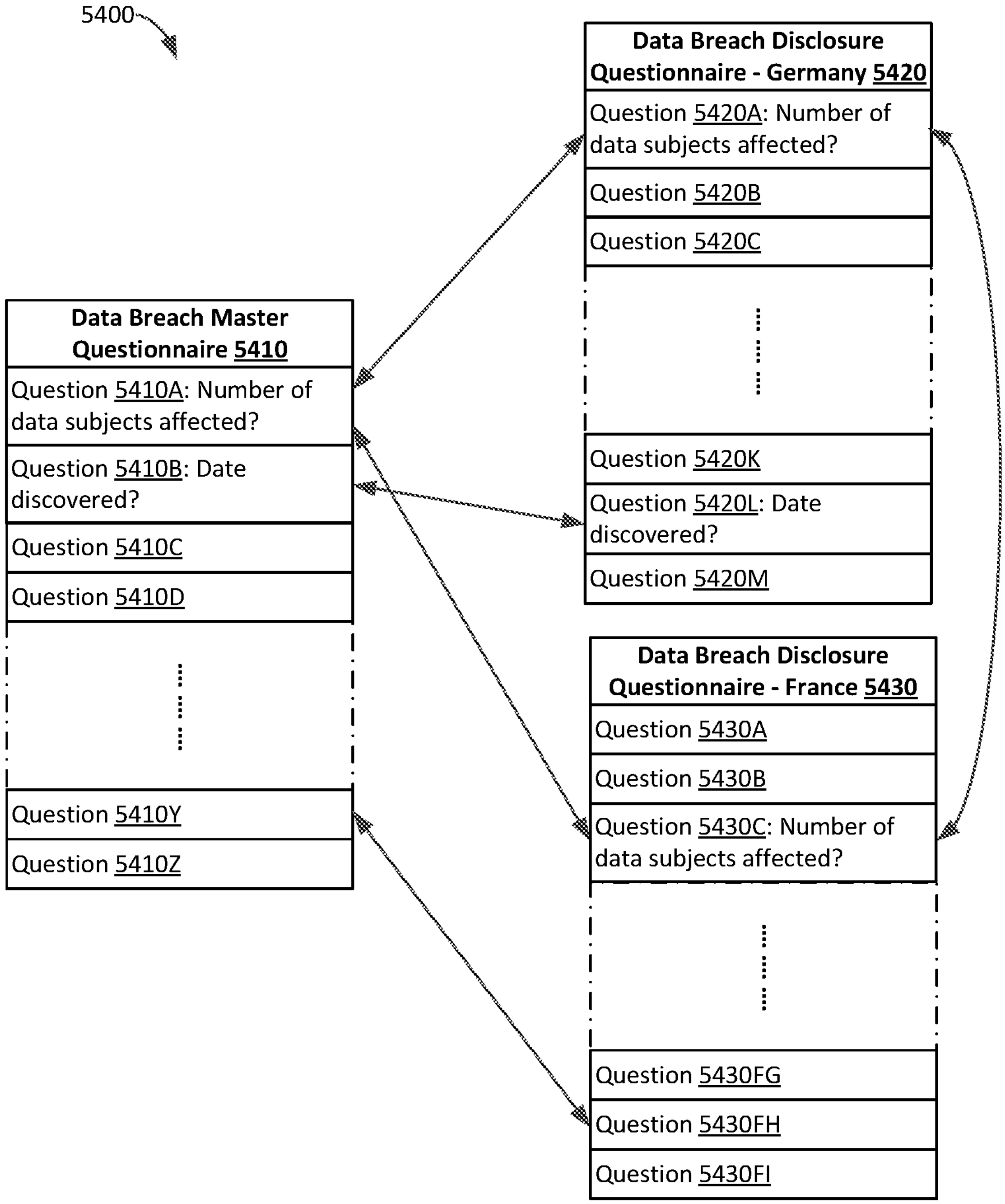
FIG. 54 illustrates an exemplary data structure representing an aspect of an ontology that may be used to determine disclosure requirements for various territories according to various embodiments.

FIG. 54 illustrates an exemplary Data Structure 5400 representing a data breach ontology according to particular embodiments that may be used for determining data breach response requirements and/or gathering data breach reporting information. The Data Structure 5400 may include requirements for each territory and/or business sector regarding, for example, what types of data breaches must be disclosed (e.g., whether a particular type of data breach must be disclosed and to whom), when different types of affected breached need to be disclosed (e.g., one or more reporting deadlines), and/or how different types of data breaches need to be disclosed (e.g., what information needs to be reported, the form of reporting, etc.). The Data Structure 5400 may also facilitate the gathering of data for, and the reporting of, data breaches.

The Data Breach Master Questionnaire 5410 represents data received as answers to a master questionnaire that the system provided to a user. The system may map answers to questions in the master questionnaire to corresponding answers for one or more other questionnaires. For example, the system may map one or more answers for the Master Questionnaire 5410 to one or more answers for the Data Breach Disclosure Questionnaire for Germany 5420 and/or the Data Breach Disclosure Questionnaire for France 5430, as shown in FIG. 54. The system may also, or instead, map answers to questions in any particular questionnaire to corresponding answers for any one or more other questionnaires. For example, the system may map one or more questions for the Data Breach Disclosure Questionnaire for Germany 5420 to one or more questions for the Data Breach Disclosure Questionnaire for France 5430, as shown in FIG. 54.

For example, the system may map data associated with question 5410A of the Data Breach Master Questionnaire 5410, which may provide a number of data subjects affected by a data breach, to question 5420A for the Data Breach Disclosure Questionnaire for Germany 5420 and to question 5430C for the Data Breach Disclosure Questionnaire for France 5430. Also, or instead, the system may map data associated with question 5420A for the Data Breach Disclosure Questionnaire for Germany 5420 to question 5430C for the Data Breach Disclosure Questionnaire for France 5430. The system may also, or instead, map data associated with question 5410B of the Data Breach Master Questionnaire 5410, which may provide a date for the detection of a data breach, to question 5420L for the Data Breach Disclosure Questionnaire for Germany 5420, but not to a question in the Data Breach Disclosure Questionnaire for France 5430. The system may also, or instead, map data associated with question 5410Y of the Data Breach Master Questionnaire 5410 to question 5430FH for the Data Breach Disclosure Questionnaire for France 5430, but not to a question in the Data Breach Disclosure Questionnaire for Germany 5420. In various embodiments, an ontology may map any one or more questions of any questionnaire to any one or more questions in any one or more other questionnaires in the ontology, or to no question in any other questionnaire.

One potential advantage of various embodiments of computer-implemented versions of this ontology is that it may allow a user to effectively complete at least a portion of a large number of data breach questionnaires by only completing a single master questionnaire. In various embodiments, the system may prompt the user to input answers to each respective question in the master questionnaire. The system would then map the answer to each of the questions to also be the answer to any corresponding questions in the data breach questionnaires of any other countries in which the entity was doing business or that were involved in a particular data breach (e.g., as determined by input from a user).

In particular embodiments, the system may be configured to dynamically edit the current master questionnaire for a particular entity so that the master questionnaire includes, for example, at least one question that will provide the answer for each question within a data breach disclosure questionnaire of a plurality of territories in which the entity does business (e.g., all of the territories in which the entity does business) or that were involved in a particular data breach (e.g., all of the territories affected by the particular data breach).

For example, in a particular embodiment, if a data breach disclosure questionnaire includes a question that is unique to Brazil, the master questionnaire will include that question as long as the entity's profile information indicates that the entity is doing business in Brazil or that Brazil is involved in the associated data breach. However, if a user modifies the entity's profile information to indicate that the entity no longer does business in Brazil, the system may automatically modify the master questionnaire to remove the question (since the question will no longer be applicable to the entity). Similarly, if a user even later updates the entity's profile to indicate that the entity has resumed doing business in Brazil, the system may automatically update the master questionnaire to include the Brazil-specific question (and/or questions).

In various embodiments, the system may be configured to generate a master questionnaire at any appropriate time. For example, in a particular embodiment, the system may prompt a user to indicate one or more territories (e.g., regions, jurisdictions, and/or countries) and/or sectors in which an entity is doing business and, at least partially in response to receiving the user's input, generate a threshold list of questions that the system may then use to determine which territories require disclosure of a particular data breach. In another particular embodiment, the system may prompt a user to indicate one or more territories (e.g., regions, jurisdictions, and/or countries) and/or sectors affected (e.g., potentially affected) by a particular data breach and, at least partially in response to receiving the user's input, generate a threshold list of questions that the system may then use to determine which territories affected by the data breach require disclosure of the data breach.

Figure 55:
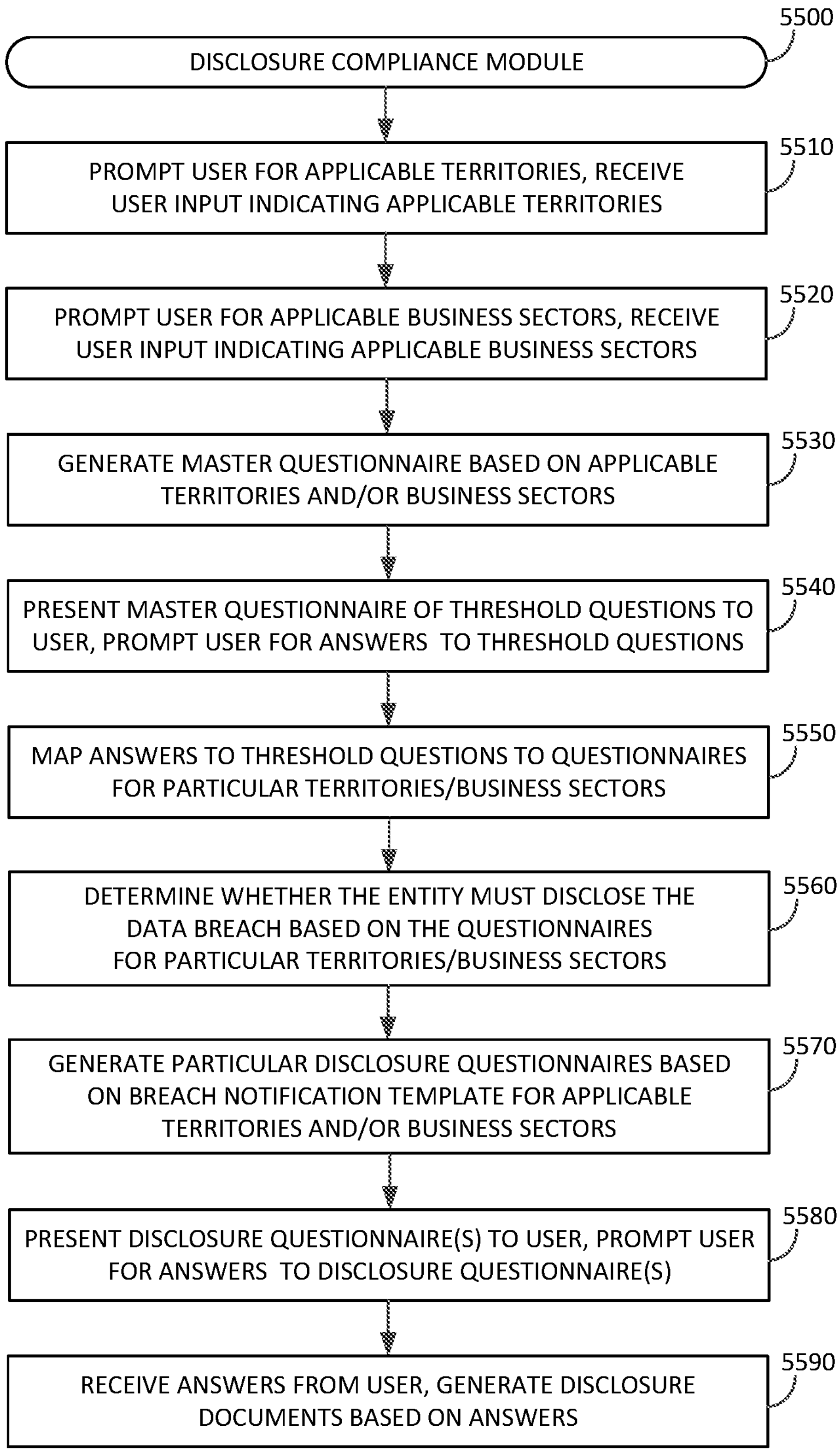
FIG. 55 is a flow chart showing an example of a process performed by the Disclosure Compliance Module according to particular embodiments.

For example, in a particular embodiment, after a user identifies a particular data breach, the system may responsively execute a disclosure compliance module, such as the exemplary Disclosure Compliance Module 5500 shown in FIG. 55. In executing the Disclosure Compliance Module 5500, at Step 5510, the system may prompt the user to indicate the territories (e.g., regions, jurisdictions, countries, etc.) in which the entity does business. Alternatively, or in addition, at Step 5510, the system may prompt the user to indicate the territories that may be affected by the particular data breach. In various embodiments, the system may ask the user to select territories from a listing of territories. Alternatively, or in addition, the system may prompt the user to indicate the applicable territories using any suitable technique. Further at Step 5510, the system may receive input from the user indicating the applicable territories. In particular embodiments, the system may facilitate such prompting for territories and receipt of indications of applicable territories by using graphical user interfaces.

Next, at Step 5520, the system may prompt the user to indicate the business sectors (e.g., healthcare, finance, etc.) in which the entity is doing business. Alternatively, or in addition, at Step 5510, the system may prompt the user to indicate the business sectors that may be affected by the particular data breach. In various embodiments, the system may ask the user to select business sectors from a listing of business sectors. Alternatively, or in addition, the system may prompt the user to indicate the applicable business sectors using any suitable technique. Further at Step 5520, the system may receive input from the user indicating the applicable business sectors. In particular embodiments, the system may facilitate such prompting for business sectors and receipt of indications of applicable business sectors by using one or more graphical user interfaces.

In response to the user-indicated applicable territories and/or business, at Step 5530 the system may generate a master questionnaire of threshold questions for the applicable territories and business sectors, e.g., as described above. At Step 5540, the system may present the master questionnaire to the user and prompt the user for input indicating answers to the threshold questions in the master questionnaire. Further at Step 5540, the system may receive input from the user indicating answers to the threshold questions in the master questionnaire. The system may prompt the user to indicate the answers to the threshold questions using any suitable techniques. In particular embodiments, the system may facilitate such prompting for answers to the threshold questions and receipt of indications of answers to the threshold questions by using graphical user interfaces.

At Step 5550, the system may use the ontology to map the user's answers to the threshold questions in the master questionnaire back to the threshold questionnaires for each particular applicable territory and/or business sector. At Step 5560, the system may to determine based on the information mapped from the master questionnaire answers to the threshold questionnaires for each particular applicable territory and/or business sector, whether, under the applicable laws of each particular applicable territory and/or within the particular applicable business sector, the entity must disclose the data breach (e.g., in addition to the matter of any required disclosure, timing of any required disclosure, etc.). In various embodiments, the system may be configured to determine a respective disclosure requirement for each of one or more territories and/or one or more business sectors in which a particular entity operates. In particular embodiments, the system is configured to simultaneously determine, for at least two or more jurisdictions in which the entity operates, a respective disclosure requirement for each of the at least two or more jurisdictions (e.g., the system is configured to determine the respective disclosure requirements for each of the at least two or more jurisdictions in parallel). The system may, for example, utilize one or more parallel processing techniques.

If so, at Step 5570, the system generates one or more disclosure questionnaires, each of which may reflect questions from a breach notification template for a particular territory and/or business sector, for completion by the user. Alternatively, the system may generate one or more disclosure questionnaires that may each include a consolidated master list of disclosure questions that are respectively mapped (e.g., using the ontology) to any one or more corresponding questions in one or more respective disclosure questionnaires (e.g., breach notification templates) for each of the territories in which the entity is required to disclose the breach (e.g., as determined by the system). Alternatively, or in addition, the system may facilitate the user completing a breach notification template for each territory individually. At Step 5580, the system may present the one or more disclosure questionnaires to the user and prompt the user for input indicating answers to the questions in each disclosure questionnaire. Further at Step 5580, the system may receive input from the user indicating answers to the questions in each disclosure questionnaire. The system may prompt the user to indicate the answers to questions in each disclosure questionnaire using any suitable techniques. In particular embodiments, the system may facilitate such prompting for answers to the questions in each disclosure questionnaire and receipt of indications of answers to the questions in each disclosure questionnaire by using graphical user interfaces. The system may then use the answers to the questions in each disclosure questionnaire to generate the applicable disclosure document(s) for each territory.

At Step 5590, after receiving the user's answers to the questions in each disclosure questionnaire, the system may use the input received from the user (e.g., when completing the master questionnaire and/or when providing answers to the questions in each disclosure questionnaire) to automatically generate a suitable disclosure document disclosing the breach for each territory in which disclosure of the breach is required. The system may then access, from system memory, information regarding how to properly submit the required disclosure document to each territory and display that information to the user. This information may include, for example, a mailing address or email address to which the disclosure document must be submitted, the entity or person to which the disclosure document should be sent, etc. In a particular embodiment, the system may be adapted to auto-submit one or more of the disclosure documents to the entity or person to which the disclosure document should be sent (e.g., via a suitable electronic or paper transmission of the document).

In various embodiments, the system may be adapted to present questions for a particular jurisdiction in the order in which they are presented on the jurisdiction's disclosure form. This may make it easier for the individual to prepare and finalize the disclosure form. In particular embodiments, the system may be further adapted to, based on a user's answers to one or more of the master list of disclosure questions, automatically promote an incident to a breach status.

Figure 56:
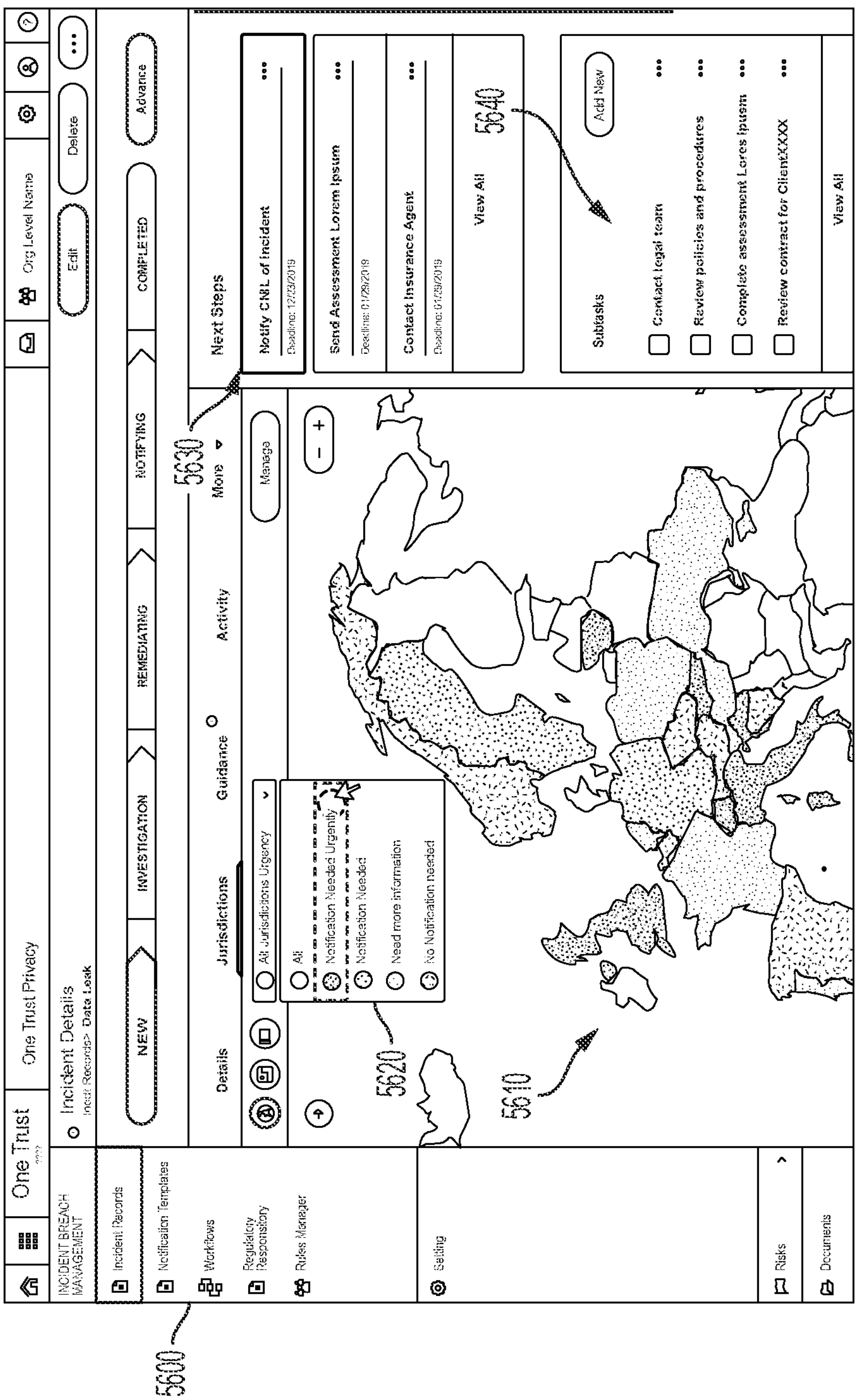
FIG. 56 is an example of a GUI indicating territories that require notification of a data breach.

In various embodiments, the system may be configured to present the results of the disclosure determination using a graphical user interface. FIG. 56 depicts an exemplary interface 5600 showing the results of a disclosure determination as described herein (e.g., by the Disclosure Compliance Module 5500). The system may indicate on interface 5600 the territories for which the system has determined that disclosure is required. The system may also indicate on such an interface the territories for which the system has determined that disclosure is not required. The interface 5600 may include a graphical representation of one or more territories, such as map 5610. The system may color code, shade, or otherwise visually indicate which of the territories shown in the map 5610 require notification of a data breach and which do not. The system may also color code, shade, or may otherwise visually indicate which of the territories shown in the map 5610 are not territories in which the entity is conducting business (and therefore were not included in the disclosure analysis performed by the system). The system may generate a legend 5620 in the interface 5600 to illustrate to the user the meaning of the color coding, shading, visual indications, etc. used on the map 5610 to illustrate the disclosure status of each territory and/or whether each territory was included in the disclosure analysis.

The interface 5600 may also include details of the disclosure requirements determined by a data breach disclosure determination as described herein. For example, the system may present disclosure requirements listing 5630 on the interface 5600 listing data breach notification requirements for the various jurisdictions in which disclosure is required. The interface 5600 may also include details of each particular disclosure requirement for a territory in which disclosure is required. For example, the system may present disclosure requirement subtasks listing 5640 on the interface 5600 listing particular subtasks associated with a particular data breach notification requirement for a particular territory in which disclosure is required, such as the territory highlighted in the disclosure requirements listing 5630.

Figure 57:
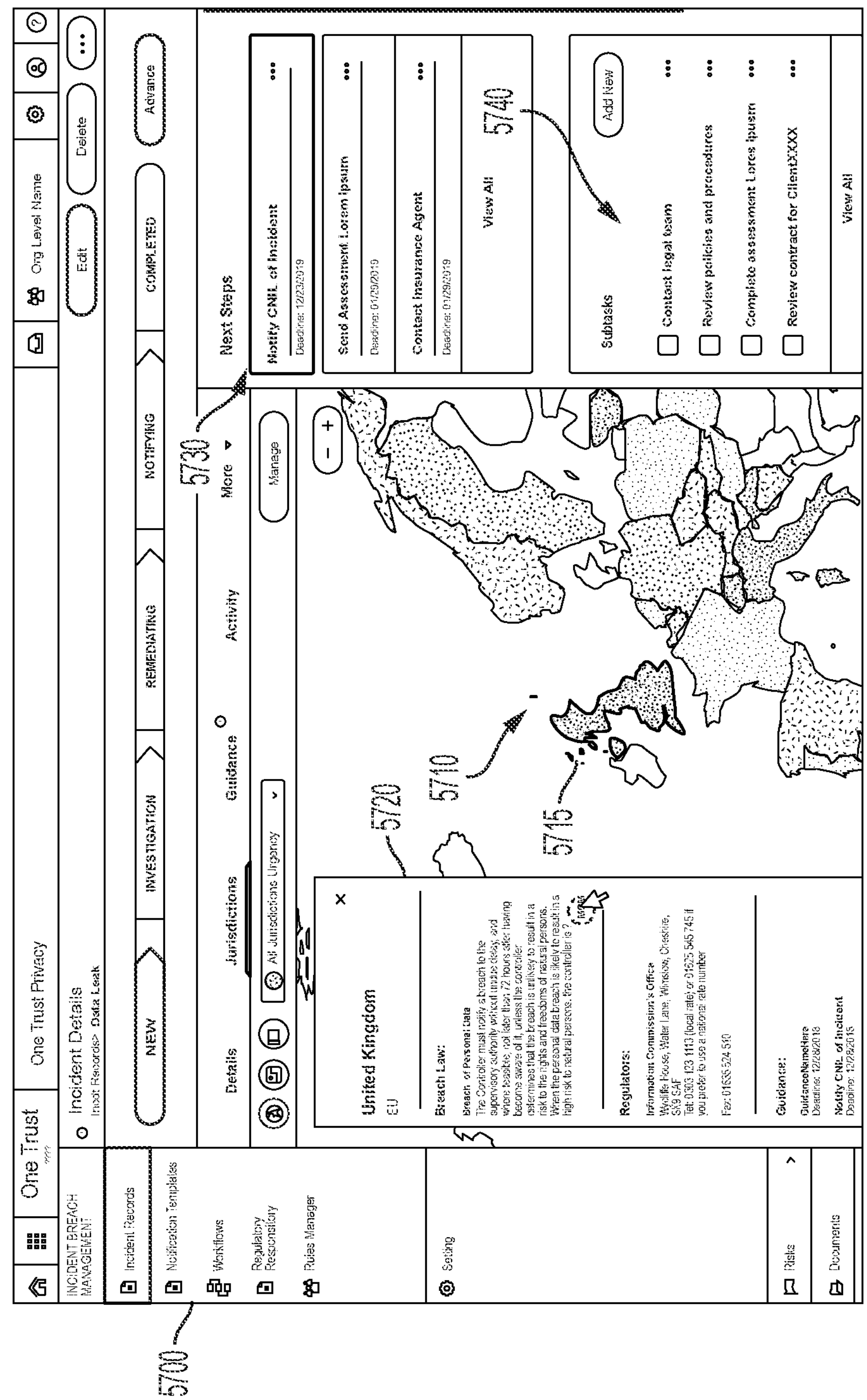
FIG. 57 is an example of a GUI indicating data breach notification details for a particular territory.

The system may also present further detailed information regarding the disclosure requirements for a particular territory for which the system has determined that disclosure of the data breach is required. FIG. 57 depicts an exemplary interface 5700 showing detailed results of a disclosure determination as described herein (e.g., by the Disclosure Compliance Module 5500) for a particular territory. The interface 5700 may include a graphical representation of one or more territories, such as map 5710. Upon selection of one of these territories, the system may highlight the selected territory, for example, the selected territory 5715 on the interface 5700. The system may then, in response to user selection of the selected territory 5715, generate detailed information regarding the selected territory 5715 in the detailed information section 5720. The detailed information section 5720 may include detailed information regarding the reporting requirements for the selected territory 5715, such as the particular laws or regulation that require disclosure, the regulating body, contact information for the regulators, etc.

As in FIG. 56, the interface 5700 of FIG. 57 may also include details of the disclosure requirements determined by a data breach disclosure determination as described herein, such as disclosure requirements listing 5730 listing data breach notification requirements for the various jurisdictions in which disclosure is required and disclosure requirement subtasks listing 5740 on listing particular subtasks associated with a particular data breach notification requirement for the selected territory 5715.

In any embodiment described herein, they system may be configured to at least partially automatically determine and populate one or more responses to one or more questions in the master questionnaire (e.g., prior to mapping the one or more responses to a corresponding questionnaire for a particular jurisdiction and/or business unit). The system may, for example, use one or more data mapping techniques (such as any data mapping technique described herein), for example, to determine particular data subjects involved, particular data assets involved, a location of those data assets, a type of data elements involved in the data breach, a volume of data subjects affected by the data breach, a classification of data involved in the breach, and/or any other suitable data related to the breach that may be relevant to one or more reporting and/or disclosure requirements. The system may, in various embodiments, at least partially automatically populate one or more responses to a master questionnaire and: (1) optionally prompt a user to confirm the automatically populated responses; and (2) prompt a user to provide any additional responses that the system did not automatically populate. In a particular example, in response to a data breach involving a payroll processing database utilized by an entity, the system may be configured to access a data model for the entity to determine, for example: (1) a number of employees whose personal data (e.g., name, mailing address, banking information, etc.) may have been affected by the breach; (2) a type of data potentially exposed by the breach (e.g., routing numbers, names, social security numbers, etc.); (3) a number of other entity data assets that may have been affected (e.g., by virtue of interfacing with the payroll processing database, sending or receiving data to the databased, etc.); and/or (4) any other data related to the payroll processing database that may be relevant to determine what disclosure requirements may need to be met by the entity in response to the data breach. The system may then use the determined data to at least partially automatically populate one or more master questionnaires (e.g., one or more responses in the one or more master questionnaires) for use in one or more breach disclosure assessments.

Assessing Entity and/or Vendor Compliance with Privacy Standards

Systems and methods according to various embodiments may store, in memory, an ontology that maps respective controls that are required for compliance with a first privacy standard (e.g., HIPAA, NIST, HITECH, GDPR, CCPA, etc.) to: (1) corresponding controls required for compliance with one or more other privacy standards; and/or (2) respective corresponding questions within a master questionnaire. For example, each of the HIPAA, NIST, and HITECH privacy standards may all require multi-factor authentication of employees before allowing the employees to access sensitive data. Accordingly, the ontology may map, to each other, respective controls listed in the HIPAA, NIST and HITECH privacy standards that each involve multi-factor authentication of employees.

The ontology may also, or alternatively, map each of the respective controls listed in a privacy standard or required by a privacy regulation (e.g., HIPAA, NIST, HITECH, GDPR, CCPA, etc.) to a question in a master list of questions that is used to determine compliance with the one or more privacy standards and/or regulations. For example, the master questionnaire may include a question regarding the use of multi-factor authentication of employees that maps to a requirement of one or more privacy standards. Such a question may be, for example, "Does your organization require multi-factor authentication of employees before they access sensitive data?". In a particular example, in response to receiving the answer to this question in the master questionnaire from a user, the system may use the answer in conjunction with the ontology to populate the answer to the corresponding questions within particular questionnaires that are used to assess an entity's level of compliance with a plurality of privacy standards and/or regulations, where each particular questionnaire is specific to a particular privacy standard or regulation (e.g., HIPAA, NIST, HITECH, CSA, GDPR, CCPA, etc.). For example, if the user indicated in the answer to this question in the master questionnaire that the user's organization does require multi-factor authentication of employees before they access sensitive data, the system may save, in system memory using the ontology, an answer corresponding to "Yes" to that particular question (or similar questions that may, for example, be worded differently) in the particular privacy standard compliance questionnaires for HIPAA, NIST, and HITECH.

It should be understood that the ontology may vary in complexity based on the circumstances. In particular embodiments, one or more questions from the master list a master questionnaire (e.g., 1, 2, 3, 4, 5, 10, 25, 50, etc. questions) may each be respectively mapped to one or more corresponding questions in a plurality of (e.g., any number between 1 and 500, or more) respective compliance questionnaires for other privacy standards. For example, the question above regarding multi-factor authentication may be mapped to a respective question in compliance questionnaires for 20 different privacy standards.

The system may include any number and type of questions in a master questionnaire and any compliance questionnaire for a particular privacy regulation and/or privacy standard. The system may use the answers to any such questions to determine whether and to what extent an entity and/or a vendor complies with a particular privacy regulation and/or privacy standard. In this way, the system may determine vendor and/or entity compliance with various privacy regulations and/or privacy standards that may each have varying requirements. The questions that the system may include on a master questionnaire and/or a compliance questionnaire for a particular privacy regulation and/or privacy standard may include, but are not limited to, controls on access to sensitive data, controls on modification and storage of sensitive data, required employee certifications, required security controls on devices/websites/systems, and any other questions associated with any type of control or requirement needed to comply with any privacy standard or privacy regulation.

Figure 58:
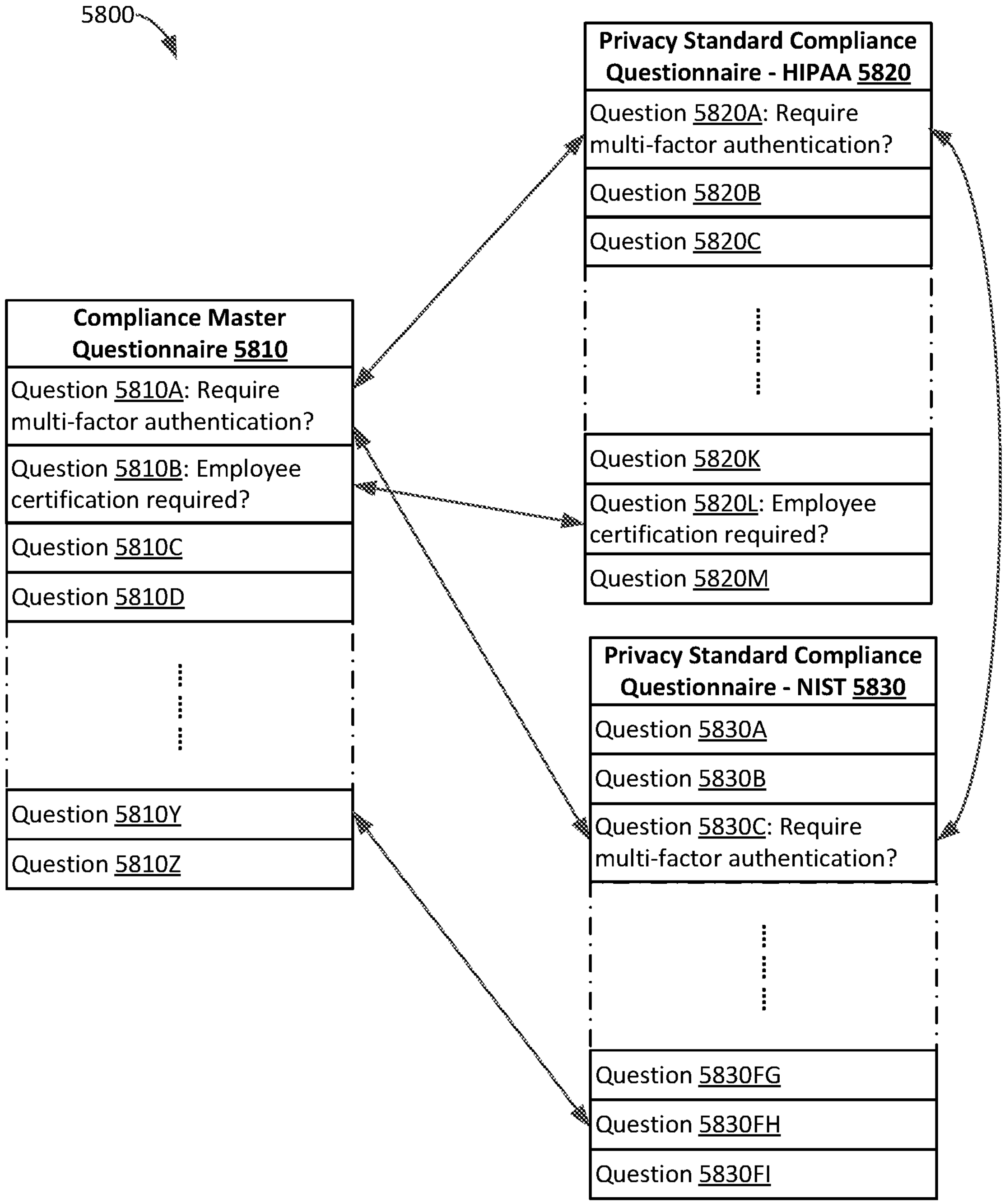
FIG. 58 illustrates an exemplary data structure representing an aspect of an ontology that may be used to determine compliance with various privacy standards and regulations according to various embodiments.

FIG. 58 illustrates an exemplary Data Structure 5800 representing a compliance ontology according to particular embodiments that may be used for determining particular privacy standard/regulation compliance and/or gathering privacy standard/regulation compliance information. The Data Structure 5800 may include requirements for each particular privacy standard and regulation, for example, what types of controls must be in place, what types of security measures are required, employee requirements (e.g., training, certifications, background checks, etc.), physical requirements, software requirements, etc. The Data Structure 5800 may also facilitate the gathering of data for, and the determination of, compliance with any one or more privacy standards and privacy regulations.

The Compliance Master Questionnaire 5810 represents data received as answers to a master questionnaire that the system provided to a user. The system may map answers to questions in the master questionnaire to corresponding answers for one or more other questionnaires. For example, the system may map one or more answers for the Master Questionnaire 5810 to one or more answers for the Privacy Standard Compliance Questionnaire for HIPAA 5820 and/or the Privacy Standard Compliance Questionnaire for NIST 5830, as shown in FIG. 58. The system may also, or instead, map answers to questions in any particular questionnaire to corresponding answers for any one or more other questionnaires. For example, the system may map one or more questions for the Privacy Standard Compliance Questionnaire for HIPAA 5820 to one or more questions for the Privacy Standard Compliance Questionnaire for NIST 5830, as shown in FIG. 58.

For example, the system may map data associated with question 5810A of the Compliance Master Questionnaire 5810, which may indicate whether multi-factor authentication is required, to question 5820A for the Privacy Standard Compliance Questionnaire for HIPAA 5820 and to question 5830C for the Privacy Standard Compliance Questionnaire for NIST 5830. Also, or instead, the system may map data associated with question 5820A for the Privacy Standard Compliance Questionnaire for HIPAA 5820 to question 5830C for the Privacy Standard Compliance Questionnaire for NIST 5830. The system may also, or instead, map data associated with question 5810B of the Compliance Master Questionnaire 5810, which may provide an indication as to whether a particular certification is required for employees, to question 5820L for the Privacy Standard Compliance Questionnaire for HIPAA 5820, but not to a question in the Privacy Standard Compliance Questionnaire for NIST 5830. The system may also, or instead, map data associated with question 5810Y of the Compliance Master Questionnaire 5810 to question 5830FH for the Privacy Standard Compliance Questionnaire for NIST 5830, but not to a question in the Privacy Standard Compliance Questionnaire for HIPAA 5820. In various embodiments, an ontology may map any one or more questions of any questionnaire to any one or more questions in any one or more other questionnaires in the ontology, or to no question in any other questionnaire.

One potential advantage of various embodiments of computer implemented versions of this ontology is that it may allow a user to effectively complete at least a portion of a large number of privacy standard and/or regulation compliance questionnaires by only completing a single, master questionnaire. In various embodiments, the system may prompt the user to input answers to each respective question in the master questionnaire. The system would then, using the ontology, map the answer to each of the questions to also be the answer to any corresponding questions in the respective compliance questionnaires for any suitable privacy standards.

In particular embodiments, the system may be configured to dynamically edit the current master questionnaire for a particular entity or vendor so that the master questionnaire includes, for example, at least one question that will provide the answer for each question within a privacy standard compliance questionnaire of a plurality of data standards. For example, if a privacy standard compliance questionnaire includes a question that is unique to HIPAA, the master questionnaire will include that question if a user indicates that they would like to assess an entity's compliance with HIPAA. However, if a user indicates that the entity (or the user) no longer wishes to assess the entity's compliance with HIPAA, the system may automatically modify the master questionnaire to remove the question (since the question will no longer be applicable to the entity). Similarly, if a user later updates the entity's profile to indicate that the entity (or user) again wishes to evaluate the entity's compliance with HIPAA, the system may automatically update the master questionnaire to include the HIPAA-specific question.

In various embodiments, the system may be configured to generate the master questionnaire at any appropriate time. For example, in a particular embodiment, the system may prompt the user to indicate the privacy standards and/or regulations that the user would like to have an entity or vendor evaluated for compliance with before generating a master list of questions that the system then uses to determine the extent to which the entity or vendor complies with the indicated privacy standards.

After a user provides answers to the questions in a master list, the system may use the ontology to map the user's answers to the questions back to the compliance questionnaires for each specified privacy standard and regulation to determine the extent to which the entity or vendor complies with each respective privacy standard and regulation. In various embodiments, the results of this determination may be selectively communicated to the user in any suitable way. For example, the system may generate and present to the user a report showing the degree to which (e.g., in percentages) an entity complies with each specified privacy standard and regulation.

In particular embodiments, the system may be adapted to not re-present questions that the system already has answers for. In such embodiments, the system may only present, to the user, compliance questions for selected privacy standards that the system doesn't already have an analogous answer for (e.g., based on an earlier-answered question from a master list of questions and/or an earlier-answered question from a compliance question for another privacy standard or regulation.)

In particular embodiments, the system may be adapted to automatically determine that a particular entity complies, fully or partially (e.g., in regard to consent) with one or more particular standards (e.g., the HITECH standard) based on the entity's compliance with one or more other standards and/or the answers to various questions within a master questionnaire.

In various embodiments, the questions presented to a user (e.g., as part of a master questionnaire) may be answered based on different types of information that may be associated with different levels of confidence. For example, each particular question may be answered with: (1) unsubstantiated data provided by the entity or vendor; (2) data that is substantiated via a remote interview; or (3) data that is substantiated by an on-site audit. In particular embodiments, the system is adapted to store an indication of the confidence level of the answer to each compliance question in memory (e.g., along with answer data associated with the question in a master questionnaire and/or a compliance questionnaire for a particular standard or regulation) and to selectively provide this information to a user (e.g., in the form of a report). In this way, the system may provide the user with an indication of the confidence level that the entity actually complies with the standard. For example, the system may generate an aggregate confidence score for an entity's compliance with a particular privacy standard based on the individual confidence levels associated with each answer to each question in the compliance questionnaire for that particular privacy standard.

In particular embodiments, the entity being assessed in the manner described above may be a vendor. The system may be adapted to allow the vendor to allow other entities to access the vendor's compliance data (e.g., as described herein) and to use such data to independently assess whether the vendor complies with any of a plurality of privacy standards and/or regulations. For example, if a particular potential customer of a vendor wishes to determine whether the vendor complies with the GDPR, the system may execute a privacy standard compliance module, such as those described herein, to assess whether the vendor complies with the GDPR. If the system doesn't have answers to all of the questions within a GDPR compliance assessment questionnaire, the system may prompt the user to provide answers to those questions as discussed above. The system may then optionally save the provided answers for later use by the vendor, or other potential customers of the vendor.

A potential advantage of various such embodiments is that they may allow a vendor to complete a single master questionnaire (e.g., a master Privacy Impact Assessment) that may be used by the vendor and/or a plurality of the vendor's customers to assess the vendor's current compliance with various applicable privacy standards and/or regulations. This may alleviate the need for the vendor to provide this data to multiple parties individually. Another advantage is that such embodiments may allow an entity, such a vendor, to use a single privacy impact assessment questionnaire when assessing each of the entity's business processes.

Figure 59:
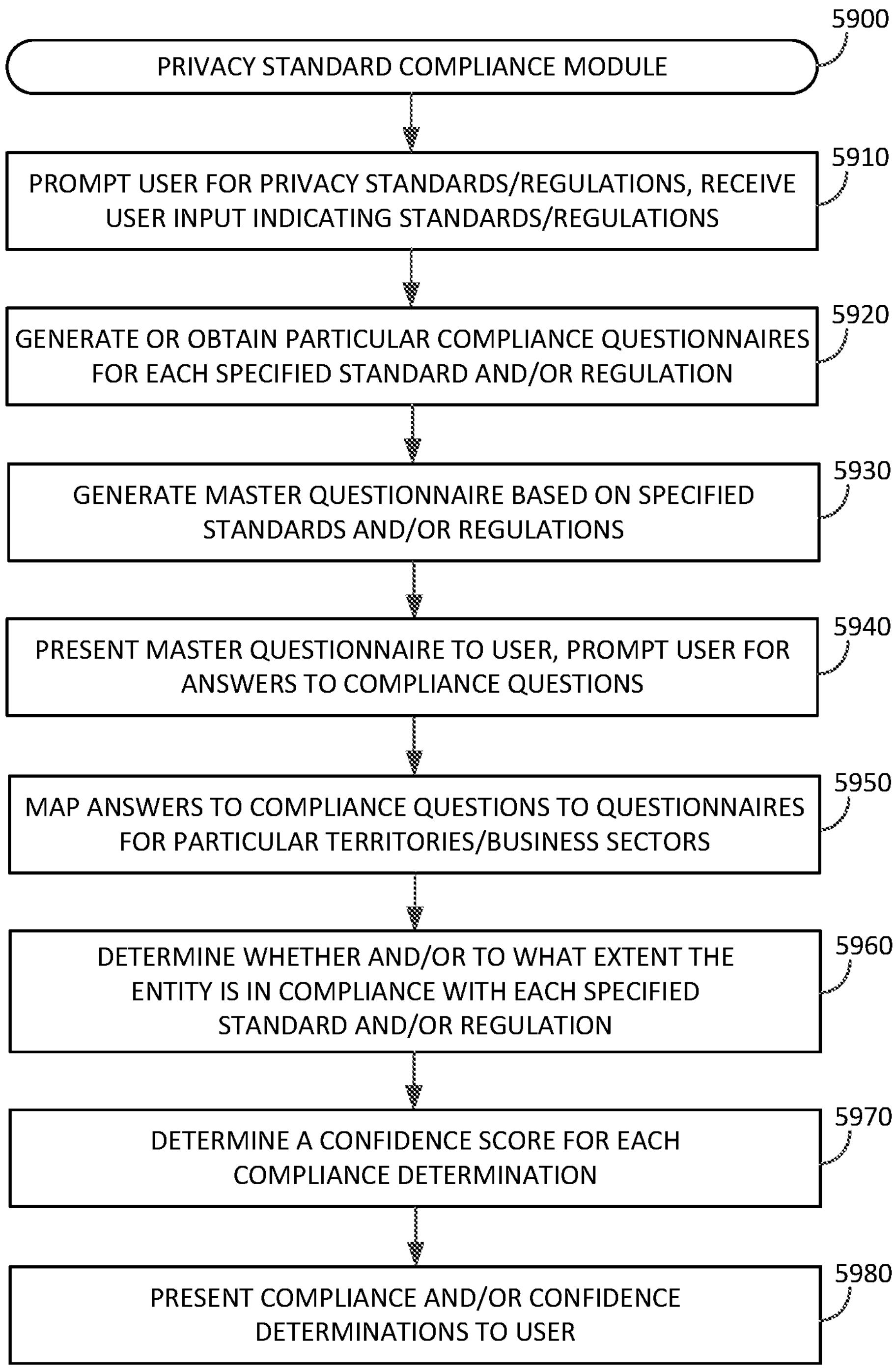
FIG. 59 is a flow chart showing an example of a process performed by the Privacy Standard Compliance Module according to particular embodiments.

In various embodiments, the system may execute a privacy standard and/or privacy regulation compliance module, such as the exemplary Privacy Standard Compliance Module 5900 shown in FIG. 59. In particular embodiments, the system may execute the Privacy Standard Compliance Module 5900 in response to user input requesting the evaluation of an entity's (e.g., company, organization, vendor, etc.) compliance with one or more privacy standards and/or privacy regulations. In executing the Privacy Standard Compliance Module 5900, at Step 5910, the system may prompt the user to indicate one or more particular privacy standards and/or regulations. In various embodiments, the system may ask the user to select one or more standards and/or regulations from a listing of standards and/or regulations. Alternatively, or in addition, the system may prompt the user to indicate the applicable standards/regulations using any suitable means. Further at Step 5910, the system may receive input from the user indicating the applicable standards/regulations. In particular embodiments, the system may facilitate such prompting for standards and/or regulations and receipt of indications of applicable standards and/or regulations by using graphical user interfaces.

At Step 5920, in response to receiving the specified standards and/or regulations, the system may generate or otherwise obtain a particular compliance questionnaire for each specified standard or regulation. At Step 5930, the system may generate a master questionnaire of compliance questions based on the specified standards and/or regulations. In various embodiments, the system may generate the ontology mapping questions in each particular compliance questionnaire to questions in the master questionnaire and/or to questions in other particular compliance questionnaires at Step 5930. In particular embodiments, for example as described above, the system may generate a master questionnaire that includes every question from each particular compliance questionnaire for each specified standard or regulation, while eliminating questions that represent substantially duplicative data. For example, the system may use pattern matching, machine learning techniques, or any other means to determine which questions from a particular privacy standard compliance questionnaire are the same or similar to another question in another privacy standard compliance questionnaire and include just one such question in the master questionnaire, reducing the total number of questions presented to the user.

Further at Step 5930, questions in the master questionnaire may be customized in any suitable manner. For example, questions may be presented in natural language form to solicit the corresponding information for respective privacy standard compliance questionnaires. Questions may also be presented in a language appropriate for a particular vendor or user, translated from another language used in one or more of the privacy standard compliance questionnaires if need be. The system may use machine learning, machine translation, neural networking, and/or any other suitable means of preparing and mapping questions in a master questionnaire so that the responsive data provided by a user can be used in one or more privacy standard and/or privacy regulation compliance questionnaires.

At Step 5940, the system may present the master questionnaire to the user and prompt the user for input indicating answers to the compliance questions in the master questionnaire. Further at Step 5940, the system may receive input from the user indicating answers to the compliance questions in the master questionnaire. Also at Step 5940, the system may determine a confidence level for each question, for example, based on the form of substantiation for the respective question as described above. The system may prompt the user to indicate the answers to the compliance questions using any suitable means. In particular embodiments, the system may facilitate such prompting for answers to the compliance questions and receipt of indications of answers to the compliance questions by using graphical user interfaces.

At Step 5950, the system may use the ontology to map the user's answers to the compliance questions in the master questionnaire back to the compliance questionnaires for each particular privacy standard or privacy regulation. At Step 5960, the system may to determine, based on the information mapped from the master questionnaire answers to the compliance questionnaires for each particular privacy standard or privacy regulation, whether and/or to what extent the entity is in compliance with the particular privacy standard or privacy regulation. At Step 5970, the system may determine a confidence score for each particular privacy standard or privacy regulation compliance determination, for example, based on the confidence level for each question in the compliance questionnaire for that particular privacy standard or privacy regulation as described above. At Step 5980, the system may present the results of the compliance determinations to the user. In various embodiments, these determinations may be presented on a graphical user interface or in a report of any form. The system may also, or instead, present the results of any compliance determination and/or associated confidence determination using any suitable means.

Assessing Entity and/or Vendor Readiness to Comply with Privacy Regulations

Systems and methods according to various embodiments may store, in memory, an ontology that maps respective data privacy requirements for a particular jurisdiction or set of regulations (e.g., GDPR, CCPA, French privacy regulations, German privacy regulations, etc.) to: (1) corresponding data privacy requirements required for compliance with one or more other particular jurisdictions or sets of regulations; and/or (2) respective corresponding questions within a master questionnaire. For example, the GDPR and the CCPA regulations may each require a particular privacy policy to be in compliance with the respective set of regulations. Accordingly, the ontology may map, to each other, corresponding privacy policies listed in the GDPR and the CCPA regulations. In various embodiments, the system may also, or instead, determine compliance in a particular jurisdiction with different regulations or other requirements (e.g., within the same general field) that apply during different periods of time. For example, the system may assess a particular entity's compliance with a first set of privacy regulations that currently apply within a particular jurisdiction and also assess the particular entity's compliance with a second set of privacy regulations that will apply after a predetermined future date within the particular jurisdiction. This may be advantageous in that it may allow a user to efficiently assess their compliance with current and future regulations at a particular period of time.

In embodiments such as those discussed above, the ontology may map, to each other, corresponding privacy policies for each set of regulations. Compliance with other types of requirements may also be evaluated, such as requirements associated with one or more Environmental, Social, and Governance (ESG) frameworks, industry standards, privacy standards, etc. By gathering answers to questions in a single master questionnaire, the system can map the answers to data privacy requirements required for compliance with the regulations in various jurisdictions and/or regions and assess the readiness of an entity to be in compliance with the regulations for such jurisdictions and/or regions.

In various embodiments, an ontology generated and/or stored by the system may also, or instead, include respective requirements for sectoral laws (e.g., laws related or applicable to particular business sectors, such as health, finance, etc., in some instances, in a particular jurisdiction) to: (1) corresponding requirements required for compliance in another particular business sector (e.g., in a particular jurisdiction); (2) corresponding data privacy requirements required for compliance with one or more other particular jurisdictions or sets of regulations; and/or (3) respective corresponding questions within a master questionnaire. For example, the healthcare information regulations (e.g., HIPAA) in a particular jurisdiction may require a particular privacy policy to be in compliance. Accordingly, the ontology may map, to each other, corresponding healthcare information regulations. By gathering answers to questions in a single master questionnaire, the system can map the answers to sectoral requirements required for compliance with sectoral regulations (e.g., healthcare information regulations, financial information regulations, etc.) for various jurisdictions and/or regions and assess the readiness of an entity to be in compliance with the sectoral requirements for such jurisdictions and/or regions.

The ontology may map each of the respective controls listed in a set of regulations for a particular region or territory (e.g., GDPR, CCPA, etc.) to a question in a master list of questions that is used to assess the entity's compliance with the set of regulations for that particular region or territory. For example, the master questionnaire may include a question regarding the use of a particular privacy data control or the implementation of a particular privacy policy. The system may map this question in the ontology to a requirement of one or more privacy regulations for particular jurisdictions and/or regions. Examples of such a question may include "Does your organization require multi-factor authentication of employees before they access sensitive data?" and "Do you prominently display a link to your privacy policy on your homepage?". In a particular example, in response to receiving the answer to this question in the master questionnaire from a user, the system may use the answer in conjunction with the ontology to populate the data associated with corresponding requirements within particular questionnaires that are used to assess an entity's readiness to comply with a plurality of privacy regulations for particular jurisdictions and/or regions, where each particular questionnaire is specific to a particular set of privacy regulations for a particular jurisdiction and/or region (e.g., GDPR, CCPA, etc.). For example, if the user indicated in the answer to this question in the master questionnaire that the user's organization does not prominently display a link to its privacy policy on its homepage, the system may save, in a computer memory using the ontology, an answer corresponding to "entity does not prominently display link to privacy policy on homepage" to that particular requirement (or similar requirements that may, for example, be worded differently) as represented in a questionnaire for the particular privacy regulations for a particular region.

It should be understood that the ontology may vary in complexity based on the circumstances. In particular embodiments, one or more questions from a master questionnaire (e.g., 1, 2, 3, 4, 5, 10, 25, 50, etc. questions) may each be respectively mapped to one or more corresponding questions in a plurality of (e.g., any number between 1 and 500, or more) respective questionnaires for particular sets of regulations for particular regions or territories. For example, the question above regarding displaying a link to a privacy policy on a homepage may be mapped to a respective question in questionnaires for 20 different sets of regulations, each associated with a different territory or region.

The system may include any number and type of questions in a master questionnaire and any readiness questionnaire for a particular set of privacy regulations for any particular territory or region. The system may use the answers to any such questions to determine whether and to what extent an entity (or a vendor) is ready to comply with a particular set of privacy regulations for any particular territory or region. Note that any of the particular sets of privacy regulations for any particular territory or region described herein may be currently in force or may be prospective (e.g., planned but not yet in force). In this way, the system may determine entity readiness for compliance with various sets of privacy regulations that may each have varying requirements and may each be currently in force or anticipated to be implemented in the future. The questions that the system may include on a master questionnaire and/or a readiness questionnaire for a particular territory or region may include, but are not limited to, controls on access to sensitive data, controls on modification and storage of sensitive data, required disclosures, required security controls on devices/websites/systems, require policies, required contact information, require consent modifications, and any other questions associated with any type of control or requirement needed to comply with any set of regulations for any territory, jurisdiction, or region.

Figure 60:
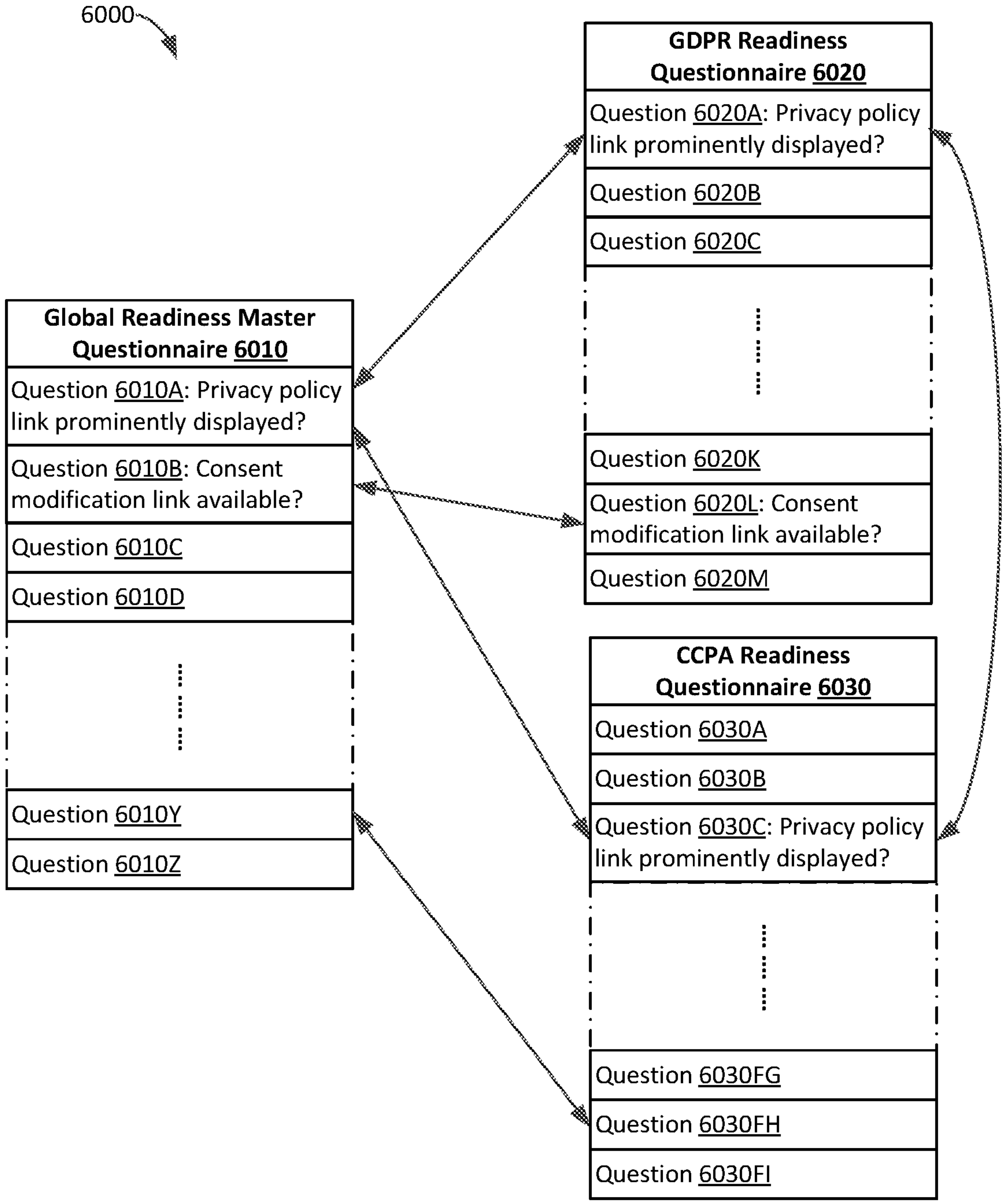
FIG. 60 illustrates an exemplary data structure representing an aspect of an ontology that may be used to determine an entity's compliance readiness for various and regions territories according to various embodiments.

FIG. 60 illustrates an exemplary Data Structure 6000 representing a global readiness assessment ontology according to particular embodiments that may be used for determining an entity's readiness to comply with one or more particular sets of privacy regulations and/or one or more particular sets of other requirements, and/or for gathering regulatory compliance information. The Data Structure 6000 may include requirements for each particular set of regulations or requirements for a particular territory or region (and/or for particular sectors in a particular territory or region), for example, what types of controls must be in place, what types of policies are required, physical requirements, software requirements, data handling requirements, etc. The Data Structure 6000 may also facilitate the gathering of data for, and the determination of, compliance (or readiness to comply) with any one or more sets of privacy regulations.

The Global Readiness Master Questionnaire 6010 represents data received as answers to a master questionnaire that the system provided to a user. The system may map answers to questions in the master questionnaire to corresponding answers for one or more other questionnaires. For example, the system may map one or more answers for the Master Questionnaire 6010 to one or more answers for the GDPR Readiness Questionnaire 6020 and/or the CCPA Readiness Questionnaire 6030, as shown in FIG. 60. The system may also, or instead, map answers to questions in any particular questionnaire to corresponding answers for any one or more other questionnaires. For example, the system may map one or more questions for the GDPR Readiness Questionnaire 6020 to one or more questions for the CCPA Readiness Questionnaire 6030, as shown in FIG. 60.

For example, the system may map data associated with question 6010A of the Global Readiness Master Questionnaire 6010, which may indicate whether a link to a privacy policy is prominently displayed on the entity's homepage, to question 6020A for the GDPR Readiness Questionnaire 6020 and to question 6030C for the CCPA Readiness Questionnaire 6030. Also, or instead, the system may map data associated with question 6020A for the GDPR Readiness Questionnaire 6020 to question 6030C for the CCPA Readiness Questionnaire 6030. The system may also, or instead, map data associated with question 6010B of the Global Readiness Master Questionnaire 6010, which may provide an indication as to whether a link is provided to allow a data subject to request a consent modification, to question 6020L for the GDPR Readiness Questionnaire 6020, but not to a question in the CCPA Readiness Questionnaire 6030. The system may also, or instead, map data associated with question 6010Y of the Global Readiness Master Questionnaire 6010 to question 6030FH for the CCPA Readiness Questionnaire 6030, but not to a question in the GDPR Readiness Questionnaire 6020. In various embodiments, an ontology may map any one or more questions of any questionnaire to any one or more questions in any one or more other questionnaires, or to no question in any other questionnaire.

One potential advantage of various embodiments of computer implemented versions of this ontology is that it may allow a user to effectively complete at least a portion of a large number of regulatory readiness questionnaires by only completing a single, master questionnaire. In various embodiments, the system may prompt the user to input answers to each respective question in the master questionnaire. The system may then, using the ontology, map the answer to each of the questions to also be the answer to any corresponding questions in the respective regulatory readiness questionnaires for any suitable set of regulations.

In particular embodiments, the system may be configured to dynamically generate and/or edit the current master questionnaire so that the master questionnaire includes, for example, at least one question that will provide the answer for each question within each readiness questionnaire of a plurality of readiness questionnaires for a plurality of respective sets of regulations (e.g., jurisdictional, sectoral, etc.). For example, if a readiness questionnaire for the GDPR includes a question that is unique to the GDPR (e.g., among the possible or available sets of regulations for which readiness may be assessed), the master questionnaire will include that question if a user indicates that they would like to assess the entity's compliance with the GDPR. However, if a user indicates that the entity (or the user) no longer wishes to assess the entity's readiness to comply with the GDPR, the system may automatically modify the master questionnaire to remove the question (since the question will no longer be applicable to any relevant set of regulations). Similarly, if a user later updates the entity's profile to indicate that the entity (or user) again wishes to evaluate the entity's readiness to comply with the GDPR, the system may automatically update the master questionnaire to include the GDPR-specific question.

In various embodiments, the system may be configured to generate the global readiness master questionnaire at any appropriate time. For example, in a particular embodiment, the system may prompt the user to indicate the regions and territories for which the user would like to have the entity evaluated for readiness to comply with the applicable privacy regulations. In response to receiving this information from the user, the system may generate a master list of questions that the system then uses to assess the readiness of the entity to comply with the applicable privacy regulations.

After a user provides answers to the questions in a master list, the system may use the ontology to map the user's answers to the questions back to the readiness questionnaires for each specified set of regulations for each particular region/territory to determine the extent to which the entity is ready to comply with each respective set of regulations. In various embodiments, the results of this assessment may be selectively communicated to the user in any suitable way. For example, the system may generate and present to the user a report showing the degree of readiness (e.g., in percentages) the entity has to comply with each specified set of privacy regulations.

In particular embodiments, the system may be adapted to not re-present questions that the system already has answers for. In such embodiments, the system may only present, to the user, readiness questions for selected sets of privacy regulations that the system doesn't already have analogous data for (e.g., based on an earlier-answered question from a master list of questions and/or an earlier-answered question from a readiness questionnaire for another set of privacy regulations or an earlier completed readiness questionnaire for this particular set of privacy regulations.)

In particular embodiments, the system may be adapted to automatically determine to what extent the entity is ready to comply with one or more particular sets of privacy regulations and/or other requirements for one or more particular regions or territories (e.g., GDPR, CCPA, ESG framework, HIPAA, sets of regulations applicable on particular dates, etc.), and/or for particular sectors in one or more particular regions or territories, based on data provided for the entity in response to various questions within a readiness questionnaire associated with one or more other sets of privacy regulations and/or in response to various questions within a master questionnaire.

In particular embodiments, the entity being assessed in the manner described above may be a vendor. The system may be adapted to allow the vendor to allow other entities to access the vendor's readiness assessment data (e.g., as described herein) and to use such data to independently determine the readiness of the vendor to comply with any of a plurality of set of privacy regulations. For example, if a particular potential customer of a vendor wishes to determine whether the vendor complies with the GDPR, the system may execute a readiness assessment module, such as those described herein, to assess the extent to which the vendor is prepared to comply with the GDPR. If the system doesn't have answers to all of the questions within a GDPR readiness assessment questionnaire, the system may prompt the user to provide answers to those questions as discussed herein. The system may then optionally save the provided answers for later use by the vendor or other potential customers of the vendor in future readiness assessments.

A potential advantage of various such embodiments is that they may allow a vendor to complete a single master questionnaire (e.g., a master global readiness questionnaire) that may be used by the vendor and/or a plurality of the vendor's customers to assess the vendor's readiness to comply with various sets of privacy regulations. This may alleviate the need for the vendor to provide this data to multiple parties individually. Another advantage is that such embodiments may allow an entity, such a vendor, to use a single master questionnaire when assessing its readiness to comply with multiple sets of privacy regulations.

Figure 61:
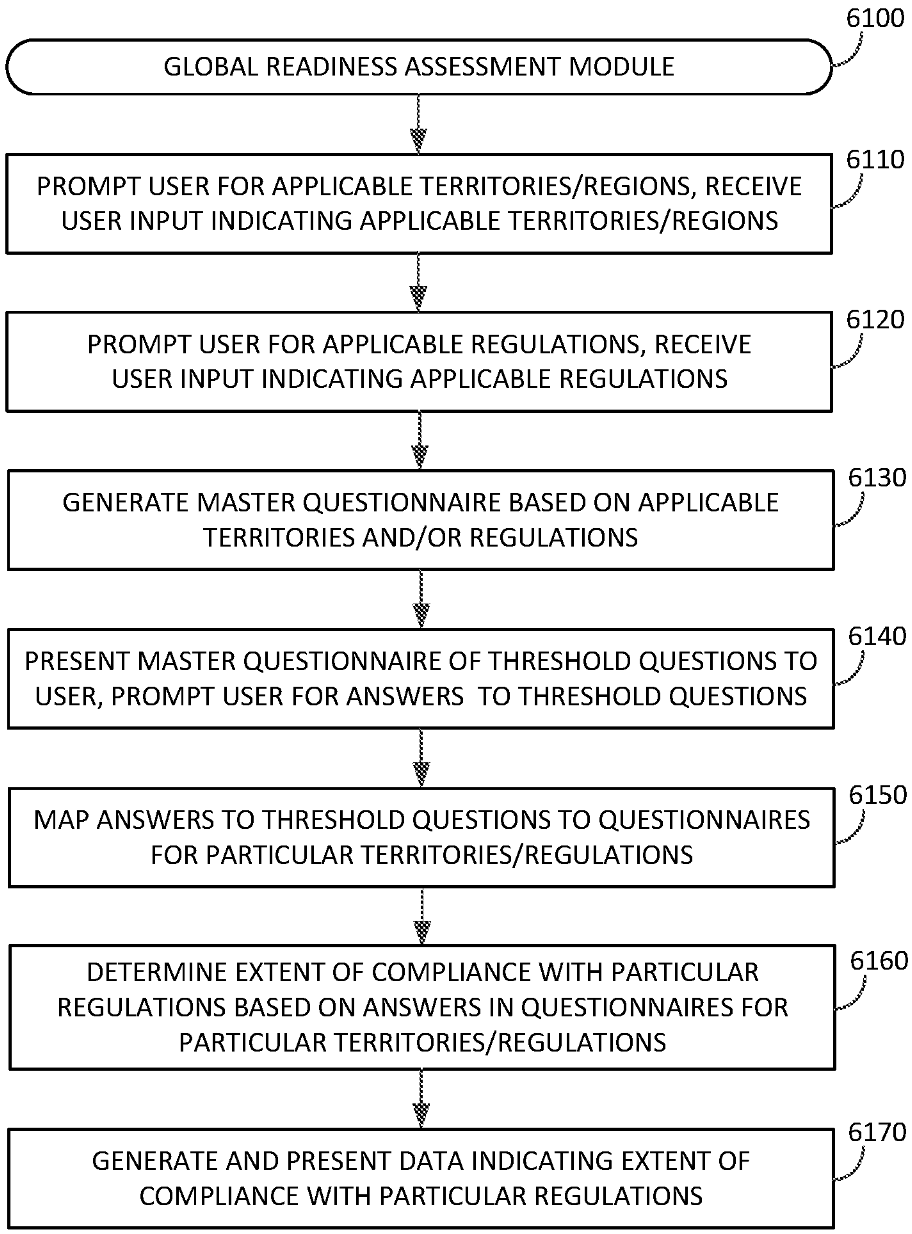
FIG. 61 is a flow chart showing an example of a process performed by the Global Readiness Assessment Module according to particular embodiments.

In various embodiments, the system may execute a global readiness assessment module, such as the exemplary Global Readiness Assessment Module 6100 shown in FIG. 61. In particular embodiments, the system may execute the Global Readiness Assessment Module 6100 in response to user input requesting the evaluation of an entity's (e.g., company, organization, vendor, etc.) readiness to comply with one or more particular sets of privacy regulations or other requirements in one or more regions or territories and/or with one or more particular sets of privacy regulations or other requirements for one or more particular sectors in one or more particular regions or territories. In executing the Global Readiness Assessment Module 6100, at Step 6110, the system may prompt the user to indicate one or more particular regions, territories, and/or sectors, for example, in which the entity conducts business or has customers. In various embodiments, the system may ask the user to select one or more regions and/or territories from a map of regions and/or territories or from a listing of regions, territories, and/or sectors. Alternatively, or in addition, the system may prompt the user to indicate the applicable regions, territories, and/or sectors using any suitable means. Further at Step 6110, the system may receive input from the user indicating the applicable regions, territories, and/or sectors. In particular embodiments, the system may facilitate such prompting for regions, territories, and/or sectors and receipt of indications of applicable regions, territories, and/or sectors using one or more graphical user interfaces.

In various embodiments, the system may allow a user to specify or select the particular sets of regulations and/or other requirements rather than, or in addition to, selecting regions, territories, and/or sectors. At Step 6120, the system may prompt the user to indicate one or more particular sets of regulations and/or requirements (e.g., GDPR, CCPA, ESG framework, HIPAA, sets of regulations applicable on particular dates, etc.), for example, governing the entity's conduct in various regions, territories, and/or sectors. In various embodiments, the system may ask the user to select one or more sets of regulations using a map indicating the regions and/or territories where such sets of regulations are in force or from a listing of sets of regulations. Alternatively, or in addition, the system may prompt the user to indicate the applicable sets of regulations using any suitable means. Further at Step 6120, the system may receive input from the user indicating the applicable sets of regulations. In particular embodiments, the system may facilitate such prompting for sets of regulations and receipt of indications of applicable sets of regulations using one or more graphical user interfaces.

At Step 6130, the system may generate a master questionnaire of global readiness questions based on the specified regions, territories, sectors, and/or sets of regulations. In various embodiments, the system may generate the ontology mapping questions in each particular compliance questionnaire to questions in the master questionnaire and/or to questions in other particular compliance questionnaires at Step 6130. In particular embodiments, for example as described above, the system may generate a master questionnaire that includes every question from each particular readiness questionnaire for each specified set of regulations, while eliminating questions that represent substantially duplicative data. For example, the system may use pattern matching, machine learning techniques, or any other means to determine which questions from a particular readiness questionnaire for a particular set of regulations are the same or similar to another question in another readiness questionnaire for a different particular set of regulations and include just one such question in the global readiness master questionnaire, reducing the total number of questions presented to the user.

Further at Step 6130, questions in the global readiness master questionnaire may be customized in any suitable manner. For example, questions may be presented in natural language form to solicit the corresponding information for respective readiness questionnaires. Questions may also be presented in a language appropriate for a particular user, translated from another language used in one or more of the readiness questionnaire if need be. The system may use machine learning, machine translation, neural networking, and/or any other suitable means of preparing and mapping questions in a master questionnaire so that the responsive data provided by a user can be used in one or more readiness questionnaires.

At Step 6140, the system may present the global readiness master questionnaire to the user and prompt the user for input indicating answers to the compliance readiness questions in the master questionnaire. Further at Step 6140, the system may receive input from the user indicating answers to the questions in the global readiness master questionnaire. The system may prompt the user to indicate the answers to the compliance readiness questions using any suitable means. In particular embodiments, the system may facilitate such prompting for answers to the compliance readiness questions and receipt of indications of answers to the compliance readiness questions using one or more graphical user interfaces.

At Step 6150, the system may use the ontology to map the user's answers to the compliance readiness questions in the master questionnaire back to the readiness questionnaires for each particular set of privacy regulations. At Step 6160, the system may to determine, based on the information mapped from the master questionnaire answers to the readiness questionnaires for each particular set of privacy regulations, whether and/or to what extent the entity is prepared to comply with each particular set of privacy regulations. In particular embodiments, the system may determine a percentage of readiness to comply with a particular set of privacy regulations based on the percentage of answers to questions in a respective questionnaire for that particular set of privacy regulations that indicate compliance. For example, if the user's answers to 25% of the questions in a questionnaire for a particular set of regulations indicate that the entity complies with the respective requirements represented by those questions, the system may determine that the entity is at 25% readiness to comply with that particular set of regulations. Alternatively, or in addition, the system may employ an algorithm or other means of calculating a readiness level or score (e.g., weighting particular questions) that may be represented in any suitable manner (e.g., percentage, raw score, relative score, etc.). The system may use any other suitable means of determining an extent of the entity's readiness to comply with the regulations associated with any particular region or territory.

At Step 6170, the system may present the results of the compliance readiness determination to the user. In various embodiments, these results may be presented on a graphical user interface or in a report of any form. The system may present the results of multiple compliance determinations to the user for comparison purposes. The system may also, or instead, present the results of any readiness determination using any suitable means.

Figure 62:
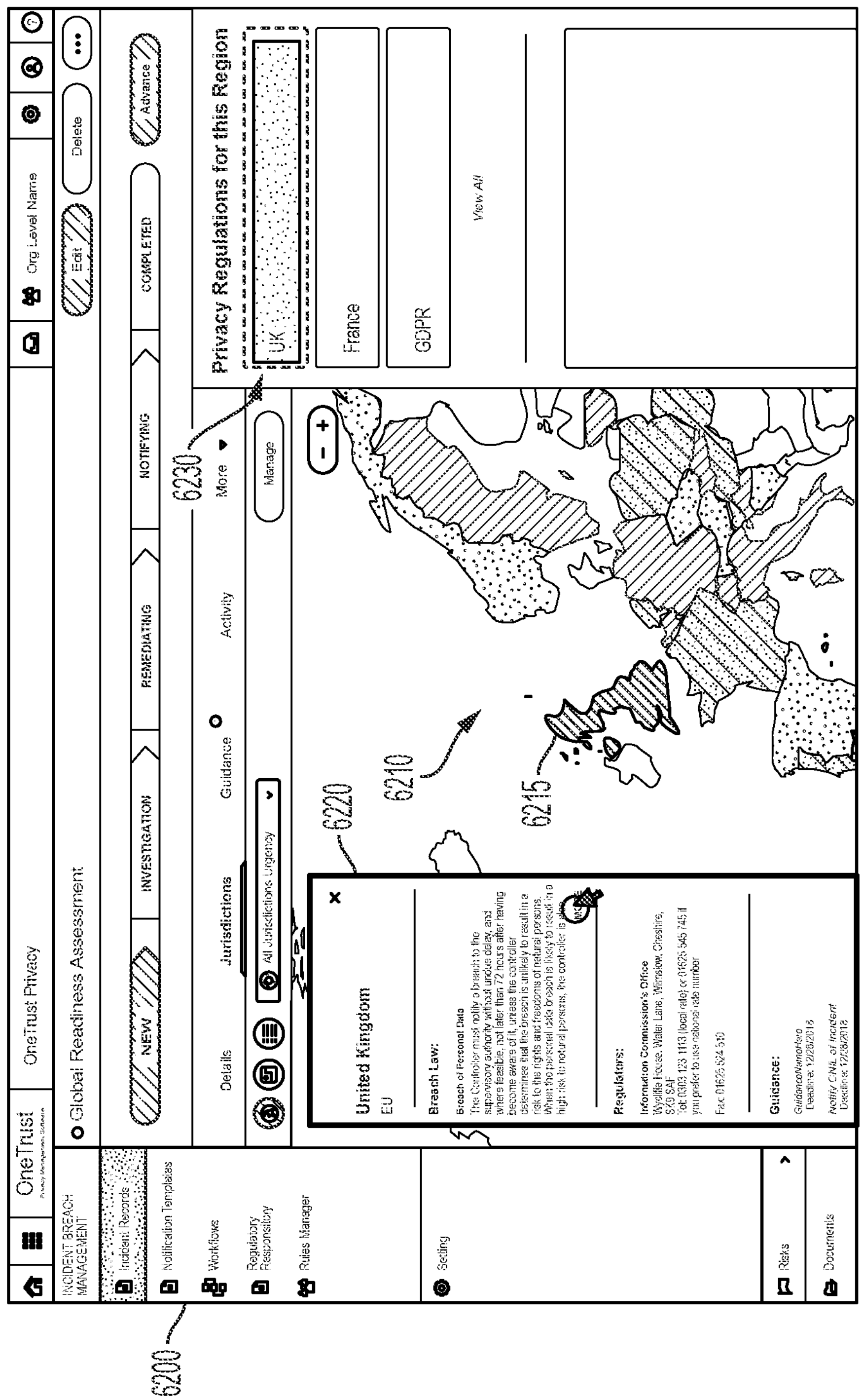
FIG. 62 is an example of a GUI allowing user selection of territories and regions for compliance readiness assessment.

In various embodiments, the system may be configured to solicit input regarding territories, regions, sectors, and/or sets of regulations for which readiness is to be assessed and/or to present the results of such readiness assessments using a graphical user interface. FIG. 62 depicts an exemplary interface 6200 showing a map 6210 of regions and territories that allows a user to select one or more territories for a global readiness assessment (e.g., by the Global Readiness Assessment Module 6100). The system may indicate on interface 6200 the territories selected and the associated regulation for a selected territory. For example, territory 6215 may be highlighted or otherwise emphasized as a selected territory, and the system may, in response to selecting the territory 6215, present a summary 6220 of the privacy regulations and/or other requirements that may be applicable to the territory 6215. The system may color code, shade, or otherwise visually indicate which of the territories shown in the map 6210 are associated with which regulations. The system may also present a listing of regulations and/or requirements 6230 that may be applicable to one or more territories shown in map 6210. By detecting a user selection of any of the regions or territories shown in the map 6210 and/or the listing 6230, the system may responsively add the selected regions and territories to a listing of regions and territories that the system will evaluate for compliance readiness.

Figure 63:
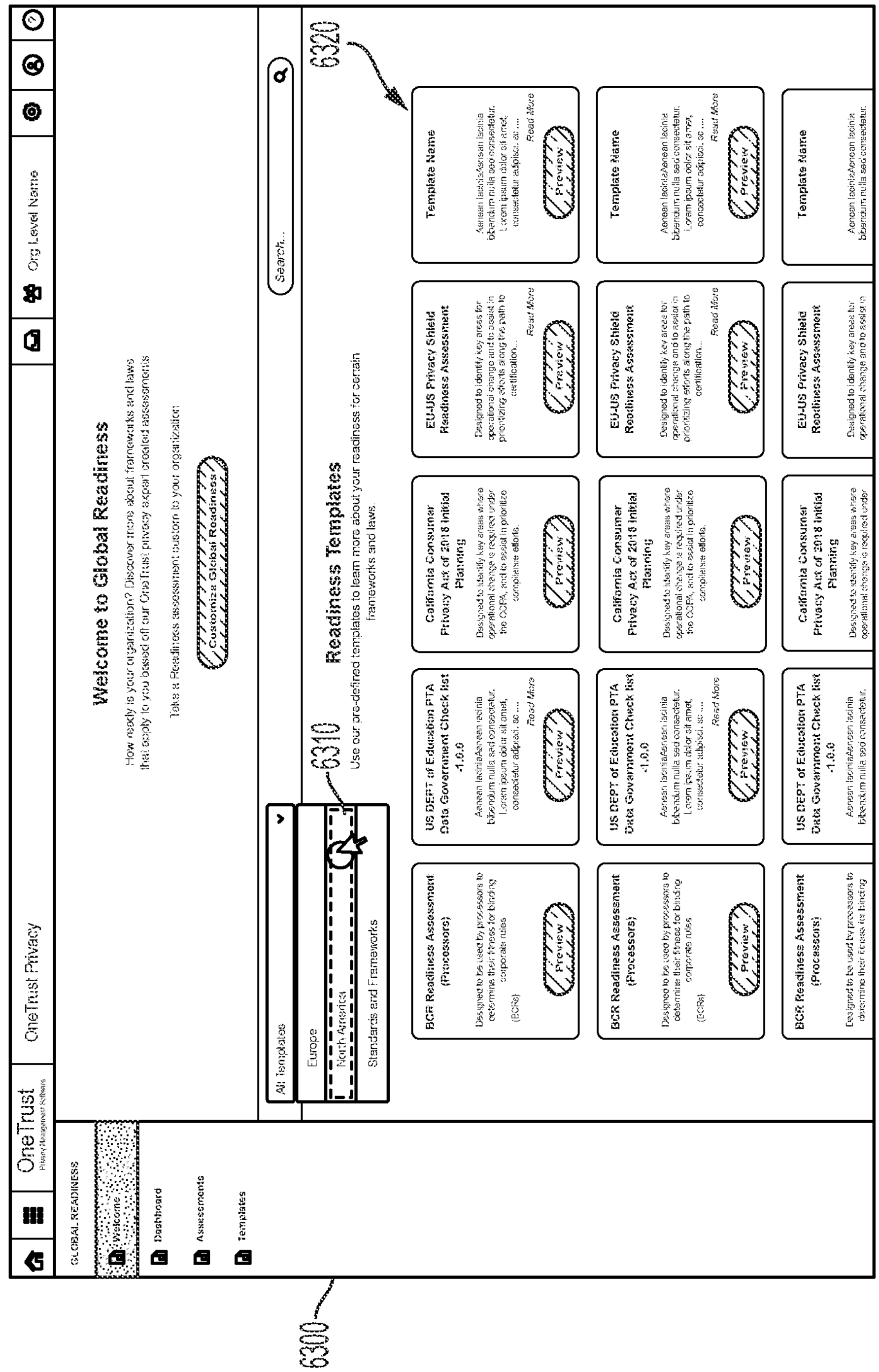
FIG. 63 is an example of a GUI showing user selection of territories and regions for compliance readiness assessment.

FIG. 63 depicts an exemplary interface 6300 showing a listing of privacy regulations and/or other types of requirements 6320. This listing may represent the regulations and/or requirements implicated when a user selected one or more regions or territories, such as on interface 6200 of FIG. 62. The listing of privacy regulations and/or other types of requirements 6320 may also, or instead, allow the user to select additional sets of regulations and/or requirements for which the entity's readiness is to be evaluated and/or may allow the user to deselect sets of regulations and/or requirements, thereby removing such regulations/requirements from those for which the entity's readiness is to be evaluated. The listing of privacy regulations and/or other types of requirements 6320 may be filtered and/or sorted based on regions and territories, for example using the region listing 6310.

Figure 64:
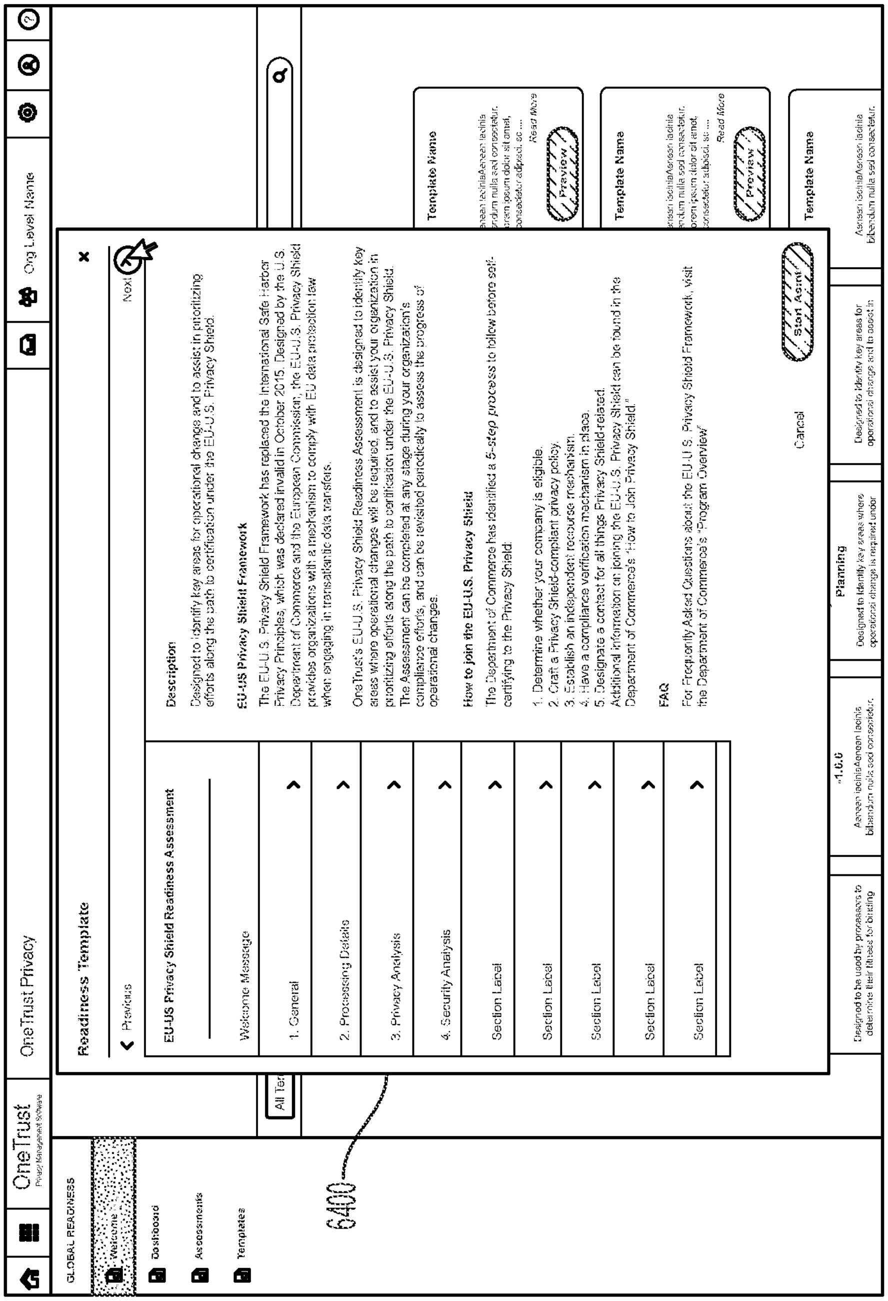
FIG. 64 is an example of a GUI showing compliance details for regulations associated with a territory or region selected for compliance readiness assessment.

As selection of one of the sets of regulations presented in the listing of privacy regulations and/or other types of requirements 6320 may generate another interface (e.g., a pop-up window) providing further details regarding that set of privacy regulations/requirements, such as interface 6400 shown in FIG. 64. The interface 6400 may include a user-interactive listing of the various requirements of the selected set of regulations or requirements, allowing a user to view the details of complying with that particular set of regulations or requirements.

Figure 65:
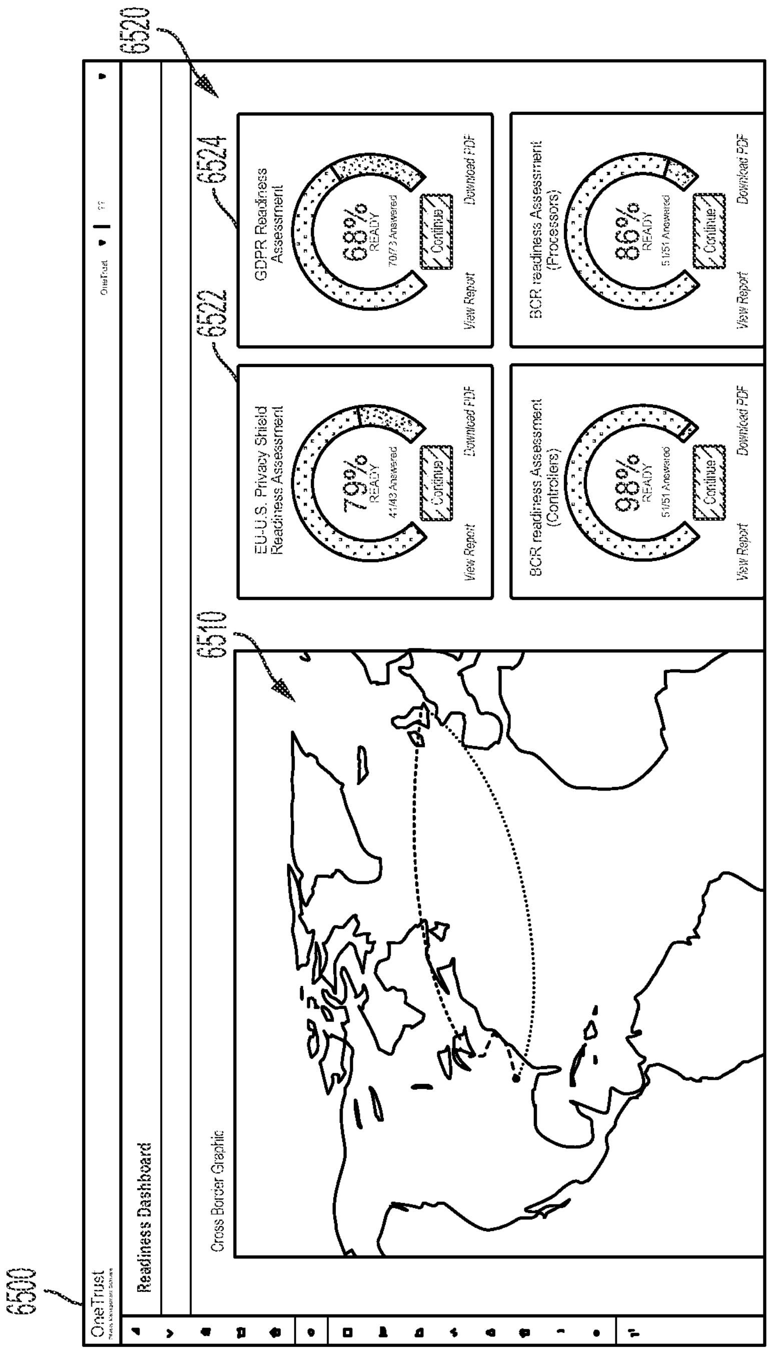
FIG. 65 is an example of a GUI showing the results of a compliance readiness assessment.

FIG. 65 depicts an exemplary interface 6500 showing the results of compliance readiness assessments. The interface 6500 may include a map 6510 that may indicate the regions, territories, and/or sectors for which the entity's readiness was evaluated. The system may generate a listing of the results of the readiness analysis 6520 for each applicable set of regulations and/or requirements, allowing for a ready comparison between the results of multiple compliance readiness assessments. Each entry in the listing 6520 may include specific results for the respective set of regulations or requirements. For example, the entry 6522 may indicate that the entity is 79% ready to comply with the EU-U.S. PrivacyShield regulations, while the entry 6524 may indicate that the entity is 68% ready to comply with the GDPR. Each such entry may also provide options that a user may select to view more details about the results and/or the associated set of regulations. As noted above, the system may provide the results of a compliance readiness assessment in any suitable form.

Generation of an Intelligent Data Breach Response Plan

Because of the large number of regulations that must be followed across various jurisdictions in order to remain in compliance such regulations and to properly respond in the event of a data breach or other incident, it can be very difficult for an entity to develop proper response and compliance plans. In some instances, various requirements and regulations (e.g., jurisdictional, sectoral, standards-based, etc.) may be in conflict with one another, making the planning and response process even more complex. In particular embodiments, the system may be configured to automatically develop a plan for responding to a particular data breach or other incident based upon various criteria that take into account requirements and regulations for various regions, territories, and/or sectors. The system may, for example, use one or more of the follow criteria in developing a response plan for a data breach: (1) the respective disclosure requirements of each regions, territories, and/or sectors (e.g., whether and how quickly the region/territory/sector requires disclosure of the data breach); (2) how frequently each region, territory, and/or sector enforces its data breach disclosure requirements; (3) any penalty (e.g., applicable fine) for not properly satisfying the disclosure requirements of each region, territory, and/or sector; (4) how important each region, territory, and/or sector is to the entity's business (e.g., how much business the entity does in the region, territory, and/or sector); and/or (5) any other suitable factor. Such a plan may be particularly helpful in situations where there are conflicts (e.g., irreconcilable conflicts) between the laws or regulations regarding how and when a particular breach must be disclosed. For example, where there are conflicts between the regulations of two or more regions, territories, and/or sectors, the system may be configured to determine the particular region, territory, or sector for which violation of a regulation is less (or more) impactful and develop a response plan based on that determination.

In various embodiments the system may generate and/or store one or more ontologies in a suitable data structure, for example as described herein. In exemplary embodiments, such a data structure (or any data structure configured to organize the data disclosed herein) may include, for example, the requirements of each territory and/or business sector, such as the types of data breaches need to be disclosed in a particular territory, when and how different types of data breaches need to be disclosed in a particular territory, etc. In particular embodiments, the data structure may also include information regarding, for each particular region, territory, and/or sector, one or more of: (1) how often the regulations (e.g., breach-related regulations) of the particular region, territory, or sector are enforced; (2) the fine(s) for not disclosing a breach as required by the particular region, territory, or sector; (3) how other privacy officers within the entity (or other, similar entities) typically handle data breaches within the particular region, territory, or sector (e.g., do they routinely comply with a territory's applicable breach disclosure requirements?); and (4) other applicable information that may be useful in developing a decision as to how to best handle a privacy breach that impacts one or more of the regions, territories, and/or sectors in which the entity conducts business.

In various embodiments, the system may enable a user to execute a regulatory disclosure compliance module that prompts the user to input, in addition to the information described above, information regarding the importance of each particular region, territory, or sector to the entity's business and any other business information that may be helpful in prioritizing efforts in responding to the disclosure requirements of multiple different regions, territories, and/or sectors.

After receiving this information, the system may then use any suitable algorithm to create an ordered list of regions, territories, and/or sectors in which the entity needs to disclose the breach. Particular territories may be listed, for example, in order of the urgency with which the disclosure must be filed in the respective territories (e.g., based on how soon from the current date the disclosure must be filed in each territory and/or the importance of the territory to the entity's business). In particular embodiments, the system may, for example, generate a disclosure urgency score for each territory and order the list based on the determined respective disclosure urgency scores for each of the countries.

In various embodiments, the system may communicate this information via a heat map display of a plurality of territories, where the heat map visually indicates (e.g., by displaying the territories in different respective colors) which territories require the most immediate disclosure. In other embodiments, the system may present to a user a listing of affected regions, territories, and/or sectors ordered by their relative urgency. In various embodiments, the system is configured to display detailed information regarding a particular region's, territory's, or sector's disclosure requirements in response to a user selecting the territory on the heat map or from a listing of affected regions, territories, and/or sectors.

In addition, or instead, the system may be configured to generate a list of recommended steps (e.g., an ordered checklist of steps) that the user (or entity) should complete to satisfy data breach reporting requirements and recommendations according to the system's logic. The system may present questions to a user soliciting information required to satisfy each step and may automatically generate reporting communications that may be required by the affected jurisdictions and/or sectors. This may be advantageous because it may allow a user to satisfy multiple different jurisdictions' and/or sectors' respective disclosure obligations, for example, by providing answers to a single questionnaire (e.g., as described herein in regard to the Data Structure 5400). This may further be advantageous because it may allow a user to satisfy multiple different jurisdictions' (or different business sectors') respective disclosure obligations according to a particular protocol that takes into account internal conflict-of-laws logic by completing each step in the list in the specified order.

It should be understood, based on the discussion above, that a list of compliance or disclosure steps may omit one or more steps that are necessary to comply with the regulations of one or more territories regarding the data breach. For example, the system may have determined that, since the penalty for non-compliance in a particular territory is below a particular monetary threshold, and since the company needs to allocate resources to disclosing the data breach to many other territories that have relatively high monetary fines for non-disclosure, it is recommended not to comply, in the particular instance, with the disclosure regulations of the particular territory.

It should also be understood that the list of steps may be in any suitable order. For example, steps for complying with a particular jurisdiction's disclosure laws may be listed in consecutive order or intermixed with one or more steps for steps for complying with the disclosure laws of one or more other jurisdictions. This may be useful, for example, in situations where a particular jurisdiction requires the disclosure requirement to be completed in two stages, with a first stage to be completed before the due date of a particular action that is due in another jurisdiction, and a second stage to be completed after the due date of that particular action.

Also, in various embodiments, the system may allow a user to modify the list of action items (e.g., by deleting certain action items, adding additional action items, or by reordering the list of action items so that, for example, at least one of the actions is performed sooner than it would have been in the original ordered list. In particular embodiments, such manual modifications of the original list may be used by one or more machine learning modules within the system to adjust the logic used to present future lists of action items for the entity or for other entities.

In various embodiments, the system may automate one or more of the steps described herein, for example, as part of a workflow. The system may automatically route one or more of the tasks generated to particular recipients for completion as part of such a workflow. Upon determining the particular type of breach or incident and details relating thereto, the system may automatically generate or select a suitable workflow that may include such tasks. The system may also use a determined workflow as a template and integrate details of required tasks based on specific information related to the particular breach or incident. In particular embodiments, the system may automatically route any of the subtasks and/or any items in any of the checklists described herein to one or more suitable recipients based on the parameters or details of the associated incident and or the type of incident.

Figure 66:
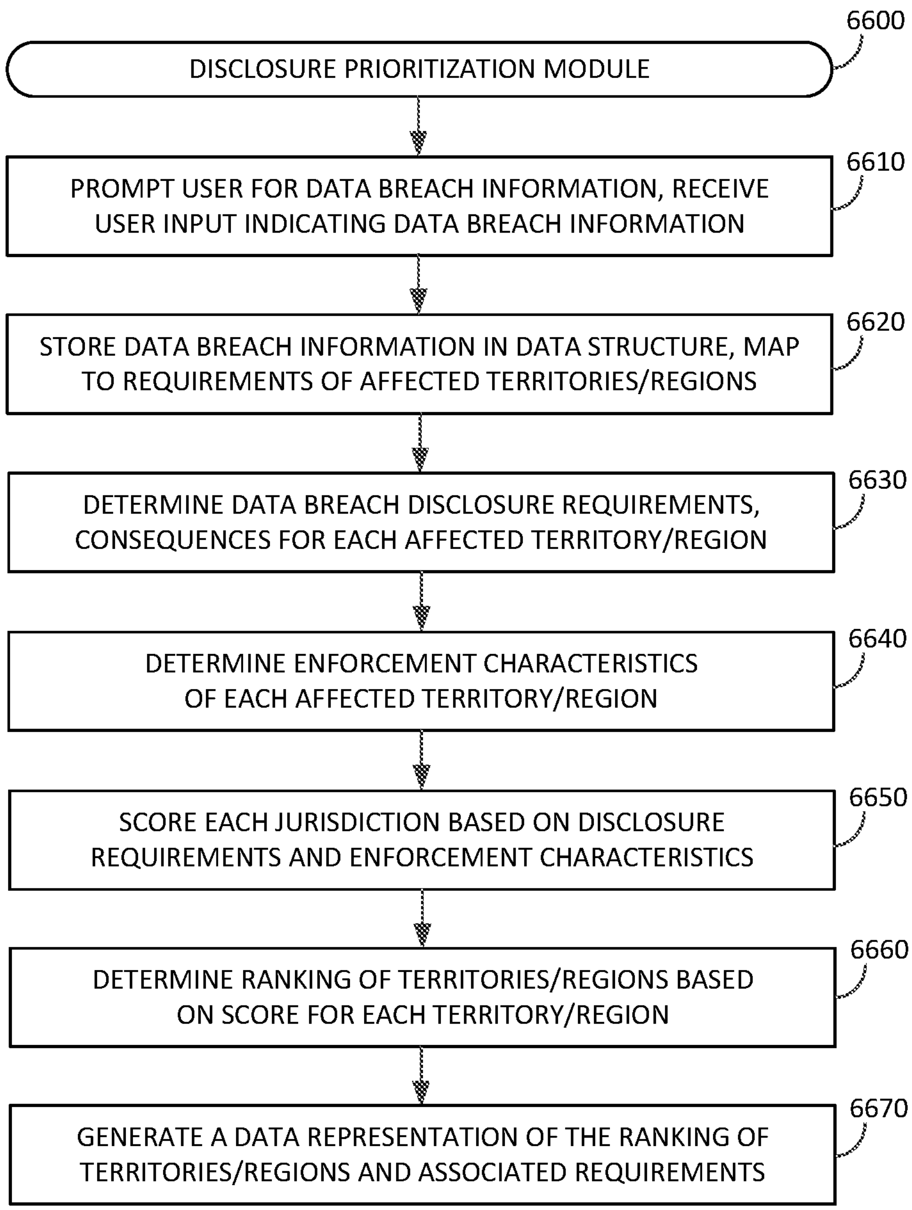
FIG. 66 is a flow chart showing an example of a process performed by the Disclosure Prioritization Module according to particular embodiments.

FIG. 66 depicts a Disclosure Prioritization Module 6600 according to a particular embodiment, which may be executed, for example, on any of the servers, devices, or computing devices described herein, or on any combination thereof. The Disclosure Prioritization Module 6600 may also generate, modify, otherwise interoperate with one or more ontologies as described herein. Note that the steps that the Disclosure Prioritization Module 6600 may perform are described here in an exemplary order. The Disclosure Prioritization Module 6600 according to various embodiments may perform any subset of these steps in any order and/or in conjunction with any one or more other functions and activities.

When executing the Disclosure Prioritization Module 6600, the system may begin, at Step 6610, by generating and presenting an interface to a user prompting the user to provide data breach information. This interface may take any form capable of presenting and collecting information from a user. In a particular embodiment, the system may generate a data breach information interface as a GUI presented on one or more computer display devices. The Disclosure Prioritization Module 6600 may use the data breach information interface to solicit any useful information about the data breach. For example, the data breach information interface may ask the user to provide an incident name, type of data involved (e.g., personal data, particular type of personal data, etc.), an amount of data involved, a number of data subjects affected, a date on which the breach was discovered (and, in some examples, a time of discovery), the jurisdictions affected, the method used to detect the data breach (e.g., manually, automatically), a name of user reporting breach, a sector affected by the breach, and/or any other information that may be of use in generating a data breach response plan. The data breach information interface may request information regarding the importance of each affected territory to the entity's business and/or any other business information that may be helpful in prioritizing efforts in responding to the disclosure requirements of multiple different territories. Further at Step 6610, the Disclosure Prioritization Module 6600 may receive the data breach information from the user via the interface.

At Step 6620, according to various embodiments, the system may store the received data breach information in a data structure that may incorporate an ontology for future use. For example, after determining the affected jurisdictions, the Disclosure Prioritization Module 6600 may generate an ontology (e.g., similar to that described in regard to the Data Structure 5400) that maps respective requirements and recommendations for compliance with a first privacy law, regulation, standard, and/or policy in a first jurisdiction to corresponding requirements and recommendations for compliance with one or more other privacy laws, regulations, standards and/or policies. The ontology generated by the Disclosure Prioritization Module 6600 may also, or alternatively, map each of the requirements and recommendations for compliance with each privacy law, regulation, standard, and/or policy in each affected jurisdiction (and, in particular embodiments, sector) to a question in a master list of questions in a master questionnaire that may be used to request information to address such requirements and recommendations (e.g., as described above). The Disclosure Prioritization Module 6600 may store the answers received at Step 6610 as answers to a master questionnaire and subsequently map those answers to the respective requirements and recommendations for compliance with for each affected jurisdiction.

At Step 6630, the Disclosure Prioritization Module 6600 may begin generating a plan for responding to the breach by first determining the data breach disclosure requirements, if any, for each applicable jurisdiction and/or sector. The Disclosure Prioritization Module 6600 may also, at step 6630, determine the consequences, if any, of failures to address these requirements. The Disclosure Prioritization Module 6600 may also, at step 6630, determine one or more recommended (e.g., but not required) actions associated with responding to the data breach in each particular jurisdiction or sector. For example, for a breach of the type indicated by the information provided by the user for each affected jurisdiction, the Disclosure Prioritization Module 6600 may determine whether disclosing the breach is required, any deadlines associated with disclosing the breach, any penalties associated with a failure to timely disclose the breach, the form of notification required in disclosing the breach, one or more recommended internal notifications (e.g., notify the entity's legal department, notify one or more particular privacy officers, etc.), and/or any other information that may be specified as required or recommended for a territory or region for data breach reporting. Such information may be obtained from one or more data structures, including one or more data structures having, or associated with, one or more ontologies as described herein.

At Step 6640, the Disclosure Prioritization Module 6600 may continue generating a plan for responding to the breach by determining one or more enforcement characteristics for each affected jurisdiction and/or sector. For example, for a breach of the type indicated by the user, the Disclosure Prioritization Module 6600 may determine, for each affected jurisdiction and/or sector, how often regulations associated with that type of breach are enforced, how often fines are imposed for not disclosing a such a breach as required, the potential liability to data subjects and/or consumers for such a breach, how other privacy officers within this and/or one or more other entities typically handle similar data breaches, and/or any other applicable information that may be useful in developing a data breach response plan. Here again, such information may be obtained from one or more data structures, including one or more data structures having, or associated with, one or more ontologies as described herein.

At Step 6650, the Disclosure Prioritization Module 6600 may determine or assign a score or grade to each region, territory, and/or sector implicated in the data breach based on the information available. For example, the Disclosure Prioritization Module 6600 may assign one or more points or a score for each of several attributes for each jurisdiction and/or sector. Such attributes may include a business importance of a jurisdiction and/or sector, a penalty associated with not satisfying requirements for a jurisdiction and/or sector, a difficulty of satisfying requirements for a jurisdiction and/or sector, the temporal proximity of a deadline for satisfying requirements for a jurisdiction and/or sector, an availability of a cure period, and/or any other criteria or attributes that may be associated with a region, territory, and/or sector and its respective data breach response requirements. The Disclosure Prioritization Module 6600 may determine a sum of such points associated with respective attributes for a particular jurisdiction and/or sector, in some embodiments applying a weight to one or more particular attributes, as a total score for that jurisdiction or sector. The Disclosure Prioritization Module 6600 may instead, or in conjunction, use other any other algorithm or method to determine a score or other indicator of the importance of each jurisdiction and/or sector relative to the other affected jurisdictions and/or sectors at Step 6650.

At Step 6660, the Disclosure Prioritization Module 6600 may rank the affected jurisdictions and/or sectors based on the scoring determined for each jurisdiction and/or sector at Step 6650. The system may generate this ranking based solely on scores or grades assigned to each affected jurisdiction/sector or may use a combination of factors that may or may not include such scoring. In particular embodiments, at Step 6660, the Disclosure Prioritization Module 6600 may determine that one or more jurisdictions and/or sectors have a score, grade, or other associated attribute(s) that indicates that the one or more jurisdictions and/or sectors should not be included in a representation of affected jurisdictions at all. For example, the Disclosure Prioritization Module 6600 may determine that, because the penalty for non-compliance in a particular territory is below a particular monetary threshold, a penalty score for that jurisdiction may be very low, zero, or even negative (e.g., to reduce the importance of an otherwise important territory due to the very low penalty for non-compliance). The Disclosure Prioritization Module 6600 may also, or instead, weight a penalty score for each jurisdiction and/or sector so that any very low or zero penalty removes the jurisdiction from a list of affected jurisdictions and/or sectors requiring a data breach report (e.g., by using a penalty score as a multiplier such that a score for the jurisdiction or sector will by zero when other scores for the jurisdiction or sector are multiplied by the penalty score). This may allow an entity to allocate its limited resources to disclosing the data breach to other territories and/or sectors that may have relatively higher monetary fines for non-disclosure by not complying in a particular jurisdiction or sector where the penalty for non-compliance is relatively inconsequential.

At Step 6670, the Disclosure Prioritization Module 6600 may generate a data representation of the requirements for each jurisdiction and/or sector and/or the ranking of the affected jurisdictions and/or sectors. Note that, at Step 6670, the Disclosure Prioritization Module 6600 may not present all such data in a single data representation. The Disclosure Prioritization Module 6600 may generate a ranked list, a heat map, or other visual representation indicating all, or a subset, of the affected jurisdictions and/or sectors. The system may allow a user to manipulate an indicator of each jurisdiction in such a representation and may, in response to detecting such manipulation, present the requirements and/or recommendations for that jurisdiction and/or sector. For example, a user may click or tap on a country represented in a heat map and the system may, in response, generate another visual representation that shows the data breach response requirements and/or recommendations for that country. Such requirements and/or recommendations may be presented in an interactive list format that allows a user to provide data indicating whether each item in such a list has been performed or to otherwise provide data and input associated with the item (e.g., a checklist).

The Disclosure Prioritization Module 6600 may present scores, rankings, data breach response requirements, and/or any other data in any of various formats. For example, the Disclosure Prioritization Module 6600 may generate visual interface presented on one or more computer monitors or display devices indicating scores, rankings, data breach response requirements, and/or any other data. In addition, or instead, the Disclosure Prioritization Module 6600 may generate one or more printed reports indicating scores, rankings, data breach response requirements, and/or any other data. In addition, or instead, the Disclosure Prioritization Module 6600 may generate one or more audible indications of scores, rankings, data breach response requirements, and/or any other data. The Disclosure Prioritization Module 6600 may generate and/or provide any other form of report or provision of scores, rankings, data breach response requirements, and/or any other data, and any combinations thereof.

Figure 67:
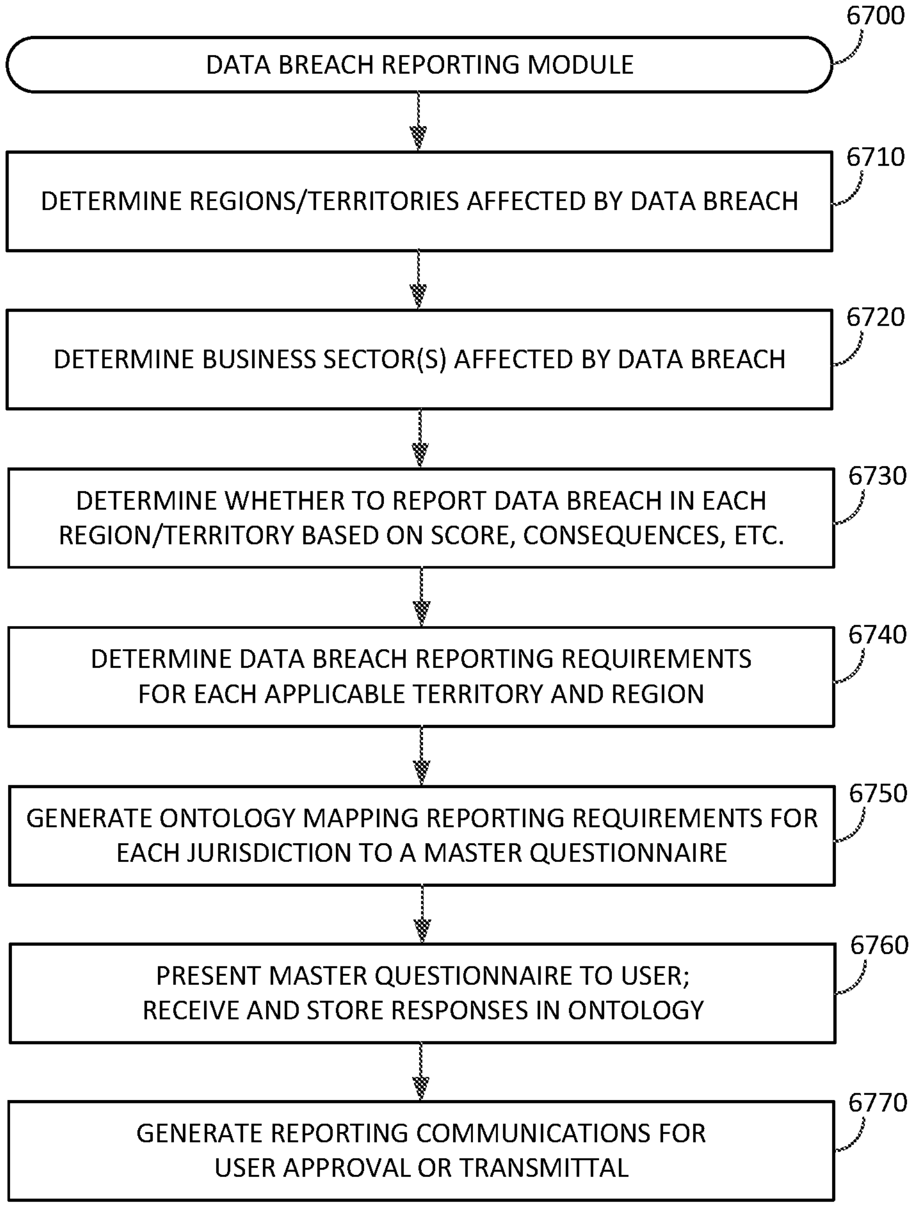
FIG. 67 is a flow chart showing an example of a process performed by the Data Breach Reporting Module according to particular embodiments.

FIG. 67 depicts a Data Breach Reporting Module 6700 according to a particular embodiment, which may be executed, for example, on any of the servers, devices, or computing devices described herein, or on any combination thereof. The Data Breach Reporting Module 6700 may also generate, modify, otherwise interoperate with one or more ontologies as described herein. Note that the steps that the Data Breach Reporting Module 6700 may perform are described here in an exemplary order. The Data Breach Reporting Module 6700 according to various embodiments may perform any subset of these steps in any order and/or in conjunction with any one or more other functions and activities.

When executing the Data Breach Reporting Module 6700, the system may begin, at Step 6710, by determining one or more jurisdictions affected by a data breach. The Data Breach Reporting Module 6700 may determine such one or more jurisdictions using a data map, questionnaire, received user input (e.g., as described herein), or any other source of information. At Step 6720, the Data Breach Reporting Module 6700 may determine one or more business sectors affected by the data breach. The Data Breach Reporting Module 6700 may determine such one or more business sectors using a data map, questionnaire, received user input (e.g., as described herein), or any other source of information. The affected business sector may be important because a jurisdiction may have different reporting requirements for data breaches in different business sectors.

At Step 6730, the Data Breach Reporting Module 6700 may determine whether the data breach should be reported in each of the one or more affected jurisdictions and business sectors. For example, the system may determine, at Step 6730, whether to include each particular jurisdiction in an ontology used to generate a master questionnaire soliciting information for reporting the data breach. In particular embodiments, the Data Breach Reporting Module 6700 may determine that the entity should not allocate limited resources to disclosing the data breach in a relatively inconsequential (e.g., based on applicable penalties for not reporting the breach) jurisdiction. For example, using one or more particular embodiments described herein, the system may determine that, for a particular territory, the penalty for non-compliance is below a particular monetary threshold (e.g., based on a penalty score assigned to that jurisdiction of zero or negative as described above). In response, the Data Breach Reporting Module 6700 may determine, at Step 6730, to not report the data breach in that particular jurisdiction. In this way, the system may avoid requesting user responses to questions in a disclosure or master questionnaire that are specific to that jurisdiction, thereby saving valuable user and entity resources.

In various embodiments, the Data Breach Reporting Module 6700 may receive or obtain a listing of jurisdictions in which reporting should be performed from a module such as the Disclosure Compliance Module 5500 or the Disclosure Prioritization Module 6600, either of which may have taken into account the relative importance of each jurisdiction and may therefore have already removed one or more affected jurisdictions based on its analysis of their consequence to the entity.

At Step 6740, the Data Breach Reporting Module 6700 may determine the particular data breach reporting requirements and recommendations, if any, for each applicable jurisdiction. For example, the Data Breach Reporting Module 6700 may determine that a letter to a regulatory agency that includes a number of affected data subjects and date of discovery of the data breach must be generated for a particular jurisdiction. The Data Breach Reporting Module 6700 may also, or instead, determine that an internal report to the entity's privacy officer that includes the amount of personal data compromised and name of the user handling the data breach is recommended to be prepared. The Data Breach Reporting Module 6700 may also, or instead, determine that a notification of the data breach must be sent to affected data subjects or consumers.

Based on the data breach reporting requirements and recommendations, at Step 6750, the Data Breach Reporting Module 6700 may generate an ontology that maps respective requirements and recommendations for compliance with the regulations in a first jurisdiction to corresponding requirements and recommendations for compliance in one or more other jurisdictions. The Data Breach Reporting Module 6700 may also, or instead, generate an ontology at Step 6750 that maps each of the requirements and recommendations for compliance with a particular regulation in a particular jurisdiction to a question in a master list of questions in a master questionnaire that may be used to request information needed to satisfy disclosure requirements in several jurisdictions.

Once a master questionnaire is generated, at Step 6760, the Data Breach Reporting Module 6700 may present the questionnaire to a user prompting the user to answer questions with information needed to properly disclose the data breach. For example, the Data Breach Reporting Module 6700 may generate an interactive graphical user interface on a computer display device that allows a user to view the questionnaire and submit data, information, and/or documentation as answers to questions in the questionnaire. In response to receiving data, information, and/or documentation for a question in the master questionnaire at Step 6760, the Data Breach Reporting Module 6700 may use the data, information, and/or documentation and the ontology to populate the data, information, and/or documentation of a corresponding question associated with a jurisdiction and required for compliance with the particular applicable regulations in that jurisdiction. In this way, the Data Breach Reporting Module 6700 may gather the required information for a reporting a data breach in several jurisdictions according to their applicable laws, and regulations using a single master questionnaire rather than a different questionnaire per jurisdiction. For example, the Data Breach Reporting Module 6700 may prompt the user to input answers (e.g., number of data subject affected, date of breach discovery, amount of personal data compromised, etc.) to each respective question in the master questionnaire. The Data Breach Reporting Module 6700 may then map the answer to each of these questions to the respective answer to any corresponding questions in the questionnaires for any jurisdiction as appropriate.

At Step 6770, using the data collected and organized using an ontology at Step 6760, the Data Breach Reporting Module 6700 may generate the communications (e.g., a regulatory report or a report to a regulatory body) required for data breach reporting for a particular jurisdiction. The Data Breach Reporting Module 6700 may format, and/or transmit such reports based on the requirements of the particular jurisdiction for which the report is generated. These communications may be presented to a user for approval or further modification before transmission to a regulatory agency or may be transmitted (e.g., automatically) to a regulatory agency.

Figure 68:
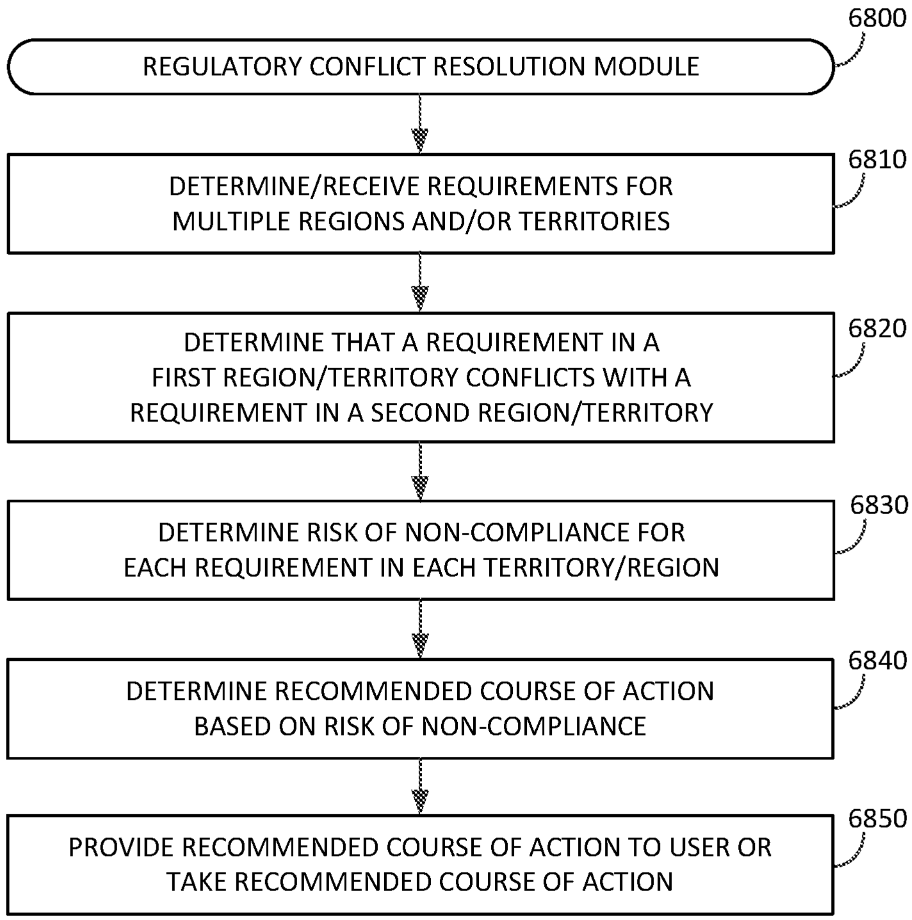
FIG. 68 is a flow chart showing an example of a process performed by the Regulatory Conflict Resolution Module according to particular embodiments.

FIG. 68 depicts a Regulatory Conflict Resolution Module 6800 according to a particular embodiment, which may be executed, for example, on any of the servers, devices, or computing devices described herein, or on any combination thereof. The Regulatory Conflict Resolution Module 6800 may also generate, modify, otherwise interoperate with one or more ontologies as described herein. Note that the steps that the Regulatory Conflict Resolution Module 6800 may perform are described here in an exemplary order. The Regulatory Conflict Resolution Module 6800 according to various embodiments may perform any subset of these steps in any order and/or in conjunction with any one or more other functions and activities.

When executing the Regulatory Conflict Resolution Module 6800, the system may begin, at Step 6810, by determining, receiving, or otherwise obtaining requirements (e.g., regulations, standards, laws, other requirements, etc.) for multiple jurisdictions (e.g., territories, regions, etc.) and/or sectors. For example, the Regulatory Conflict Resolution Module 6800 may determine such one or more requirements using a data map, questionnaire, received user input (e.g., as described herein), or any other source of information (e.g., as part of collecting data breach requirements; as part of determining compliance for a particular jurisdiction or standard, etc.) At Step 6820, the Regulatory Conflict Resolution Module 6800 may determine a requirement for a first jurisdiction and/or sector conflicts with a similar requirement in a second jurisdiction and/or sector. For example, the Regulatory Conflict Resolution Module 6800 may determine that a first territory requires that the entity stores collected personal data for no longer than 90 days while a second territory requires that the entity stores collected personal data for at least 90 days. In another example, the Regulatory Conflict Resolution Module 6800 may determine that a first sector in a particular territory requires that the entity report a data breach in a first time and manner that is incompatible with the data breach time and manner reporting requirements for a second sector in that particular territory. The system may detect any type of conflict and number of conflicts between regulations, requirements, etc. of any set of regulations or standards.

At Step 6830, the Regulatory Conflict Resolution Module 6800 may determine a risk of non-compliance with each of the regulations that is in conflict with another regulations. For example, the system may determine that failure to delete collected personal data after 90 days in a first territory that requires it incurs only a small yearly monetary fine if such a failure is detected in an audit that is rarely performed. The system may further determine that failure to retain collected personal data beyond 90 days in a second territory that requires it incurs an immediate suspension of the entity's business license and a large monetary fine if such a failure is detected in routinely performed monthly audits. In this example, the system may determine that the risk in the first territory is much less than the risk in the second territory.

In particular embodiments, the system may also, or instead, take into account the business risk involved in non-compliance of conflicting requirements. For example, the system may determine that the risk of non-compliance is much lower in jurisdictions and/or sectors where the entity has few customers (e.g., below a threshold number of customers, such as 10, 50, 100, etc.) and/or much higher in jurisdictions and/or sectors where the entity has many customers (e.g., above a threshold number of customers, such as 100,000, 1,000,000 etc.). In particular embodiments, the system may use a scoring method to determine risk that takes into account several attributes or factors, each of which may be weighted based on various criteria. For example, at Step 6830, the Regulatory Conflict Resolution Module 6800 may use the scores generated by the Disclosure Prioritization Module 6600 to determine, at least in part, the risk of non-compliance with conflicting data breach reporting requirements. The system may use any other methods and algorithms to determine risk, including those dedicated to such risk determination. The system may also use any criteria for determining risk, including, but not limited to, a risk of audit, a past history in a particular jurisdiction and/or sector, a history of how an entity has addressed similar conflicts in the past, how similar entities have addressed similar conflicts, a volume of data processed in a particular jurisdiction and/or sector, types of services offered in a particular jurisdiction and/or sector, business goals in a particular jurisdiction and/or sector, etc.

At Step 6840, the Regulatory Conflict Resolution Module 6800 may determine a particular recommended course of action based on the risk determinations of Step 6830. For example, the Regulatory Conflict Resolution Module 6800 may compare the risks of non-compliance determined at Step 6830 and determine to recommend complying with the least risky requirement. Alternatively, the system may determine to report the conflict and seek user input regarding the course of action to be taken.

At Step 6850, the Regulatory Conflict Resolution Module 6800 may provide the recommended course of action to a user, for example, via a graphical user interface. Alternatively, the Regulatory Conflict Resolution Module 6800 may proceed with the course of action automatically, for example, if configured to do so. Such courses of action may include any activity or function described herein, including those relating to complying with data breach disclosure requirements or requirements for compliance with any regulation, requirements, rules, standards, etc.

Figure 69:
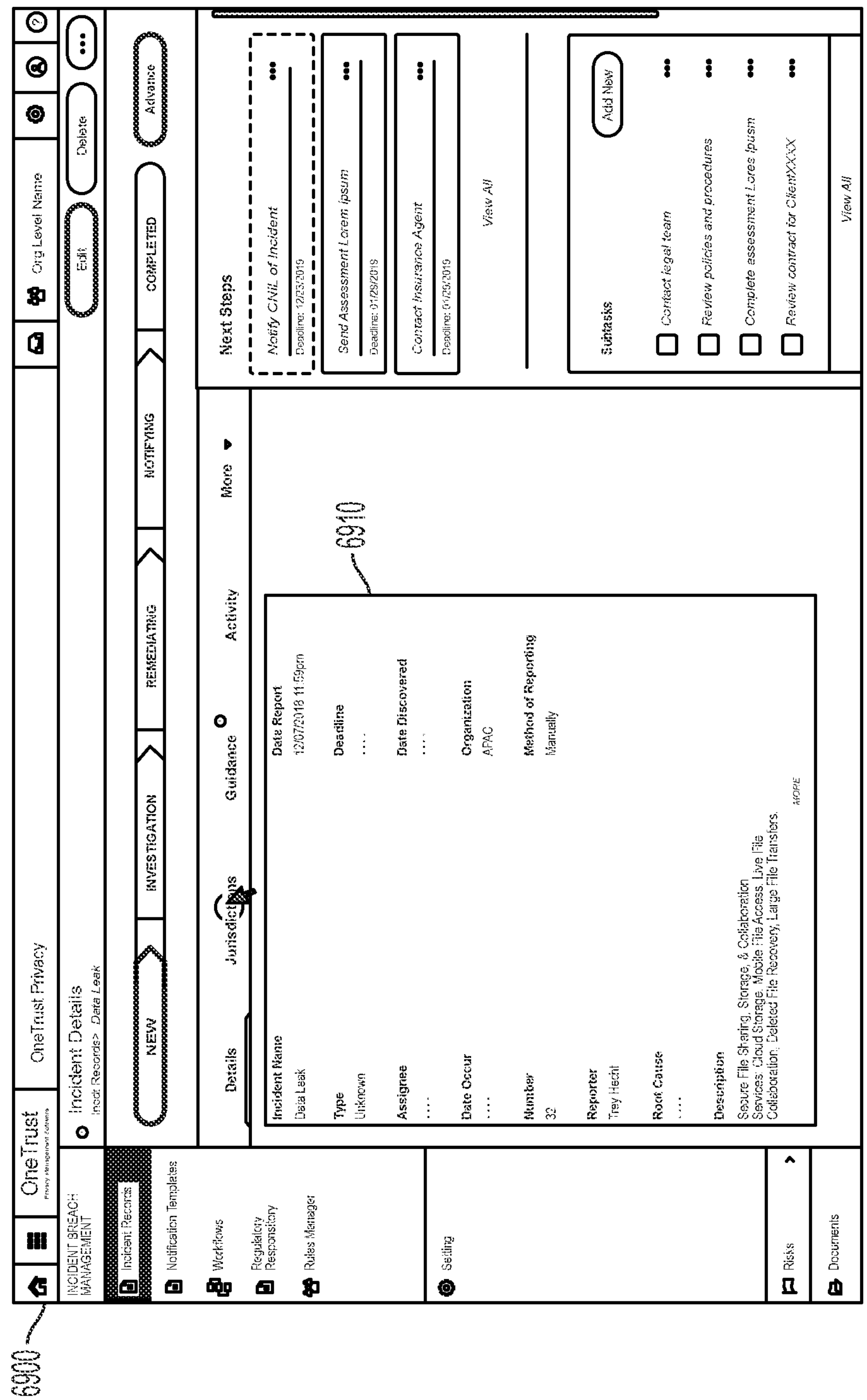
FIG. 69 is an example of a GUI allowing user entry of data breach information for disclosure requirement analysis and data breach reporting.

The disclosed systems may generate GUIs that may facilitate implementation of the disclosed subject matter, examples of which will now be described in greater detail. FIG. 69 illustrates an exemplary interface 6900. A system may generate the interface 6900 on a computing device and may present the interface 6900 on a display device. In some embodiments, the system may generate the interface 6900 as a webpage presented within a web browser. The system may generate the interface 6900 in response to detecting the activation of a control indicating that a data breach has been discovered.

The interface 6900 may include data entry area 6910 that allow a user to input details about the data breach. The interface 6900 may allow the entry, in data entry area 6910, of any data breach information described herein, and any other data breach information. For example, interface 6900 may allow the entry of a number of data subjects affected, a volume or quantity of data compromised, a type of personal data compromised, a data breach discovery date and/or time, a data breach occurrence date and/or time, a data breach reporting date and/or time, a name of the data breach discovering user or organization, a method of receiving a report of the data breach, a description of the data breach, one or more business sectors affected by the data breach, and/or a name of the particular data breach. The interface 6900 may also allow submission of one or more affected jurisdictions, but in other embodiments jurisdictions may be provided at a different interface, such as interface 7000 of FIG. 70.

Figure 70:
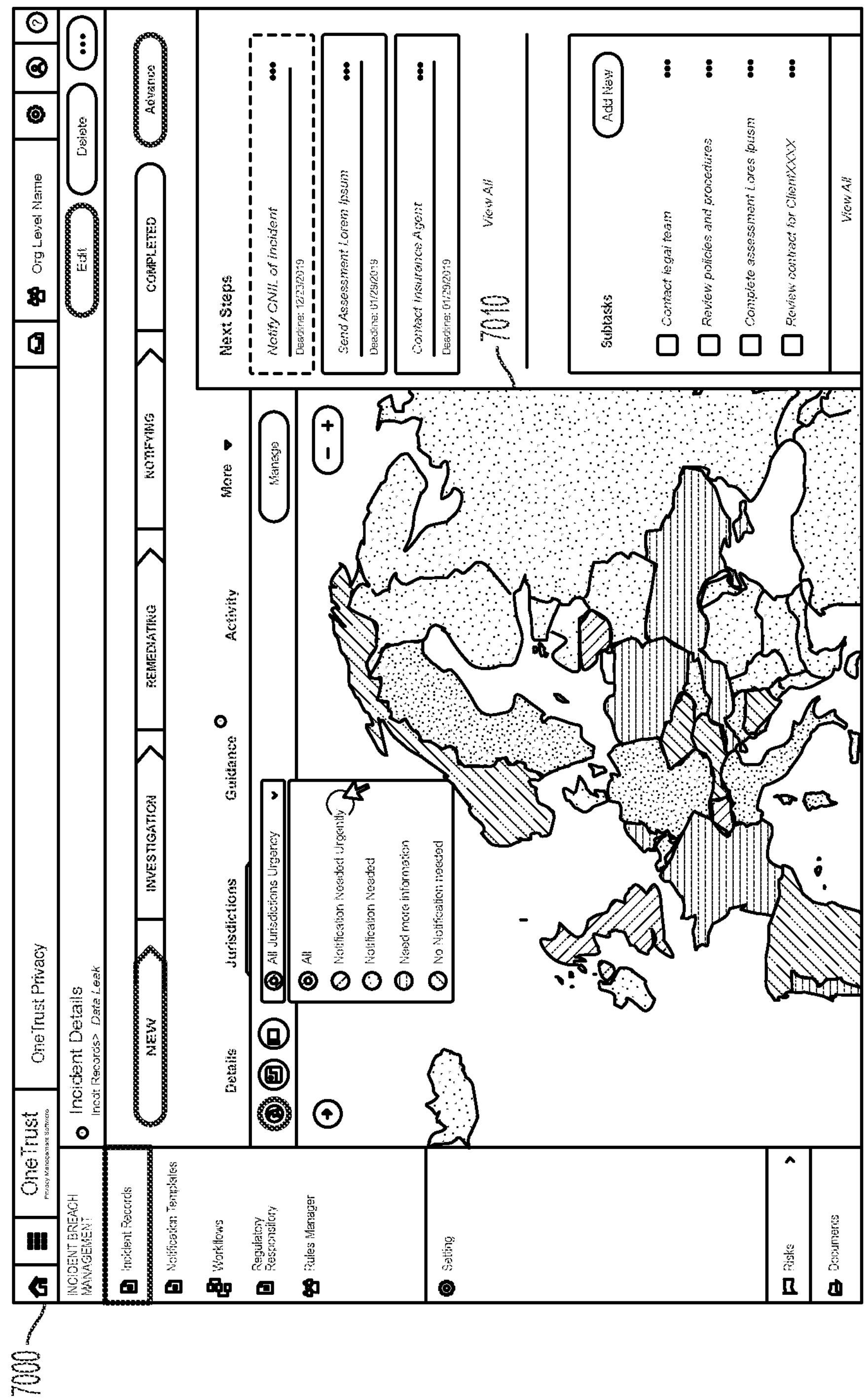
FIG. 70 is an example of another GUI allowing user entry of data breach information for disclosure requirement analysis and data breach reporting.

FIG. 70 illustrates an exemplary interface 7000. A system may generate the interface 7000 on a computing device and may present the interface 7000 on a display device. In some embodiments, the system may generate the interface 7000 as a webpage presented within a web browser. The system may generate the interface 7000 in response to detecting the activation of a control indicating that a data breach has been discovered or in response to detecting an indication that information has been received from an earlier presented interface, such as the interface 6900 of FIG. 69.

The interface 7000 may include a data entry area 7010 that allow a user to input details about one or more jurisdictions and/or sectors affected by the data breach. The interface 7000 may allow a user to indicate one or more affected jurisdictions, in the data entry area 7010, by selection of jurisdictions from a map that may include all or a subset of the jurisdictions in which the entity conducts business. In another example, the interface 7000 may allow a user to indicate one or more affected jurisdictions and/or sectors by selecting jurisdictions and/or sectors from a list of jurisdictions and/or sectors in which the entity conducts business. In another example, the interface 7000 may allow a user to indicate one or more affected jurisdictions and/or sectors by entry of the jurisdictions and/or sectors into a text box. In various other embodiments, any method of collecting affected jurisdiction and/or sector information may be used.

As described herein, once jurisdiction, sector, and/or other data breach information has been collected, the system may determine data breach disclosure and reporting requirement for each affected jurisdiction and/or sector (e.g., as performed by the Disclosure Compliance Module 5500, the Disclosure Prioritization Module 6600, the Data Breach Reporting Module 6700, and/or in any other suitable manner). The system may also determine a score or urgency value for each affected jurisdiction and may rank the affected jurisdictions and/or sectors, in some embodiments, removing those for which there are no consequential penalties for failing to report the data breach. In particular embodiments, the system may also, or instead, remove particular jurisdictions and/or sectors from a ranking for which a regulatory conflict analysis has determined that those particular jurisdictions and/or sectors have a lower risk of non-compliance than others that may be left in the ranking. In various embodiments, the system may present affected jurisdictions in a heat map, with various colors and/or textures used to indicate the relative urgency of data breach reporting for each jurisdiction. In other embodiments, the system may generate a listing in order of urgency of the affected jurisdictions and/or sectors. In still other embodiments, other methods may be used to present the affected jurisdictions and/or sectors and their respective data breach reporting urgency.

Also as described herein, the system may generate an interactive list of items that should be addressed in the event of a data breach. For example, the system may generate a listing of actions required by the laws, regulations, standards, and/or policies associated with a respective jurisdiction and/or sector. The listing may include inputs that allow a user to "check off" items as they are completed, or to otherwise provide information related to that item. Any such listing may be ordered based on the urgency, ranking, or other priority as described herein. For example, the system may place items required to be completed sooner and/or subject to a higher non-compliance penalty than other items earlier in a list, for example, based on a score assigned to each item and/or to its respective jurisdiction or sector. In another example, the system may place items that do not have an associated cure period earlier in a list, for example, based on a score assigned to each item and/or to its respective jurisdiction or sector.

Figure 71:
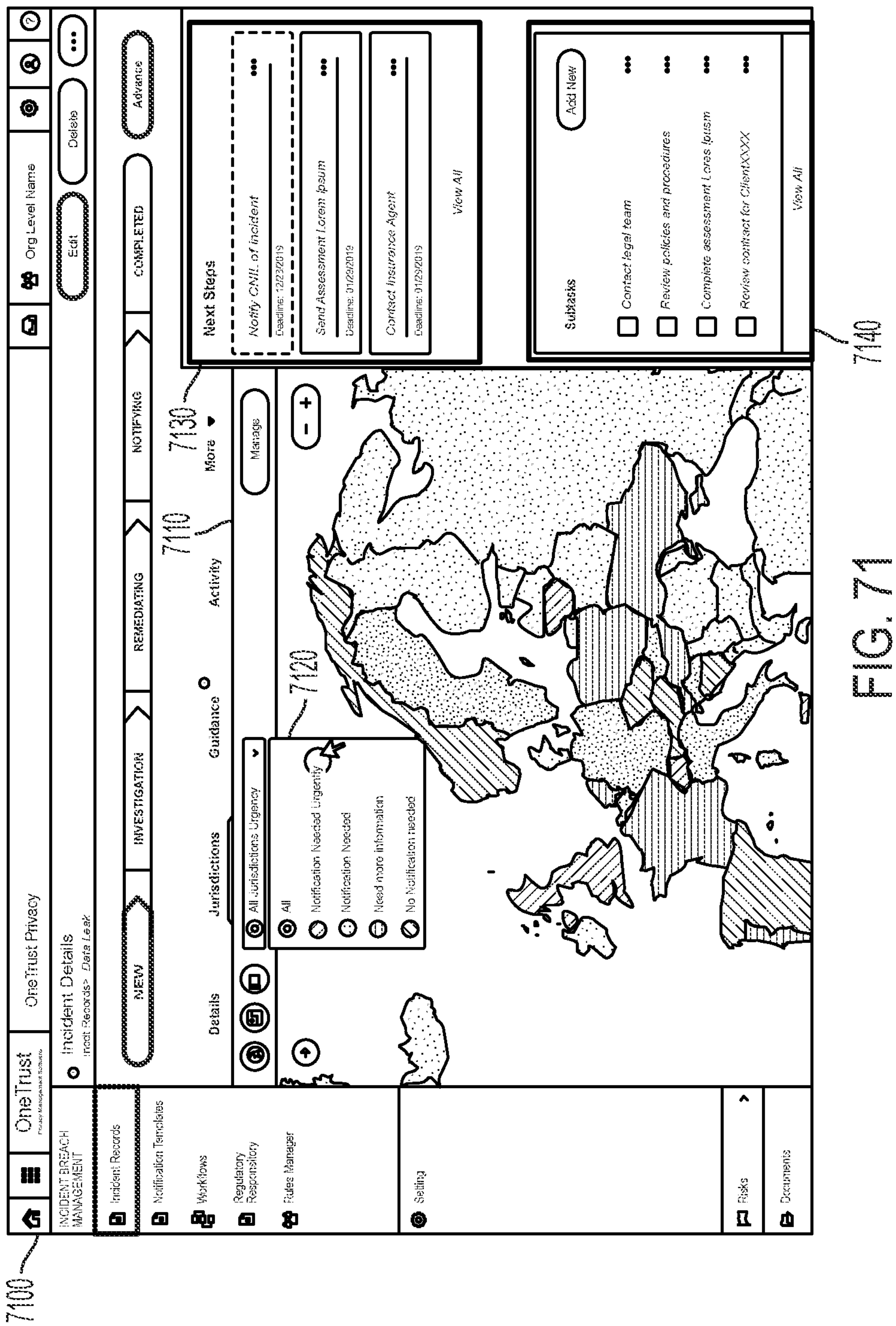
FIG. 71 is an example of a GUI showing a heat map of jurisdictions in which reporting of a data breach may be required and associated reporting tasks.

In the example shown in FIG. 71, the system may generate an exemplary interface 7100 that may include a heat map 7110. The heat map 7110 may indicate various jurisdictions, at least a subset of which may include one or more jurisdictions affected by the data breach. The system may color code and/or generate texture for each affected jurisdiction as shown in the heat map 7110. The interface 7100 may include legend 7120 that may indicate the values or descriptions of the urgency associated with each color shown in the heat map 7110. The system may also, or instead, use coloring and/or texture to indicate the affected business sector in each affected jurisdiction.

The interface 7100 may also include one or more listings of tasks to be performed and/or recommended next steps, each of which may be presented in order of importance or urgency. For example, the listing 7130 may provide a list of steps that are recommended and/or required to be performed in response to a data breach. The listing 7130 may include items that are generally required and/or applicable to more than one affected jurisdiction and/or sectors (e.g., instead of items associated with only one jurisdiction). The listing 7130 may include items ordered by urgency, which the system may have determined based on a score or other value assigned to each item. The system may provide a check box for each of the items in the listing 7130. Upon completion of an item, a user may select the check box for that item. In various embodiments, the system may remove that item from the listing 7130 and/or make a record of item completion and no longer present that item to a user as part of a list of incomplete data breach response activities. The system may also provide a mechanism allowing the assignment of each item in the listing 7130 to a particular user or to an organization. Upon assignment to a particular user or organization, the system may remove that item from the listing 7130 and/or make a record of item completion and no longer present that item to a user as part of a list of incomplete data breach response activities. Alternatively, the system may leave any assigned items on the listing 7130 until the assigned user or organization provides an indication or confirmation that the item has been completed.

Each of the items in the listing 7130 may have one or more associated tasks to be performed. For example, for the highlighted first item in the listing 7130, the system may generate a listing of tasks associated with the item may be provided in the subtask listing 7140. The subtask listing 7140 may include tasks ordered by urgency, which, as for items in the listing 7130, the system may have determined based on a score or other value assigned to each task. The system may provide a check box for each of the tasks in the subtask listing 7140. Upon completion of a task, a user may select the check box for that task. In various embodiments, the system may remove that task from the subtask listing 7140 and/or make a record of task completion and no longer present that task to a user as part of a list of incomplete data breach response activities. The system may also provide a mechanism allowing the assignment of each task in the subtask listing 7140 to a particular user or to an organization. Upon assignment to a particular user or organization, the system may remove that task from the subtask listing 7140 and/or make a record of task completion and no longer present that task to a user as part of a list of incomplete data breach response activities. Alternatively, the system may leave any assigned tasks on the subtask listing 7140 until the assigned user or organization provides an indication or confirmation that the task has been completed.

Figure 72:
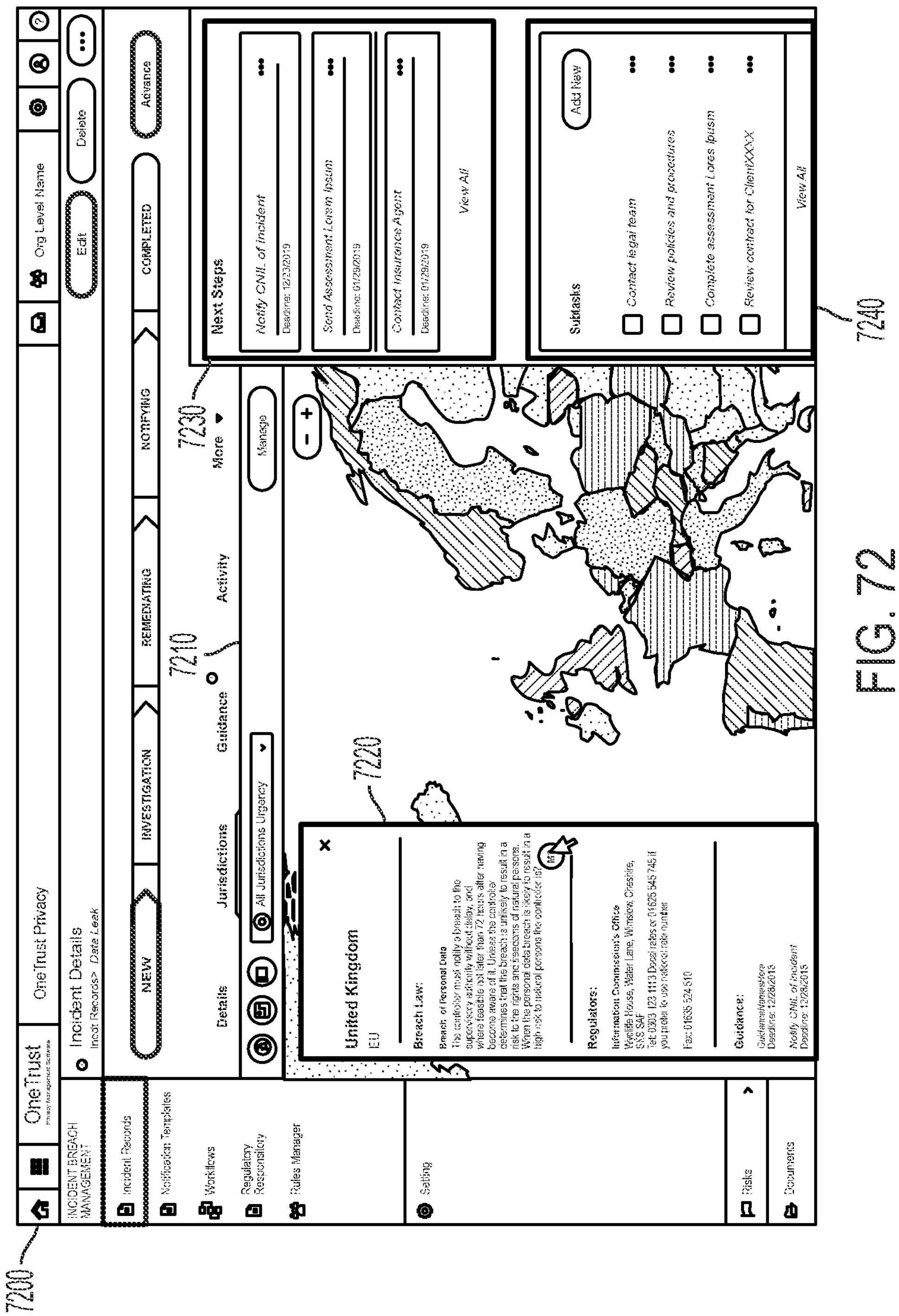
FIG. 72 is an example of a GUI showing a map of jurisdictions in which reporting of a data breach may be required and associated reporting tasks.

As described herein, the system may be configured to display detailed information regarding a particular jurisdiction's disclosure requirements in response to a user selecting the jurisdiction on a heat map or from a listing of affected jurisdictions. In the example shown in FIG. 72, the system may generate an exemplary interface 7200 that may include a heat map 7210. The heat map 7210 may indicate various jurisdictions (e.g., geographical territories, regions), at least a subset of which may include one or more jurisdictions affected by the data breach. The system may color code and/or add texture to each affected jurisdiction as shown in the heat map 7210. Upon selection of an affected jurisdiction (the United Kingdom in the particular example of FIG. 72), the interface 7200 may generate data breach response details 7220 that may provide details about the recommended and/or required data breach response actions for the selected jurisdiction.

The interface 7200 may also include listings of tasks to be performed and/or recommended next steps, each of which may be presented in order of importance or urgency. For example, the listing 7230 may provide a list of steps recommended and/or required to be performed in response to a data breach. The listing 7230 may include items that are particularly required and/or applicable to the selected affected jurisdiction or sector (the United Kingdom in the particular example of FIG. 72). Alternatively, the listing 7230 may include items that are generally required and/or applicable to more than one affected jurisdiction or sector, while data breach response details 7220 may provide details about the recommended and/or required data breach response actions for the selected jurisdiction or sector (e.g., in the particular example of FIG. 72, the listing 7230 may show items that are generally required and/or applicable to multiple jurisdictions and/or sectors, while data breach response details 7220 may show items particularly relevant to the United Kingdom). The listing 7230 may include items ordered by urgency, which the system may have determined based on a score or other value assigned to each item. The system may provide a check box for each of the items in the listing 7230. Upon completion of an item, a user may select the check box for that item. In various embodiments, the system may remove that item from the listing 7230 and/or make a record of item completion and no longer present that item to a user as part of a list of incomplete data breach response activities. The system may also provide a mechanism allowing the assignment of each item in the listing 7230 to a particular user or to an organization. Upon assignment to a particular user or organization, the system may remove that item from the listing 7230 and/or make a record of item completion and no longer present that item to a user as part of a list of incomplete data breach response activities. Alternatively, the system may leave any assigned items on the listing 7230 until the assigned user or organization provides an indication or confirmation that the item has been completed.

The system may determine one or more associated tasks to be performed for each of the items in the listing 7230. For example, for the highlighted first item in the listing 7230, a listing of tasks associated with that particular item may be provided in the subtask listing 7240. The subtask listing 7240 may include tasks ordered by urgency, which, as for items in the listing 7230, the system may have determined based on a score or other value assigned to each task. The system may provide a check box for each of the tasks in the subtask listing 7240. Upon completion of a task, a user may select the check box for that task. In various embodiments, the system may remove that task from the subtask listing 7240 and/or make a record of task completion and no longer present that task to a user as part of a list of incomplete data breach response activities. The system may also provide a mechanism allowing the assignment of each task in the subtask listing 7240 to a particular user or organization. Upon assignment to a particular user or organization, the system may remove that task from the subtask listing 7240 and/or make a record of task completion and no longer present that item to a user as part of a list of incomplete data breach response activities. Alternatively, the system may leave any assigned tasks on the subtask listing 7240 until the assigned user or organization provides an indication or confirmation that the task has been completed.

Figure 73:
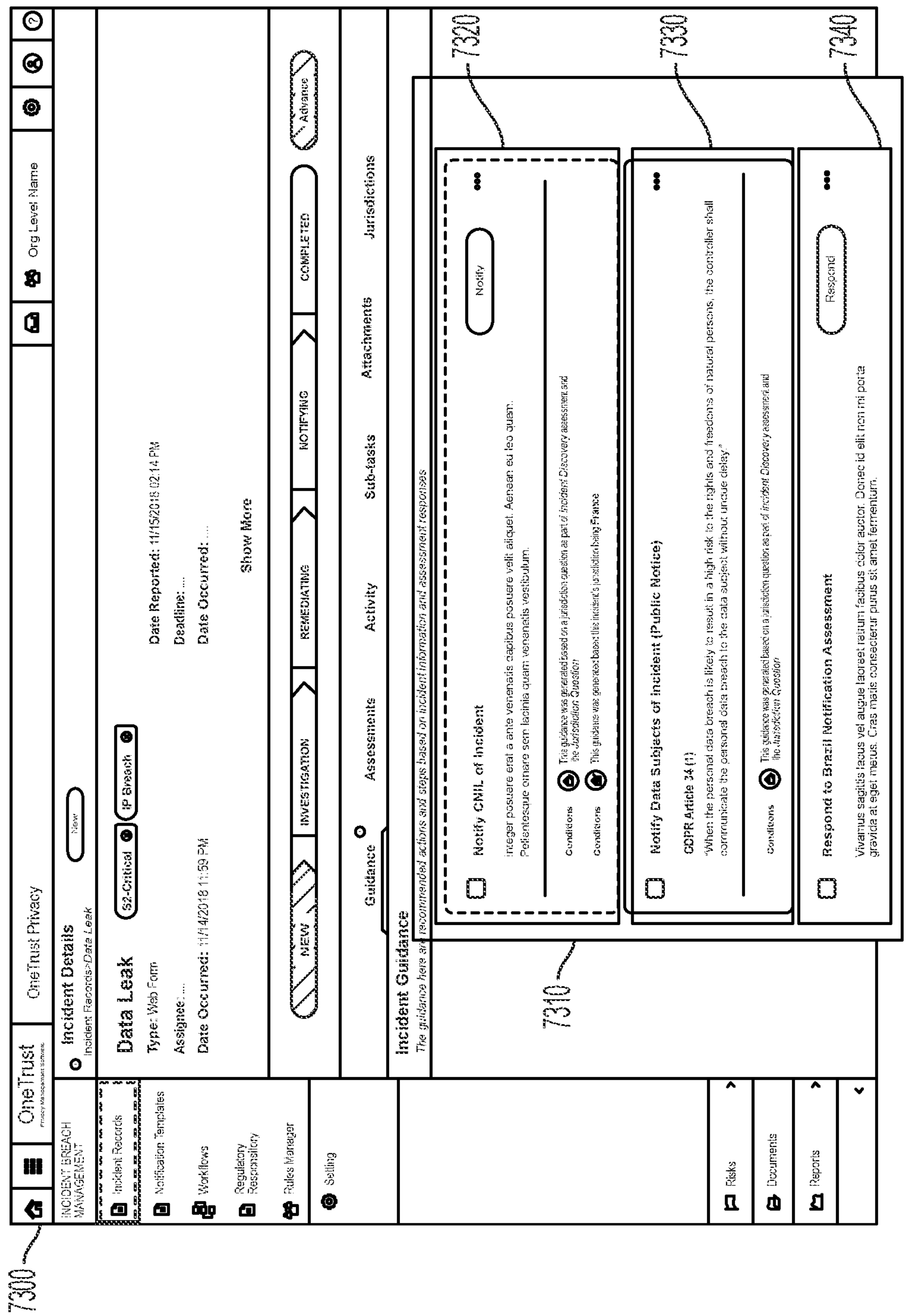
FIG. 73 is an example of a GUI showing a listing of data breach reporting tasks.

In the example shown in FIG. 73, the system may generate an exemplary interface 7300 that may include a listing 7310 of one or more items required to be performed in response to a data breach. The listing 7310 may include items 7320, 7330, and 7340 that may be ordered by urgency or otherwise ranked based on a score or other value determined by the system and assigned to each item, for example, as described herein. For example, the item 7320 may have the highest urgency score, and therefore is listed first, followed by the item 7330, which may have the second highest urgency score, and then followed by the item 7340, which may have the third highest urgency score. Each of the items 7320, 7330, and 7340 may include a summary or a detailed description of its requirements and associated characteristics, such as the jurisdiction and/or sector to which the item corresponds. Items that may typically be required for compliance may be removed from a list such as the listing 7310 due to conflict-of-laws decisions made earlier, as described above.

The system may present a check box for each of the items 7320, 7330, and 7340 in the interface 7300. Upon completion of an item, a user may select the check box for that item. In various embodiments, the system may remove that item from its listing of required items and/or make a record of item completion and no longer present that item to a user as part of a list of incomplete data breach response activities. The system may also provide a mechanism allowing the assignment of each of the items 7320, 7330, and 7340 in interface 7300 to a particular user or organization. Upon assignment to a particular user or organization, the system may remove that item from the listing 7310 and/or make a record of item completion and no longer present that item to a user as part of a list of incomplete data breach response activities. Alternatively, the system may leave any assigned items on the listing 7310 until the assigned user or organization provides an indication or confirmation that the item has been completed.

Figure 74:
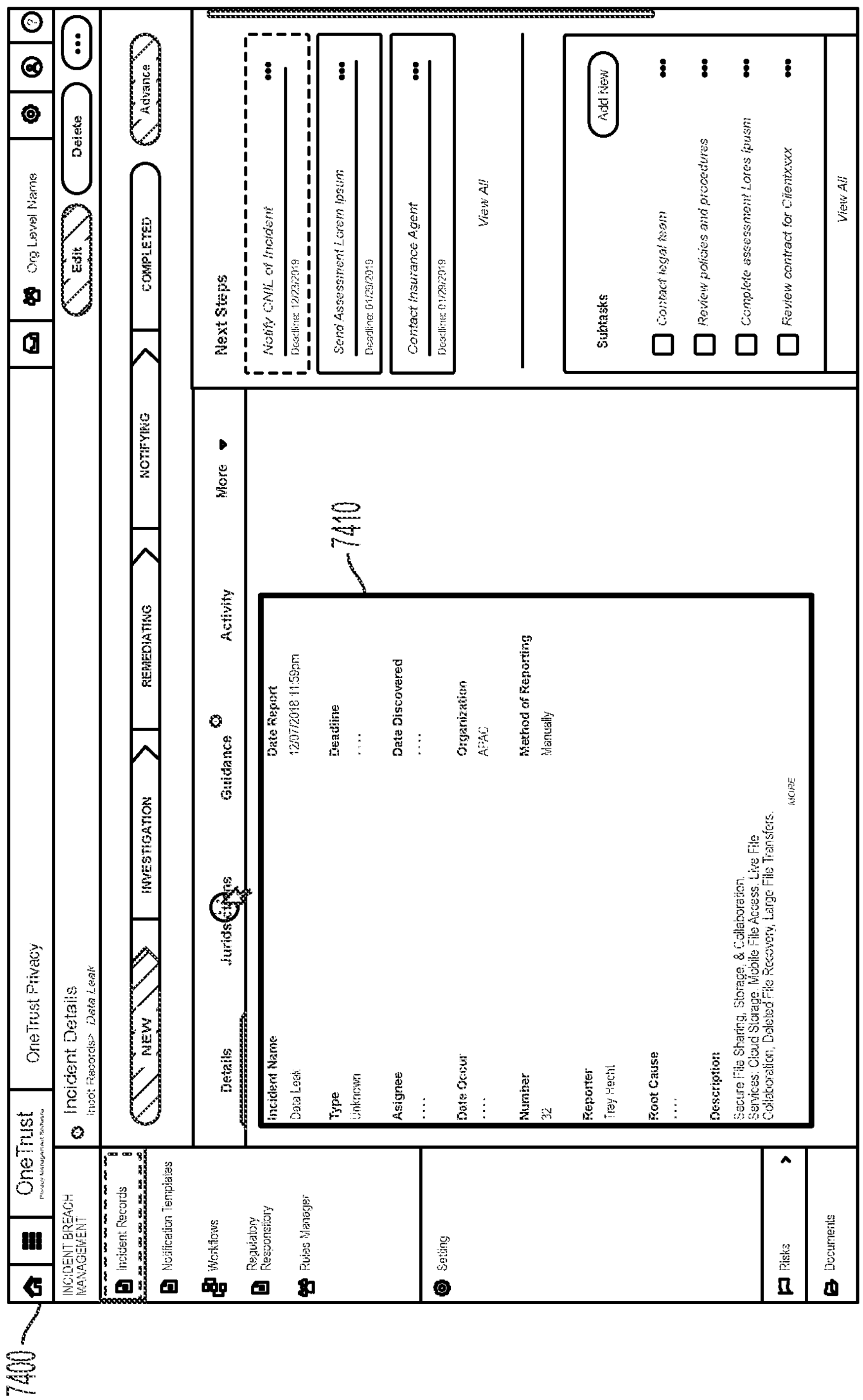
FIG. 74 is an example of a GUI allowing user entry of information as response to questions in a master questionnaire.

As described herein, the system may determine which affected jurisdictions and/or sectors require reporting of data breaches. The system may use information collected via a master questionnaire to populate a data structure that uses an ontology to map answers to questions in the master questionnaire to questions associated with particular jurisdictions and/or sectors. In the example shown in FIG. 74, an exemplary interface 7400 may include questions 7410 from a master questionnaire that allow a user to input answers to each question in the master questionnaire. The interface 7400 may allow the entry, via questions 7410 from the master questionnaire, of any data breach information described herein or otherwise and/or that may be needed to complete the data breach reporting requirements for one or more jurisdictions. For example, questions 7410 may include questions soliciting a number of data subjects affected, a volume or quantity of data compromised, a type of personal data compromised, a data breach discovery date and/or time, a data breach occurrence date and/or time, a data breach reporting date and/or time, a method of receiving a report of the data breach, a business sector affected by the breach, and/or a description of the data breach. In response to receiving the data breach information as answers to the questions 7410, the system may map the answers to respective questions in particular questionnaires for particular jurisdictions as described herein.

In various embodiments, the system may present questions in a master questionnaire, such questions 7410 from a master questionnaire, in an order that corresponds to the order of such questions in corresponding reporting documents or other communications. This may make it easier for a user to prepare and finalize the reporting communications or documentation for each jurisdiction and/or sector. Alternatively, or in addition, the system may present questions in an order that allows the system to take into account internal conflict-of-laws logic by addressing such conflicts in turn.

To further illustrate the disclosed embodiments, an example will now be provided. This example is only intended to further illustrate exemplary aspects of the various embodiments and is not intended to provide any limitations to any embodiments of the disclosed subject matter.

In an example, a business may determine that a breach of personal data or personal information has occurred. The business may determine that 500,000 user accounts having personal data or personal information for users in the U.S. and Canada have been accessed by an unauthorized system. Each such user account may include a user's first name and last name and at least one credit card number. In response, an employee of the business may operate a system, such as those described herein, to interact with one or more interfaces (e.g., as described in regard to interface 6900, interface 7000, etc.) to provide incident information, such as the type of data compromised (here, names and credit card numbers), the affected jurisdictions (in this example, the U.S. and Canada), a number of compromised accounts (in this example, 500,000), and a date of discovery of the breach. The employee may provide any other useful information to the system. The system may then process the information (e.g., as performed by the Disclosure Compliance Module 5500, the Disclosure Prioritization Module 6600, the Data Breach Reporting Module 6700, and/or in any other suitable manner) and present the next steps to the employee regarding reporting requirements, for example, in a prioritized listing (e.g., as described in regard to interfaces 7100, 7200, 7300, 7400). For example, the system may provide a listing that includes supplying a notification to the business's legal department, supplying a notification to a California regulatory agency, and supplying a notification to a Canadian regulatory agency, in that order. The system may also include penalties associated with each step, such as the potential civil penalties for failure to provide the notifications to the California regulatory agency and the Canadian regulatory agency. Alternatively, the system may substantially automatically take actions to report or otherwise address the breach as described herein. As the user completes the steps provided by the system, the user may provide information via an interface (e.g., as described in regard to interfaces 7100, 7200, 7300, 7400) that the system may use to track the completion of the steps. The system may then, automatically or upon demand, update the listing of steps to remove completed steps and/or add additional steps based on newly received information.

CONCLUSION

Although embodiments above are described in reference to various systems and methods for assessing the risk associated with particular vendors, it should be understood that any applicable concept described herein could be done with entities other than vendors—for example business partners other than vendors, tenants in the context of landlord/tenant relationships, etc.

Also, although embodiments above are described in reference to various systems and methods for creating and managing data flows related to individual privacy campaigns, it should be understood that various aspects of the system described above may be applicable to other privacy-related systems, or to other types of systems, in general. For example, the functionality described above for obtaining the answers to various questions (e.g., assigning individual questions or sections of questions to multiple different users, facilitating collaboration between the users as they complete the questions, automatically reminding users to complete their assigned questions, and other aspects of the systems and methods described above) may be used within the context of Privacy Impact Assessments (e.g., in having users answer certain questions to determine whether a certain project complies with an organization's privacy policies).

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Many modifications and other embodiments of the invention will come to mind to one skilled in the art to which this invention pertains having the benefit of the teachings presented in the foregoing descriptions and the associated drawings. While examples discussed above cover the use of various embodiments in the context of operationalizing privacy compliance and assessing risk of privacy campaigns, various embodiments may be used in any other suitable context. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A method comprising:

generating, by computing hardware, a graphical user interface based on a master compliance readiness questionnaire for a first set of requirements for a first regulation and a second set of requirements for a second regulation applicable to operations performed by an entity, wherein generating the graphical user interface comprises:

configuring a first prompt for requesting a first answer to a first master question of the master compliance readiness questionnaire, and configuring a second prompt for requesting a second answer to a second master question of the master compliance readiness questionnaire;

providing, by the computing hardware, the graphical user interface for display, wherein displaying the graphical user interface involves providing the first prompt requesting the first answer to the first master question and providing the second prompt requesting the second answer to the second master question;

receiving, by the computing hardware, the first answer and the second answer;

accessing, by the computing hardware, an ontology that maps a data structure to the first set of requirements and the second set of requirements, wherein the data structure is configured to be populated via the master compliance readiness questionnaire;

updating, by the computing hardware, a first element of the data structure for the entity with the first answer, wherein the ontology maps the first element to a first requirement of the first set of requirements and a first requirement of the second set of requirements;

updating, by the computing hardware, a second element of the data structure for the entity with the second answer, wherein the ontology maps the second element to a second requirement of the first set of requirements and a second requirement of the second set of requirements;

determining, by the computing hardware, a first percentage of compliance with the first regulation based on the first element of the data structure that has been updated with the first answer and the second element of the data structure that has been updated with the second answer;

determining, by the computing hardware, a second percentage of compliance with the second regulation based on the first element of the data structure that has been updated with the first answer, the second element of the data structure that has been updated with the second answer, and a third element of the data structure having a mapping via the ontology to the second set of requirements and lacking a mapping via the ontology to the first set of requirements; and updating, by the computing hardware, the graphical user interface to present the first percentage of compliance and the second percentage of compliance.

2. The method of claim 1, wherein updating the graphical user interface to present the first percentage of compliance and the second percentage of compliance comprises:

generating a comparison between the first percentage of compliance and the second percentage of compliance; and updating the graphical user interface to present the comparison.

3. The method of claim 1, wherein the first regulation and the second regulation are related to at least one of: an environmental, social, and governance framework; an industry standard; or a privacy standard.

4. The method of claim 1, wherein the graphical user interface is configured with a list of regulations and the method further comprises:

receiving, by the computing hardware, a first indication of a selection of the first regulation from the list of regulations; and receiving, by the computing hardware, a second indication of a selection of the second regulation from the list of regulations.

5. The method of claim 1 further comprising:

receiving, by the computing hardware, supporting data associated with the first answer; and determining, by the computing hardware, a confidence level for the first answer, wherein:

the supporting data substantiates the first answer, the confidence level for the first answer represents a confidence that the entity complies with at least one of the first requirement of the first set of requirements or the first requirement of the second set of requirements, and at least one of the first percentage of compliance or the second percentage of compliance is determined based on the confidence level for the first answer.

6. The method of claim 5, wherein determining the confidence level for the first answer is based on a source of the supporting data.

7. The method of claim 5, wherein the supporting data comprises at least one of unsubstantiated data provided by the entity, substantiated data based on a remote interview with the entity, or substantiated data based on an audit of the entity.

8. A system comprising:

a non-transitory computer-readable medium storing instructions; and a processing device communicatively coupled to the non-transitory computer-readable medium, wherein, the processing device is configured to execute the instructions and thereby perform operations comprising:

generating a graphical user interface based on a master compliance readiness questionnaire for a first set of requirements for a first regulation and a second set of requirements for a second regulation applicable to operations performed by an entity, wherein generating the graphical user interface comprises:

configuring a first prompt for requesting a first answer to a first master question of the master compliance readiness questionnaire, and configuring a second prompt for requesting a second answer to a second master question of the master compliance readiness questionnaire;

providing the graphical user interface for display, wherein displaying the graphical user interface involves providing the first prompt requesting the first answer to the first master question and providing the second prompt requesting the second answer to the second master question;

receiving the first answer and the second answer;

accessing an ontology that maps a data structure to the first set of requirements and the second set of requirements, wherein the data structure is configured to be populated via the master compliance readiness questionnaire;

updating a first element of the data structure for the entity with the first answer, wherein the ontology maps the first element to a first requirement of the first set of requirements and a first requirement of the second set of requirements;

updating a second element of the data structure for the entity with the second answer, wherein the ontology maps the second element to a second requirement of the first set of requirements and a second requirement of the second set of requirements;

determining a first percentage of compliance with the first regulation based on the first element of the data structure that has been updated with the first answer and the second element of the data structure that has been updated with the second answer;

determining a second percentage of compliance with the second regulation based on the first element of the data structure that has been updated with the first answer, the second element of the data structure that has been updated with the second answer, and a third element of the data structure having a mapping via the ontology to the second set of requirements and lacking a mapping via the ontology to the first set of requirements; and updating the graphical user interface to present the first percentage of compliance and the second percentage of compliance.

9. The system of claim 8, wherein the operations further comprise:

receiving an indication that a third regulation is no longer applicable to the entity; and editing, based on the indication, the master compliance readiness questionnaire to remove a third master question associated with a third requirement of a third set of requirements for the third regulation.

10. The system of claim 8, wherein the first regulation and the second regulation related to at least one of: an environmental, social, and governance framework; an industry standard; or a privacy standard.

11. The system of claim 8, wherein the operations further comprise:

receiving supporting data associated with the first answer;

determining a confidence level for the first answer, wherein:

the supporting data substantiates the first answer, and the confidence level for the first answer represents a confidence that the entity complies with at least one of the first requirement of the first set of requirements or the first requirement of the second set of requirements; and updating a fourth element of the data structure for the entity with the confidence level for the first answer.

12. The system of claim 11, wherein the operations further comprise updating the graphical user interface to present the confidence level for the first answer.

13. The system of claim 11, wherein the supporting data comprises at least one of unsubstantiated data provided by the entity, substantiated data based on a remote interview with the entity, or substantiated data based on an audit of the entity.

14. A non-transitory computer-readable medium having program code that is stored thereon, the program code executable by one or more processing devices for performing operations comprising:

generating a graphical user interface based on a master compliance readiness questionnaire for a first set of requirements for a first regulation and a second set of requirements for a second regulation applicable to operations performed by an entity, wherein generating the graphical user interface comprises:

configuring a first prompt for requesting a first answer to a first master question of the master compliance readiness questionnaire, and configuring a second prompt for requesting a second answer to a second master question of the master compliance readiness questionnaire;

providing the graphical user interface for display, wherein displaying the graphical user interface involves providing the first prompt requesting the first answer to the first master question and providing the second prompt requesting the second answer to the second master question;

receiving the first answer and the second answer;

accessing an ontology that maps a data structure to the first set of requirements and the second set of requirements:

updating a first element of the data structure for the entity with the first answer based on the ontology mapping the first element of the data structure to a first requirement of the first set of requirements and a first requirement of the second set of requirements;

updating a second element of the data structure based on the ontology mapping the second element of the data structure to a second requirement of the first set of requirements and a second requirement of the second set of requirements;

determining a first percentage of compliance with the first regulation based on the first element of the data structure and the second element of the data structure;

determining a second percentage of compliance with the second regulation based on the first element of the data structure, the second element of the data structure, and a third element of the data structure having a mapping via the ontology to the second set of requirements and lacking a mapping via the ontology to the first set of requirements; and updating the graphical user interface to present the first percentage of compliance and the second percentage of compliance.

15. The non-transitory computer-readable medium of claim 14, wherein the operations further comprise:

receiving an indication that a third regulation is no longer applicable to the entity; and editing, based on the indication, the master compliance readiness questionnaire to remove a third master question associated with a third requirement of a third set of requirements for the third regulation.

16. The non-transitory computer-readable medium of claim 14, wherein the first regulation and the second regulation related to at least one of: an environmental, social, and governance framework; an industry standard; or a privacy standard.

17. The non-transitory computer-readable medium of claim 14, wherein the operations further comprise:

receiving supporting data associated with the first answer;

determining a confidence level for the first answer, wherein:

the supporting data substantiates the first answer, and the confidence level for the first answer represents a confidence that the entity complies with at least one of the first requirement of the first set of requirements or the first requirement of the second set of requirements; and updating a fourth element of the data structure for the entity with the confidence level for the first answer.

18. The non-transitory computer-readable medium of claim 17, wherein the supporting data comprises at least one of unsubstantiated data provided by the entity, substantiated data based on a remote interview with the entity, or substantiated data based on an audit of the entity.

* * * * *